(12) United States Patent
Sasaki et al.

(10) Patent No.: US 8,290,338 B2
(45) Date of Patent: Oct. 16, 2012

(54) RECORDING MEDIUM, PLAYBACK DEVICE, ENCODING DEVICE, INTEGRATED CIRCUIT, AND PLAYBACK OUTPUT DEVICE

(75) Inventors: Taiji Sasaki, Osaka (JP); Hiroshi Yahata, Osaka (JP); Tomoki Ogawa, Osaka (JP); Wataru Ikeda, Osaka (JP)

(73) Assignee: Panasonic Corporation, Osaka (JP)

( * ) Notice: Subject to any disclaimer, the term of this patent is extended or adjusted under 35 U.S.C. 154(b) by 362 days.

(21) Appl. No.: 12/783,708

(22) Filed: May 20, 2010

(65) Prior Publication Data
US 2010/0303444 A1    Dec. 2, 2010

Related U.S. Application Data

(60) Provisional application No. 61/181,424, filed on May 27, 2009.

(51) Int. Cl.
*H04N 9/80* (2006.01)
(52) U.S. Cl. ......... 386/241; 386/240; 386/242; 386/244
(58) Field of Classification Search .................... 386/241
See application file for complete search history.

(56) References Cited

U.S. PATENT DOCUMENTS

| | | | |
|---|---|---|---|
| 5,923,869 A | 7/1999 | Kashiwagi et al. | |
| 6,393,574 B1 | 5/2002 | Kashiwagi et al. | |
| 6,470,460 B1 | 10/2002 | Kashiwagi et al. | |
| 6,484,266 B2 | 11/2002 | Kashiwagi et al. | |
| 6,502,198 B2 | 12/2002 | Kashiwagi et al. | |
| 6,502,199 B2 | 12/2002 | Kashiwagi et al. | |
| 6,502,200 B2 | 12/2002 | Kashiwagi et al. | |
| 6,516,138 B2 | 2/2003 | Kashiwagi et al. | |
| 6,516,139 B2 | 2/2003 | Kashiwagi et al. | |
| 6,519,414 B2 | 2/2003 | Kashiwagi et al. | |
| 6,526,226 B2 | 2/2003 | Kashiwagi et al. | |
| 6,546,195 B2 | 4/2003 | Kashiwagi et al. | |
| 6,573,819 B1 | 6/2003 | Oshima et al. | |
| 6,574,423 B1 | 6/2003 | Oshima et al. | |

(Continued)

FOREIGN PATENT DOCUMENTS

JP    3935507    3/2007

(Continued)

OTHER PUBLICATIONS

International Search Report issued Aug. 10, 2010 in International (PCT) Application No. PCT/JP2010/003319.

(Continued)

*Primary Examiner* — Jamie Atala
(74) *Attorney, Agent, or Firm* — Wenderoth, Lind & Ponack, L.L.P.

(57) ABSTRACT

A main-view and sub-view video stream pair, a graphics stream, and playlist information are recorded on a BD-ROM disc. In the sub-view video stream, metadata is provided in each GOP. The metadata includes a correspondence table associating offset identifiers and offset information. The offset information defines offset control for each picture in a GOP. Offset control is processing to provide a left offset and right offset for the horizontal coordinates in a graphics plane to generate a pair of graphics planes that are respectively combined with main-view and sub-view video planes. The playlist information includes a stream selection table for each playback section. When the stream selection table associates a stream number with a packet identifier of a graphics stream, one of the offset identifiers is allocated to the stream number.

25 Claims, 113 Drawing Sheets

U.S. PATENT DOCUMENTS

| | | |
|---|---|---|
| 6,907,190 B2 | 6/2005 | Kashiwagi et al. |
| 6,925,250 B1 | 8/2005 | Oshima et al. |
| 6,954,584 B2 | 10/2005 | Kashiwagi et al. |
| 7,194,194 B2 | 3/2007 | Kashiwagi et al. |
| 7,317,868 B2 | 1/2008 | Oshima et al. |
| 7,848,617 B2 * | 12/2010 | Seo et al. ............ 386/244 |
| 2001/0053281 A1 | 12/2001 | Kashiwagi et al. |
| 2001/0055474 A1 | 12/2001 | Kashiwagi et al. |
| 2002/0001454 A1 | 1/2002 | Kashiwagi et al. |
| 2002/0001455 A1 | 1/2002 | Kashiwagi et al. |
| 2002/0003944 A1 | 1/2002 | Kashiwagi et al. |
| 2002/0003945 A1 | 1/2002 | Kashiwagi et al. |
| 2002/0003950 A1 | 1/2002 | Kashiwagi et al. |
| 2002/0003951 A1 | 1/2002 | Kashiwagi et al. |
| 2002/0025143 A1 | 2/2002 | Kashiwagi et al. |
| 2003/0053797 A1 | 3/2003 | Oshima et al. |
| 2003/0108341 A1 | 6/2003 | Oshima et al. |
| 2003/0138238 A1 | 7/2003 | Kashiwagi et al. |
| 2004/0175133 A1 | 9/2004 | Kashiwagi et al. |
| 2004/0179820 A1 | 9/2004 | Kashiwagi et al. |
| 2005/0180735 A1 | 8/2005 | Oshima et al. |
| 2005/0249375 A1 * | 11/2005 | Seo et al. ............ 382/100 |
| 2007/0003221 A1 * | 1/2007 | Hamada et al. ............ 386/95 |
| 2008/0056686 A1 | 3/2008 | Oshima et al. |
| 2008/0063385 A1 | 3/2008 | Oshima et al. |
| 2008/0063386 A1 | 3/2008 | Oshima et al. |
| 2008/0101767 A1 | 5/2008 | Oshima et al. |
| 2008/0292287 A1 | 11/2008 | Oshima et al. |
| 2009/0142041 A1 * | 6/2009 | Nagasawa et al. ............ 386/124 |
| 2009/0175596 A1 * | 7/2009 | Hirai ............ 386/97 |
| 2009/0220215 A1 | 9/2009 | Oshima et al. |
| 2009/0252483 A1 | 10/2009 | Oshima et al. |
| 2010/0020158 A1 | 1/2010 | Oshima et al. |
| 2010/0134602 A1 | 6/2010 | Inaba |
| 2010/0303444 A1 | 12/2010 | Sasaki et al. |

FOREIGN PATENT DOCUMENTS

| | | |
|---|---|---|
| JP | 2007-166651 | 6/2007 |
| JP | 2009-17207 | 1/2009 |
| WO | 2008/044191 | 4/2008 |

OTHER PUBLICATIONS

Office Action issued Nov. 16, 2011 in U.S Appl. No. 13/055,025.

* cited by examiner

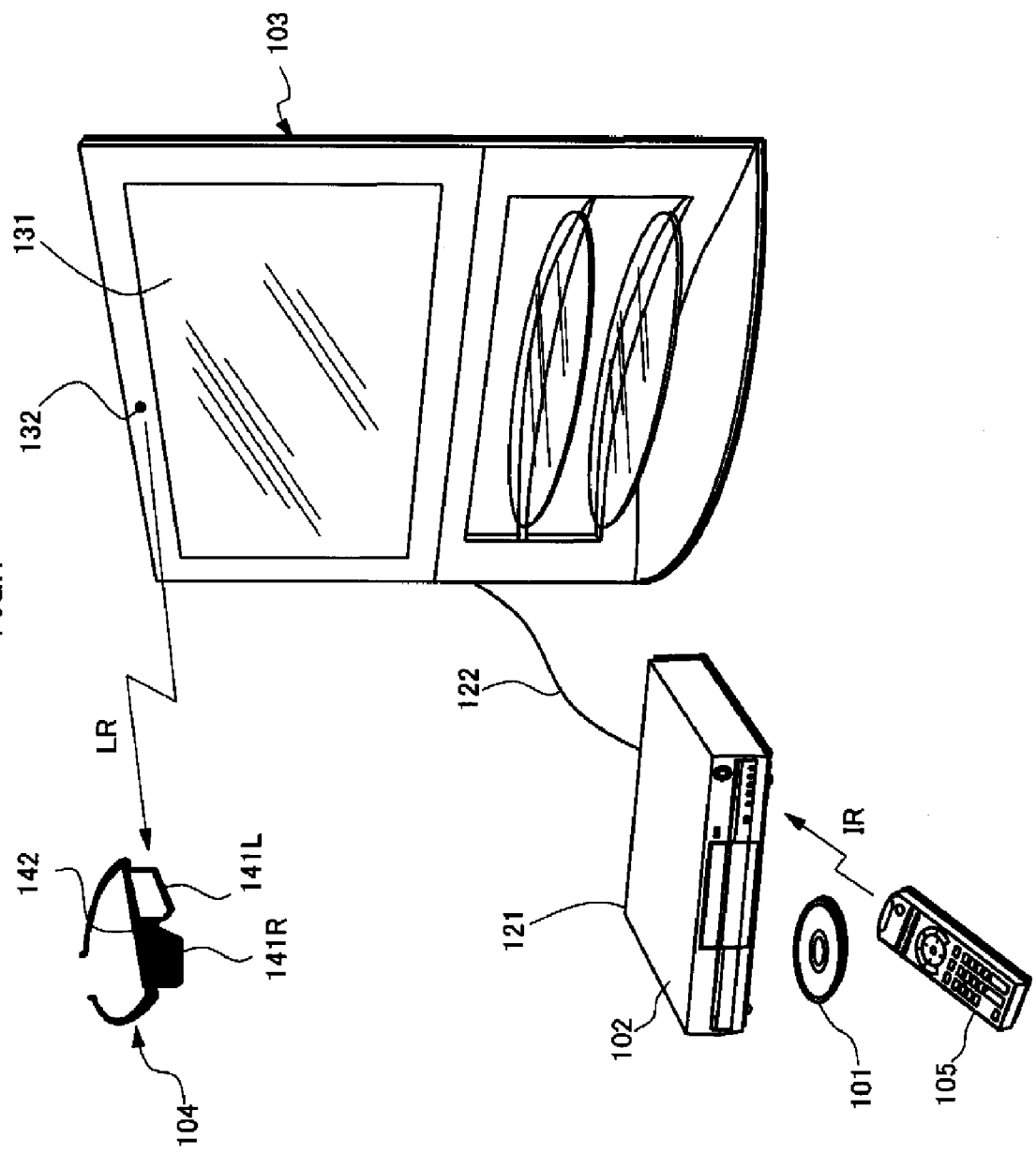

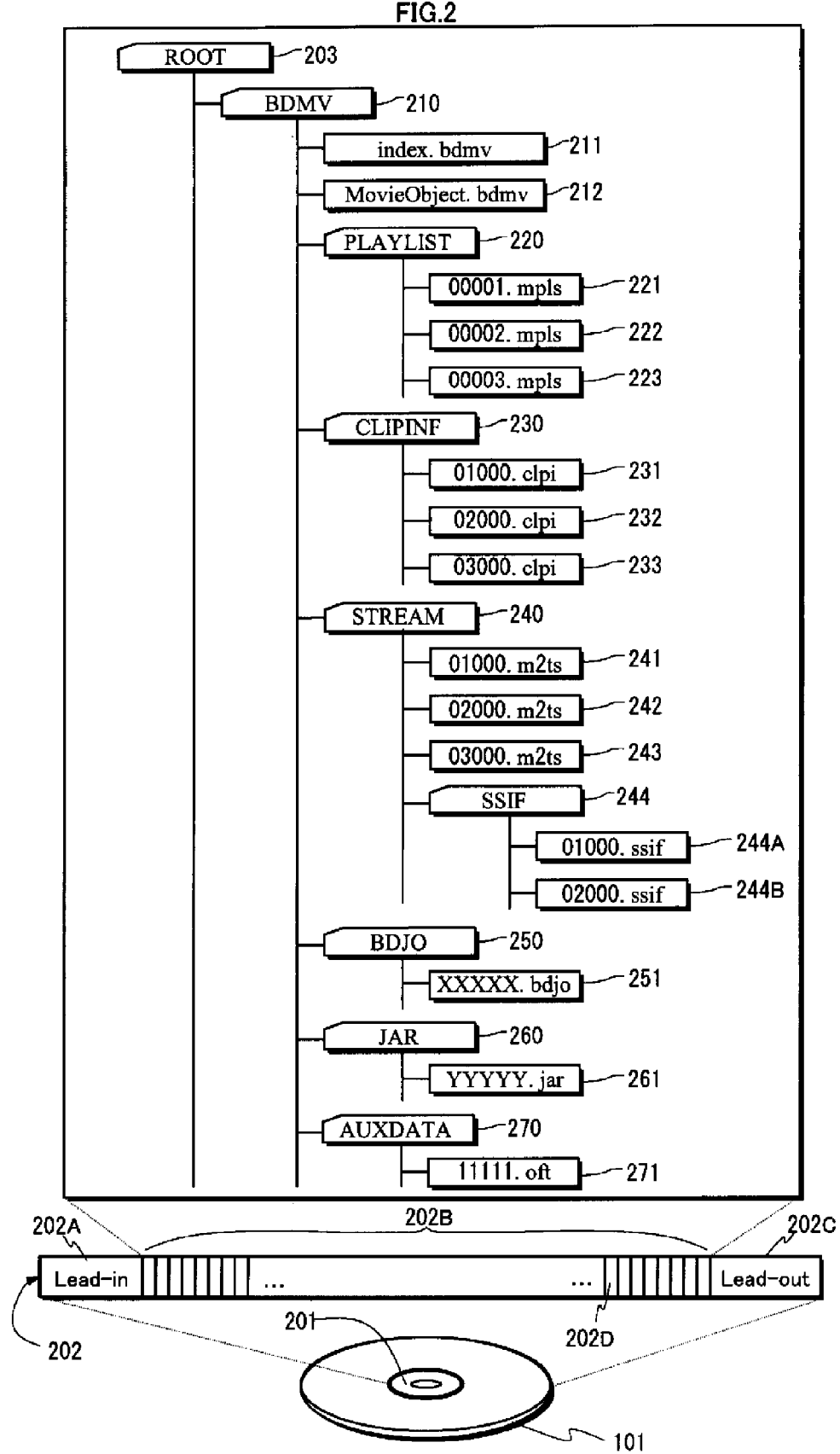

FIG.3A

| PID=0x1011 | Primary video stream | 301 |
| 0x1100 | Primary audio stream | 302A |
| 0x1101 | Primary audio stream | 302B |
| 0x1200 | PG stream | 303A |
| 0x1201 | PG stream | 303B |
| 0x1400 | IG stream | 304 |
| 0x1A00 | Secondary audio stream | 305 |
| 0x1B00 | Secondary video stream | 306 |

FIG.3B

| PID=0x1012 | Primary video stream | 311R |
| 0x1013 | Primary video stream | 311D |
| 0x1B20 | Secondary video stream | 312R |
| 0x1B21 | Secondary video stream | 313D |

FIG.3C

| PID=0x1800 | Text subtitle stream | 321 |

FIG.14

| Syntax | No. of bits |
|---|---|
| offset_metadata () { | |
|   number_of_offset_sequence | 8 |
|   number_of_displayed_frames_in_GOP | |
|   for(offset_sequence_id=0;<br>    offset_sequence_id<number_of_offset_sequence;<br>    offset_sequence_id++) { | |
|     offset_sequence () { | |
|       for(i=0; i<number_of_displayed_frames_in_GOP; i++) { | |
|         Plane_offset_direction | 1 |
|         Plane_offset_value | 7 |
|       } | |
|     } | |
|   } | |
| } | |

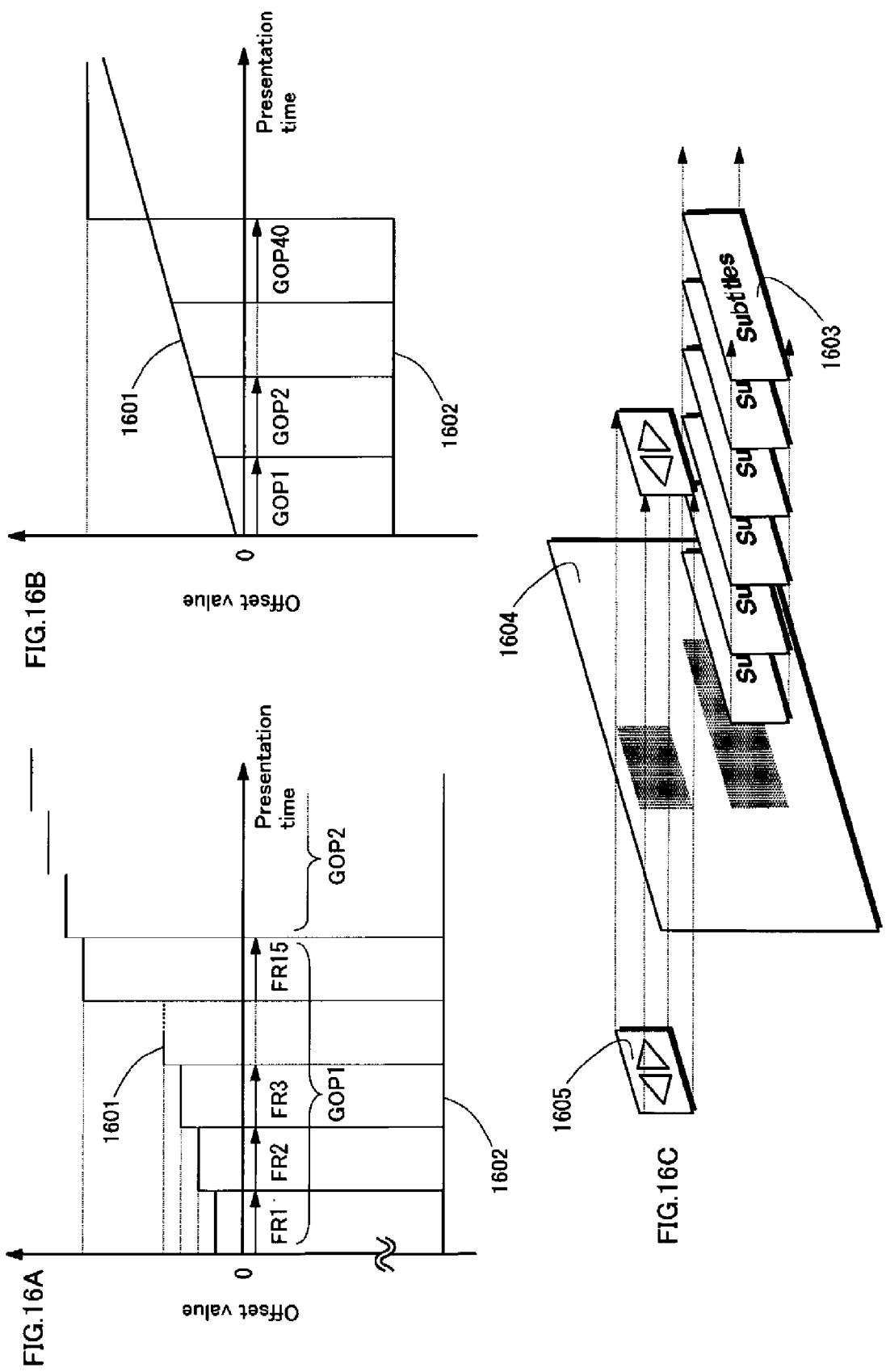

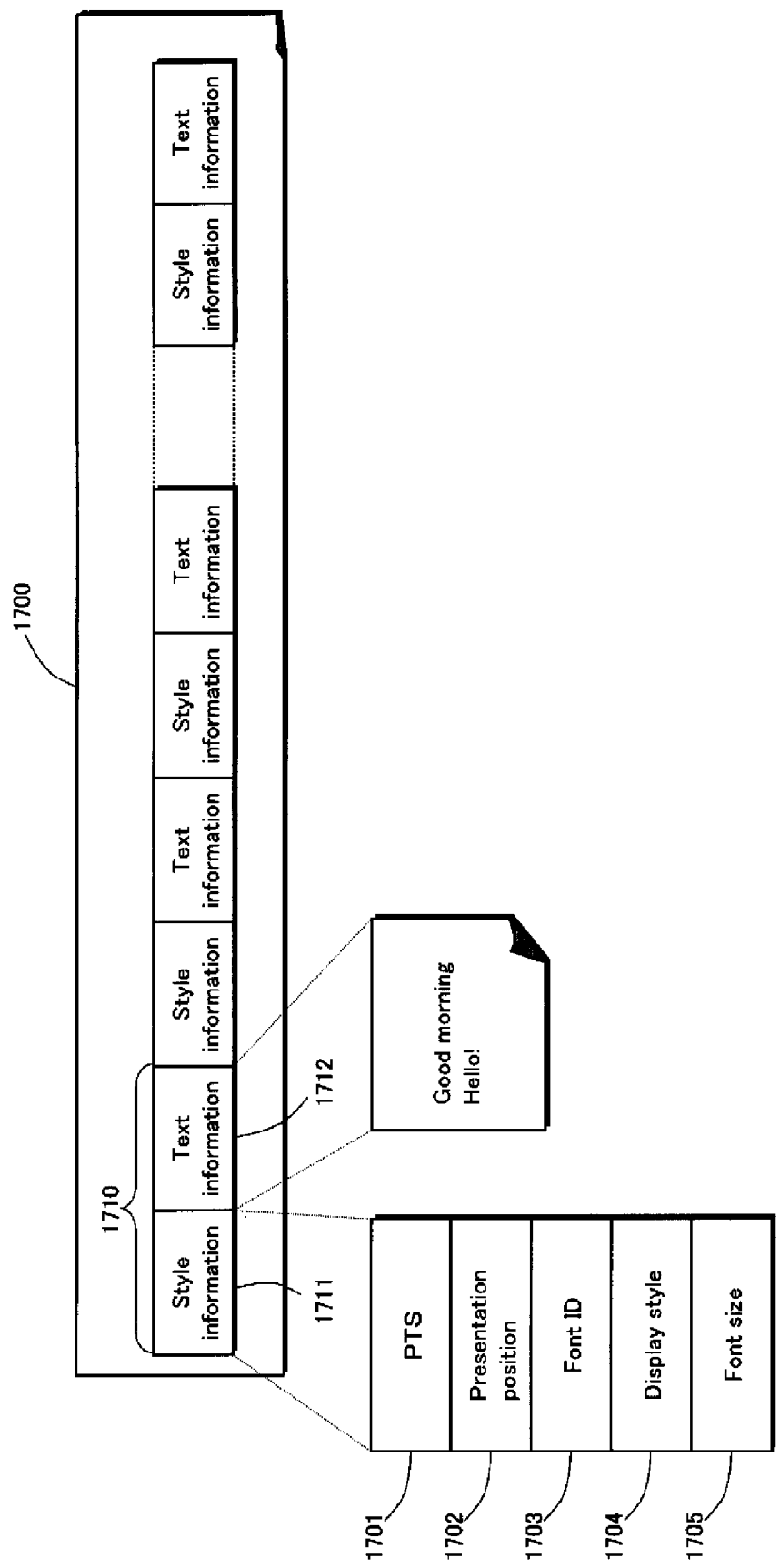

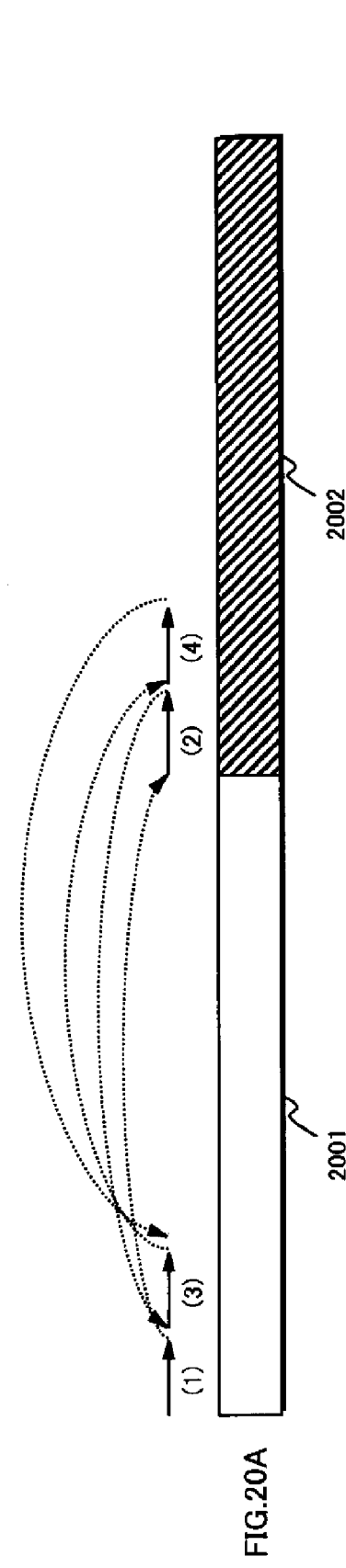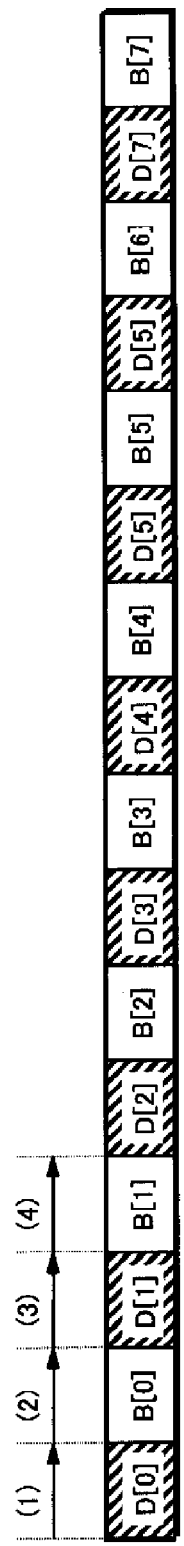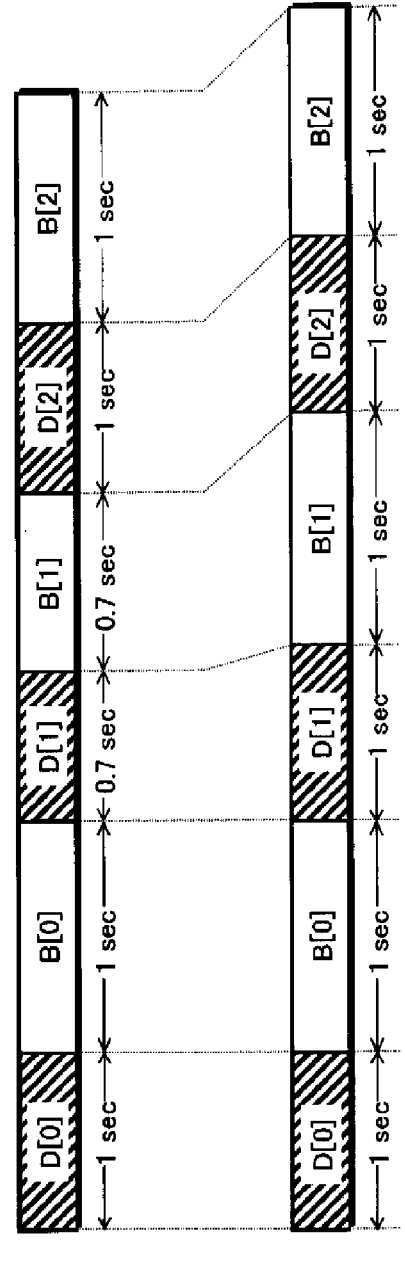

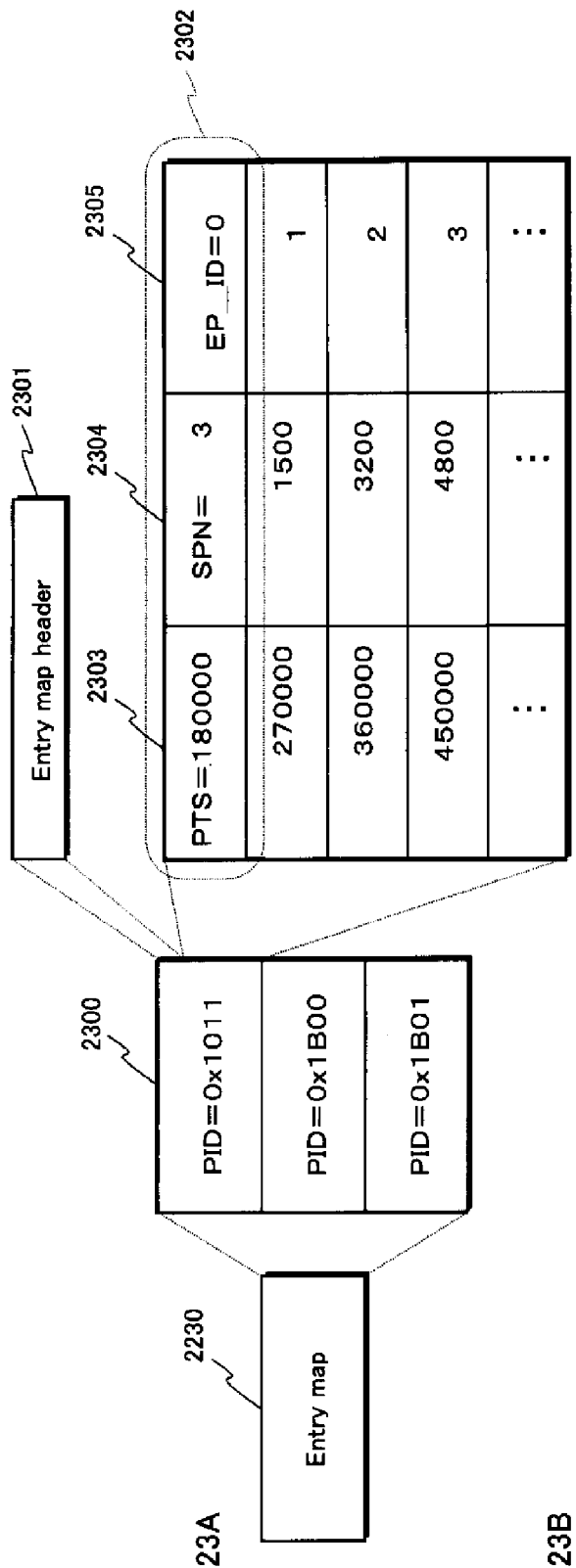
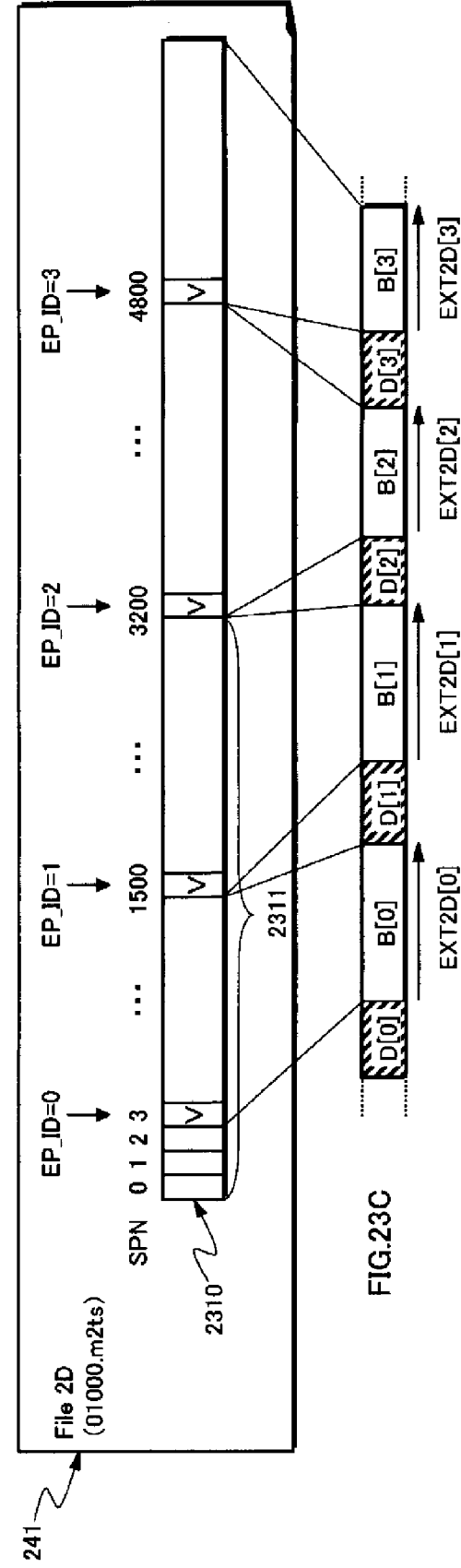
FIG.23A
FIG.23B
FIG.23C

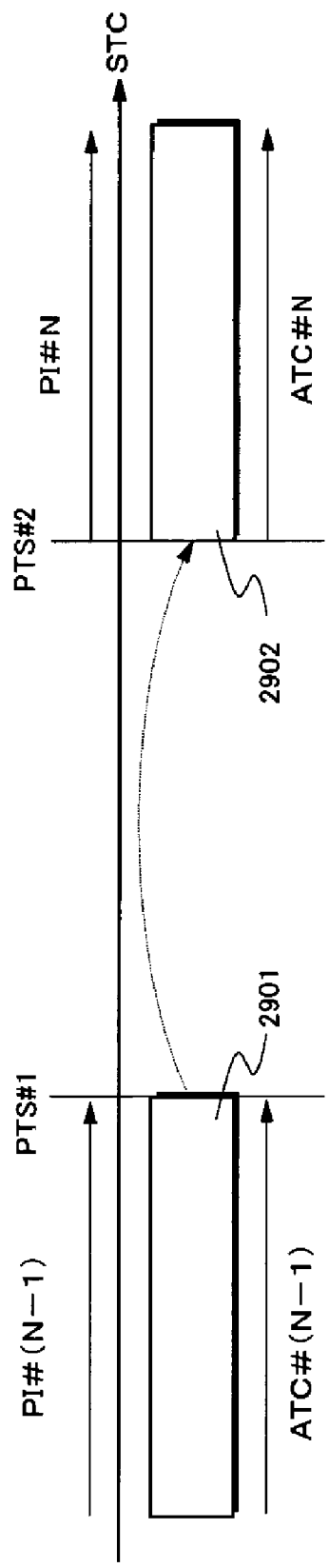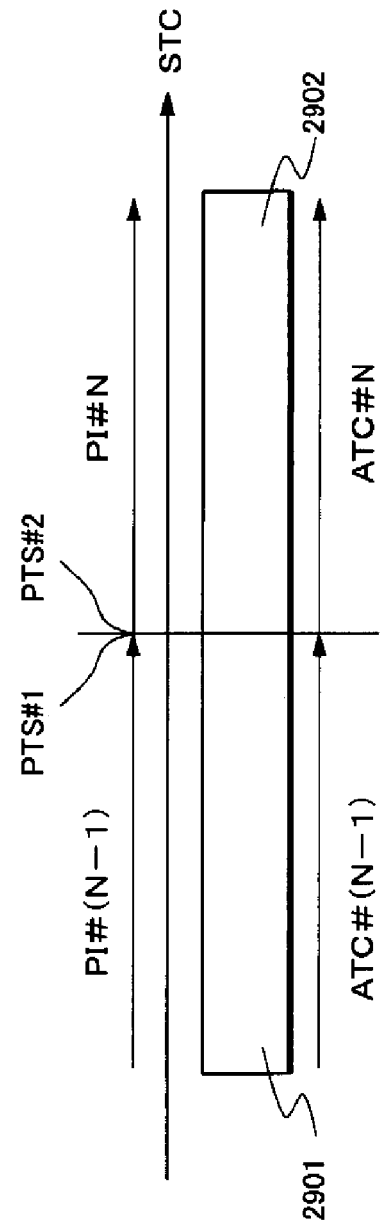

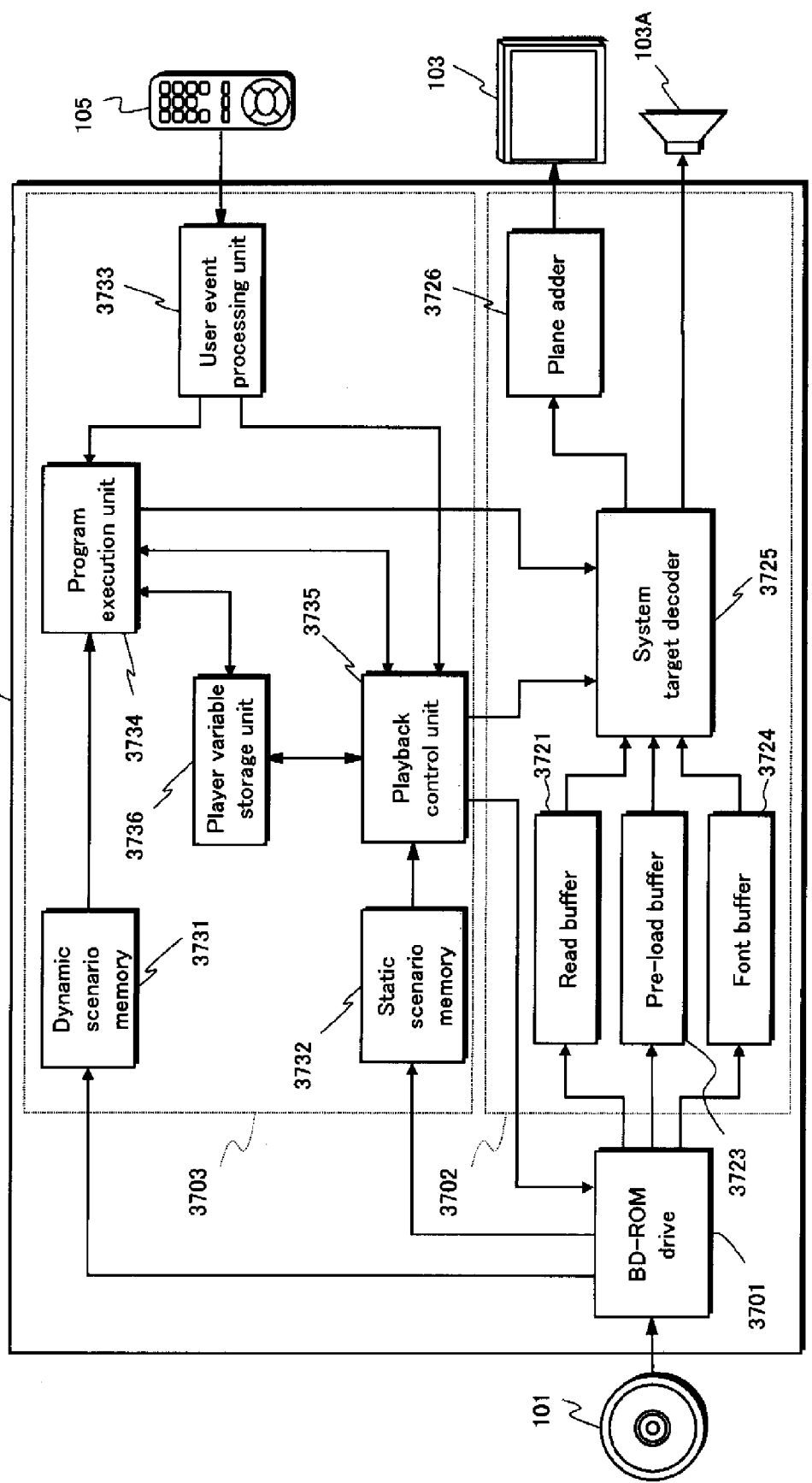

FIG. 38

| 3801 | 3802 |
|---|---|
| 0 | Language Code |
| 1 | Audio stream number |
| 2 | Subtitle stream number |
| 3 | Angle number |
| 4 | Title number |
| 5 | Chapter number |
| 6 | Program number |
| 7 | Cell number |
| 8 | Key name |
| 9 | Navigation timer |
| 10 | Current playback time |

| 3801 | 3802 |
|---|---|
| 11 | Player audio mixing mode for Karaoke |
| 12 | Country code for parental management |
| 13 | Parental level |
| 14 | Player configuration for Video |
| 15 | Player configuration for Audio |
| 16 | Language code for AST |
| 17 | Language code ext. for AST |
| 18 | Language code for STST |
| 19 | Language coded ext. for STST |
| 20 | Player region code |
| 21 | Secondary Video Stream number |

| 3801 | 3802 |
|---|---|
| 22 | Secondary Audio Stream number |
| 23 | Player status |
| 24 | reserved |
| 25 | reserved |
| 26 | reserved |
| 27 | reserved |
| 28 | reserved |
| 29 | reserved |
| 30 | reserved |
| 31 | reserved |
| 32 | reserved |

FIG. 42

| 27 | PG_ref_offset_id ~4210 | IG_ref_offset_id ~4211 | SV_ref_offset_id ~4212 | IM_ref_offset_id ~4213 |
|---|---|---|---|---|
| 28 | PG_offset_adjustment ~4220 | IG_offset_adjustment ~4221 | SV_offset_adjustment ~4222 | IM_offset_adjustment ~4223 |

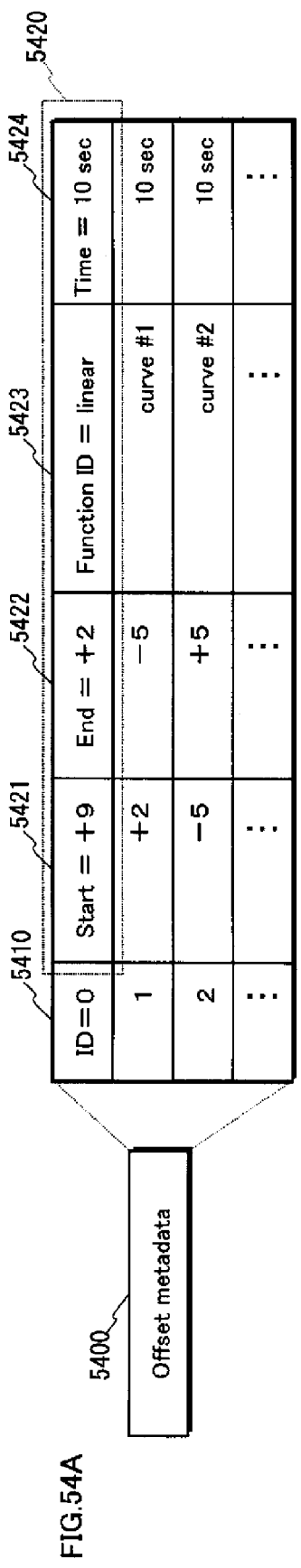
FIG.54A
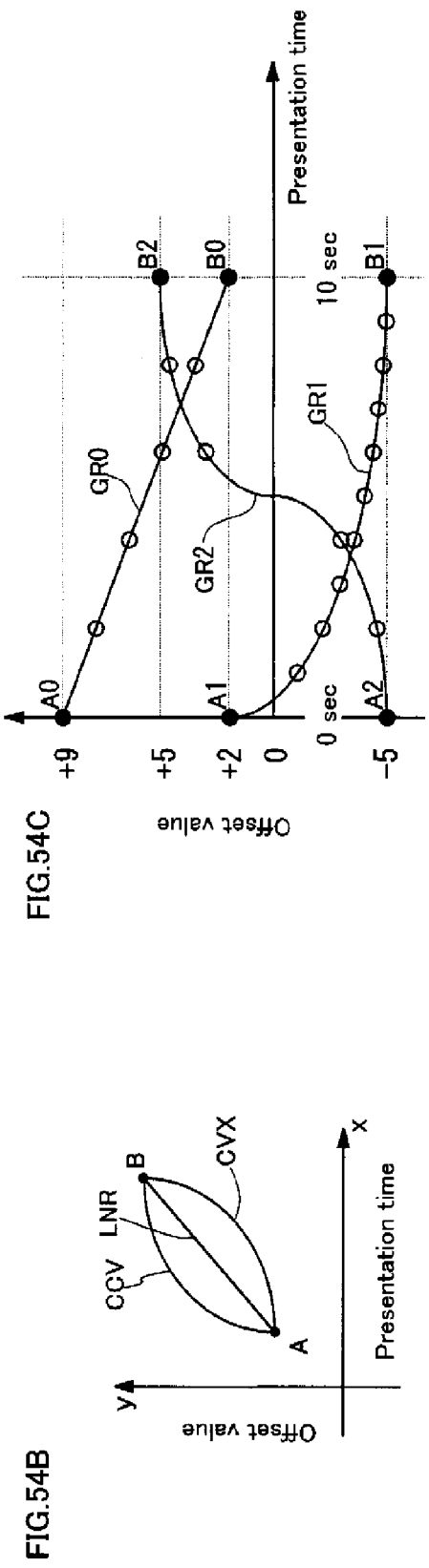
FIG.54C
FIG.54B

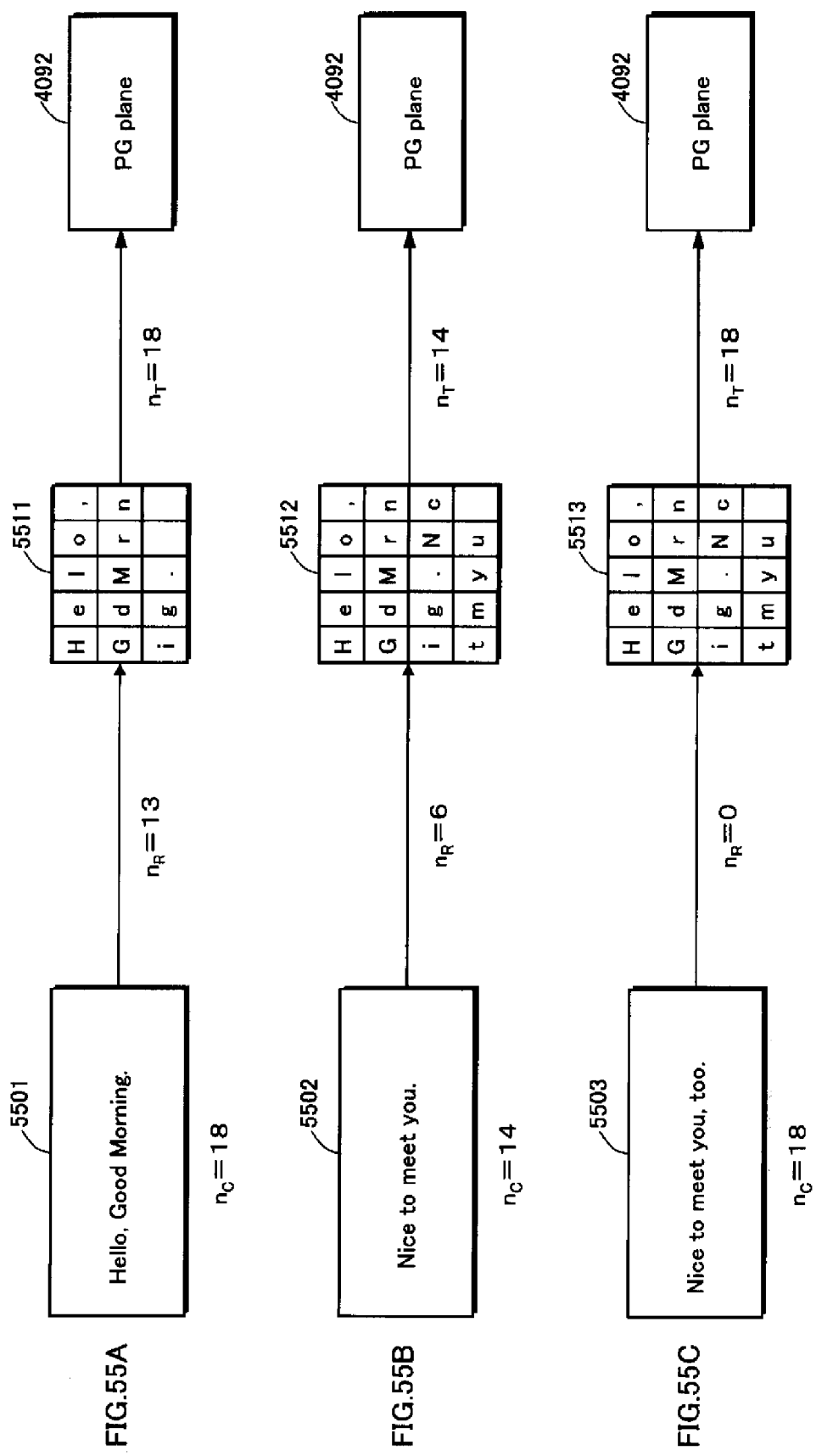

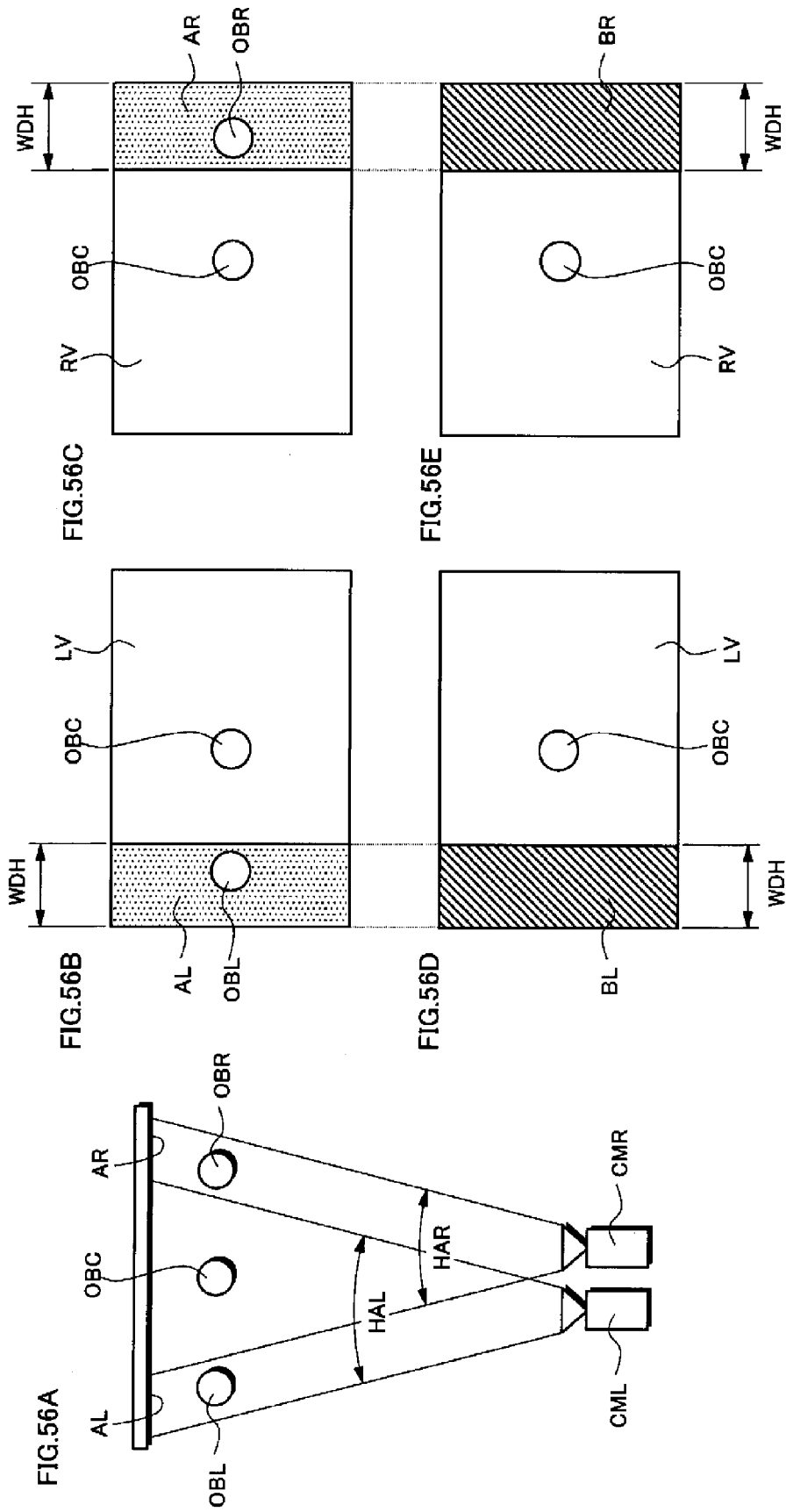

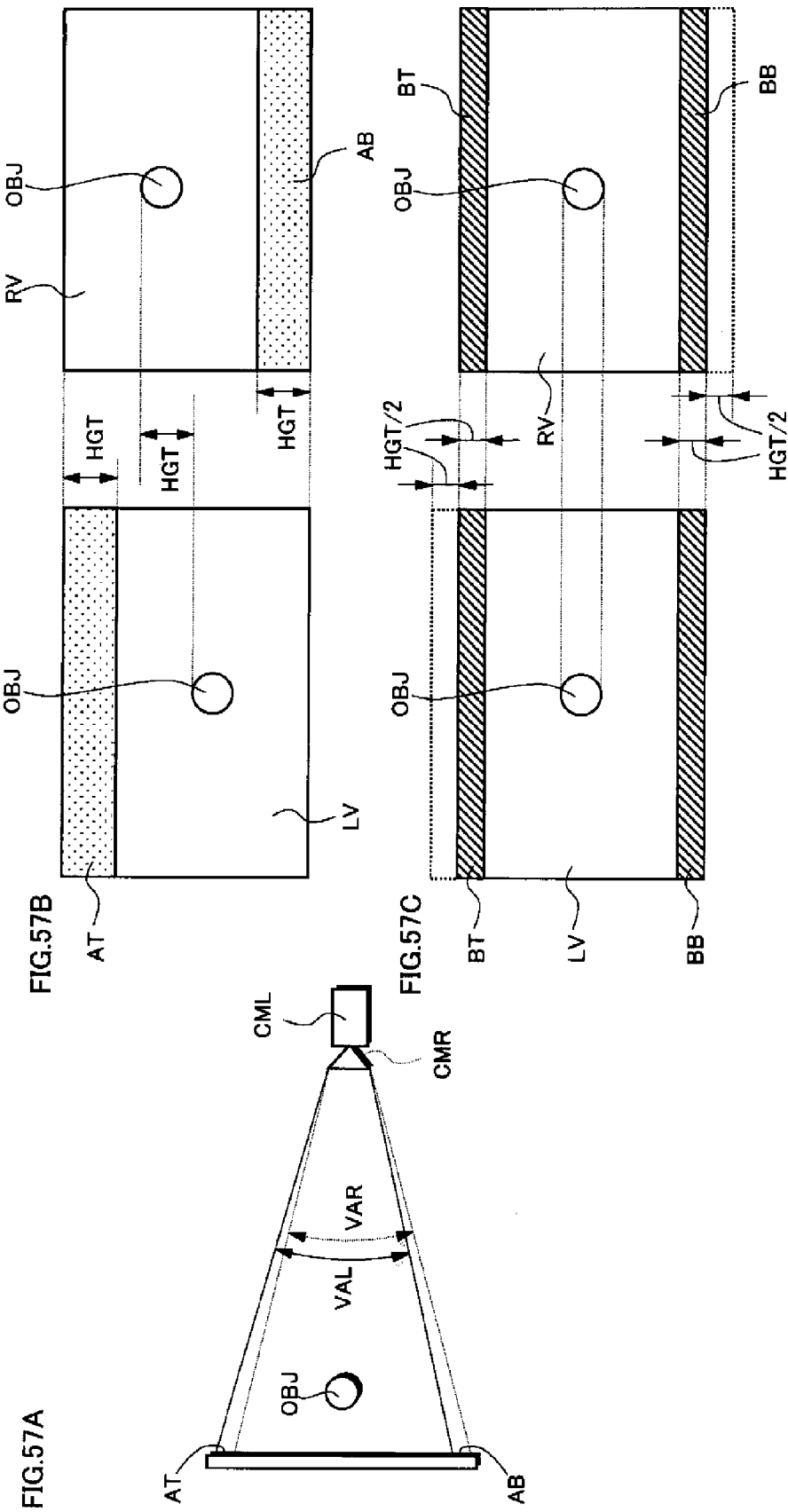

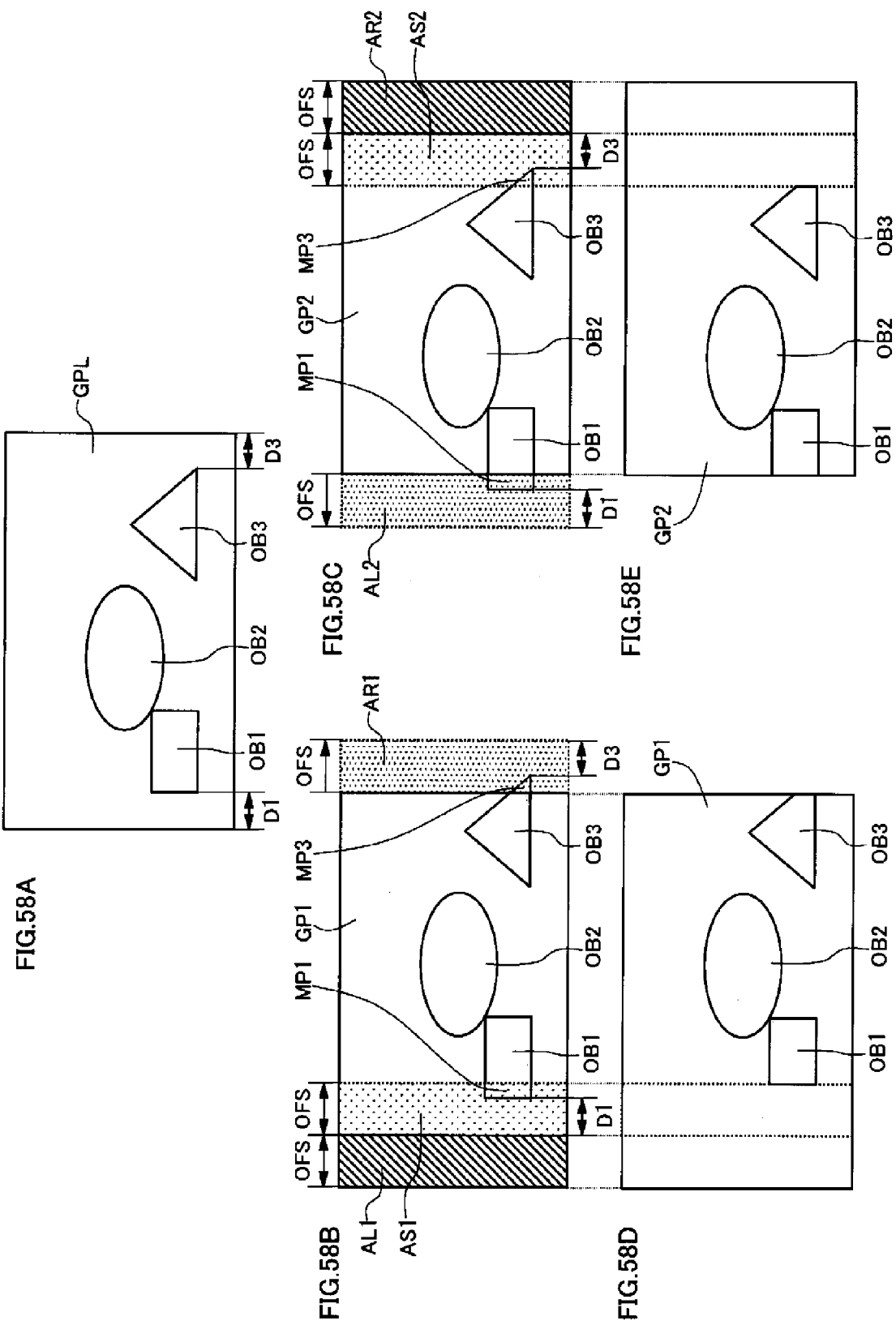

FIG.61A

| PID=0x1012 | Primary video stream |
|---|---|
| 0x1220 | Left-view PG stream |
| 0x1221 | Left-view PG stream |
| 0x1240 | Right-view PG stream |
| 0x1241 | Right-view PG stream |
| 0x1420 | Left-view IG stream |
| 0x1440 | Right-view IG stream |
| 0x1B20 | Secondary video stream |

FIG.61B

| PID=0x1013 | Primary video stream |
|---|---|
| 0x1260 | Depth map PG stream |
| 0x1261 | Depth map PG stream |
| 0x1460 | Depth map IG stream |
| 0x1B40 | Secondary video stream |

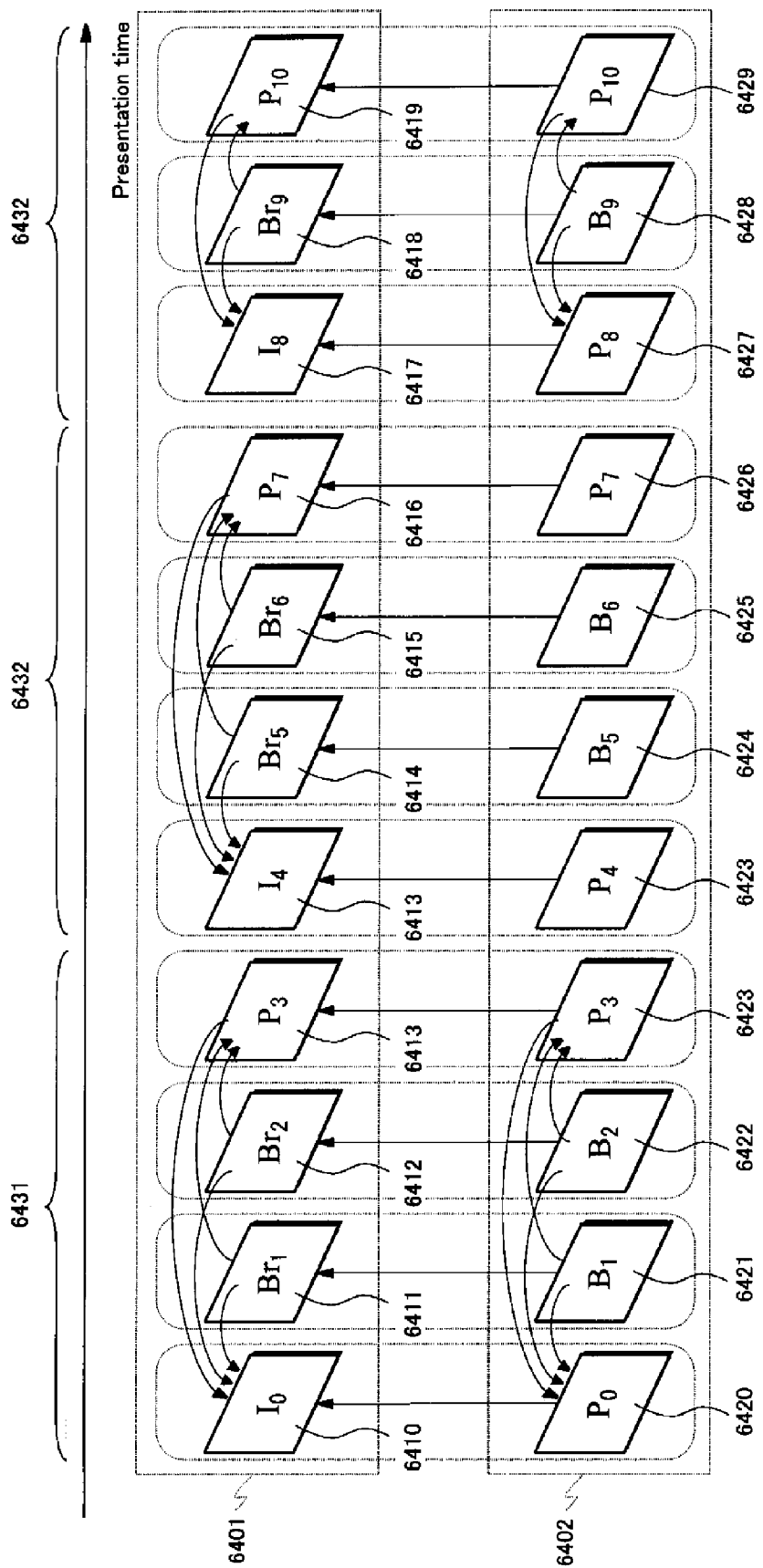

FIG.66

| | P slice | B slice |
|---|---|---|
| Slice header | .... <br> - ref_pic_list_modification_flag_l0 = 1 <br> - modification_of_pic_nums_idc = 5 <br> - abs_diff_view_idx_minus1 = 0 <br> - ref_pic_list_modification_flag_l0 = 3 <br> .... | .... <br> - ref_pic_list_modification_flag_l0 = 1 <br> - modification_of_pic_nums_idc = 5 <br> - abs_diff_view_idx_minus1 = 0 <br> - ref_pic_list_modification_flag_l0 = 3 <br> - ref_pic_list_modification_flag_l1 = 1 <br> - modification_of_pic_nums_idc = 5 <br> - abs_diff_view_idx_minus1 = 0 <br> - ref_pic_list_modification_flag_l1 = 3 <br> .... |
| Slice data | - mb_skip_run = number of MB in slice (for CAVLC) <br> - mb_skip_flag x number of MB in slice (for CABAC) | - mb_skip_run = number of MB in slice (for CAVLC) <br> - mb_skip_flag x number of MB in slice (for CABAC) |

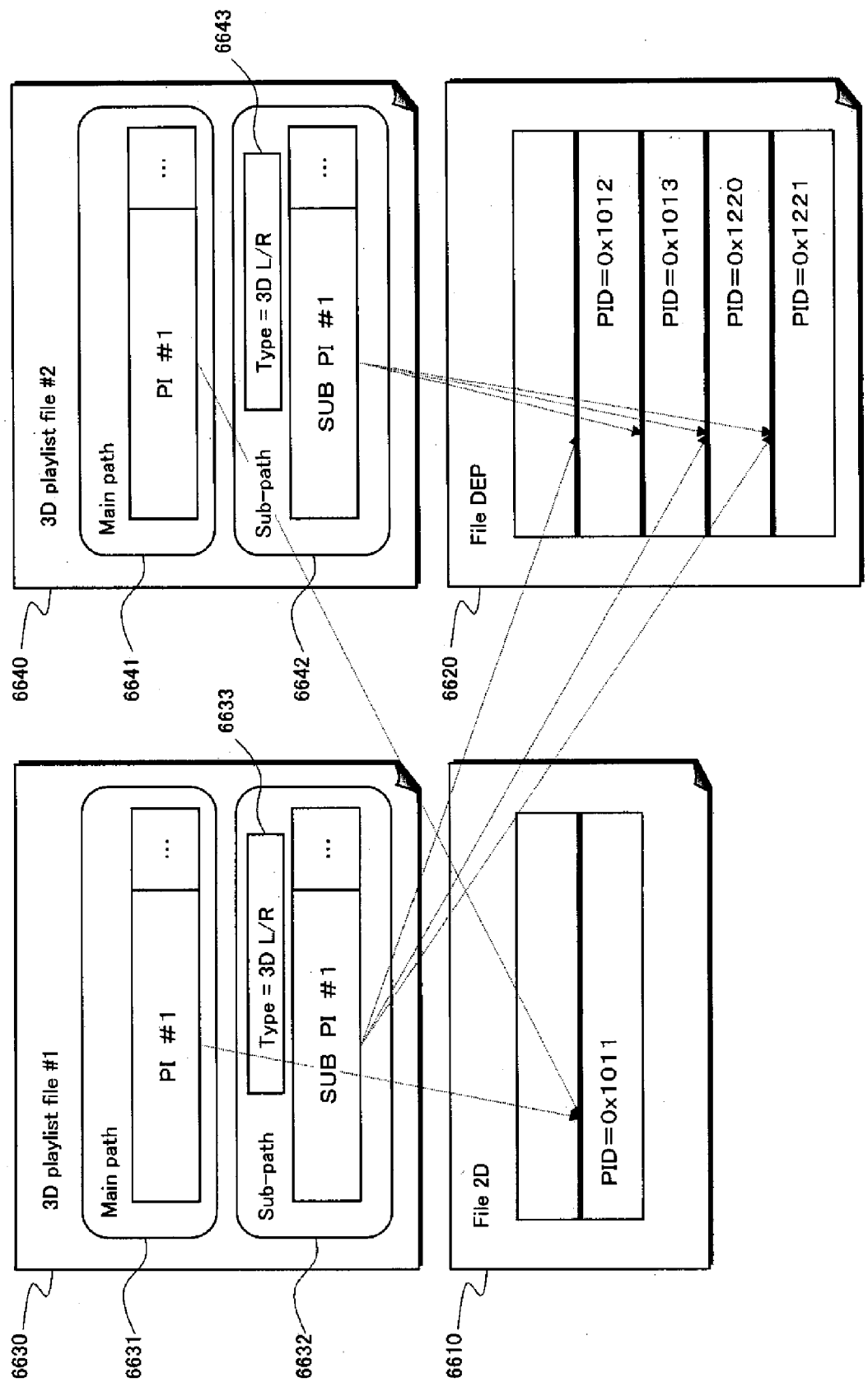

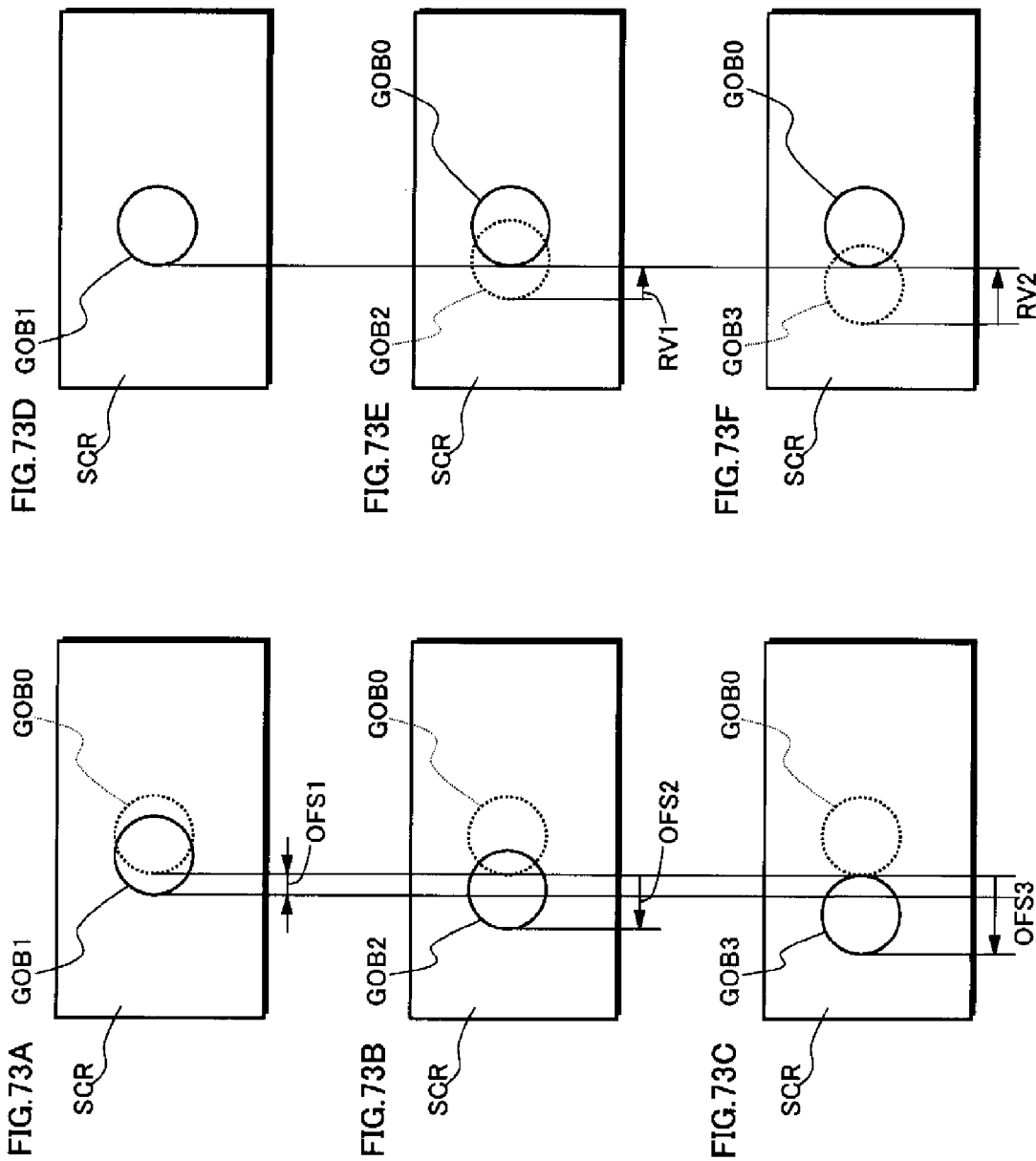

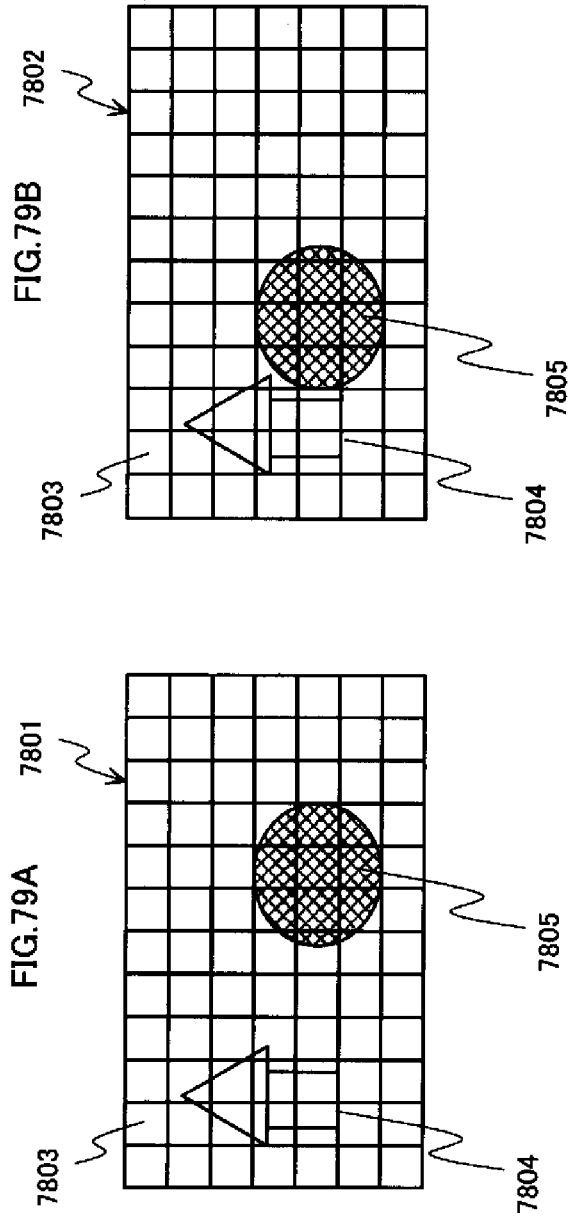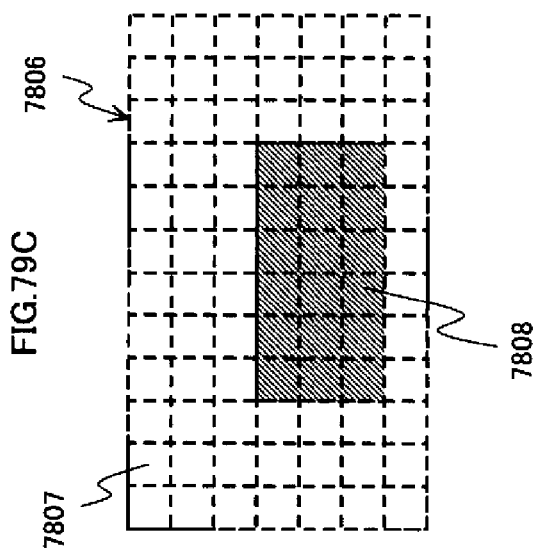

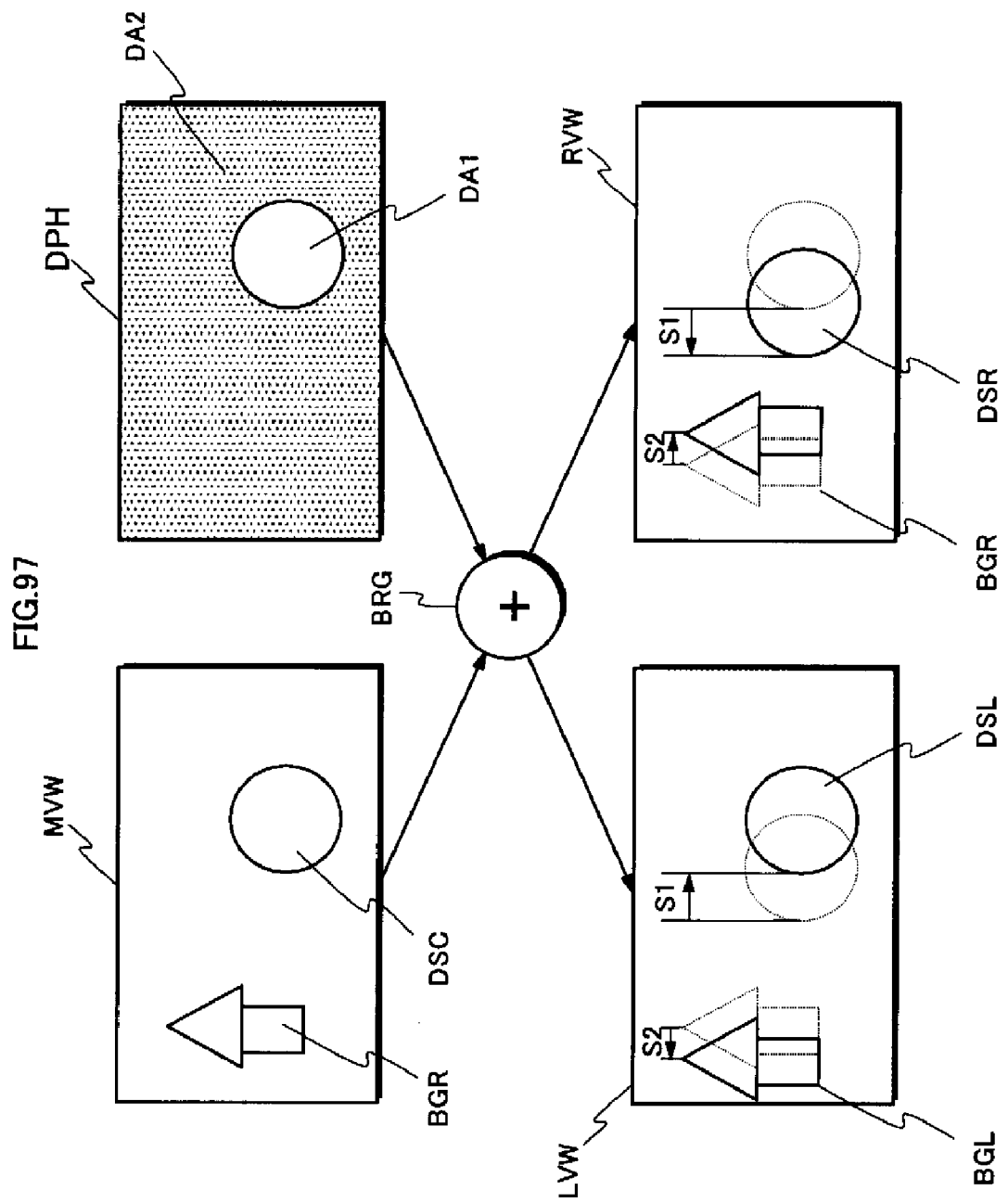

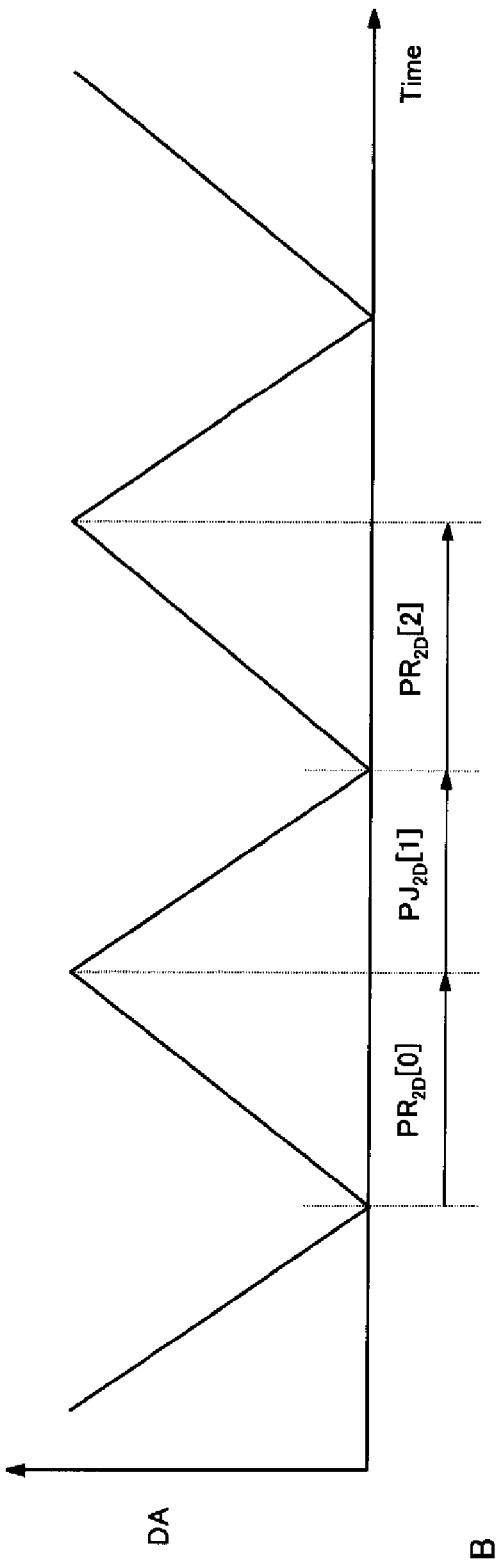
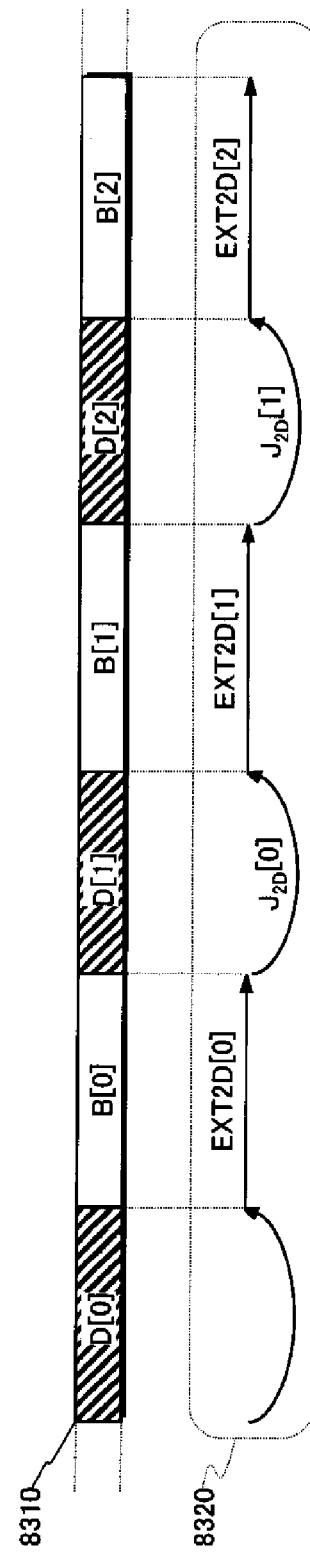
FIG.99A
FIG.99B

FIG.100

| $S_{JUMP}$ (sectors) | 0 | 1 – 10000 | 10001 – 20000 | 20001 – 40000 | 40000 – 1/10 of a stroke | 1/10 of a stroke or greater |
|---|---|---|---|---|---|---|
| $T_{JUMP\_MAX}$ (ms) | $0 = T_{JUMP0}$ | 250 | 300 | 350 | 700 | 1400 |

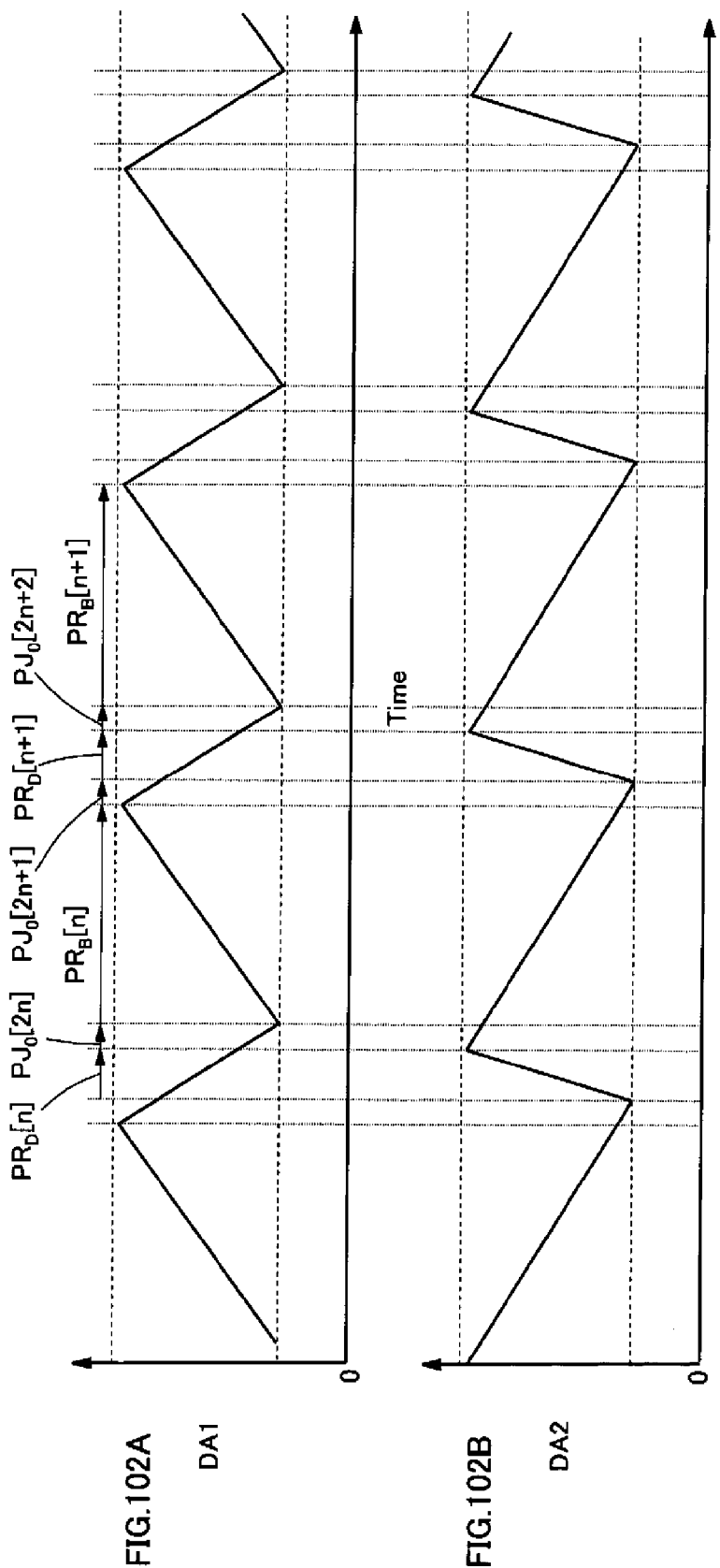
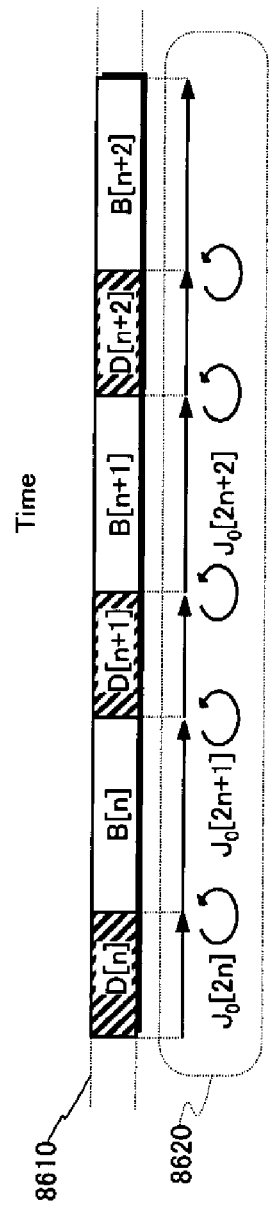
FIG. 102A DA1
FIG. 102B DA2
FIG. 102C

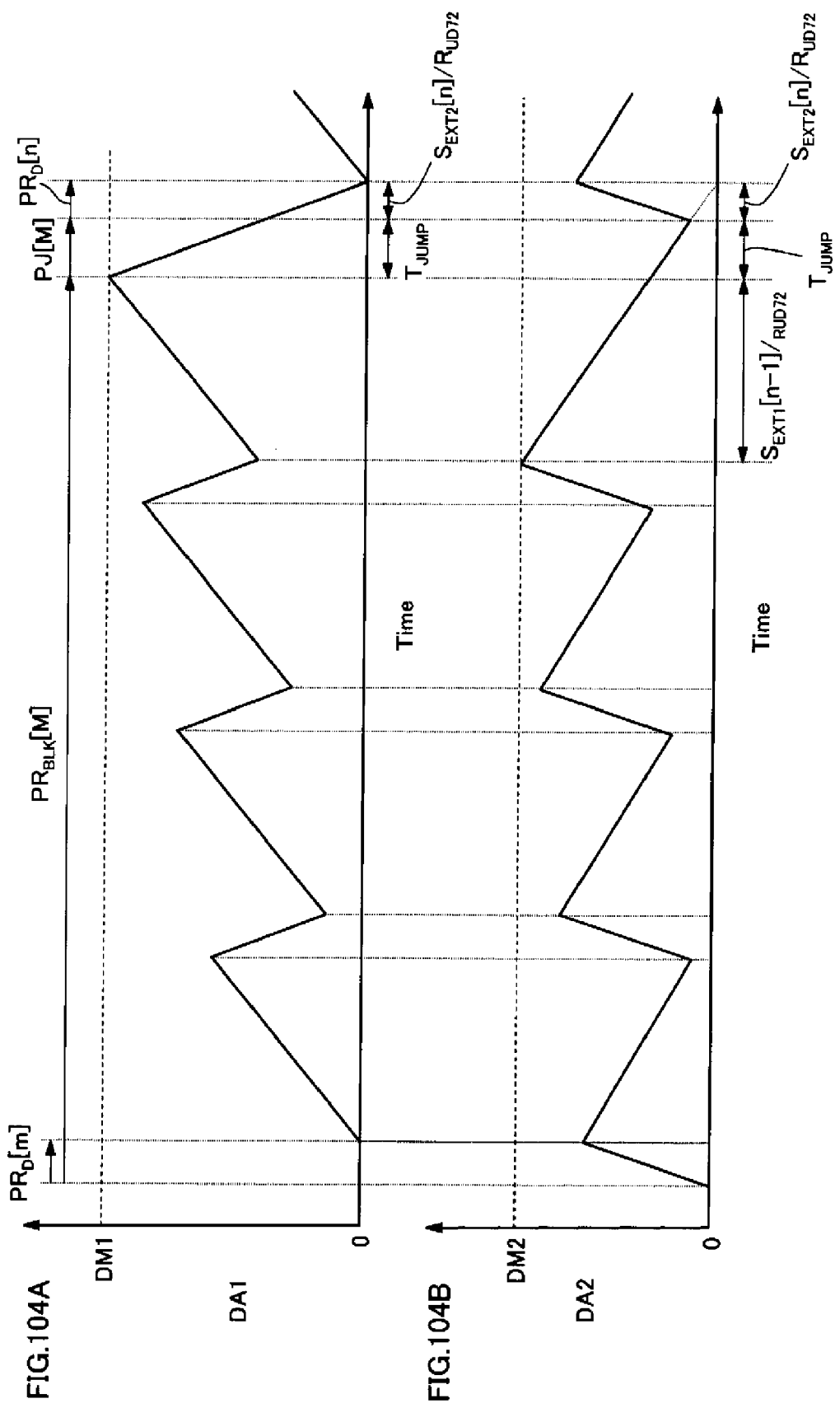

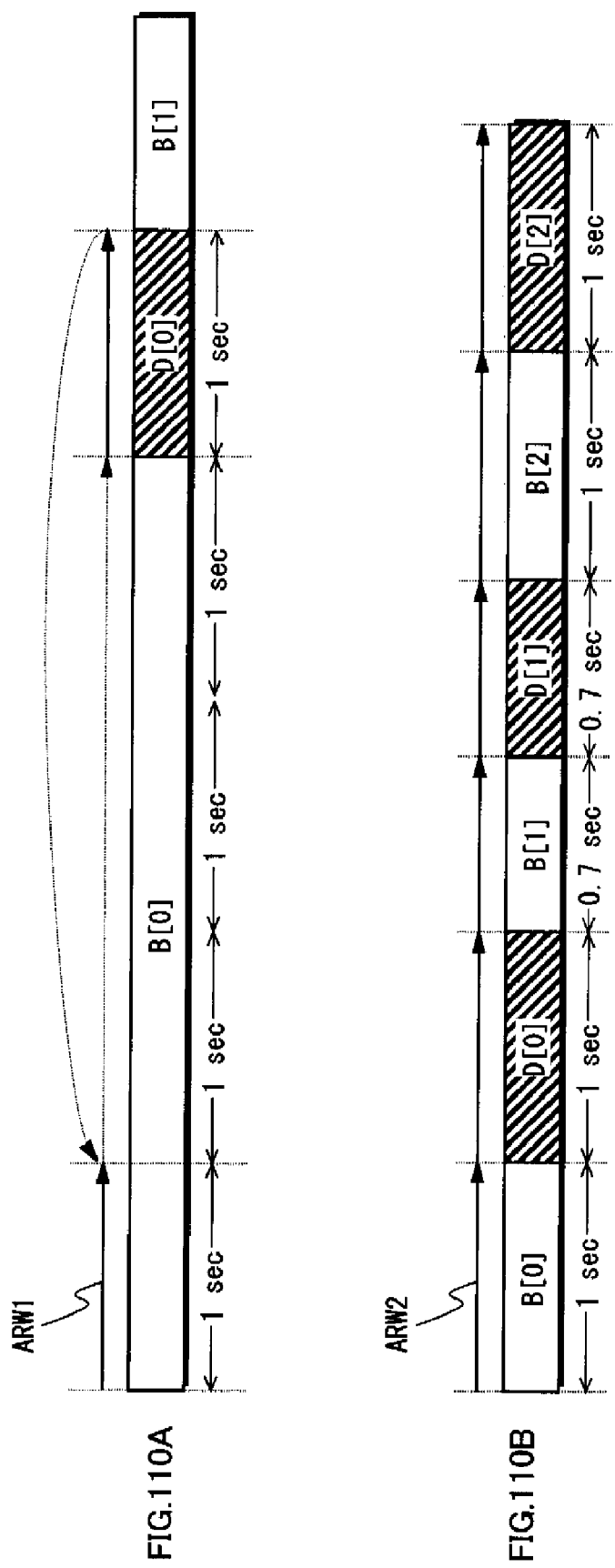

RECORDING MEDIUM, PLAYBACK DEVICE, ENCODING DEVICE, INTEGRATED CIRCUIT, AND PLAYBACK OUTPUT DEVICE

This application claims benefit to the provisional U.S. application 61/181,424, filed May 27, 2009.

BACKGROUND OF THE INVENTION (1) Field of the Invention

The present invention relates to a technology for stereoscopic, i.e. three-dimensional (3D), video playback and especially to the structure of stream data on a recording medium.

(2) Description of the Related Art

In recent years, general interest in 3D video has been increasing. For example, amusement park attractions that incorporate 3D video images are popular. Furthermore, throughout the country, the number of movie theaters showing 3D movies is increasing. Along with this increased interest in 3D video, the development of technology that enables playback of 3D video images in the home has also been progressing. There is demand for this technology to store 3D video content on a portable recording medium, such as an optical disc, while maintaining the 3D video content at high image quality. Furthermore, there is demand for the recording medium to be compatible with a two-dimensional (2D) playback device. That is, it is preferable for a 2D playback device to be able to play back 2D video images and a 3D playback device to be able to play back 3D video images from the same 3D video content recorded on the recording medium. Here, a "2D playback device" refers to a conventional playback device that can only play back monoscopic video images, i.e. 2D video images, whereas a "3D playback device" refers to a playback device that can play back 3D video images. Note that in the present description, a 3D playback device is assumed to be able to also play back conventional 2D video images.

FIG. 113 is a schematic diagram illustrating the technology for ensuring the compatibility of an optical disc storing 3D video content with 2D playback devices (see Patent Literature 1). An optical disc PDS stores two types of video streams. One is a 2D/left-view video stream, and the other is a right-view video stream. A "2D/left-view video stream" represents a 2D video image to be shown to the left eye of a viewer during 3D playback, i.e. a "left view". During 2D playback, this stream constitutes the 2D video image. A "right-view video stream" represents a 2D video image to be shown to the right eye of the viewer during 3D playback, i.e. a "right view". The left and right-view video streams have the same frame rate but different presentation times shifted from each other by half a frame period. For example, when the frame rate of each video stream is 24 frames per second, the frames of the 2D/left-view video stream and the right-view video stream are alternately displayed every ⅟48 seconds.

As shown in FIG. 113, the left-view and right-view video streams are divided into a plurality of extents EX1A-C and EX2A-C respectively on the optical disc PDS. Each extent contains at least one group of pictures (GOP), GOPs being read together by the optical disc drive. Hereinafter, the extents belonging to the 2D/left-view video stream are referred to as "2D/left-view extents", and the extents belonging to the right-view video stream are referred to as "right-view extents". The 2D/left-view extents EX1A-C and the right-view extents EX2A-C are alternately arranged on a track TRC of the optical disc PDS. Each two contiguous extents EX1A+EX2A, EX1B+EX2B, and EX1C+EX2C have the same length of playback time. Such an arrangement of extents is referred to as an "interleaved arrangement". A group of extents recorded in an interleaved arrangement on a recording medium is used both in 3D video playback and 2D video image playback, as described below.

From among the extents recorded on the optical disc PDS, a 2D playback device PL2 causes an optical disc drive DD1 to read only the 2D/left-view extents EX1A-C sequentially from the start, skipping the reading of right-view extents EX2A-C. Furthermore, an image decoder VDC sequentially decodes the extents read by the optical disc drive DD2 into a video frame VFL. In this way, a display device DS2 only displays left views, and viewers can watch normal 2D video images.

A 3D playback device PL3 causes an optical disc drive DD3 to alternately read 2D/left-view extents and right-view extents from the optical disc PDS. When expressed as codes, the extents are read in the order EX1A, EX2A, EX1B, EX2B, EX1C, and EX2C. Furthermore, from among the read extents, those belonging to the 2D/left-view video stream are supplied to a left-video decoder VDL, whereas those belonging to the right-view video stream are supplied to a right-video decoder VDR. The video decoders VDL and VDR alternately decode each video stream into video frames VFL and VFR, respectively. As a result, left views and right views are alternately displayed on a display device DS3. In synchronization with the switching of the views by the display device DS3, shutter glasses SHG cause the left and right lenses to become opaque alternately. Therefore, a viewer wearing the shutter glasses SHG sees the views displayed by the display device DS3 as 3D video images.

When 3D video content is stored on any recording medium, not only on an optical disc, the above-described interleaved arrangement of extents is used. The recording medium can thus be used both for playback of 2D video images and 3D video images.

Prior Art Literature

Patent Literature

Patent Literature 1: Japanese Patent Publication No. 3935507

SUMMARY OF THE INVENTION

Problems to be Solved by the Invention

In addition to a video stream, video content generally includes one or more graphics streams representing graphics images such as subtitles or interactive screens. These graphics images are also rendered in 3D when video images are played back from 3D video image content. 2 plane mode and 1 plane+offset mode are methods for rendering graphics images in 3D. 3D video image content in 2 plane mode includes a pair of graphics streams respectively representing graphics images for the left view and the right view. A playback device in 2 plane mode generates a separate left-view and right-view graphics plane from the graphics streams. 3D video image content in 1 plane+offset mode includes offset information corresponding to a graphics stream that represents 2D graphics images. A playback device in 1 plane+offset mode first generates a single graphics plane from the graphics stream and then provides horizontal offset in the graphics plane in accordance with the offset information. A pair of left-view and right-view graphics planes is thus generated from the graphics stream. In either mode, left-view and right-view graphics are alternately displayed on the screen of the display device. As a result, the viewer perceives the graphics images as 3D video images.

In a conventional data structure for 3D video image content, the graphics stream and the offset information are included in separate files for content in 1 plane+offset mode. In this case, the playback device in 1 plane+offset mode generates a pair of left-view and right-view graphics images based on data obtained by processing these files separately. In order to improve the playback quality of these graphics images, it is necessary to maintain a closer correspondence between the graphics stream and offset information. The processing for these files is asynchronous. Graphics images and offset information, however, generally change in cycles of frames. Furthermore, one scene generally has a plurality of graphics images. Accordingly, it is hard to maintain an even closer correspondence between the graphics stream and the offset information in a data structure in which these are stored as separate files. As a result, it is difficult to improve the playback quality of 3D graphics images.

Additionally, a playback device in 1 plane+offset mode needs to have a sufficient capacity of an internal memory device to load the file containing the offset information. Since each graphics stream has a large amount of offset information, however, the size of the file rapidy expands when a 3D video image content has an increasing variety of graphics streams. This makes it difficult to reduce the capacity of the internal memory device.

When a playback device in 1 plane+offset mode provides a large offset to a graphics plane to generate a pair of graphics planes, a region in the right or left edge of one graphics plane may not be included in the right or left edge of the other graphics plane. Furthermore, the fields of vision in the actual left view and right view representing 3D video image content are generally misaligned, with a region in the periphery of one view not included in the periphery of the other view. These regions are only seen by one of the viewer's eyes, which may make the viewer feel uncomfortable. As a result, it is difficult to improve the quality of 3D video images.

Meanwhile, there is an increasing demand on the part of content providers for 3D video image content in which graphics images alone are rendered in 3D and superimposed on 2D video images. Conventional 3D video image technology, however, does not provide for such content. Accordingly, it is difficult for a playback device to play back 3D video images with sufficiently high quality from such content.

It is an object of the present invention to solve the above problems particularly by providing a recording medium that can cause a playback device to play back higher quality 3D graphics images in combination with the video images represented by a video stream.

Means for Solving the Problems

On a recording medium according to the first aspect of the present invention, a main-view video stream, a sub-view video stream, a graphics stream, and playlist information are recorded. The main-view video stream includes main-view pictures, which constitute main views of stereoscopic video images. The sub-view video stream includes sub-view pictures and metadata, the sub-view pictures constituting sub-views of stereoscopic video images. The graphics stream includes graphics data, which constitutes monoscopic graphics images. Each of the main-view pictures is rendered on a main-view video plane when played back, each of the sub-view pictures is rendered on a sub-view video plane when played back, and the graphics data is rendered on a graphics plane when played back. The metadata is provided in each group of pictures (GOP) constituting the sub-view video stream and includes a plurality of pieces of offset information and a plurality of offset identifiers corresponding to the pieces of offset information. The pieces of offset information are control information defining offset control for a plurality of pictures constituting a GOP. The offset control is a process to provide a left offset and a right offset for horizontal coordinates in the graphics plane to generate a pair of graphics planes, and then combine the pair of graphics planes respectively with the main-view video plane and the sub-view video plane. The playlist information includes at least one piece of playback section information. Each piece of playback section information includes (i) information indicating a start position and an end position in a playback section and (ii) a stream selection table corresponding to the playback section. The stream selection table is a correspondence table associating stream numbers with packet identifiers for stream data whose playback is permitted in the playback section. When associating a stream number with a packet identifier of the graphics stream, the stream selection table allocates one of the offset identifiers to the stream number.

On a recording medium according to the second aspect of the present invention, a main-view video stream and a sub-view video stream are recorded. The main-view video stream includes main-view pictures, which constitute main views of stereoscopic video images. The sub-view video stream includes sub-view pictures and metadata, the sub-view pictures constituting sub-views of stereoscopic video images. The metadata includes information for identifying a shared area in which viewing angles of video images overlap, the video images being respectively represented by a left-view picture and a right-view picture of stereoscopic video images constituted by the main-view pictures and the sub-view pictures.

On a recording medium according to the third aspect of the present invention, a main-view video stream, a sub-view video stream, and a graphics stream are recorded. The main-view video stream includes main-view pictures, which constitute main views of stereoscopic video images. The sub-view video stream includes sub-view pictures and metadata, the sub-view pictures constituting sub-views of stereoscopic video images. The graphics stream includes graphics data, which constitutes monoscopic graphics images. Each of the main-view pictures is rendered on a main-view video plane when played back, each of the sub-view pictures is rendered on a sub-view video plane when played back, and the graphics data is rendered on a graphics plane when played back. The metadata includes information defining an active area in the graphics plane. An "active area" refers to an area within the graphics plane that is actually displayed on the screen.

On a recording medium according to the third aspect of the present invention, a main-view video stream, a sub-view video stream, a main-view graphics stream, and a sub-view graphics stream are recorded. The main-view video stream includes main-view pictures, which constitute monoscopic video images. The main-view graphics stream includes graphics data constituting main views of stereoscopic graphics images. The sub-view graphics stream includes graphics data constituting sub-views of stereoscopic graphics images. The sub-view video stream includes pictures constituting the same monoscopic video images as the main-view pictures.

Advantageous Effect of the Invention

The recording medium according to the first aspect of the present invention can cause the playback device to read offset information from metadata in parallel with decoding of the sub-view video stream. Accordingly, the recording medium can cause the playback device to maintain an even closer correspondence between the graphics stream and the offset information. As a result, the recording medium can cause the playback device to play back 3D graphics images, along with video images represented by the video stream, at a higher quality.

The recording medium according to the second aspect of the present invention can cause the playback device to process each video plane in parallel with decoding of the sub-view video stream and to hide areas other than shared areas. As a result, the recording medium can cause the playback device to play back 3D graphics images, along with video images represented by the video stream, at a higher quality.

The recording medium according to the third aspect of the present invention can cause the playback device to process the graphics plane in parallel with decoding of the sub-view video stream and to appropriately display the active area of the graphics plane. As a result, the recording medium can cause the playback device to play back 3D graphics images, along with video images represented by the video stream, at a higher quality.

In the recording medium according to the fourth aspect of the present invention, monoscopic video images represented by the sub-view video stream are the same as monoscopic video images represented by the main-view video stream. Accordingly, if a 3D playback device plays the recording medium back normally, 3D graphics images are played back from the graphics stream concurrently with 2D video images played back from the video stream. Therefore, the recording medium can cause the playback device to play back 3D graphics images, along with video images represented by the video stream, at a higher quality.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 1 is a schematic diagram showing a home theater system that uses a recording medium according to embodiment 1 of the present invention;

FIG. 2 is a schematic diagram showing a data structure of a BD-ROM disc 101 shown in FIG. 1;

FIG. 3A is a list of elementary streams multiplexed in a main TS on the BD-ROM disc 101 shown in FIG. 2, FIG. 3B is a list of elementary streams multiplexed in a sub-TS on the BD-ROM disc 101, and FIG. 3C is a list of elementary streams multiplexed in a text subtitle stream on the BD-ROM disc 101;

FIG. 14 is a table showing syntax of the offset metadata 1310 shown in FIG. 13;

FIGS. 16A and 16B are graphs showing examples of offset sequences, and FIG. 16C is a schematic diagram showing 3D graphics images reproduced in accordance with the offset sequences shown in FIGS. 16A and 16B;

FIG. 17 is a schematic diagram showing a data structure of a text subtitle stream 1700;

FIG. 20A is a schematic diagram showing an arrangement of a main TS 2001 and a sub-TS 2002 recorded separately and consecutively on a BD-ROM disc, FIG. 20B is a schematic diagram showing an arrangement of dependent-view data blocks D[0], D[1], D[2], . . . and base-view data blocks B[0], B[1], B[2], . . . recorded alternately on the BD-ROM disc 101 according to embodiment 1 of the present invention, FIG. 20C is a schematic diagram showing an example of the extent ATC times for a dependent-view data block group D[n] and a base-view data block group B[n] recorded in an interleaved arrangement (n=0, 1, 2), and FIG. 20D is a schematic diagram showing another example of extent ATC times;

FIG. 23A is a schematic diagram showing a data structure of an entry map 2230 shown in FIG. 22, FIG. 23B is a schematic diagram showing source packets in a source packet group 2310 belonging to a file 2D 241 that are associated with each EP_ID 2305 by the entry map 2230, and FIG. 23C is a schematic diagram showing a data block group D[n], B[n] (n=0, 1, 2, 3, . . . ) on a BD-ROM disc 101 corresponding to the source packet group 2310;

FIGS. 29A and 29B are schematic diagrams showing a correspondence between two playback sections 2901 and 2902 to be connected when CC 2904 is "5" or "6";

FIG. 37 is a functional block diagram of a 2D playback device 3700;

FIG. 38 is a list of SPRMs;

FIG. 42 is a table showing a data structure of SPRM(27) and SPRM(28);

FIG. 54A is a schematic diagram showing a data structure of offset metadata 5400 that uses a completion function, FIG. 54B is a graph showing the types of elements in the completion function, and FIG. 54C is a graph showing offset values calculated by a 3D playback device from offset sequence IDs=0, 1, 2 shown in FIG. 54A;

FIGS. 55A, 55B, and 55C are schematic diagrams showing (i) character sequences 5501, 5502, and 5503 indicated by text data entries #1, #2, and #3 which are consecutive in a single text subtitle stream and (ii) cache data 5511, 5512, and 5513 stored in a bit map buffer when each text data entry is decoded;

FIG. 56A is a plan view schematically showing horizontal angles of view HAL and HAR for a pair of video cameras CML and CMR filming 3D video images, FIG. 56B is a schematic diagram showing a left view LV filmed by the left-video camera CML, FIG. 56C is a schematic diagram showing a right view RV filmed by a right-video camera CMR, and FIGS. 56D and 56E are schematic diagrams respectively showing a left view LV represented by a left-video plane and a right view RV represented by a right-video plane, the video planes having been processed by a parallax video generation unit 4510;

FIG. 57A is a plan view schematically showing vertical angles of view VAL and VAR for a pair of video cameras CML and CMR filming 3D video images, FIG. 57B is a schematic diagram showing a left view LV filmed by the left-video camera CML and a right view RV filmed by a right-video camera CMR, and FIG. 57C is a schematic diagram showing a left view LV represented by a left-video plane and a right view RV represented by a right-video plane, the video planes having been processed by the parallax video generation unit 4510 shown in FIG. 45;

FIG. 58A is a schematic diagram showing an example of graphics images represented by a graphics plane GPL, FIGS. 58B and 58C are schematic diagrams respectively showing a right and left offset provided to the graphics plane GPL, and FIGS. 58D and 58E are schematic diagrams showing graphics images represented by graphics planes GP1 and GP2 to which the right and left offset have been provided;

FIG. 61A is a list of elementary streams multiplexed in a first sub-TS on a BD-ROM disc 101, and FIG. 61B is a list of elementary streams multiplexed in a second sub-TS on a BD-ROM disc 101;

FIG. 65 is a schematic diagram showing pictures in a base-view video stream 6401 and a right-view video stream 6402 in order of presentation time;

FIG. 66 is a table showing syntax of a slice header and slice data when encoding a right-view picture group in a pseudo-2D playback section in accordance with MVC;

FIG. 67 is a schematic diagram showing (i) a pair of a file 2D 6610 and a file DEP 6620 that constitute both a 3D playback section and a pseudo-2D playback section and (ii) two types of 3D playlist files 6630 and 6640 that define each of the playback sections;

FIGS. 73A, 73B, and 73C are schematic diagrams showing differences in the presentation position of a graphics element in B-D presentation mode and B-B presentation mode, and FIGS. 73D, 73E, and 73F are schematic diagrams respectively showing processing to compensate for displacement of the graphics element in B-B presentation mode shown in FIGS. 73A, 73B, and 73C;

FIGS. 79A and 79B are schematic diagrams respectively showing a picture in a left view and a right view used to display one scene of 3D video images, and FIG. 79C is a schematic diagram showing depth information calculated from these pictures by a frame depth information generation unit 7505 shown in FIG. 76;

FIG. 97 is a schematic diagram showing an example of constructing a left-view LVW and a right-view RVW from the combination of a 2D video image MVW and a depth map DPH;

FIG. 99A is a graph showing changes in a data amount DA stored in a read buffer 3721, shown in FIG. 98, during operation in 2D playback mode, and FIG. 99B is a schematic diagram showing a correspondence between an extent block 8310 for playback and a playback path 8320 in 2D playback mode;

FIG. 100 is an example of a correspondence table between jump distances $S_{JUMP}$ and maximum jump times $T_{JUMP\_MAX}$ for a BD-ROM disc;

FIGS. 102A and 102B are graphs showing changes in data amounts DA1 and DA2 stored in read buffers 4121 and 4122 shown in FIG. 101 when 3D video images are played back seamlessly from a single extent block, and FIG. 102C is a schematic diagram showing correspondence between the extent block 8610 and a playback path 8620 in 3D playback mode;

FIGS. 104A and 104B are graphs showing changes in data amounts DA1 and DA2 stored in read buffers 4121 and 4122 when 3D video images are played back seamlessly from the two consecutive extent blocks 8701 and 8702 shown in FIG. 103B;

FIG. 110A is a schematic diagram showing a playback path when extent ATC times and playback times of the video stream differ between contiguous base-view data blocks and dependent-view data blocks, and FIG. 110B is a schematic diagram showing a playback path when the playback times of the video stream are equal for contiguous base-view and dependent-view data blocks;

DESCRIPTION OF THE PREFERRED EMBODIMENTS

Figure 4:
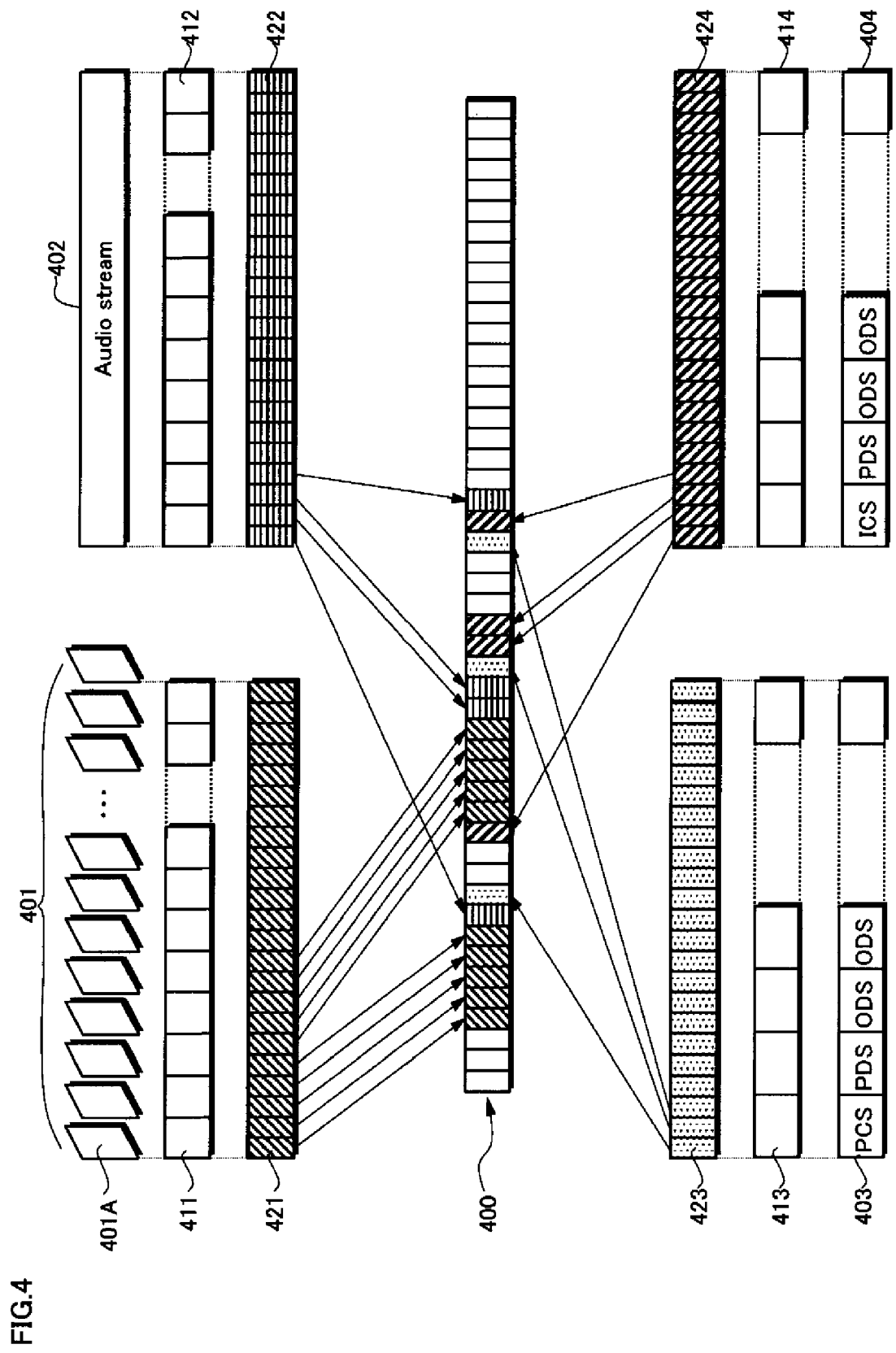
FIG. 4 is a schematic diagram showing an arrangement of TS packets in multiplexed stream data 400.

The following describes a recording medium and a playback device pertaining to preferred embodiments of the present invention with reference to the drawings.

<<Embodiment 1>>

FIG. 1 is a schematic diagram showing a home theater system that uses a recording medium according to embodiment 1 of the present invention. This home theater system adopts a 3D video image (stereoscopic video image) playback method that uses parallax video images, and in particular adopts an alternate-frame sequencing method as a display method (see <<Supplementary Explanation>> for details). As shown in FIG. 1, this home theater system plays back a recording medium 101 and includes a playback device 102, a display device 103, shutter glasses 104, and a remote control 105.

The recording medium 101 is a read-only Blu-ray disc (BD)™, i.e. a BD-ROM disc. The recording medium 101 can be a different portable recording medium, such as an optical disc with a different format such as DVD or the like, a removable hard disk drive (HDD), or a semiconductor memory device such as an SD memory card. This recording medium, i.e. the BD-ROM disc 101, stores movie content as 3D video images. This content includes video streams representing a left view and a right view for the 3D video images. The content may further include a video stream representing a depth map for the 3D video images. These video streams are arranged on the BD-ROM disc 101 in units of data blocks and are accessed using a file structure described below. The video streams representing the left view or the right view are used by both a 2D playback device and a 3D playback device to play the content back as 2D video images. Conversely, a pair of video streams representing a left view and a right view, or a pair of video streams representing either a left view or a right view and a depth map, are used by a 3D playback device to play the content back as 3D video images.

A BD-ROM drive 121 is mounted on the playback device 102. The BD-ROM drive 121 is an optical disc drive conforming to the BD-ROM format. The playback device 102 uses the BD-ROM drive 121 to read content from the BD-ROM disc 101. The playback device 102 further decodes the content into video data/audio data. The playback device 102 is a 3D playback device and can play the content back as both 2D video images and as 3D video images. Hereinafter, the operational modes of the playback device 102 when playing back 2D video images and 3D video images are respectively referred to as "2D playback mode" and "3D playback mode". In 2D playback mode, video data only includes either a left-view or a right-view video frame. In 3D playback mode, video data includes both left-view and right-view video frames.

3D playback mode is further divided into left/right (L/R) mode and depth mode. In "L/R mode", a pair of left-view and right-view video frames is generated from a combination of video streams representing the left view and right view. In "depth mode", a pair of left-view and right-view video frames is generated from a combination of video streams representing either a left view or a right view and a depth map. The playback device 102 is provided with an L/R mode. The playback device 102 may be further provided with a depth mode.

The playback device 102 is connected to the display device 103 via a High-Definition Multimedia Interface (HDMI) cable 122. The playback device 102 converts the video data/audio data into a video signal/audio signal in the HDMI format and transmits the signals to the display device 103 via the HDMI cable 122. In 2D playback mode, only one of either the left-view or the right-view video frame is multiplexed in the video signal. In 3D playback mode, both the left-view and the right-view video frames are time-multiplexed in the video signal. Additionally, the playback device 102 exchanges CEC messages with the display device 103 via the HDMI cable 122. The playback device 102 can thus ask the display device 103 whether it supports playback of 3D video images.

The display device 103 is a liquid crystal display. Alternatively, the display device 103 can be another type of flat panel display, such as a plasma display, an organic EL display, etc., or a projector. The display device 103 displays video on the screen 131 in response to a video signal, and causes the speakers to produce audio in response to an audio signal. The display device 103 supports playback of 3D video images. During playback of 2D video images, either the left view or the right view is displayed on the screen 131. During playback of 3D video images, the left view and right view are alternately displayed on the screen 131.

The display device 103 includes a left/right signal transmitting unit 132. The left/right signal transmitting unit 132 transmits a left/right signal LR to the shutter glasses 104 via infrared rays or by radio transmission. The left/right signal LR indicates whether the image currently displayed on the screen 131 is a left-view or a right-view image. During playback of 3D video images, the display device 103 detects switching of frames by distinguishing between a left-view frame and a right-view frame based on a control signal that accompanies a video signal. Furthermore, the display device 103 causes the left/right signal transmitting unit 132 to switch the left/right signal LR synchronously with the detected switching of frames.

The shutter glasses 104 include two liquid crystal display panels 141L and 141R and a left/right signal receiving unit 142. The liquid crystal display panels 141L and 141R respectively constitute the left and right lens parts. The left/right signal receiving unit 142 receives a left/right signal LR, and in accordance with changes therein, transmits the signal to the left and right liquid crystal display panels 141L and 141R. In response to the signal, each of the liquid crystal display panels 141L and 141R either lets light pass through the entire panel or shuts light out. For example, when the left/right signal LR indicates a left-view display, the liquid crystal display panel 141L for the left eye lets light pass through, while the liquid crystal display panel 141R for the right eye shuts light out. When the left/right signal LR indicates a right-view display, the display panels act oppositely. The two liquid crystal display panels 141L and 141R thus alternately let light pass through in sync with the switching of frames. As a result, when the viewer looks at the screen 131 while wearing the shutter glasses 104, the left view is shown only to the viewer's left eye, and the right view is shown only to the right eye. The viewer is made to perceive the difference between the images seen by each eye as the binocular parallax for the same stereoscopic image, and thus the video image appears to be stereoscopic.

The remote control 105 includes an operation unit and a transmitting unit. The operation unit includes a plurality of buttons. The buttons correspond to each of the functions of the playback device 102 and the display device 103, such as turning the power on or off, starting or stopping playback of the BD-ROM disc 101, etc. The operation unit detects when the user presses a button and conveys identification information for the button to the transmitting unit as a signal. The transmitting unit converts this signal into a signal IR and outputs it via infrared rays or radio transmission to the playback device 102 or the display device 103. On the other hand, the playback device 102 and display device 103 each receive this signal IR, determine the button indicated by this signal IR, and execute the function associated with the button. In this way, the user can remotely control the playback device 102 or the display device 103.

<Data Structure of the BD-ROM Disc>

FIG. 2 is a schematic diagram showing a data structure of a BD-ROM disc 101. As shown in FIG. 2, a Burst Cutting Area (BCA) 201 is provided at the innermost part of the data recording area on the BD-ROM disc 101. Only the BD-ROM drive 121 is permitted to access the BCA, and access by application programs is prohibited. The BCA 201 can thus be used as technology for copyright protection. In the data recording area outside of the BCA 201, tracks spiral from the inner to the outer circumference. In FIG. 2, a track 202 is schematically extended in a transverse direction. The left side represents the inner circumferential part of the disc 101, and the right side represents the outer circumferential part. As shown in FIG. 2, track 202 contains a lead-in area 202A, a volume area 202B, and a lead-out area 202C in order from the inner circumference. The lead-in area 202A is provided immediately on the outside edge of the BCA 201. The lead-in area 202A includes information necessary for the BD-ROM drive 121 to access the volume area 202B, such as the size, the physical address, etc. of the data recorded in the volume area 202B. The lead-out area 202C is provided on the outermost circumferential part of the data recording area and indicates the end of the volume area 202B. The volume area 202B includes application data such as video images, audio, etc. The volume area 202B is divided into small areas 202D called "sectors".

The sectors have a common size, for example 2048 bytes. Each sector 202D is consecutively assigned a serial number in order from the top of the volume area 202B. These serial numbers are called logical block numbers (LBN) and are used in logical addresses on the BD-ROM disc 101. During reading of data from the BD-ROM disc 101, data to be read is specified through designation of the LBN for the destination sector. The volume area 202B can thus be accessed in units of sectors. Furthermore, on the BD-ROM disc 101, logical addresses are substantially the same as physical addresses. In particular, in an area where the LBNs are consecutive, the physical addresses are also substantially consecutive. Accordingly, the BD-ROM drive 121 can consecutively read data from sectors having consecutive LBNs without making the optical pickup perform a seek.

The data recorded in the volume area 202B is managed under a predetermined file system. Universal Disc Format (UDF) is adopted as this file system. Alternatively, the file system may be ISO9660. The data recorded on the volume area 202B is represented in a directory/file format in accordance with the file system (see the <<Supplementary Explanation>> for details). In other words, the data is accessible in units of directories or files.

<<Directory/File Structure on the BD-ROM Disc>>

FIG. 2 further shows the directory/file structure of the data stored in the volume area 202B on a BD-ROM disc 101. As shown in FIG. 2, in this directory/file structure, a BD movie (BDMV) directory 210 is located directly below a ROOT directory 203. Below the BDMV directory 210 are an index file (index.bdmv) 211 and a movie object file (MovieObject.bdmv) 212.

The index file 211 contains information for managing as a whole the content recorded on the BD-ROM disc 101. In particular, this information includes both information to make the playback device 102 recognize the content, as well as an index table. The index table is a correspondence table between a title constituting the content and a program to control the operation of the playback device 102. This program is called an "object". Object types are a movie object and a BD-J (BD Java™) object.

The movie object file 212 generally stores a plurality of movie objects. Each movie object includes a sequence of navigation commands. A navigation command is a control command causing the playback device 102 to execute playback processes similar to general DVD players. Types of navigation commands are, for example, a read-out command to read out a playlist file corresponding to a title, a playback command to play back stream data from an AV stream file indicated by a playlist file, and a transition command to make a transition to another title. Navigation commands are written in an interpreted language and are deciphered by an interpreter, i.e. a job control program, included in the playback device 102, thus making the control unit execute the desired job. A navigation command is composed of an opcode and an operand. The opcode describes the type of operation that the playback device 102 is to execute, such as dividing, playing back, or calculating a title, etc. The operand indicates identification information targeted by the operation such as the title's number, etc. The control unit of the playback device 102 calls a movie object in response, for example, to a user operation and executes navigation commands included in the called movie object in the order of the sequence. In a manner similar to general DVD players, the playback device 102 first displays a menu on the display device 103 to allow the user to select a command. The playback device 102 then executes playback start/stop of a title, switches to another title, etc. in response to the selected command, thereby dynamically changing the progress of video playback.

As shown in FIG. 2, the BDMV directory 210 further contains a playlist (PLAYLIST) directory 220, a clip information (CLIPINF) directory 230, a stream (STREAM) directory 240, a BD-J object (BDJO: BD Java Object) directory 250, a Java archive (JAR: Java Archive) directory 260, and an auxiliary data (AUXDATA) directory 270.

Three types of AV stream files, (01000.m2ts) 241, (02000.m2ts) 242, and (03000.m2ts) 243, as well as a stereoscopic interleaved file (SSIF) directory 244 are located directly under the STREAM directory 240. Two types of AV stream files, (01000.ssif) 244A and (02000.ssif) 244B are located directly under the SSIF directory 244.

An "AV stream file" refers to a file, from among an actual video content recorded on a BD-ROM disc 101, that complies with the file format determined by the file system. Such an actual video content generally refers to stream data in which different types of stream data representing video, audio, subtitles, etc., i.e. elementary streams, have been multiplexed. This multiplexed stream data can be broadly divided into three types: a main transport stream (TS), a sub-TS, and a text subtitle stream.

A "main TS" is multiplexed stream data that includes a base-view video stream as a primary video stream. A "base-view video stream" is a video stream that can be played back independently and that represents 2D video images. These 2D video images are referred to as the "base view" or the "main view".

A "sub-TS" is multiplexed stream data that includes a dependent-view video stream as a primary video stream. A "dependent-view video stream" is a video stream that requires a base-view video stream for playback and represents 3D video images by being combined with the base-view video stream. The types of dependent-view video streams are a right-view video stream, left-view video stream, and depth map stream. When the base view is the left view of 3D video images, a "right-view video stream" is a video stream representing the right view of the 3D video images. The reverse is true for a "left-view video stream". When the base view is a projection of 3D video images on a virtual 2D screen, a "depth map stream" is stream data representing a depth map for the 3D video images. In particular, when the base view is the left view of 3D video images, the depth map stream that is used is referred to as a "left-view depth map stream", and when the base view is the right view, the depth map stream that is used is referred to as a "right-view depth map stream". The 2D video images or depth map represented by the dependent-view video stream are referred to as a "dependent view" or "sub-view".

A "text subtitle stream" (textST(SubTitle)stream) is stream data containing a text character string representing subtitles of a movie that are recorded in a particular language. A "text character string" is a data sequence representing each character included in subtitles with a specific character code. Unlike other TSs, a text subtitle stream only includes one elementary stream.

Depending on the type of multiplexed stream data stored therein, AV stream files are divided into four types: file 2D, file dependent (hereinafter, abbreviated as "file DEP"), text subtitle file, and interleaved file (hereinafter, abbreviated as "file SS"). A "file 2D" is an AV stream file for playback of 2D video images in 2D playback mode and includes a main TS. A "file DEP" is an AV stream file that includes a sub-TS. A "text subtitle file" is an AV stream file that includes a text subtitle stream. A "file SS" is an AV stream file that includes a main TS and a sub-TS representing the same 3D video images. In particular, a file SS shares its main TS with a certain file 2D and shares its sub-TS with a certain file DEP. In other words, in the file system on the BD-ROM disc 101, a main TS can be accessed by both a file SS and a file 2D, and a sub TS can be accessed by both a file SS and a file DEP. This setup, whereby a sequence of data recorded on the BD-ROM disc 101 is common to different files and can be accessed by all of the files, is referred to as "file cross-link".

In the example shown in FIG. 2, the first AV stream file (01000.m2ts) 241 is a file 2D, the second AV stream file (02000.m2ts) 242 is a file DEP, and the third AV stream file (03000.m2ts) 243 is a text subtitle file. In this way, files 2D, files DEP, and text subtitle files are located directly below the STREAM directory 240. The first AV stream file, i.e. the base-view video stream that includes the file 2D 241, represents a left view of 3D video images. The second AV stream file, i.e. the dependent-view video stream that includes the file DEP 242, includes both a right-view video stream and a depth map stream.

In the example shown in FIG. 2, the fourth AV stream file (01000.ssif) 244A and the fifth AV stream file (02000.ssif) 244B are both a file SS. In this way, files SS are located directly below the SSIF directory 244. The fourth AV stream file, i.e. the first file SS 244A, shares a main TS, and in particular a base-view video stream, with the file 2D 241 and shares a sub-TS, in particular a right-view video stream, with the file DEP 242. The fifth AV stream file, i.e. the second file SS 244B, shares a main TS, and in particular a base-view video stream, with the file 2D 241 and shares a sub-TS, in particular a depth map stream, with the file DEP 242.

Three types of clip information files, (01000.clpi) 231, (02000.clpi) 232, and (03000.clpi) 233 are located in the CLIPINF directory 230. A "clip information file" is a file associated on a one-to-one basis with a file 2D, file DEP, and text subtitle file and in particular contains an entry map for each file. An "entry map" is a correspondence table between the presentation time for each scene or subtitle represented by the file and the address within each file at which the scene or subtitle is recorded. Among the clip information files, a clip information file associated with a file 2D is referred to as a "2D clip information file", and a clip information file associated with a file DEP is referred to as a "dependent-view clip information file". In the example shown in FIG. 2, the first clip information file (01000.clpi) 231 is a 2D clip information file and is associated with the file 2D 241. The second clip information file (02000.clpi) 232 is a dependent-view clip information file and is associated with the file DEP 242. The third clip information file (03000.clpi) 233 is associated with the text subtitle file 243.

Three types of playlist files, (00001.mpls) 221, (00002.mpls) 222, and (00003.mpls) 223 are located in the PLAYLIST directory 220. A "playlist file" is a file that specifies the playback path of an AV stream file, i.e. the part of an AV stream file for playback, and the order of playback. The types of playlist files are a 2D playlist file and a 3D playlist file. A "2D playlist file" specifies the playback path of a file 2D. A "3D playlist file" specifies, for a playback device in 2D playback mode, the playback path of a file 2D, and for a playback device in 3D playback mode, the playback path of a file SS. As shown in the example in FIG. 2, the first playlist file (00001.mpls) 221 is a 2D playlist file and specifies the playback path of the file 2D 241. The second playlist file (00002.mpls) 222 is a 3D playlist file that specifies, for a playback device in 2D playback mode, the playback path of the file 2D 241, and for a 3D playback device in L/R mode, the playback path of the first file SS 244A. The third playlist file (00003.mpls) 223 is a 3D playlist file that specifies, for a playback device in 2D playback mode, the playback path of the file 2D 241, and for a 3D playback device in depth mode, the playback path of the second file SS 244B.

A BD-J object file (XXXXX.bdjo) 251 is located in the BDJO directory 250. The BD-J object file 251 includes a single BD-J object. The BD-J object is a bytecode program to cause a Java virtual machine mounted on the playback device 102 to play back a title and render graphics images. The BD-J object is written in a compiler language such as Java or the like. The BD-J object includes an application management table and identification information for the playlist file to which is referred. The "application management table" is a list of the Java application programs to be executed by the Java virtual machine and their period of execution, i.e. lifecycle. The "identification information of the playlist file to which is referred" identifies a playlist file that corresponds to a title to be played back. The Java virtual machine calls a BD-J object in response to a user operation or an application program and executes the Java application program according to the application management table included in the BD-J object. Consequently, the playback device 102 dynamically changes the progress of the video for each title played back, or causes the display device 103 to display graphics images independently of the title video.

A JAR file (YYYYY.jar) 261 is located in the JAR directory 260. The JAR directory 261 generally includes a plurality of actual Java application programs to be executed in accordance with the application management table shown in the BD-J object. A "Java application program" is a bytecode program written in a compiler language such as Java or the like, as is the BD-J object. Types of Java application programs include programs causing the Java virtual machine to perform playback of a title and programs causing the Java virtual machine to render graphics images. The JAR file 261 is a Java archive file, and when it is read by the playback device 102, it is loaded in internal memory. In this way, a Java application program is stored in memory.

A font set (11111.oft) 271 is located in the AUXDATA directory 270. The font set 271 includes font information related to the text subtitle stream. For each character code, the font information includes raster data representing a character style. Character codes are allocated, for example, to numbers, letters of the alphabet, and to the Japanese syllabary. The font set is structured separately by character style and language and includes, for example, OpenType fonts.

<<Structure of Multiplexed Stream Data>>

FIG. 3A is a list of elementary streams multiplexed in a main TS on a BD-ROM disc 101. The main TS is a digital stream in MPEG-2 Transport Stream (TS) format and includes the file 2D 241 shown in FIG. 2. As shown in FIG. 3A, the main TS includes a primary video stream 301, primary audio streams 302A and 302B, and presentation graphics (PG) streams 303A and 303B. The main TS may additionally include an interactive graphics (IG) stream 304, a secondary audio stream 305, and a secondary video stream 306.

The primary video stream 301 represents the primary video of a movie, and the secondary video stream 306 represents secondary video of the movie. The primary video is the main video pertaining to the content, such as the main feature of a movie, and is displayed on the entire screen, for example. On the other hand, the secondary video is displayed on the screen simultaneously with the primary video with the use, for example, of a picture-in-picture method, so that the secondary video images are displayed in a smaller window within the primary video images.

The primary video stream 301 and the secondary video stream 306 are both a base-view video stream. Each of the video streams 301 and 306 is encoded by a video compression encoding method, such as MPEG-2, MPEG-4 AVC, or SMPTE VC-1.

The primary audio streams 302A and 302B represent the primary audio of the movie. In this case, the two primary audio streams 302A and 302B are in different languages. The secondary audio stream 305 represents secondary audio to be mixed with the primary audio, such as sound effects accompanying operation of an interactive screen. Each of the audio streams 302A, 302B, and 305 is encoded by a method such as AC-3, Dolby Digital Plus ("Dolby Digital" is a registered trademark), Meridian Lossless Packing™ (MLP), Digital Theater System™ (DTS), DTS-HD, or linear Pulse Code Modulation (PCM).

Each of the PG streams 303A and 303B represents graphics images, such as subtitles formed by graphics, to be displayed superimposed on the video images represented by the primary video stream 301. The two PG streams 303A and 303B represent, for example, subtitles in a different language. The IG stream 304 represents Graphical User Interface (GUI) graphics elements, and the arrangement thereof, for constructing an interactive screen on the screen 131 in the display device 103.

The elementary streams 301-306 are identified by packet identifiers (PIDs). PIDs are assigned, for example, as follows. Since one main TS includes only one primary video stream, the primary video stream 301 is assigned a hexadecimal value of 0x1011. When up to 32 other elementary streams can be multiplexed by type in one main TS, the primary audio streams 302A and 302B are each assigned any value from 0x1100 to 0x111F. The PG streams 303A and 303B are each assigned any value from 0x1200 to 0x121F. The IG stream 304 is assigned any value from 0x1400 to 0x141F. The secondary audio stream 305 is assigned any value from 0x1A00 to 0x1A1F. The secondary video stream 306 is assigned any value from 0x1B00 to 0x1B1F.

FIG. 3B is a list of elementary streams multiplexed in a sub-TS on a BD-ROM disc 101. The sub-TS is multiplexed stream data in MPEG-2 TS format and is included in the file DEP 242 shown in FIG. 2. As shown in FIG. 3B, the sub-TS includes two primary video streams 311R and 311D. 311R is a right-view video stream, whereas 311D is a depth map stream. When the primary video stream 301 in the main TS represents the left view of 3D video images, the right-view video stream 311R represents the right view of the 3D video images. The depth map stream 311D represents 3D video images in combination with the primary video stream 301 in the main TS. Additionally, the sub TS may include secondary video streams 312R and 312D. 312R is a right-view video stream, whereas 312D is a depth map stream. When the secondary video stream 306 in the main TS represents the left view of 3D video images, the right-view video stream 312R represents the right view of the 3D video images. The depth map stream 312D represents 3D video images in combination with the secondary video stream 306 in the main TS.

PIDs are assigned to the elementary streams 311R, ..., 312D as follows, for example. The primary video streams 311R and 311D are respectively assigned values of 0x1012 and 0x1013. When up to 32 other elementary streams can be multiplexed by type in one sub-TS, the secondary video streams 312R and 312D are assigned any value from 0x1B20 to 0x1B3F.

FIG. 3C is a list of elementary streams multiplexed in a text subtitle stream on a BD-ROM disc 101. The text subtitle stream is stream data in MPEG-2 TS format. As shown in FIG. 3C, the text subtitle stream includes only one elementary stream 321. A PID with a constant value of 0x1800 is assigned to the elementary stream 321.

FIG. 4 is a schematic diagram showing the arrangement of TS packets in the multiplexed stream data 400. The main TS and sub TS share this packet structure. Note that the packet structure of the text subtitle stream is described further below. In the multiplexed stream data 400, the elementary streams 401, 402, 403, and 404 are respectively converted into sequences of TS packets 421, 422, 423, and 424. For example, in the video stream 401, each frame 401A or each field is first converted into one Packetized Elementary Stream (PES) packet 411. Next, each PES packet 411 is generally converted into a plurality of TS packets 421. Similarly, the audio stream 402, PG stream 403, and IG stream 404 are respectively first converted into a sequence of PES packets 412, 413, and 414, after which they are converted into a sequence of TS packets 422, 423, and 424. Finally, the TS packets 421, 422, 423, and 424 obtained from the elementary streams 401, 402, 403, and 404 are time-multiplexed into one piece of stream data, i.e. the main TS 400.

Figure 5:
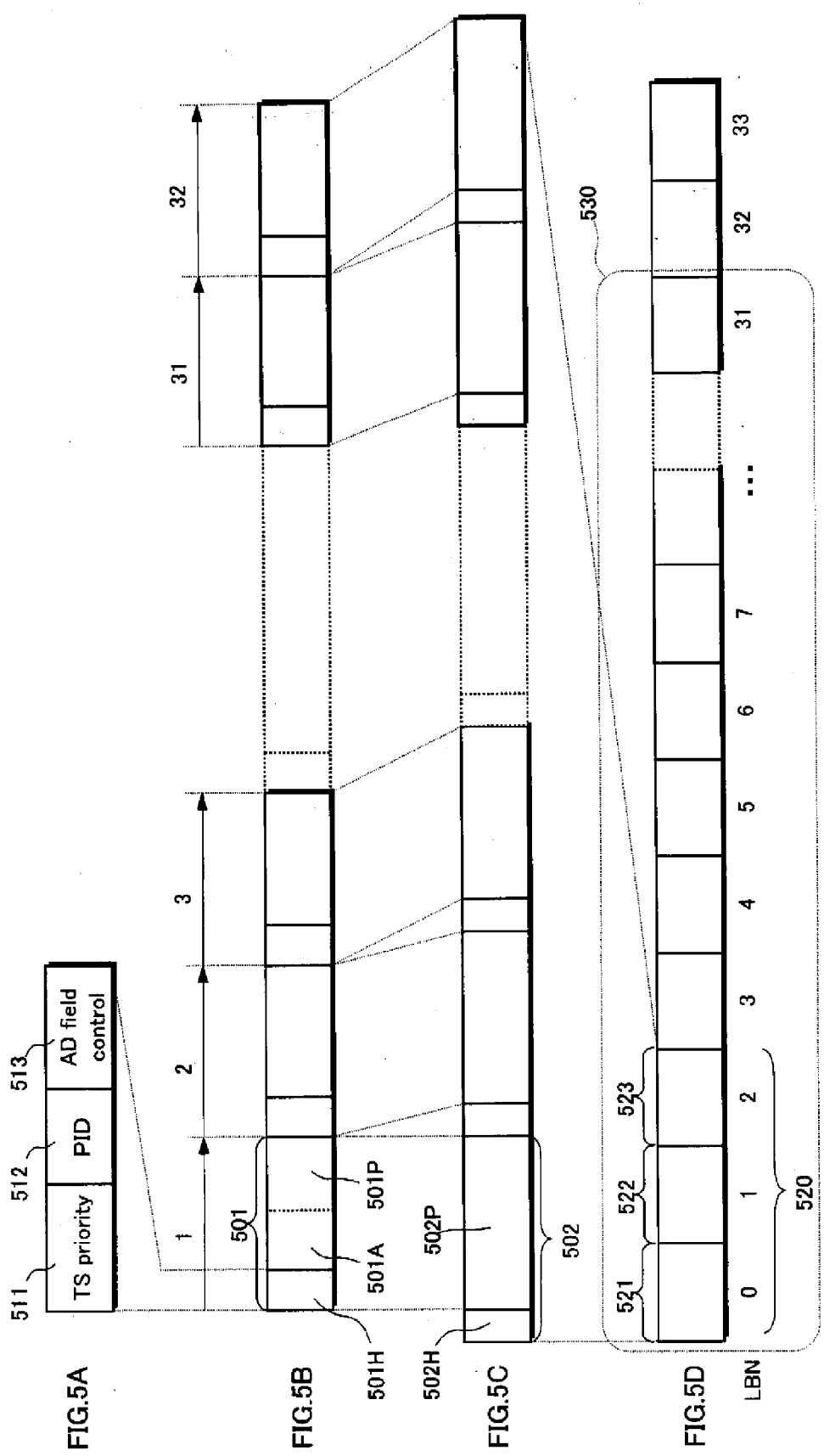
FIG. 5A is a schematic diagram showing a data structure of a TS header 501H.
FIG. 5B is a schematic diagram showing a format of a TS packet sequence comprising multiplexed stream data.
FIG. 5C is a schematic diagram of a format of a source packet sequence composed of a TS packet sequence in multiplexed stream data.
FIG. 5D is a schematic diagram showing a sector group, in which a sequence of source packets 502 are consecutively recorded, in a volume area 202B of the BD-ROM disc 101.

FIG. 5B is a schematic diagram showing a TS packet sequence constituting multiplexed stream data. Each TS packet 501 is 188 bytes long. As shown in FIG. 5B, each TS packet 501 includes a TS header 501H and either, or both, a TS payload 501P and an adaptation field (hereinafter abbreviated as "AD field") 501A. The TS payload 501P and AD field 501A together constitute a 184 byte long data area. The TS payload 501P is used as a storage area for a PES packet. The PES packets 411-414 shown in FIG. 4 are typically divided into a plurality of parts, and each part is stored in a different TS payload 501P. The AD field 501A is an area for storing stuffing bytes (i.e. dummy data) when the amount of data in the TS payload 501P does not reach 184 bytes. Additionally, when the TS packet 501 is, for example, a PCR as described below, the AD field 501A is used to store such information. The TS header 501H is a four-byte long data area.

FIG. 5A is a schematic diagram showing the data structure of a TS header 501H. As shown in FIG. 5A, the TS header 501H includes TS priority (transport_priority) 511, PID 512, and AD field control (adaptation_field$_{13}$ control) 513. The PID 512 indicates the PID for the elementary stream whose data is stored in the TS payload 501P of the TS packet 501 containing the PID 512. The TS priority 511 indicates the degree of priority of the TS packet 501 among the TS packets that share the value indicated by the PID 512. The AD field control 513 indicates whether the TS packet 501 contains an AD field 501A and/or a TS payload 501P. For example, if the AD field control 513 indicates "1", then the TS packet 501 does not include an AD field 501A but includes a TS payload 501P. If the AD field control 513 indicates "2", then the reverse is true. If the AD field control 513 indicates "3", then the TS packet 501 includes both an AD field 501A and a TS payload 501P.

FIG. 5C is a schematic diagram showing the formation of a source packet sequence composed of the TS packet sequence for multiplexed stream data. As shown in FIG. 5C, each source packet 502 is 192 bytes long and includes one TS packet 501, shown in FIG. 5B, and a four-byte long header (TP_Extra_Header) 502H. When the TS packet 501 is recorded on the BD-ROM disc 101, a source packet 502 is constituted by attaching a header 502H to the TS packet 501. The header 502H includes an ATS (Arrival_Time_Stamp). The "ATS" is time information used by the playback device 102 as follows. When a source packet 502 is sent from the BD-ROM disc 101 to a system target decoder in the playback device 102, the TS packet 502P is extracted from the source packet 502 and transferred to a PID filter in the system target decoder. The ATS in the header 502H indicates the time at which this transfer is to begin. The "system target decoder" is a device that decodes multiplexed stream data one elementary stream at a time. Details regarding the system target decoder and its use of the ATS are provided below.

Figure 32:
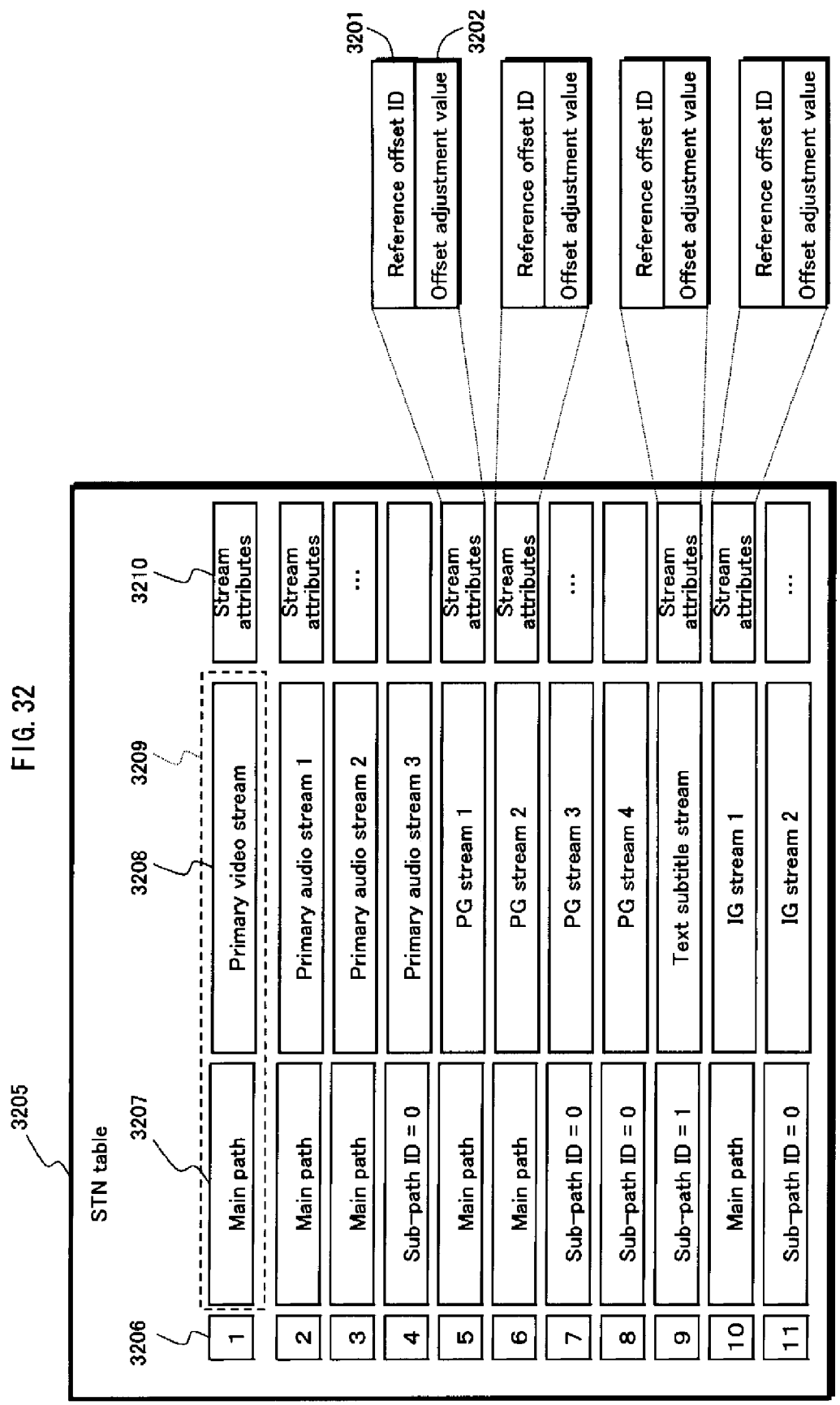
FIG. 32 is a schematic diagram showing an STN table 3205 included in a main path 3101 of the 3D playlist file shown in FIG. 31.

FIG. 5D is a schematic diagram of a sector group, in which a sequence of source packets 502 are consecutively recorded, in the volume area 202B of the BD-ROM disc 101. As shown in FIG. 5D, 32 source packets 502 are recorded at a time as a sequence in three consecutive sectors 521, 522, and 523. This is because the data amount for 32 source packets, i.e. 192 bytes×32=6144 bytes, is the same as the total size of three sectors, i.e. 2048 bytes×3=6144 bytes. 32 source packets 502 that are recorded in this way in three consecutive sectors 521, 522, and 523 are referred to as an "aligned unit" 520. The playback device 102 reads source packets 502 from the BD-ROM disc 101 by each aligned unit 520, i.e. 32 source packets at a time. Also, the sector group 521, 522, 523, ... is divided into 32 pieces in order from the top, and each forms one error correction code block 530. The BD-ROM drive 121 performs error correction processing for each ECC block 530.

<<Data Structure of Video Stream>>

Each of the pictures included in the video stream represents one frame or one field and is compressed by a video compression encoding method, such as MPEG-2, MPEG-4 AVC, etc. This compression uses the picture's spatial or temporal redundancy. Here, picture encoding that only uses the picture's spatial redundancy is referred to as "intra-picture encoding". On the other hand, picture encoding that uses temporal redundancy, i.e. the similarity between data for a plurality of pictures displayed sequentially, is referred to as "inter-picture predictive encoding". In inter-picture predictive encoding, first, a picture earlier or later in presentation time is assigned to the picture to be encoded as a reference picture. Next, a motion vector is detected between the picture to be encoded and the reference picture, and then motion compensation is performed on the reference picture using the motion vector. Furthermore, the difference value between the picture obtained by motion compensation and the picture to be encoded is sought, and spatial redundancy is removed using the difference value. In this way, the amount of data for each picture is compressed.

Figure 6:
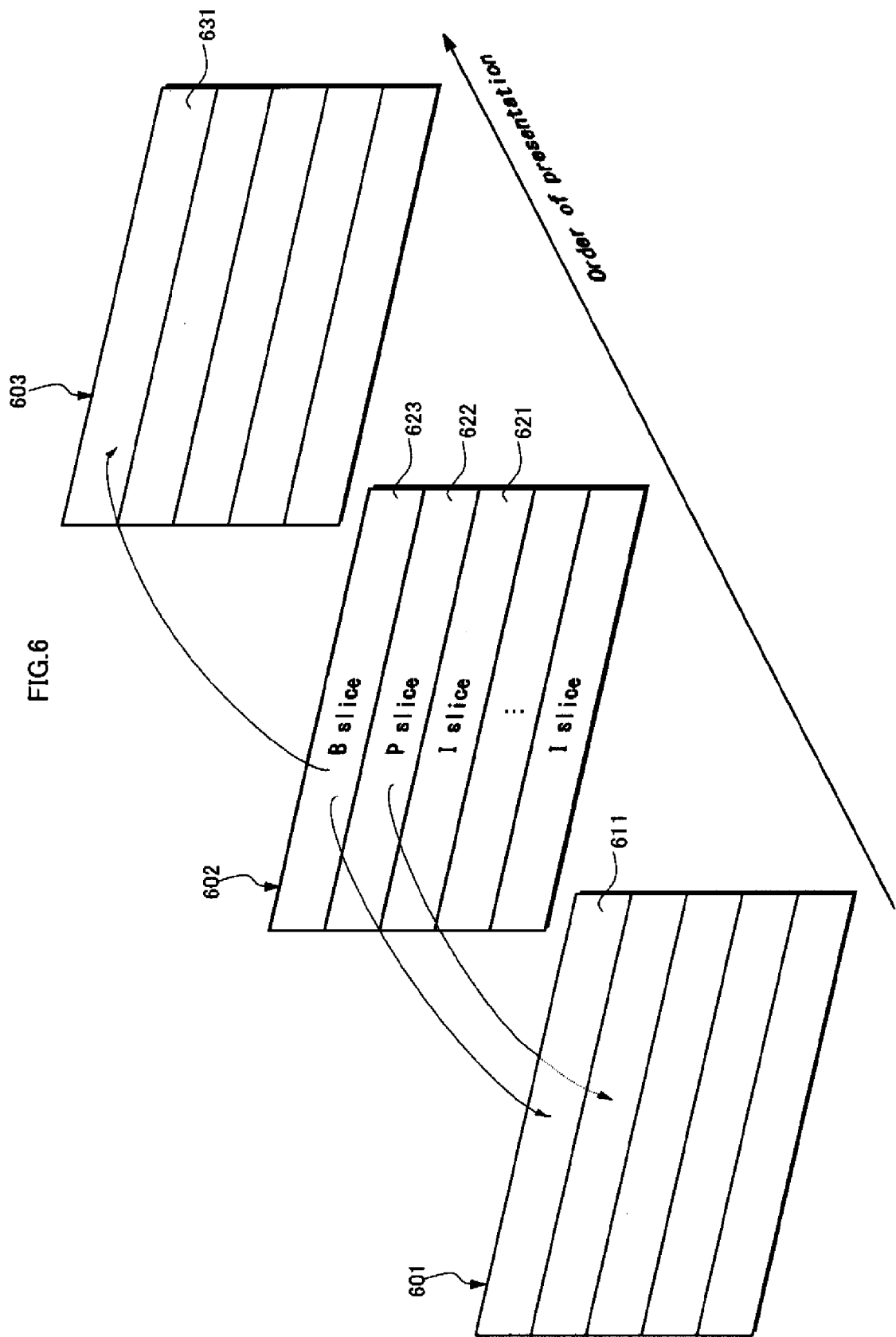
FIG. 6 is a schematic diagram showing, in order of presentation time, three pictures 601, 602, and 603 included in a video stream.

FIG. 6 is a schematic diagram showing, in order of presentation time, three pictures 601, 602, and 603 included in a video stream. As shown in FIG. 6, the pictures 601, 602, and 603 are typically divided into a plurality of slices 611, . . . , 621, 622, 623, . . . , 631, . . . A "slice" is a band-shaped region formed by a plurality of macroblocks that typically line up horizontally. A "macroblock" is a pixel matrix of a predetermined size, such as 16×16. While not shown in FIG. 6, one slice may be composed of two or more rows of macroblocks. In the above-mentioned encoding method, pictures are compressed one slice at a time. After compression, a slice is classified into one of three types: I slice, P slice, and B slice. An "I (Intra) slice" 621 refers to a slice compressed by intra-picture encoding. A "P (Predictive) slice" 622 refers to a slice compressed by inter-picture predictive encoding, having used as a reference picture one picture 601 that has an earlier presentation time. A "B (Bidirectionally Predictive) slice" 623 refers to a slice compressed by inter-picture predictive encoding, having used as reference pictures two pictures 601, 603 that have an earlier or later presentation time. In FIG. 6, the pictures to which a P slice 622 and a B slice 623 refer are indicated by arrows. In MPEG-4 AVC, as shown in FIG. 6, one picture 602 may include different types of slices. In MPEG-2, however, one picture only includes slices of the same type.

For the sake of convenience, in the following explanation it is assumed that one picture only includes slices of the same type, regardless of the encoding method. In this case, after compression a picture is classified into one of three types, in accordance with the type of the slice: I picture, P picture, and B picture. Furthermore, B pictures that are used as a reference picture for other pictures in inter-picture predictive encoding are particularly referred to as "Br (reference B) pictures".

Figure 7:
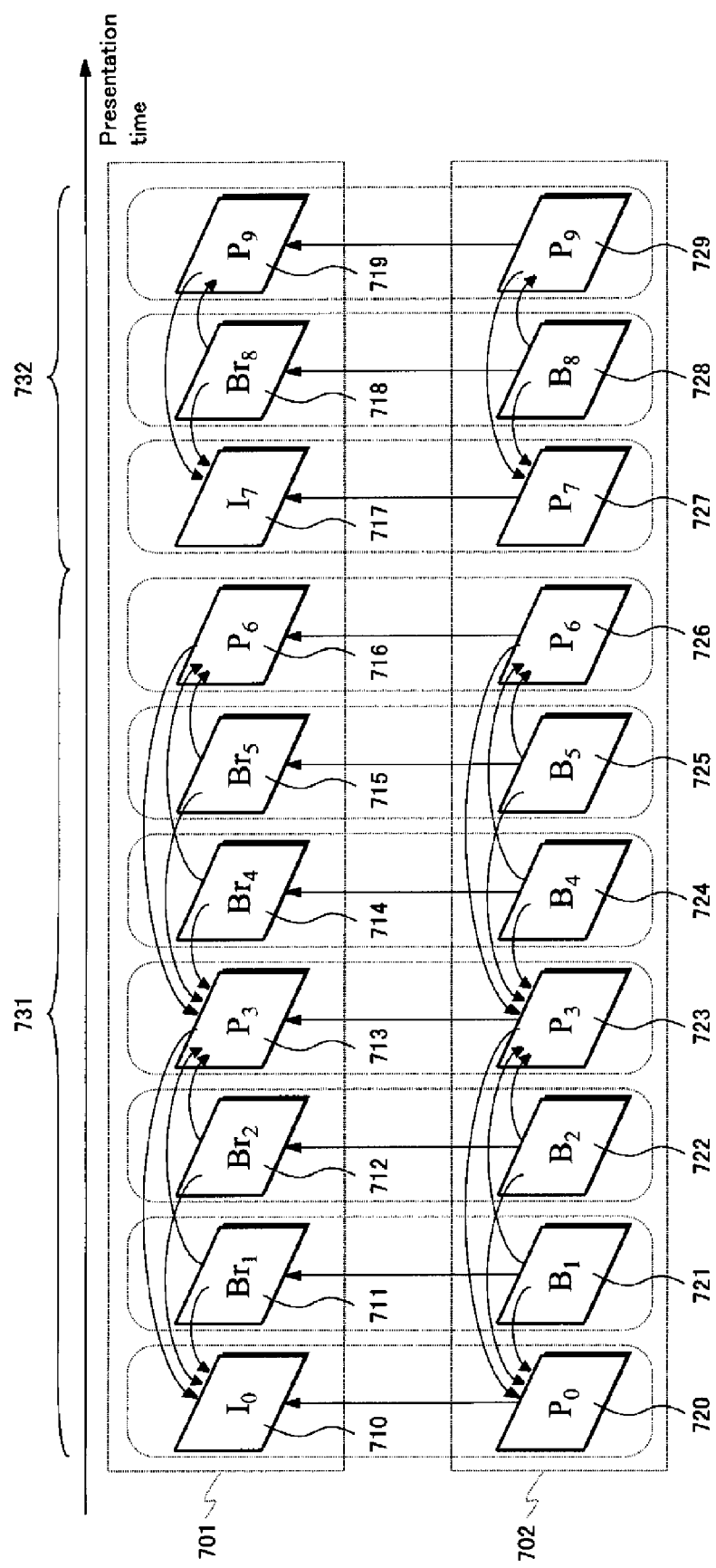
FIG. 7 is a schematic diagram showing pictures in a base-view video stream 701 and a right-view video stream 702 in order of presentation time.

FIG. 7 is a schematic diagram showing the pictures for a base-view video stream 701 and a right-view video stream 702 in order of presentation time. As shown in FIG. 7, the base-view video stream 701 includes pictures 710, 711, 712, . . . , 719 (hereinafter "base-view pictures"), and the right-view video stream 702 includes pictures 720, 721, 722, . . . , 729 (hereinafter "right-view pictures"). The base-view pictures 710-719 are typically divided into a plurality of GOPs 731 and 732. A "GOP" refers to a sequence of pictures having an I picture at the top of the sequence. In addition to an I picture, a GOP typically includes P pictures and B pictures.

In the example shown in FIG. 7, the base-view pictures in the GOPs 731 and 732 are compressed in the following order. In the first GOP 731, the top base-view picture is compressed as $I_0$ picture 710. The subscripted number indicates the serial number allotted to each picture in the order of presentation time. Next, the fourth base-view picture is compressed as $P_3$ picture 713 using $I_0$ picture 710 as a reference picture. The arrows shown in FIG. 7 indicate that the picture at the head of the arrow is a reference picture for the picture at the tail of the arrow. Next, the second and third base-view pictures are respectively compressed as $Br_1$ picture 711 and $Br_2$ picture 712, using both $I_0$ picture 710 and $P_3$ picture 713 as reference pictures.

Furthermore, the seventh base-view picture is compressed as $P_6$ picture 716 using $P_3$ picture 713 as a reference picture. Next, the fourth and fifth base-view pictures are respectively compressed as $Br_4$ picture 714 and $Br_5$ picture 715, using both $P_3$ picture 713 and $P_6$ picture 716 as reference pictures. Similarly, in the second GOP 732, the top base-view picture is first compressed as $I_7$ picture 717. Next, the third base-view picture is compressed as $P_9$ picture 719 using $I_7$ picture 717 as a reference picture. Subsequently, the second base-view picture is compressed as $Br_8$ picture 718 using both $I_7$ picture 717 and $P_9$ picture 719 as reference pictures.

In the base-view video stream 701, each GOP 731 and 732 always contains an I picture at the top, and thus base-view pictures can be decoded GOP by GOP. For example, in the first GOP 731, the $I_0$ picture 710 is first decoded independently. Next, the $P_3$ picture 713 is decoded using the decoded $I_0$ picture 710. Then the $Br_1$ picture 711 and $Br_2$ picture 712 are decoded using both the decoded $I_0$ picture 710 and $P_3$ picture 713. The subsequent picture group 714, 715, . . . is similarly decoded. In this way, the base-view video stream 701 can be decoded independently and furthermore can be randomly accessed in units of GOPs.

As further shown in FIG. 7, the right-view pictures 720-729 are compressed by inter-picture predictive encoding. However, the encoding method differs from the encoding method for the base-view pictures 710-719, since in addition to redundancy in the temporal redundancy of video images, redundancy between the left and right-video images is also used. Specifically, as shown by the arrows in FIG. 7, the reference picture for each of the right-view pictures 720-729 is not selected from the right-view video stream 702, but rather from the base-view video stream 701. In particular, the presentation time is substantially the same for each of the right-view pictures 720-729 and the corresponding base-view picture selected as a reference picture. These pictures represent a right view and a left view for the same scene of a 3D video image, i.e. a parallax video image. The right-view pictures 720-729 and the base-view pictures 710-719 are thus in one-to-one correspondence. In particular, the GOP structure is the same between these pictures.

In the example shown in FIG. 7, the top right-view picture in the first GOP 731 is compressed as $P_0$ picture 720 using $I_0$ picture 710 in the base-view video stream 701 as a reference picture. These pictures 710 and 720 represent the left view and right view of the top frame in the 3D video images. Next, the fourth right-view picture is compressed as $P_3$ picture 723 using $P_3$ picture 713 in the base-view video stream 701 and $P_0$ picture 720 as reference pictures. Next, the second right-view picture is compressed as $B_1$ picture 721, using $Br_1$ picture 711 in the base-view video stream 701 in addition to $P_0$ picture 720 and $P_3$ picture 723 as reference pictures. Similarly, the third right-view picture is compressed as $B_2$ picture 722, using $Br_2$ picture 712 in the base-view video stream 701 in addition to $P_0$ picture 720 and $P_3$ picture 730 as reference pictures. For each of the remaining right-view pictures 724-729, a base-view picture with a presentation time substantially the same as the right-view picture is similarly used as a reference picture.

The revised standards for MPEG-4 AVC/H.264, called Multiview Video Coding (MVC), are known as a video compression encoding method that makes use of correlation between left and right-video images as described above. MVC was created in July of 2008 by the Joint Video Team (JVT), a joint project between ISO/IEC MPEG and ITU-T VCEG, and is a standard for collectively encoding video that can be seen from a plurality of perspectives. With MVC, not only is temporal similarity in video images used for inter-video predictive encoding, but so is similarity between video images from differing perspectives. This type of predictive encoding has a higher video compression ratio than predictive encoding that individually compresses data of video images seen from each perspective.

As described above, a base-view picture is used as a reference picture for compression of each of the right-view pictures 720-729. Therefore, unlike the base-view video stream 701, the right-view video stream 702 cannot be decoded independently. On the other hand, however, the difference between parallax video images is generally very small; that is, the correlation between the left view and the right view is high. Accordingly, the right-view pictures generally have a significantly higher compression rate than the base-view pictures, meaning that the amount of data is significantly smaller.

The depth maps included in a depth map stream are in one-to-one correspondence with the base-view pictures 710-719 and each represent a depth map for the 2D video image in the corresponding base-view picture. The depth maps are compressed by a video compression encoding method, such as MPEG-2, MPEG-4 AVC, etc., in the same way as the base-view pictures 710-719. In particular, inter-picture predictive encoding is used in this encoding method. In other words, each depth map is compressed using another depth map as a reference picture. Furthermore, the depth map stream is divided into units of GOPs in the same way as the base-view video stream 701, and each GOP always contains an I picture at the top. Accordingly, depth maps can be decoded GOP by GOP. However, since a depth map itself is only information representing the depth of each part of a 2D video image pixel by pixel, the depth map stream cannot be used independently for playback of video images.

For example, as in the two primary video streams 311R and 311D shown in FIG. 3B, the right-view video stream and depth map stream that correspond to the same base-view video stream are compressed with the same encoding method. For example, if the right-view video stream is encoded in MVC format, the depth map stream is also encoded in MVC format. In this case, during playback of 3D video images, the playback device 102 can smoothly switch between L/R mode and depth mode, while maintaining a constant encoding method.

Figure 8:
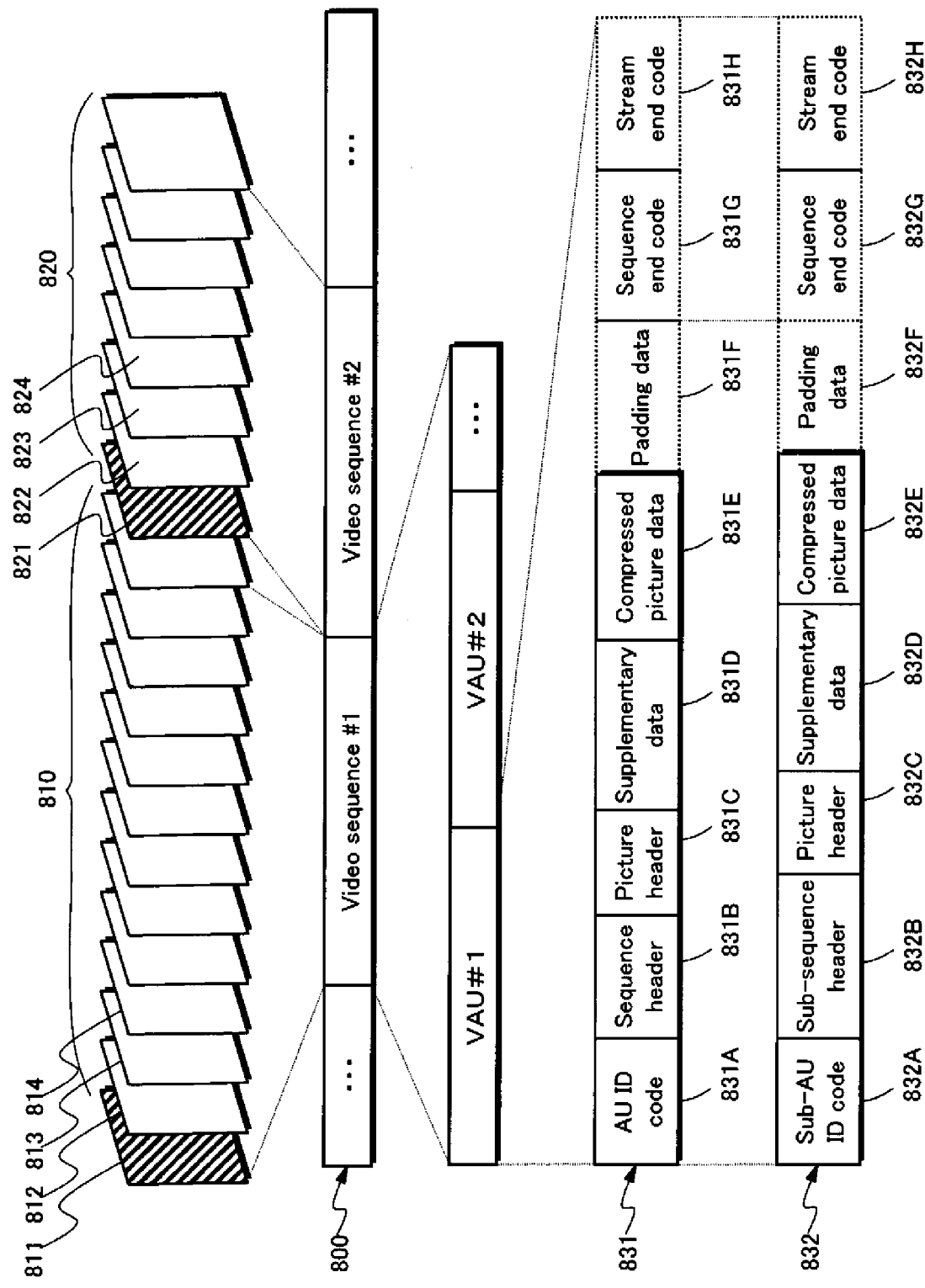
FIG. 8 is a schematic diagram showing details on a data structure of a video stream 800.

FIG. 8 is a schematic diagram showing details on a data structure of a video stream 800. This data structure is substantially the same for the base-view video stream and the dependent-view video stream. As shown in FIG. 8, the video stream 800 is generally composed of a plurality of video sequences #1, #2, . . . A "video sequence" is a combination of pictures 811, 812, 813, 814, . . . that constitute a single GOP 810 and to which additional information, such as a header, has been individually attached. The combination of this additional information and a picture is referred to as a "video access unit (VAU)". That is, in the GOPs 810 and 820, a single VAU #1, #2, . . . is formed for each picture. Each picture can be read from the video stream 800 in units of VAUs.

FIG. 8 further shows the structure of VAU #1 831 located at the top of each video sequence in the base-view video stream. The VAU #1 831 includes an access unit (AU) identification code 831A, sequence header 831B, picture header 831C, supplementary data 831D, and compressed picture data 831E. Except for not including a sequence header 831B, VAUs from the second VAU #2 on have the same structure as VAU #1 831. The AU identification code 831A is a predetermined code indicating the top of the VAU #1 831. The sequence header 831B, also called a GOP header, includes an identification number for the video sequence #1 which includes the VAU #1 831. The sequence header 831B further includes information shared by the whole GOP 810, e.g. resolution, frame rate, aspect ratio, and bit rate. The picture header 831C indicates its own identification number, and the identification number for the video sequence #1, and information necessary for decoding the picture, such as the type of encoding method. The supplementary data 831D includes additional information regarding matters other than the decoding of the picture, for example closed caption text information, information on the GOP structure, and time code information. In particular, the supplementary data 831D includes decoding switch information, described below. The compressed picture data 831E includes a base-view picture. Additionally, the VAU #1 831 may include any or all of padding data 831F, a sequence end code 831G, and a stream end code 831H as necessary. The padding data 831F is dummy data. By adjusting the size of the padding data 831F in conjunction with the size of the compressed picture data 831E, the bit rate of the VAU #1 831 can be maintained at a predetermined value. The sequence end code 831G indicates that the VAU #1 831 is located at the end of the video sequence #1. The stream end code 831H indicates the end of the base-view video stream 800.

FIG. 8 also shows the structure of a VAU #1 832 located at the top of each video sequence in the dependent-view video stream. The VAU #1 832 includes a sub-AU identification code 832A, sub-sequence header 832B, picture header 832C, supplementary data 832D, and compressed picture data 832E. Except for not including a sub-sequence header 832B, VAUs from the second VAU #2 on have the same structure as VAU #1 832. The sub-AU identification code 832A is a predetermined code indicating the top of the VAU #1 832. The sub-sequence header 832B includes an identification number for the video sequence #1 which includes the VAU #1 832. The sub-sequence header 832B further includes information shared by the whole GOP 810, e.g. resolution, frame rate, aspect ratio, and bit rate. These values are the same as the values set for the corresponding GOP in the base-view video stream, i.e. the values shown by the sequence header 831B in the VAU #1 831. The picture header 832C indicates its own identification number, the identification number for the video sequence #1, and information necessary for decoding the picture, such as the type of encoding method. The supplementary data 832D includes additional information regarding matters other than the decoding of the picture, for example closed caption text information, information on the GOP structure, and time code information. In particular, the supplementary data 832D includes offset metadata (details provided below) in addition to decoding switch information. The compressed picture data 832E includes a dependent-view picture. Additionally, the VAU #1 832 may include any or all of padding data 832F, a sequence end code 832G, and a stream end code 832H as necessary. The padding data 832F is dummy data. By adjusting the size of the padding data 832F in conjunction with the size of the compressed picture data 832E, the bit rate of the VAU #1 832 can be maintained at a predetermined value. The sequence end code 832G indicates that the VAU #1 832 is located at the end of the video sequence #1. The stream end code 832H indicates the end of the dependent-view video stream 800.

The specific content of each component in a VAU differs according to the encoding method of the video stream 800. For example, when the encoding method is MPEG-4 AVC or MVC, the components in the VAUs shown in FIG. 8 are composed of a single Network Abstraction Layer (NAL) unit. Specifically, the AU identification code 831A, sequence header 831B, picture header 831C, supplementary data 831D, compressed picture data 831E, padding data 831F, sequence end code 831G, and stream end code 831H respectively correspond to an Access Unit (AU) delimiter, Sequence Parameter Set (SPS), Picture Parameter Set (PPS), Supplemental Enhancement Information (SEI), View Component, Filler Data, End of Sequence, and End of Stream.

Figure 9:
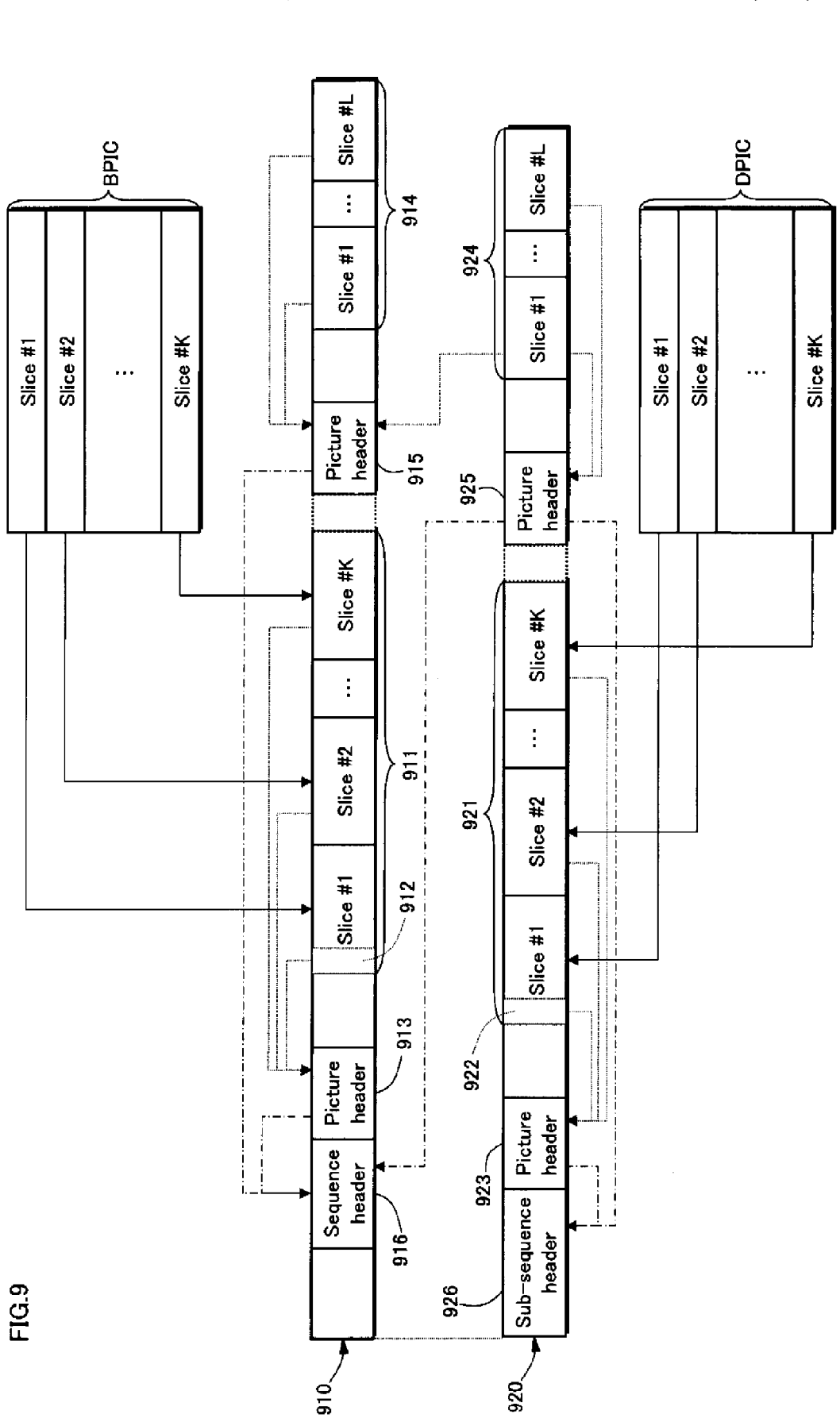
FIG. 9 is a schematic diagram showing reference relationships of headers between VAUs included in a base-view video stream 910 and a dependent-view video stream 920.

FIG. 9 is a schematic diagram showing reference correspondence of headers between VAUs included in a base-view video stream 910 and a dependent-view video stream 920. As shown in FIG. 9, in the base-view video stream 910, the top picture BPIC is divided into slices #1-#K (the letter K represents an integer greater than or equal to 1) and stored in the compressed picture data 911 for the VAU. A slice header 912 is attached to each of the slices #1-#K. The reference picture number, which is identification information indicating the picture referred to by each slice #1-#K, is stored in the slice header 912 of each slice. Each base-view picture to be referenced can thus be specified from the reference picture number indicated by each slice header. The slice header 912 further includes an identification number (for example, PPS number) for the picture header 913 in the same VAU. As shown by the arrow on the dashed lines in FIG. 9, the picture header 913 to be referenced can thus be specified from the identification number indicated by each slice header. Similarly, another picture is divided into slices #1-#L (the letter L represents an integer greater than or equal to 1) and stored in the compressed picture data 914 of another VAU. The slice header attached to each of the slices #1-#L includes the identification number for the picture header 915 in the same VAU. As shown by the arrow on the dashed lines in FIG. 9, the picture header 915 to be referenced can thus be specified from the identification number indicated by each slice header. Furthermore, the picture headers 913 and 915 include the identification number (for example, SPS number) for the sequence header 916 in the same video sequence. As shown by the arrow on the alternating long and short dashed lines in FIG. 9, the sequence header 916 to be referenced can thus be specified from the identification number indicated by the picture headers 913 and 915.

Further referring to FIG. 9, in the dependent-view video stream 920, the top picture DPIC is similarly divided into slices #1-#K and stored in the compressed picture data 921 for the VAU. The slice header 922 attached to each of the slices #1-#K includes a reference picture number. The base-view picture and dependent-view picture to which the slice refers can be specified from the reference picture number. Each slice header further includes the identification number for the picture header 923 in the same VAU. As shown by the arrow on the dashed lines in FIG. 9, the picture header 923 to be referenced can thus be specified from the identification number indicated by each slice header 922. Other pictures are similarly divided into slices #1-#L and stored in the compressed picture data 924 of another VAU. The slice header attached to each of the slices #1-#L includes the reference picture number and the identification number for the picture header 925 in the same VAU. As shown by the arrow on the dashed lines in FIG. 9, the picture header 925 to be referenced can thus be specified from the identification number indicated by each slice header 922. Furthermore, the picture headers 923 and 925 include the sub-sequence header 926 in the same video sequence. As shown by the arrow on the alternating long and short dashed lines in FIG. 9, the sub-sequence header 926 to be referenced can thus be specified from the identification number indicated by the picture headers 923 and 925.

Figure 10:
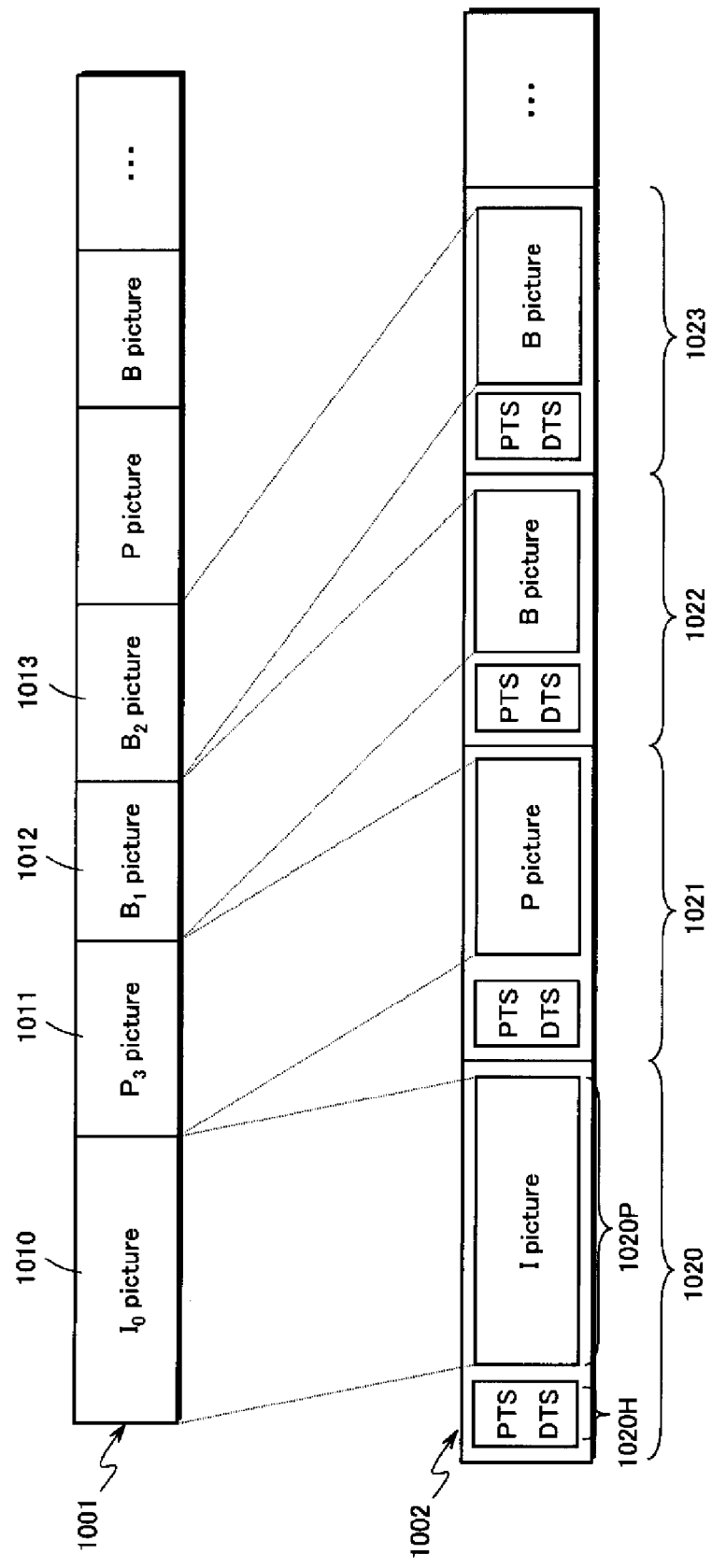
FIG. 10 is a schematic diagram showing details on a method for storing a video stream 1001 into a PES packet sequence 1002.

FIG. 10 is a schematic diagram showing details on a method for storing a video stream 1001 into a PES packet sequence 1002. This storage method is the same for the base-view video stream and the dependent-view video stream. As shown in FIG. 10, in the actual video stream 1001, pictures are multiplexed in the order of encoding, not in the order of presentation time. For example, in the VAUs in the base-view video stream, as shown in FIG. 10, $I_0$ picture 1010, $P_3$ picture 1011, $B_1$ picture 1012, $B_2$ picture 1013, . . . are stored in order from the top. The subscripted number indicates the serial number allotted to each picture in order of presentation time. $I_0$ picture 1010 is used as a reference picture for encoding $P_3$ picture 1011, and both $I_0$ picture 1010 and $P_3$ picture 1011 are used as reference pictures for encoding $B_1$ picture 1012 and $B_2$ picture 1013. Each of these VAUs is stored as a different PES packet 1020, 1021, 1022, 1023, . . . Each PES packet 1020, . . . includes a PES payload 1020P and a PES header 1020H. Each VAU is stored in a PES payload 1020P. Each PES header 1020H includes a presentation time, (Presentation Time-Stamp, or PTS), and a decoding time (Decoding Time-Stamp, or DTS), for the picture stored in the PES payload 1020P in the same PES packet 1020.

As with the video stream 1001 shown in FIG. 10, the other elementary streams shown in FIGS. 3 and 4 are stored in PES payloads in a sequence of PES packets. Furthermore, the PES header in each PES packet includes the PTS for the data stored in the PES payload for the PES packet.

Figure 11:
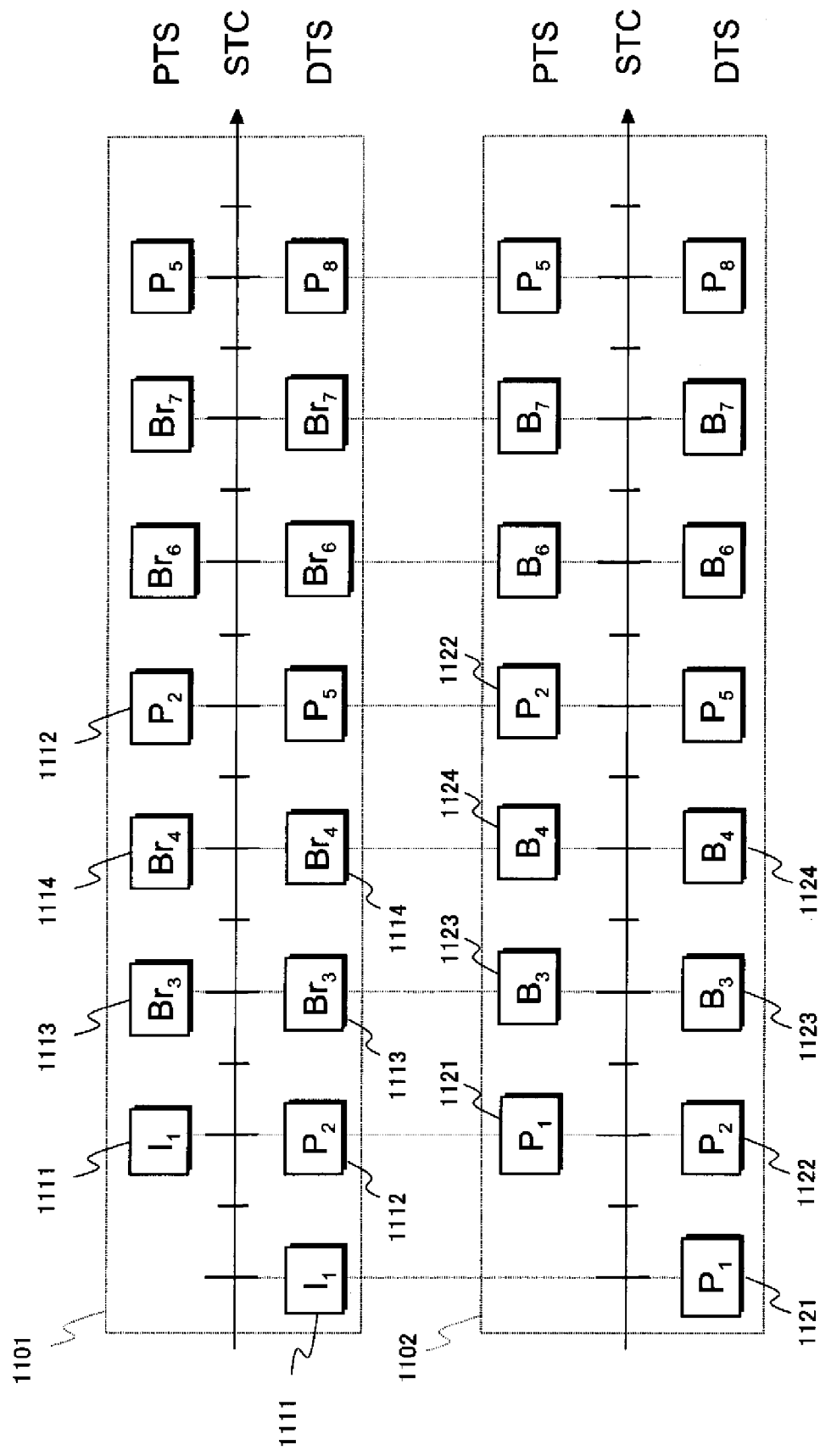
FIG. 11 is a schematic diagram showing correspondence between PTSs and DTSs assigned to each picture in a base-view video stream 1101 and a dependent-view video stream 1102.

FIG. 11 is a schematic diagram showing correspondence between PTSs and DTSs assigned to each picture in a base-view video stream 1101 and a dependent-view video stream 1102. As shown in FIG. 11, between the video streams 1101 and 1102, the same PTSs and DTSs are assigned to a pair of pictures representing the same frame or field in a 3D video image. For example, the top frame or field in the 3D video image is rendered from a combination of $I_1$ picture 1111 in the base-view video stream 1101 and $P_1$ picture 1121 in the dependent-view video stream 1102. Accordingly, the PTS and DTS for these two pictures 1111 and 1121 are the same. The subscripted numbers indicate the serial number allotted to each picture in the order of DTSs. Also, when the dependent-view video stream 1102 is a depth map stream, $P_1$ picture 1121 is replaced by an I picture representing a depth map for the $I_1$ picture 1111. Similarly, the PTS and DTS for the pair of second pictures in the video streams 1101 and 1102, i.e. $P_2$ pictures 1112 and 1122, are the same. The PTS and DTS are both the same for the pair of third pictures in the video streams 1101 and 1102, i.e. $Br_a$ picture 1113 and $B_3$ picture 1123. The same is also true for the pair $Br_4$ picture 1114 and $B_4$ picture 1124.

A pair of VAUs that include pictures for which the PTS and DTS are the same between the base-view video stream 1101 and the dependent-view video stream 1102 is called a "3D VAU". Using the allocation of PTSs and DTSs shown in FIG. 11, it is easy to cause the decoder in the playback device 102 in 3D playback mode to process the base-view video stream 1101 and the dependent-view video stream 1102 in parallel in units of 3D VAUs. In this way, the decoder definitely processes a pair of pictures representing the same frame or field in a 3D video image in parallel. Furthermore, the sequence header in the 3D VAU at the top of each GOP includes the same resolution, the same frame rate, and the same aspect ratio. In particular, this frame rate is equal to the value when the base-view video stream 1101 is decoded independently in 2D playback mode.

[Decoding Switch Information]

Figure 12B:
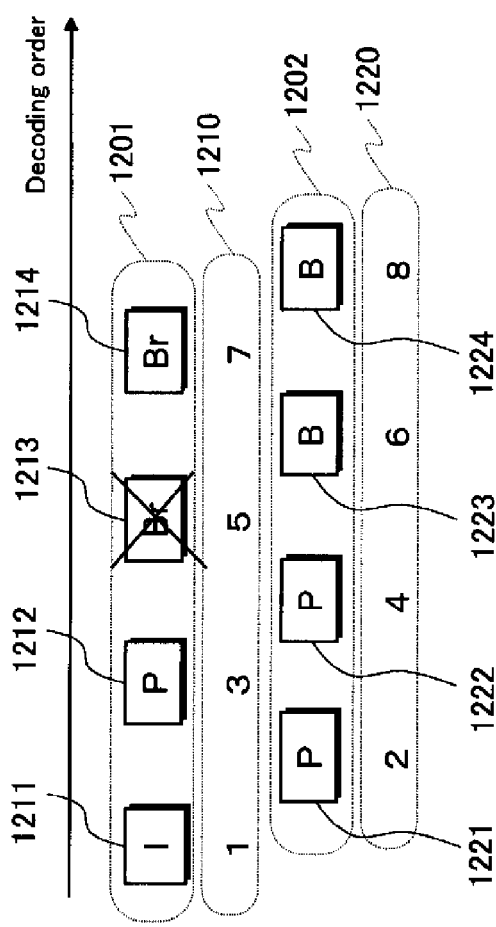
FIG. 12B is a schematic diagram showing sequences of decoding counters 1210 and 1220 allocated to each picture in a base-view video stream 1201 and a dependent-view video stream 1202.
Figure 12C:
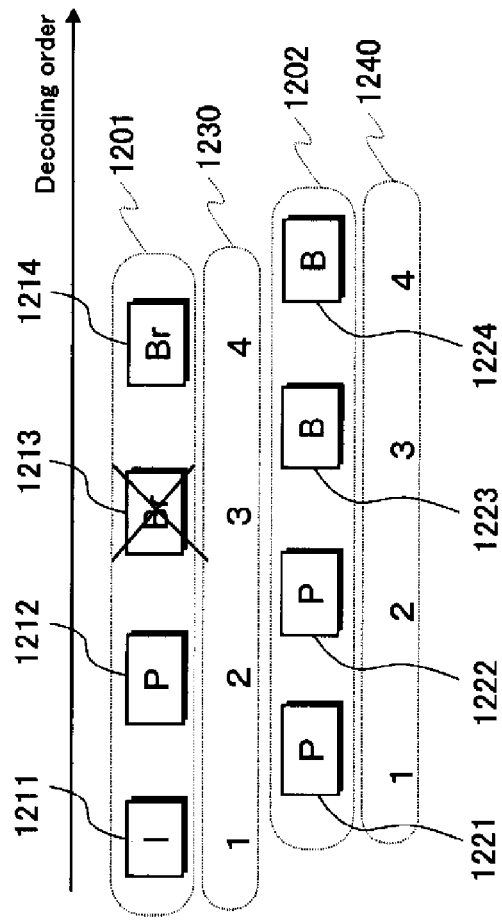
FIG. 12C is a schematic diagram showing other examples of the decoding counters 1230 and 1240.
Figure 12A:
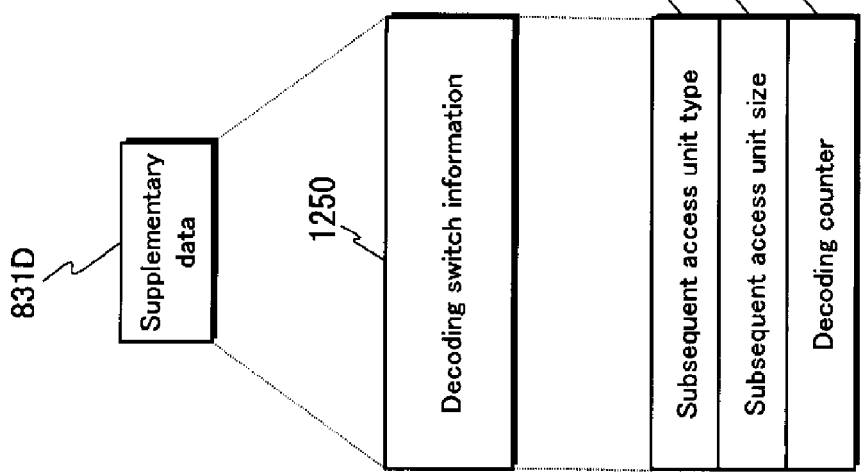
FIG. 12A is a schematic diagram showing a data structure of decoding switch information 1250 that includes supplementary data 831D and 832D shown in FIG. 8.

FIG. 12A is a schematic diagram showing a data structure of decoding switch information 1250 that includes supplementary data 831D and 832D shown in FIG. 8. In particular in MPEG-4 AVC, supplementary data 831D and 832D correspond to a type of NAL unit, "SEI". The decoding switch information 1250 is included in the supplementary data 831D and 832D in each VAU in both the base-view video stream and the dependent-view video stream. The decoding switch information 1250 is information to cause the decoder in the playback device 102 to easily specify the next VAU to decode. As described below, the decoder alternately decodes the base-view video stream and the dependent-view video stream in units of VAUs. When doing so, the decoder generally specifies the next VAU to be decoded in alignment with the time shown by the DTS assigned to each VAU. Many types of decoders, however, continue to decode VAUs in order, ignoring the DTS. For such decoders, it is preferable for each VAU to include decoding switch information 1250 in addition to a DTS.

As shown in FIG. 12A, decoding switch information 1250 includes a subsequent access unit type 1251, subsequent access unit size 1252, and decoding counter 1253. The subsequent access unit type 1251 indicates whether the next VAU to be decoded belongs to a base-view video stream or a dependent-view video stream. For example, when the value of the subsequent access unit type 1251 is "1", the next VAU to be decoded belongs to a base-view video stream, and when the value of the subsequent access unit type 1251 is "2", the next VAU to be decoded belongs to a dependent-view video stream. When the value of the subsequent access unit type 1251 is "0", the current VAU is located at the end of the stream targeted for decoding, and the next VAU to be decoded does not exist. The subsequent access unit size 1252 indicates the size of the next VAU that is to be decoded. By referring to the subsequent access unit size 1252, the decoder in the playback device 102 can specify the size of a VAU without analyzing its actual structure. Accordingly, the decoder can easily extract VAUs from the buffer. The decoding counter 1253 shows the decoding order of the VAU to which it belongs. The order is counted from a VAU that includes an I picture in the base-view video stream.

FIG. 12B is a schematic diagram showing sequences of decoding counters 1210 and 1220 allocated to each picture in a base-view video stream 1201 and a dependent-view video stream 1202. As shown in FIG. 12B, the decoding counters 1210 and 1220 are incremented alternately between the two video streams 1201 and 1202. For example, for VAU 1211 that includes an I picture in the base-view video stream 1201, a value of "1" is assigned to the decoding counter 1210. Next, a value of "2" is assigned to the decoding counter 1220 for the VAU 1221 that includes the next P picture to be decoded in the dependent-view video stream 1202. Furthermore, a value of "3" is assigned to the decoding counter 1210 for the VAU 1212 that includes the next P picture to be decoded in the base-view video stream 1201. By assigning values in this way, even when the decoder in the playback device 102 fails to read one of the VAUs due to some error, the decoder can immediately specify the missing picture using the decoding counters 1210 and 1220. Accordingly, the decoder can perform error processing appropriately and promptly.

In the example shown in FIG. 12B, an error occurs during the reading of the third VAU 1213 in the base-view video stream 1201, and the Br picture is missing. During decoding processing of the P picture contained in the second VAU 1222 in the dependent-view video stream 1202, however, the decoder has read the decoding counter 1220 for this VAU 1222 and retained the value. Accordingly, the decoder can predict the decoding counter 1210 for the next VAU to be processed. Specifically, the decoding counter 1220 in the VAU 1222 that includes the P picture is "4". Therefore, the decoding counter 1210 for the next VAU to be read can be predicted to be "5". The next VAU that is actually read, however, is the fourth VAU 1214 in the base-view video stream 1201, whose decoding counter 1210 is "7". The decoder can thus detect that it failed to read a VAU. Accordingly, the decoder can execute the following processing: "skip decoding processing of the B picture extracted from the third VAU 1223 in the dependent-view video stream 1202, since the Br picture to be used as a reference is missing". In this way, the decoder checks the decoding counters 1210 and 1220 during each decoding process. Consequently, the decoder can promptly detect errors during reading of VAUs and can promptly execute appropriate error processing. As a result, the decoder can prevent noise from contaminating the playback video.

FIG. 12C is a schematic diagram showing other examples of the decoding counters 1230 and 1240 allocated to each picture in a base-view video stream 1201 and a dependent-view video stream 1202. As shown in FIG. 12C, decoding counters 1230 and 1240 are incremented separately in the video streams 1201 and 1202. Therefore, the decoding counters 1230 and 1240 are the same for a pair of pictures in the same 3D VAU. In this case, when the decoder has decoded a VAU in the base-view video stream 1201, it can predict that "the decoding counter 1230 is the same as the decoding counter 1240 for the next VAU to be decoded in the dependent-view video stream 1202". Conversely, when the decoder has decoded a VAU in the dependent-view video stream 1202, it can predict that "the decoding counter 1230 for the next VAU to be decoded in the base-view video stream 1201 is the same as the decoding counter 1240 plus one". Accordingly, at any point in time, the decoder can promptly detect an error in reading a VAU using the decoding counters 1230 and 1240 and can promptly execute appropriate error processing. As a result, the decoder can prevent noise from contaminating the playback video.

[Offset Metadata]

Figure 13:
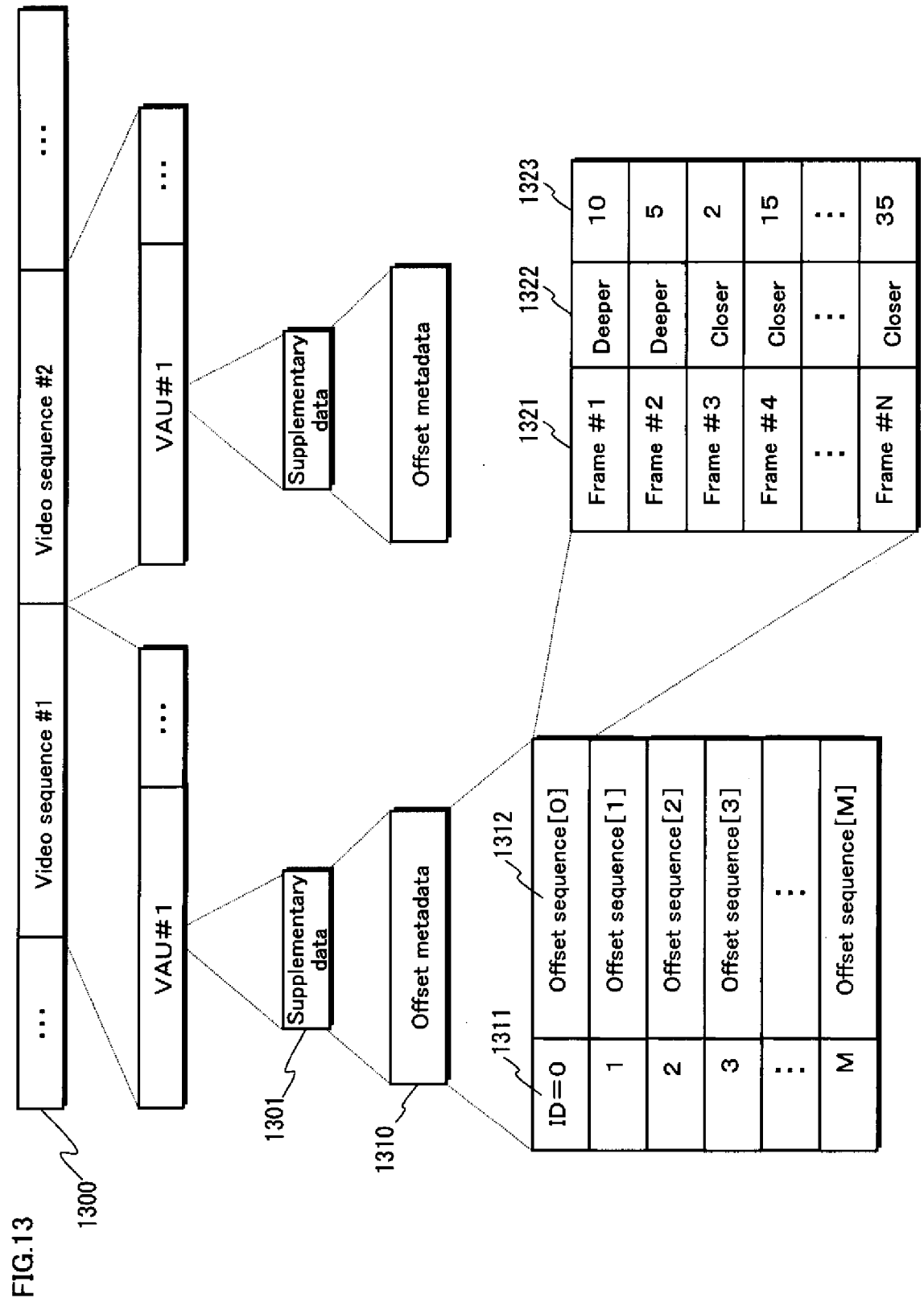
FIG. 13 is a schematic diagram showing a data structure of offset metadata 1310 included in a dependent-view video stream 1300.

FIG. 13 is a schematic diagram showing a data structure of offset metadata 1310 included in a dependent-view video stream 1300. FIG. 14 is a table showing syntax of this offset metadata 1310. As shown in FIG. 13, the offset metadata 1310 is stored in the supplementary data 1301 of VAU #1 located at the top of each video sequence (i.e. each GOP). As shown in FIGS. 13 and 14, the offset metadata 1310 includes a correspondence table between offset sequence IDs 1311 and offset sequences 1312.

The offset sequence IDs 1311 are serial numbers 0, 1, 2, . . . , M allotted in order to the offset sequences 1312. The letter M represents an integer greater than or equal to 1 and indicates the total number of offset sequences 1312 (number_of_offset_sequence). An offset sequence ID 1311 is allocated to each graphics plane to be combined in a video plane played back from each video sequence. In this way, an offset sequence 1312 is associated with each graphics plane.

A "video plane" refers to plane data generated from a picture included in a video sequence. A "graphics plane" refers to plane data generated from graphics data representing a 2D graphics image or from a text character string included in a text subtitle stream. "Plane data" is a two-dimensional array of pixel data. The size of the array is the same as the resolution of the video frame. A set of pixel data is formed by a combination of a chromatic coordinate value and an α value (opaqueness). The chromatic coordinate value is expressed as an RGB value or a YCrCb value. Types of graphics planes include a PG plane, IG plane, image plane, and On-Screen Display (OSD) plane. A PG plane is generated from a PG stream in the main TS or from a text subtitle stream. An IG plane is generated from an IG stream in the main TS. An image plane is generated in accordance with a BD-J object. An OSD plane is generated in accordance with firmware in the playback device 102.

Each offset sequence 1312 is a correspondence table between frame numbers 1321 and offset information 1322 and 1323. Frame numbers 1321 are serial numbers 1, 2, . . . , N allocated in order of presentation to frames #1, #2, . . . , N represented by a single video sequence (for example, video sequence #1). In FIG. 14, the frame number 1321 is represented as an integer variable "i". The letter N represents an integer greater than or equal to one and indicates the total number of frames included in the video sequence (number_of_displayed_frames_in_GOP). The pieces of offset information 1322 and 1323 are control information defining offset control for a single graphics plane.

"Offset control" refers to a process to provide left and right offsets for the horizontal coordinates in a graphics plane and combine the resulting planes respectively with the base-view video plane and dependent-view video plane. "Providing horizontal offsets to a graphics plane" refers to horizontally shifting each piece of pixel data in the graphics plane. From a single graphics plane, this generates a pair of graphics planes representing a left view and a right view. The presentation position of each element in the 2D graphics images played back from this pair of planes is shifted to the left or right from the original presentation position. The viewer is made to perceive a pair of a left view and a right view as a single 3D graphics image due to the binocular parallax produced by these shifts.

An offset is determined by a direction and a size. Accordingly, as shown in FIGS. 13 and 14, each piece of offset information includes an offset direction (Plane_offset_direction) 1322 and an offset value (Plane_offset_value) 1323. The offset direction 1322 indicates whether a 3D graphics image is closer to the viewer than the screen or further back. Whether the presentation position in the left view and the right view is shifted to the left or to the right from the original presentation position of the 2D graphics image depends on the value of the offset direction 1322. The offset value 1323 indicates the number of horizontal pixels of the distance between the original presentation position of the 2D graphics image and the presentation position of each of the left view and the right view.

Figure 15B:
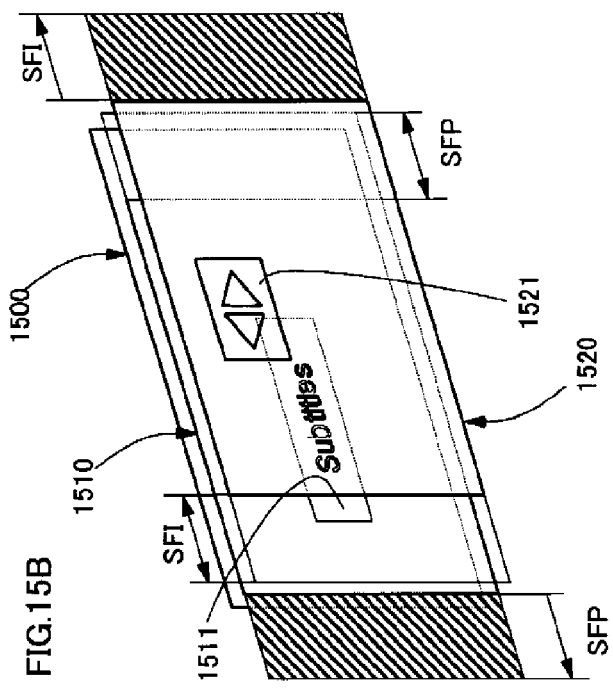
FIGS. 15A and 15B are schematic diagrams showing offset controls for a PG plane 1510 and IG plane 1520 respectively.
Figure 15A:
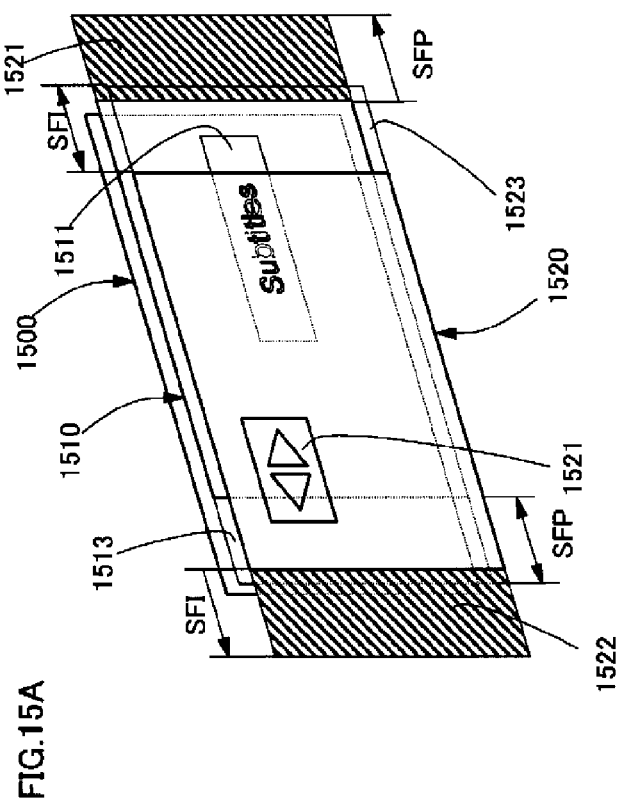

FIGS. 15A and 15B are schematic diagrams showing offset controls for a PG plane 1510 and IG plane 1520 respectively. Via these offset controls, two types of graphics planes, 1510 and 1520, are respectively combined with the left-view video plane 1501 and the right-view video plane 1502. A "left-view/right-view video plane" refers to a video plane that represents a left view/right view and is generated from a combination of the base-view video stream and the dependent-view video stream. In the following description, it is assumed that a subtitle 1511 indicated by the PG plane 1510 is displayed closer than the screen, and a button 1521 indicated by the IG plane 1520 is displayed further back than the screen.

As shown in FIG. 15A, a right offset is provided to the PG plane 1510. Specifically, the position of each piece of pixel data in the PG plane 1510 is first shifted to the right (virtually) from the corresponding position of the pixel data in the left-view video plane 1501 by a number of pixels SFP equal to the offset value. Next, a strip 1512 (virtually) protruding from the right edge of the range of the left-view video plane 1501 is "cut off" from the right edge of the PG plane 1510. In other words, the pixel data for this region 1512 is discarded. Conversely, a transparent strip 1513 is added to the left edge of the PG plane 1510. The width of this strip 1513 is the width of the strip 1512 at the right edge; i.e. the width is the same as the offset value SFP. A PG plane representing the left view is thus generated from the PG plane 1510 and combined with the left-view video plane 1501. In particular, in this left-view PG plane, the presentation position of the subtitle 1511 is shifted to the right from the original presentation position by the offset value SFP.

Conversely, a left offset is provided to the IG plane 1520. Specifically, the position of each piece of pixel data in the IG plane 1520 is first shifted to the left (virtually) from the corresponding position of the pixel data in the left-view video plane 1501 by a number of pixels SFI equal to the offset value. Next, a strip 1522 (virtually) protruding from the left edge of the range of the left-view video plane 1510 is cut off from the left edge of the IG plane 1520. Conversely, a transparent strip 1523 is added to the right edge of the IG plane 1520. The width of this strip 1523 is the width of the strip 1522 at the left edge; i.e. the width is the same as the offset value SFI. An IG plane representing the left view is thus generated from the IG plane 1520 and combined with the left-view video plane 1501. In particular, in this left-view IG plane, the presentation position of the button 1521 is shifted to the left from the original presentation position by the offset value SFI.

As shown in FIG. 15B, a left offset is provided to the PG plane 1510, and a right offset is added to the IG plane 1520. In other words, the above operations are performed in reverse for the PG plane 1510 and the IG plane 1520. As a result, plane data representing the right view is generated from the plane data 1510 and 1520 and combined with the right-view video plane 1520. In particular, in the right-view PG plane, the presentation position of the subtitle 1511 is shifted to the left from the original presentation position by the offset value SFP. On the other hand, in the right-view IG plane, the presentation position of the button 1521 is shifted to the right from the original presentation position by the offset value SFI.

Figure 15C:
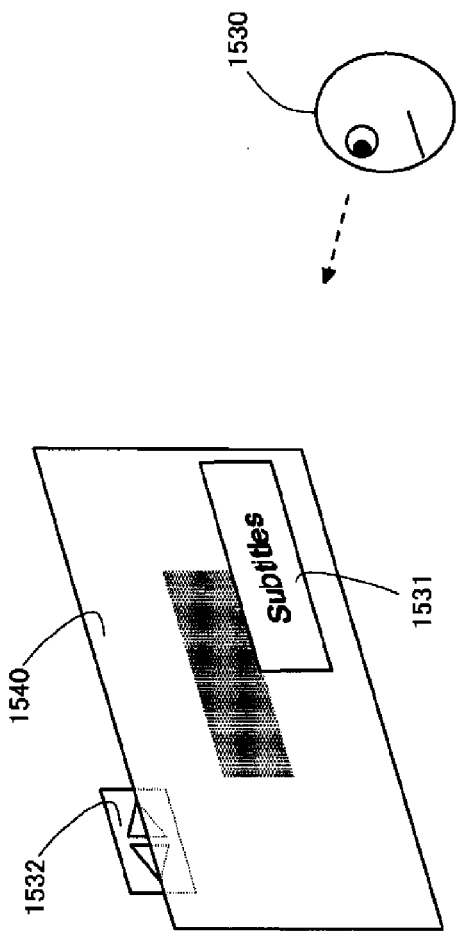
FIG. 15C is a schematic diagram showing 3D graphics images that a viewer 1530 is made to perceive from 2D graphics images represented by graphics planes shown in FIGS. 15A and 15B.

FIG. 15C is a schematic diagram showing 3D graphics images that a viewer 1530 is made to perceive from 2D graphics images represented by graphics planes shown in FIGS. 15A and 15B. When the 2D graphics images represented by these graphics planes are alternately displayed on the screen 1540, the viewer 1530 perceives the subtitle 1531 to be closer than the screen 1540 and the button 1532 to be further back than the screen 1540, as shown in FIG. 15C. The distance between the 3D graphics images 1531 and 1532 and the screen 1540 can be adjusted via the offset values SFP and SFI.

FIGS. 16A and 16B are graphs showing examples of offset sequences. In these graphs, the offset value is positive when the offset direction is toward the viewer from the screen. FIG. 16A is an enlargement of the graph for the presentation period of the first GOP in FIG. 16B, i.e. GOP1. As shown in FIG. 16A, the stepwise line 1601 shows offset values for the offset sequence with an offset sequence ID equaling 0, i.e. offset sequence [0]. On the other hand, the horizontal line 1602 shows offset values for the offset sequence with an offset sequence ID equaling 1, i.e. offset sequence [1]. The offset value 1601 of the offset sequence [0] increases stepwise during the presentation period GOP1 of the first GOP in the order of frames FR1, FR2, FR3, ..., FR15, ... As shown in FIG. 16B, the stepwise increase in the offset value 1601 similarly continues in the presentation periods GOP2, GOP3, ..., GOP40, ... for the second and subsequent GOPs. The amount of increase per frame is sufficiently small for the offset value 1601 in FIG. 16B to appear to increase continually as a line. On the other hand, the offset value 1602 in offset sequence [1] is maintained constant during the presentation period GOP1 of the first GOP. As shown in FIG. 16B, the offset value 1602 increases to a positive value at the end of the presentation period GOP40 for the $40^{th}$ GOP. Offset values may thus exhibit discontinuous change.

FIG. 16C is a schematic diagram showing 3D graphics images reproduced in accordance with the offset sequences shown in FIGS. 16A and 16B. When the subtitle 3D video image 1603 is displayed in accordance with the offset sequence [0], the 3D video image 1603 appears to start from right in front of the screen 1604 and gradually approach the viewer. On the other hand, when the button 3D video image 1605 is displayed in accordance with the offset sequence [1], the 3D video image 1605 appears to suddenly jump from a fixed position behind the screen 1604 to in front of the screen 1604. As described, the patterns by which offset values increase and decrease frame by frame are changed in a variety of ways from one offset sequence to another. Individual changes in the depth of a plurality of 3D graphics images can thereby be represented in a variety of ways.

<<Data Structure of PG Stream>>

Referring again to FIG. 4, a PG stream 403 includes a plurality of functional segments. These functional segments include a Presentation Control Segment (PCS), Pallet Define Segment (PDS), Window Define Segment (WDS), and Object Define Segment (ODS). The PCS defines a display set in a graphics stream as well as a screen structure that uses graphics objects. Types of screen structure include Cut-In/Out, Fade-In/Out, Color Change, Scroll, and Wipe-In/Out. Defining a screen structure with PCS allows for a display effect whereby "a certain subtitle gradually disappears, and the next subtitle is displayed". PDS defines the correspondence between a pixel code and a chromatic coordinate value (for example, luminance Y, red-difference Cr, blue-difference Cb, opaqueness α). WDS defines a rectangular region inside the graphics plane, i.e. a window. ODS uses the pixel code and run length to define a graphics object to which run length compression has been applied.

<<Data Structure of IG Stream>>

Referring yet again to FIG. 4, the IG stream 404 includes an Interactive Composition Segment (ICS), PDS, and ODS. PDS and ODS are the same functional segments as included in the PG stream 403. In particular, a graphics object that includes an ODS represents a GUI graphics element, such as a button, pop-up menu, etc., that forms an interactive screen. An ICS defines interactive operations that uses these graphics objects. Specifically, an ICS defines the states that each graphics object, such as a button, pop-up menu, etc. can take when changed in response to user operation, states such as normal, selected, and active. An ICS also includes button information. Button information includes a command that the playback device is to perform when the user performs a certain operation on the button or the like.

<<Data Structure of Text Subtitle Stream>>

FIG. 17 is a schematic diagram showing a data structure of a text subtitle stream 1700. The text subtitle stream 1700 includes a plurality of text data entries 1710. Each text data entry 1710 is composed of a pair of style information 1711 and text information 1712. The text information 1712 represents a text character string to be displayed. The style information 1711 includes a PTS 1701, presentation position 1702, font ID 1703, display style 1704, and font size 1705. The PTS 1701 displays the presentation time of the text character string displayed by the text information 1712 in the same pair. The presentation position 1702 indicates the presentation position of the text character string in the graphics plane. The font ID 1703 is identification information on the font set to be referenced when rendering the text character string in the graphics plane. The display style 1704 indicates the character style, such as bold, italic, etc. when displaying the text character string. The font size 1705 indicates the size of the characters when displaying the text character string.

<<Other TS Packets Included in AV Stream File>>

In addition to the TS packets converted from the elementary stream as shown in FIG. 3, the types of TS packets included in an AV stream file include a Program Association Table (PAT), Program Map Table (PMT), and Program Clock Reference (PCR). The PCR, PMT, and PAT are specified by the European Digital Broadcasting Standard and are intended to regulate the partial transport stream constituting a single program. By using PCR, PMT, and PAT, the AV stream file can also be regulated in the same way as the partial transport stream. Specifically, the PAT shows the PID of a PMT included in the same AV stream file. The PID of the PAT itself is 0. The PMT includes the PIDs for the elementary streams representing video, audio, subtitles, etc. included in the same AV stream file, as well as the attribute information for the elementary streams. The PMT also includes various descriptors relating to the AV stream file. The descriptors particularly include copy control information showing whether copying of the AV stream file is permitted or not. The PCR includes information indicating the value of a system time clock (STC) to be associated with the ATS assigned to the PCR itself. The STC referred to here is a clock used as a reference for the PTS and the DTS by a decoder in the playback device 102. This decoder uses the PCR to synchronize the STC with the ATC.

Figure 18:
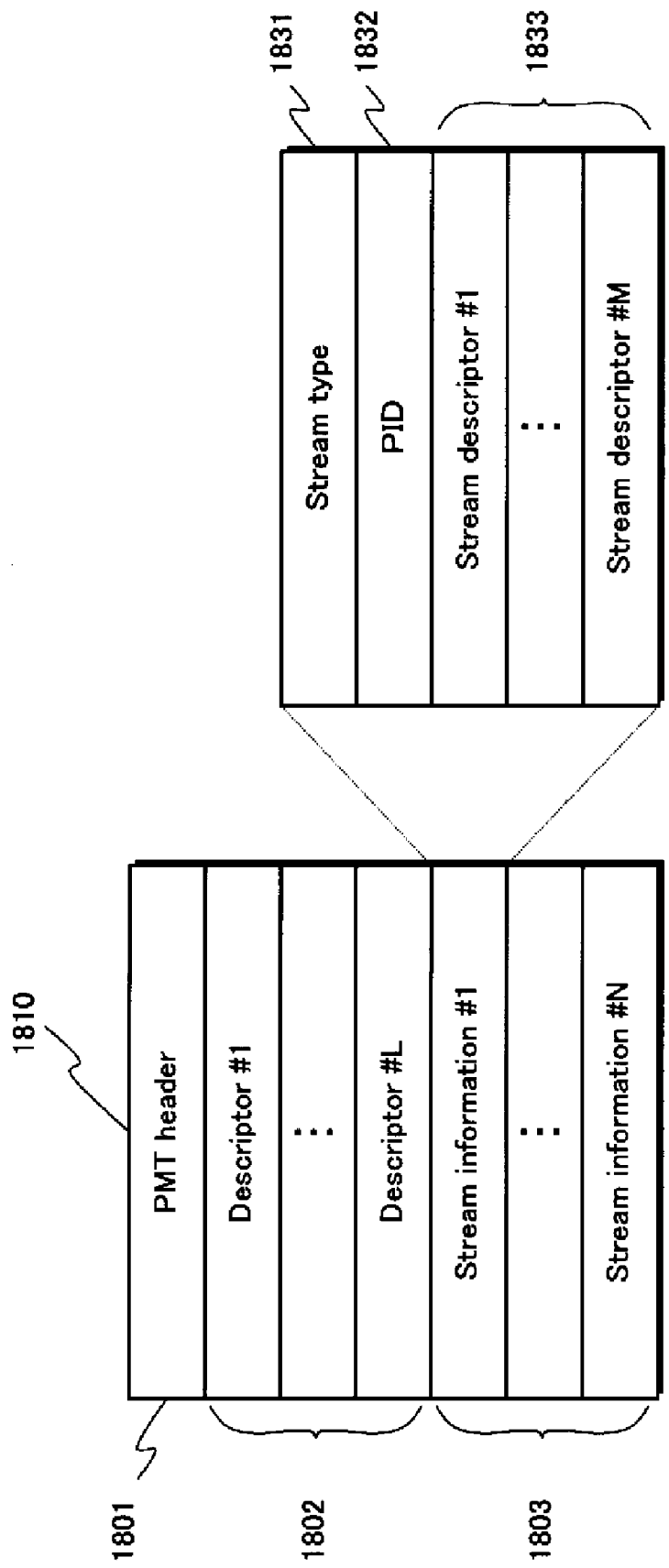
FIG. 18 is a schematic diagram showing a data structure of a PMT 1810.

FIG. 18 is a schematic diagram showing a data structure of a PMT 1810. The PMT 1810 includes a PMT header 1801, descriptors 1802, and pieces of stream information 1803. The PMT header 1801 indicates the length of data, etc. stored in the PMT 1810. Each descriptor 1802 relates to the entire AV stream file that includes the PMT 1810. The copy control information is included in one of the descriptors 1802. Each piece of stream information 1803 relates to one of the elementary streams included in the AV stream file and is assigned to a different elementary stream. Each piece of stream information 1803 includes a stream type 1831, a PID 1832, and stream descriptors 1833. The stream type 1831 includes identification information for the codec used for compressing the elementary stream. The PID 1832 indicates the PID of the elementary stream. The stream descriptors 1833 include attribute information of the elementary stream, such as a frame rate and an aspect ratio.

By using PCR, PMT, and PAT, the decoder in the playback device 102 can be made to process the AV stream file in the same way as the partial transport stream in the European Digital Broadcasting Standard. In this way, it is possible to ensure compatibility between a playback device for the BD-ROM disc 101 and a terminal device conforming to the European Digital Broadcasting Standard.

<<Interleaved Arrangement of Multiplexed Stream Data>>

For seamless playback of 3D video images, the physical arrangement of the base-view video stream and dependent-view video stream on the BD-ROM disc 101 is important. This "seamless playback" refers to playing back video and audio from multiplexed stream data without interruption.

Figure 19:
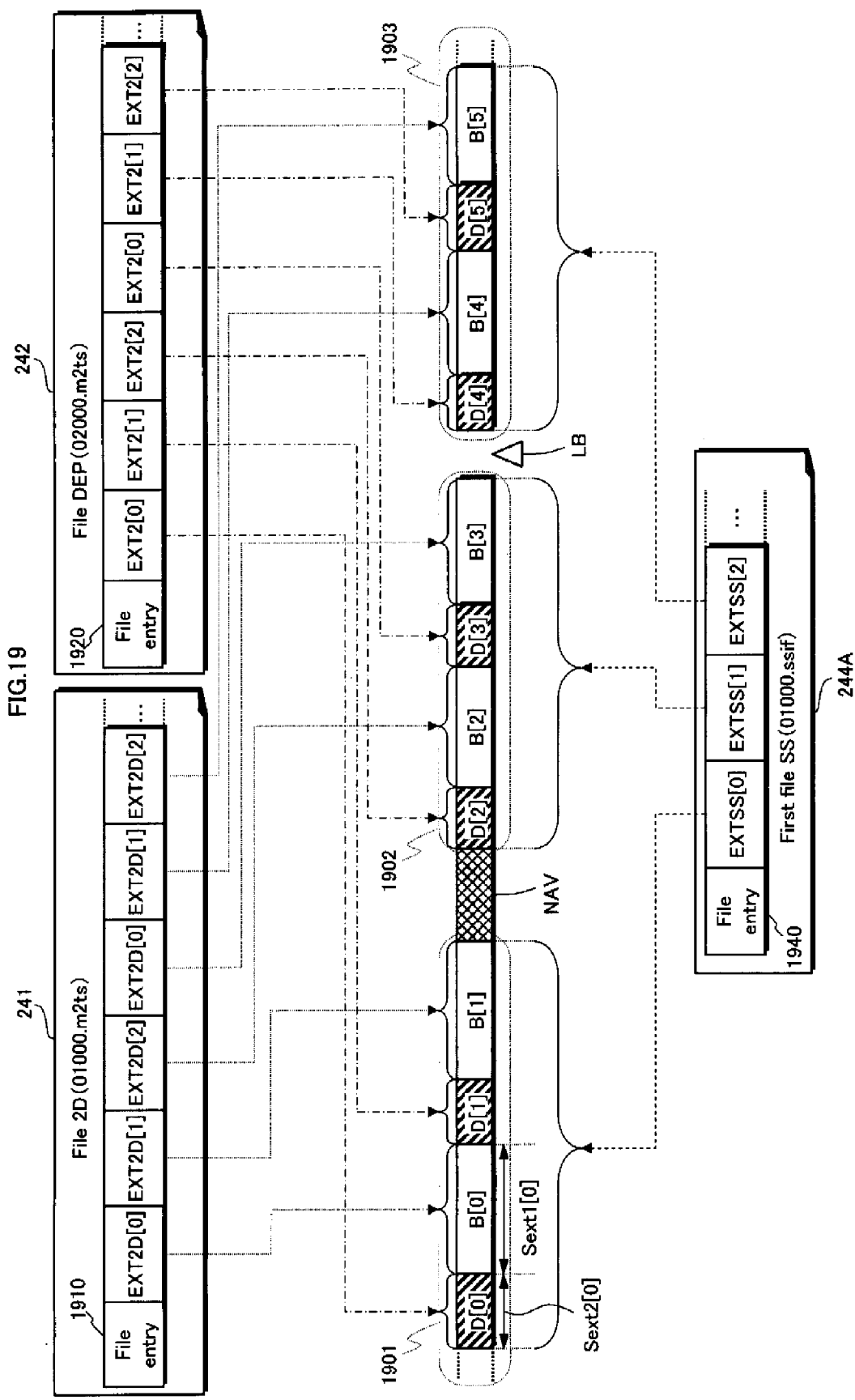
FIG. 19 is a schematic diagram showing a physical arrangement of multiplexed stream data on the BD-ROM disc 101 shown in FIG. 2.

FIG. 19 is a schematic diagram showing a physical arrangement of multiplexed stream data on the BD-ROM disc 101. As shown in FIG. 19, the multiplexed stream data is divided into a plurality of data blocks D[n], B[n] (n=0, 1, 2, 3, . . . ) and arranged on the BD-ROM disc 101. A "data block" refers to a sequence of data recorded on a contiguous area on the BD-ROM disc 101, i.e. a plurality of physically contiguous sectors. Since physical addresses and logical addresses on the BD-ROM disc 101 are substantially the same, the LBNs within each data block are also continuous. Accordingly, the BD-ROM drive 121 can continuously read a data block without causing the optical pickup to perform a seek. Hereinafter, data blocks B[n] belonging to a main TS are referred to as "base-view data blocks", and data blocks D[n] belonging to a sub-TS are referred to as "dependent-view data blocks". In particular, data blocks that include the right-view video stream are referred to as "right-view data blocks", and the data blocks that include the depth map stream are referred to as "depth map data blocks".

In the file system on the BD-ROM disc 101, each data block B[n] and D[n] can be accessed as one extent in the files 2D or the files DEP. In other words, the logical address for each data block can be known from the file entry of a file 2D or a file DEP (see <<Supplementary Explanation>> for details).

In the example shown in FIG. 19, the file entry 1910 in the file 2D (01000.m2ts) 241 indicates the sizes of the base-view data blocks B[n] and the LBNs of their tops. Accordingly, the base-view data blocks B[n] can be accessed as extents EXT2D[n] in the file 2D 241. Hereinafter, the extents EXT2D[n] belonging to the file 2D 241 are referred to as "2D extents". On the other hand, the file entry 1920 of the file DEP (02000.m2ts) 242 indicates the sizes of the dependent-view data blocks D[n] and the LBNs of their tops. Accordingly, each dependent-view data block D[n] can be accessed as an extent EXT2[n] in the file DEP 242. Hereinafter, the extents EXT2[n] belonging to the file DEP 242 are referred to as "dependent-view extents".

As shown in FIG. 19, a data block group is recorded continuously along a track on the BD-ROM disc 101. Furthermore, the base-view data blocks B[n] and the dependent-view data blocks D[n] are arranged alternately one by one. This type of arrangement of a data block group is referred to as an "interleaved arrangement". In particular, one series of data blocks recorded in an interleaved arrangement is referred to as an "extent block". Three extent blocks 1901, 1902, and 1903 are shown in FIG. 19. As shown in the first two extent blocks 1901 and 1902, a storage area NAV for data other than multiplexed stream data exists between the extent blocks, thus separating the extent blocks. Also, when the BD-ROM disc 101 is a multi-layer disc, i.e. when the BD-ROM disc 101 includes a plurality of recording layers, the extent blocks may also separated by a layer boundary LB between the recording layers, as in the second and third extent blocks 1902 and 1903 shown in FIG. 19. In this way, one series of multiplexed stream data is generally arranged so as to be divided into a plurality of extent blocks. In this case, for the playback device 102 to seamlessly play back video images from the multiplexed stream data, it is necessary for video images to be played back from the extent blocks to be seamlessly connected. Hereinafter, processing required by the playback device 102 for that purpose is referred to as "seamless connection between extent blocks".

The extent blocks 1901-1903 have the same number of the two types of data blocks, D[n] and B[n]. Furthermore, the extent ATC time is the same between an $n^{th}$ contiguous data block pair D[n] and B[n]. In this context, an "Arrival Time Clock (ATC)" refers to a clock that acts as a standard for an ATS. Also, the "extent ATC time" is defined by the value of the ATC and represents the range of the ATS assigned to source packets in an extent, i.e. the time interval from the ATS of the source packet at the top of the extent to the ATS of the source packet at the top of the next extent. In other words, the extent ATC time is the same as the time required to transfer all of the source packets in the extent from the read buffer in the playback device 102 to the system target decoder. The "read buffer" is a buffer memory in the playback device 102 where data blocks read from the BD-ROM disc 101 are temporarily stored before being transmitted to the system target decoder. Details on the read buffer are provided later. In the example shown in FIG. 19, since three extent blocks 1901-1903 are connected together seamlessly, the extent ATC times are the same between the data block pairs D[n], B[n] (n=0, 1, 2, ... ). The VAUs located at the top of contiguous data blocks D[n] and B[n] belong to the same 3D VAU, and in particular include the top picture of the GOP representing the same 3D video image. For example, the top of the right-view data block D[n] includes a P picture for the right-view video stream, and the top of the base-view data block B[n] includes an I picture for the base-view video stream. The P picture for the right-view video stream represents the right view when the 2D video image represented by the I picture in the base-view video stream is used as the left view. In particular, the P picture, as shown in FIG. 7, is compressed using the I picture as a reference picture. Accordingly, the playback device 102 in 3D playback mode can start playback of 3D video images from any pair of data blocks D[n] and B[n]. That is to say, processing that requires random access of video streams, such as interrupt playback, is possible.

Furthermore, in the interleaved arrangement, among contiguous pairs of data blocks D[n] and B[n], dependent-view data blocks D[n] are positioned before the base-view data blocks B[n]. This is because the amount of data is smaller in the dependent-view data block D[n] than the base-view data block B[n], i.e. the bit rate is lower. For example, the picture included in the $n^{th}$ right-view data block D[n] is compressed using the picture included in the $n^{th}$ base-view data block B[n] as a reference picture. Accordingly, the size $S_{ext2}[n]$ of the right-view data block D[n] is equal to or less than the size $S_{EXT1}[n]$ of the base-view data block B[n]: $S_{EXT2}[n] \leq S_{EXT1}[n]$. On the other hand, the amount of data per pixel in the depth map, i.e. the number of bits of the depth value, is in general smaller than the amount of data per pixel of the base-view picture, i.e. the sum of the number of bits of the chromatic coordinate value and the a value. Furthermore, as shown in FIGS. 3A and 3B, unlike the sub-TS, the main TS includes other elementary streams, such as a primary audio stream, in addition to the primary video stream. Therefore, the size of the depth map data block, $S_{EXT3}[n]$, is less than or equal to the size of the base-view data block B[n], $S_{EXT1}[n]$: $S_{EXT3}[n] < S_{EXT1}[n]$.

[Significance of Dividing Multiplexed Stream Data into Data Blocks]

In order to play 3D video images back seamlessly from the BD-ROM disc 101, the playback device 102 has to process the main TS and sub-TS in parallel. The read buffer capacity usable in such processing, however, is generally limited. In particular, there is a limit to the amount of data that can be continuously read into the read buffer from the BD-ROM disc 101. Accordingly, the playback device 102 has to read sections of the main TS and sub-TS with the same extent ATC time by dividing the sections.

FIG. 20A is a schematic diagram showing the arrangement of the main TS 2001 and sub-TS 2002 recorded separately and consecutively on a BD-ROM disc. When the playback device 102 processes the main TS 2001 and sub-TS 2002 in parallel, as shown by the arrows (1)-(4) on the solid lines in FIG. 20A, the BD-ROM drive 121 alternately reads sections of the main TS 2001 and the sub-TS 2002 that have the same extent ATC time. At this time, as shown by the arrows in the dashed lines in FIG. 20A, during read processing the BD-ROM drive 121 has to make a large change in the area to be read on the BD-ROM disc. For example, after the top section of the main TS 2001 shown by arrow (1) is read, the BD-ROM drive 121 temporarily stops the read operation by the optical pickup and increases the rotation speed of the BD-ROM disc. In this way, the BD-ROM drive 121 rapidly moves the sector on the BD-ROM disc on which the top section of the sub-TS 2002 shown by arrow (2) is recorded to the position of the optical pickup. This operation to temporarily stop reading by the optical pickup and, while reading is stopped, position the optical pickup above the next area to be read is referred to as a "jump". The dashed lines with an arrow shown in FIG. 20A indicate the range of the jumps necessary during read processing. During each jump period, read processing by the optical pickup stops, and only decoding processing by the decoder progresses. Since the jump is excessive in the example shown in FIG. 20A, it is difficult to cause read processing to keep up with decoding processing. As a result, it is difficult to stably maintain seamless playback.

FIG. 20B is a schematic diagram showing an arrangement of dependent-view data blocks D[0], D[1], D[2], . . . and base-view data blocks B[0], B[1], B[2], . . . recorded alternately on the BD-ROM disc 101 according to embodiment 1 of the present invention. As shown in FIG. 20B, the main TS and sub-TS are divided into a plurality of data blocks and are arranged alternately. In this case, during playback of 3D video images, the playback device 102 reads data blocks D[0], B[0], D[1], B[1] . . . in order from the top, as shown by arrows (1)-(4) in FIG. 20B. By simply reading these data blocks in order, the playback device 102 can smoothly read the main TS and sub-TS alternately. In particular, since no jump occurs during read processing, seamless playback of 3D video images can be stably maintained.

[Significance of Providing Contiguous Data Blocks with the Same Extent ATC Time]

FIG. 20C is a schematic diagram showing an example of the extent ATC times for a dependent-view data block group D[n] and a base-view data block group B[n] recorded in an interleaved arrangement (n=0, 1, 2). As shown in FIG. 20C, the extent ATC time is the same in each pair between the dependent-view data block D[n] and the immediately subsequent base-view data block B[n]. For example, the extent ATC time is equal to one second for each of D[0] and B[0] in the top data block pair. Accordingly, when the data blocks D[0] and B[0] are read by the read buffer in the playback device 102, all of the TS packets therein are sent from the read buffer to the system target decoder in the same one-second interval. Similarly, since the extent ATC time is equal to 0.7 seconds for each of D[1] and B[1] in the second data block pair, all of the TS packets in each data block are transmitted from the read buffer to the system target decoder in the same 0.7-second interval.

FIG. 20D is a schematic diagram showing another example of the extent ATC times for a dependent-view data block group D[n] and a base-view data block group B[n] recorded in an interleaved arrangement. As shown in FIG. 20D, the extent ATC times in all of the data blocks D[n] and B[n] are equal to one second. Accordingly, in the same one-second interval in which any of the data blocks D[n] and B[n] are read by the read buffer in the playback device 102, all of the TS packets in each of those data blocks are transmitted from the read buffer to the system target decoder.

As described above, the compression rate of the dependent-view data blocks is higher than the compression rate of the base-view data blocks. Accordingly, decoding processing of the dependent-view data blocks is generally slower than decoding processing of the base-view data blocks. On the other hand, when the extent ATC times are equal, the dependent-view data blocks have a smaller amount of data than the base-view data blocks. Therefore, when the extent ATC times are the same between contiguous data blocks as in FIGS. 20C and 20D, the speed at which the data to be decoded is provided to the system target decoder can easily be maintained uniformly with the speed of processing by the decoder. In other words, the system target decoder facilitates synchronization between the decoding processing of the base-view data blocks and the decoding processing of the dependent-view data blocks, particularly in interrupt playback.

[Significance of Placing Smaller-Data-Amount Data Blocks First]

When reading a data block located at the top or at the playback start position of each extent block, the playback device 102 in 3D playback mode first reads the entirety of the data block into the read buffer. The data block is not transferred to the system target decoder during that period. After finishing reading the data block, the playback device 102 transfers the data block to the system target decoder in parallel with the next data block. This processing is called "preloading".

The technical significance of preloading is as follows. First, in L/R mode, base-view data blocks are necessary for decoding the dependent-view data blocks. Therefore, to maintain the buffer at the minimum necessary capacity for storing the decoded data until output processing, it is preferable to simultaneously provide the data blocks to the system target decoder to be decoded. On the other hand, in depth mode, processing is necessary to generate a pair of video planes representing parallax images from a pair of a decoded base-view picture and a decoded depth map. Accordingly, to maintain the buffer at the minimum necessary capacity for storing the decoded data until this processing, it is preferable to provide the base-view data blocks simultaneously with the depth map data blocks to the system target decoder to be decoded. Therefore, preloading causes the entirety of the data block at the top of an extent block or at the playback start position to be read into the read buffer in advance. This enables the data block and the following data block to be transferred simultaneously from the read buffer to the system target decoder and decoded. Furthermore, the subsequent pairs of data blocks can also be simultaneously decoded by the system target decoder.

When preloading, the entirety of the data block that is read first is stored in the read buffer. Accordingly, the read buffer requires at least a capacity equal to the size of the data block. To maintain the capacity of the read buffer at a minimum, the size of the data block to be preloaded should be as small as possible. Meanwhile, for interrupt playback, etc., any pair of data blocks may be selected as the playback start position. For this reason, the data block having the smallest data amount is placed first in each pair of the data blocks. This enables the minimum capacity to be maintained in the read buffer.

<<Cross-Linking of AV Stream Files to Data Blocks>>

For the data block group shown in FIG. 19, the AV stream files are cross-linked as follows. The file entry 1940 of the first file SS (01000.ssif) 244A considers each extent block 1901-1903 to each be one extent, indicating the size of each and the LBN of the top thereof. Accordingly, the extent blocks 1901-1903 can be accessed as the extents EXTSS[0], EXTSS[1], and EXTSS[2] of the first file SS 244A. Hereinafter, the extents EXTSS[0], EXTSS[1], and EXTSS[2] belonging to the first file SS 244A are referred to as the "extents SS". Each of the extents SS EXTSS[0], EXTSS[1], and EXTSS[2] share the base-view data blocks B[n] with the file 2D 241 and share the dependent-view data blocks D[n] with the file DEP 242.

<<Playback Path for Extent Block Group>>

Figure 21:
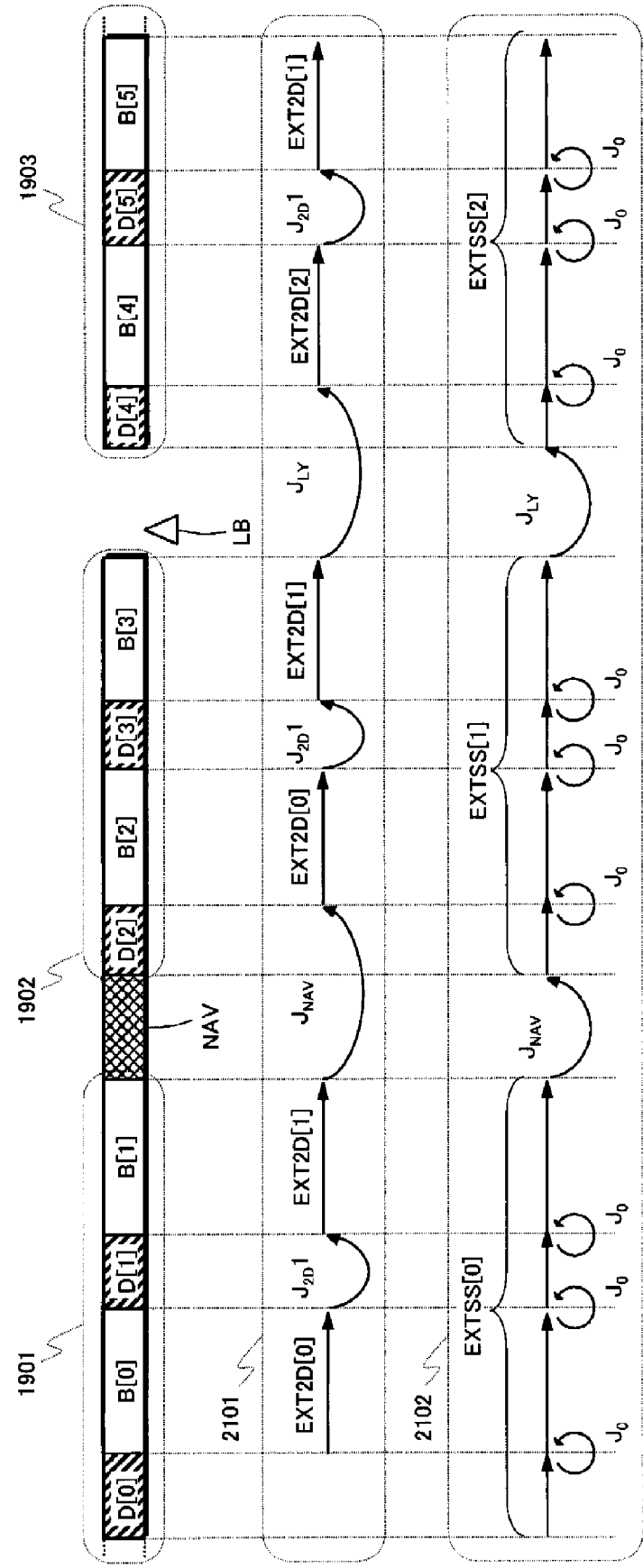
FIG. 21 is a schematic diagram showing a playback path 2101 in 2D playback mode and a playback path 2102 in L/R mode for an extent block group 1901-1903 shown in FIG. 19.

FIG. 21 is a schematic diagram showing a playback path 2101 in 2D playback mode for an extent block group 1901-1903. The playback device 102 in 2D playback mode plays back the file 2D 241. Accordingly, as indicated by the playback path 2101 in 2D playback mode, the base-view data blocks B[n] (n=0, 1, 2, . . . ) are read in order from the extent blocks 1901-1903 as 2D extents EXT2D[0], EXT2D[1], and EXT2D[2]. Specifically, first, the top base-view data block B[0] is read from the top extent block 1901, then reading of the immediately subsequent dependent-view data block D[0] is skipped by a first jump $J_{2D}1$. Next, the second base-view data block B[1] is read, and then reading of the immediately subsequent data NAV and dependent-view data block D[1] is skipped by a second jump $J_{NAV}$. NAV. Subsequently, reading of the base-view data blocks and jumps are repeated similarly in the second and subsequent extent blocks 1902 and 1903.

A jump $J_{LY}$ occurring between the second extent block 1902 and the third extent block 1903 is a long jump across the layer boundary LB. A "long jump" is a collective term for jumps with a long seek time and specifically refers to a jump distance that exceeds a predetermined threshold value. "Jump distance" refers to the length of the area on the BD-ROM disc 101 whose reading is skipped during a jump period. Jump distance is normally expressed as the number of sectors of the corresponding section. The threshold value used to define a long jump is specified, for example, as 40000 sectors in the BD-ROM standard. This threshold value, however, depends on the type of BD-ROM disc and on the BD-ROM drive's read processing capability. Long jumps particularly include focus jumps and track jumps. A "focus jump" is a jump caused by switching recording layers, and includes processing to change the focus distance of the optical pickup. A "track jump" includes processing to move the optical pickup in a radial direction along the BD-ROM disc 101.

FIG. 21 is a schematic diagram showing a playback path 2102 in L/R mode for the extent block group 1901-1903. The playback device 102 in L/R mode plays back the first file SS 244A. Accordingly, as indicated by the playback path 2102 in L/R mode, the extent blocks 1901-1903 are read in order as the extents SS EXTSS [0], EXTSS[1], and EXTSS[2]. Specifically, the data blocks D[0], B[0], D[1] and B[1] are first sequentially read from the top extent block 1901, then reading of the immediately subsequent data NAV is skipped by a first jump $J_{NAV}$. Next, the data blocks D[2], . . . , B[3] are sequentially read from the second extent block 1902. Immediately thereafter, a long jump $J_{LY}$ occurs at the same time as switching the recording layer, and next, the data blocks D[4], B[4], . . . are sequentially read from the third extent block 1903.

When reading the extent blocks 1901-1903 as extents of the first file SS 244A, the playback device 102 reads the top LBN of the extents SS EXTSS[0], EXTSS[1], . . . and the size thereof, from the file entry 1940 in the first file SS 244A and then outputs the LBNs and sizes to the BD-ROM drive 121. The BD-ROM drive 121 continuously reads data having the input size from the input LBN. In such processing, control of the BD-ROM drive 121 is easier than processing to read the data block groups as the extents in the first file DEP 242 and the file 2D 241 for the following reasons (A) and (B): (A) the playback device 102 may refer in order to extents using a file entry in one location, and (B) since the total number of extents to be read substantially halves, the total number of pairs of an LBN and a size that need to be output to the BD-ROM drive 121 halves. However, after the playback device 102 has read the extents SS EXTSS[0], EXTSS[1], . . . , it needs to separate each into a dependent-view data block and a base-view data block and output them to the decoder. The clip information file is used for this separation processing. Details are provided below.

As shown in FIG. 19, when actually reading the extent blocks 1901-1903, the BD-ROM drive 121 performs a zero sector transition $J_0$ in the time from the top of a data block to the top of the next data block. A "zero sector transition" is a movement of the optical pickup between two consecutive data blocks. During a period in which a zero sector transition is performed (hereinafter referred to as a "zero sector transition period"), the optical pickup temporarily suspends its read operation and waits. In this sense, the zero sector transition is considered "a jump in which the jump distance is equal to 0 sectors". The length of the zero sector transition period, that is, the zero sector transition time period, may include, in addition to the time for shifting the position of the optical pickup via revolution of the BD-ROM disc 101, overhead caused by error correction processing. "Overhead caused by error correction processing" refers to excess time caused by performing error correction processing twice using an ECC block when the boundary between ECC blocks does not match the boundary between two data blocks. A whole ECC block is necessary for error correction processing. Accordingly, when two consecutive data blocks share a single ECC block, the whole ECC block is read and used for error correction processing during reading of either data block. As a result, each time one of these data blocks is read, a maximum of 32 sectors of excess data is additionally read. The overhead caused by error correction processing is assessed as the total time for reading the excess data, i.e. 32 sectors×2048 bytes×8 bits/byte×2 instances/read rate. Note that by configuring each data block in ECC block units, the overhead caused by error correction processing may be removed from the zero sector transition time.

<<Clip Information File>>

Figure 22:
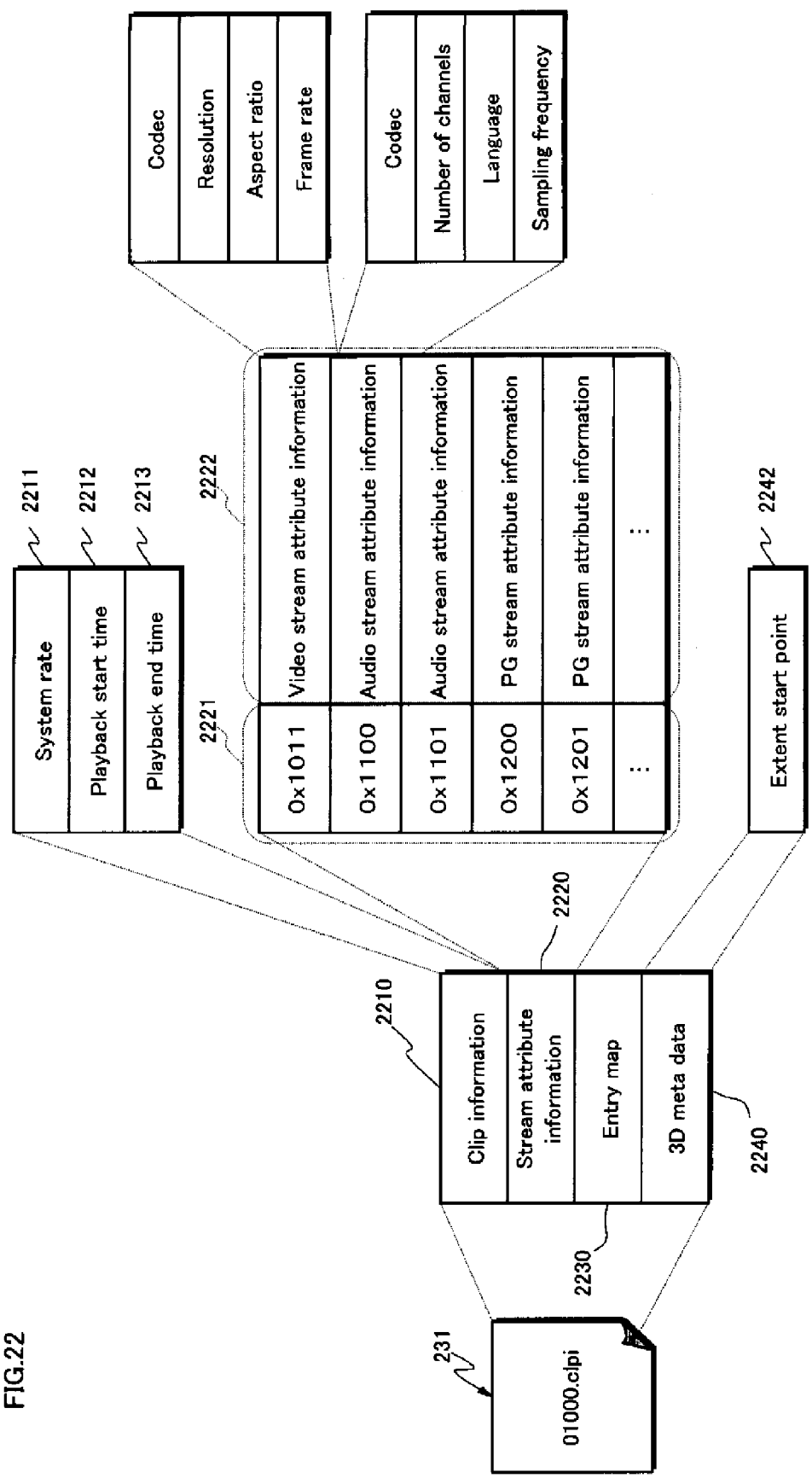
FIG. 22 is a schematic diagram showing a data structure of a first clip information file (01000.clpi) 231 shown in FIG. 2.

FIG. 22 is a schematic diagram showing a data structure of a first clip information file (01000.clpi), i.e. the 2D clip information file 231. The dependent-view clip information file (02000.clip) 232 and the clip information file (03000.clpi) 233 corresponding to the text subtitle stream have the same data structure. Below, the data structure common to all clip information files is described, first using the data structure of the 2D clip information file 231 as an example. Afterwards, the differences in data structure between a 2D clip information file and a dependent-view clip information file are described.

As shown in FIG. 22, the 2D clip information file 231 includes clip information 2210, stream attribute information 2220, an entry map 2230, and 3D meta data 2240. The 3D meta data 2240 includes extent start points 2242. The clip information 2210 includes a system rate 2211, a playback start time 2212, and a playback end time 2213. The system rate 2211 specifies a system rate for the file 2D (01000.m2ts) 241. The playback device 102 in 2D playback mode transfers TS packets belonging to the file 2D 241 from the read buffer to the system target decoder. The "system rate" refers to the upper limit of the transfer rate. The interval between the ATSs of the source packets in the file 2D 241 is set so that the transfer speed is limited to the system rate or lower. The playback start time 2212 indicates the PTS of the VAU located at the top of the file 2D 241, e.g. the PTS of the top video frame. The playback end time 2212 indicates the value of the STC delayed a predetermined time from the PTS of the VAU located at the end of the file 2D 241, e.g. the sum of the PTS of the last video frame and the playback time of one frame.

The stream attribute information 2220 is a correspondence table between the PID 2221 for each elementary stream included in the file 2D 241 and pieces of attribute information 2222. Each piece of attribute information 2222 is different for a video stream, audio stream, PG stream, text subtitle stream, and IG stream. For example, the attribute information corresponding to the PID 0x1011 for the primary video stream includes a codec type used for the compression of the video stream, as well as a resolution, aspect ratio, and frame rate for each picture constituting the video stream. On the other hand, the attribute information corresponding to the PID 0x1100 for the primary audio stream includes a codec type used for compressing the audio stream, a number of channels included in the audio stream, language, and sampling frequency. The playback device 102 uses this attribute information 2222 to initialize the decoder.

[Entry Map]

FIG. 23A is a schematic diagram showing a data structure of an entry map 2230. As shown in FIG. 23A, the entry map 2230 includes tables 2300. There is the same number of tables 2300 as there are video streams multiplexed in the main TS, and tables are assigned one-by-one to each video stream. In FIG. 23A, each table 2300 is distinguished by the PID of the video stream to which it is assigned. Each table 2300 includes an entry map header 2301 and an entry point 2302. The entry map header 2301 includes the PID corresponding to the table 2300 and the total number of entry points 2302 included in the table 2300. An entry point 2302 associates each pair of a PTS 2303 and source packet number (SPN) 2304 with one of individually differing entry points ID (EP_ID) 2305. The PTS 2303 is equivalent to the PTS for one of the I pictures included in the video stream for the PID indicated by the entry map header 2301. The SPN 2304 is equivalent to the SPN for the top of the source packet group stored in the corresponding I picture. An "SPN" refers to the serial number assigned consecutively from the top to a source packet group belonging to one AV stream file. The SPN is used as the address for each source packet in the AV stream file. In the entry map 2230 in the 2D clip information file 231, the SPN refers to the number assigned to the source packet group belonging to the file 2D 241, i.e. the source packet group constituting the main TS. Accordingly, the entry point 2302 expresses the correspondence between the PTS and the address, i.e. the SPN, of each I picture included in the file 2D 241.

An entry point 2302 does not need to be set for all of the I pictures in the file 2D 241. However, when an I picture is located at the top of a GOP, and the TS packet that includes the top of that I picture is located at the top of a 2D extent, an entry point 2302 has to be set for that I picture.

FIG. 23B is a schematic diagram showing source packets in a source packet group 2310 belonging to a file 2D 241 that are associated with each EP_ID 2305 by the entry map 2230. FIG. 23C is a schematic diagram showing a data block group D[n], B[n] (n=0, 1, 2, 3, . . . ) on a BD-ROM disc 101 corresponding to the source packet group 2310. When the playback device 102 plays back 2D video images from the file 2D 241, it refers to the entry map 2230 to specify the SPN for the source packet that includes a frame representing an arbitrary scene from the PTS for that frame. Specifically, when for example a PTS=360000 is indicated as the PTS for a specific entry point for the playback start position, the playback device 102 first retrieves the SPN=3200 allocated to this PTS in the entry map 2230. Next, the playback device 102 seeks the quotient SPN×192/2048, i.e. the value of the SPN multiplied by 192 bytes, the data amount per source packet, and divided by 2048 bytes, the data amount per sector. As can be understood from FIGS. 5B and 5C, this value is the same as the total number of sectors recorded in the main TS prior to the source packet to which the SPN is assigned. In the example shown in FIG. 23B, this value is 3200×192/2048=300, and is equal to the total number of sectors on which source packet groups 2311 are recorded from SPN 0 through 3199. Next, the playback device 102 refers to the file entry in the file 2D 241 and specifies the LBN of the (total number+1)$^{th}$ sector, counting from the top of the sector groups in which 2D extent groups are recorded. In the example shown in FIG. 23C, within the sector groups in which the base-view data blocks B[0], B[1], B[2], . . . which can be accessed as 2D extents EXT2D[0], EXT2D[1], EXT2D[2], . . . are recorded, the LBN of the 301$^{st}$ sector counting from the top is specified. The playback device 102 indicates this LBN to the BD-ROM drive 121. In this way, base-view data block groups are read as aligned units in order from the sector for this LBN. Furthermore, from the first aligned unit that is read in, the playback device 102 selects the source packet indicated by the entry point for the playback start position and then extracts and decodes an I picture. From then on, subsequent pictures are decoded in order referring to already decoded pictures. In this way, the playback device 102 can play back 2D video images from the file 2D 241 from a specified PTS onwards.

Furthermore, the entry map 2230 is useful for efficient processing during trickplay such as fast forward, reverse, etc. For example, the playback device 102 in 2D playback mode first refers to the entry map 2230 to read SPNs starting at the playback start position, e.g. to read SPN=3200, 4800, . . . in order from the entry points EP_ID=2, 3, . . . that include PTSs starting at PTS=360000. Next, the playback device 102 refers to the file entry in the file 2D 241 to specify the LBN of the sectors corresponding to each SPN. The playback device 102 then indicates each LBN to the BD-ROM drive 121. Aligned units are thus read from the sector for each LBN. Furthermore, from each aligned unit, the playback device 102 selects the source packet indicated by each entry point and then extracts and decodes an I picture. The playback device 102 can thus selectively play back an I picture from the file 2D 241 without analyzing the 2D extent group EXT2D[n] itself.

[Extent Start Point]

Figure 24B:
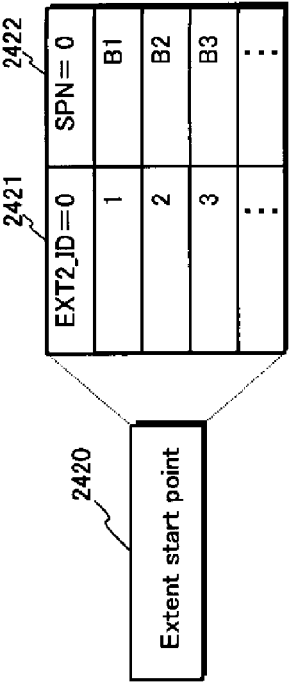
FIG. 24B is a schematic diagram showing a data structure of extent start points 2420 included in a second clip information file (02000.clpi) 232.
Figure 24D:
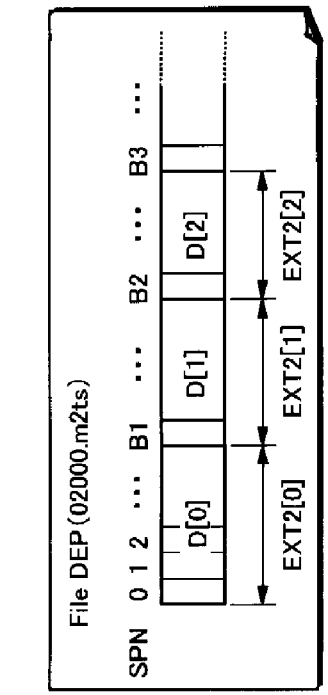
FIG. 24D is a schematic diagram representing a correspondence between dependent-view extents EXT2[0], EXT2[1], . . . belonging to a file DEP (02000.m2ts) 242 and SPNs 2422 shown by the extent start points 2420.
Figure 24A:
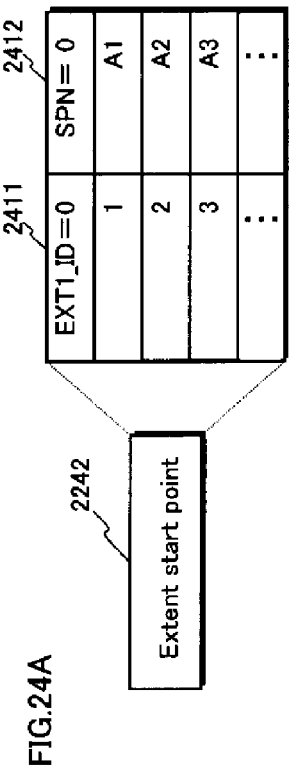
FIG. 24A is a schematic diagram showing a data structure of extent start points 2242 shown in FIG. 22.

FIG. 24A is a schematic diagram showing a data structure of extent start points 2242. As shown in FIG. 24A, an "extent start point" 2242 includes base-view extent IDs (EXT1_ID) 2411 and SPNs 2412. The EXT1_IDs 2411 are serial numbers assigned consecutively from the top to the base-view data blocks belonging to the first file SS (01000.ssif) 244A. One SPN 2412 is assigned to each EXT1_ID 2411 and is the same as the SPN for the source packet located at the top of the base-view data block identified by the EXT1_ID 2411. This SPN is a serial number assigned from the top to the source packets included in the base-view data block group belonging to the first file SS 244A.

In the extent blocks 1901-1903 shown in FIG. 19, the file 2D 241 and the first file SS 244A share the base-view data blocks B[0], B[1], B[2], . . . in common. However, data block groups placed at locations requiring a long jump, such as at boundaries between recording layers, generally include base-view data blocks belonging to only one of the file 2D 241 or the first file SS 244A (see <<Supplementary Explanation>> for details). Accordingly, the SPN 2412 that indicates the extent start point 2242 generally differs from the SPN for the source packet located at the top of the 2D extent belonging to the file 2D 241.

FIG. 24B is a schematic diagram showing a data structure of extent start points 2420 included in a second clip information file (02000.clpi), i.e. the dependent-view clip information file 232. As shown in FIG. 24B, the extent start point 2420 includes dependent-view extent IDs (EXT2_ID) 2421 and SPNs 2422. The EXT2_IDs 2421 are serial numbers assigned from the top to the dependent-view data blocks belonging to the first file SS 244A. One SPN 2422 is assigned to each EXT2_ID 2421 and is the same as the SPN for the source packet located at the top of the dependent-view data block identified by the EXT2_ID 2421. This SPN is a serial number assigned in order from the top to the source packets included in the dependent-view data block group belonging to the first file SS 244A.

FIG. 24D is a schematic diagram representing correspondence between dependent-view extents EXT2[0], EXT2[1], . . . belonging to the file DEP (02000.m2ts) 242 and the SPNs 2422 shown by the extent start points 2420. As shown in FIG. 19, the file DEP 242 and the first file SS 244A share dependent-view data blocks in common. Accordingly, as shown in FIG. 24D, each SPN 2422 shown by the extent start points 2420 is the same as the SPN for the source packet located at the top of each dependent-view extent EXT2[0], EXT2[1], As described below, the extent start point 2242 in the 2D clip information file 231 and the extent start point 2420 in the dependent-view clip information file 232 are used to detect the boundary of data blocks included in each extent SS during playback of 3D video images from the first file SS 244A.

Figure 24C:
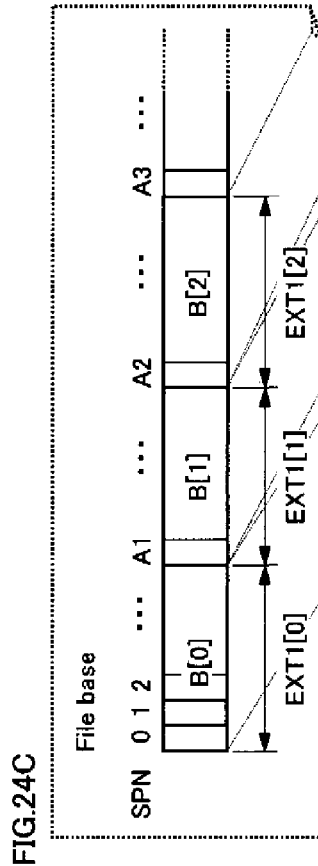
FIG. 24C is a schematic diagram representing base-view data blocks B[0], B[1], B[2], . . . extracted from a first file SS 244A by a playback device 102 in 3D playback mode.
Figure 24E:
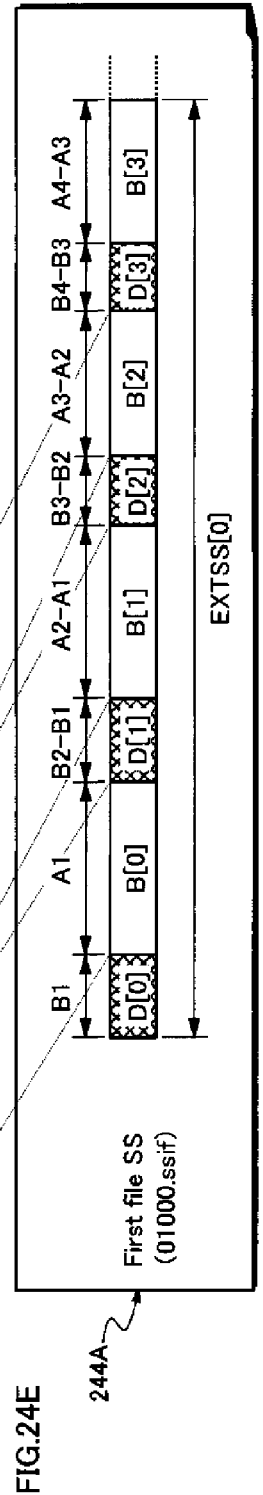
FIG. 24E is a schematic diagram showing an example of a correspondence between an extent SS EXTSS[0] belonging to the first file SS 244A and an extent block on a BD-ROM disc 101.
Figure 25:
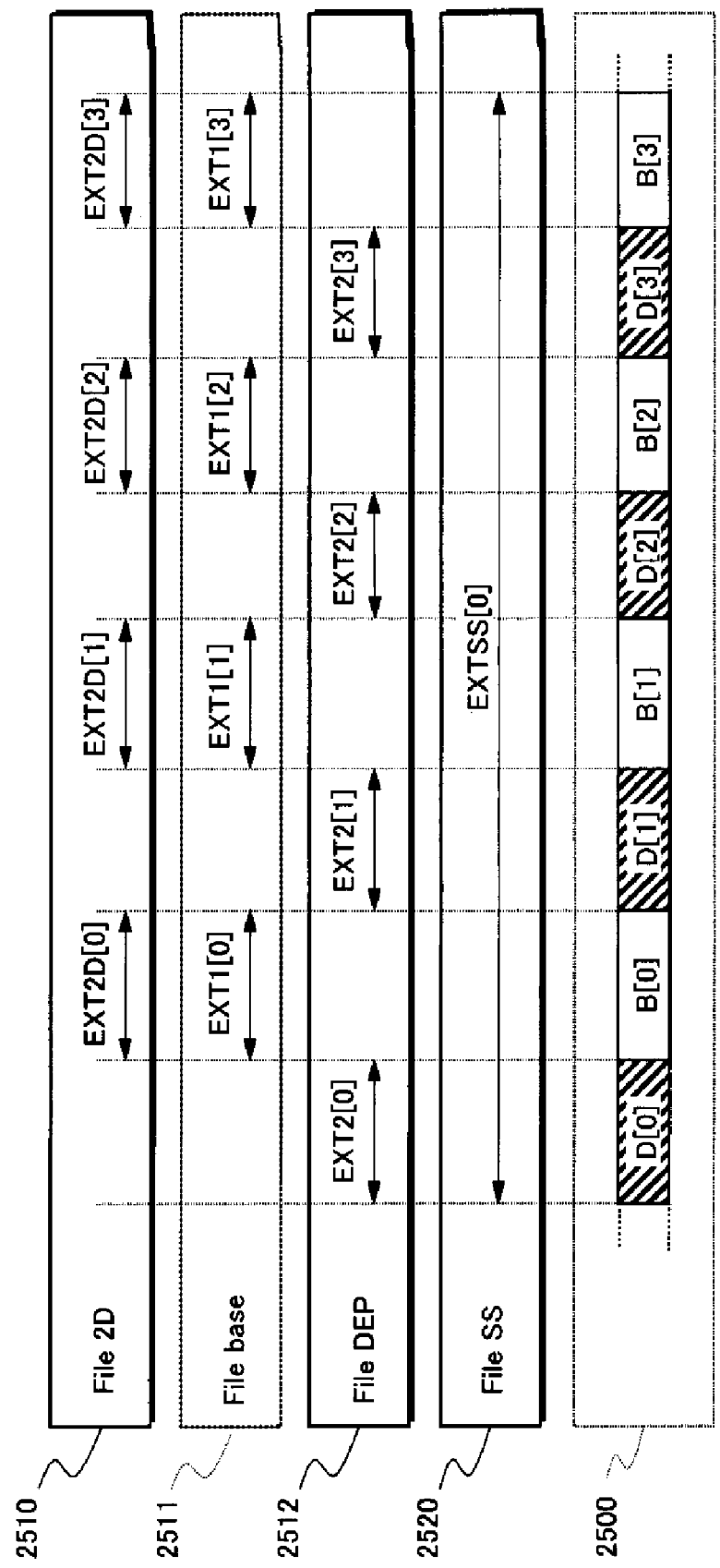
FIG. 25 is a schematic diagram showing a correspondence between an extent block 2500 and each extent group in a file 2D 2510, file base 2511, file DEP 2512, and file SS 2520 recorded on the BD-ROM disc 101 shown in FIG. 2.

FIG. 24E is a schematic diagram showing an example of correspondence between an extent SS EXTSS[0] belonging to the first file SS 244A and an extent block on the BD-ROM disc 101. As shown in FIG. 24E, the extent block includes data block groups D[n] and B[n] (n=0, 1, 2, . . . ) in an interleaved arrangement. Note that the following description is also true for other arrangements. The extent block can be accessed as a single extent SS EXTSS[0]. Furthermore, in the extent SS EXTSS[0], the number of source packets included in the $n^{th}$ base-view data block B[n] is, at the extent start point 2242, the same as the difference A(n+1)−An between SPNs corresponding to EXT1_ID=n+1 and n. In this case, A0=0. On the other hand, the number of source packets included in the dependent-view data block D[n+1] is, in the extent start point 2420, the same as the difference B(n+1)−Bn between SPNs corresponding to EXT2_ID=n+1 and n. In this case, B0=0.

When the playback device 102 in 3D playback mode plays back 3D video images from the first file SS 244A, the playback device 102 refers to the entry maps and the extent start points 2242 and 2420 respectively found in the clip information files 231 and 232. By doing this, the playback device 102 specifies, from the PTS for a frame representing the right view of an arbitrary scene, the LBN for the sector on which a dependent-view data block that includes the frame is recorded. Specifically, the playback device 102 for example first retrieves the SPN associated with the PTS from the entry map in the dependent-view clip information file 232. It is assumed that the source packet indicated by the SPN is included in the third dependent-view extent EXT2[2] in the first file DEP 242, i.e. the dependent-view data block D[2]. Next, the playback device 102 retrieves "B2", the largest SPN before the target SPN, from among the SPNs 2422 shown by the extent start points 2420 in the dependent-view clip information file 232. The playback device 102 also retrieves the corresponding EXT2_ID "2". Then the playback device 102 retrieves the value "A2" for the SPN 2412 corresponding to the EXT1_ID, which is the same as the EXT2_ID "2", from the extent start points 2242 in the 2D clip information file 231. The playback device 102 further seeks the sum B2+A2 of the retrieved SPNs. As can be seen from FIG. 24E, this sum B2+A2 is the same as the total number of source packets included in the data blocks located before the third dependent-view data block D[2] among the data blocks included in the extent SS EXTSS[0]. Accordingly, this sum B2+A2 multiplied by 192 bytes, the data amount per source packet, and divided by 2048 bytes, the data amount per sector, i.e. (B2+A2)×192/2048, is the same as the number of sectors from the top of the extent SS EXTSS[0] until immediately before the third dependent-view data block D[2]. Using this quotient, the LBN for the sector on which the top of the dependent-view data block D[2] is recorded can be specified by referencing the file entry for the first file SS 244A.

After specifying the LBN via the above-described procedure, the playback device 102 indicates the LBN to the BD-ROM drive 121. In this way, the portion of the extent SS EXTSS[0] recorded starting with the sector for this LBN, i.e. the data block group D[2], B[2], D[3], B[3], . . . starting from the third dependent-view data block D[2], is read as aligned units.

The playback device 102 further refers to the extent start points 2242 and 2420 to extract dependent-view data blocks and base-view data blocks alternately from the read extents SS. For example, assume that the data block group D[n], B[n] (n=0, 1, 2, . . . ) is read in order from the extent SS EXTSS[0] shown in FIG. 24E.

The playback device 102 first extracts B1 source packets from the top of the extent SS EXTSS[0] as the dependent-view data block D[0]. Next, the playback device 102 extracts the $B1^{th}$ source packet and the subsequent (A1−1) source packets, a total of A1 source packets, as the first base-view data block B[0]. The playback device 102 then extracts the $(B1+A1)^{th}$ source packet and the subsequent (B2−B1−1) source packets, a total of (B2−B1) source packets, as the second dependent-view data block D[1]. The playback device 102 further extracts the $(A1+B2)^{th}$ source packet and the subsequent (A2−A1−1) source packets, a total of (A2−A1) source packets, as the second base-view data block B[1]. Thereafter, the playback device 102 thus continues to detect the boundary between data blocks in the extent SS based on the number of read source packets, thereby alternately extracting dependent-view and base-view data blocks. The extracted base-view and dependent-view data blocks are transmitted to the system target decoder to be decoded in parallel.

In this way, the playback device 102 in 3D playback mode can play back 3D video images from the first file SS 244A starting at a specific PTS. As a result, the playback device 102 can in fact benefit from the above-described advantages (A) and (B) regarding control of the BD-ROM drive 121.

<<File Base>>

FIG. 24C is a schematic diagram representing the base-view data blocks B[0], B[1], B[2], . . . extracted from the first file SS 244A by the playback device 102 in 3D playback mode. As shown in FIG. 24C, when allocating SPNs in order from the top to a source packet group included in the base-view data block B[n] (n=0, 1, 2, . . . ), the SPN of the source packet located at the top of the data block B[n] is equal to the SPN 2412 indicating the extent start point 2242. The base-view data block group extracted from a single file SS by referring to extent start points, like the base-view data block group B[n], is referred to as a "file base". Furthermore, the base-view data blocks included in a file base are referred to as "base-view extents". As shown in FIG. 24E, each base-view extent EXT1[0], EXT1[1] . . . is referred to by an extent start point 2242 or 2420 in a clip information file.

A base-view extent EXT 1 [n] shares the same base-view data block B[n] with a 2D extent EXT2D[n]. Accordingly, the file base includes the same main TS as the file 2D. Unlike the 2D extent EXT2D[n], however, the base-view extent EXT 1 [n] is not referred to by any file entry. As described above, the base-view extent EXT1[n] is extracted from the extent SS EXTSS [·] in the file SS with use of the extent start point in the clip information file. The file base thus differs from a conventional file by not including a file entry and by needing an extent start point as a reference for a base-view extent. In this sense, the file base is a "virtual file". In particular, the file base is not recognized by the file system and does not appear in the directory/file structure shown in FIG. 2.

FIG. 23 is a schematic diagram showing correspondence between a single extent block 2300 recorded on the BD-ROM disc 101 and each of the extent block groups in a file 2D 2310, file base 2311, file DEP 2312, and file SS 2320. As shown in FIG. 23, the extent block 2300 includes the dependent-view data blocks D[n] and the base-view data blocks B[n] (n= . . . , 0, 1, 2, 3, . . . ). The base-view data block B[n] belongs to the file 2D 2310 as the 2D extent EXT2D[n]. The dependent-view data block D[n] belongs to the file DEP 2312 as the dependent-view extent EXT2[n]. The entirety of the extent block 2300 belongs to the file SS 2320 as one extent SS EXTSS[0]. Accordingly, the extent SS EXTSS[0] shares the base-view data block B[n] in common with the 2D extent EXT2D[n] and shares the dependent-view data block D[n] with the dependent-view extent EXT2[n]. After being read into the playback device 102, the extent SS EXTSS[0] is separated into the dependent-view data block D[n] and the base-view data block B[n]. These base-view data blocks B[n] belong to the file base 2311 as the base-view extents EXT1 [n]. The boundary in the extent SS EXTSS [0] between the base-view extent EXT1 [n] and the dependent-view extent EXT2[n] is specified with use of the extent start point in the clip information file corresponding to each of the file 2D 2310 and the file DEP 2312.

<<Dependent-View Clip Information File>>

The dependent-view clip information file has the same data structure as the 2D clip information file shown in FIGS. 22-24. Accordingly, the following description covers the differences between the dependent-view clip information file and the 2D clip information file. Details on the similarities can be found in the above description.

A dependent-view clip information file differs from a 2D clip information file mainly in the following two points: (i) conditions are placed on the stream attribute information, and (ii) conditions are placed on the entry points.

(i) When the base-view video stream and the dependent-view video stream are to be used for playback of 3D video images by the playback device 102 in L/R mode, as shown in FIG. 7, the dependent-view video stream is compressed using the base-view video stream. At this point, the video stream attributes of the dependent-view video stream become equivalent to the base-view video stream. The video stream attribute information for the base-view video stream is associated with PID=0x1011 in the stream attribute information 2220 in the 2D clip information file. On the other hand, the video stream attribute information for the dependent-view video stream is associated with PID=0x1012 or 0x1013 in the stream attribute information in the dependent-view clip information file. Accordingly, the items shown in FIG. 22, i.e. the codec, resolution, aspect ratio, and frame rate, have to match between these two pieces of video stream attribute information. If the codec type matches, then a reference relationship between pictures in the base-view video stream and the dependent-view video stream is established during coding, and thus each picture can be decoded. If the resolution, aspect ratio, and frame rate all match, then on-screen display of the left and right videos can be synchronized. Therefore, these videos can be shown as 3D video images without making the viewer feel uncomfortable.

(ii) The entry map in the dependent-view clip information file includes a table allocated to the dependent-view video stream. Like the table 2300 shown in FIG. 23A, this table includes an entry map header and entry points. The entry map header indicates the PID for the dependent-view video stream allocated to the table, i.e. either 0x1012 or 0x1013. In each entry point, a pair of a PTS and an SPN is associated with a single EP_ID. The PTS for each entry point is the same as the PTS for the top picture in one of the GOPs included in the dependent-view video stream. The SPN for each entry point is the same as the top SPN of the source packet group stored in the picture indicated by the PTS belonging to the same entry point. This SPN refers to a serial number assigned consecutively from the top to the source packet group belonging to the file DEP, i.e. the source packet group constituting the sub-TS. The PTS for each entry point has to match the PTS, within the entry map in the 2D clip information file, for the entry point in the table allotted to the base-view video stream. In other words, whenever an entry point is set to the top of a source packet group that includes one of a set of pictures included in the same 3D VAU, an entry point always has to be set to the top of the source packet group that includes the other picture.

Figure 26:
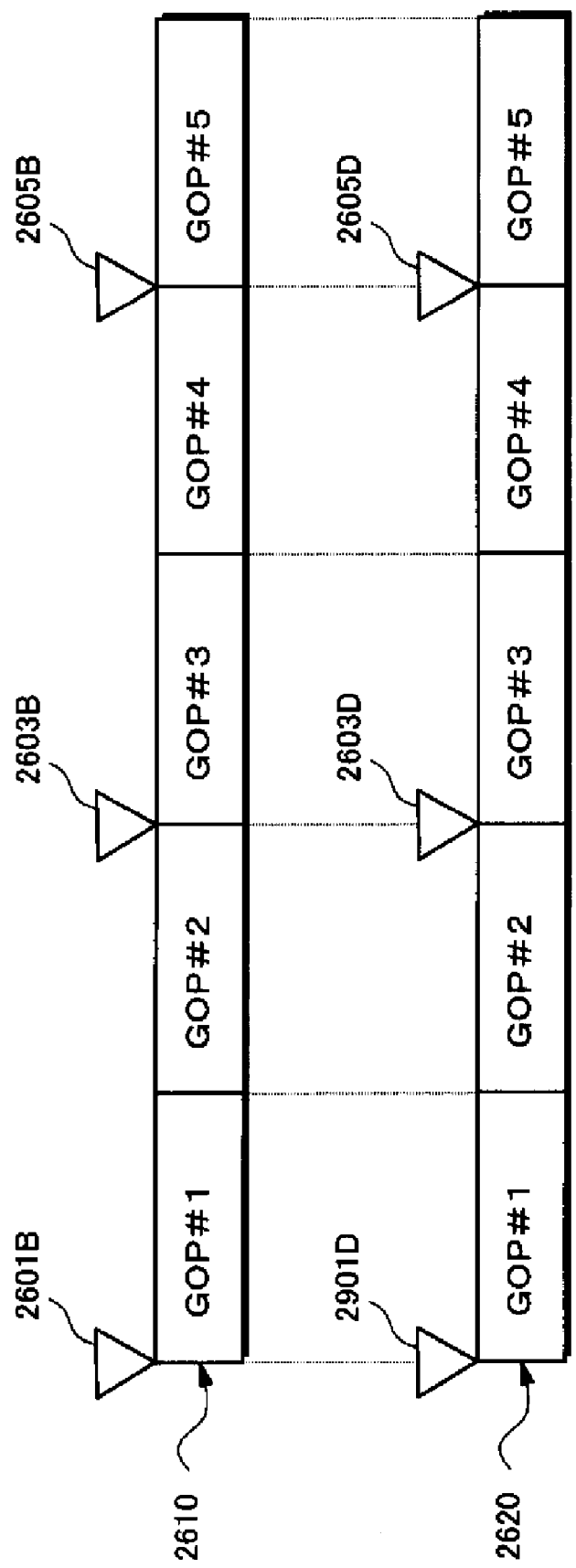
FIG. 26 is a schematic diagram showing an example of entry points set in a base-view video stream 2610 and a dependent-view video stream 2620.

FIG. 26 is a schematic diagram showing an example of entry points set in a base-view video stream 2610 and a dependent-view video stream 2620. In the two video streams 2610 and 2620, GOPs that are the same number from the top represent video for the same playback period. As shown in FIG. 26, in the base-view video stream 2610, entry points 2601B, 2603B, and 2605B are set to the top of the odd-numbered GOPs as counted from the top, i.e. GOP #1, GOP #3, and GOP #5. Accordingly, in the dependent-view video stream 2620 as well, entry points 2601D, 2603D, and 2605D are set to the top of the odd-numbered GOPs as counted from the top, i.e. GOP #1, GOP #3, and GOP #5. In this case, when the playback device 102 begins playback of 3D video images from GOP #3, for example, it can immediately calculate the address of the playback start position in the file SS from the SPN of the corresponding entry points 2603B and 2603D. In particular, when both entry points 2603B and 2603D are set to the top of a data block, then as can be understood from FIG. 24E, the sum of the SPNs of the entry points 2603B and 2603D equals the SPN of the playback start position within the file SS. As described with reference to FIG. 24E, from this number of source packets, it is possible to calculate the LBN of the sector on which the part of the file SS for the playback start position is recorded. In this way, even during playback of 3D video images, it is possible to improve response speed for processing that requires random access to the video stream, such as interrupt playback or the like.

<<2D Playlist File>>

Figure 27:
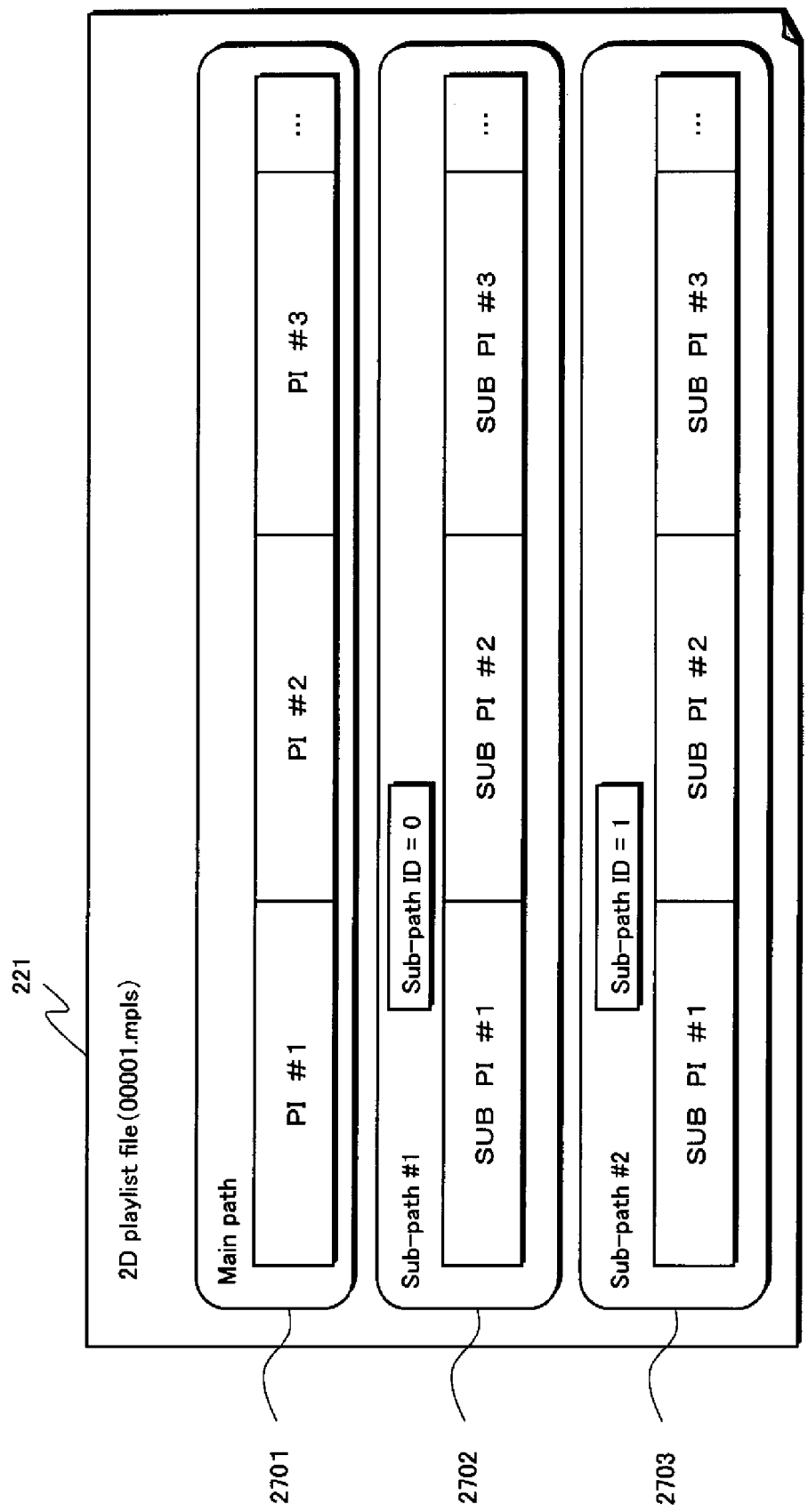
FIG. 27 is a schematic diagram showing a data structure of a 2D playlist file 221 shown in FIG. 2.

FIG. 27 is a schematic diagram showing a data structure of a 2D playlist file. The first playlist file (00001.mpls) 221 shown in FIG. 2 has this data structure. As shown in FIG. 27, the 2D playlist file 221 includes a main path 2701 and two sub-paths 2702 and 2703.

The main path 2701 is a sequence of playitem information pieces (PI) that defines the main playback path for the file 2D 241, i.e. the section for playback and the section's playback order. Each PI is identified with a unique playitem ID=#N (N=1, 2, 3, . . . ). Each PI #N defines a different playback section along the main playback path with a pair of PTSs. One of the PTSs in the pair represents the start time (In-Time) of the playback section, and the other represents the end time (Out-Time). Furthermore, the order of the PIs in the main path 2701 represents the order of corresponding playback sections in the playback path.

Each of the sub-paths 2702 and 2703 is a sequence of sub-playitem information pieces (SUB_PI) that defines a playback path that can be associated in parallel with the main playback path for the file 2D 241. Such a playback path is a different section of the file 2D 241 than is represented by the main path 2701, or is a section of stream data multiplexed in another file 2D, along with the corresponding playback order.

The playback path may also indicate stream data multiplexed in a different file 2D than the file 2D 241 as a section for playback, along with the corresponding playback order. The stream data indicated by the playback path represents other 2D video images to be played back simultaneously with 2D video images played back from the file 2D 241 in accordance with the main path 2701. These other 2D video images include, for example, sub-video in a picture-in-picture format, a browser window, a pop-up menu, or subtitles. In particular, the playback path for a text subtitle file is defined by a sub-path. Serial numbers "0" and "1" are assigned to the sub-paths 2702 and 2703 in the order of registration in the 2D playlist file 221. These serial numbers are used as sub-path IDs to identify the sub-paths 2702 and 2703. In the sub-paths 2702 and 2703, each SUB_PI is identified by a unique sub-playitem ID=#M (M=1, 2, 3, ... ). Each SUB_PI #M defines a different playback section along the playback path with a pair of PTSs. One of the PTSs in the pair represents the playback start time of the playback section, and the other represents the playback end time. Furthermore, the order of the SUB_PIs in the sub-paths 2702 and 2703 represents the order of corresponding playback sections in the playback path.

Figure 28:
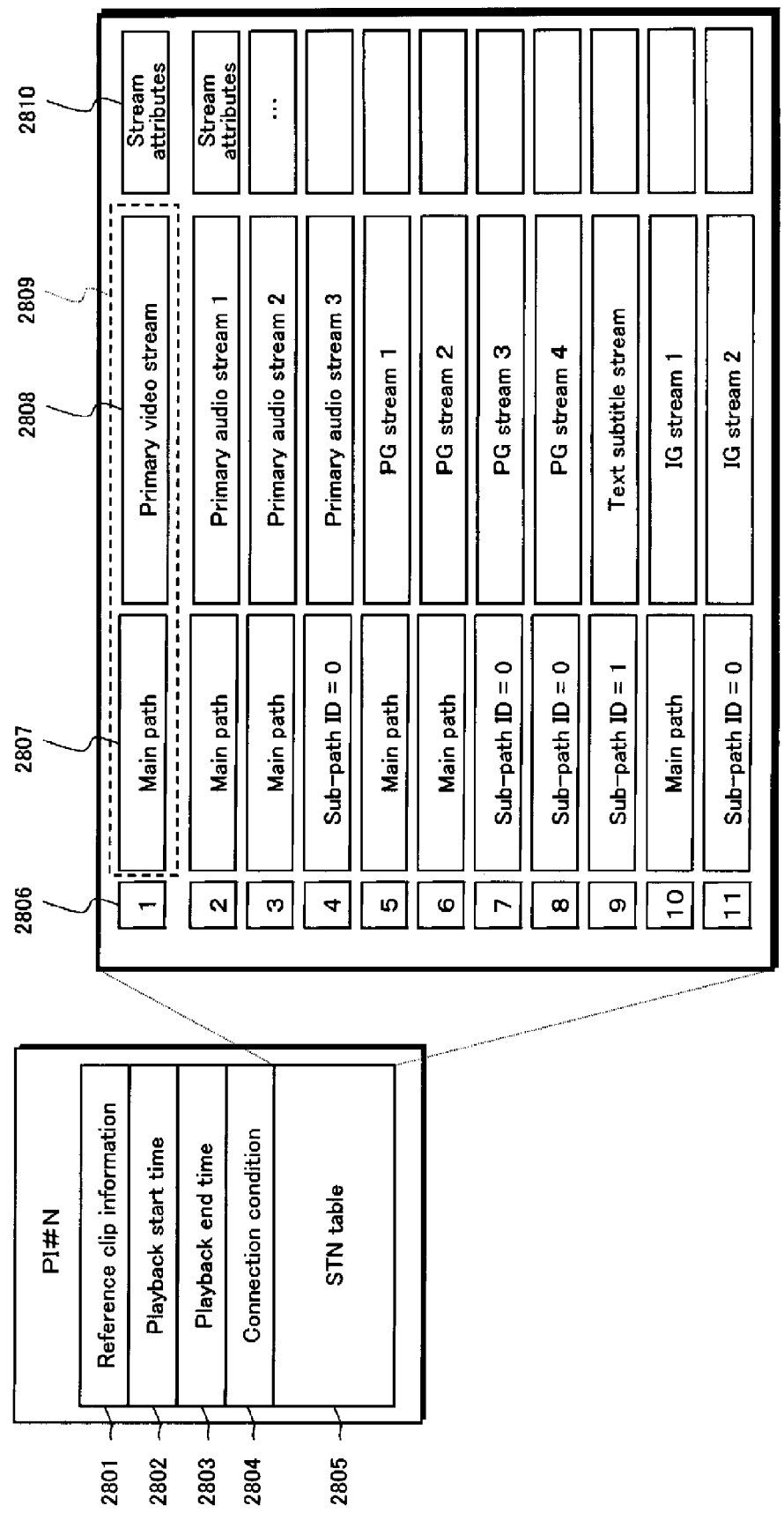
FIG. 28 is a schematic diagram showing a data structure of PI #N (N=1, 2, 3) shown in FIG. 27.

FIG. 28 is a schematic diagram showing a data structure of PI #N. As shown in FIG. 28, a PI #N includes a piece of reference clip information 2801, playback start time (In_Time) 2802, playback end time (Out_Time) 2803, connection condition 2804, and stream selection table (hereinafter referred to as "STN table" (stream number table)) 2805. The reference clip information 2801 is information for identifying the 2D clip information file 231. The playback start time 2802 and playback end time 2803 respectively indicate PTSs for the beginning and the end of the section for playback of the file 2D 241. The connection condition 2804 specifies a condition for connecting video in the playback section specified by a playback start time 2802 and a playback end time 2803 to video in the playback section specified by the previous PI #(N−1). The STN table 2805 is a list of elementary streams that can be selected from the file 2D 241 by the decoder in the playback device 102 from the playback start time 2802 until the playback end time 2803.

The data structure of a SUB_PI is the same as the data structure of the PI shown in FIG. 28 insofar as it includes reference clip information, a playback start time, and a playback end time. In particular, the playback start time and playback end time of a SUB_PI are expressed as values along the same time axis as a PI. The SUB_PI further includes an "SP connection condition" field. The SP connection condition has the same meaning as a PI connection condition.

[Connection Condition]

The connection condition (hereinafter abbreviated as "CC") 2804 can for example be assigned three types of values, "1", "5", and "6". When the CC 2804 is "1", the video to be played back from the section of the file 2D 241 specified by the PI #N does not need to be seamlessly connected to the video played back from the section of the file 2D 241 specified by the immediately preceding PI #(N−1). On the other hand, when the CC 2804 indicates "5" or "6", both video images need to be seamlessly connected.

FIGS. 29A and 29B are schematic diagrams showing correspondence between two playback sections 2901 and 2902 that are to be connected when CC 2904 is "5" or "6". In this case, the PI #(N−1) specifies a first section 2901 in the file 2D 241, and the PI #N specifies a second section 2902 in the file 2D 241. As shown in FIG. 29A, when the CC 2904 indicates "5", the STCs of the two PIs, PI #(N−1) and PI #N, may be nonconsecutive. That is, the PTS #1 at the end of the first section 2901 and the PTS #2 at the top of the second section 2902 may be nonconsecutive. Several constraint conditions, however, need to be satisfied. For example, the first section 2901 and second section 2902 need to be created so that the decoder can smoothly continue to decode data even when the second section 2902 is supplied to the decoder consecutively after the first section 2901. Furthermore, the last frame of the audio stream contained in the first section 2901 needs to overlap the top frame of the audio stream contained in the second section 2902. On the other hand, as shown in FIG. 29B, when the CC 2904 indicates "6", the first section 2901 and the second section 2902 need to be able to be handled as successive sections for the decoder to duly decode. That is, STCs and ATCs need to be contiguous between the first section 2901 and the second section 2902. Similarly, when the SP connection condition is "5" or "6", STCs and ATCs both need to be contiguous between sections of the file 2D specified by two contiguous SUB_PIs.

[STN Table]

Referring again to FIG. 28, the STN table 2805 is an array of stream registration information. "Stream registration information" is information individually listing the elementary streams that can be selected for playback from the main TS between the playback start time 2802 and playback end time 2803. The stream number (STN) 2806 is a serial number allocated individually to stream registration information and is used by the playback device 102 to identify each elementary stream. The STN 2806 further indicates priority for selection among elementary streams of the same type. The stream registration information includes a stream entry 2809 and stream attribute information 2810. The stream entry 2809 includes stream path information 2807 and stream identification information 2808. The stream path information 2807 is information indicating the file 2D to which the selected elementary stream belongs. For example, if the stream path information 2807 indicates "main path", the file 2D corresponds to the 2D clip information file indicated by reference clip information 2801. On the other hand, if the stream path information 2807 indicates "sub-path ID=1", the file 2D to which the selected elementary stream belongs corresponds to the 2D clip information file indicated by the reference clip information of the SUB_PI included in the sub-path with a sub-path ID=1. The playback start time and playback end time specified by this SUB_PI are both included in the interval from the playback start time 2802 until the playback end time 2803 specified by the PI included in the STN table 2805. The stream identification information 2808 indicates the PID for the elementary stream multiplexed in the file 2D specified by the stream path information 2807. The elementary stream indicated by this PID can be selected from the playback start time 2802 until the playback end time 2803. The stream attribute information 2810 indicates attribute information for each elementary stream. For example, the attribute information for each of an audio stream, PG stream, text subtitle stream, and IG stream indicates a language type of the stream. The attribute information of a text subtitle stream also defines the font set that can be used to render the text character string.

[Playback of 2D Video Images in Accordance with a 2D Playlist File]

Figure 30:
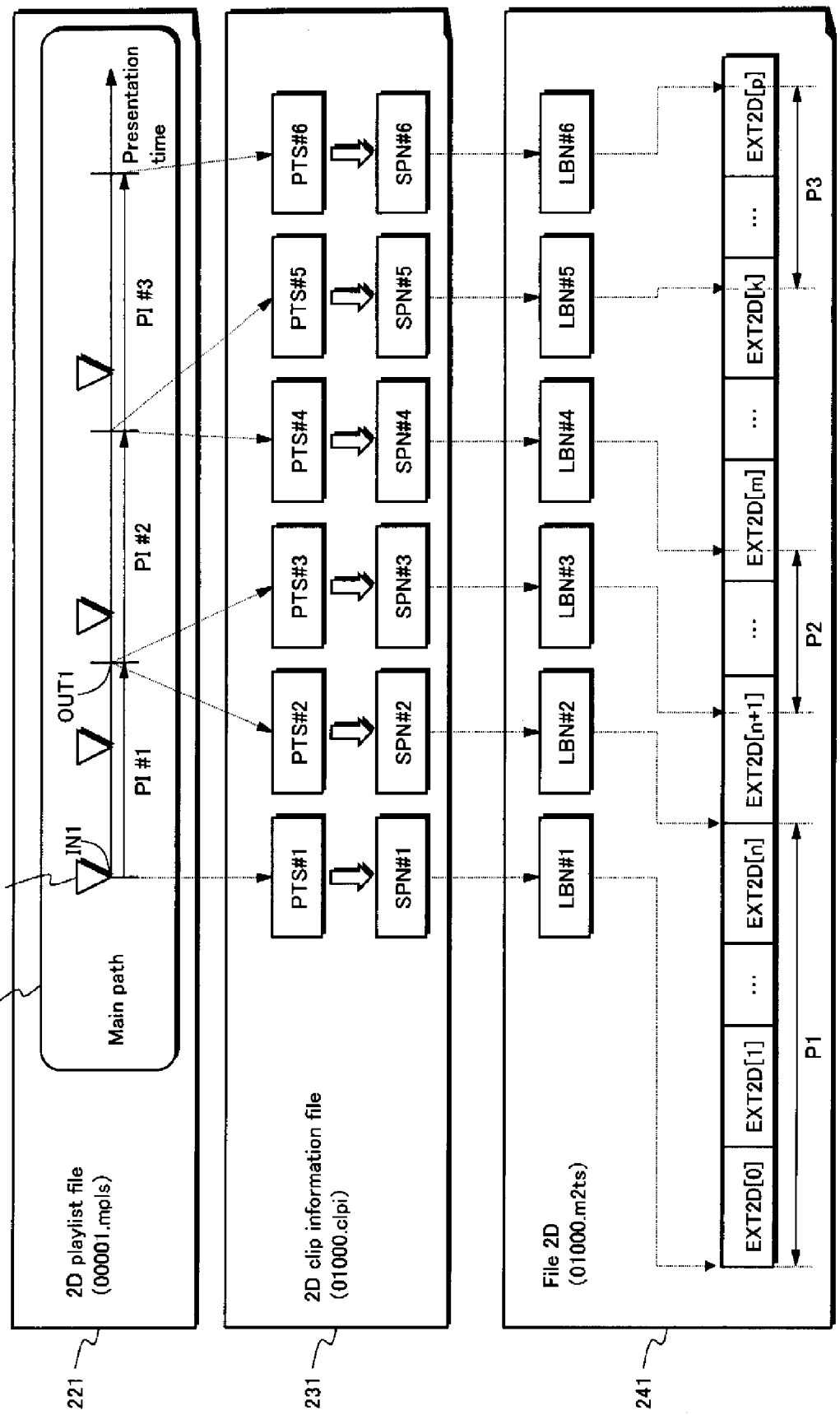
FIG. 30 is a schematic diagram showing a correspondence between PTSs indicated by a 2D playlist file (00001.mpls) 221 shown in FIG. 2 and sections played back from a file 2D (01000.m2ts) 241 shown in FIG. 2.

FIG. 30 is a schematic diagram showing correspondence between the PTSs indicated by the 2D playlist file (00001.mpls) 221 and the sections played back from the file 2D (01000.m2ts) 241. As shown in FIG. 30, in the main path 2701 in the 2D playlist file 221, the PI #1 specifies a PTS #1, which indicates a playback start time IN1, and a PTS #2, which indicates a playback end time OUT1. The reference clip information for the PI #1 indicates the 2D clip information file (01000.clpi) 231. When playing back 2D video images in accordance with the 2D playlist file 221, the playback device 102 first reads the PTS #1 and PTS #2 from the PI #1. Next, the playback device 102 refers to the entry map in the 2D clip information file 231 to retrieve from the file 2D 241 the SPN #1 and SPN #2 that correspond to the PTS #1 and PTS #2. The playback device 102 then calculates the corresponding numbers of sectors from the SPN #1 and SPN #2. Furthermore, the playback device 102 refers to these numbers of sectors and the file entry for the file 2D 241 to specify the LBN #1 and LBN #2 at the beginning and end, respectively, of the sector group P1 on which the 2D extent group EXT2D[0], . . . , EXT2D[n] to be played back is recorded. Calculation of the numbers of sectors and specification of the LBNs are as per the description of FIGS. 23B and 23C. Finally, the playback device 102 indicates the range from LBN #1 to LBN #2 to the BD-ROM drive 121. The source packet group belonging to the 2D extent group EXT2D[0], . . . , EXT2D[n] is thus read from the sector group P1 in this range. Similarly, the pair PTS #3 and PTS #4 indicated by the PI #2 are first converted into a pair of SPN #3 and SPN #4 by referring to the entry map in the 2D clip information file 231. Then, referring to the file entry for the file 2D 241, the pair of SPN #3 and SPN #4 are converted into a pair of LBN #3 and LBN #4. Furthermore, a source packet group belonging to the 2D extent group is read from the sector group P2 in a range from the LBN #3 to the LBN #4. Conversion of a pair of PTS #5 and PTS #6 indicated by the PI #3 to a pair of SPN #5 and SPN #6, conversion of the pair of SPN #5 and SPN #6 to a pair of LBN #5 and LBN #6, and reading of a source packet group from the sector group P3 in a range from the LBN #5 to the LBN #6 are similarly performed. The playback device 102 thus plays back 2D video images from the file 2D 241 in accordance with the main path 2701 in the 2D playlist file 221.

The 2D playlist file 221 may include an entry mark 3001. The entry mark 3001 indicates a time point in the main path 2701 at which playback is actually to start. For example, as shown in FIG. 30, a plurality of entry marks 3001 can be set for the PI #1. The entry mark 3001 is particularly used for searching for a playback start position during random access. For example, when the 2D playlist file 221 specifies a playback path for a movie title, the entry marks 3001 are assigned to the top of each chapter. Consequently, the playback device 102 can play back the movie title by chapters.

<<3D Playlist File>>

Figure 31:
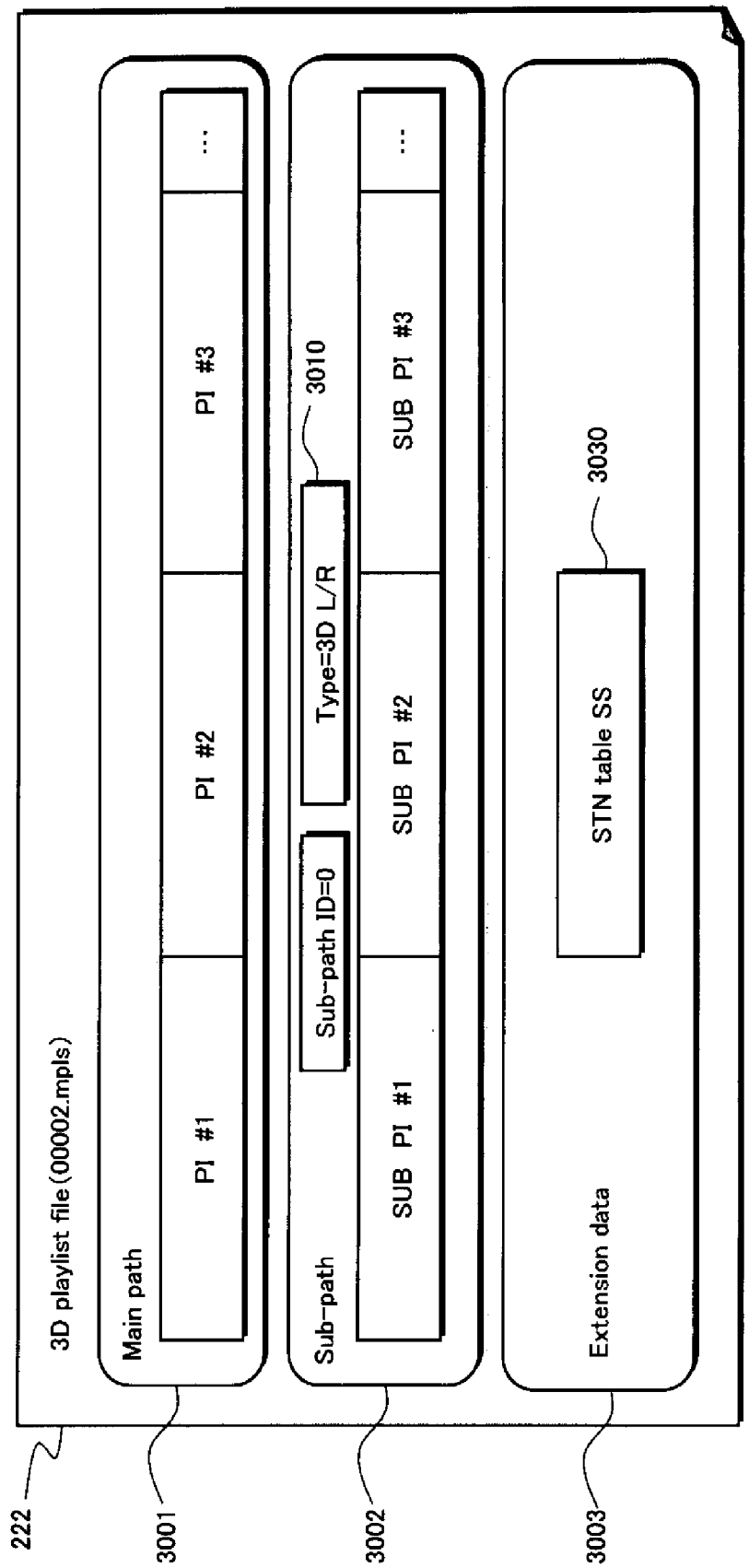
FIG. 31 is a schematic diagram showing a data structure of a 3D playlist file 222 shown in FIG. 2.

FIG. 31 is a schematic diagram showing a data structure of a 3D playlist file. The second playlist file (00002.mpls) 222 shown in FIG. 2 has this data structure, as does the second playlist file (00003.mpls) 223. As shown in FIG. 31, the 3D playlist file 222 includes a main path 3101, sub-path 3102, and extension data 3103.

The main path 3101 specifies the playback path of the main TS shown in FIG. 3A. Accordingly, the main path 3101 is substantially the same as the main path 2701 for the 2D playlist file 221 shown in FIG. 27. In other words, the playback device 102 in 2D playback mode can play back 2D video images from the file 2D 241 in accordance with the main path 3101 in the 3D playlist file 222. The main path 3101 differs from the main path 2701 shown in FIG. 27 in that, when an STN is associated with a PID in a graphics stream or text subtitle stream, the STN table for each PI allocates an offset sequence ID to the STN.

The sub-path 3102 specifies the playback path for the sub-TS shown in FIG. 3B, i.e. the playback path for the file DEP 242. The sub-path 3102 may also specify a playback path for the text subtitle stream shown in FIG. 3C. The data structure of the sub-path 3102 is the same as the data structure of the sub-paths 2702 and 2703 in the 2D playlist file 241 shown in FIG. 27. Accordingly, details on this similar data structure can be found in the description of FIG. 27, in particular details on the data structure of the SUB_PI.

The SUB_PI #N (N=1, 2, 3, . . . ) in the sub-path 3102 are in one-to-one correspondence with the PI #N in the main path 3101. Furthermore, the playback start time and playback end time specified by each SUB_PI #N is the same as the playback start time and playback end time specified by the corresponding PI #N. The sub-path 3102 additionally includes a sub-path type 3110. The "sub-path type" generally indicates whether playback processing should be synchronized between the main path and the sub-path. In the 3D playlist file 222, the sub-path type 3110 in particular indicates the type of the 3D playback mode, i.e. the type of the dependent-view video stream to be played back in accordance with the sub-path 3102. In FIG. 31, the value of the sub-path type 3110 is "3D L/R", thus indicating that the 3D playback mode is L/R mode, i.e. that the right-view video stream is to be played back. On the other hand, a value of "3D depth" for the sub-path type 3110 indicates that the 3D playback mode is depth mode, i.e. that the depth map stream is to be played back. When the playback device 102 in 3D playback mode detects that the value of the sub-path type 3110 is "3D L/R" or "3D depth", the playback device 102 synchronizes playback processing that conforms to the main path 3101 with playback processing that conforms to the sub-path 3102.

Extension data 3103 is interpreted only by the playback device 102 in 3D playback mode; the playback device 102 in 2D playback mode ignores the extension data 3103. In particular, the extension data 3103 includes an extension stream selection table 3130. The "extension stream selection table (STN_table_SS)" (hereinafter abbreviated as "STN table SS") is an array of stream registration information to be added to the STN tables indicated by each PI in the main path 3101 during 3D playback mode. This stream registration information indicates elementary streams that can be selected for playback from the sub TS.

[STN Table]

FIG. 32 is a schematic diagram showing an STN table 3205 included in a main path 3101 of the 3D playlist file 222. As shown in FIG. 32, the stream identification information 3208 allocated to STN 3206=5, 6, . . . , 11 indicates PIDs for a PG stream, text subtitle stream, or IG stream. In this case, the stream attribute information 3210 allocated to the STN 3206=5, 6, . . . , 11 further includes a reference offset ID 3201 and offset adjustment value 3202.

In the file DEP 242, as shown in FIG. 13, offset metadata 1310 is placed in VAU #1 of each video sequence. The reference offset ID (stream_ref_offset_id) 3201 is the same as one of the offset sequence IDs 1311 included in the offset metadata 1310. In other words, the reference offset ID 3201 defines the offset sequence that should be associated with each of the STNs 3206=5, 6, . . . , 11 from among the plurality of offset sequences included in the offset metadata 1310.

The offset adjustment value (stream_offset_adjustment) 3202 indicates the value that should be added to each offset value included in the offset sequence defined by the reference offset ID 3201. The offset adjustment value 3202 is, for example, added by the playback device 102 to each offset value when the size of the screen of the display device 103 greatly differs from the size that was assumed during creation of the 3D video content. In this way, the binocular parallax between 2D graphics images for a left view and a right view can be maintained in an appropriate range.

[STN Table SS]

Figure 33:
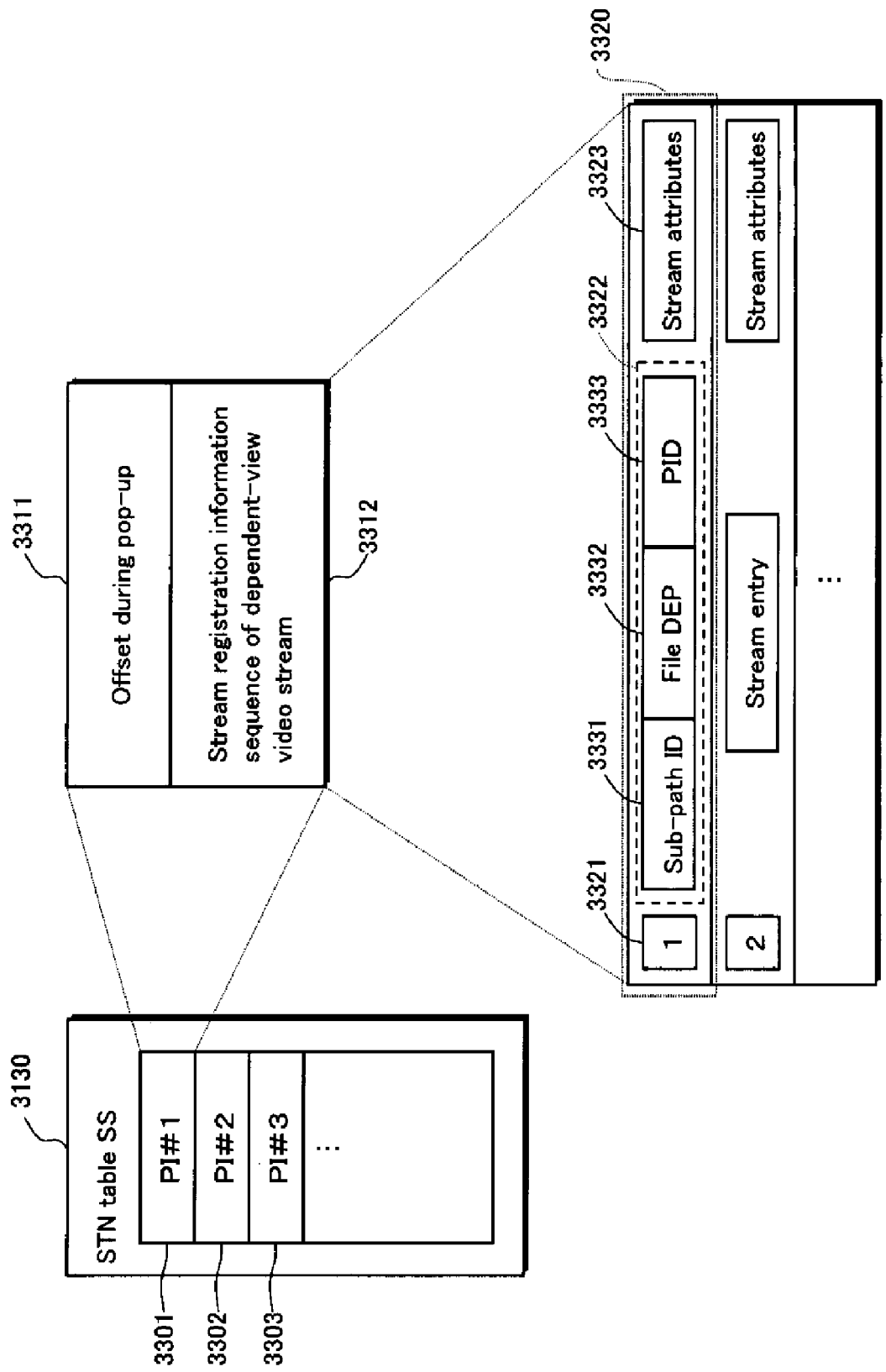
FIG. 33 is a schematic diagram showing a data structure of the STN table SS 3130 shown in FIG. 31.

FIG. 33 is a schematic diagram showing a data structure of the STN table SS 3130. As shown in FIG. 33, an STN table SS 3130 includes stream registration information sequences 3301, 3302, 3303, . . . . The stream registration information sequences 3301, 3302, 3303, . . . individually correspond to the PI #1, PI #2, PI #3, . . . in the main path 3101 and are used by the playback device 102 in 3D playback mode in combination with the stream registration information sequences included in the STN tables in the corresponding PIs. The stream registration information sequence 3301 corresponding to each PI includes an offset during pop-up (Fixed_offset_during_Popup) 3311 and stream registration information sequence 3312 for the dependent-view video streams.

The offset during pop-up 3311 indicates whether a pop-up menu is played back from the IG stream. The playback device 102 in 3D playback mode changes the presentation mode of the video plane and the graphics plane in accordance with the value of the offset 3311. There are two types of presentation modes for the video plane: base-view (B)–dependent-view (D) presentation mode and B-B presentation mode. There are two types of presentation modes for the graphics plane: 1 plane+offset mode and 1 plane+zero offset mode. For example, when the value of the offset during pop-up 3311 is "0", a pop-up menu is not played back from the IG stream. At this point, B-D presentation mode is selected as the video plane presentation mode, and 1 plane+offset mode is selected as the presentation mode for the graphics plane. On the other hand, when the value of the offset during pop-up 3311 is "1", a pop-up menu is played back from the IG stream. At this point, B-B presentation mode is selected as the video plane presentation mode, and 1 plane+zero offset mode is selected as the presentation mode for the graphics plane.

In "B-D presentation mode", the playback device 102 alternately outputs the left-view and right-view video planes. Accordingly, since left-view and right-view frames are alternately displayed on the screen of the display device 103, the viewer perceives these frames as 3D video images. In "B-B presentation mode", the playback device 102 outputs plane data decoded only from the base-view video stream twice for a frame while maintaining the operation mode in 3D playback mode (in particular, maintaining the frame rate at the value for 3D playback, e.g. 48 frames/second). Accordingly, only either the left-view or right-view video plane is displayed on the screen of the display device 103, and thus the viewer perceives these video planes simply as 2D video images.

In "1 plane+offset mode", the playback device 102 generates, via offset control, a pair of left-view and right-view graphics planes from the graphics stream or the text subtitle stream in the main TS and alternately outputs these graphics planes. Accordingly, left-view and right-view graphics planes are alternately displayed on the screen of the display device 103, and thus the viewer perceives these frames as 3D graphics images. In "1 plane+zero offset mode", the playback device 102 temporarily stops offset control and outputs a graphics plane decoded from the graphics stream or the text subtitle stream in the main TS twice for a frame while maintaining the operation mode in 3D playback mode. Accordingly, only either the left-view or right-view graphics planes are displayed on the screen of the display device 103, and thus the viewer perceives these planes simply as 2D graphics images.

The playback device 102 in 3D playback mode refers to the offset during pop-up 3311 for each PI and selects B-B presentation mode and 1 plane+zero offset mode when a pop-up menu is played back from an IG stream. While a pop-up menu is displayed, other 3D video images are thus temporarily changed to 2D video images. This improves the visibility and usability of the pop-up menu.

The stream registration information sequence 3312 for the dependent-view video stream includes stream registration information indicating the dependent-view video streams that can be selected for playback from the sub-TS. This stream registration information sequence 3312 is used in combination with the stream registration information sequence, among the stream registration information sequences included in the STN table in the corresponding PI, that indicates the base-view video stream. When reading a piece of stream registration information from an STN table, the playback device 102 in 3D playback mode automatically also reads the stream registration information sequence, located in the STN table SS, that has been combined with the piece of stream registration information. When simply switching from 2D playback mode to 3D playback mode, the playback device 102 can thus maintain already recognized STNs and stream attributes such as language.

As shown in FIG. 33, the stream registration information sequence 3312 in the dependent-view video stream generally includes a plurality of pieces of stream registration information (SS_dependent_view_block) 3320. These are the same in number as the pieces of stream registration information in the corresponding PI that indicate the base-view video stream. Each piece of stream registration information 3320 includes an STN 3321, stream entry 3322, and stream attribute information 3323. The STN 3321 is a serial number assigned individually to pieces of stream registration information 3320 and is the same as the STN of the piece of stream registration information, located in the corresponding PI, with which the piece of stream registration information 3320 is combined. The stream entry 3322 includes sub-path ID reference information (ref_to_Subpath_id) 3331, stream file reference information (ref_to_subClip_entry_id) 3332, and a PID (ref_to_stream_PID_subclip) 3333. The sub-path ID reference information 3331 indicates the sub-path ID of the sub-path that specifies the playback path of the dependent-view video stream. The stream file reference information 3332 is information to identify the file DEP storing this dependent-view video stream. The PID 3333 is the PID for this dependent-view video stream. The stream attribute information 3323 includes attributes for this dependent-view video stream, such as frame rate, resolution, and video format. In particular, these attributes are the same as those for the base-view video stream shown by the piece of stream registration information, located in the corresponding PI, with which each piece of stream registration information is combined.

[Playback of 3D Video Images in Accordance With a 3D Playlist File]

Figure 34:
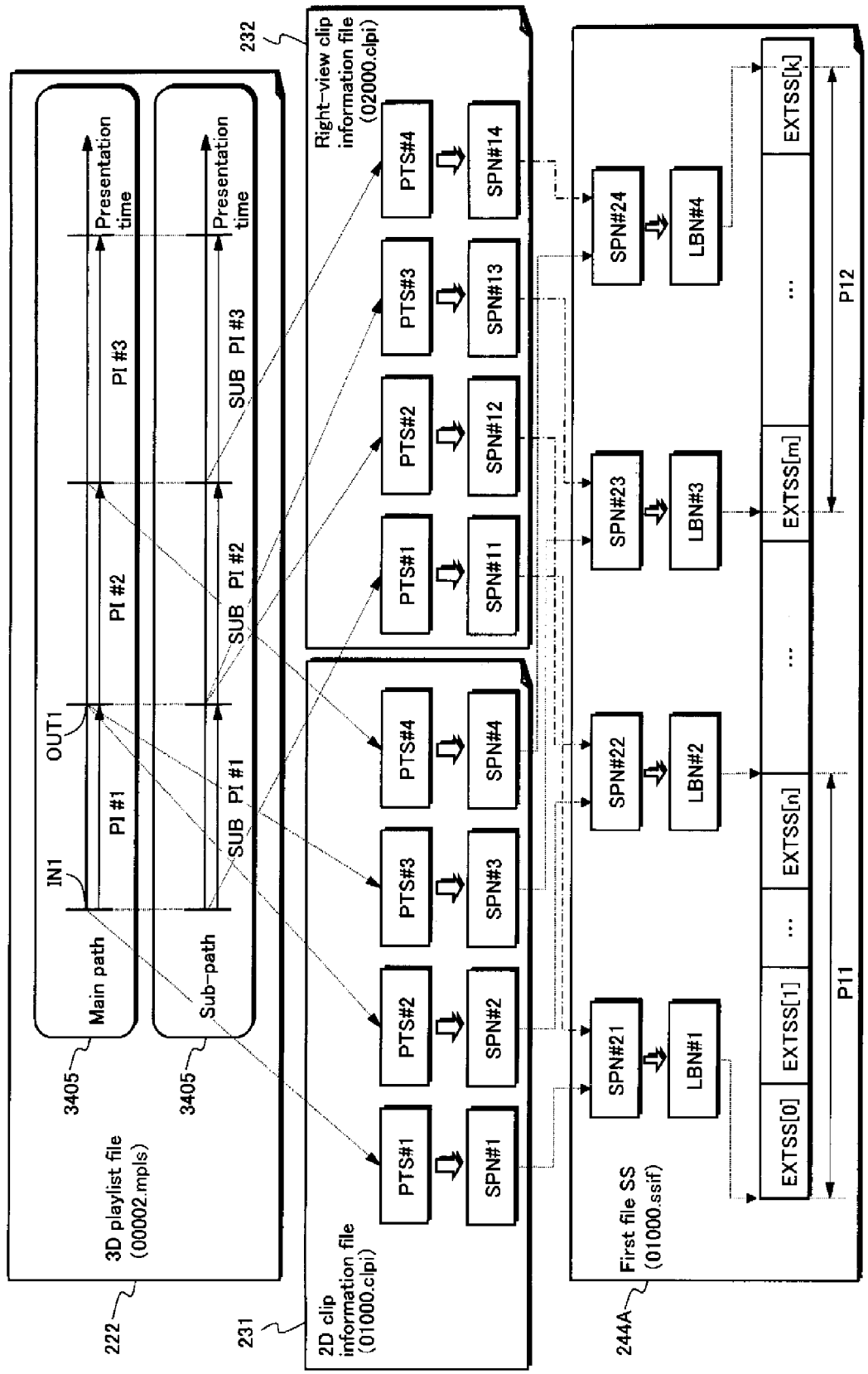
FIG. 34 is a schematic diagram showing correspondence between PTSs indicated by a 3D playlist file (00002.mpls) 222 shown in FIG. 2 and sections played back from a first file SS (01000.ssif) 244A shown in FIG. 2.

FIG. 34 is a schematic diagram showing correspondence between PTSs indicated by the 3D playlist file (00002.mpls) 222 and sections played back from the first file SS (01000.ssif) 244A. As shown in FIG. 34, in the main path 3401 in the 3D playlist file 222, the PI #1 specifies a PTS #1, which indicates a playback start time IN1, and a PTS #2, which indicates a playback end time OUT1. The reference clip information for the PI #1 indicates the 2D clip information file (01000.clpi) 231. In the sub-path 3402, which indicates that the sub-path type is "3D L/R", the SUB_PI #1 specifies the same PTS #1 and PTS #2 as the PI #1. The reference clip information for the SUB_PI #1 indicates the dependent-view clip information file (02000.clpi) 232.

When playing back 3D video images in accordance with the 3D playlist file 222, the playback device 102 first reads PTS #1 and PTS #2 from the PI #1 and SUB_PI #1. Next, the playback device 102 refers to the entry map in the 2D clip information file 231 to retrieve from the file 2D 241 the SPN #1 and SPN #2 that correspond to the PTS #1 and PTS #2. In parallel, the playback device 102 refers to the entry map in the dependent-view clip information file 232 to retrieve from the first file DEP 242 the SPN #11 and SPN #12 that correspond to the PTS #1 and PTS #2. As described with reference to FIG. 24E, the playback device 102 then uses the extent start points 2242 and 2420 in the clip information files 231 and 232 to calculate, from SPN #1 and SPN #11, the number of source packets SPN #21 from the top of the first file SS 244A to the playback start position. Similarly, the playback device 102 calculates, from SPN #2 and SPN #12, the number of source packets SPN #$_{22}$ from the top of the first file SS 244A to the playback start position. The playback device 102 further calculates the numbers of sectors corresponding to the SPN #21 and SPN #22. Next, the playback device 102 refers to these numbers of sectors and the file entry of the first file SS 244A to specify the LBN #1 and LBN #2 at the beginning and end, respectively, of the sector group P11 on which the extent SS group EXTSS[0], . . . , EXTSS[n] to be played back is recorded. Calculation of the numbers of sectors and specification of the LBNs are as per the description of FIG. 24E. Finally, the playback device 102 indicates the range from LBN #1 to LBN #2 to the BD-ROM drive 121. The source packet group belonging to the extent SS group EXTSS[0], . . . , EXTSS[n] is thus read from the sector group P11 in this range. Similarly, the pair PTS #3 and PTS #4 indicated by the PI #2 and SUB_PI #2 are first converted into a pair of SPN #3 and SPN #4 and a pair of SPN #13 and SPN #14 by referring to the entry maps in the clip information files 231 and 232. Then, the number of source packets SPN #23 from the top of the first file SS 244A to the playback start position is calculated from SPN #3 and SPN #13, and the number of source packets SPN #24 from the top of the first file SS 244A to the playback end position is calculated from SPN #4 and SPN #14. Next, referring to the file entry for the first file SS 244A, the pair of SPN #23 and SPN #24 are converted into a pair of LBN #3 and LBN #4. Furthermore, a source packet group belonging to the extent SS group is read from the sector group P12 in a range from the LBN #3 to the LBN #4.

In parallel with the above-described read processing, as described with reference to FIG. 24E, the playback device 102 refers to the extent start points 2242 and 2420 in the clip information files 231 and 232 to extract base-view extents from each extent SS and decode the base-view extents in parallel with the remaining dependent-view extents. The playback device 102 can thus play back 3D video images from the first file SS 244A in accordance with the 3D playlist file 222.

<<Index Table>>

Figure 35:
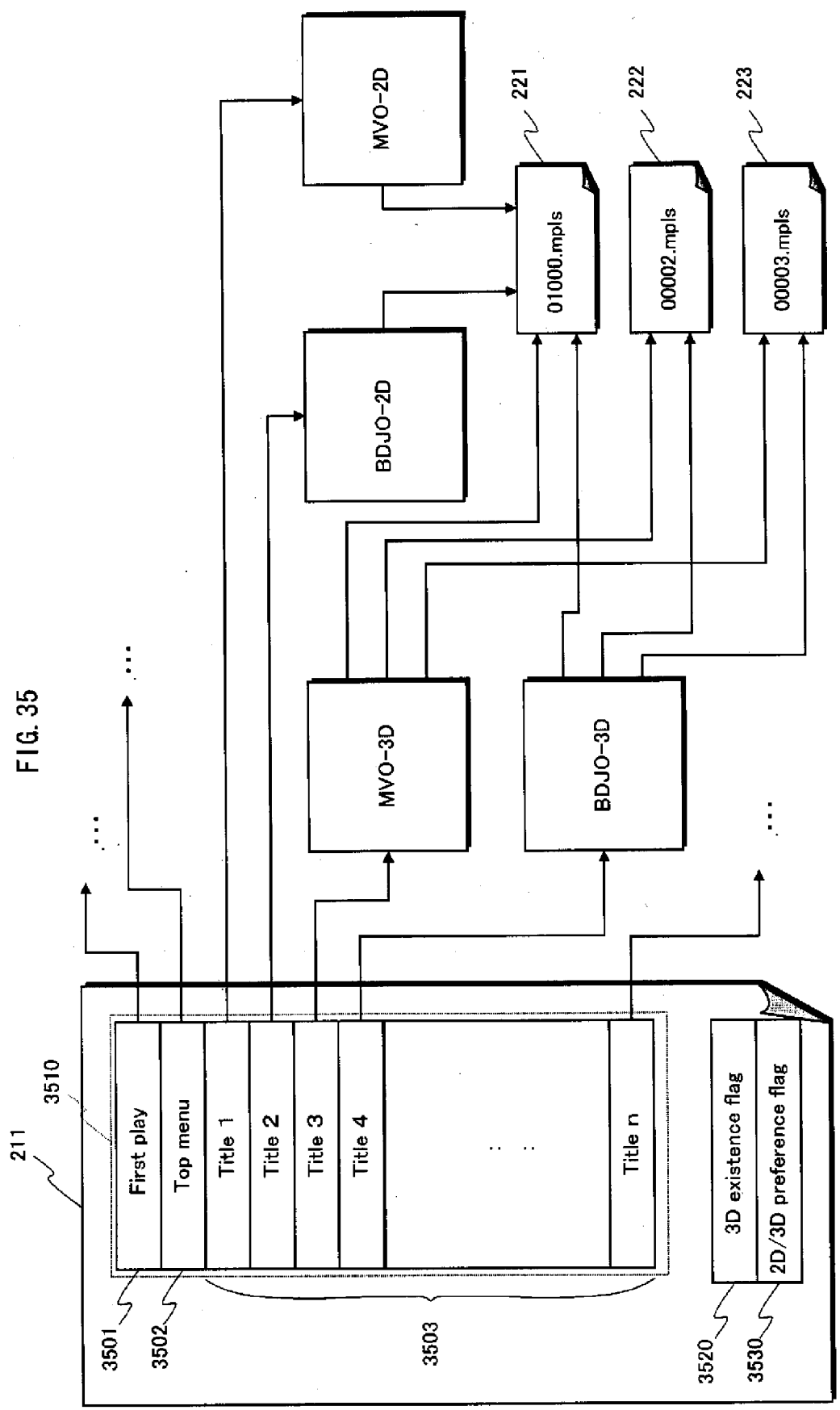
FIG. 35 is a schematic diagram showing a data structure of an index file (index.bdmv) 211 shown in FIG. 2.

FIG. 35 is a schematic diagram showing a data structure of an index file (index.bdmv) 211 shown in FIG. 2. As shown in FIG. 35, the index file 211 includes an index table 3510, 3D existence flag 3520, and 2D/3D preference flag 3530.

The index table 3510 stores the items "first play" 3501, "top menu" 3502, and "title k" 3503 (k=1, 2, . . . , n; the letter n represents an integer greater than or equal to 1). Each item is associated with either a movie object MVO-2D, MVO-3D, . . . , or a BD-J object BDJO-2D, BDJO-3D, . . . Each time a title or a menu is called in response to a user operation or an application program, a control unit in the playback device 102 refers to a corresponding item in the index table 3510. Furthermore, the control unit calls an object associated with the item from the BD-ROM disc 101 and accordingly executes a variety of processes. Specifically, the item "first play" 3501 specifies an object to be called when the disc 101 is loaded into the BD-ROM drive 121. The item "top menu" 3502 specifies an object for displaying a menu on the display device 103 when a command "go back to menu" is input, for example, by user operation. In the items "title k" 3503, the titles that constitute the content on the disc 101 are individually allocated. For example, when a title for playback is specified by user operation, in the item "title k" in which the title is allocated, the object for playing back video images from the AV stream file corresponding to the title is specified.

In the example shown in FIG. 35, the items "title 1" and "title 2" are allocated to titles of 2D video images. The movie object associated with the item "title 1", MVO-2D, includes a group of commands related to playback processes for 2D video images using the 2D playlist file (00001.mpls) 221. When the playback device 102 refers to the item "title 1", then in accordance with the movie object MVO-2D, the 2D playlist file 221 is read from the disc 101, and playback processes for 2D video images are executed in accordance with the playback path specified therein. The BD-J object associated with the item "title 2", BDJO-2D, includes an application management table related to playback processes for 2D video images using the 2D playlist file 221. When the playback device 102 refers to the item "title 2", then in accordance with the application management table in the BD-J object BDJO-2D, a Java application program is called from the JAR file 261 and executed. In this way, the 2D playlist file 221 is read from the disc 101, and playback processes for 2D video images are executed in accordance with the playback path specified therein.

Furthermore, in the example shown in FIG. 35, the items "title 3" and "title 4" are allocated to titles of 3D video images. The movie object associated with the item "title 3", MVO-3D, includes, in addition to a group of commands related to playback processes for 2D video images using the 2D playlist file 221, a group of commands related to playback processes for 3D video images using either 3D playlist file (00002.mpls) 222 or (00003.mpls) 223. In the BD-J object associated with the item "title 4", BDJO-3D, the application management table specifies, in addition to a Java application program related to playback processes for 2D video images using the 2D playlist file 221, a Java application program related to playback processes for 3D video images using either 3D playlist file 222 or 223.

The 3D existence flag 3520 shows whether or not 3D video image content is recorded on the BD-ROM disc 101. When the BD-ROM disc 101 is inserted into the BD-ROM drive 121, the playback device 102 first checks the 3D existence flag 3520. When the 3D existence flag 3520 is off, the playback device 102 does not need to select 3D playback mode. Accordingly, the playback device 102 can rapidly proceed in 2D playback mode without performing HDMI authentication on the display device 103. "HDMI authentication" refers to processing by which the playback device 102 exchanges CEC messages with the display device 103 via the HDMI cable 122 to check with the display device 103 as to whether it supports playback of 3D video images. By skipping HDMI authentication, the time between insertion of the BD-ROM disc 101 and the start of playback of 2D video images is shortened.

The 2D/3D preference flag 3530 indicates whether playback of 3D video images should be prioritized when both the playback device and the display device support playback of both 2D video images and 3D video images. The 2D/3D preference flag 3530 is set by the content provider. When the 3D existence flag 3520 in the BD-ROM disc 101 is on, the playback device 102 then additionally checks the 2D/3D preference flag 3530. When the 2D/3D preference flag 3530 is on, the playback device 102 does not make the user select the playback mode, but rather performs HDMI authentication. Based on the results thereof, the playback device 102 operates in either 2D playback mode or 3D playback mode. That is, the playback device 102 does not display a playback mode selection screen. Accordingly, if the results of HDMI authentication indicate that the display device 103 supports playback of 3D video images, the playback device 102 operates in 3D playback mode. This makes it possible to avoid delays in starting up caused by processing to switch from 2D playback mode to 3D playback mode, such as switching frame rates, etc.

[Selection of Playlist File When Selecting a 3D Video Title]

In the example shown in FIG. 35, when the playback device 102 refers to item "title 3" in the index table 3510, the following determination processes are performed in accordance with the movie object MVO-3D: (1) Is the 3D existence flag 3520 on or off? (2) Does the playback device 102 itself support playback of 3D video images? (3) Is the 2D/3D preference flag 3530 on or off? (4) Has the user selected 3D playback mode? (5) Does the display device 103 support playback of 3D video images? and (6) Is the 3D playback mode of the playback device 102 in L/R mode or depth mode? Next, in accordance with the results of these determinations, the playback device 102 selects one of the playlist files 221-223 for playback. On the other hand, when the playback device 102 refers to item "title 4", a Java application program is called from the JAR file 261, in accordance with the application management table in the BD-J object BDJO-3D, and executed. The above-described determination processes (1)-(6) are thus performed, and a playlist file is then selected in accordance with the results of determination.

Figure 36:
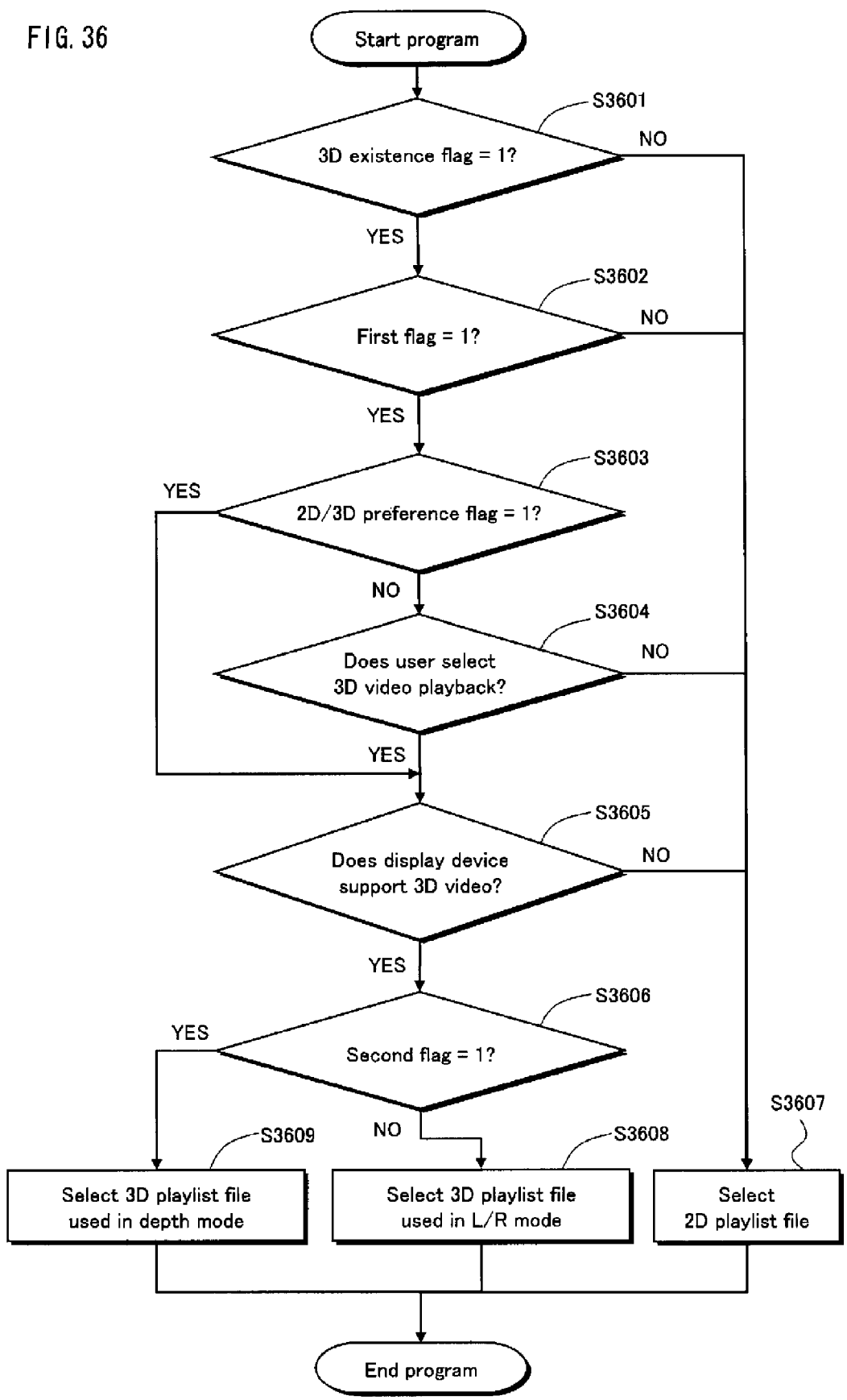
FIG. 36 is a flowchart of processing whereby the playback device 102 shown in FIG. 1 selects a playlist file for playback.

FIG. 36 is a flowchart of selection processing for a playlist file to be played back using the above determination processes (1)-(6). For this selection processing, it is assumed that the playback device 102 includes a first flag and a second flag. The first flag indicates whether the playback device 102 supports playback of 3D video images. For example, a value of "0" for the first flag indicates that the playback device 102 only supports playback of 2D video images, whereas "1" indicates support of 3D video images as well. The second flag indicates whether the 3D playback mode is L/R mode or depth mode. For example, a value of "0" for the second flag indicates that the 3D playback mode is L/R mode, whereas "1" indicates depth mode. Furthermore, the respective values of the 3D existence flag 3520 and 2D/3D preference flag 3530 are set to "1" when these flags are on, and to "0" when these flags are off.

In step S3601, the playback device 102 checks the value of the 3D existence flag 3520. If the value is "1", processing proceeds to step S3602. If the value is "0", processing proceeds to step S3607.

In step S3602, the playback device 102 checks the value of the first flag. If the value is "1", processing proceeds to step S3603. If the value is "0", processing proceeds to step S3607.

In step S3603, the playback device 102 checks the value of the 2D/3D preference flag 3530. If the value is "0", processing proceeds to step S3604. If the value is "1", processing proceeds to step S3605.

In step S3604, the playback device 102 displays a menu on the display device 103 for the user to select either 2D playback mode or 3D playback mode. If the user selects 3D playback mode via operation of a remote control 105 or the like, processing proceeds to step S3605, whereas if the user selects 2D playback mode, processing proceeds to step S3607.

In step S3605, the playback device 102 perform HDMI authentication to check whether the display device 103 supports playback of 3D video images. Specifically, the playback device 102 exchanges CEC messages with the display device 103 via the HDMI cable 122 to check with the display device 103 as to whether it supports playback of 3D video images. If the display device 103 does support playback of 3D video images, processing proceeds to step S3606. If the display device 103 does not support playback of 3D video images, processing proceeds to step S3607.

In step S3606, the playback device 102 checks the value of the second flag. If the value is "0", processing proceeds to step S3608. If the value is "1", processing proceeds to step S3609.

In step S3607, the playback device 102 selects for playback the 2D playlist file 221. Note that, at this time, the playback device 102 may cause the display device 103 to display the reason why playback of 3D video images was not selected. Processing then terminates.

In step S3608, the playback device 102 selects for playback the 3D playlist file 222 used in L/R mode. Processing then terminates.

In step S3609, the playback device 102 selects for playback the 3D playlist file 222 used in depth mode. Processing then terminates.

<Structure of 2D Playback Device>

When playing back 2D video image content from a BD-ROM disc 101 in 2D playback mode, the playback device 102 operates as a 2D playback device. FIG. 37 is a functional block diagram of a 2D playback device 3700. As shown in FIG. 37, the 2D playback device 3700 includes a BD-ROM drive 3701, playback unit 3702, and control unit 3703. The playback unit 3702 includes a read buffer 3721, preload buffer 3723, font buffer 3724, system target decoder 3725, and plane adder 3726. The control unit 3703 includes a dynamic scenario memory 3731, static scenario memory 3732, user event processing unit 3733, program execution unit 3734, playback control unit 3735, and player variable storage unit 3736. The playback unit 3702 and the control unit 3703 are each implemented on a different integrated circuit, but may alternatively be implemented on a single integrated circuit.

When the BD-ROM disc 101 is loaded into the BD-ROM drive 3701, the BD-ROM drive 3701 radiates laser light to the disc 101 and detects change in the reflected light. Furthermore, using the change in the amount of reflected light, the BD-ROM drive 3701 reads data recorded on the disc 101. Specifically, the BD-ROM drive 3701 has an optical pickup, i.e. an optical head. The optical head has a semiconductor laser, collimate lens, beam splitter, objective lens, collecting lens, and optical detector. A beam of light radiated from the semiconductor laser sequentially passes through the collimate lens, beam splitter, and objective lens to be collected on a recording layer of the disc 101. The collected beam is reflected and diffracted by the recording layer. The reflected and diffracted light passes through the objective lens, the beam splitter, and the collecting lens, and is collected onto the optical detector. The optical detector generates a playback signal at a level in accordance with the amount of collected light. Furthermore, data is decoded from the playback signal.

The BD-ROM drive 3701 reads data from the BD-ROM disc 101 based on a request from the playback control unit 3735. Out of the read data, the extents in the file 2D, i.e. the 2D extents, are transferred to the read buffer 3721; the text subtitle file is transferred to the preload buffer 3723; the font set is transferred to the font buffer 3724; dynamic scenario information is transferred to the dynamic scenario memory 3731; and static scenario information is transferred to the static scenario memory 3732. "Dynamic scenario information" includes an index file, movie object file, and BD-J object file. "Static scenario information" includes a 2D playlist file and a 2D clip information file.

The read buffer 3721, preload buffer 3723, font buffer 3724, dynamic scenario memory 3731, and static scenario memory 3732 are each a buffer memory. Memory elements in the playback unit 3702 is used as the read buffer 3721, preload buffer 3723, and font buffer 3724. Memory elements in the control unit 3703 are used as the dynamic scenario memory 3731 and the static scenario memory 3732. Alternatively, different areas in a single memory element may be used as part or all of these buffer memories 3721-3723, 3731, and 3732.

The system target decoder 3725 reads 2D extents from the read buffer 3721 in units of source packets and demultiplexes the 2D extents. The system target decoder 3725 then decodes each of the elementary streams obtained by the demultiplexing. At this point, information necessary for decoding each elementary stream, such as the type of codec and attributes of the stream, is transferred from the playback control unit 3735 to the system target decoder 3725. The system target decoder 3725 outputs a primary video stream, secondary video stream, IG stream, and PG stream after decoding respectively as primary video plane data, secondary video plane data, IG plane data, and PG plane data, in units of VAUs. On the other hand, the system target decoder 3725 mixes the decoded primary audio stream and secondary audio stream and transmits the resultant data to an audio output device, such as an internal speaker 103A of the display device 103. The system target decoder 3725 also reads the text subtitle stream from the preload buffer 3723 by text data entry and interprets the text character string represented therein. The system target decoder 3725 then refers to the font set stored in the font buffer 3724 and outputs bit map data corresponding to the text character string as PG plane data. In addition, the system target decoder 3725 receives graphics data from the program execution unit 3734. The graphics data is used for rendering graphics elements for a GUI, such as a menu, on the screen and is in a raster data format such as JPEG and PNG. The system target decoder 3725 processes the graphics data and outputs the processed data as image plane data. Details on the system target decoder 3725 are provided below.

The plane adder 3726 receives primary video plane data, secondary video plane data, IG plane data, PG plane data, and image plane data from the system target decoder 3725 and superimposes these pieces of plane data to generate one combined video frame or field. The combined video data is transferred to the display device 103 for display on the screen.

The user event processing unit 3733 detects a user operation via the remote control 105 or the front panel of the playback device 102. Based on the user operation, the user event processing unit 3733 requests the program execution unit 3734 or the playback control unit 3735 to perform processing. For example, when a user instructs to display a pop-up menu by pushing a button on the remote control 105, the user event processing unit 3733 detects the push and identifies the button. The user event processing unit 3733 further requests the program execution unit 3734 to execute a command corresponding to the button, i.e. a command to display the pop-up menu. On the other hand, when a user pushes a fast-forward or a rewind button on the remote control 105, for example, the user event processing unit 3733 detects the push and identifies the button. The user event processing unit 3733 then requests the playback control unit 3735 to fast-forward or rewind the playlist currently being played back.

The program execution unit 3734 is a processor that reads programs from movie object files and BD-J object files stored in the dynamic scenario memory 3731 and executes these programs. Furthermore, the program execution unit 3734 performs the following operations in accordance with the programs: (1) The program execution unit 3734 orders the playback control unit 3735 to perform playlist playback processing; (2) The program execution unit 3734 generates graphics data for a menu or game as PNG or JPEG raster data and transfers the generated data to the system target decoder 3725 to be combined with other video data. Via program design, specific details on these processes can be designed relatively flexibly. In other words, during the authoring process of the BD-ROM disc 101, the nature of these processes is determined while programming the movie object files and BD-J object files.

The playback control unit 3735 controls transfer of different types of data, such as 2D extents, an index file, etc. from the BD-ROM disc 101 to the read buffer 3721, the preload buffer 3723, font buffer 3724, dynamic scenario memory 3731, and static scenario memory 3732. A file system managing the directory file structure shown in FIG. 2 is used for this control. That is, the playback control unit 3735 causes the BD-ROM drive 3701 to transfer the files to each of the buffer memories 3721-3723, 3731, and 3732 using a system call for opening files. The "file opening" is composed of a sequence of the following processes. First, a file name to be detected is provided to the file system by a system call, and an attempt is made to detect the file name from the directory/file structure. When the detection is successful, the file entry for the target file to be transferred is first transferred to memory in the playback control unit 3735, and a File Control Block (FCB) is generated in the memory. Subsequently, a file handle for the target file is returned from the file system to the playback control unit 3735. Afterwards, the playback control unit 3735 can cause the BD-ROM drive 3701 to transfer the target file from the BD-ROM disc 101 to each of the buffer memories 3721-3723, 3731, and 3732 by showing the file handle to the BD-ROM drive 3701.

The playback control unit 3735 decodes the file 2D to output video data and audio data by controlling the BD-ROM drive 3701 and the system target decoder 3725. Specifically, the playback control unit 3735 first reads a 2D playlist file from the static scenario memory 3732, in response to an instruction from the program execution unit 3734 or a request from the user event processing unit 3733, and interprets the content of the file. In accordance with the interpreted content, particularly with the playback path, the playback control unit 3735 then specifies a file 2D to be played back and instructs the BD-ROM drive 3701 and the system target decoder 3725 to read and decode this file. Such playback processing based on a playlist file is called "playlist playback processing". When a text subtitle stream is included in the playback path, the playback control unit 3735 specifies the necessary font sets from the stream attribute information in the STN table and transmits the font sets from the BD-ROM disc 101 to the font buffer 3724.

In addition, the playback control unit 3735 sets various types of player variables in the player variable storage unit 3736 using the static scenario information. With reference to the player variables, the playback control unit 3735 further specifies to the system target decoder 3725 elementary streams to be decoded and provides the information necessary for decoding the elementary streams.

The player variable storage unit 3736 is composed of a group of registers for storing player variables. Types of player variables include system parameters (SPRM) and general parameters (GPRM). An SPRM indicates the status of the playback device 102. FIG. 38 is a list of SPRMs. Each SPRM is assigned a serial number 3801, and each serial number 3801 is associated with a unique variable value 3802. The contents of major SPRMs are shown below. Here, the numbers in parentheses indicate the serial numbers 3801.

SPRM(0): Language code
SPRM(1): Primary audio stream number
SPRM(2): Subtitle stream number
SPRM(3): Angle number
SPRM(4): Title number
SPRM(5): Chapter number
SPRM(6): Program number
SPRM(7): Cell number
SPRM(8): Key name
SPRM(9): Navigation timer
SPRM(10): Current playback time
SPRM(11): Player audio mixing mode for karaoke
SPRM(12): Country code for parental management
SPRM(13): Parental level
SPRM(14): Player configuration for video
SPRM(15): Player configuration for audio
SPRM(16): Language code for audio stream
SPRM(17): Language code extension for audio stream
SPRM(18): Language code for subtitle stream
SPRM(19): Language code extension for subtitle stream
SPRM(20): Player region code
SPRM(21): Secondary video stream number
SPRM(22): Secondary audio stream number
SPRM(23): Player status
SPRM(24): Reserved
SPRM(25): Reserved
SPRM(26): Reserved
SPRM(27): Reserved
SPRM(28): Reserved
SPRM(29): Reserved
SPRM(30): Reserved
SPRM(31): Reserved The SPRM(10) indicates the PTS of the picture currently being decoded and is updated every time a picture is decoded and written into the primary video plane memory. Accordingly, the current playback point can be known by referring to the SPRM(10).

The parental level in SPRM(13) indicates a predetermined restricted age and is used for parental control of viewing of titles recorded on the BD-ROM disc 101. A user of the playback device 102 sets the value of the SPRM(13) via, for example, an OSD of the playback device 102. "Parental control" refers to restricting viewing of a title in accordance with the viewer's age. The following is an example of how the playback device 102 performs parental control. The playback device 102 first reads, from the BD-ROM disc 101, the age for which viewing of a title is permitted and compares this age with the value of the SPRM(13). If this age is equal to or less than the value of the SPRM(13), the playback device 102 continues with playback of the title. If this age is greater than the value of the SPRM(13), the playback device 102 stops playback of the title.

The language code for audio stream in SPRM(16) and the language code for subtitle stream in SPRM(18) show default language codes of the playback device 102. These codes may be changed by a user with use of the OSD or the like of the playback device 102, or the codes may be changed by an application program via the program execution unit 3734. For example, if the SPRM(16) shows "English", then during playback processing of a playlist, the playback control unit 3735 first searches the STN table in the PI showing the current playback section, i.e. the current PI, for a stream entry having the language code for "English". The playback control unit 3735 then extracts the PID from the stream identification information of the stream entry and transmits the extracted PID to the system target decoder 3725. As a result, an audio stream having the PID is selected and decoded by the system target decoder 3725. These processes can be executed by the playback control unit 3735 with use of the movie object file or the BD-J object file.

During playback processing, the playback control unit 3735 updates the player variables in accordance with the status of playback. The playback control unit 3735 updates the SPRM(1), SPRM(2), SPRM(21), and SPRM(22) in particular. These SPRM respectively show, in the stated order, the STN of the audio stream, subtitle stream, secondary video stream, and secondary audio stream that are currently being processed. For example, suppose that the SPRM(1) has been changed by the program execution unit 3734. In this case, the playback control unit 3735 first refers to the STN shown by the new SPRM(1) and retrieves the stream entry that includes this STN from the STN table in the current PI. The playback control unit 3735 then extracts the PID from the stream identification information of the stream entry and transmits the extracted PID to the system target decoder 3725. As a result, an audio stream having the PID is selected and decoded by the system target decoder 3725. This is how the audio stream to be played back is switched. The subtitle stream and the secondary video stream to be played back can be similarly switched.

<<2D Playlist Playback Processing>>

Figure 39:
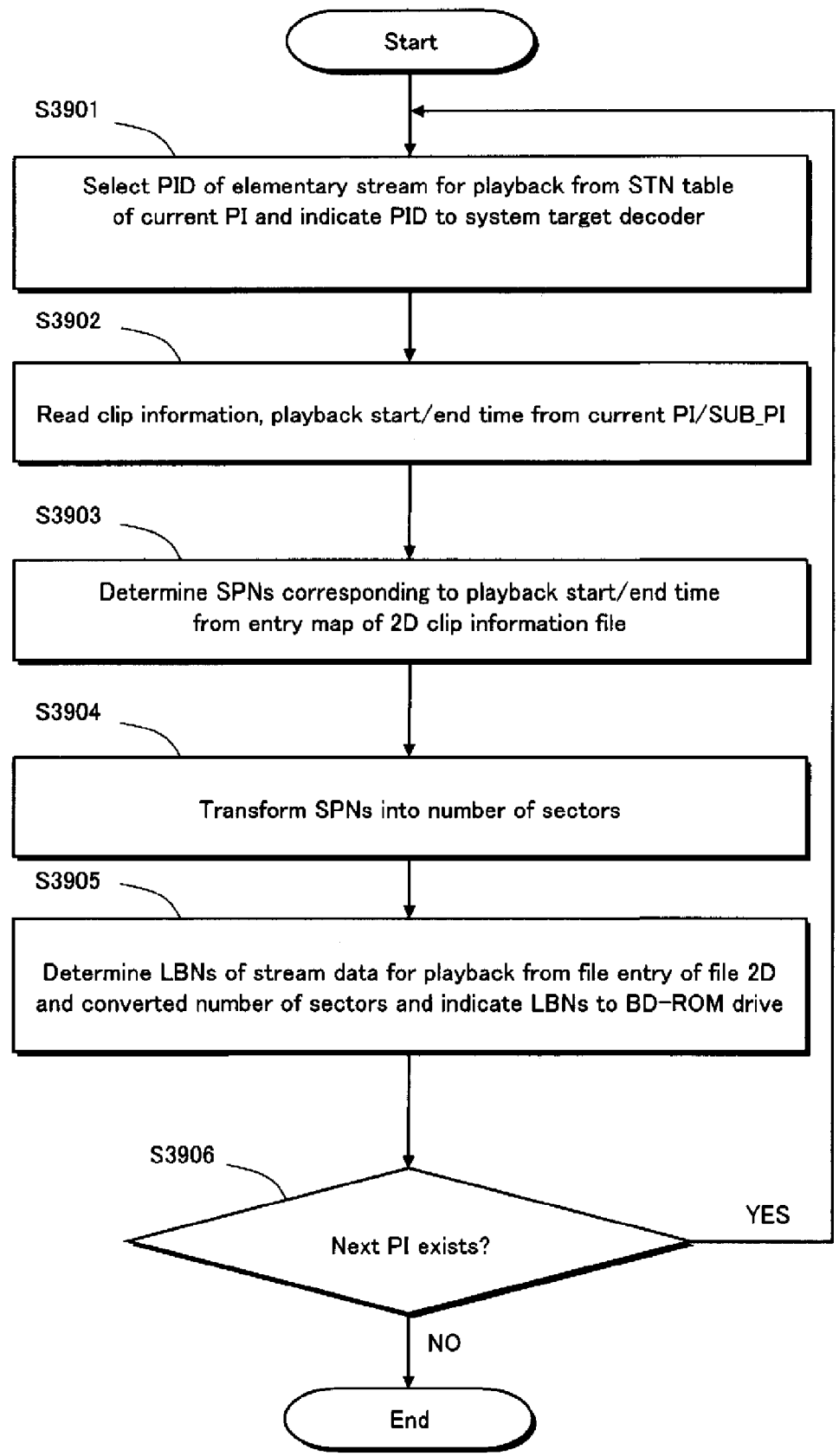
FIG. 39 is a flowchart of 2D playlist playback processing by a playback control unit 3735 shown in FIG. 37.

FIG. 39 is a flowchart of 2D playlist playback processing by a playback control unit 3735. 2D playlist playback processing is performed according to a 2D playlist file and is started by the playback control unit 3735 reading a 2D playlist file from the static scenario memory 3732.

In step S3901, the playback control unit 3735 first reads a single PI from a main path in the 2D playlist file and then sets the PI as the current PI. Next, from the STN table of the current PI, the playback control unit 3735 selects PIDs of elementary streams to be played back and specifies attribute information necessary for decoding the elementary streams. The selected PIDs and attribute information are indicated to the system target decoder 3725. The playback control unit 3735 further specifies a SUB_PI associated with the current PI from the sub-paths in the 2D playlist file. When the SUB_PI defies a playback section of a text subtitle stream, the playback control unit 3735 specifies the necessary font sets from the stream attribute information in the STN table and transmits the font sets from the BD-ROM disc 101 to the font buffer 3724. Thereafter, processing proceeds to step S3902.

In step S3902, the playback control unit 3735 reads reference clip information, a PTS #1 indicating a playback start time IN1, and a PTS #2 indicating a playback end time OUT1 from the current PI. From this reference clip information, a 2D clip information file corresponding to the file 2D to be played back is specified. Furthermore, when a SUB_PI exists that is associated with the current PI, similar information is also read from the SUB_PI. Thereafter, processing proceeds to step S3903.

In step S3903, with reference to the entry map of the 2D clip information file, the playback control unit 3735 retrieves the SPN #1 and the SPN #2 in the file 2D corresponding to the PTS #1 and the PTS #2. The pair of PTSs indicated by the SUB_PI are also converted to a pair of SPNs. Thereafter, processing proceeds to step S3904.

In step S3904, from the SPN #1 and the SPN #2, the playback control unit 3735 calculates a number of sectors corresponding to each of the SPN #1 and the SPN #2. Specifically, the playback control unit 3735 first obtains the product of each of the SPN #1 and the SPN #2 multiplied by the data amount per source packet, i.e. 192 bytes. Next, the playback control unit 3735 obtains a quotient by dividing each product by the data amount per sector, i.e. 2048 bytes: N1=SPN #1×192/2048, N2=SPN #2×192/2048. The quotients N1 and N2 are the same as the total number of sectors, in the main TS, recorded in portions previous to the source packets to which SPN #1 and SPN #2 are allocated, respectively. The pair of SPNs converted from the pair of PTSs indicated by the SUB_PI is similarly converted to a pair of numbers of sectors. Thereafter, processing proceeds to step S3905.

In step S3905, the playback control unit 3735 specifies, from the numbers of sectors N1 and N2 obtained in step S3904, LBNs of the top and end of the 2D extent group to be played back. Specifically, with reference to the file entry of the file 2D to be played back, the playback control unit 3735 counts from the top of the sector group in which the 2D extent group is recorded so that the LBN of the $(N1+1)^{th}$ sector=LBN #1, and the LBN of the $(N2+1)^{th}$ sector=LBN #2. The playback control unit 3735 further specifies a range from the LBN#1 to the LBN#2 to the BD-ROM drive 121. The pair of numbers of sectors converted from the pair of PTSs indicated by the SUB_PI is similarly converted to a pair of LBNs and specified to the BD-ROM drive 121. As a result, from the sector group in the specified range, a source packet group belonging to a 2D extent group is read in aligned units. Thereafter, processing proceeds to step S3906.

In step S3906, the playback control unit 3735 checks whether an unprocessed PI remains in the main path. When an unprocessed PI remains, processing is repeated from step S3901. When no unprocessed PI remains, processing ends.

<<System Target Decoder>>

Figure 40:
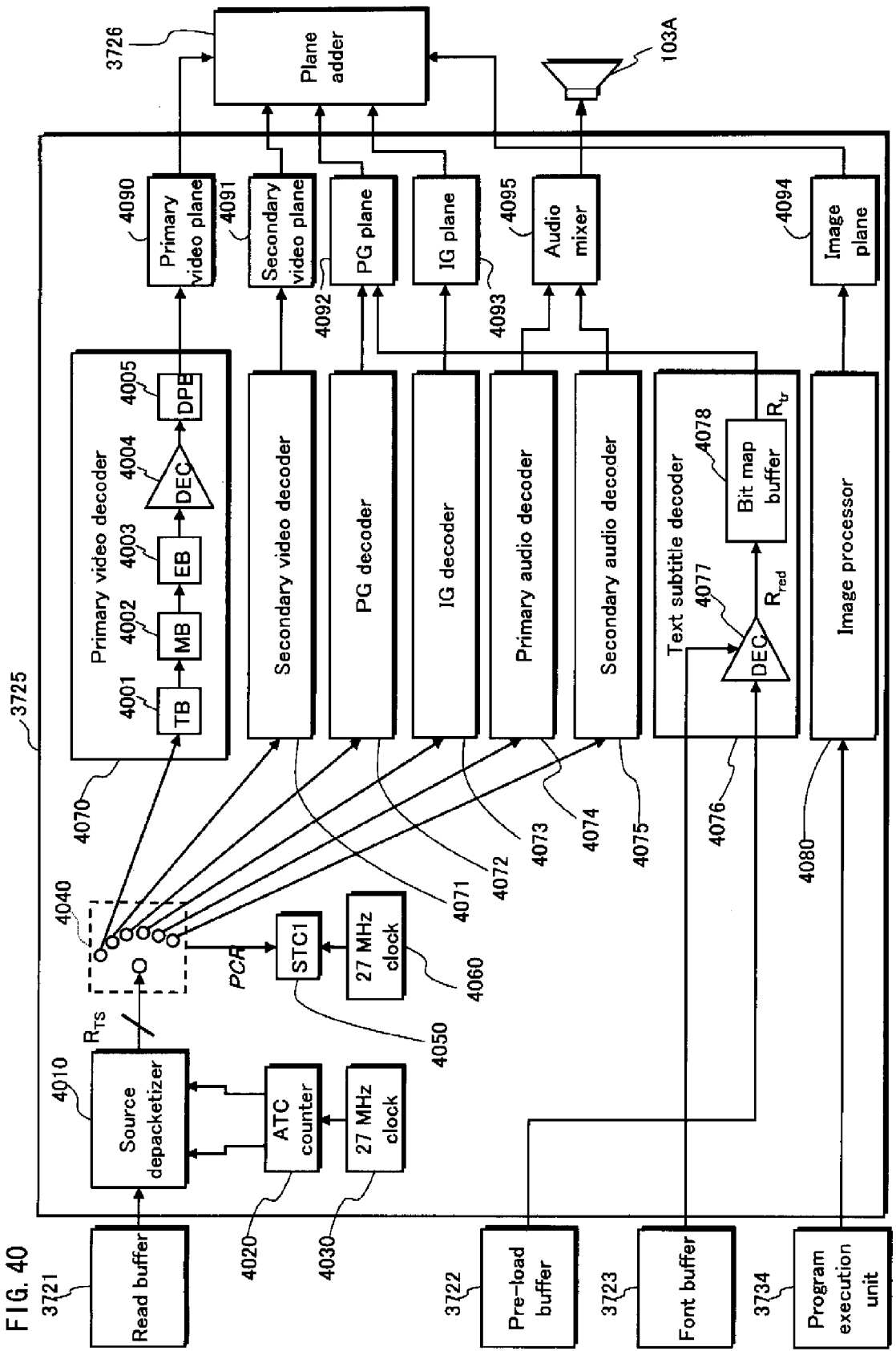
FIG. 40 is a functional block diagram of a system target decoder 3725 shown in FIG. 37.

FIG. 40 is a functional block diagram of the system target decoder 3725. As shown in FIG. 40, the system target decoder 3725 includes a source depacketizer 4010, ATC counter 4020, first 27 MHz clock 4030, PID filter 4040, STC counter (STC1) 4050, second 27 MHz clock 4060, primary video decoder 4070, secondary video decoder 4071, PG decoder 4072, IG decoder 4073, primary audio decoder 4074, secondary audio decoder 4075, text subtitle decoder 4076, image processor 4080, primary video plane memory 4090, secondary video plane memory 4091, PG plane memory 4092, IG plane memory 4093, image plane memory 4094, and audio mixer 4095.

The source depacketizer 4010 reads source packets from the read buffer 3721, extracts the TS packets from the read source packets, and transfers the TS packets to the PID filter 4040. Furthermore, the source depacketizer 4010 synchronizes the time of the transfer with the time shown by the ATS of each source packet. Specifically, the source depacketizer 4010 first monitors the value of the ATC generated by the ATC counter 4020. In this case, the value of the ATC depends on the ATC counter 4020 and is incremented in accordance with a pulse of a clock signal from the first 27 MHz clock 4030. Subsequently, at the instant the value of the ATC matches the ATS of a source packet, the source depacketizer 4010 transfers the TS packets extracted from the source packet to the PID filter 4040. By adjusting the time of transfer in this way, the mean transfer rate of TS packets from the source depacketizer 4010 to the PID filter 4040 does not surpass the value $R_{TS}$ specified by the system rate 2211 in the 2D clip information file 231 shown in FIG. 22.

The PID filter 4040 first monitors a PID that includes each TS packet outputted by the source depacketizer 4010. When the PID matches a PID pre-specified by the playback control unit 3735, the PID filter 4040 selects the TS packet and transfers it to the decoder 4070-4075 appropriate for decoding of the elementary stream indicated by the PID (the text subtitle decoder 4076, however, is excluded). For example, if a PID is 0x1011, the TS packets are transferred to the primary video decoder 4070. TS packets with PIDs ranging from 0x1B00-0x1B1F, 0x1100-0x111F, 0x1A00-0x1A1F, 0x1200-0x121F, and 0x1400-0x141F are transferred to the secondary video decoder 4071, primary audio decoder 4074, secondary audio decoder 4075, PG decoder 4072, and IG decoder 4073, respectively.

The PID filter 4040 further detects a PCR from TS packets using the PIDs of the TS packets. At each detection, the PID filter 4040 sets the value of the STC counter 4050 to a predetermined value. Then, the value of the STC counter 4050 is incremented in accordance with a pulse of the clock signal of the second 27 MHz clock 4060. In addition, the value to which the STC counter 4050 is set is indicated to the PID filter 4040 from the playback control unit 3735 in advance. The decoders 4070-4076 each use the value of the STC counter 4050 as the STC. Specifically, the decoders 4070-4076 first reconstruct the TS packets received from the PID filter 4040 into PES packets. Next, the decoders 4070-4076 adjust the timing of the decoding of data included in the PES payloads in accordance with the times indicated by the PTSs or the DTSs included in the PES headers.

The primary video decoder 4070, as shown in FIG. 40, includes a transport stream buffer (TB) 4001, multiplexing buffer (MB) 4002, elementary stream buffer (EB) 4003, compressed video decoder (DEC) 4004, and decoded picture buffer (DPB) 4005.

The TB 4001, MB 4002, and EB 4003 are each a buffer memory and use an area of a memory element internally provided in the primary video decoder 4070. Alternatively, some or all of the buffer memories may be separated in discrete memory elements. The TB 4001 stores the TS packets received from the PID filter 4040 as they are. The MB 4002 stores PES packets reconstructed from the TS packets stored in the TB 4001. Note that when the TS packets are transferred from the TB 4001 to the MB 4002, the TS header is removed from each TS packet. The EB 4003 extracts encoded VAUs from the PES packets and stores the VAUs therein. A VAU includes a compressed picture, i.e., an I picture, B picture, or P picture. Note that when data is transferred from the MB 4002 to the EB 4003, the PES header is removed from each PES packet.

The DEC 4004 is a hardware decoder specifically for decoding of compressed pictures and is composed of an LSI that includes, in particular, a function to accelerate the decoding. The DEC 4004 decodes a picture from each VAU in the EB 4003 at the time shown by the DTS included in the original PES packet. The DEC 4004 may also refer to the decoding switch information 1250 shown in FIG. 12 to decode pictures from VAUs sequentially, regardless of the DTSs. During decoding, the DEC 4004 first analyzes the VAU header to specify the compressed picture, compression encoding method, and stream attribute stored in the VAU, selecting a decoding method in accordance with this information. Compression encoding methods include, for example, MPEG-2, MPEG-4 AVC, and VC1. Furthermore, the DEC 4004 transmits the decoded, uncompressed picture to the DPB 4005.

Like the TB 4001, MB 4002, and EB 4003, the DPB 4005 is a buffer memory that uses an area of a built-in memory element in the primary video decoder 4070. Alternatively, the DPB 4005 may be located in a memory element separate from the other buffer memories 4001, 4002, and 4003. The DPB 4005 temporarily stores the decoded pictures. When a P picture or B picture is to be decoded by the DEC 4004, the DPB 4005 retrieves reference pictures, in response to an instruction from the DEC 4004, from among stored, decoded pictures. The DPB 4005 then provides the reference pictures to the DEC 4004. Furthermore, the DPB 4005 writes the stored pictures into the primary video plane memory 4090 at the time shown by the PTSs included in the original PES packets.

The secondary video decoder 4071 includes the same structure as the primary video decoder 4070. The secondary video decoder 4071 first decodes the TS packets of the secondary video stream received from the PID filter 4040 into uncompressed pictures. Subsequently, the secondary video decoder 4071 writes the uncompressed pictures into the secondary video plane memory 4091 at the time shown by the PTSs included in the PES packets.

The PG decoder 4072 decodes the TS packets received from the PID filter 4040 into uncompressed graphics data and writes the uncompressed graphics data to the PG plane memory 4092 at the time shown by the PTSs included in the PES packets. Specifically, the PG decoder 4072 first decodes the ODS belonging to each display set in the PG stream into graphics objects and writes the graphics objects into an object buffer. Next, the PG decoder 4072 reads the graphics object from the object buffer and writes it into the plane memory. In particular, the PG decoder 4072 uses a pipeline to simultaneously perform the processes of (i) writing the graphics object into the object buffer and (ii) reading a different graphics object from the object buffer and writing the different graphics object into the plane memory. The PG decoder 4072 can thus maintain precise synchronization with other decoders, such as the primary video decoder 4070.

The IG decoder 4073 decodes the TS packets received from the PID filter 4040 into uncompressed graphics data and writes the uncompressed graphics data to the IG plane memory 4093 at the time shown by the PTSs included in the PES packets. Details on these processes are the same as in the PG decoder 4072.

The primary audio decoder 4074 first stores the TS packets received from the PID filter 4040 in a buffer provided therein. Subsequently, the primary audio decoder 4074 removes the TS header and the PES header from each TS packet in the buffer, and decodes the remaining data into uncompressed LPCM audio data. Furthermore, the primary audio decoder 4074 transmits the resultant audio data to the audio mixer 4095 at the time shown by the PTS included in the original PES packet. The primary audio decoder 4074 selects the decoding method for compressed audio data in accordance with the compression encoding method and stream attributes for the primary audio stream included in the TS packets. Compression encoding methods include, for example, AC-3 and DTS.

The secondary audio decoder 4075 has the same structure as the primary audio decoder 4074. The secondary audio decoder 4075 first reconstructs PES packets from the TS packets of the secondary audio stream received from the PID filter 4040 and then decodes the data included in the PES payloads into uncompressed LPCM audio data. Subsequently, the secondary audio decoder 4075 transmits the uncompressed LPCM audio data to the audio mixer 4095 at the times shown by the PTSs included in the PES headers. The secondary audio decoder 4075 selects the decoding method for compressed audio data in accordance with the compression encoding method and stream attributes for the secondary audio stream included in the TS packets. Compression encoding methods include, for example, Dolby Digital Plus and DTS-HD LBR.

As shown in FIG. 40, the text subtitle decoder 4076, includes a text decoder (DEC) 4077 and bit map buffer 4078. The DEC 4077 is a hardware decoder specifically for the processes of decoding and rendering of text character strings and is composed of an LSI that includes, in particular, a function to accelerate these processes. The DEC 4077 first reads each text data entry from the text subtitle stream in the preload buffer 3723 and interprets the style information. Next, in accordance with the style information, the DEC 4077 uses the font set in the font buffer 3724 to decode the text information into bit map data and write the bit map data in the bit map buffer 4078. The bit map buffer 4078 is a buffer memory that uses a region in a memory element internal to the text subtitle decoder 4076. The bit map buffer 4078 transmits the corresponding bit map data to the PG plane memory 4092 at the time indicated by the PTS included in each text data entry.

When one text data entry represents a text character string of $n_C$ characters (the letters $n_C$ represent an integer greater than or equal to 1), then the time $T_{process}$ required for the DEC 4077 to decode bit map data from the text data entry and write characters into the PG plane memory 4092 is expressed by the following equation, which uses a rendering rate $R_{red}$ of text characters by the DEC 4077 and a data transfer rate $R_{tr}$ from the bit map buffer 4078 to the PG plane memory 4092: $T_{process}=n_C/R_{red}+n_C/R_{tr}$. For example, if the rendering rate $R_{red}$ and data transfer rate $R_{tr}$ are both 20 characters per second, then the time $T_{process}$ required to write 20 characters ($n_C=20$) into the PG plane memory 4092 is 20/20+20/20=2 seconds. Accordingly, if the time $T_{process}$ is restricted for example to two seconds or less using the above equation, then the data amount for one text data entry can be restricted. Accordingly, the text subtitle decoder 4076 can easily be implemented.

The audio mixer 4095 receives uncompressed audio data from both the primary audio decoder 4074 and the secondary audio decoder 4075 and then mixes the received data. The audio mixer 4095 also transmits the synthesized sound yielded by mixing audio data to, for example, an internal speaker 103A of the display device 103.

The image processor 4080 receives graphics data, i.e., PNG or JPEG raster data, from the program execution unit 3734. Upon receiving the graphics data, the image processor 4080 renders the graphics data and writes the graphics data to the image plane memory 4094.

<Structure of 3D Playback Device>

When playing back 3D video image content from the BD-ROM disc 101 in 3D playback mode, the playback device 102 operates as a 3D playback device. The fundamental part of the device's structure is identical to the 2D playback device shown in FIGS. 37 and 40. Therefore, the following is a description of sections of the structure of the 2D playback device that are enlarged or modified. Details on the fundamental parts of the 3D playback device can be found in the above description of the 2D playback device. The 3D playback device also uses the same structure as the 2D playback device for 2D playlist playback processing. Accordingly, the details on this structure can be found in the description of the 2D playback device. The following description assumes playback processing of 3D video images in accordance with 3D playlist files, i.e. 3D playlist playback processing.

Figure 41:
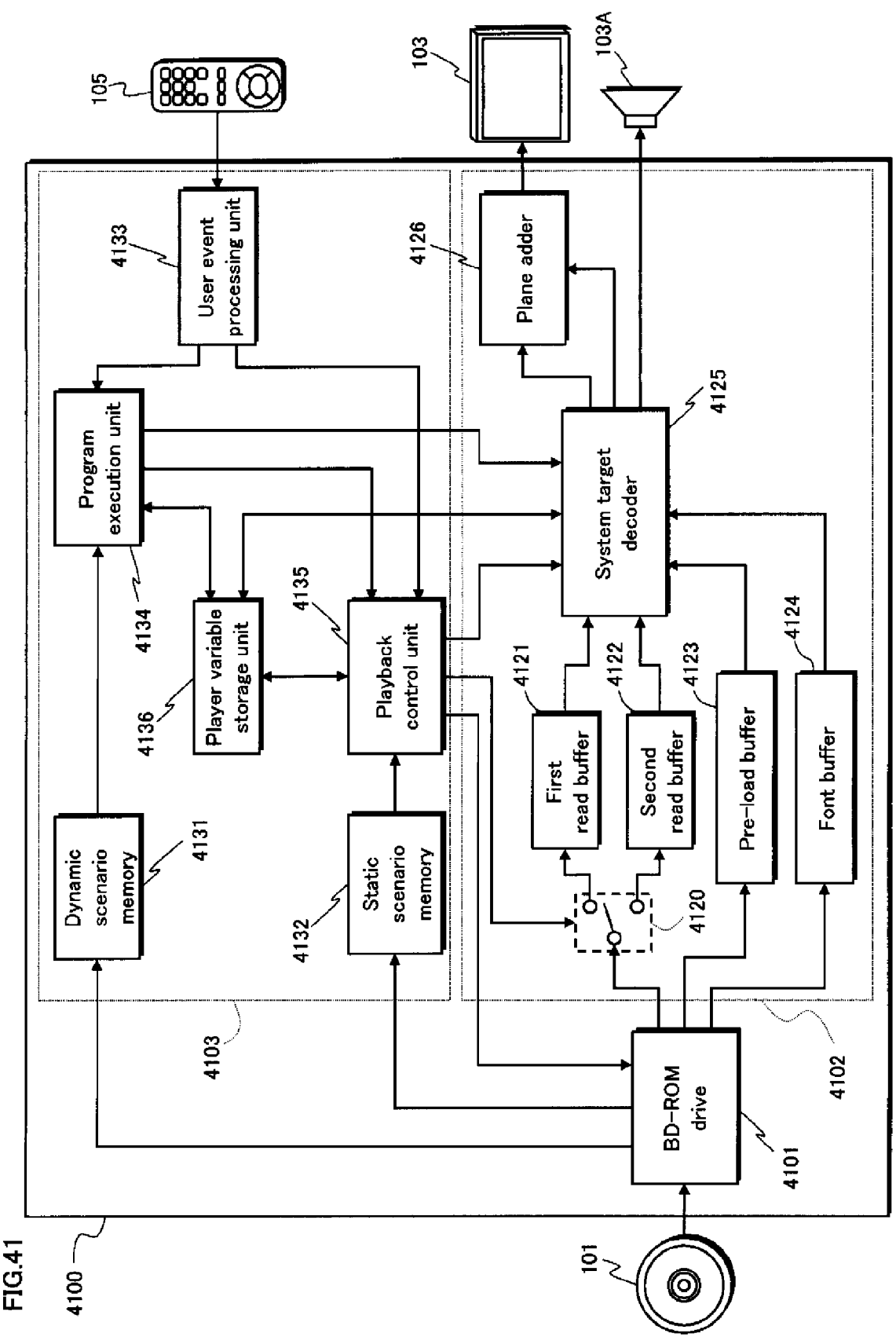
FIG. 41 is a functional block diagram of a 3D playback device 4100.

FIG. 41 is a functional block diagram of a 3D playback device 4100. The 3D playback device 4100 includes a BD-ROM drive 4101, playback unit 4102, and control unit 4103. The playback unit 4102 includes a switch 4120, first read buffer 4121, second read buffer 4122, preload buffer 4123, font buffer 4124, system target decoder 4125, and plane adder 4126. The control unit 4103 includes a dynamic scenario memory 4131, static scenario memory 4132, user event processing unit 4133, program execution unit 4134, playback control unit 4135, and player variable storage unit 4136. The playback unit 4102 and the control unit 4103 are each implemented on a different integrated circuit, but may alternatively be implemented on a single integrated circuit. In particular, the preload buffer 4123, font buffer 4124, dynamic scenario memory 4131, static scenario memory 4132, user event processing unit 4133, and program execution unit 4134 have an identical structure with the 2D playback device shown in FIG. 37. Accordingly, details thereof can be found in the above description of the 2D playback device.

When instructed by the program execution unit 4134 or other unit to perform 3D playlist playback processing, the playback control unit 4135 reads a PI from the 3D playlist file stored in the static scenario memory 4132 in order, setting the read PI as the current PI. Each time the playback control unit 4135 sets a current PI, it sets operation conditions on the system target decoder 4125 and the plane adder 4126 in accordance with the STN table of the PI and the STN table SS in the 3D playlist file. Specifically, the playback control unit 4135 selects the PID of the elementary stream for decoding and transmits the PID, together with the attribute information necessary for decoding the elementary stream, to the system target decoder 4125. If a PG stream, IG stream, or text subtitle stream is included in the elementary stream indicated by the selected PID, the playback control unit 4135 specifies the reference offset ID 3201 and offset adjustment value 3202 allocated to the stream data, setting the reference offset ID 3201 and offset adjustment value 3202 to the SPRM(27) and SPRM(28) in the player variable storage unit 4136. The playback control unit 4135 also selects the presentation mode of each piece of plane data in accordance with the offset during pop-up 3311 indicated by the STN table SS, indicating the selected presentation mode to the system target decoder 4125 and plane adder 4126.

Next, in accordance with the current PI, the playback control unit 4135 indicates the range of the LBNs in the sector group recorded in the extent SS to be read to the BD-ROM drive 4101 via the procedures in the description of FIG. 24E. Meanwhile, the playback control unit 4135 refers to the extent start points in the clip information file stored in the static scenario memory 4132 to generate information indicating the boundary of the data blocks in each extent SS. This information indicates, for example, the number of source packets from the top of the extent SS to each boundary. The playback control unit 4135 then transmits this information to the switch 4120.

The player variable storage unit 4136 includes the SPRMs shown in FIG. 38, like the player variable storage unit 3736 in the 2D playback device. However, unlike FIG. 38, SPRM(24) includes the first flag, and SPRM(25) includes the second flag, as shown in FIG. 36. In this case, when the SPRM(24) is "0", the playback device 102 only supports playback of 2D video images, and when the SPRM(24) is "1", the playback device 102 also supports playback of 3D video images. The playback device is in L/R mode when the SPRM(25) is "0" and is in depth mode when the SPRM(25) is "1".

Furthermore, in the player variable storage unit 4136, unlike FIG. 38, the SPRM(27) includes a storage area for a reference offset ID for each graphics plane, and the SPRM (28) includes a storage area for an offset adjustment value for each graphics plane. FIG. 42 is a table showing a data structure of SPRM(27) and SPRM(28). As shown in FIG. 42, SPRM(27) includes an area for storing four types of reference offset IDs 4210-4213. These reference offset IDs 4210, 4211, 4212, and 4213 are respectively for a PG plane (PG_ref_offset_id), IG plane (IG_ref_offset_id), secondary video plane (SV_ref_offset_id), and image plane (IM_ref_offset_id). The SPRM(28) includes an area for storing four types of offset adjustment values 4220-4223. These offset adjustment values 4220, 4221, 4222, and 4223 are respectively for a PG plane (PG_offset_adjustment), IG plane (IG_offset_adjustment), secondary video plane (SV_offset_adjustment), and image plane (IM_offset_adjustment).

Referring again to FIG. 41, the BD-ROM drive 4101 includes the same structural elements as the BD-ROM drive 3701 in the 2D playback device shown in FIG. 37. Upon receiving an indication from the playback control unit 4135 of a range of LBNs, the BD-ROM drive 4101 reads data from the sectors on the BD-ROM disc 101 as indicated by the range. In particular, a source packet group belonging to an extent in the file SS, i.e. belonging to an extent SS, are transmitted from the BD-ROM drive 4101 to the switch 4120. Each extent SS includes one or more pairs of a base-view and dependent-view data block, as shown in FIG. 19. These data blocks have to be transferred in parallel to different read buffers 4121 and 4122. Accordingly, the BD-ROM drive 4101 is required to have at least the same access speed as the BD-ROM drive 3701 in the 2D playback device.

The switch 4120 receives an extent SS from the BD-ROM drive 4101. On the other hand, the switch 4120 receives, from the playback control unit 4135, information indicating the boundary in each data block included in the extent SS, i.e. the number of source packets from the top of the extent SS to each boundary. The switch 4120 then refers to this information (i) to extract base-view extents from each extent SS and transmit the extents to the first read buffer 4121, and (ii) to extract dependent-view extents and transmit the extents to the second read buffer 4122.

The first read buffer 4121 and the second read buffer 4122 are buffer memories that use a memory element in the playback unit 4102. In particular, different areas in a single memory element are used as the read buffers 4121 and 4122. Alternatively, different memory elements may be used as the read buffers 4121 and 4122. The first read buffer 4121 receives base-view extents from the switch 4120 and stores these extents. The second read buffer 4122 receives dependent-view extents from the switch 4120 and stores these extents.

In 3D playlist playback processing, the system target decoder 4125 first receives PIDs for stream data to be decoded, as well as attribute information necessary for decoding the stream data, from the playback control unit 4135. The system target decoder 4125 then reads source packets alternately from base-view extents stored in the first read buffer 4121 and dependent-view extents stored in the second read buffer 4122. Next, the system target decoder 4125 separates, from each source packet, elementary streams indicated by the PIDs received from the playback control unit 4135 and decodes the elementary streams. The system target decoder 4125 then writes the decoded elementary streams in internal plane memory according to the type thereof. The base-view video stream is written in the left-video plane memory, and the dependent-view video stream is written in the right-video plane memory. On the other hand, the secondary video stream is written in the secondary video plane memory, the IG stream in the IG plane memory, and the PG stream in the PG plane memory. When the secondary video stream is composed of a pair of a base-view and a dependent-view video stream, separate secondary video plane memories are prepared for both the left-view and right-view pieces of plane data. The system target decoder 4125 also reads each text data entry from the preload buffer 4123 and uses the font set stored in the font buffer 4124 to decode the text data entries into bit map data and write the bit map data in the PG plane memory. The system target decoder 4125 additionally renders graphics data from the program execution unit 4134, such as JPEG, PNG, etc. raster data, and writes this data in the image plane memory.

The system target decoder 4125 associates the output mode of plane data from the left-video and right-video plane memories with B-D presentation mode and B-B presentation mode as follows. When the playback control unit 4135 indicates B-D presentation mode, the system target decoder 4125 alternately outputs plane data from the left-video and right-video plane memories. On the other hand, when the playback control unit 4135 indicates B-B presentation mode, the system target decoder 4125 outputs plane data from only the left-video or right-video plane memory twice per frame while maintaining the operation mode in 3D playback mode.

When the playback control unit 4135 indicates 1 plane+offset mode, then each time the system target decoder 4125 reads the VAU at the top of each video sequence from the dependent-view video stream, the system target decoder 4125 reads the offset metadata 1310 from the VAU. In the playback section of the video sequence, the system target decoder 4125 first specifies the PTS stored in the same PES packet along with each VAU and specifies the number of the frame represented by the compressed picture data of the VAU. The system target decoder 4125 then reads the offset information associated with the frame number from the offset metadata and transmits the offset information to the plane adder 4126 at the time indicated by the specified PTS.

The plane adder 4126 receives each type of plane data from the system target decoder 4125 and superimposes these pieces of plane data on one another to create one combined frame or field. In particular, in L/R mode, left-video plane data represents a left-view video plane, and right-view plane data represents a right-view video plane. Accordingly, the plane adder 4126 superimposes other plane data representing the left view on the left-video plane data and superimposes other plane data representing the right view on the right-video plane data. On the other hand, in depth mode, the right-video plane data represents a depth map for the video plane representing the left-video plane data. Accordingly, the plane adder 4126 first generates a pair of left-view and right-view pieces of video plane data from the corresponding pieces of video plane data. Subsequently, the plane adder 4126 performs the same combination processing as in L/R mode.

When receiving an indication of 1 plane+offset mode or 1 plane+zero offset mode from the playback control unit 4135 as the presentation mode for the secondary video plane, PG plane, IG plane, or image plane, the plane adder 4126 performs offset control on the plane data received from the system target decoder 4125. A pair of left-view plane data and right-view plane data is thus generated.

In particular, when 1 plane+offset mode is indicated, the plane adder 4126 first reads one of the reference offset IDs 4210-4213 that corresponds to each graphics plane from the SPRM(27) in the player variable storage unit 4136. Next, the plane adder 4126 refers to the offset information received from the system target decoder 4125 to retrieve offset information, namely an offset direction 1322 and offset value 1323, belonging to the offset sequence 1312 indicated by each reference offset ID 4210-4213. Subsequently, the plane adder 4126 reads one of the offset adjustment values 4220-4223 that corresponds to each graphics plane from the SPRM(28) in the player variable storage unit 4136 and adds each offset adjustment value to the corresponding offset value. The plane adder 4126 then uses each offset value to perform offset control on the corresponding graphics plane.

On the other hand, when 1 plane+zero offset mode is indicated, the plane adder 4126 does not refer to either SPRM(27) or SPRM(28), but rather performs offset control on each graphics plane with an offset value of "0". Accordingly, the same plane data is used for both the left-view and right-view graphics planes and combined with other pieces of plane data.

<<3D Playlist Playback Processing>>

Figure 43:
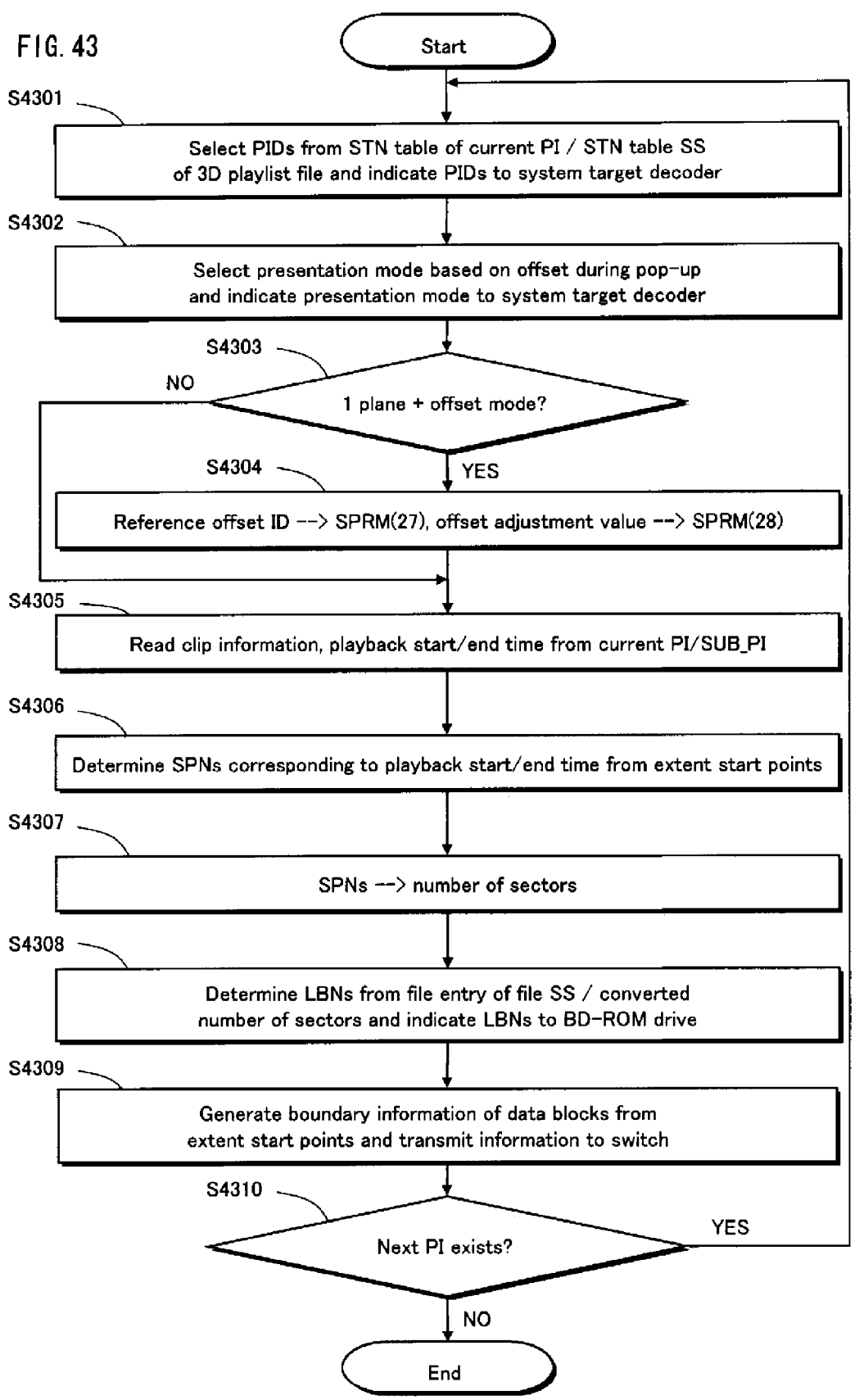
FIG. 43 is a flowchart of 3D playlist playback processing by a playback control unit 4135 shown in FIG. 41.

FIG. 43 is a flowchart of 3D playlist playback processing by a playback control unit 4135. 3D playlist playback processing is started by the playback control unit 4135 reading a 3D playlist file from the static scenario memory 4132.

In step S4301, the playback control unit 4135 first reads a single PI from a main path in the 3D playlist file and then sets the PI as the current PI. Next, from the STN table of the current PI, the playback control unit 4135 selects PIDs of elementary streams to be played back and specifies attribute information necessary for decoding the elementary streams. The playback control unit 4135 further selects, from among the elementary streams corresponding to the current PI in the STN table SS in the 3D playlist file, a PID of elementary streams that are to be added to the elementary streams to be played back, and playback control unit 4135 specifies attribute information necessary for decoding these elementary streams. The selected PIDs and attribute information are indicated to the system target decoder 4125. The playback control unit 4135 additionally specifies, from among sub-paths in the 3D playlist file, a SUB_PI to be referenced at the same time as the current PI, specifying this SUB_PI as the current SUB_PI. Thereafter, processing proceeds to step S4302.

In step S4302, the playback control unit 4135 selects the display mode for each piece of plane data based on the offset during pop-up indicated by the STN table SS and indicates the display mode to the system target decoder 4125 and the plane adder 4126. In particular, when the value of the offset during pop-up is "0", B-D presentation mode is selected as the video plane presentation mode, and 1 plane+offset mode is selected as the presentation mode for the graphics plane. On the other hand, when the value of the offset during pop-up is "1", B-B presentation mode is selected as the video plane presentation mode, and 1 plane+zero offset mode is selected as the presentation mode for the graphics plane. Thereafter, processing proceeds to step S4303.

In step S4303, the playback control unit 4135 checks whether 1 plane+offset mode or 1 plane+zero offset mode has been selected as the presentation mode of the graphics plane. If 1 plane+offset mode has been selected, processing proceeds to step S4304. If 1 plane+zero offset mode has been selected, processing proceeds to step S4305.

In step S4304, the playback control unit 4135 refers to the STN table of the current PI and retrieves the PG stream, IG stream, or text subtitle stream from among the elementary streams indicated by the selected PIDs. Furthermore, the playback control unit 4135 specifies the reference offset ID and offset adjustment value allocated to the pieces of stream data, setting the reference offset ID and offset adjustment value to the SPRM(27) and SPRM(28) in the player variable storage unit 4136. Thereafter, processing proceeds to step S4305.

In step S4305, the playback control unit 4135 reads reference clip information, a PTS #1 indicating a playback start time IN1, and a PTS #2 indicating a playback end time OUT1 from the current PI and the SUB_PI. From this reference clip information, a clip information file corresponding to each of the file 2D and the file DEP to be played back is specified. Thereafter, processing proceeds to step S4306.

In step S4306, with reference to the entry map in each of the clip information files specified in step S4305, the playback control unit 4135 retrieves the SPN #1 and SPN #2 in the file 2D, and the SPN #11 and SPN #12 in the file DEP, corresponding to the PTS #1 and the PTS #2. As described with reference to FIG. 24, referring to extent start points of each clip information file, the playback control unit 4135 further calculates, from the SPN #1 and the SPN #11, the number of source packets SPN #21 from the top of the file SS to the playback start position. The playback control unit 4135 also calculates, from the SPN #2 and the SPN #12, the number of source packets SPN #22 from the top of the file SS to the playback end position. Specifically, the playback control unit 4135 first retrieves, from among SPNs shown by extent start points of the 2D clip information files, a value "Am" that is the largest value less than or equal to SPN #1, and retrieves, from among the SPNs shown by extent start points of dependent-view clip information files, a value "Bm" that is the largest value less than or equal to the SPN #11. Next, the playback control unit 4135 obtains the sum of the retrieved SPNs Am+Bm and sets the sum as SPN #21. Next, the playback control unit 4135 retrieves, from among SPNs shown by the extent start points of the 2D clip information files, a value "An" that is the smallest value that is larger than the SPN #2. The playback control unit 4135 also retrieves, from the SPNs of the extent start points of the dependent-view clip information files, a value "Bn" that is the smallest value that is larger than the SPN #12. Next, the playback control unit 4135 obtains the sum of the retrieved SPNs An+Bn and sets the sum as SPN #22. Thereafter, processing proceeds to step S4307.

In step S4307, the playback control unit 4135 converts the SPN #21 and the SPN #22, determined in step S4306, into a pair of numbers of sectors N1 and N2. Specifically, the playback control unit 4135 first obtains the product of SPN #21 and the data amount per source packet, i.e. 192 bytes. Next, the playback control unit 4135 divides this product the data amount per sector, i.e. 2048 bytes: SPN #21×192/2048. The resulting quotient is the same as the number of sectors N1 from the top of the file SS to immediately before the playback start position. Similarly, from the SPN #22, the playback control unit 4135 calculates SPN #22×192/2048. The resulting quotient is the same as the number of sectors N2 from the top of the file SS to immediately before the playback end position. Thereafter, processing proceeds to step S4308.

In step S4308, the playback control unit 4135 specifies, from the numbers of sectors N1 and N2 obtained in step S4307, LBNs of the top and end of the extent SS group to be played back. Specifically, with reference to the file entry of the file SS to be played back, the playback control unit 4135 counts from the top of sector group in which the extent SS group is recorded so that the LBN of the (N1+1)$^{th}$ sector=LBN #1, and the LBN of the (N2+1)$^{th}$ sector=LBN #2. The playback control unit 4135 further specifies a range from the LBN#1 to the LBN#2 to the BD-ROM drive 4101. As a result, from the sector group in the specified range, a source packet group belonging to an extent SS group is read in aligned units. Thereafter, processing proceeds to step S4309.

In step S4309, referring to the extent start points of the clip information file used in step S4306, the playback control unit 4135 generates information (hereinafter referred to as "data block boundary information") indicating a boundary between dependent-view blocks and base-view data blocks included in the extent SS group, transmitting the data block boundary information to the switch 4120. As a specific example, assume that the SPN #21 indicating the playback start position is the same as the sum of SPNs indicating the extent start points, An+Bn, and that the SPN# 22 indicating the playback end position is the same as the sum of SPNs indicating the extent start points, Am+Bm. In this case, the playback control unit 4135 obtains a sequence of differences between SPNs from the respective extent start points, A(n+1)−An, B(n+1)−Bn, A(n+2)−A(n+1), B(n+2)−B(n+1), ..., Am−A(m−1), and Bm−B(m−1), and transmits the sequence to the switch 4120 as the data block boundary information. As shown in FIG. 24E, this sequence indicates the number of source packets of data blocks included in the extent SS. The switch 4120 counts, from zero, the number of source packets of the extents SS received from the BD-ROM drive 4101. Each time the count is the same as the difference between SPNs indicated by the data block boundary information, the switch 4120 switches the destination of output of the source packets between the two read buffers 4121 and 4122 and resets the count to zero. As a result, {B(n+1)−Bn} source packets from the top of the extent SS are output to the second read buffer 4122 as the first dependent-view extent, and the following {A(n+1)−An} source packets are transmitted to the first read buffer 4121 as the first base-view extent. Thereafter, dependent-view extents and base-view extents are extracted from the extent SS alternately in the same way, alternating each time the number of source packets received by the switch 4120 is the same as the difference between SPNs indicated by the data block boundary information.

In step S4310, the playback control unit 4135 checks whether an unprocessed PI remains in the main path. When an unprocessed PI remains, processing is repeated from step S4301. When no unprocessed PI remains, processing ends.

<<System Target Decoder>>

Figure 44:
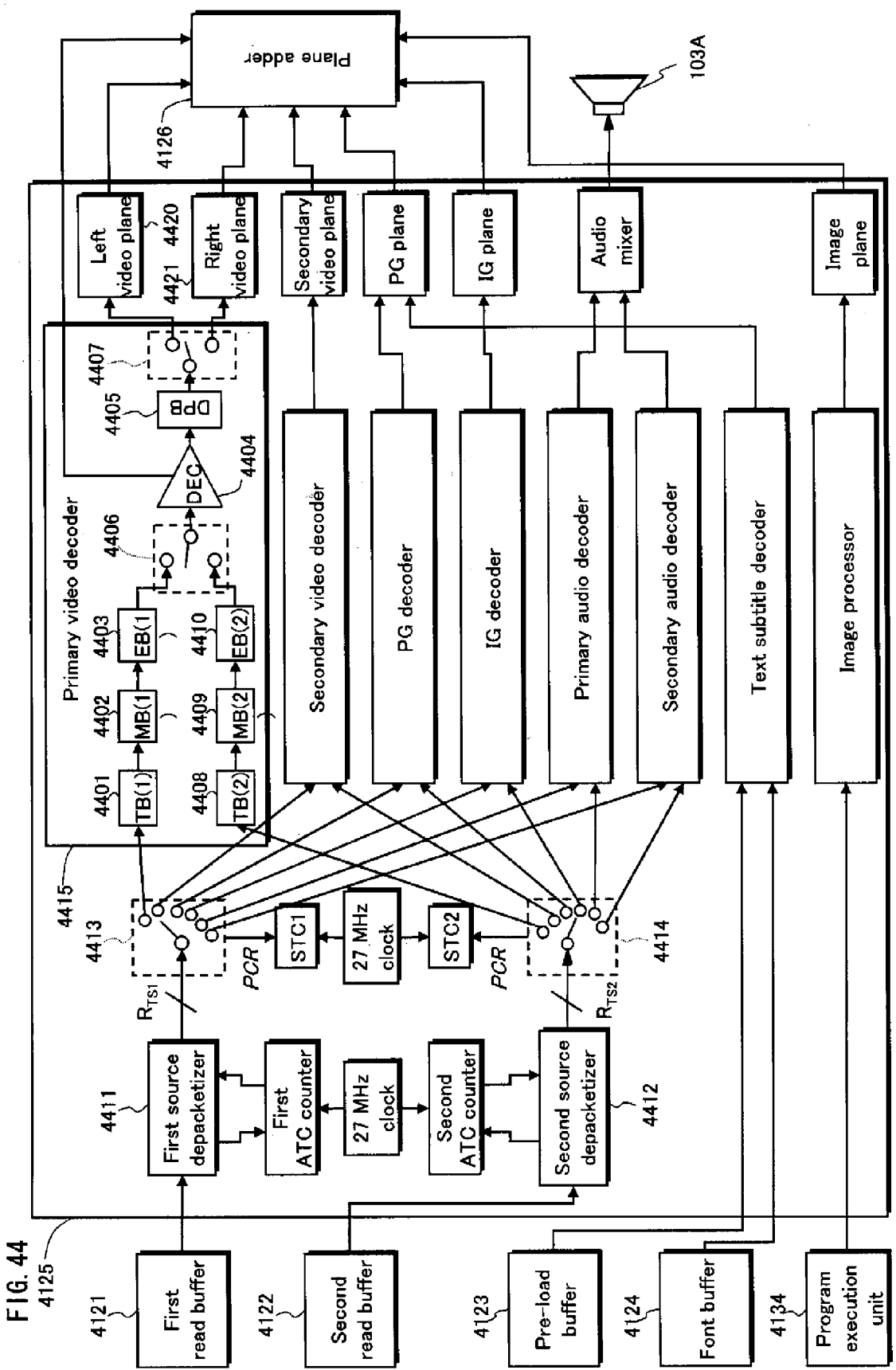
FIG. 44 is a functional block diagram of a system target decoder 4125 shown in FIG. 41.

FIG. 44 is a functional block diagram of the system target decoder 4125. The structural elements shown in FIG. 44 differ from the structural elements of the 2D playback device shown in FIG. 40 in that the input system from the read buffer to each of the decoders is doubled. On the other hand, the primary audio decoder, secondary audio decoder, text subtitle decoder, audio mixer, image processor, and plane memories are the same as those in the 2D playback device shown in FIG. 40. Accordingly, among the structural elements shown in FIG. 44, those differing from the structural elements shown in FIG. 40 are described below. Details on similar structural elements can be found in the description of FIG. 40. Furthermore, since the video decoders each have a similar structure, only the structure of the primary video decoder 4415 is described below. This description is also valid for the structure of other video decoders.

The first source depacketizer 4411 reads source packets from the first read buffer 4121. The first source depacketizer 4411 further retrieves TS packets included in the source packets and transmits the TS packets to the first PID filter 4413. The second source depacketizer 4412 reads source packets from the second read buffer 4122, furthermore retrieving TS packets included in the source packets and transmitting the TS packets to the second PID filter 4414. Each of the source depacketizers 4411 and 4412 further synchronizes the time of transfer the TS packets with the time shown by the ATS of each source packet. This synchronization method is the same method as the source depacketizer 4010 shown in FIG. 40. Accordingly, details thereof can be found in the description provided for FIG. 40. With this sort of adjustment of transfer time, the mean transfer rate $R_{TS1}$ of TS packets from the first source depacketizer 4411 to the first PID filter 4413 does not exceed the system rate indicated by the 2D clip information file. Similarly, the mean transfer rate $R_{TS2}$ of TS packets from the second source depacketizer 4412 to the second PID filter 4414 does not exceed the system rate indicated by the dependent-view clip information file.

The first PID filter 4413 compares the PID of each TS packet received from the first source depacketizer 4411 with the selected PID. The playback control unit 4135 designates the selected PID beforehand in accordance with the STN table in the 3D playlist file. When the two PIDs match, the first PID filter 4413 transfers the TS packets to the decoder assigned to the PID. For example, if a PID is 0x1011, the TS packets are transferred to TB(1) 4401 in the primary video decoder 4415. On the other hand, TS packets with PIDs ranging from 0x1B00-0x1B1F, 0x1100-0x111F, 0x1A00-0x1A1F, 0x1200-0x121F, and 0x1400-0x141F are transferred to the secondary video decoder, primary audio decoder, secondary audio decoder, PG decoder, or IG decoder respectively.

The second PID filter 4414 compares the PID of each TS packet received from the second source depacketizer 4412 with the selected PID. The playback control unit 4135 designates the selected PID beforehand in accordance with the STN table SS in the 3D playlist file. When the two PIDs match, the second PID filter 4414 transfers the TS packets to the decoder assigned to the PID. For example, if a PID is 0x1012 or 0x1013, the TS packets are transferred to TB(2) 4408 in the primary video decoder 4415. On the other hand, TS packets with PIDs ranging from 0x1B20-0x1B3F, 0x1220-0x127F, and 0x1420-0x147F are transferred to the secondary video decoder, PG decoder, or IG decoder respectively.

The primary video decoder 4415 includes a TB(1) 4401, MB(1) 4402, EB(1) 4403, TB(2) 4408, MB(2) 4409, EB(2) 4410, buffer switch 4406, DEC 4404, DPB 4405, and picture switch 4407. The TB(1) 4401, MB(1) 4402, EB(1) 4403, TB(2) 4408, MB(2) 4409, EB(2) 4410 and DPB 4405 are all buffer memories. Each of these buffer memories uses an area of a memory element included in the primary video decoder 4415. Alternatively, some or all of these buffer memories may be separated on different memory elements.

The TB(1) 4401 receives TS packets that include a base-view video stream from the first PID filter 4413 and stores the TS packets as they are. The MB(1) 4402 stores PES packets reconstructed from the TS packets stored in the TB(1) 4401. The TS headers of the TS packets are removed at this point. The EB(1) 4403 extracts and stores encoded VAUs from the PES packets stored in the MB(1) 4402. The PES headers of the PES packets are removed at this point.

The TB(2) 4408 receives TS packets that include a dependent-view video stream from the second PID filter 4414 and stores the TS packets as they are. The MB(2) 4409 stores PES packets reconstructed from the TS packets stored in the TB(2) 4408. The TS headers of the TS packets are removed at this point. The EB(2) 4410 extracts and stores encoded VAUs from the PES packets stored in the MB(2) 4409. The PES headers of the PES packets are removed at this point.

The buffer switch 4406 transfers the headers of the VAUs stored in the EB(1) 4403 and the EB(2) 4410 in response to a request from the DEC 4404. Furthermore, the buffer switch 4406 transfers the compressed picture data for the VAUs to the DEC 4404 at the times indicated by the DTSs included in the original PES packets. In this case, the DTSs are equal between a pair of pictures belonging to the same 3D VAU between the base-view video stream and dependent-view video stream. Accordingly, for a pair of VAUs that have the same DTS, the buffer switch 4406 first transmits the VAU stored in the EB(1) 4403 to the DEC 4404. Additionally, the buffer switch 4406 may cause the DEC 4404 to return the decoding switch information 1250 in the VAU. In such a case, the buffer switch 4406 can determine if it should transfer the next VAU from the EB(1) 4403 or the EB(2) 4410 by referring to the decoding switch information.

Like the DEC 4004 shown in FIG. 40, the DEC 4404 is a hardware decoder specifically for decoding of compressed pictures and is composed of an LSI that includes, in particular, a function to accelerate the decoding. The DEC 4404 decodes the compressed picture data transferred from the buffer switch 4406 in order. During decoding, the DEC 4404 first analyzes each VAU header to specify the compressed picture, compression encoding method, and stream attribute stored in the VAU, selecting a decoding method in accordance with this information. Compression encoding methods include, for example, MPEG-2, MPEG-4 AVC, MVC, and VC1. Furthermore, the DEC 4404 transmits the decoded, uncompressed picture to the DPB 4405.

Each time the DEC 4404 reads the VAU at the top of each video sequence in the dependent-view video stream, the DEC 4404 also reads the offset metadata from the VAU. In the playback section of the video sequence, the DEC 4404 first specifies the PTS stored in the same PES packet along with each VAU and specifies the number of the frame represented by the compressed picture data of the VAU. The DEC 4404 then reads the offset information associated with the frame number from the offset metadata and transmits the offset information to the plane adder 4126 at the time indicated by the specified PTS.

The DPB 4405 temporarily stores the uncompressed pictures decoded by the DEC 4404. When the DEC 4404 decodes a P picture or a B picture, the DPB 4405 retrieves reference pictures from among the stored, uncompressed pictures in response to a request from the DEC 4404 and supplies the retrieved reference pictures to the DEC 4404.

The picture switch 4407 writes the uncompressed pictures from the DPB 4405 to either the left-video plane memory 4420 or the right-video plane memory 4421 at the time indicated by the PTS included in the original PES packet. In this case, the PTSs are equal between a base-view picture and a dependent-view picture belonging to the same 3D VAU. Accordingly, for a pair of pictures that have the same PTS and that are stored by the DPB 4405, the picture switch 4407 first writes the base-view picture in the left-video plane memory 4420 and then writes the dependent-view picture in the right-video plane memory 4421.

<<Plane Adders>>

Figure 45:
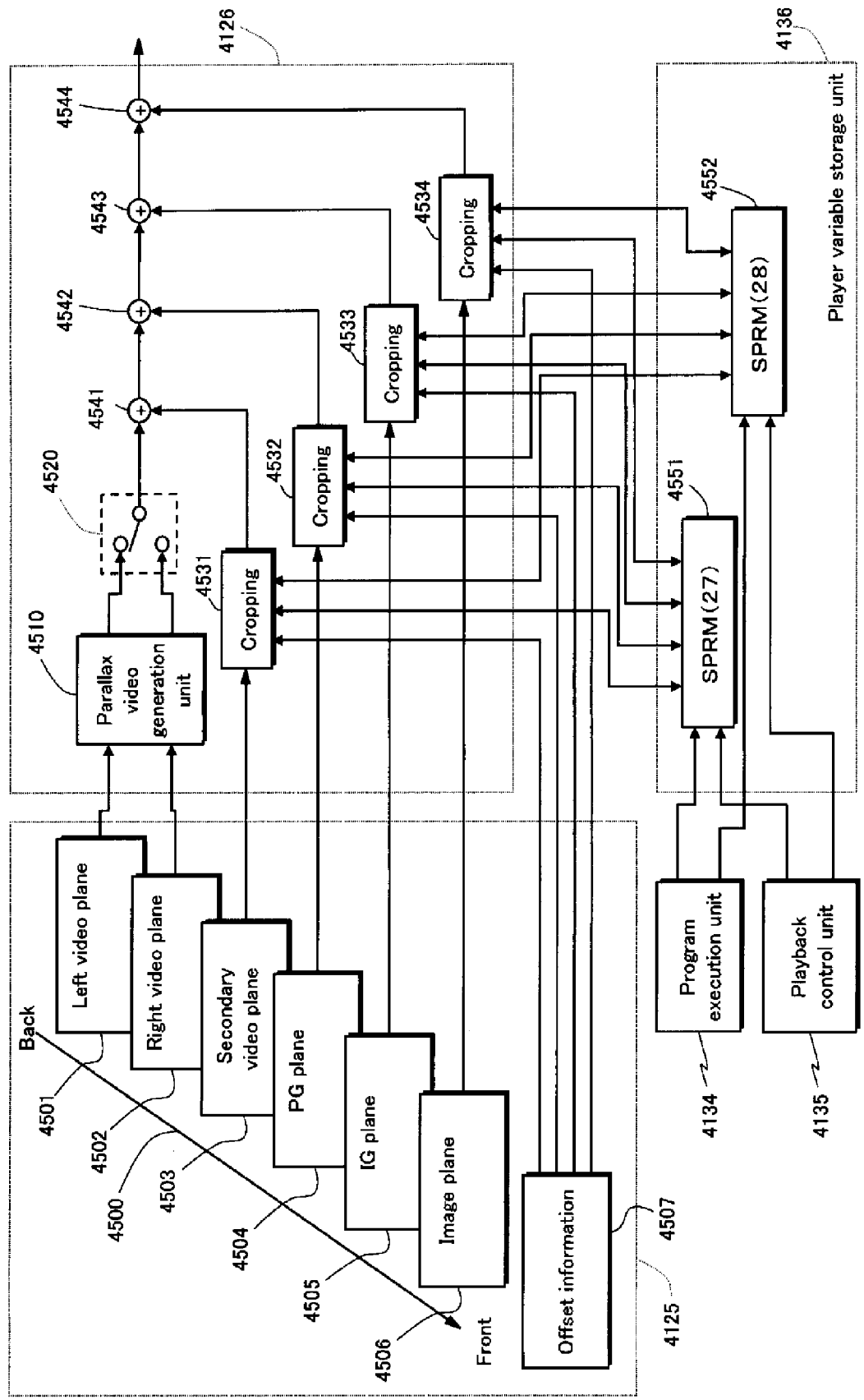
FIG. 45 is a functional block diagram of a plane adder 4126 shown in FIG. 41.

FIG. 45 is a functional block diagram of a plane adder 4126. As shown in FIG. 45, the plane adder 4126 includes a parallax video generation unit 4510, switch 4520, four cropping units 4531-4534, and four adders 4541-4544.

The parallax video generation unit 4510 receives left-video plane data 4501 and right-video plane data 4502 from the system target decoder 4125. In the playback device 102 in L/R mode, the left-video plane data 4501 represents the left-view video plane, and the right-video plane data 4502 represents the right-view video plane. At this point, the parallax video generation unit 4510 transmits the left-video plane data 4501 and the right-video plane data 4502 as they are to the switch 4520. On the other hand, in the playback device 102 in depth mode, the left-video plane data 4501 represents the video plane for 2D video images, and the right-video plane data 4502 represents a depth map for the 2D video images. In this case, the parallax video generation unit 4510 first calculates the binocular parallax for each element in the 2D video images using the depth map. Next, the parallax video generation unit 4510 processes the left-video plane data 4501 to shift the presentation position of each element in the video plane for 2D video images to the left or right according to the calculated binocular parallax. This generates a pair of video planes representing the left view and right view. Furthermore, the parallax video generation unit 4510 transmits the pair of video planes to the switch 4520 as a pair of pieces of left-video and right-video plane data.

When the playback control unit 4135 indicates B-D presentation mode, the switch 4520 transmits left-video plane data 4501 and right-video plane data 4502 with the same PTS to the first adder 4541 in that order. When the playback control unit 4135 indicates B-B presentation mode, the switch 4520 transmits one of the left-video plane data 4501 and right-video plane data 4502 with the same PTS twice per frame to the first adder 4541, discarding the other piece of plane data.

The first cropping unit 4531 includes the same structure as a pair of the parallax video generation unit 4510 and switch 4520. These structures are used when the secondary video plane data is a pair of a left view and a right view. In particular, in the playback device 102 in depth mode, the parallax video generation unit in the first cropping unit 4531 converts the secondary video plane data into a pair of left-view and right-view pieces of plane data. When the playback control unit 4135 indicates B-D presentation mode, the left-view and right-view pieces of plane data are alternately transmitted to the first adder 4541. On the other hand, when the playback control unit 4135 indicates B-B presentation mode, one of the left-view and right-view pieces of plane data is transmitted twice per frame to the first adder 4541, and the other piece of plane data is discarded.

When the playback control unit 4135 indicates 1 plane+offset mode, the first cropping unit 4531 performs the following offset control on the secondary video plane data 4503. The first cropping unit 4531 first receives offset information 4507 from the system target decoder 4125. At this point, the first cropping unit 4531 reads the reference offset ID (SV_ref_offset_id) 4212 corresponding to the secondary video plane from the SPRM(27) 4551 in the player variable storage unit 4136. Next, the first cropping unit 4531 retrieves the offset information belonging to the offset sequence indicated by the reference offset ID from the offset information 4507 received from the system target decoder 4125. Subsequently, the first cropping unit 4531 reads the offset adjustment value (SV_offset_adjustment) 4222 corresponding to the secondary video plane from the SPRM(28) 4552 in the player variable storage unit 4136 and adds the offset adjustment value to the retrieved offset value. After that, the first cropping unit 4531 refers to the offset value to perform offset control on the secondary video plane data 4503. As a result, the secondary video plane data 4503 is converted into a pair of pieces of secondary video plane data representing a left view and a right view, and this pair is alternately output.

The playback control unit 4135 generally updates the values of the SPRM(27) 4551 and SPRM(28) 4552 each time the current PI changes. Additionally, the program execution unit 4134 may set the values of the SPRM(27) 4551 and the SPRM(28) 4552 in accordance with a movie object or BD-J object.

On the other hand, when the playback control unit 4135 indicates 1 plane+zero offset mode, the first cropping unit 4531 does not perform offset control, instead outputting the secondary video plane data 4503 twice as is.

Similarly, the second cropping unit 4532 refers to the reference offset ID (PG_ref_offset_id) 4210 for the PG plane and to the offset adjustment value (PG_offset_adjustment) 4220 to perform offset control on the PG plane data 4504. The third cropping unit 4533 refers to the reference offset ID (IG_ref_offset_id) 4211 for the IG plane and to the offset adjustment value (IG_offset adjustment) 4221 to perform offset control on the IG plane data 4505. The first cropping unit 4534 refers to the reference offset ID (IM_ref_offset_id) 4213 for the image plane and to the offset adjustment value (IM_offset_adjustment) 4223 to perform offset control on the image plane data 4506.

[Flowchart of Offset Control]

Figure 46:
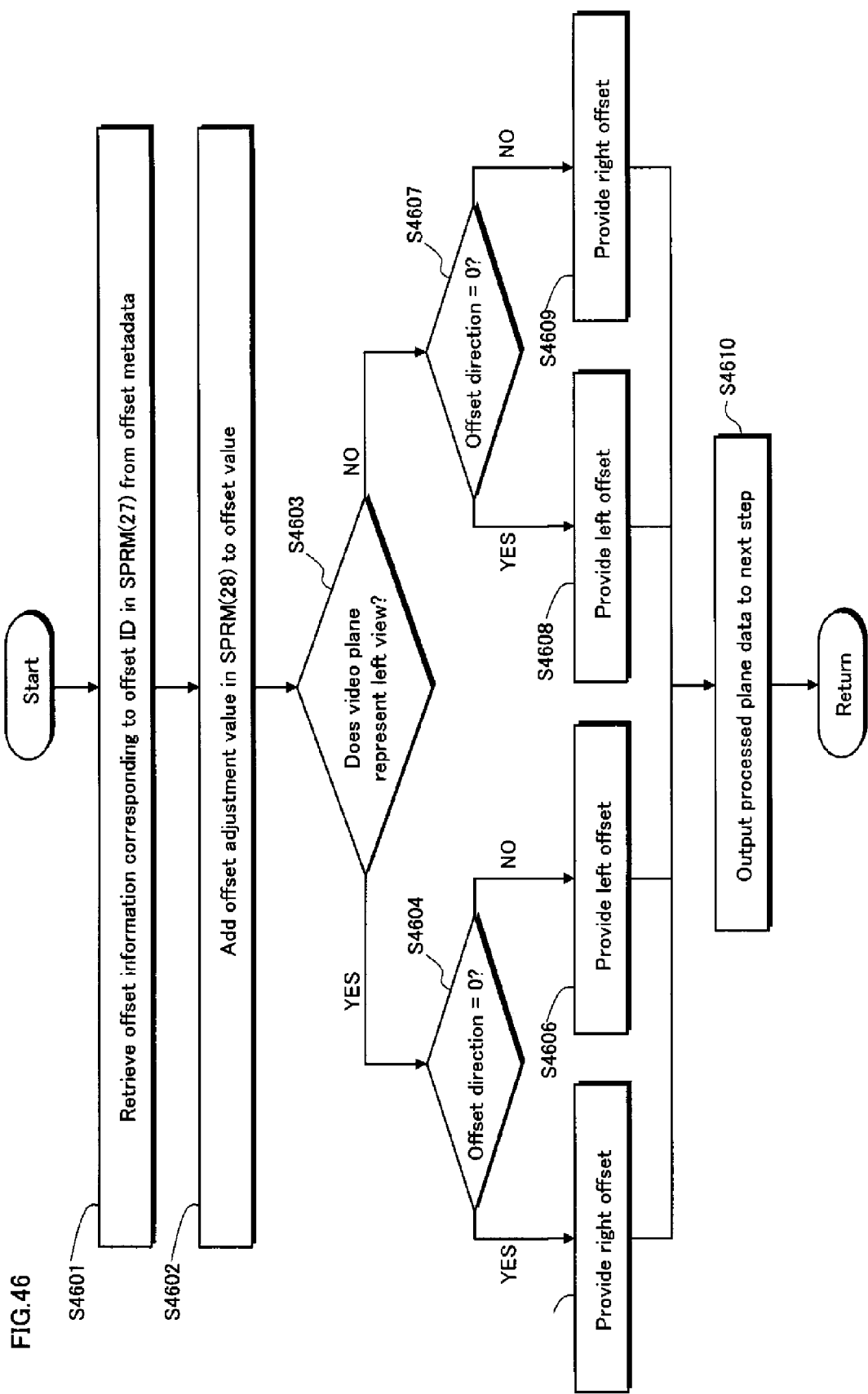
FIG. 46 is a flowchart of offset control by cropping units 4531-4534 shown in FIG. 45.

FIG. 46 is a flowchart of offset control by the cropping units 4531-4534. Each of the cropping units 4531-4534 begins offset control upon receiving offset information 4507 from the system target decoder 4125. In the following example, the second cropping unit 4532 performs offset control on the PG plane data 4504. The other cropping units 4531, 4533, and 4534 perform similar processing respectively on the secondary video plane data 4503, IG plane data 4505, and image plane data 4506.

In step S4601, the second cropping unit 4532 first receives PG plane data 4504 from the system target decoder 4125. At this point, the second cropping unit 4532 reads the reference offset ID (PG_ref_offset_id) 4210 for the PG plane from the SPRM(27) 4551. Next, the second cropping unit 4531 retrieves the offset information belonging to the offset sequence indicated by the reference offset ID from the offset information 4507 received from the system target decoder 4125. Thereafter, processing proceeds to step S4602.

In step S4602, the second cropping unit 4532 reads the offset adjustment value (PG_offset_adjustment) 4220 for the PG plane from the SPRM(28) 4552 and adds this offset adjustment value to the offset value retrieved in step S4601. Thereafter, processing proceeds to step S4603.

In step S4603, the second cropping unit 4532 checks whether the video plane data selected by the switch 4520 represents a left view or not. If the video plane data represents a left view, processing proceeds to step S4604. If the video plane data represents a right view, processing proceeds to step S4605.

In step S4604, the second cropping unit 4532 checks the value of the retrieved offset direction. Hereinafter, the following is assumed: if the offset direction value is "0", the 3D graphics image is closer to the viewer than the screen, and if the offset direction value is "1", the image is further back than the screen. In this context, when the offset direction value is "0", processing proceeds to step S4605. If the offset direction value is "1", processing proceeds to step S4606.

In step S4605, the second cropping unit 4532 provides a right offset to the PG plane data 4504. In other words, the position of each piece of pixel data included in the PG plane data 4504 is shifted to the right by the offset value. Thereafter, processing proceeds to step S4610.

In step S4606, the second cropping unit 4532 provides a left offset to the PG plane data 4504. In other words, the position of each piece of pixel data included in the PG plane data 4504 is shifted to the left by the offset value. Thereafter, processing proceeds to step S4610.

In step S4607, the second cropping unit 4532 checks the value of the retrieved offset direction. If the offset direction value is "0", processing proceeds to step S4608. If the offset direction value is "1", processing proceeds to step S4609.

In step S4608, the second cropping unit 4532 provides a left offset to the PG plane data 4504, contrary to step S4605. In other words, the position of each piece of pixel data included in the PG plane data 4504 is shifted to the left by the offset value. Thereafter, processing proceeds to step S4610.

In step S4609, the second cropping unit 4532 provides a right offset to the PG plane data 4504, contrary to step S4606. In other words, the position of each piece of pixel data included in the PG plane data 4504 is shifted to the right by the offset value. Thereafter, processing proceeds to step S4610.

In step S4610, the second cropping unit 4532 outputs the processed PG plane data 4504 to the third cropping unit 4534. Processing then terminates.

[Changes in Plane Data Via Offset Control]

Figure 47:
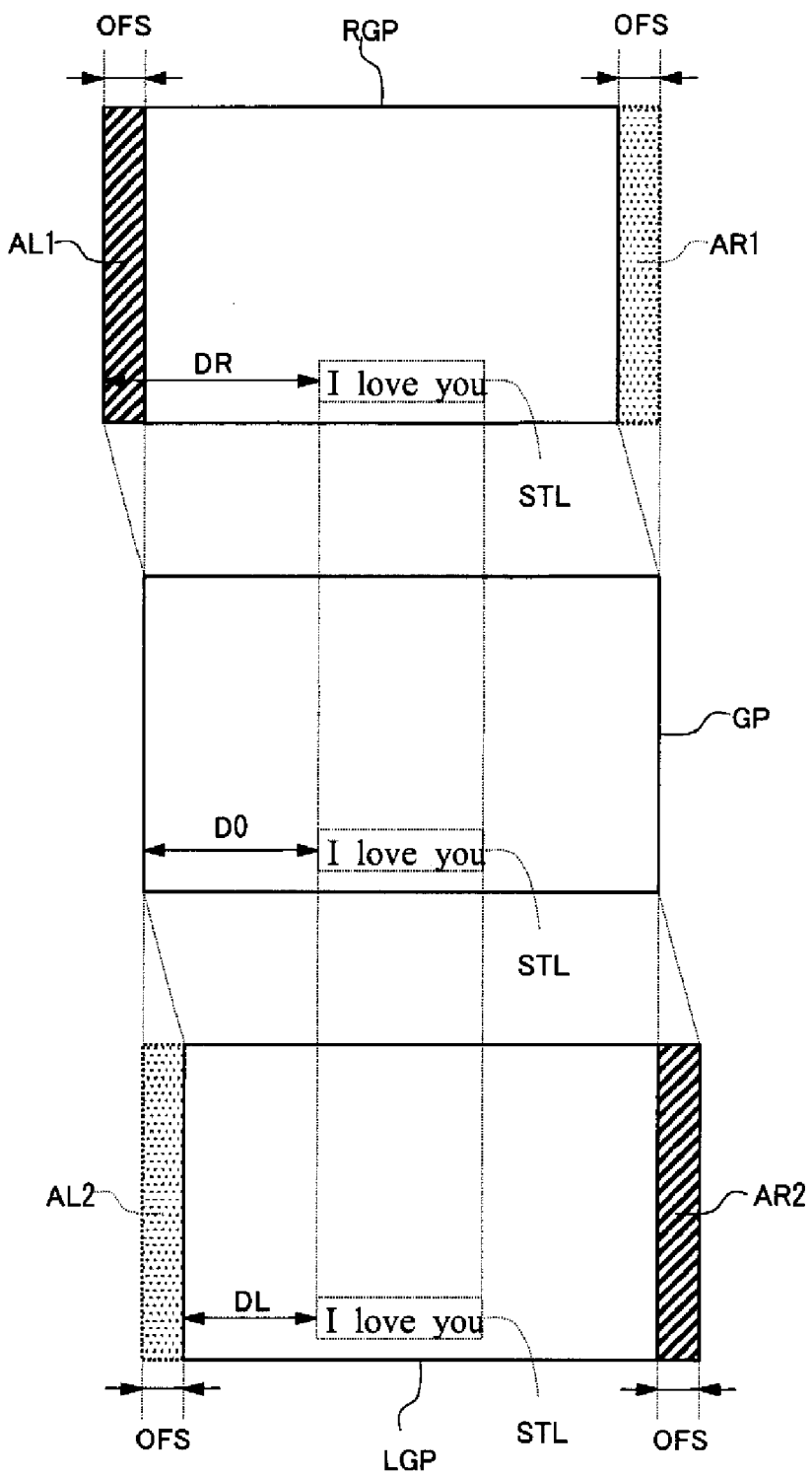
FIG. 47 is a schematic diagram showing PG plane data to which the second cropping unit 4532 shown in FIG. 45 provides offset control.

FIG. 47 is a schematic diagram showing PG plane data to which the second cropping unit 4532 provides offset control. As shown in FIG. 47, the PG plane data GP includes pixel data representing the subtitle "I love you", i.e. subtitle data STL. This subtitle data STL is located at a distance D0 from the left edge of the PG plane data GP before offset control.

When providing a right offset to the PG plane data GP, the second cropping unit 4532 changes the position of each piece of pixel data in the PG plane data GP from its original position to the right by a number of pixels OFS equal to the offset value. Specifically, the second cropping unit 4532 performs cropping to remove, from the right edge of the PG plane data GP, pixel data included in a strip AR1 of a width OFS equal to the offset value. Next, the second cropping unit 4532 forms a strip AL1 of width OFS by adding pixel data to the left edge of the PG plane data GP. The pixel data included in this strip AL1 is set as transparent. This process yields PG plane data RGP to which a right offset has been provided. Subtitle data STL is actually located at a distance DR from the left edge of this PG plane data RGP. This distance DR equals the original distance D0 plus the offset value OFS: DR=D0+OFS.

Conversely, when providing a left offset to the PG plane data GP, the second cropping unit 4532 changes the position of each piece of pixel data in the PG plane data GP from its original position to the left by a number of pixels OFS equal to the offset value. Specifically, the second cropping unit 4532 performs cropping to remove, from the left edge of the PG plane data GP, pixel data included in a strip AL2 of a width OFS equal to the offset value. Next, the second cropping unit 4532 forms a strip AR2 of width OFS by adding pixel data to the right edge of the PG plane data GP. The pixel data included in this strip AR2 is set as transparent. This process yields PG plane data LGP to which a left offset has been provided. Subtitle data STL is actually located at a distance DL from the left edge of this PG plane data RGP. This distance DL equals the original distance D0 minus the offset value OFS: DL=D0−OFS Referring again to FIG. 45, the first adder 4541 receives video plane data from the switch 4520 and receives secondary video plane data from the first cropping unit 4531. At this point, the first adder 4541 superimposes each pair of the plane data and secondary video plane data and transmits the result to the second adder 4542. The second adder 4542 receives PG plane data from the second cropping unit 4532, superimposes this PG plane data on the plane data from the first adder 4541, and transmits the result to the third adder 4543. The third adder 4543 receives IG plane data from the third cropping unit 4533, superimposes this IG plane data on the plane data from the second adder 4542, and transmits the result to the fourth adder 4544. The fourth adder 4544 receives image plane data from the fourth cropping unit 4534, superimposes this image plane data on the plane data from the third adder 4543, and outputs the result to the display device 103. The adders 4541-4544 each make use of alpha blending when superimposing plane data. In this way, the secondary video plane data 4503, PG plane data 4504, IG plane data 4505, and image plane data 4506 are superimposed in the order shown by the arrow 4500 in FIG. 45 on the left-video plane data 4501 or right-video plane data 4502. As a result, the video images indicated by each piece of plane data are displayed on the screen of the display device 103 so that the left-video plane or right-video plane appears to overlap with the secondary video plane, IG plane, PG plane, and image plane in that order.

In addition to the above-stated processing, the plane adder 4524 converts the output format of the plane data combined by the four adders 4541-4544 into a format that complies with the display method of 3D video images adopted in a device such as the display device 103 to which the data is output. If an alternate-frame sequencing method is adopted in the device, for example, the plane adder 4524 outputs the combined plane data pieces as one frame or one field. On the other hand, if a method that uses a lenticular lens is adopted in the device, the plane adder 4524 combines a pair of left-view and right-view pieces of plane data as one frame or one field of video data with use of internal buffer memory. Specifically, the plane adder 4524 temporarily stores and holds in the buffer memory the left-view plane data that has been combined first. Subsequently, the plane adder 4524 combines the right-view plane data, and further combines the resultant data with the left-view plane data held in the buffer memory. During combination, the left-view and right-view pieces of plane data are each divided, in a vertical direction, into small rectangular areas that are long and thin, and the small rectangular areas are arranged alternately in the horizontal direction in one frame or one field so as to re-constitute the frame or the field. In this way, the pair of left-view and right-view pieces of plane data is combined into one video frame or field. The plane adder 4524 then outputs the combined video frame or field to the corresponding device.

<Effects of Embodiment 1>

In the BD-ROM disc 101 according to embodiment 1 of the present invention, offset metadata is located at the top of each GOP in the dependent-view video stream. The offset metadata individually allocates offset sequence IDs to a plurality of offset sequences. Meanwhile, in a 3D playlist file, an STN table in each playback section individually allocates reference offset IDs to graphics/text streams to be decoded, i.e. a PG stream, IG stream, and text subtitle stream. Accordingly, the playback device 102 in 1 plane+offset mode can read offset information from the offset metadata in parallel with decoding of the dependent-view video stream and use this offset information for offset control on the graphics plane. Therefore, even if there are a plurality of graphics/text streams for playback, the playback device 102 can reliably maintain the correspondence between these streams and the offset information. As a result, the playback device 102 can play back 3D graphics images, along with video images represented by the video stream, at a higher quality. Furthermore, the playback device 102 does not need to preload offset information for the entire playback path in an internal memory unit. This makes it easy to reduce the capacity of the internal memory unit.

<Modifications>

(1-A) In L/R mode according to embodiment 1 of the present invention, the base-view video stream represents the left view, and the dependent-view video stream represents the right view. Conversely, however, the base-view video stream may represent the right view and the dependent-view video stream the left view.

(1-B) On the BD-ROM disc 101 according to embodiment 1 of the present invention, the base-view video stream and the dependent-view video stream are multiplexed in different TSs. Alternatively, the base-view video stream and the dependent-view video stream may be multiplexed into a single TS.

(1-C) The index file 211 shown in FIG. 35 includes a 3D existence flag 3520 and a 2D/3D preference flag 3530 that is shared by all titles. Alternatively, the index file may set a different 3D existence flag or 2D/3D preference flag for each title.

(1-D) In the AV stream file for 3D video images, data regarding the playback format of 3D video images may be added to the PMT 1810 shown in FIG. 18. In this case, the PMT 1810 includes 3D descriptors in addition to the PMT header 1801, descriptors 1802, and pieces of stream information 1803. The 3D descriptors are information on the playback format of 3D video images, are shared by the entire AV stream file, and particularly include 3D format information. The 3D format information indicates the playback format, such as L/R mode or depth mode, of the 3D video images in the AV stream file. Each piece of stream information 1803 includes 3D stream descriptors in addition to a stream type 1831, a PID 1832, and stream descriptors 1833. The 3D stream descriptors indicate information on the playback format of 3D video images for each elementary stream included in the AV stream file. In particular, the 3D stream descriptors of the video stream include a 3D display type. The 3D display type indicates whether the video images indicated by the video stream are a left view or a right view when the video images are displayed in L/R mode. The 3D display type also indicates whether the video images indicated by the video stream are 2D video images or depth maps when the video images are displayed in depth mode. When a PMT thus includes information regarding the playback format of 3D video images, the playback system of these video images can acquire such information simply from the AV stream file. This sort of data structure is therefore useful when distributing 3D video image content via a broadcast.

(1-E) The dependent-view clip information file may include, among stream attribute information 2220 such as in FIG. 22, a predetermined flag in the video stream attribute information allocated to PID=0x1012, 0x1013 of the dependent-view video stream. When turned on, this flag indicates that the dependent-view video stream refers to the base-view video stream. Furthermore, the video stream attribute information may include information regarding the base-view video stream to which the dependent-view video stream refers. This information can be used to confirm the correspondence between video streams when verifying, via a predetermined tool, whether the 3D video image content has been created in accordance with a prescribed format.

(1-F) In embodiment 1 of the present invention, the size of base-view extents and dependent-view extents can be calculated from the extent start points 2242 and 2420 included in the clip information file. Alternatively, a list of the size of each extent may be stored in, for example, the clip information file as part of the meta data.

(1-G) The reference offset IDs and offset adjustment values for the PG stream, IG stream, and text subtitle stream may be stored in the STN table SS 3130 instead of in the STN table 3205. Alternatively, this information may be stored in the stream attribute information 2220 in the clip information file. Furthermore, the reference offset ID may be stored in the subtitle entry for each PG stream and text subtitle stream or may be stored in each page of the IG stream.

(1-H) The program execution unit 4134 may set the values of the SPRM(27) 4551 and the SPRM(28) 4552 in accordance with a movie object or BD-J object. In other words, the playback device 102 may cause an application program to set the reference offset ID and offset adjustment value. Furthermore, such an application program may be limited to an object associated with the item "first play" 3501 in the index table 3510.

Figure 48:
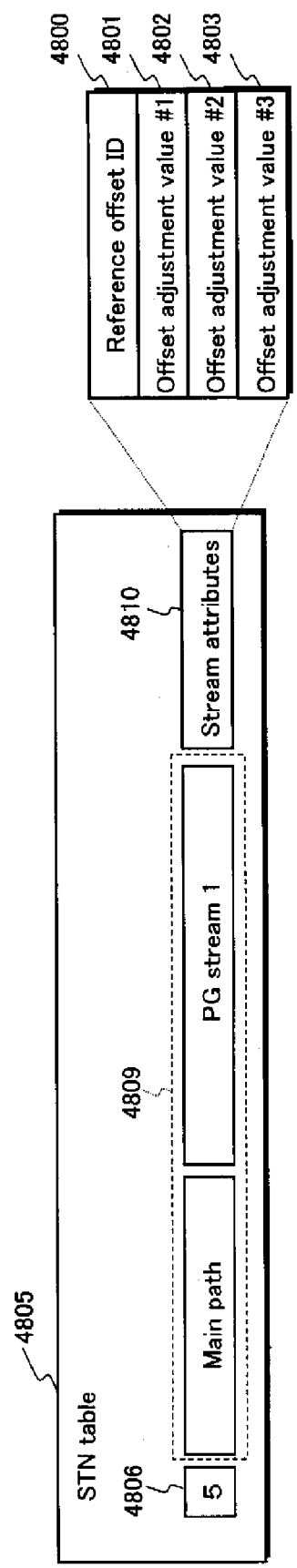
FIG. 48 is a schematic diagram showing an STN table 4805 in which is set a plurality of offset adjustment values for a single piece of stream data.

(1-I) In the STN table, a plurality of offset adjustment values may be set for one piece of stream data. FIG. 48 is a schematic diagram showing such an STN table 4805. As shown in FIG. 48, the stream attribute 4810 is associated with the same STN 4806 as the stream entry 4810 of PG stream 1. This stream attribute 4810 includes three types of offset adjustment values #1-#3 4801-4803 along with a single reference offset ID 4800. These offset adjustment values are used to change the offset to be provided to a graphics plane generated from PG stream 1 in accordance with the screen size of the display device. In this context, it is assumed that the correspondence between the types of offset adjustment values and screen size is pre-established. Specifically, the offset adjustment value #1 4801, offset adjustment value #2 4802, and offset adjustment value #3 4803 are respectively used when the screen size falls within a range of 0-33 inches, 34-66 inches, and 67 inches or greater. Each offset adjustment value 4801-4803 is set to satisfy the following condition: the maximum value of the parallax between a left-view and right-view graphics image as produced by providing an offset to a graphics plane is equal to or less than an average viewer's interpupillary distance (in the case of children, 5 cm or less). As long as this condition is satisfied, the parallax will not exceed the viewer's interpupillary distance, which reduces the danger of the viewer experiencing a form of motion sickness produced by watching 3D video images or suffering eye strain.

Figure 49:
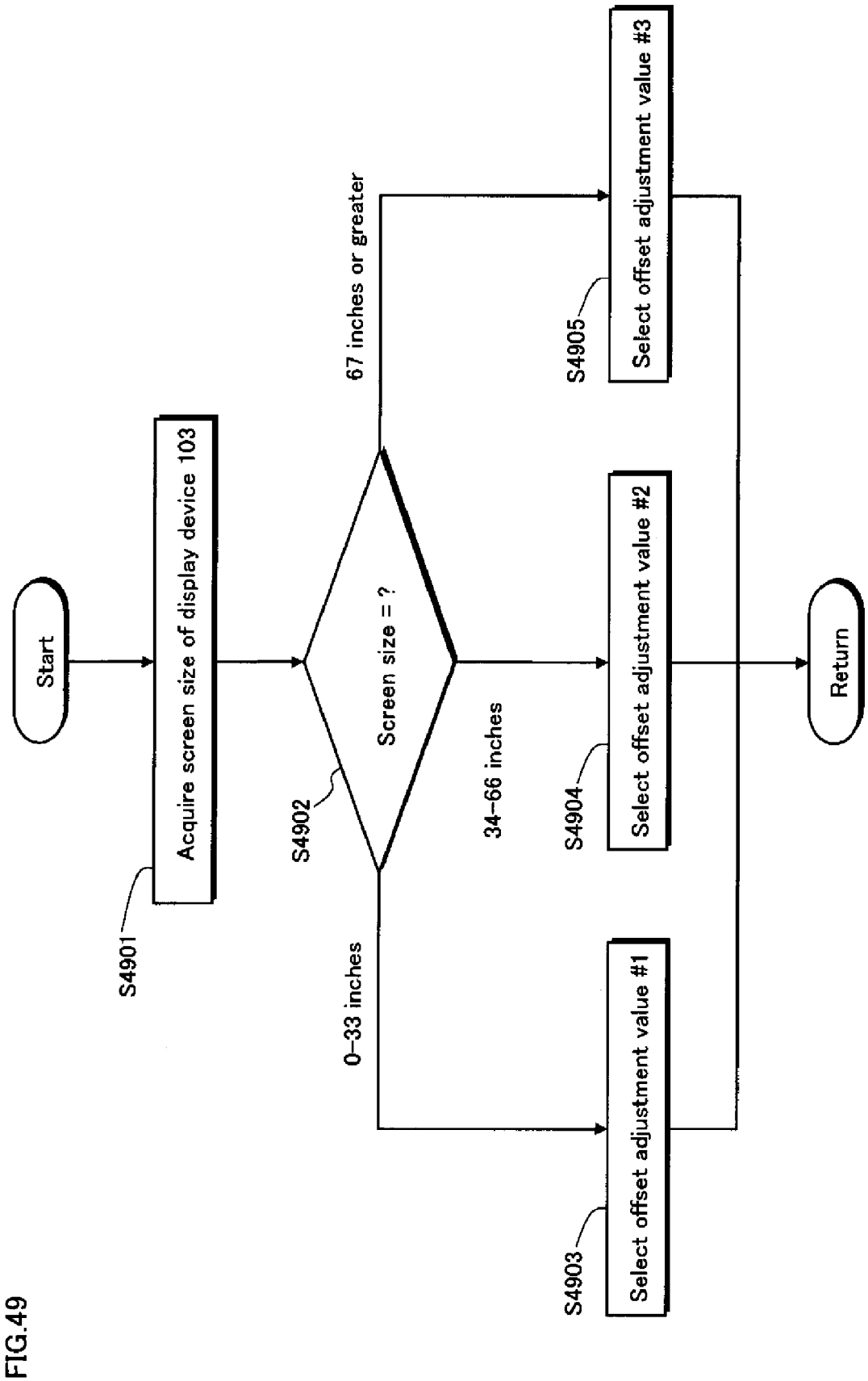
FIG. 49 is a flowchart of processing to select an offset adjustment value based on the screen size of the display device 103 shown in FIG. 1.

FIG. 49 is a flowchart of processing to select an offset adjustment value based on the screen size of the display device 103. The playback control unit 4135 of the playback device 102 performs the following selection processing when the total number of offset adjustment values allocated to a single piece of stream data changes caused by switching of the current PI.

In step S4901, the playback control unit 4135 acquires the screen size of the display device 103. At this point, the playback control unit 4135 performs HDMI authentication if necessary. Specifically, the playback control unit 4135 exchanges CEC messages with the display device 103 via the HDMI cable 122 and causes the display device 103 to transmit information indicating the screen size. On the other hand, if the screen size of the display device 103 is already stored in one of the SPRMs or the like as the value of a player variable, the playback control unit 4135 reads the screen size from the player variable storage unit 4136. Thereafter, processing proceeds to step S4902.

In step S4902, the playback control unit 4135 determines whether the screen size of the display device 103 falls within one of the following ranges: 0-33 inches, 34-66 inches, and 67 inches or greater. If the screen size falls within the ranges of 0-33 inches, 34-66 inches, and 67 or greater, then processing respectively proceeds to step S4903, S4904, and S4905.

In steps S4903, S4904, and S4905, the playback control unit 4135 respectively selects offset adjustment value #1, 4801, offset adjustment value #2, 4802, and offset adjustment value #3, 4803, then storing information representing the selected value as a player variable in the player variable storage unit 4136. Processing then terminates. This is how the playback control unit 4135 selects the type of offset adjustment value indicated by the player variable from each STN table and updates the SPRM(28) to this value until the next offset adjustment value selection processing is performed.

Figure 50:
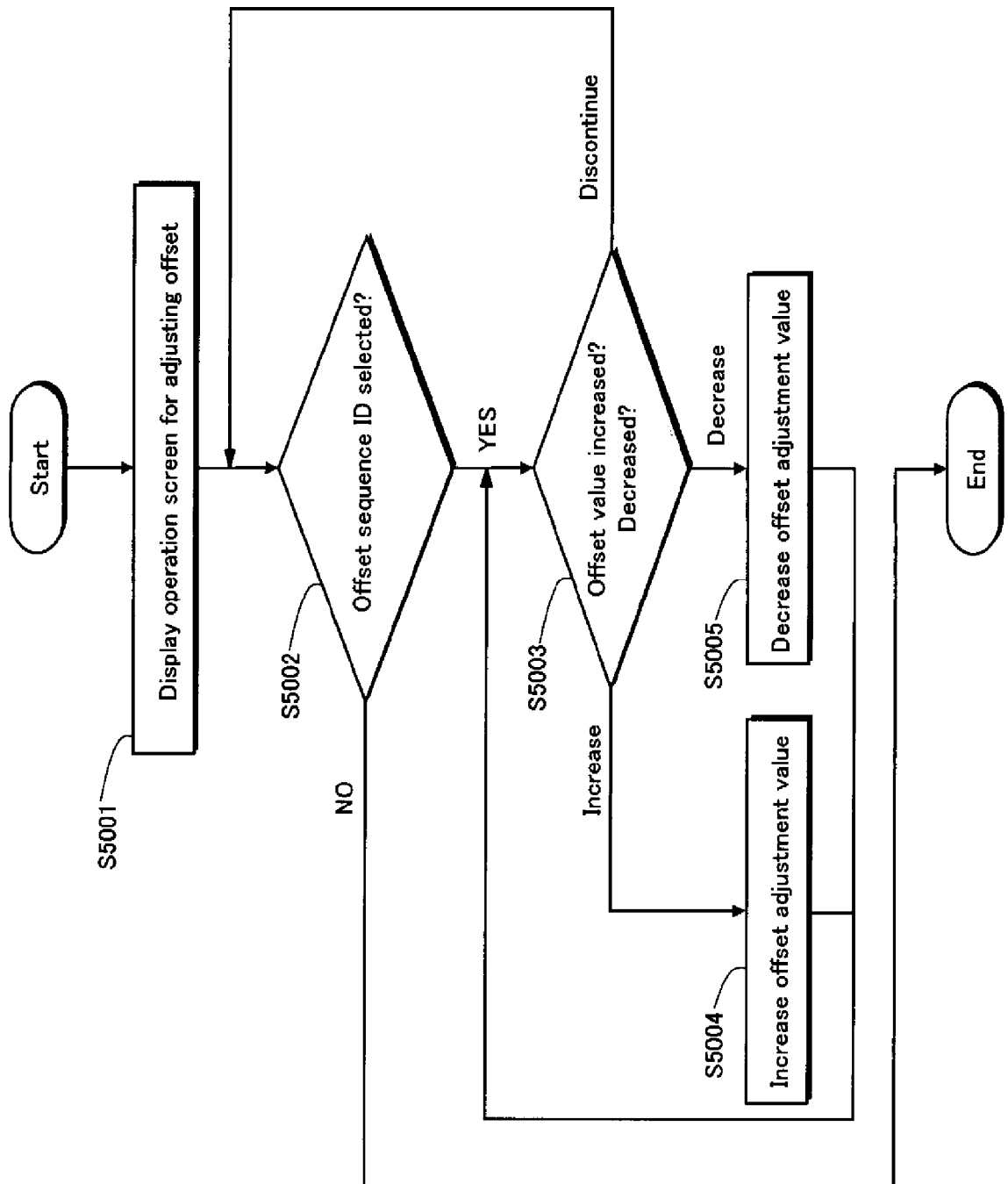
FIG. 50 is a flowchart of processing to adjust the offset that a playback control unit 4135 shown in FIG. 41 is to provide to a graphics plane.

(1-J) The playback control unit 4135 may have the viewer adjust the offset to be provided to the graphics plane. FIG. 50 is a flowchart of such adjustment processing. When the viewer operates the remote control 105 or the front panel of the playback device 102 and requests to set the offset adjustment value, the user event processing unit 4133 receives the request, whereupon processing starts.

In step S5001, in response to a request from the user event processing unit 4133, the playback control unit 4135 displays an operation screen for adjusting the offset on the display device 103. An OSD of the playback device 102 is used for displaying this operation screen. In particular, the playback unit 4102 displays the operation screen together with a graphics image. Thereafter, processing proceeds to step S5002.

In step S5002, via the operation screen the playback control unit 4135 has the viewer select a graphics plane for adjustment. Specifically, the playback control unit 4135 displays a list of graphics planes that can be selected on a menu in the operation screen so that the viewer can select a desired item by operating the remote control 105. An offset sequence ID is allocated to correspond to each item. When one of the items is selected within a predetermined time, processing proceeds to step S5003. When no item is selected within a predetermined time, or when the viewer instructs to stop processing by operating the remote control 105, processing terminates.

In step S5003, the playback control unit 4135 first stores the selected offset sequence ID. Next, via the operation screen, the playback control unit 4135 has the viewer select an increase or decrease in the offset value by operating the remote control 105. When an increase in the offset value is selected, processing proceeds to step S5004, and when a decrease is selected, processing proceeds to step S5005. When no increase or decrease is selected within a predetermined time, or when the viewer instructs to stop processing by operating the remote control 105, processing returns to step S5002.

In steps S5004 and S5005, the playback control unit 4135 updates the SPRM(28) respectively to add a predetermined value to, and subtract a predetermined value from, one of the offset adjustment values 4220-4223 that corresponds to the stored offset sequence ID. Thereafter, processing returns to step S5003.

While the loop in steps S5003-5005 is being repeated, the playback control unit 4135 causes the playback unit 4102 to continue playback processing of the graphics plane. The playback unit 4102 makes the operation screen or the graphics image—whichever is displayed closer to the viewer—semi-transparent, or displays the operation screen closer than the graphics image. This makes the graphics image visible even when the operation screen is being displayed, and thus the viewer can immediately confirm the effect of increasing or decreasing the offset value in the same way as when adjusting the brightness or color of the screen.

(1-K) The playback device 102 may have the user register an interpupillary distance as a reserved SPRM, for example SPRM(32). In this case, the playback device 102 can adjust the offset adjustment value so that the maximum value of the parallax between the left-view and right-view graphics images does not exceed the value registered in the SPRM(32). Specifically, it suffices for the playback device 102 to perform the following calculations for each offset value output by the system target decoder. The playback device 102 first seeks the ratio of the value of the SPRM(32) to the width (horizontal length) of the screen of the display device 103 and further seeks the product of this ratio and the number of horizontal pixels of the display device 103. This product represents two times the upper limit of the offset that can be provided to the graphics plane via offset control. Next, the playback device 102 compares this product with the double of each offset value. If the double of any offset value is equal to or greater than this product, the playback device 102 identifies the ID of the offset sequence that includes the offset value and reduces the offset adjustment value for the graphics plane indicated by that ID. The amount of the reduction is set to at least half the difference between the double of the offset value and the above product. The maximum value of the parallax between a left-view and a right-view graphics image thus does not exceed the viewer's interpupillary distance, which thereby reduces the danger of the viewer experiencing a form of motion sickness produced by watching 3D video images or suffering eye strain.

(1-L) For offset control, each of the cropping units 4531-4534 uses the offset sequence specified by the reference offset IDs 4210-4213 indicated by the SPRM(27). Conversely, for offset control, each cropping unit 4531-4534 may be made not to use the offset sequence specified by each offset sequence ID indicated by a predetermined SPRM. In other words, the SPRM may indicate the offset sequence IDs (PG_ref_offset_id_mask, IG_ref_offset_id_mask, SV_ref_offset_id_mask, IM_ref_offset_id_mask) that are to be masked during offset control. In this case, each of the cropping units 4531-4534 may select the ID of the offset sequence that includes the largest offset value from among the offset sequences that are received from the system target decoder 4125 and are allocated to the offset sequence IDs not masked in the offset information 4507. In this way, the depth of the graphics images represented by the secondary video plane, PG plane, IG plane, and image plane can easily be aligned. This allows for an increase in the degree of freedom when creating each piece of stream data.

Alternatively, when unable to detect a reference offset ID 4210-4213 in the offset information 4507, each cropping unit 4531-4534 may use the largest offset value included in the offset information 4507 as a substitute.

(1-M) When displaying a menu unique to the playback device 102 as an OSD, the playback device 102 may perform offset control on the graphics plane representing the 2D video images in the menu, i.e. on the OSD plane. In this case, the playback device 102 may select, within the offset information 4507 transmitted by the system target decoder 4125 at the presentation time of the menu, the offset information that has an offset direction that is closer to the viewer than the screen and that has the largest offset value. The menu can thus be displayed closer than any 3D graphics image, such as subtitles or the like, played back from the 3D video image content.

Alternatively, the playback device 102 may pre-store offset information for the OSD plane. A specific offset sequence ID, such as offset_id=0, is allocated to this offset information. Furthermore, the following two conditions may be placed on the offset information with an offset sequence ID=0: (1) The offset direction is closer to the viewer than the screen, and (2) The offset value is the same as the largest offset value among those included in the pieces of offset information that (i) are allocated to offset sequence IDs other than zero, (ii) correspond to the same frame number, and (iii) have offset directions closer to the screen than the viewer. With this prescription, the playback device 102 does not have to select offset information from among the offset information 4507 transmitted by the system target decoder 4125, thus simplifying offset control of the OSD plane. Also, each of the cropping units 4531-4534 may use offset information for offset sequence ID=0 as a substitute when unable to detect reference offset IDs 4210-4213 indicated by SPRM(27) among the offset information 4507 received from the system target decoder 4125.

(1-N) The 3D playlist file 222 shown in FIG. 31 includes one sub-path. Alternatively, the 3D playlist file may include a plurality of sub-paths. For example, if the sub-path type of one sub-path is "3D L/R", then the sub-path type of the other sub-path may be "3D depth". By switching between these two types of sub-paths when playing back 3D video images in accordance with the 3D playlist file, the playback device 102 can easily switch between L/R mode and depth mode. In particular, such switching can be performed more rapidly than switching the 3D playlist file itself.

A plurality of dependent-view video streams may represent the same 3D video images in combination with a shared base-view video stream. However, the parallax between the left view and right view for the same scene differs between the dependent-view video streams. These dependent-view video streams may be multiplexed into one sub-TS, or separated into different sub-TSs. In this case, the 3D playlist file includes a plurality of sub-paths. Each sub-path refers to a different dependent-view video stream. By switching between sub-paths when playing back 3D video images in accordance with the 3D playlist file, the playback device 102 can easily change the sense of depth of the 3D video images. In particular, such processing can be performed more rapidly than switching the 3D playlist file itself.

Figure 51:
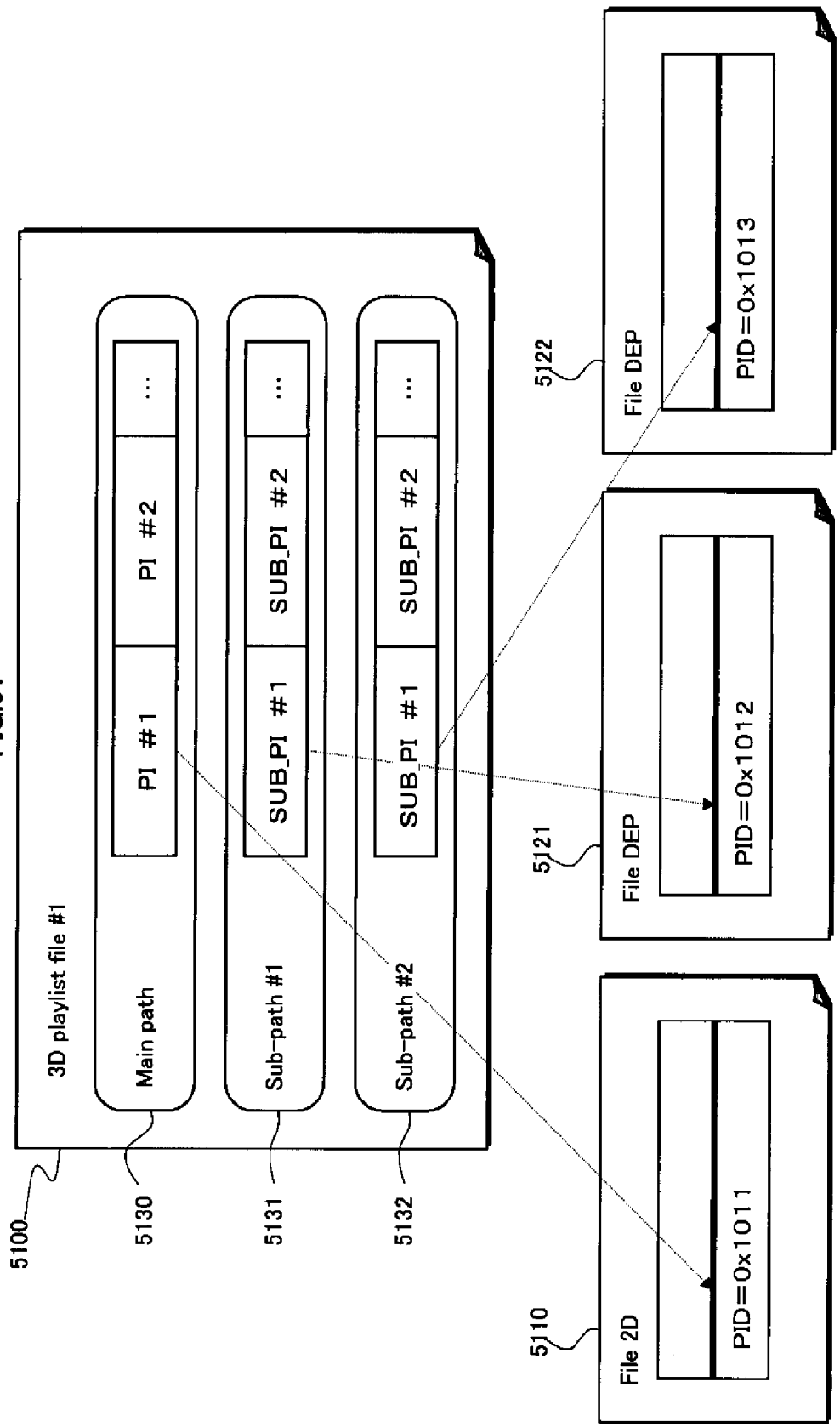
FIG. 51 is a schematic diagram showing (i) a data structure of a 3D playlist file 5100 that includes a plurality of sub-paths and (ii) a data structure of a file 2D 5110 and two files DEP 5121 and 5122 that are referred to by the 3D playlist file 5100.

FIG. 51 is a schematic diagram showing (i) a data structure of a 3D playlist file 5100 that includes a plurality of sub-paths and (ii) a data structure of a file 2D S110 and two files DEP 5121 and 5122 that are referred to by the 3D playlist file S100. The file 2D 5110 includes a base-view video stream with a PID=0x1011. The file DEP #1 5121 includes a dependent-view video stream #1 with a PID=0x1012. The file DEP #2 5122 includes a dependent-view video stream #2 with a PID=0x1013. In combination with the base-view video stream in the file 2D 5110, the dependent-view video streams #1 and #2 separately represent the same 3D video images. However, the parallax between the left view and right view for the same scene differs between the dependent-view video streams #1 and #2. Furthermore, offset sequences with the same offset sequence ID define different offset values for the same frame number.

The 3D playlist file 5100 includes a main path 5130 and two sub-paths 5131 and 5132. The PI #1 of the main path 5130 refers to file 2D 5110, in particular to the base-view video stream. The SUB_PI #1 of each of the sub-paths 5131 and 5132 shares the same playback time as the PI #1 in the main path 5130. The SUB_PI #1 of the sub-path #1 5131 refers to the file DEP #1 5121, in particular to the dependent-view video stream #1. The SUB_PI #1 of the sub-path #2 5132 refers to the file DEP #2 5122, in particular to the dependent-view video stream #2.

During 3D playlist playback processing of the 3D playlist file 5100, the playback device 102 first has a user or an application program select the sub-path for playback. Alternatively, the playback device 102 may select the sub-path for playback according to the screen size of the display device 103, as in modification (1-I), or may select the sub-path by referring to the interpupillary distance of the viewer, as in modification (1-K). By selecting the sub-path in this way, the parallax between the left-view and right-view video planes can easily be changed. Furthermore, since offset information changes caused by switching of the dependent-view video stream, the offsets of the graphics planes played back from the PG stream or IG stream included in the file 2D 5110 change. This makes it easy to change the sense of depth of the 3D video images.

If the playback device 102 supports BD-Live™, the device may use this function to download either of the files DEP #1 and #2 from a server on a network. BD-Live™ is a function of a playback device that, in accordance with an application program, downloads new digital content from an external network, such as the Internet, and plays this digital content back together with the content on a BD-ROM disc. Such new digital content includes additions to content on the BD-ROM disc, such as bonus video content and subtitles, and interactive content such as a browser screen and game, etc. By updating the dependent-view video stream via BD-Live™, the sense of depth of the 3D video images already recorded on the BD-ROM disc can be changed during playback. In particular, since offset information is stored in the dependent-view video stream, simply downloading a new file DEP makes it possible to acquire the information necessary to change the parallax between the left view and right view of either the video plane or the graphics plane.

(1-O) When reference offset IDs are set in the 3D playlist file, the following constraint conditions may be prescribed for seamless connection between PIs.

Figure 52:
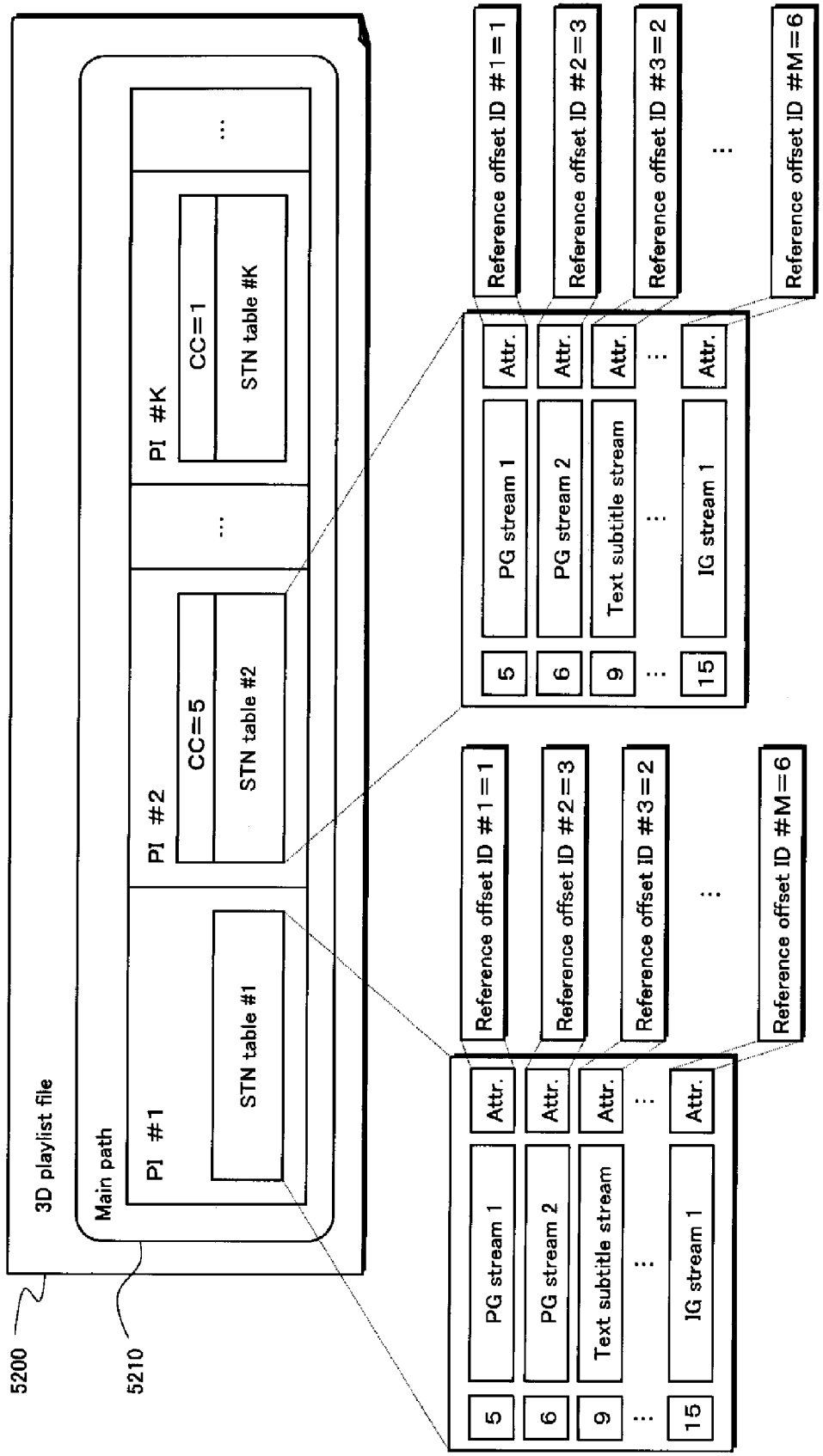
FIG. 52 is a schematic diagram showing reference offset IDs included in a 3D playlist file 5200.

FIG. 52 is a schematic diagram showing reference offset IDs included in a 3D playlist file 5200. As shown in FIG. 52, CC=5 is set in the PI #2 of the main path 5210. Accordingly, video images in the playback sections defined by PI #1 and PI #2 need to be connected seamlessly. In this case, in PI #1 and PI #2, changes are prohibited to both the values of the reference offset IDs and the number of offset sequences included in the dependent-view video stream, i.e. the number of entries. Furthermore, changes to both the offset adjustment values and the number of entries thereof may be prohibited.

The specifics of these constraint conditions are as follows. In the STN table #1 included in PI #1, reference offset ID #1=1, reference offset ID #2=3, reference offset ID #3=2, . . . , and reference offset ID #M=6 are respectively allocated to PG stream 1, PG stream 2, the text subtitle stream, . . . , and IG stream 1. In this context, the letter M represents an integer that has to be smaller than the total number X of the offset sequences included in the dependent-view video stream recorded in STN table #1: M<X. Furthermore, in the STN table #2 included in PI #2 as well, reference offset ID #1=1, reference offset ID #2=3, reference offset ID #3=2, . . . , and reference offset ID #M=6 are respectively allocated to PG stream 1, PG stream 2, the text subtitle stream, . . . , and IG stream 1. Also, the total number of offset sequences included in the dependent-view video stream recorded in STN table #2 has to equal the total number X of offset sequences included in the dependent-view video stream recorded in STN table #1. In this way, both the values of the reference offset IDs and the total number of offset sequences included in the dependent-view video stream that is referred to cannot be changed between playitems for which seamless connection is set, such as when CC=5.

With these constraint conditions, the playback device 102 can skip updating of the SPRM(27) when changing the current PI from PI #1 to PI #2. Since the processing load for seamless connection is thus reduced, the reliability of this processing can be further improved. As a result, the quality of 3D video images can be improved.

As shown in FIG. 52, CC=1 is set in the PI #K of the main path 5210. In this context, the letter K represents an integer greater than or equal to three. Accordingly, the video images in the playback section defined by PI #K do not necessarily have to be seamlessly connected to the video images in the playback section defined by the immediately prior PI #(K−1). In this case, in the STN table #K included in PI #K, the reference offset IDs and offset adjustment values can be freely set, regardless of the content of the STN table included in the prior PI. Furthermore, the playback device 102 can reset SPRM(27) and SPRM(28) when setting PI #K as the current PI.

(1-P) In some video content, such as content for displaying song lyrics during karaoke, graphics image of subtitles or the like are repeatedly displayed as still images, and only the graphics images are frequently updated. When such content is formed into 3D video image content, the VAU in which the offset metadata is placed further includes a sequence end code. When the playback device 102 decodes this VAU, it stores the offset information obtained from the offset metadata and does not change the offset information until a VAU that includes new offset metadata is decoded.

Figures 53A, 53B:
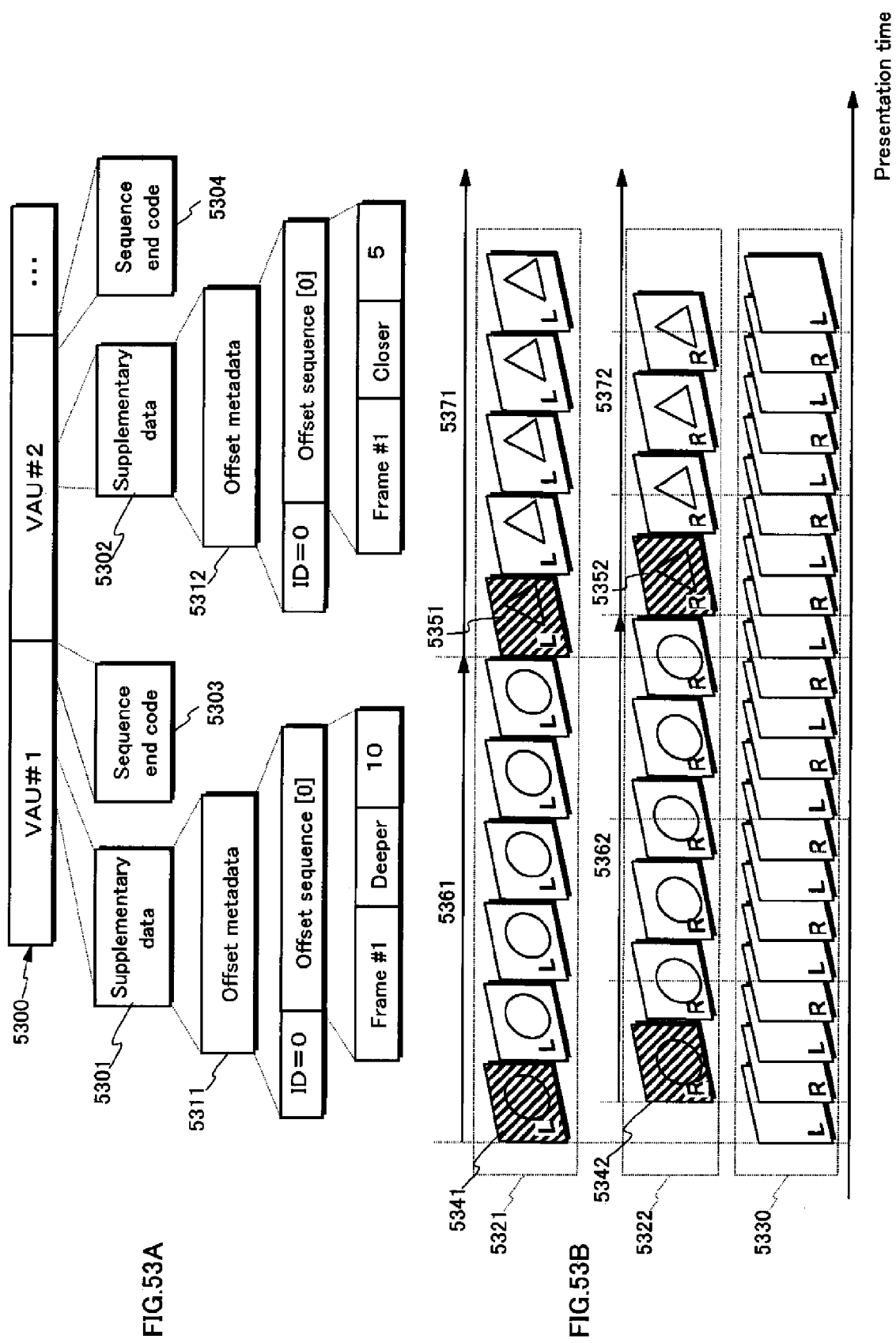
FIG. 53A is a schematic diagram showing a data structure of a dependent-view video stream 5300 representing only still images.
FIG. 53B is a schematic diagram showing a left-view video plane sequence 5321, a right-view video plane sequence 5322, and a graphics plane sequence 5330 that are played back in accordance with a 3D playlist file such as in FIG. 53A.

FIG. 53A is a schematic diagram showing a data structure of a dependent-view video stream 5300 representing only still images. Each VAU in the dependent-view video stream 5300 represents one still image. In this case, a sequence end code 5303, 5304 is placed at the end of each VAU. Meanwhile, offset metadata 5311, 5312 is placed in the supplementary data 5301, 5302 of each VAU. The offset metadata 5311 in VAU #1 includes an offset sequence [0] with an offset sequence ID=0. This offset sequence [0] includes only offset information on frame #1. Similarly, in the offset metadata 5312 of VAU #2, the offset sequence [0] includes only offset information on frame #1.

It is assumed that the 3D playlist file specifies the following two items: (1) The still images represented by the VAUs in the dependent-view video stream 5300 switch at 10 second intervals, and (2) Graphics images represented by the graphics stream are overlapped on each still image. FIG. 53B is a schematic diagram showing a left-view video plane sequence 5321, a right-view video plane sequence 5322, and a graphics plane sequence 5330 that are played back in accordance with a 3D playlist file such as in FIG. 53A. In FIG. 53B, the video planes at the time when the still image is switched are shown with hatching. In the left-view video plane sequence 5321, the still image indicated by the first video plane 5341 is repeatedly played back for the first 10 second interval 5361, and the still image indicated by the next video plane 5351 is repeatedly played back for the next 10 second interval 5371. In the right-view video plane sequence 5322, the still image indicated by the first video plane 5342 is repeatedly played back for the first 10 second interval 5362, and the still image indicated by the next video plane 5352 is repeatedly played back for the next 10 second interval 5372.

When the playback device 102 decodes VAU #1 in the dependent-view video stream 5300, it reads offset information (offset direction=further back than the screen, offset value=10 pixels) for frame #1 from the offset metadata 5311. Furthermore, the playback device 102 detects the sequence end code 5303. At this point, the playback device 102 stores the offset information for frame #1. In this way, during the first 10 second interval 5361, the offset provided to the graphics plane sequence 5330 is maintained constant in accordance with the stored offset information. In other words, the depth of the graphics images is maintained constant.

Once 10 seconds have passed after decoding of VAU #1, the playback device 102 decodes VAU #2. At this point, the playback device 102 reads new offset information (offset direction=closer than the screen, offset value=5 pixels) for frame #1 from the offset metadata 5312. Furthermore, the playback device 102 detects the sequence end code 5304. At this point, the playback device 102 stores the offset information for frame #1. In this way, during the next 10 second interval 5371, the offset provided to the graphics plane sequence 5330 is changed and maintained constant in accordance with the newly stored offset information. In other words, the graphics images are maintained constant at a new depth.

When a VAU includes a sequence end code, the playback device 102 is thus caused to store existing offset information as is. Accordingly, even when a video stream is composed only of still images, the playback device 102 can reliably maintain offset control for the graphics plane.

(1-Q) The offset metadata may be stored in the base-view video stream instead of in the dependent-view video stream. In this case as well, the offset metadata is preferably stored in the supplementary data in the VAU located at the top of each video sequence. Furthermore, the 3D playlist file may be provided with a flag indicating whether the base-view video stream or the dependent-view video stream includes the offset metadata. This allows for an increase in the degree of freedom when creating each piece of stream data. Also, it may be prescribed that this flag is "prohibited from being changed during between PIs in which video images are seamlessly connected via CC=5, 6".

(1-R) Offset metadata may be stored in each VAU (i.e., each frame or field) instead of only being stored in the top VAU in each video sequence (i.e., each GOP). Alternatively, offset metadata may be set at arbitrary intervals, such as three frames or greater, for each content. In this case, it is preferable that offset metadata always be stored in the top VAU in each video sequence and that the interval between the offset metadata and the immediately prior offset metadata be restricted to three frames or greater. Accordingly, the playback device can reliably perform processing to change offset information in parallel with interrupt playback.

(1-S) Instead of being stored in the video stream, offset metadata may be multiplexed in a main TS or a sub-TS as independent stream data. In this case, a unique PID is allocated to the offset metadata. The system target decoder refers to this PID to separate the offset metadata from other stream data. Alternatively, the offset metadata may first be preloaded into a dedicated buffer and later undergo playback processing, like the text subtitle stream. In this case, the offset metadata is stored at constant frame intervals. Accordingly, a PTS is not necessary for the offset metadata, thus reducing the data amount of the PES header. This reduces the capacity of the buffer for preloading.

Alternatively, instead of being stored in the supplementary data of a VAU, offset metadata may be embedded in the video stream with use of a video watermark. Furthermore, the offset metadata may be embedded in the audio stream with use of an audio watermark.

(1-T) In the offset metadata, instead of defining an offset value for each frame, each offset sequence may define a function that represents a change over time in the offset value for each presentation time, i.e. a completion function. In this case, the 3D playback device uses the completion function at each presentation time to calculate the offset value for each frame included in that presentation time.

FIG. 54A is a schematic diagram showing a data structure of offset metadata 5400 that uses a completion function. As shown in FIG. 54A, the offset metadata 5400 includes a correspondence table between offset sequence IDs 5410 and offset sequences 5420. An offset sequence 5420 includes a starting offset value (offset_start) 5421, an ending offset value (offset_end) 5422, offset function ID (offset_func_id) 5423, and offset_duration (offset_duration) 5424. When the offset metadata 5400 is stored in a video sequence in the dependent-view video stream, the starting offset value 5421 indicates the offset value for the first frame represented by the video sequence. The ending offset value 5422 indicates the offset value for the first frame represented by the next video sequence. The offset function ID 5423 defines the type of completion function. The type of completion function represents the shape of the changes in the offset value during the presentation time of the video sequence. The offset duration 5424 indicates the length of the presentation time of the video sequence.

FIG. 54B is a graph showing the types of elements in the completion function. As shown in FIG. 54B, the x-axis represents the presentation time, and the y-axis represents the offset value. In this context, the sign of the offset value is determined by the depth of the graphics image, i.e. by whether the 3D graphics image is further back or closer than the screen. Three types of elements in a completion function are provided: a linear shape LNR, a convex shape CVX, and a concave shape CCV. The linear shape LNR is defined by a linear function $y=ax+b$, whereas the convex shape CVX and concave shape CCV are defined by a second degree curve $y=ax^2+bx+c$, a third degree curve $y=ax^3+bx^2+cx+d$, or a gamma curve $y=a(x+b)^{1/r}+c$. In this context, the constants a, b, c, and d are parameters determined by the xy coordinates of each edge A, B of each element, i.e. by a pair of presentation time and the offset value at that point. On the other hand, the constant r is separately defined and is stored in each offset sequence. The types of completion functions are defined by one of these elements LNR, CVX, and CCV or by a combination thereof.

FIG. 54C is a graph showing offset values calculated by a 3D playback device from offset sequence IDs=0, 1, 2 shown in FIG. 54A. As shown in FIG. 54C, the horizontal axis of the graph represents the time elapsed since the first frame in each video sequence was displayed; in the video sequence, an offset sequence is stored. The black circles A0, B0, A1, B1, A2, and B2 indicate coordinates defined by either the starting offset value 5421 or ending offset value 5422 and the offset duration 5424. The lines GR0, GR1, and GR2 that respectively connect the pairs of black circles A0+B0, A1+B1, and A2+B2 represent completion functions that are each determined by the type of completion function specified in the offset function ID 5423 and by the coordinate values of the black circles A0+B0, A1+B1, and A2+B2 at the edges of the lines. In the offset sequence with offset sequence ID=0, the offset function ID 5423 indicates "linear", and thus the black circles A0 and B0 at either edge are connected by a line #0 GR0 with a linear shape LNR. In the offset sequence with offset sequence ID=1, the offset function ID 5423 indicates "curve #1", and thus the black circles A1 and B1 at either edge are connected by a line #1 GR1 with a convex shape CVX. In the offset sequence with offset sequence ID=2, the offset function ID 5423 indicates "curve #2", and thus the black circles A2 and B2 at either edge are connected by a line #2 GR2 that is formed by a combination of a convex shape CVX and a concave shape CCV. The white circles represent pairs of a presentation time for a frame and an offset value for the frame as calculated by the 3D playback device using the completion function indicated by each of the lines GR0, GR1, and GR2. As is clear from these lines GR0, GR1, and GR2, the mere combination of the starting offset value 5421, ending offset value 5422, offset function ID 5423, and offset duration 5424 can represent a variety of changes in offset value, i.e. in the depth of 3D graphics images. Accordingly, the size of the overall offset metadata can be reduced without a loss in the ability to express 3D graphics images.

(1-U) In the text subtitle decoder 4076 shown in FIG. 40, an area within the bit map buffer 4078, which stores bit map data already decoded by the text decoder (DEC) 4077, may be used as a cache. This can speed up rendering of the PG plane memory 4092 by the text subtitle decoder 4076.

FIGS. 55A, 55B, and 55C are schematic diagrams showing (i) character sequences 5501, 5502, and 5503 indicated by text data entries #1, #2, and #3 which are consecutive in a single text subtitle stream and (ii) cache data 5511, 5512, and 5513 stored in a bit map buffer when each text data entry is decoded.

As shown in FIG. 55A, the first character sequence 5501 indicated by text data entry #1 is "Hello, Good Morning" The number of characters $n_C$ equals 18: $n_C=18$. Commas and periods each count as a character. The first character sequence 5501 includes two lower-case "l" and "n" characters, three lower-case "o" characters, and one of each other character. In this case, the DEC 4077 converts the first "l", "n", and "o" and the other characters into bit map data and writes the bit map data into the bit map buffer 4078, skipping rendering of the second and subsequent instances of "l", "n", and "o". As a result, the number of characters that the DEC 4077 actually converts into bit map data, i.e. the rendering number $n_R$, is 13: $n_R=13$. On the other hand, the cache data #1 5511 at the time the text data entry #1 is decoded displays different characters one at a time. The bit map buffer 4078 transmits, from the cache data #1 5511 to the PG plane memory 4092, "l" and "n" twice each, "o" three times, and the remaining characters once each. In other words, the number of transmissions $n_T$ from the bit map buffer 4078 to the PG plane memory 4092 equals the number of characters $n_C$ in the first character sequence 5501: $n_T=n_C=18$.

As shown in FIG. 55B, the second character sequence 5502 indicated by text data entry #2 is "Nice to meet you." The number of characters $n_C$ equals 14: $n_C=14$. However, among the second character sequence 5502, bit map data for the lower-case letters "i", "e", "o", and the period is already included in the cache data #1 5511. Furthermore, the second character sequence 5502 includes the lower-case letter "t" twice. In this case, the DEC 4077 skips rendering of the "i", "e", "o", period, and the second "t", converting the first "t" and the other characters into bit map data and storing the bit map data in the bit map buffer 4078. As a result, the rendering number $n_R$ is 6: $n_R=6$. Only bit map data for characters not included in the cache data #1 5511 is added to the cache data #2 5512 at the time the text data entry #2 is decoded. The bit map buffer 4078 transmits, from the cache data #2 5512 to the PG plane memory 4092, the character "e" three times, "t" and "o" twice each, and the other characters in the second character sequence 5502 once each. In other words, the number of transmissions $n_T$ from the bit map buffer 4078 to the PG plane memory 4092 equals the number of characters $n_C$ in the second character sequence 5502: $n_T=n_C=14$.

As shown in FIG. 55C, the third character sequence 5503 indicated by text data entry #3 is "Nice to meet you, too." The number of characters $n_C$ equals 18: $n_C=18$. However, bit map data for all of the characters included in the third character sequence 5502 is already included in the cache data #2 5512. In this case, the DEC 4077 skips rendering of the entire third character sequence 5503. In other words, the rendering number $n_R$ is 0: $n_R=0$. On the other hand, the cache data #3 5513 at the time the text data entry #3 is decoded is the same as the cache data #2 5512. The bit map buffer 4078 transmits, from the cache data #3 5513 to the PG plane memory 4092, the characters "e" and "t" three times each, "o" four times, and the other characters in the third character sequence 5503 once each. In other words, the number of transmissions $n_T$ from the bit map buffer 4078 to the PG plane memory 4092 equals the number of characters $n_C$ in the third character sequence 5503: $n_T=n_C=18$.

As is clear from the above explanation, the burden on the DEC 4077 for rendering text characters can be lessened by using bit map data stored in the bit map buffer 4078 as cache data. As a result, the time necessary for rendering a character sequence on the PG plane can be reduced. In practice, when one text data entry represents a text character string of $n_C$ characters (the letters $n_C$ represent an integer greater than or equal to 1), then the time $T_{process}$ necessary for the DEC 4077 to decode a bit map data from the text data entry and write characters in the PG plane memory 4092 is represented by the following equation, which uses a rendering number $n_R$, a rendering rate $R_{red}$, and a data transfer rate $R_{tr}$ from the bit map buffer 4078 to the PG plane memory 4092: $T_{process}=n_R/R_{red}+n_C/R_{tr}$. Since the rendering number $n_R$ is clearly equal to or less than the character number $n_C$ ($n_R \leq n_C$), using a cache reduces the time $T_{process}$. For example, if the rendering rate $R_{red}$ and data transfer rate $R_{tr}$ are both 20 characters per second, then the time $T_{process}$ required to write 20 characters ($n_C=20$) into the PG plane memory 4092 is $n_R/20+20/20=(n_R/20+1)$ seconds. Accordingly, whereas the time $T_{process}$ when the rendering number $n_R=20$ is 2 seconds, the time $T_{process}$ when the rendering number $n_R=10$ is 1.5 seconds, and the time $T_{process}$ when the rendering number $n_R=0$ is 1 second. As the rendering number decreases, i.e. as the amount of cache data that is used increases, the time $T_{process}$ thus decreases.

A flag indicating whether the style information 1711 has been updated from the immediately prior text data entry may be added to each text data entry 1710 shown in FIG. 17. When the style information 1711 has been updated, the bit map data for the characters shown by the text information 1712 included in the corresponding text data entry 1710 has a low probability of being included in the cache. Accordingly, the DEC 4077 can determine whether or not to search for bit map data in the cache data based on the value of the flag.

Furthermore, bit map data in the cache may be processed on a first-in first-out (FIFO) basis. Alternatively, a flag indicating the degree of priority of the cache may be stored in the text information 1712 in each text data entry 1710, and a flag may also be stored in each text data entry 1710 to indicate whether or not the bit map data for the character sequence shown by the text information 1712 should be stored in the cache. These flags can used to keep bit map data for character sequences that occur infrequently from being stored in the cache.

<<Embodiment 2>>

A BD-ROM disc and playback device according to embodiment 2 of the present invention can prevent the risk of a "misalignment" between a left view and a right view causing viewers to feel uncomfortable. Apart from this point, the BD-ROM disc and playback device according to embodiment 2 have the same structure and functions as in embodiment 1. Accordingly, the following is a description of the BD-ROM disc and playback device according to embodiment 2 insofar as these have been changed or expanded as compared to embodiment 1. Details on the parts of the BD-ROM disc and playback device that are the same as in embodiment 1 can be found in the description of embodiment 1.

<Horizontal Misalignment Between Left View and Right View>

FIG. 56A is a plan view schematically showing horizontal angles of view HAL and HAR for a pair of video cameras CML and CMR filming 3D video images. As shown in FIG. 56A, the pair of video cameras CML and CMR are placed side by side in the horizontal direction. The left-video camera CML films the left view, and the right-video camera CMR films the right view. The horizontal angles of view HAL and HAR of the video cameras CML and CMR are the same size but differ in location. This yields a strip AL that is only included in the horizontal angle of view HAL of the left-video camera CML and a strip AR that is only included in the horizontal angle of view HAR of the right-video camera CMR. The object OBC located in the section common to both horizontal angles of view HAL and HAR is captured by both video cameras CML and CMR. However, the object OBL located in strip AL, which is included only in the horizontal angle of view HAL of the left-video camera CML, is only captured by the left-video camera CML, and the object OBR located in strip AR, which is included only in the horizontal angle of view HAR of the right-video camera CMR, is only captured by the right-video camera CMR.

FIG. 56B is a schematic diagram showing a left view LV filmed by the left-video camera CML, and FIG. 56C is a schematic diagram showing a right view RV captured by the right-video camera CMR. As shown in FIGS. 56B and 56C, the strip AL, which is included only in the horizontal angle of view HAL of the left-video camera CML, appears as a strip along the left edge of the left view LV. However, this strip AL is not included in the right view RV. On the other hand, the strip AR, which is included only in the horizontal angle of view HAR of the right-video camera CMR, appears as a strip along the right edge of the right view RV. However, this strip AR is not included in the left view LV. Accordingly, among the three objects OBL, OBC, and OBR shown in FIG. 56A, the object on the right OBR is not included in the left view LV, and the object on the left OBL is not included in the right view RV. As a result, the object on the left OBL is only visible to the viewer's left eye, and the object on the right OBR is only visible to the right eye. The left view LV and right view RV thus run the risk of causing the viewer to feel uncomfortable.

On the BD-ROM disc according to embodiment 2, information indicating the width WDH of the above strips AL and AR included in each frame of the left view LV and right view RV is stored in the dependent-view video stream. This information is stored in the same location as the offset metadata 1310 shown in FIG. 13, i.e. in the supplementary data 1301 of the VAU at the top of each video sequence. On the other hand, in the playback device according to embodiment 2, the system target decoder 4125 shown in FIG. 41 reads information showing the width WDH of the above strips AL and AR from the dependent-view video stream. Furthermore, the system target decoder 4125 transmits this information to the plane adder 4126 along with the offset information 4507 shown in FIG. 45. In the plane adder 4126, the parallax video generation unit 4510 refers to this information to process the left-video plane and the right-video plane, uniformly painting the strips AL and AR a background color or black. In other words, the pixel data included in the strips AL and AR is uniformly overwritten with data that represents a background color or black.

FIGS. 56D and 56E are schematic diagrams respectively showing a left view LV represented by a left-video plane and a right view RV represented by a right-video plane, the video planes having been processed by the parallax video generation unit 4510. As shown in FIG. 56D, the strip AL, which is included only in the horizontal angle of view HAL of the left-video camera CML, is hidden by a black strip BL of width WDH. On the other hand, as shown in FIG. 56E, the strip AR, which is included only in the horizontal angle of view HAR of the right-video camera CMR, is hidden by a black strip BR of width WDH. As a result, both of the viewer's eyes see only the area shared by the left view LV and the right view RV, which avoids the risk of causing the viewer to feel uncomfortable.

Furthermore, the parallax video generation unit 4510 may perform cropping similar to that shown in FIG. 47 to remove pixel data included in the outer half of the strips AL and AR respectively located in the left-video plane and right-video plane. In this case, the parallax video generation unit 4510 uniformly paints the remaining half of the strips AL and AR a background color or black and, in addition, adds a background-color or black strip of half the width of the strips AL and AR to the opposite side. In this way, both of the viewer's eyes see the area shared by the left view LV and the right view RV in the center of the screen, with background color or black strips at both edges of the screen. This avoids the risk of causing the viewer to feel uncomfortable.

Alternatively, the parallax video generation unit 4510 may process the left-video plane and right-video plane as follows. First, via cropping similar to that shown in FIG. 47, the parallax video generation unit 4510 removes the pixel data in the strips AL and AR from each of the video planes. Next, the parallax video generation unit 4510 resizes each video plane from the pixel data in the remaining area via scaling. The video image shown by the remaining area is thus expanded to fill the entire frame. As a result, both of the viewer's eyes see only the area shared by the left view LV and the right view RV, which avoids the risk of causing the viewer to feel uncomfortable.

Note that the horizontal misalignment between the left view and the right view may also occur when stereoscopic video images are generated from monoscopic video images filmed with a single camera, i.e. during 2D/3D conversion. In this case as well, the misalignment may be hidden in the same way as above. In other words, part of the pixel data may be removed from each of the left-video picture data (left-video plane) and the right-video picture data (right-video plane) and replaced by different pixel data, or the remaining pixel data may be expanded to fill the entire picture (frame).

<Vertical Misalignment Between Left View and Right View>

FIG. 57A is a plan view schematically showing vertical angles of view VAL and VAR for a pair of video cameras CML and CMR filming 3D video images. As shown in FIG. 57A, the vertical angles of view VAL and VAR for the video cameras CML and CMR are the same size but differ in location. This yields a strip ΔT that is only included in the vertical angle of view VAL of the left-video camera CML and a strip AB that is only included in the vertical angle of view VAR of the right-video camera CMR. The object OBJ located in the section common to both vertical angles of view VAL and VAR is captured by both video cameras CML and CMR. However, objects located in strip AT, which is included only in the vertical angle of view VAL of the left-video camera CML, are only captured by the left-video camera CML, and objects located in strip AB, which is included only in the vertical angle of view VAR of the right-video camera CMR, are only captured by the right-video camera CMR.

FIG. 57B is a schematic diagram showing a left view LV filmed by the left-video camera CML and a right view RV filmed by the right-video camera CMR. As shown in FIG. 57B, the strip AT, which is included only in the vertical angle of view VAL of the left-video camera CML, appears as a strip along the top of the left view LV. However, this strip ΔT is not included in the right view RV. On the other hand, the strip AB, which is included only in the vertical angle of view VAR of the right-video camera CMR, appears as a strip along the bottom edge of the right view RV. However, this strip AB is not included in the left view LV. Note that the positions of the strips ΔT and AB may be reversed between the left view LV and right view RV. In this way, when the left view LV and right view RV differ with regards to inclusion of the strips ΔT and AB, the vertical position of the object OBJ shown in FIG. 57A differs between the left view LV and the right view RV by the height HGT of the strips ΔT and AB. As a result, the vertical position of the object OBJ differs as seen by the viewer's left eye and right eye, which has the risk of causing the viewer to feel uncomfortable.

On the BD-ROM disc according to embodiment 2, information indicating the height HGT of the above strips ΔT and AB included in each frame of the left view LV and right view RV is stored in the dependent-view video stream. This information is stored in the same location as the offset metadata 1310 shown in FIG. 13, i.e. in the supplementary data 1301 of the VAU at the top of each video sequence. On the other hand, in the playback device according to embodiment 2, the system target decoder 4125 shown in FIG. 41 reads information showing the height HGT of the above strips ΔT and AB from the dependent-view video stream. Furthermore, the system target decoder 4125 transmits this information to the plane adder 4126 along with the offset information 4507.

In the plane adder 4126, the parallax video generation unit 4510 refers to the height of the strips ΔT and AB to process the left-video plane and the right-video plane as follows. First, the parallax video generation unit 4510 shifts the position of the pixel data in the left-video plane up by half the height HGT, i.e. HGT/2, and shifts the position of the pixel data in the right-video plane down by HGT/2. The vertical center of the video image shown in the area of the video planes other than the strips ΔT and AB thus matches the vertical center of the screen. In the left-video plane, half of the strip ΔT is removed from the top, yielding an empty strip with a height of HDT/2 at the bottom. In the right-video plane, half of the strip AB is removed from the bottom, yielding an empty strip with a height of HDT/2 at the top. Next, the parallax video generation unit 4510 uniformly paints the strips a background color or black. In other words, the pixel data included in the strips is uniformly overwritten with data that represents a background color or black.

FIG. 57C is a schematic diagram showing a left view LV represented by a left-video plane and a right view RV represented by a right-video plane, the video planes having been processed by the parallax video generation unit 4510. As shown in FIG. 57C, the vertical centers of the left view LV and the right view RV match. Accordingly, the vertical position of the object OBJ shown in FIG. 57A is the same in the left view LV and the right view RV. At the top of the left view LV, the strip AT, which is included only in the vertical angle of view VAL of the left-video camera CML, is hidden by a black strip BT of height HGT/2, and at the bottom of the right view RV, the strip AB, which is included only in the vertical angle of view VAR of the right-video camera CMR, is hidden by a black strip BB of height HGT/2. Furthermore, a black strip BB of height HGT/2 is added to the bottom of the left view LV, and a black strip BT of height HGT/2 is added to the top of the right view RV. As a result, both of the viewer's eyes see only the area shared by the left view LV and the right view RV, and the vertical positions match between the object seen by each eye. This avoids the risk of causing the viewer to feel uncomfortable.

Alternatively, the parallax video generation unit 4510 may process the left-video plane and right-video plane as follows. First, via cropping similar to that shown in FIG. 47, the plane adder 4126 removes the pixel data in the strips ΔT and AB from each of the video planes. Next, the parallax video generation unit 4510 resizes each video plane from the pixel data in the remaining area via scaling. The video image shown by the remaining area is thus expanded to fill the entire frame, and as a result, both of the viewer's eyes see only the area shared by the left view LV and the right view RV. Furthermore, the vertical positions match between the object seen by each eye. This avoids the risk of causing the viewer to feel uncomfortable.

<Misalignment of Graphics Images Between Left View and Right View>

When a playback device in 1 plane+offset mode provides a large offset to a graphics plane to generate a pair of graphics planes, a region in the right or left edge of one graphics plane may not be included in the right or left edge of the other graphics plane.

FIG. 58A is a schematic diagram showing an example of graphics images represented by a graphics plane GPL. As shown in FIG. 58A, the graphics plane GPL represents three types of graphics elements OB1, OB2, and OB3. In particular, the left edge of the left graphics element OB1 is located at a distance D1 from the left edge of the graphics plane GPL, and the right edge of the right graphics element OB3 is located at a distance D3 from the right edge of the graphics plane GPL. FIGS. 58B and 58C are schematic diagrams respectively showing a right and left offset provided to the graphics plane GPL. As shown in FIG. 58B, a strip AR1 of width OFS equal to the offset value is removed from the right edge of the graphics plane GPL, and a transparent strip AL1 of width OFS is added to the left edge, in a way similar to that shown in FIG. 47. The horizontal positions of the graphics elements OB1-0B3 are thus shifted to the right from their original positions by a distance OFS equal to the offset value. On the other hand, as shown in FIG. 58B, a strip AL2 of width OFS equal to the offset value is removed from the left edge of the graphics plane GPL, and a transparent strip AR2 of width OFS is added to the right edge, in a way similar to that shown in FIG. 47. The horizontal positions of the graphics elements OB1-OB3 are thus shifted to the left from their original positions by the distance OFS.

As shown in FIGS. 58B and 58C, the distance OFS, which is equal to the offset value, is larger than the distance D1 between the left edge of the left graphics element OB1 and the left edge of the graphics plane GPL. The distance OFS is also larger than the distance D3 between the right edge of the right graphics element OB3 and the right edge of the graphics plane GPL. Accordingly, a portion MP3 of the right edge of the right graphics element OB3 is missing in the graphics plane GP1 to which a right offset has been provided. Also, a portion MP1 of the left edge of the left graphics element OB1 is missing in the graphics plane GP2 to which a left offset has been provided. However, the missing portion MP1 of the left graphics element OB1 is included in the graphics plane GP1 with the right offset, and the missing portion MP3 of the right graphics element OB3 is included in the graphics plane GP2 with the left offset. As a result, these missing portions MP1 and MP3 are only seen by one of the viewer's eyes, which may make the viewer feel uncomfortable.

On the BD-ROM disc according to embodiment 2, as shown in FIG. 13, the offset metadata 1310 is stored in the top of each video sequence in the dependent-view video stream. On the other hand, in the playback device according to embodiment 2, the system target decoder 4125 shown in FIG. 41 reads the offset metadata from the dependent-view video stream, transmitting this offset metadata to the plane adder 4126 as the offset information 4507 shown in FIG. 45. In the plane adder 4126, each of the cropping units 4531-4534 shown in FIG. 45 refers to the offset information 4507 to perform offset control on the graphics plane GPL. At this point, each of the cropping units 4531-4534 furthermore removes a strip, of a width equal to the offset value, that extends along the left or right edge of the graphics plane GPL. In other words, the pixel data in the strip is overwritten with data representing a transparent color. FIGS. 58B and 58C show the strips AS1 and AS2 to be removed. In the graphics plane GP1 with the right offset, the strip AS1 to be removed includes the missing portion MP1 of the left graphics element OBL In the graphics plane GP2 with the left offset, the strip AS2 to be removed includes the missing portion MP3 of the right graphics element OB3.

FIGS. 58D and 58E are schematic diagrams showing graphics images represented by the graphics planes GP1 and GP2 with the right and left offsets, respectively. As shown in FIGS. 58D and 58E, in the graphics planes GP1 and GP2, the shapes of the three types of graphics elements OB1-0B3 match. As a result, only the shared part of the graphics images are visible to each of the viewer's eyes. This avoids the risk of causing the viewer to feel uncomfortable.

Figure 59:
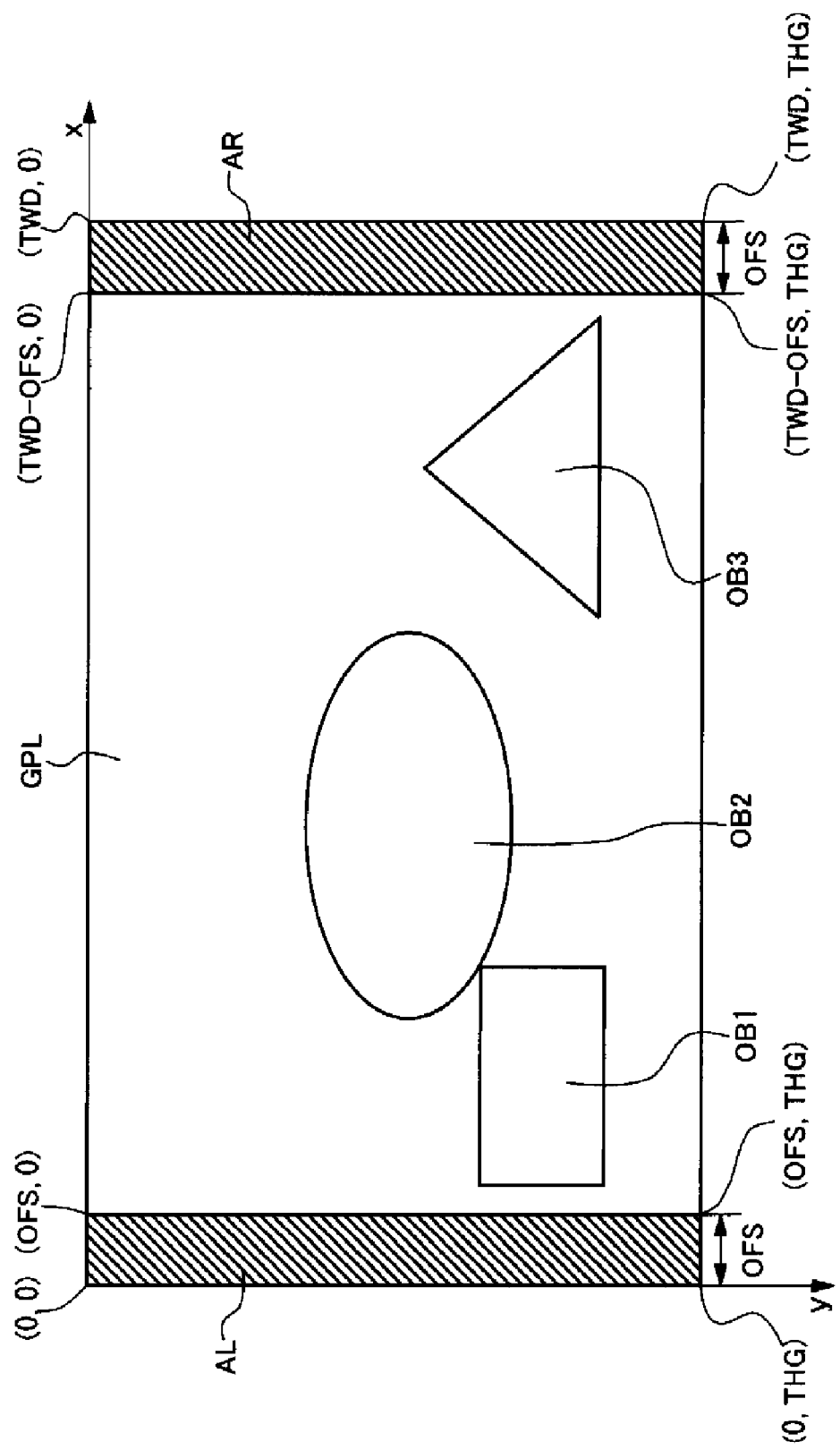
FIG. 59 is a schematic diagram showing a condition regarding the arrangement of graphics elements for a graphics plane played back from a PG stream, IG stream, and text subtitle stream on a BD-ROM disc and for a graphics plane generated by a playback device.

Alternatively, the following condition may be prescribed regarding the arrangement of graphics elements for graphics planes played back from a PG stream, IG stream, and text subtitle stream on a BD-ROM disc and for a graphics plane generated by a playback device. FIG. 59 is a schematic diagram showing such a condition. As shown in FIG. 59, xy orthogonal coordinates are established on the graphics plane GPL, with an origin (0, 0) at the upper-left corner. The x and y coordinates are respectively the horizontal and vertical coordinates of the graphics plane GPL. The coordinates of the lower-right corner of the graphics plane GPL are set to (TWD, THG). Using these xy coordinates, the condition is set as follows: in each frame, the graphics elements OB1, OB2, and OB3 must be positioned within the rectangular area having four points (OFS, 0), (TWD-OFS, 0), (TWD-OFS, THG), and (OFS, THG) as vertices. In other words, graphics elements are prohibited from being placed within the strips AL and AR of width OFS which respectively extend along the left edge and right edge of the graphics plane GPL. As is clear from FIGS. 58B and 58C, these strips AL and AR are removed by offset control. Accordingly, if graphics elements are prohibited from being placed within the strips AL and AR, the shapes of the graphics elements do not change even when an offset is provided to the graphics plane GPL. As a result, both of the viewer's eyes see the same graphics images, which avoids the risk of causing the viewer to feel uncomfortable. Note that even when the position of graphics elements is restricted in this way, a portion of the original graphics data is deleted in the graphics data output to the display device, as shown in FIG. 58.

Figure 60:
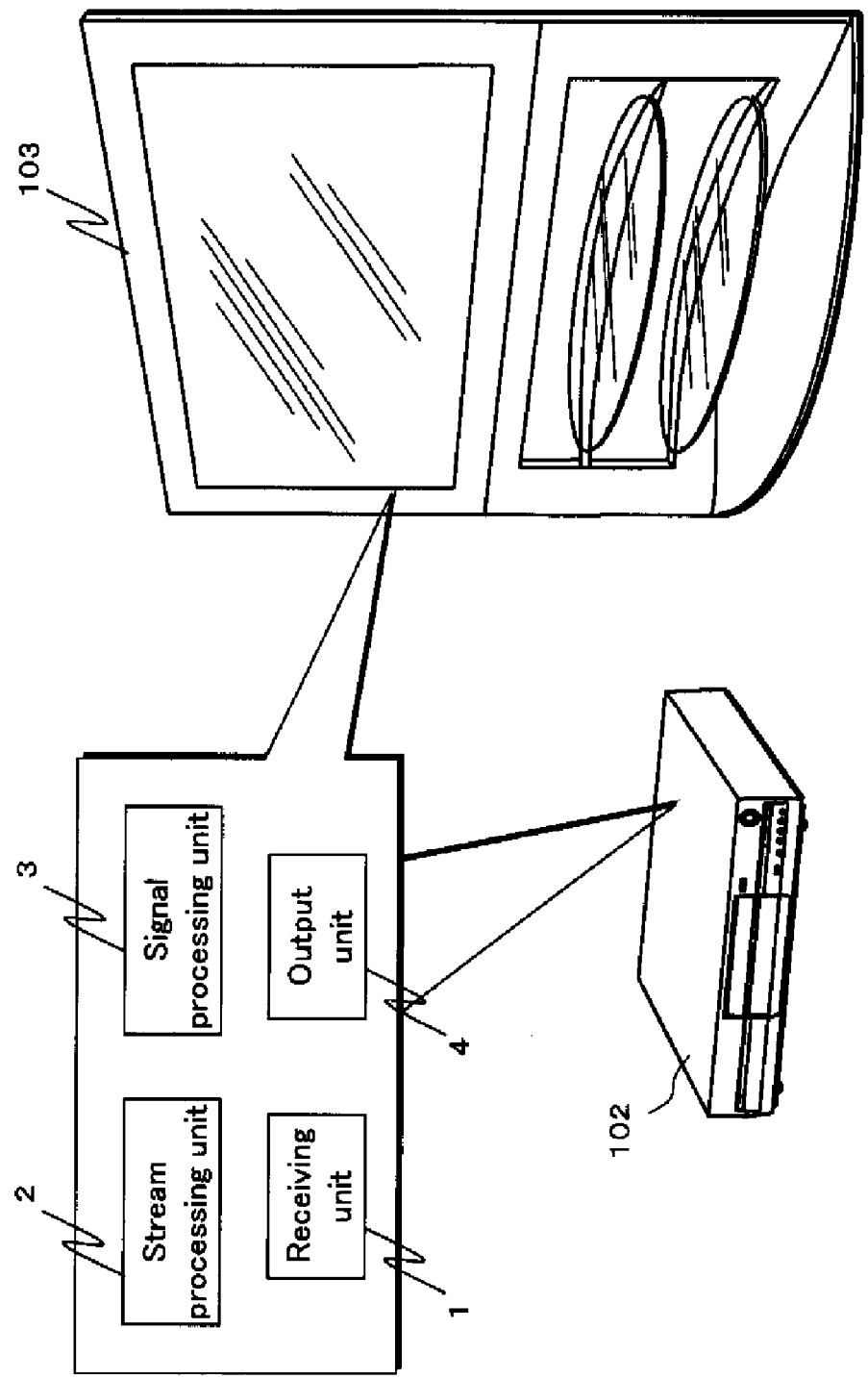
FIG. 60 is a configuration diagram showing an example of a playback output device according to embodiment 2.

In embodiment 2, the playback device 102 performs the processes shown in FIGS. 56-58. Alternatively, the display device 103 may perform these processes. FIG. 60 is a block diagram of functional units, included in the playback device 102 or the display device 103, that perform the above processes. As shown in FIG. 60, these functional units include a receiving unit 1, stream processing unit 2, signal processing unit 3, and output unit 4. The receiving unit 1 receives multiplexed stream data from a medium such as a BD-ROM disc, semiconductor memory device, external network, or broadcast wave, and transmits the multiplexed stream data to the stream processing unit 2. The stream processing unit 2 separates each type of data from the multiplexed stream data, such as video, audio, graphics, etc., and transmits the resulting pieces of data to the signal processing unit 3. The signal processing unit 3 individually decodes these pieces of data and transmits the decoded pieces of data to the output unit 4.

The output unit 4 converts the decoded pieces of data into a predetermined format and outputs the results. The output of the output unit 4 may be a video signal/audio signal in a format such as HDMI format, or may simply be video images/audio.

<<Embodiment 3>>

The BD-ROM disc according to embodiment 3 of the present invention also includes a pair of a base view and a dependent view for the PG stream and the IG stream. On the other hand, the playback device according to embodiment 3 of the present invention is provided with 2 plane mode. "2 plane mode" is one of the display modes for the graphics plane. When a sub-TS includes both a base-view and dependent-view graphics stream, the playback device in 2 plane mode decodes and alternately outputs left-view and right-view graphics plane data from the graphics streams. 3D graphics images can thus be played back from the graphics streams. Apart from these points, the BD-ROM disc and playback device according to embodiment 3 have the same structure and functions as in embodiment 1. Accordingly, the following is a description of the BD-ROM disc and playback device according to embodiment 3 insofar as these have been changed or expanded as compared to embodiment 1. Details on the parts of the BD-ROM disc and playback device that are the same as in embodiment 1 can be found in the description of embodiment 1.

<Data Structure of Sub-TS>

FIG. 61A is a list of elementary streams multiplexed in a first sub-TS on a BD-ROM disc 101. The first sub-TS is multiplexed stream data in MPEG-2 TS format and is included in a file DEP. As shown in FIG. 61A, the first sub-TS includes a primary video stream 6011, left-view PG streams 6012A and 6012B, right-view PG streams 6013A and 6013B, left-view IG stream 6014, right-view IG stream 6015, and secondary video stream 6016. When the primary video stream 301 in the main TS shown in FIG. 3A represents the left view of 3D video images, the primary video stream 6011, which is a right-view video stream, represents the right view of the 3D video images. The pairs of left-view and right-view PG streams 6012A+6013A and 6012B+6013B represent the left view and right view of graphics images, such as subtitles, when these graphics images are displayed as 3D video images. The pair of left-view and right-view IG streams 6014 and 6015 represent the left view and right view of graphics images for an interactive screen when these graphics images are displayed as 3D video images. When the secondary video stream 306 in the main TS represents the left view of 3D video images, the secondary video stream 6016, which is a right-view video stream, represents the right view of the 3D video images.

PIDs are assigned to the elementary streams 6011-6016 as follows, for example. A PID of 0x1012 is assigned to the primary video stream 6011. When up to 32 other elementary streams can be multiplexed by type in one sub-TS, the left-view PG streams 6012A and 6012B are assigned any value from 0x1220 to 0x123F, and the right-view PG streams 6013A and 6013B are assigned any value from 0x1240 to 0x125F. The left-view IG stream 6014 is assigned any value from 0x1420 to 0x143F, and the right-view IG stream 6015 is assigned any value from 0x1440 to 0x145F. The secondary video stream 6016 is assigned any value from 0x1B20 to 0x1B3F.

FIG. 61B is a list of elementary streams multiplexed in a second sub-TS on a BD-ROM disc 101. The second sub-TS is multiplexed stream data in MPEG-2 TS format and is included in a different file DEP than the first sub-TS. Alternatively, the second sub-TS may be multiplexed in the same file DEP as the first sub-TS. As shown in FIG. 61B, the second sub-TS includes a primary video stream 6021, depth map PG streams 6023A and 6023B, depth map IG stream 6024, and secondary video stream 6026. The primary video stream 6021 is a depth map stream and represents 3D video images in combination with the primary video stream 301 in the main TS. When the 2D video images represented by the PG streams 323A and 323B in the main TS are used to project 3D video images on a virtual 2D screen, the depth map PG streams 6023A and 6023B are used as the PG streams representing a depth map for the 3D video images. When the 2D video images represented by the IG stream 304 in the main TS are used to project 3D video images on a virtual 2D screen, the depth map IG stream 6024 is used as the IG stream representing a depth map for the 3D video images. The secondary video stream 6026 is a depth map stream and represents 3D video images in combination with the secondary video stream 306 in the main TS.

PIDs are assigned to the elementary streams 6021-6026 as follows, for example. A PID of 0x1013 is assigned to the primary video stream 6021. When up to 32 other elementary streams can be multiplexed by type in one sub-TS, the depth map PG streams 6023A and 6023B are assigned any value from 0x1260 to 0x127F. The depth map IG stream 6024 is assigned any value from 0x1460 to 0x147F. The secondary video stream 6026 is assigned any value from 0x1B40 to 0x1B5F.

<Data Structure of STN Table SS>

Figure 62:
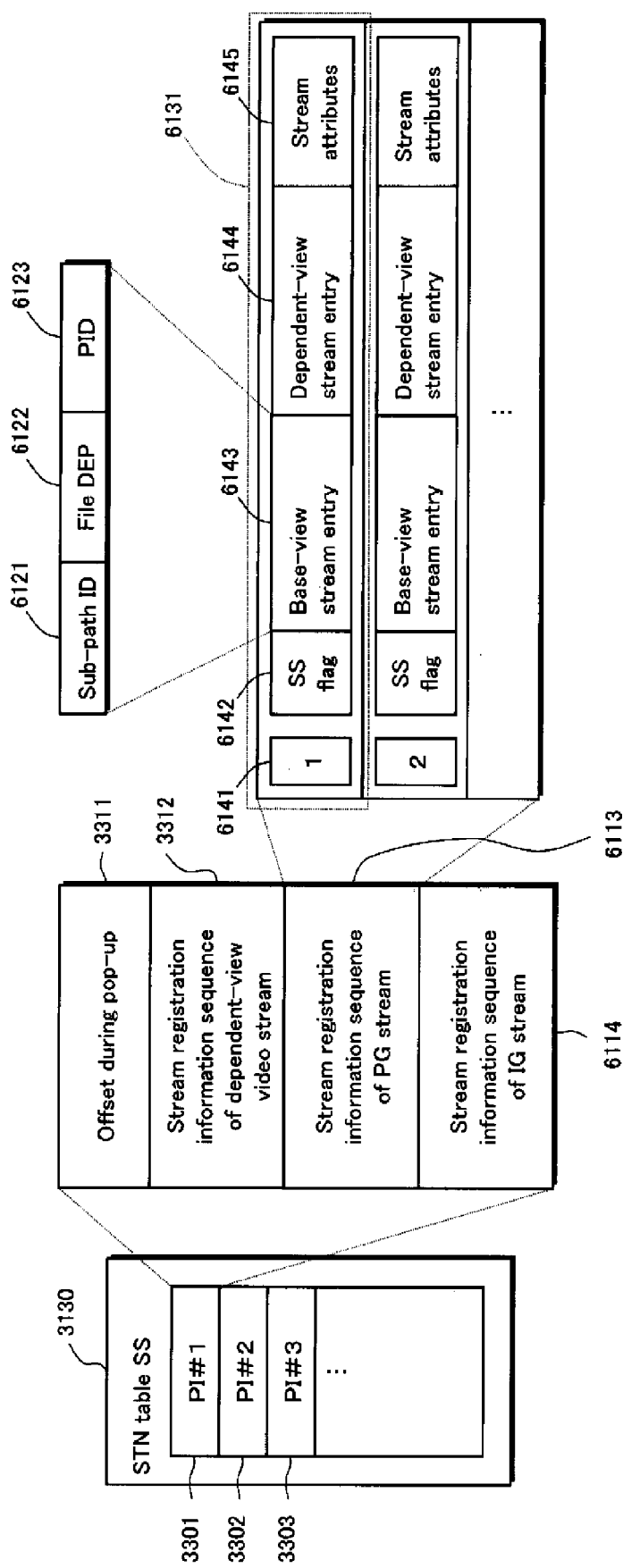
FIG. 62 is a schematic diagram showing a data structure of an STN table SS 3130 according to embodiment 2.

FIG. 62 is a schematic diagram showing a data structure of the STN table SS 3130. As shown in FIG. 62, the stream registration information sequences 3301, 3302, 3303, ... in the STN table SS 3130 include a stream registration information sequence 6113 of a PG stream and a stream registration information sequence 6114 of an IG stream in addition to an offset during pop-up 3311 and a stream registration information sequence 3312 of a dependent-view video stream.

The stream registration information sequence 6113 of a PG stream includes stream registration information indicating the PG streams that can be selected for playback from the sub-TS. The stream registration information sequence 6114 of an IG stream includes stream registration information indicating the IG streams that can be selected for playback from the sub-TS. These stream registration information sequences 6113 and 6114 are used in combination with the stream registration information sequences, included in the STN table of the corresponding PI, that indicate PG streams and IG streams. When reading a piece of stream registration information from an STN table, the playback device 102 in 3D playback mode automatically also reads the stream registration information sequence, located in the STN table SS, that has been combined with the piece of stream registration information. When simply switching from 2D playback mode to 3D playback mode, the playback device 102 can thus maintain already recognized STNs and stream attributes such as language.

As further shown in FIG. 62, the stream registration information sequence 6113 of the PG stream generally includes a plurality of pieces of stream registration information 6131. These are the same in number as the pieces of stream registration information in the corresponding PI that indicates the PG streams. The stream registration information sequence 6114 of the IG stream includes the same sort of pieces of stream registration information. These are the same in number as the pieces of stream registration information in the corresponding PI that indicates the IG streams.

Each piece of stream registration information 6131 includes an STN 6141, stereoscopic flag (is_SS_PG) 6142, base-view stream entry (stream_entry_for_base_view) 6143, dependent-view stream entry (stream_entry_for_dependent_view) 6144, and stream attribute information 6145. The STN 6141 is a serial number assigned individually to pieces of stream registration information 6131 and is the same as the STN of the piece of stream registration information, located in the corresponding PI, with which the piece of stream registration information 6131 is combined. The stereoscopic flag 6142 indicates whether both base-view and dependent-view PG streams are included on a BD-ROM disc 101. If the stereoscopic flag 6142 is on, both PG streams are included in the sub-TS. Accordingly, the playback device reads all of the fields in the base-view stream entry 6143, the dependent-view stream entry 6144, and the stream attribute information 6145. If the stereoscopic flag 6142 is off, the playback device ignores all of these fields 6143-6145. Both the base-view stream entry 6143 and the dependent-view stream entry 6144 include sub-path ID reference information 6121, stream file reference information 6122, and PIDs 6123. The sub-path ID reference information 6121 indicates the sub-path IDs of the sub-paths that specify the playback paths of the base-view and dependent-view PG streams. The stream file reference information 6122 is information to identify the file DEP storing the PG streams. The PIDs 6123 are the PIDs for the PG streams. The stream attribute information 6145 includes attributes for the PG streams, such as language type.

<System Target Decoder>

Figure 63:
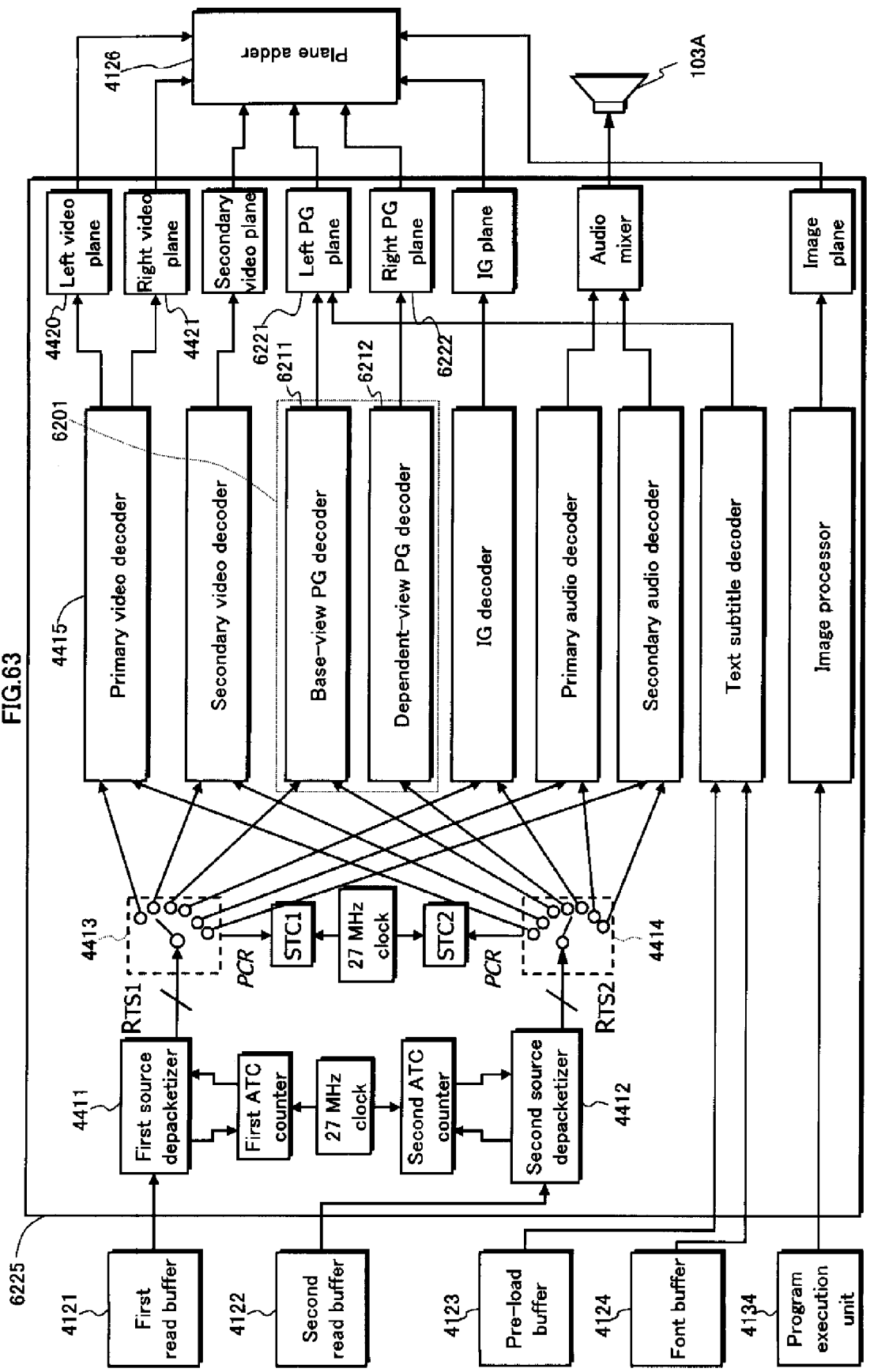
FIG. 63 is a functional block diagram of a system target decoder 6225 according to embodiment 2.

FIG. 63 is a functional block diagram of a system target decoder 6225. As shown in FIG. 63, the PG decoder 6201 supports 2 plane mode, unlike the PG decoder in the system target decoder 4125 shown in FIG. 41. Specifically, the PG decoder 6201 includes a base-view PG decoder 6211 and a dependent-view PG decoder 6212. In addition to decoding the PG streams 303A and 303B in the main TS shown in FIG. 3A, the base-view PG decoder 6211 decodes the left-view PG streams 6012A and 6012B in the first sub-TS shown in FIG. 61A into plane data. The dependent-view PG decoder 6212 decodes the right-view PG streams 6013A and 6013B in the first sub-TS shown in FIG. 61A and the depth map PG streams 6023A and 6023B in the second sub-TS shown in FIG. 61B into plane data. The secondary video decoder and the IG decoder both include a similar pair of decoders. The system target decoder 6225 further includes a pair of PG plane memories 6221 and 6222. The base-view PG decoder 6211 writes the plane data into the left PG plane memory 6221, and the dependent-view PG decoder 6212 writes the plane data into the right PG plane memory 6222. The IG plane memory and the image plane memory both have similar structures. The system target decoder 6225 further associates the output of plane data from the graphics plane memory with 2 plane mode, 1 plane+offset mode, and 1 plane+zero offset mode. In particular, when the playback control unit 4135 indicates 2 plane mode, the system target decoder 6225 alternately outputs plane data from a pair of PG plane memories 6221 and 6222 to the plane adder 6226.

<Plane Adders>

Figure 64:
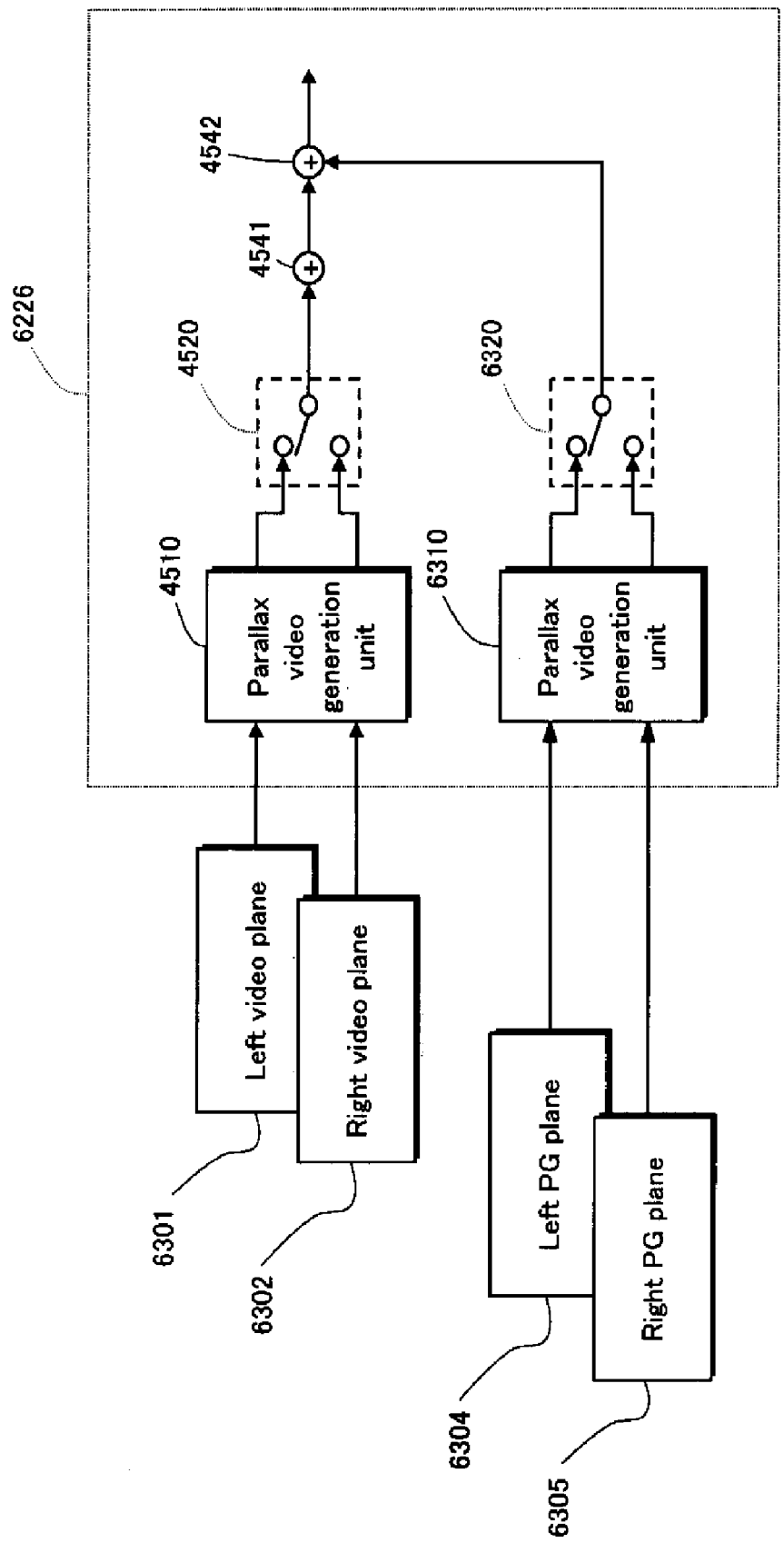
FIG. 64 is a partial functional block diagram of a plane adder 6226 in 2 plane mode.

FIG. 64 is a partial functional block diagram of the plane adder 6226 in 2 plane mode. As shown in FIG. 64, the plane adder 6226 includes a parallax video generation unit 4510, switch 4520, and adders 4541 and 4542, like the plane adder 4126 shown in FIG. 45. The plane adder 6226 further includes a second parallax video generation unit 6310 and a second switch 6320 as units for input of PG plane data 6304 and 6305. A similar structure is included in the units for input of secondary video plane data, IG plane data, and image plane data.

The second parallax video generation unit 6310 receives left PG plane data 6304 and right PG plane data 6305 from the system target decoder 6225. In the playback device 102 in L/R mode, the left PG plane data 6304 represents the left-view PG plane, and the right PG plane data 6305 represents the right-view PG plane. At this point, the second parallax video generation unit 6310 transmits the pieces of plane data 6304 and 6305 as they are to the switch 6320. On the other hand, in the playback device 102 in depth mode, the left PG plane data 6304 represents the PG plane of 2D graphics images, and the right PG plane data 6305 represents a depth map corresponding to the 2D graphics images. In this case, the second parallax video generation unit 6310 first calculates the binocular parallax for each element in the 2D graphics images using the depth map. Next, the second parallax video generation unit 6310 processes the left PG plane data 6304 to shift the presentation position of each element in the 2D graphics image in the PG plane to the left or right in accordance with the calculated binocular parallax. This generates a pair of PG planes representing a left view and right view. Furthermore, the second parallax video generation unit 6310 outputs this pair of PG planes to the second switch 6320.

The second switch 6320 outputs the left PG plane data 6304 and the right PG plane data 6305, which have the same PTS, to the second adder 4542 in this order. The second adder 4542 receives PG plane data from the second switch 6320, superimposes this PG plane data on the plane data from the first adder 4541, and transmits the result to the third adder 4543. As a result, the left-view PG plane is superimposed on the left-video plane data 6301, and the right-view PG plane is superimposed on the right-video plane data 6302.

<Combining 2D Video Images and 3D Graphics Images>

The playback device according to embodiment 3 uses the above structure to implement 2 plane mode. The playback device can thus display 3D graphics images superimposed on 3D video images. Furthermore, the BD-ROM disc and playback device according to embodiment 3 can display 3D graphics images superimposed on 2D video images, as described below.

FIG. 65 is a schematic diagram showing the pictures for a base-view video stream 6401 and a right-view video stream 6402 in order of presentation time. As shown in FIG. 65, the base-view video stream 6401 includes base-view pictures 6410, 6411, 6412, . . . , and 6419, and the right-view video stream 6402 includes right-view pictures 6420, 6421, 6422, . . . , and 6429. These pictures 6410-6419 and 6420-6429 compose three playback sections 6431, 6432, and 6433.

The first playback section 6431 and the third playback section 6433 are "3D playback sections" representing 3D video images. The pictures in the 3D playback sections 6431 and 6433 are compressed with a multiview coding method such as MVC, like the pictures shown in FIG. 7. In other words, each of the base-view pictures 6410-6413 and 6417-6419 are compressed using other base-view pictures in the same 3D playback section as reference pictures. On the other hand, each of the right-view pictures 6420-6423 and 6427-6429 are compressed using base-view pictures 6410-6413 and 6417-6419 belonging to the same 3D VAU as reference pictures, in addition to the other right-view pictures in the same 3D playback section.

The second playback section 6432 is a "pseudo-2D playback section" and represents 2D video images, despite including right-view pictures. The pictures in the pseudo-2D playback section 6432 are compressed with a multiview coding method such as MVC. In particular, each of the base-view pictures 6414-6416 is compressed using other base-view pictures in the same pseudo-2D playback section as reference pictures. However, the right-view pictures 6424-6426 are compressed as a mere reference to the base-view pictures 6414-6416 in the same 3D VAU. Accordingly, the right-view pictures represent the same 2D video images as the base-view pictures belonging to the same 3D VAU. In other words, there is no parallax between the left view and the right view. Therefore, in the pseudo-2D playback section, only 2D video images are played back, even in 3D playback mode. Furthermore, the data amount of the compressed right-view pictures is extremely small.

FIG. 66 is a table showing syntax of a slice header and slice data when encoding right-view pictures in a pseudo-2D playback section in accordance with MVC. P slices are included in the fourth right-view picture "$P_4$" 6423 and the seventh right-view picture "$P_7$" 6426 shown in FIG. 65. On the other hand, B slices are included in the fifth right-view picture "$B_5$" 6424 and the sixth right-view picture "$B_6$" 6425 shown in FIG. 65. As shown in FIG. 66, a set of four lines recorded in the slice header "ref_pic_list_modification_flag_10 (or 11)=1", "modification_of_pic_nums_idc=5", "abs_diff_view_idx_minus1=0", and "ref_pic_list_modification_flag_10 (or 11)=3" specifies the following: the index indicating the reference picture for this slice is index=0 of the base-view pictures belonging to the same 3D VAU. Since there is one reference picture for a P slice, the slice header includes a set of the above four lines. Since there are two reference pictures for a B slice, the slice header includes two sets of the above four lines. On the other hand, the two lines recorded in the slice data specify the following two items for both a P slice and a B slice: (i) When macroblocks in a slice are coded with context-adaptive variable-length coding (CAVLC), the value of a parameter "mb_skip_run" is set to the total number of macroblocks in the slice, and (ii) When macroblocks in a slice are coded with context-adaptive binary arithmetic coding (CABAC), a flag "mb_skip_flag" is repeatedly set a number of times equal to the total number of macroblocks in the slice. These specifications mean that the type of all of the macroblocks in the slice is "skip". In other words, these specifications indicate that a compressed right-view picture does not substantially include slice data, and when decoding, a reference picture can be copied as the right-view picture. Accordingly, in MVC, an extremely small data amount can express that a copy of each base-view picture in a pseudo-2D playback section is encoded as a right-view picture belonging to the same 3D VAU.

FIG. 67 is a schematic diagram showing (i) a pair of a file 2D 6610 and a file DEP 6620 that constitute both a 3D playback section and a pseudo-2D playback section and (ii) two types of 3D playback files 6630 and 6640 that define each of the playback sections.

The primary video stream (PID=0x1011) included in the file 2D 6610 is the base-view video stream shared by both 3D playback section and pseudo-2D playback sections. The file DEP 6620 includes two types of primary video streams (PID=0x1012, 0x1013). One of these streams (PID=0x1012) is a dependent-view video stream comprising 3D playback sections along with the base-view video stream. The other stream (PID=0x1013) is a dependent-view video stream constructing pseudo-2D playback sections along with the base-view video stream. In other words, the primary video stream with PID=0x1013 consists of pictures in the base-view video stream each compressed with the use of itself as a reference picture. Furthermore, the file DEP 6620 includes a pair of a left-view PG stream (PID=0x1220) and a right-view PG stream (PID=0x1240). The PG streams respectively represent a left-view and a right-view of 3D graphics images.

The playback paths specified by the 3D playlist file #1 6630 are composed of 3D playback sections. Specifically, in the main path 6631, PI #1 specifies a playback section of the base-view video stream (PID=0x1011) in the file 2D 6610. On the other hand, in the sub-path 6632 with a sub-path type 6633=3D L/R, the SUB_PI #1 specifies a playback section for the dependent-view video stream (PID=0x1012) and the pair of PG streams (PID=0x1220, 0x1240) in the file DEP 6620. This SUB_PI #1 specifies the same playback start time and playback end time as the PI #1.

The playback paths specified by the 3D playlist file #2 6640 are composed of pseudo-2D playback sections. Specifically, in the main path 6641, PI #1 specifies a playback section of the base-view video stream (PID=0x1011) in the file 2D 6610. On the other hand, in the sub-path 6642 with a sub-path type 6643=3D L/R, the SUB_PI #1 specifies a playback section for the dependent-view video stream (PID=0x1013) and the pair of PG streams (PID=0x1220, 0x1240) in the file DEP 6620. This SUB_PI #1 specifies the same playback start time and playback end time as the PI #1.

When the playback device 102 in 3D playback mode uses the 3D playlist file #1 6630 to perform 3D playlist playback processing, 3D graphics images played back from the pair of PG streams (PID=0x1220, 0x1240) are displayed superimposed on the 3D video images played back from a combination of the base-view video stream and the dependent-view video stream (PID=0x1012). On the other hand, when the playback device 102 in 3D playback mode uses the 3D playlist file #2 6640 to perform 3D playlist playback processing, 3D graphics images played back from the pair of PG streams (PID=0x1220, 0x1240) are displayed superimposed on the 2D video images played back from a combination of the base-view video stream and the dependent-view video stream (PID=0x1013). Therefore, by switching the 3D playlist file, the playback device 102 can switch video images on which 3D graphics images are to be superimposed from 3D video images to 2D video images.

Figure 68:
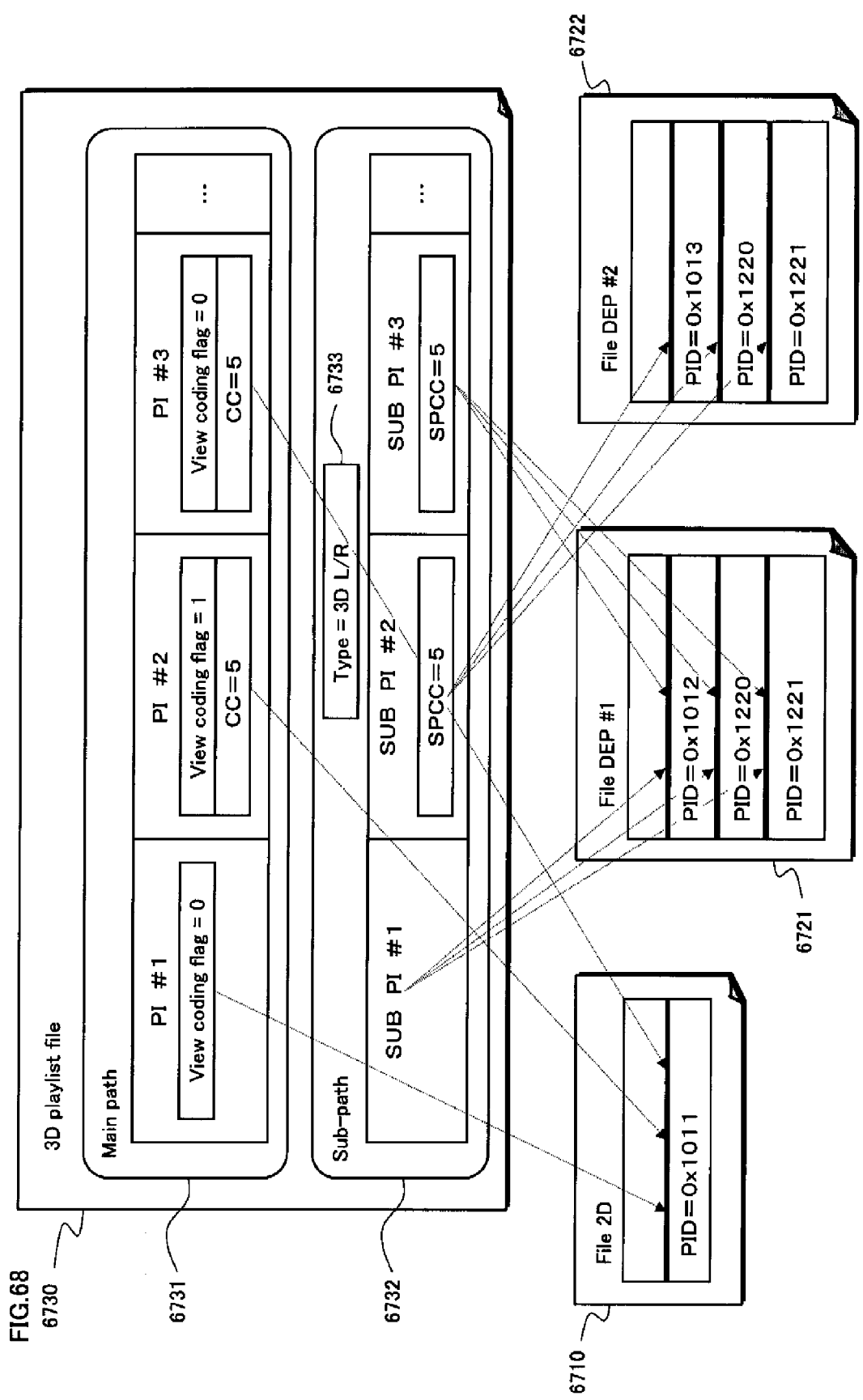
FIG. 68 is a schematic diagram showing a pair of a file 2D 6710 and a file DEP #1 6721 that constitute a 3D playback section, a file DEP #2 6722 that constitutes a pseudo-2D playback section in combination with the file 2D 6710, and a 3D playlist file 6730 that defines each of the playback sections.

FIG. 68 is a schematic diagram showing a pair of a file 2D 6710 and a file DEP #1 6721 that constitute 3D playback sections, a file DEP #2 6722 that constitutes pseudo-2D playback sections in combination with the file 2D 6710, and a 3D playlist file 6730 that defines each of the playback sections.

The primary video stream (PID=0x1011) included in the file 2D 6710 is the base-view video stream shared by both 3D playback sections and pseudo-2D playback sections. The primary video stream (PID=0x1012) included in the file DEP #1 6721 is a dependent-view video stream constructing 3D playback sections along with the base-view video stream. The primary video stream (PID=0x1013) included in the file DEP #2 6722 is a dependent-view video stream constructing pseudo-2D playback sections along with the base-view video stream. In other words, the primary video stream with PID=0x1013 consists of pictures in the base-view video stream compressed with the use of itself as a reference picture. Furthermore, the files DEP 6721 and 6722 include a pair of a left-view PG stream (PID=0x1220) and a right-view PG stream (PID=0x1240). The PG streams respectively represent a left-view and a right-view of 3D graphics images.

The playback paths specified by the 3D playlist file 6730 include both 3D playback sections and pseudo-2D playback sections. Specifically, in the main path 6731, PI #1, PI #2, and PI #3 specify different playback sections of the base-view video stream (PID=0x1011) in the file 2D 6710. On the other hand, in the sub-path 6732 with a sub-path type 6733=3D L/R, the SUB_PI #1 and SUB_PI #3 specify playback sections for the dependent-view video stream (PID=0x1012) and the pair of PG streams (PID=0x1220, 0x1240) in the file DEP

1 6721. Furthermore, the SUB_PI #2 specifies a playback section for the dependent-view video stream (PID=0x1013) and the pair of PG streams (PID=0x1220, 0x1240) in the file DEP #3 6722. Each SUB_PI #N specifies the same playback start time and playback end time as the PI #N (N=1, 2, 3). Accordingly, the pair PI #1 and SUB_PI #1 and the pair PI #3 and SUB_PI #3 specify 3D playback sections, and the pair PI #2 and SUB_PI #2 specify a pseudo-2D playback section. Furthermore, the value of the CC in the PI #2 and the PI #3 is set to "5", and the value of the SPCC in the SUB_PI #2 and the SUB_PI #3 is set to "5". In other words, it is specified that these playback sections are to be connected seamlessly.

Figure 69:
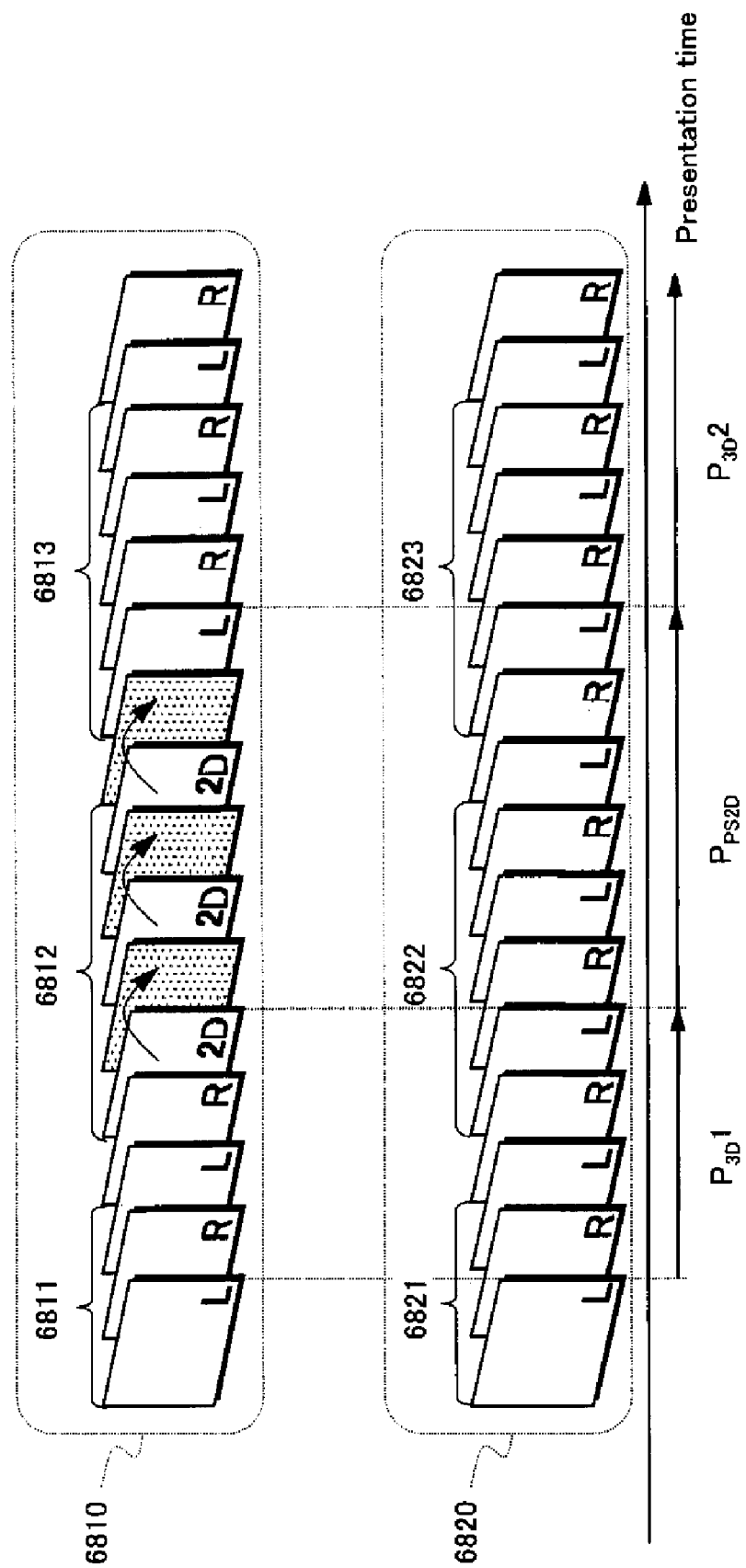
FIG. 69 is a schematic diagram showing a video plane sequence 6810 and a PG plane sequence 6820 that the playback device 102 in 3D playback mode plays back in accordance with a 3D playlist file 6730.

FIG. 69 is a schematic diagram showing a video plane sequence 6810 and a PG plane sequence 6820 that the playback device 102 in 3D playback mode plays back in accordance with the 3D playlist file 6730. As shown in FIG. 69, each sequence 6810 and 6820 includes three groups 6811-6813 and 6821-6823 in order of presentation time.

The first group 6811, 6821 comprises the first 3D playback section $P_{3D}1$ specified by the pair of the PI #1 and SUB_PI #1. In other words, the first group 6811 of video planes alternately includes left-view and right-view video planes L, R played back from the combination of the base-view video stream and the dependent-view video stream (PID=0x1012). On the other hand, the first group 6821 of PG planes alternately includes left-view and right-view PG planes L, R played back from the pair of PG streams (PID=0x1220, 0x1240). Accordingly, during the first 3D playback section $P_{3D}1$, the 3D graphics images represented by the first group 6821 of PG planes are displayed superimposed on the 3D video images represented by the first group 6811 of video planes.

The second group 6812, 6822 comprises a pseudo-2D playback section $P_{PS2D}$ specified by the pair of the PI #2 and SUB_PI #3. In other words, the second group 6812 of video planes alternately includes video planes 2D of 2D video images played back from the base-view video stream and copies of these video planes 2D played back from the dependent-view video stream (PID=0x1013). On the other hand, the second group 6822 of PG planes alternately includes left-view and right-view PG planes L, R played back from the pair of PG streams (PID=0x1220, 0x1240). Accordingly, during the pseudo-2D playback section $P_{PS2D}$, the 3D graphics images represented by the second group 6822 of PG planes are displayed superimposed on the 2D video images represented by the second group 6812 of video planes.

The third group 6813, 6823 comprises the second 3D playback section $P_{3D}2$ specified by the pair of the PI #3 and SUB_PI #3. In other words, the third group 6813 of video planes alternately includes left-view and right-view video planes L and R played back from the combination of the base-view video stream and the dependent-view video stream (PID=0x1012). On the other hand, the third group 6823 of PG planes alternately includes left-view and right-view PG planes L, R played back from the pair of PG streams (PID=0x1220, 0x1240). Accordingly, during the second 3D playback section $P_{3D}2$, the 3D graphics images represented by the third group 6823 of PG planes are displayed superimposed on the 3D video images represented by the third group 6813 of video planes.

As in the above description, during a sequence of 3D playlist playback processing, the playback device 102 can be caused to change from composites of 3D graphics images and 3D video images to composites of 3D graphics images and 2D video images when switching playback sections. Since the data structure itself of the video stream does not change between 3D playback sections and pseudo-2D playback sections, the playback device 102 can continue to operate normally in 3D playback mode during both playback sections. In particular, as shown in FIG. 68, if CC=5 and SPCC=5 are set, video images can be seamlessly connected even between a 3D playback section and a pseudo-2D playback section.

<Modifications>

(3-A) As shown in FIG. 68, each PI may include a view coding flag. The "view coding flag" indicates whether the playback section specified by the PI is a 3D playback section or a pseudo-2D playback section. For example, a value of "0" for the view coding flag indicates that the playback section is a 3D playback section, and a value of "1" indicates a pseudo-2D playback section. In the example shown in FIG. 67, each 3D playlist file may include a view coding flag. Furthermore, the view coding flag may be stored as supplementary information in the TS forming multiplexed stream data or a video stream in accordance with MVC or the like. For example, in a video stream in accordance with MVC, the header of a NAL unit, SEI, or the sub-AU identification code 832A in the VAU 832 of the dependent-view video stream shown in FIG. 8 may be used as the storage location. Alternatively, a new NAL unit may be defined for storage of the view coding flag. On the other hand, in the TS, the header of a TS packet or a descriptor—in particular a descriptor in accordance with MVC that includes attribute information, such as bit rate—may be used as the storage location of the view coding flag.

(3-B) The playback path defined by a 3D playlist file may include a playback section of regular 2D video images (hereinafter referred to as a "regular 2D playback section") in addition to 3D playback sections and pseudo-2D playback sections. A regular 2D playback section does not include a sub-TS, in particular a dependent-view video stream, and thus the playback device only plays back 2D video images in 2D playback mode from the main TS. In this case, the 3D video image content may store information indicating whether playback sections of 2D video images are pseudo-2D playback sections or regular 2D playback sections. For example, a value of "2" for the view coding flag included in the PI indicates that the playback section specified by the PI is a regular 2D playback section.

(3-C) Information may be set to indicate "whether playback sections with differing view coding flags exist within an AV stream file stored in (i) video content recorded on a recording medium such as an optical disc, memory card, or HDD, (ii) a broadcast program, (iii) a particular folder, etc." In particular, for a program, this information may be stored in a descriptor that stores program information or in a descriptor indicating attributes of the video stream that constructs the program. For example, this information indicates the following sorts of attributes of the playback path defined by the playlist file: (1) The playback path includes only 3D playback sections, (2) The playback path includes at least one 3D playback section, (3) The playback path includes both pseudo-2D playback sections and regular 2D playback sections. The playback device can simplify selection processing by selecting an operation mode to match the attributes of the playback path indicated by this information.

(3-D) When information indicating "whether video images in a playback section are 3D video images or 2D video images" is set in the 3D video content, this information may be used in lieu of the view coding flag. Specifically, when this information indicates that "the video images in a playback section are 3D video images", this playback section is a 3D playback section. On the other hand, when this information indicates that "the video images in a playback section are 2D video images", this playback section is either a pseudo-2D playback section or a regular 2D playback section. Furthermore, in order to determine whether "the playback section is a pseudo-2D playback section or a regular 2D playback section", "information indicating the number of views on video images", which is stored in the video stream, multiplexed stream data, etc. may be used. If the number of views=2, the playback section is a pseudo-2D playback section, and if the number of views=1, the playback section is a regular 2D playback section. Alternatively, "information indicating the encoding method of the content" may be used. This information is stored in the video content, in particular in the management information thereof. Specifically, if the encoding method is a multiview coding method such as MVC, the playback section is a pseudo-2D playback section, and if the encoding method is a single view coding method such as MPEG-4 AVC, then the playback section is a regular 2D playback section.

(3-E) If the playback device 102 supports BD-Live™, the base-view video stream may be read from the BD-ROM disc, and the dependent-view video stream downloaded from another device, such as a server on a network. In this case, the playback device may further refer to a view coding flag provided in the video content on the BD-ROM disc to check the attributes of the playback path of the video content. In particular, when both 3D playback sections and regular 2D playback sections exist in the playback path, and no pseudo-2D playback sections are included, the playback device may download, from a server or the like on a network, either new content to replace the regular 2D playback sections with pseudo-2D playback sections, or differential data necessary to generate data for pseudo-2D playback sections from data for regular 2D playback sections. The playback device can thus play back the entire video content in the same operation mode.

Figure 70:
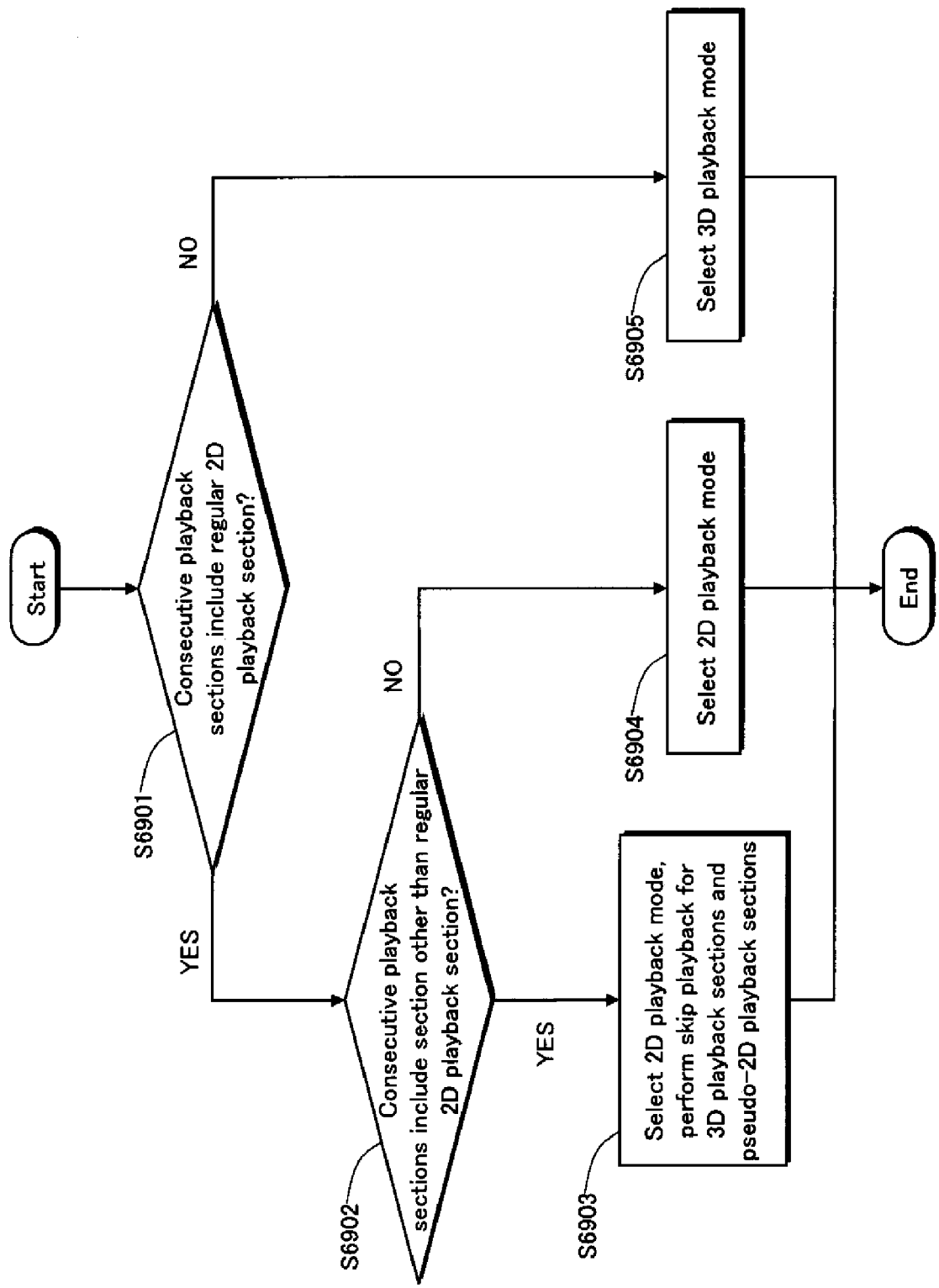
FIG. 70 is a flowchart of processing whereby a 3D playback device selects an operation mode depending on whether a regular 2D playback section exists within consecutive playback sections.

(3-F) FIG. 70 is a flowchart of processing whereby a 3D playback device selects an operation mode depending on whether a regular 2D playback section exists within consecutive playback sections. This processing is performed each time processing of one series of consecutive playback sections in a playback path starts during playlist playback processing. "Consecutive playback sections" refer to one or more playback sections, among the playback sections in the playback path, in which video images are to be played back consecutively and seamlessly.

In step S6901, the playback control unit 4135 in the playback device 102 refers to the playlist file or the like to check the attributes of the playback path, thereby determining whether the consecutive playback sections to be processed include a regular 2D playback section. If the consecutive playback sections include a regular 2D playback section, processing proceeds to step S6902. Otherwise, processing proceeds to step S6905.

In step S6902, the playback control unit 4135 further determines whether the consecutive playback sections to be processed include a different type of playback section from the regular 2D playback section. If the consecutive playback sections include a different type of playback section from the regular 2D playback section, processing proceeds to step S6903. Otherwise, processing proceeds to step S6904.

In step S6903, the consecutive playback sections to be processed include both the regular 2D playback section and another type of playback section. Accordingly, the playback device 102 selects 2D playback mode. Subsequently, playback processing of the consecutive playback sections begins in 2D playback mode. In particular, "skip playback" is performed during 3D playback sections and pseudo-2D playback sections. In other words, while data blocks included in the main TS are read from the BD-ROM disc 101, reading of data blocks included in the sub-TS is skipped by jumps. Video images are thereby played back in 2D playback mode for the entire consecutive playback sections at a frame rate of, for example, 1/24 seconds.

In step S6904, the consecutive playback sections to be processed only include regular 2D playback sections. Accordingly, the playback device 102 selects 2D playback mode. Subsequently, playback processing of the consecutive playback sections begins in 2D playback mode.

In step S6905, the consecutive playback sections to be processed only include 3D playback sections and pseudo-2D playback sections. Accordingly, the playback device 102 selects 3D playback mode. Subsequently, playback processing of the consecutive playback sections begins in 3D playback mode. Therefore, as shown in FIG. 69, combined images formed by 3D video images and 3D graphics images in 3D playback sections are seamlessly connected with combined images formed by 2D video images and 3D graphics images in pseudo-2D playback sections.

Figure 71:
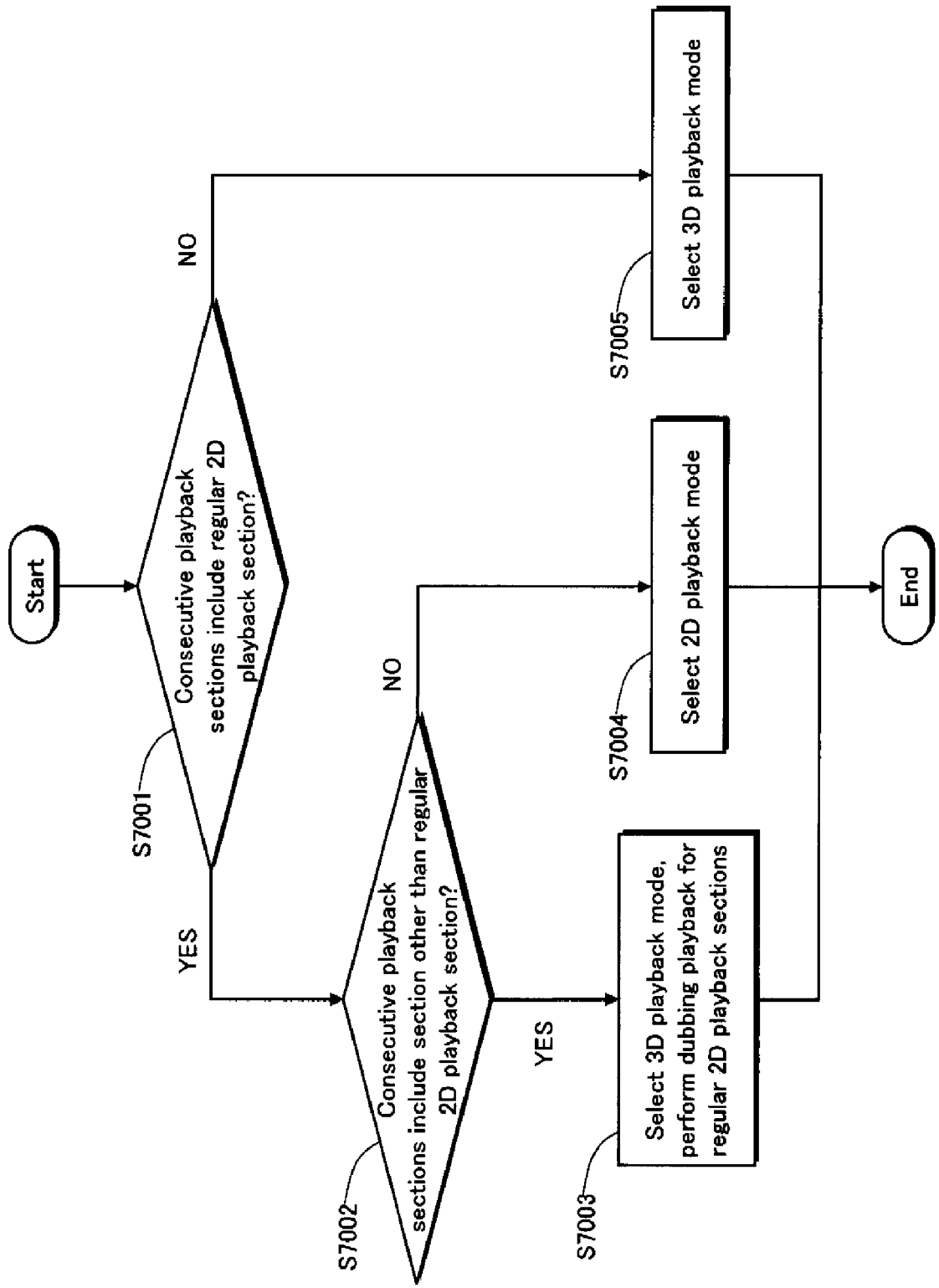
FIG. 71 is a flowchart of processing whereby a 3D playback device with a dubbing playback function selects an operation mode depending on whether a regular 2D playback section exists within consecutive playback sections.

(3-G) FIG. 71 is a flowchart of processing whereby a 3D playback device with a dubbing playback function selects an operation mode depending on whether a regular 2D playback section exists within consecutive playback sections. This processing is performed each time processing of one series of consecutive playback sections in a playback path starts during playlist playback processing. A "dubbing playback function" refers to a function to use B-B presentation mode to play back stream data representing 2D video images. During dubbing playback, video images are played back at the 3D-playback-mode frame rate, for example 1/48 seconds. Since the same frame is displayed twice, however, actual changes in the frames occur at the 2D-playback-mode frame rate, for example 1/24 seconds.

In step S7001, the playback control unit 4135 in the playback device 102 refers to the playlist file or the like to check the attributes of the playback path, thereby determining whether the consecutive playback section to be processed includes a regular 2D playback section. If the consecutive playback section includes a regular 2D playback section, processing proceeds to step S7002. Otherwise, processing proceeds to step S7005.

In step S7002, the playback control unit 4135 further determines whether the consecutive playback sections to be processed include a different type of playback section from the regular 2D playback section. If the consecutive playback sections include a different type of playback section from the regular 2D playback section, processing proceeds to step S7003. If the consecutive playback sections do not include any other type of playback sections, processing proceeds to step S7004.

In step S7003, the consecutive playback sections to be processed include both the regular 2D playback section and another type of playback section. Accordingly, the playback device 102 selects 3D playback mode, in particular B-B presentation mode for regular 2D playback sections. Subsequently, playback processing of the consecutive playback sections begins in 3D playback mode. Dubbing playback is thus performed in regular 2D playback sections. As a result, video images are played back seamlessly throughout the consecutive playback sections.

In step S7004, the consecutive playback sections to be processed only include 2D playback sections. Accordingly, the playback device 102 selects 2D playback mode. Subsequently, playback processing of the consecutive playback sections begins in 2D playback mode.

In step S7005, the consecutive playback sections to be processed only include 3D playback sections and pseudo-2D playback sections. Accordingly, the playback device 102 selects 3D playback mode. Subsequently, playback processing of the consecutive playback sections begins in 3D playback mode. Combined images formed by 3D video images and 3D graphics images in 3D playback sections are thus seamlessly connected with combined images formed by 2D video images and 3D graphics images in pseudo-2D playback sections.

(3-H) For the duration of display of a pop-up menu on the screen, i.e. during a pop-up period, the playback device 102 in 3D playback mode changes other 3D video images to 2D video images as follows. This improves the visibility and usability of the pop-up menu. IG planes decoded from an IG stream, or image planes rendered in accordance with a BD-J, are used for display of a pop-up menu.

Figure 72A:
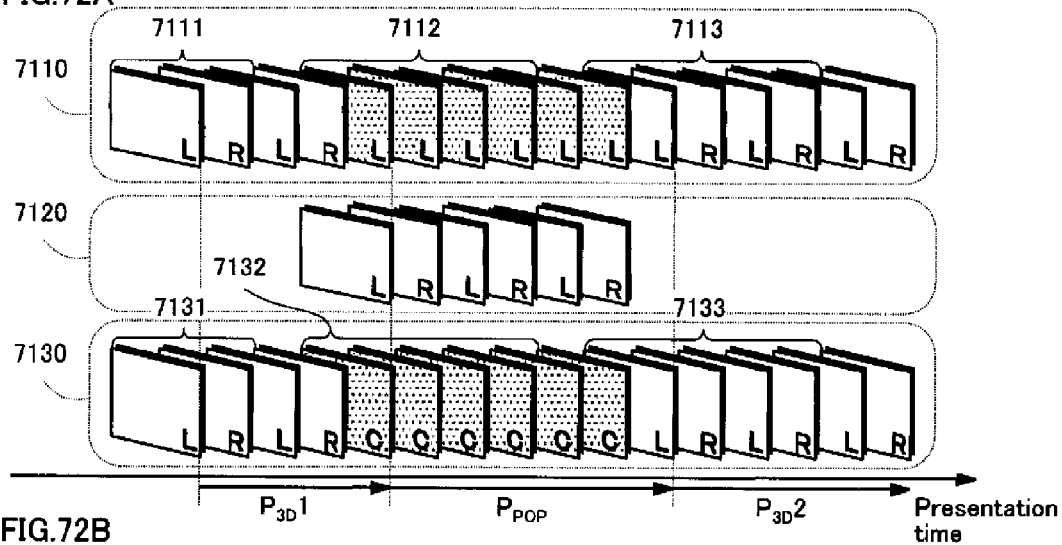
FIG. 72A is a schematic diagram showing a video plane sequence 7110, IG/image plane sequence 7120, and PG plane sequence 7130 when a pop-up menu is displayed during playback of 3D graphics images in 1 plane+offset mode.

FIG. 72A is a schematic diagram showing a video plane sequence 7110, IG/image plane sequence 7120, and PG plane sequence 7130 when a pop-up menu is displayed during playback of 3D graphics images in 1 plane+offset mode. As shown in FIG. 72A, a pop-up period $P_{POP}$ is inserted between two 3D playback sections $P_{3D}1$ and $P_{3D}2$. Accordingly, the video plane sequence 7110 and the PG plane sequence 7130 are respectively divided into three groups 7111-7113 and 7131-7133.

During the first 3D playback section $P_{3D}1$, the presentation mode of the video planes is set to B-D presentation mode, and the presentation mode of the PG planes is set to 1 plane+offset mode. Accordingly, the first group 7111 of video planes alternately includes left-view and right-view video planes L and R, and the first group 7131 of PG planes alternately includes left-view and right-view PG planes L and R. Each pair of left-view and right-view PG planes is generated via offset control from one PG plane and combined with the corresponding pair of video planes. Accordingly, during the first 3D playback section $P_{3D}1$, the 3D graphics images represented by the first group 7131 of PG planes are displayed superimposed on the 3D video images represented by the first group 7111 of video planes.

During the pop-up period $P_{POP}$, the IG/image plane sequence 7120 is played back in 1 plane+offset mode or 2 plane mode. This sequence 7120 therefore alternately includes left-view and right-view IG/image planes L and R. Furthermore, the display mode of the video planes is changed to B-B presentation mode, and the presentation mode of the PG planes is changed to 1 plane+zero offset mode. The second group 7112 of video planes thus includes two each of left-view video planes L, and the second group 7132 of PG planes includes two each of PG planes C having an offset value=0. Accordingly, during the pop-up period $P_{POP}$, the 2D graphics images represented by the second group 7132 of PG planes and the 3D graphics images of the pop-up menu represented by the IG/image plane sequence 7120 are displayed superimposed on the 2D video images represented by the second group 7112 of video planes.

During the second 3D playback section $P_{3D}2$, the presentation mode of the video planes returns to B-B presentation mode, and the presentation mode of the PG planes returns to 1 plane+offset mode. Accordingly, the third group 7113 of video planes alternately includes left-view and right-view video planes L and R, and the third group 7133 of PG planes alternately includes left-view and right-view PG planes L and R. Therefore, during the second 3D playback section $P_{3D}2$, the 3D graphics images represented by the third group 7133 of PG planes are displayed superimposed on the 3D video images represented by the third group 7113 of video planes.

Figure 72B:
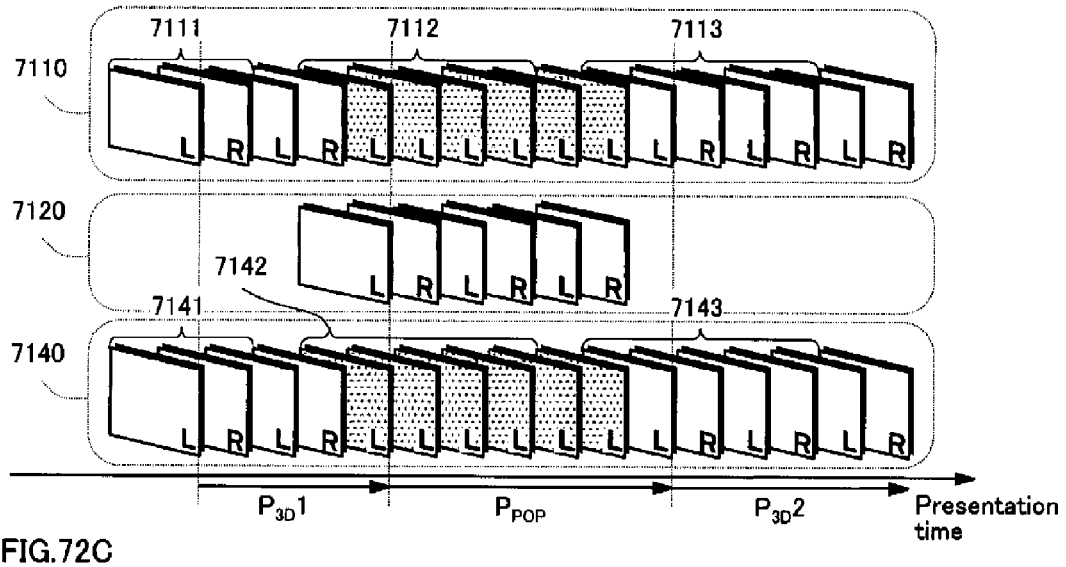
FIG. 72B is a schematic diagram showing an example of the video plane sequence 7110, the IG/image plane sequence 7120, and a PG plane sequence 7140 when a pop-up menu is displayed during playback of 3D graphics images in 2 plane mode.

FIG. 72B is a schematic diagram showing an example of the video plane sequence 7110, the IG/image plane sequence 7120, and a PG plane sequence 7140 when a pop-up menu is displayed during playback of 3D graphics images in 2 plane mode. As shown in FIG. 72B, a pop-up period $P_{POP}$ is inserted between two 3D playback sections $P_{3D}1$ and $P_{3D}2$. Accordingly, the video plane sequence 7110 and the PG plane sequence 7140 are respectively divided into three groups 7111-7113 and 7141-7143.

During the first 3D playback section $P_{3D}1$, the presentation mode of the video planes is set to B-D presentation mode, and the presentation mode of the PG planes is set to 2 plane mode. Accordingly, the first group 7111 of video planes alternately includes left-view and right-view video planes L and R, and the first group 7141 of PG planes alternately includes left-view and right-view PG planes L and R. The left-view and right-view PG planes are generated from different PG streams. Accordingly, during the first 3D playback section $P_{3D}1$, the 3D graphics images represented by the first group 7141 of PG planes are displayed superimposed on the 3D video images represented by the first group 7111 of video planes.

During the pop-up period $P_{POP}$, the IG/image plane sequence 7120 is played back in 1 plane+offset mode or 2 plane mode. This sequence 7120 therefore alternately includes left-view and right-view IG/image planes L and R. Furthermore, the presentation modes of the video planes and PG planes are changed to B-B presentation mode. The second group 7112 of video planes thus includes two each of left-view video planes L, and the second group 7142 of PG planes includes two each of left-view PG planes L. Accordingly, during the pop-up period $P_{POP}$, the 2D graphics images represented by the second group 7142 of PG planes and the 3D graphics images of the pop-up menu represented by the IG/image plane sequence 7120 are displayed superimposed on the 2D video images represented by the second group 7112 of video planes.

During the second 3D playback section $P_{3D}2$, the presentation mode of the video planes returns to B-B presentation mode, and the presentation mode of the PG planes returns to 2 plane mode. Accordingly, the third group 7113 of video planes alternately includes left-view and right-view video planes L and R, and the third group 7143 of PG planes alternately includes left-view and right-view PG planes L and R. Therefore, during the second 3D playback section $P_{3D}2$, the 3D graphics images represented by the third group 7143 of PG planes are displayed superimposed on the 3D video images represented by the third group 7113 of video planes.

Figure 72C:
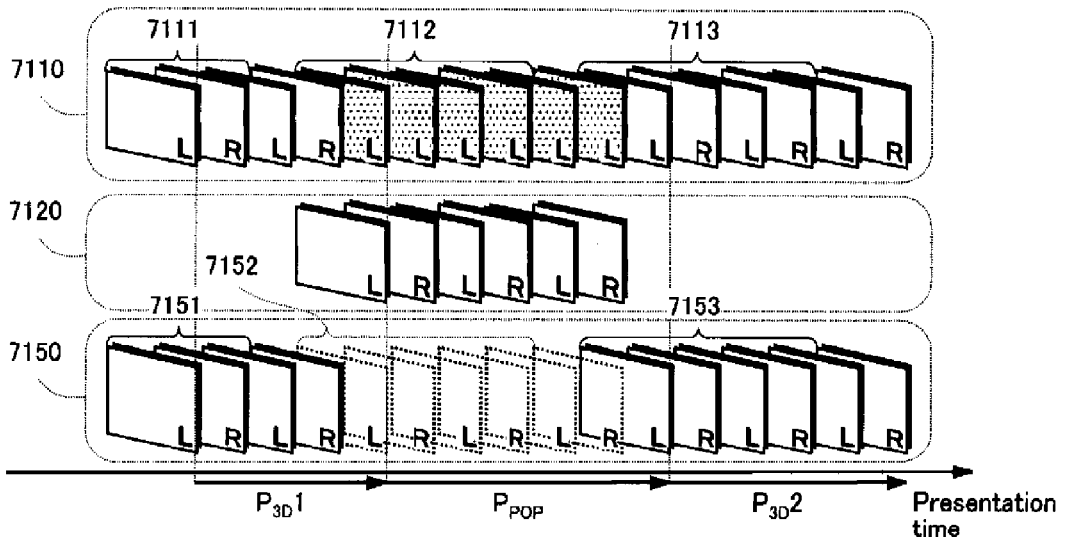
FIG. 72C is a schematic diagram showing another example.

FIG. 72C is a schematic diagram showing another example of the video plane sequence 7110, the IG/image plane sequence 7120, and a PG plane sequence 7150 when a pop-up menu is displayed during playback of 3D graphics images in 2 plane mode. As shown in FIG. 72C, unlike FIG. 72B, the PG planes are not displayed during the pop-up period $P_{POP}$. In all other respects, each of the plane sequences shown in FIG. 72C is the same as the sequences shown in FIG. 72B.

In the first 3D playback section $P_{3D}1$, the first group 7111 of video planes and the first group 7151 of PG planes alternately include left-view and right-view planes L and R, and therefore the 3D graphics images represented by the first group 7151 of PG planes are displayed superimposed on the 3D video images represented by the first group 7111 of video planes.

During the pop-up period $P_{POP}$, the IG/image plane sequence 7120 alternately includes left-view and right-view IG/image planes L and R, and the second group 7112 of video planes includes two each of left-view video planes L. Meanwhile, rendering of the PG planes continues, but output of the rendering is interrupted. Accordingly, the second group 7152 of PG planes is discarded. During the pop-up period $P_{POP}$, the 3D video images of the pop-up menu represented by the IG/image plane sequence 7120 are displayed superimposed on the 2D video images represented by the second group 7112 of video planes. On the other hand, the 3D graphics images represented by the second group 7152 of PG planes are not displayed.

During the second 3D playback section $P_{3D}2$, the presentation mode of the video planes returns to B-B presentation mode, and the presentation mode of the PG planes returns to 2 plane mode. The third group 7113 of video planes and the third group 7153 of PG planes thus alternately include left-view and right-view planes L and R. Therefore, during the second 3D playback section $P_{3D}2$, the 3D graphics images represented by the third group 7153 of PG planes are displayed superimposed on the 3D video images represented by the third group 7113 of video planes.

As described above, during the display of a pop-up menu, other 3D video images are temporarily changed to 2D video images. In particular, the processing time to change the presentation modes of the PG planes is short, since this change of the presentation modes is achieved by a change in the offset value or in the output plane. Accordingly, switching between 3D video images and 2D video images can be performed seamlessly.

Note that the presentation mode of the PG planes may be switched between 1 plane+(zero) offset mode and 2 plane mode in conjunction with the pop-up menu being turned on and off in the following cases: when the processing time required to change the presentation mode is sufficiently short; when video can be interrupted due to changing the presentation mode; or when three PG decoders play back a PG stream in the main TS and a pair of PG streams in the sub-TS in parallel.

(3-I) The playback device 102 in 2 plane mode may refer to the offset metadata to further perform offset control on the left-view and right-view graphics planes. By doing so, the playback device 102 can adjust the depth of the 3D graphics images in 2 plane mode in the same way as in 1 plane+offset mode.

In particular, it is assumed that B-B presentation mode is used in a pop-up period, and that 3D graphics images other than the pop-up menu are changed to 2D graphics images, as in FIG. 72B. FIGS. 73A, 73B, and 73C are schematic diagrams showing differences in the presentation position of a graphics element in B-D presentation mode and B-B presentation mode. As shown in FIGS. 73A-C, the dotted lines on the screen SCR indicate a presentation position GOB0 of a graphics element in B-D presentation mode, and the solid lines indicate presentation positions GOB1-3 of a graphics element in B-B presentation mode. The horizontal distances OFS1, OFS2, and OFS3 between each of the presentation positions GOB1, GOB2, and GOB3 in B-B presentation mode and the presentation position GOB0 in B-D presentation mode, as shown in FIGS. 73A-C, increase in size in numerical order: OFS1<OFS2<OFS3. When graphics images are displayed in the order of FIGS. 73A-C, in B-D presentation mode, the 3D video images of the graphics element appear to shift in a direction perpendicular to the screen SCR. On the other hand, in B-B presentation mode, the 2D video images of the graphics element appear to shift to the left on the screen SCR. Such a difference in the direction of shift may cause viewers to feel uncomfortable, and therefore the playback device 102 uses offset control, as described below, to maintain the presentation position of the graphics images constant in B-B presentation mode.

FIGS. 73D, 73E, and 73F are schematic diagrams respectively showing processing to compensate for displacement of the graphics element in B-B presentation mode shown in FIGS. 73A, 73B, and 73C. As shown in FIGS. 73D-F, the dotted lines on the screen SCR indicate the presentation positions GOB1-3 of the graphics elements before compensation, and the solid lines indicate the presentation position GOB0 after compensation. The horizontal distances OFS1, OFS2, and OFS3 between each of the presentation positions in B-B presentation mode and B-D presentation mode, as shown in FIGS. 73A-C, equal the size of the offset provided to each graphics image. Accordingly, when graphics images are displayed in the order of FIGS. 73A-C, the offset values OFS1, OFS2, and OFS3 for the graphics planes represented by the graphics images increase in size in the same order: OFS1<OFS2<OFS3. In this case, the playback device 102 first seeks the excess amounts of the second and third offset values OFS2 and OFS3 with regards to the first offset value OFS1, i.e. OFS2−OFS1 and OFS3−OFS1, respectively setting these amounts as reverse offset values RV1 and RV2: RV1=OFS2−OFS1, and RV2=OFS3−OFS1. Next, the playback device 102 uses offset control on each of the graphics planes to shift the presentation position of each graphics image towards the original presentation position GOB1 respectively by the reverse offset values RV1 and RV2. The presentation position of each graphics image is thus maintained substantially equal to the original presentation position GOB1. The risk of causing viewers to feel uncomfortable when shifting from B-D presentation mode to B-B presentation mode can thus be avoided.

<<Embodiment 4>>

The following describes, as embodiment 4 of the present invention, a device and method for recording data on the recording media of embodiments 1-3 of the present invention. The recording device described here is called an authoring device. The authoring device is generally located at a creation studio and used by authoring staff to create movie content to be distributed. First, in response to operations by the authoring staff, the recording device converts movie content into AV stream files using a predetermined compression encoding method. Next, the recording device generates a scenario. A "scenario" is information defining how each title included in the movie content is to be played back. Specifically, a scenario includes the above-described dynamic scenario information and static scenario information. Then, the recording device generates a volume image for a BD-ROM disc from the AV stream files and scenario. Lastly, the recording device records the volume image on the recording medium.

Figure 74:
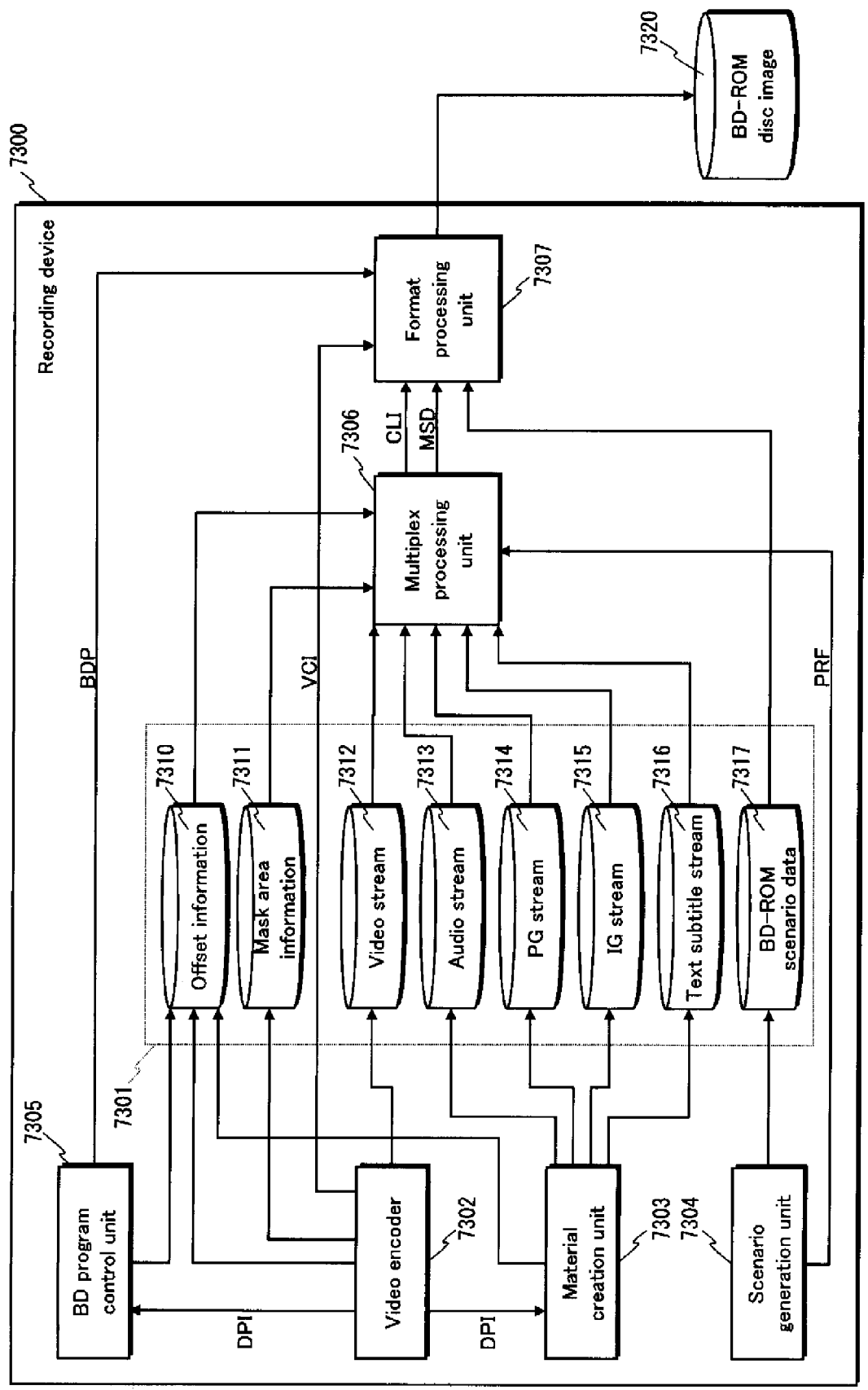
FIG. 74 is a functional block diagram of a recording device 7300 according to embodiment 4 of the present invention.

FIG. 74 is a functional block diagram of a recording device 7300. As shown in FIG. 74, the recording device 7300 includes a database unit 7301, video encoder 7302, material creation unit 7303, scenario generation unit 7304, BD program creation unit 7305, multiplex processing unit 7306, and format processing unit 7307.

The database unit 7301 is a nonvolatile storage device embedded in the recording device and is in particular a hard disk drive (HDD). Alternatively, the database unit 7301 may be an external HDD connected to the recording device, or a nonvolatile semiconductor memory device internal or external to the recording device.

The video encoder 7302 receives video data, such as uncompressed bit map data, from the authoring staff and compresses the received video data in accordance with a compression encoding method such as MPEG-4 AVC or MPEG-2. This process converts primary video data into a primary video stream and secondary video data into a secondary video stream. In particular, 3D video image data is converted into a pair of a base-view video stream and a dependent-view video stream, as shown in FIG. 7, using a multiview coding method such as MVC. In other words, the video frame sequence representing the left view is converted into a base-view video stream via inter-picture predictive encoding on the pictures in these video frames. On the other hand, the video frame sequence representing the right view is converted into a dependent-view video stream via predictive encoding on not only the pictures in these video frames, but also the base-view pictures. Note that the video frames representing the right view may be converted into a base-view video stream, and the video frames representing the left view may be converted into a dependent-view video stream. The converted video streams 7312 are stored in the database unit 7301.

Furthermore, when encoding data for 2D video images, the video encoder 7302 receives from the authoring staff information indicating that "graphics data representing 3D graphics images are multiplexed in the 2D video image data". In this case, the video encoder 7302 generates, from the 2D video image data, a pair of a base-view video stream and a dependent-view video stream constituting a pseudo-2D playback section. In other words, the video encoder 7302 first converts the 2D video image data into a base-view video stream. Next, the video encoder 7302 converts each picture in the 2D video image data into a dependent-view picture using the picture itself as a reference picture, as in the dependent-view pictures in the pseudo-2D playback section 6432 shown in FIG. 65. The converted video streams 7312 are stored in the database unit 7301. The video encoder 7302 furthermore generates view coding information VCI regarding the generated pair of a base-view video stream and a dependent-view video stream. "View coding information" indicates whether the video streams constitute either 3D playback sections or pseudo-2D playback sections. The generated view coding information VCI is output to the multiplex processing unit 7306.

When encoding a secondary video stream from 2D video image data, the video encoder 7302 may also create offset information 7310 for a secondary video plane in accordance with operations of the authoring staff. The generated offset information 7310 is stored in the database unit 7301.

Additionally, during the process of inter-picture predictive encoding, the video encoder 7302 detects motion vectors between individual images in the left view and right view and calculates depth information of each 3D video image based on the detected motion vectors. The video encoder 7302 may use this depth information to generate a depth map for the left view or right view. In this case, the video encoder 7302 uses inter-picture predictive encoding on the pictures in the left-view or right-view stream data and the depth map stream to convert these into a base-view video stream and a depth map stream. The converted video streams 7312 are stored in the database unit 7301.

The video encoder 7302 furthermore uses the depth information to calculate the width WDH of the vertical strips AL and AR, respectively included in the left view LV and right view RV shown in FIGS. 56B and 56C, and the height HGT of the horizontal strips ΔT and AB, respectively included in the left view LV and right view RV shown in FIGS. 57B and 57C. Information 7311 (hereinafter referred to as "mask area information") indicating the calculated width WDH and height HGT is stored in the database unit 7301.

The material creation unit 7303 creates elementary streams other than video streams, such as an audio stream 7313, PG stream 7314, IG stream 7315, and text subtitle stream 7316 and stores the created streams into the database unit 7301. For example, the material creation unit 7303 receives uncompressed LPCM audio data from the authoring staff, encodes the uncompressed LPCM audio data in accordance with a compression encoding method such as AC-3, and converts the encoded LPCM audio data into the audio stream 7313. The material creation unit 7303 additionally receives a subtitle information file from the authoring staff and creates the PG stream 7314 and text subtitle stream 7316 in accordance with the subtitle information file. The subtitle information file defines image data or text data for showing subtitles, display timings of the subtitles, and visual effects to be added to the subtitles, such as fade-in and fade-out. Furthermore, the material creation unit 7303 receives bit map data and a menu file from the authoring staff and creates the IG stream 7315 in accordance with the bit map data and the menu file. The bit map data shows images that are to be displayed on a menu. The menu file defines how each button on the menu is to be transitioned from one status to another and defines visual effects to be added to each button.

In response to operations by the authoring staff, the material creation unit 7303 furthermore creates offset information 7310 corresponding to the PG stream 7314, IG stream 7315, and text subtitle stream 7316. In this case, the material creation unit 7303 may use the depth information DPI generated by the video encoder 7302. The generated offset information 7310 is stored in the database unit 7301.

The scenario generation unit 7304 creates BD-ROM scenario data 7317 in response to an instruction received from the authoring staff via GUI and then stores the created BD-ROM scenario data 7317 in the database unit 7301. The BD-ROM scenario data 7317 defines methods of playing back the elementary streams 7312-7316 stored in the database unit 7301. Of the file group shown in FIG. 2, the BD-ROM scenario data 7317 includes the index file 211, the movie object file 212, and the playlist files 221-223. The scenario generation unit 7304 further creates a parameter file PRF and transfers the created parameter file PRF to the multiplex processing unit 7306. The parameter file PRF defines, from among the elementary streams 7312-7316 stored in the database unit 7301, stream data to be multiplexed into the main TS and sub-TS.

The BD program creation unit 7305 provides the authoring staff with a programming environment for programming BD-J objects and Java application programs. The BD program creation unit 7305 receives a request from a user via GUI and creates each program's source code according to the request. The BD program creation unit 7305 further creates a BD-J object file 251 from the BD-J objects and compresses the Java application programs in the JAR file 261. The program files BDP are transferred to the format processing unit 7307.

In this context, it is assumed that a BD-J object is programmed in the following way: the BD-J object causes the program execution unit 4134 shown in FIG. 41 to transfer graphics data for GUI to the system target decoder 4125. Furthermore, the BD-J object causes the system target decoder 4125 to process graphics data as image plane data and to output image plane data to the plane adder 4126 in 1 plane+offset mode. In this case, the BD program creation unit 7305 may create offset information 7310 corresponding to the image plane and store the offset information 7310 in the database unit 7301. The BD program creation unit 7305 may use the depth information DPI generated by the video encoder 7302 when creating the offset information 7310.

In accordance with the parameter file PRF, the multiplex processing unit 7306 multiplexes each of the elementary streams 7312-7316 stored in the database unit 7301 to form a stream file in MPEG-2 TS format (however, the text subtitle stream 7316 is established as an independent file). More specifically, as shown in FIG. 4, each of the elementary streams 7312-7315 is converted into a source packet sequence, and the source packets included in each sequence are assembled to construct a single piece of multiplexed stream data. In this way, the main TS and sub-TS are created. These pieces of multiplexed stream data MSD are output to the format processing unit 7307.

Furthermore, the multiplex processing unit 7306 creates the offset metadata 1310 shown in FIGS. 13 and 14 based on the offset information 7310 stored in the database unit 7301. The created offset metadata 1310, as shown in FIG. 13, is stored in the dependent-view video stream. At this point, the mask area information 7311 stored in the database unit 7301 is stored in the dependent-view video stream together with the offset metadata. Note that the multiplex processing unit 7306 may process each piece of graphics data to adjust the arrangement of the graphics elements in the left and right video image frames so that the 3D graphics images represented by each graphics plane are not displayed as overlapping in the same visual direction as 3D graphics images represented by the other graphics planes. The multiplex processing unit 7306 may also then adjust the offset value for each video frame so that the depths of 3D graphics images do not overlap.

Additionally, the multiplex processing unit 7306 creates a 2D clip information file and a dependent-view clip information file. Specifically, the multiplex processing unit 7306 first creates entry maps and lists of extent start points for the file 2D and file DEP. At this point, the multiplex processing unit 7306 arranges the 2D extents, base-view extents, dependent-view extents, and extents SS. Furthermore, the multiplex processing unit 7306 extracts attribute information from each elementary stream to be multiplexed into the main TS and sub-TS. Subsequently, the multiplex processing unit 7306 creates each clip information file CLI from the entry maps, lists of extent start points, and attribute information, and outputs the clip information files CLI to the format processing unit 7307.

The format processing unit 7307 creates a BD-ROM disc image 7320 of the directory structure shown in FIG. 2 from (i) the BD-ROM scenario data 7317 stored in the database unit 7301, (ii) a group of program files BDP such as BD-J object files created by the BD program creation unit 7305, and (iii) multiplexed stream data MSD and clip information files CLI generated by the multiplex processing unit 7306. In this directory structure, UDF is used as the file system.

When creating file entries for each of the files 2D, files DEP, and files SS, the format processing unit 7307 refers to the entry maps and 3D metadata included in the 2D clip information files and dependent-view clip information files. The SPN for each entry point and extent start point is thereby used in creating each allocation descriptor. In particular, the value of the LBN and the extent size to be represented by each allocation descriptor are determined so as to express an interleaved arrangement like the one shown in FIG. 19. As a result, each base-view data block is shared by a file SS and file 2D, and each dependent-view data block is shared by a file SS and file DEP.

Also, based on the view coding information VCI, the format processing unit 7307 rewrites the 3D playlist file, setting a view coding flag as shown in FIG. 68 in each PI in the main path.

<Recording Method of BD-ROM Disc Image>

Figure 75:
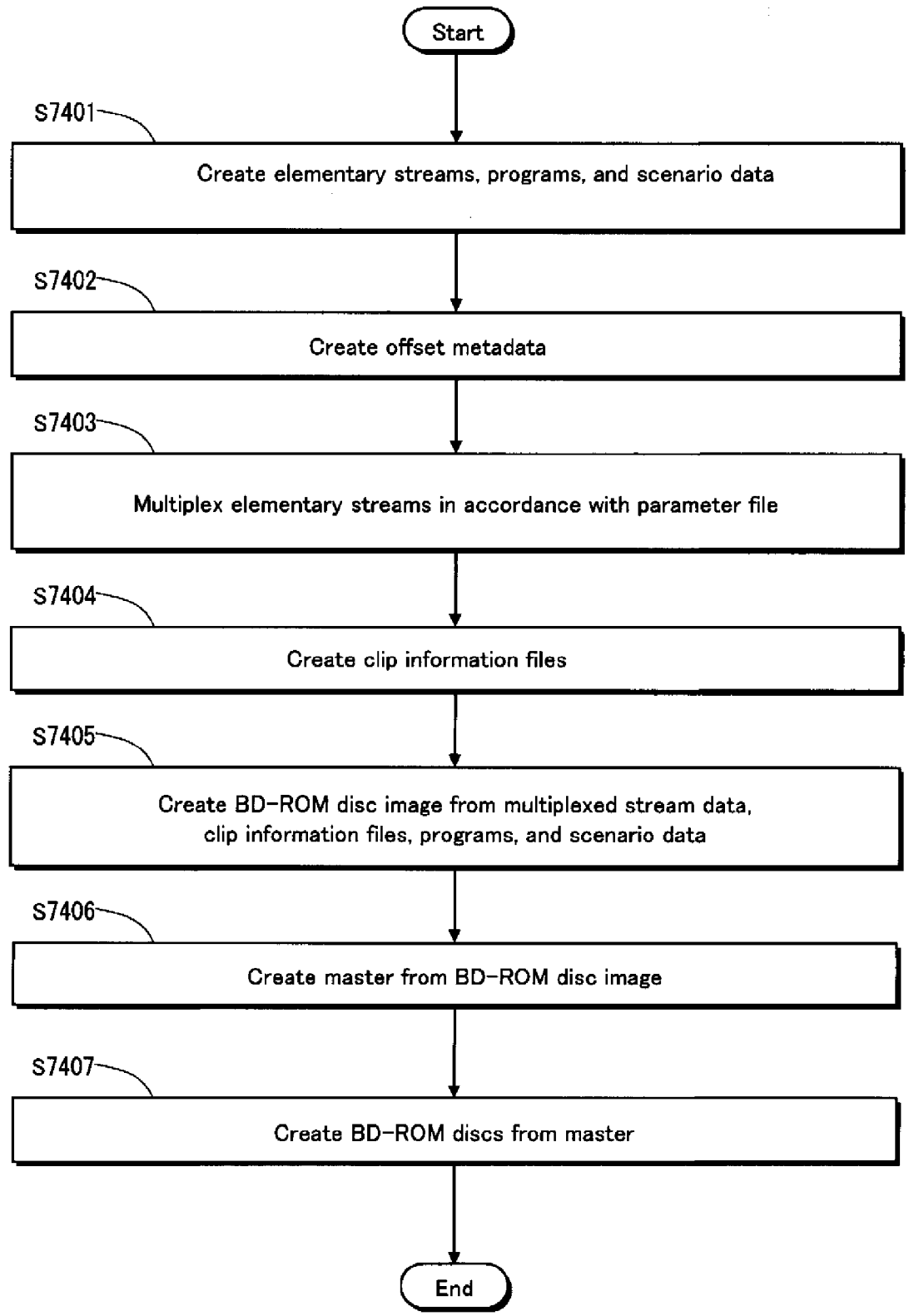
FIG. 75 is a flowchart of a method for recording movie content on a BD-ROM disc using the recording device 7300 shown in FIG. 74.

FIG. 75 is a flowchart of a method for recording movie content on a BD-ROM disc using the recording device 7300 shown in FIG. 74. This method begins, for example, when power to the recording device 7300 is turned on.

In step S7401, the elementary streams, programs, and scenario data to be recorded on a BD-ROM disc are created. In other words, the video encoder 7302 creates a video stream 7312. The material creation unit 7303 creates an audio stream 7313, PG stream 7314, IG stream 7315, and text subtitle stream 7316. The scenario generation unit 7304 creates BD-ROM scenario data 7317. These created pieces of data 7312-7317 are stored in the database unit 7301. On the other hand, the video encoder 7302 creates offset information 7310 and mask area information 7311 and stores these pieces of information in the database unit 7301. The video encoder 7302 also creates view coding information VCI and transfers this information to the format processing unit 7307. The material creation unit 7303 creates offset information 7310 and stores this information in the database unit 7301. The scenario generation unit 7304 creates a parameter file PRF and transfers this file to the multiplex processing unit 7306. The BD program creation unit 7305 creates a group of program files BDP, which include a BD-J object file and a JAR file, and transfers this group BDP to the format processing unit 7307. The BD program creation unit 7305 also creates offset information 7310 and stores this information in the database unit 7301. Thereafter, processing proceeds to step S7402.

In step S7402, the multiplex processing unit 7306 creates offset metadata based on the offset information 7310 stored in the database unit 7301. The created offset metadata is stored in the dependent-view video stream along with the mask area information 7311. Thereafter, processing proceeds to step S7403.

In step S7403, the multiplex processing unit 7306 reads the elementary streams 7312-7316 from the database unit 7301 in accordance with the parameter file PRF and multiplexes these streams into a stream file in MPEG2-TS format. Thereafter, processing proceeds to step S7404.

In step S7404, the multiplex processing unit 7306 creates a 2D clip information file and a dependent-view clip information file. In particular, during creation of the entry map and extent start points, the extent ATC time is aligned between contiguous data blocks. Furthermore, the sizes of 2D extents, base-view extents, dependent-view extents, and extents SS are set to satisfy predetermined conditions. Thereafter, processing proceeds to step S7405.

In step S7405, the format processing unit 7307 creates a BD-ROM disc image 7320 from the BD-ROM scenario data 7317, group of program files BDP, multiplexed stream data MDS, and clip information file CLI. At this point, the format processing unit 7307 furthermore sets the view coding flag in the 3D playlist file based on the view coding information VCI. Thereafter, processing proceeds to step S7406.

In step S7406, the BD-ROM disc image 7320 is converted into data for BD-ROM pressing. Furthermore, this data is recorded on a master BD-ROM disc. Thereafter, processing proceeds to step S7407.

In step S7407, BD-ROM discs 101 are mass produced by pressing the master obtained in step S7406. Processing thus concludes.

<Video Encoder>

Figure 76:
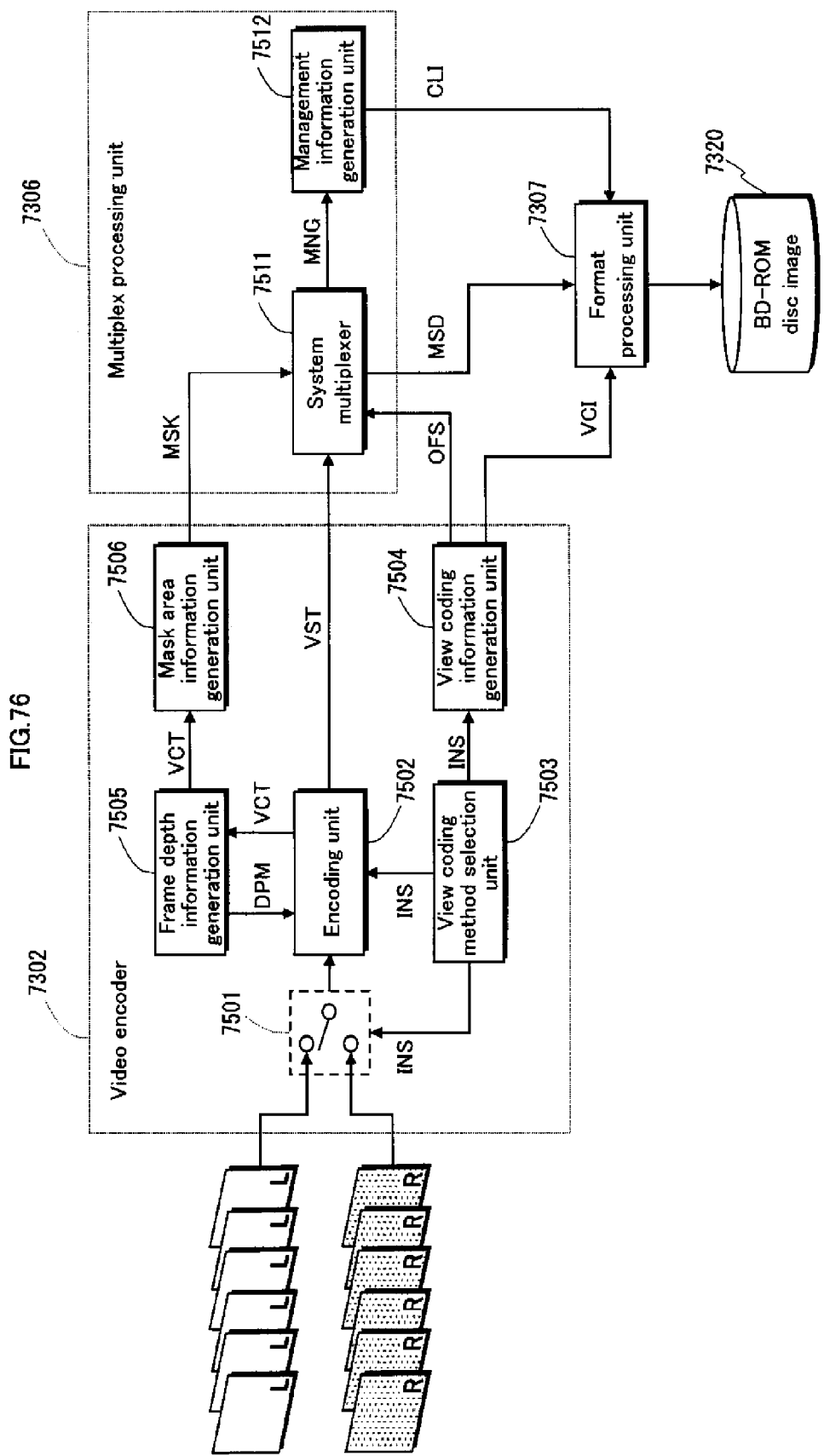
FIG. 76 is a functional block diagram of a video encoder 7302 and a multiplex processing unit 7306 which are shown in FIG. 74.

FIG. 76 is a functional block diagram of the video encoder 7302 and the multiplex processing unit 7306. As shown in FIG. 76, the video encoder 7302 includes a switch 7501, encoding unit 7502, view coding method selection unit 7503, view coding information generation unit 7504, frame depth information generation unit 7505, and mask area information generation unit 7506. The multiplex processing unit 7306 includes a system multiplexer 7511 and a management information generation unit 7512.

The switch 7501 receives a pair of video frames L and R, respectively representing a left view and a right view, from an external device such as a 3D video camera. At this point, the switch 7501 selects the video frame to transmit to the encoding unit 7502 in response to an instruction from the view coding method selection unit 7503. Specifically, when this instruction indicates a "3D playback section", the switch 7501 alternately outputs a left-view and right-view video frame to the encoding unit 7502. On the other hand, when this instruction indicates a "pseudo-2D playback section" or a "regular 2D playback section", the switch 7501 only outputs a left-view video frame to the encoding unit 7502.

The encoding unit 7502 receives a video frame from the switch 7501 in response to an instruction from the view coding method selection unit 7503 and compresses the video frame using a multiview coding method such as MVC or a single view coding method such as MPEG-4 AVC. At this point, the encoding unit 7502 selects the view coding method in accordance with the type of playback section indicated by the view coding method selection unit 7503.

Figure 77:
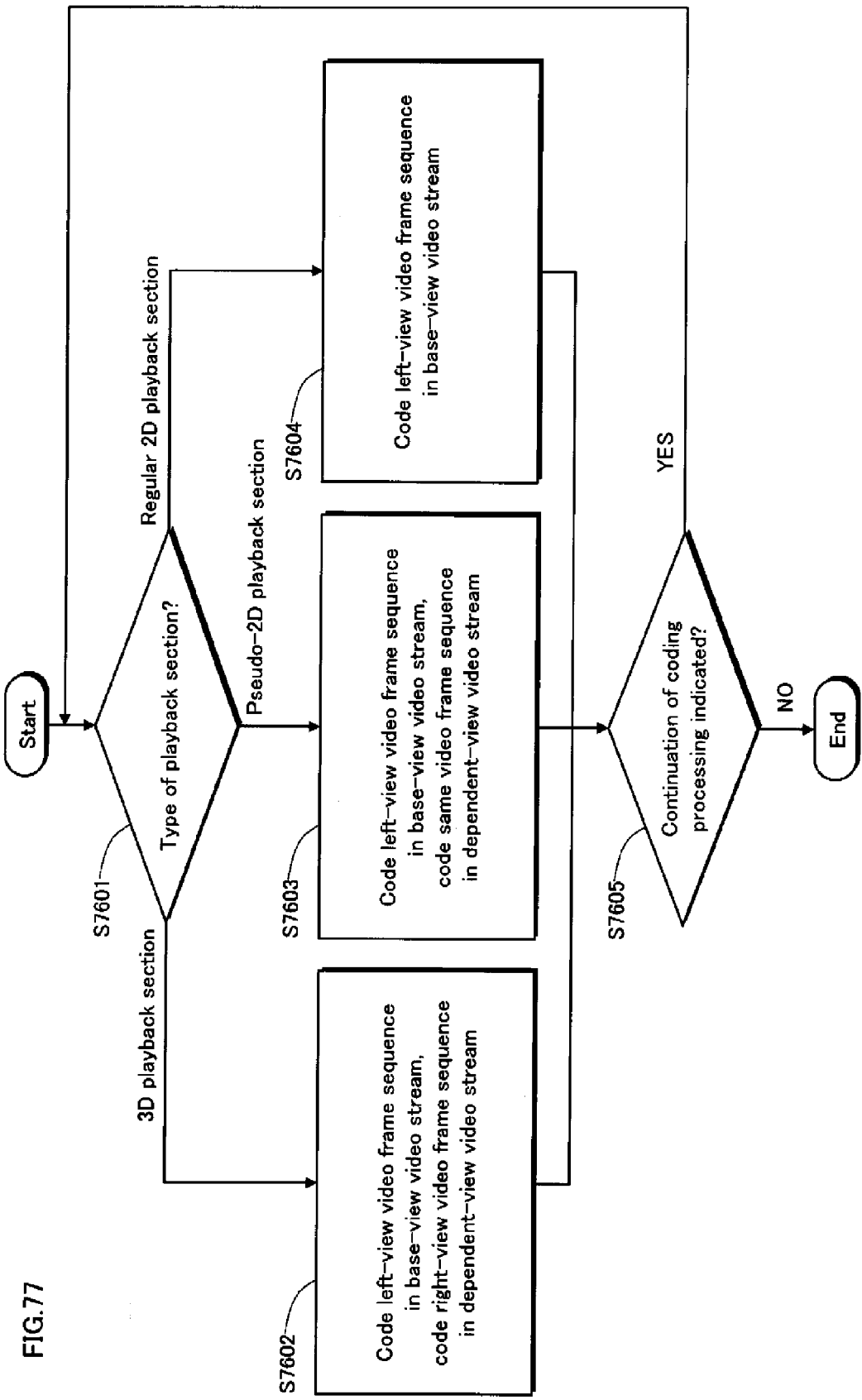
FIG. 77 is a flowchart of processing by an encoding unit 7502 shown in FIG. 76 to encode a video frame sequence.

FIG. 77 is a flowchart of processing by the encoding unit 7502 to encode a video frame sequence. This processing beings when the view coding method selection unit 7503 instructs the encoding unit 7502 to encode a video frame sequence.

In step S7601, the encoding unit 7502 determines the type of playback section indicated by the view coding method selection unit 7503. If the type is "3D playback section", "pseudo-2D playback section", and "regular 2D playback section", the processing respectively proceeds to step S7602, S7603, or S7604.

In step S7602, the encoding unit 7502 selects a multiview coding method. In other words, the encoding unit 7502 converts a sequence of video frames L representing left views into a base-view video stream via predictive encoding between the pictures in the sequence. On the other hand, the encoding unit 7502 converts a sequence of video frames R representing right views into a dependent-view video stream via predictive encoding not only within the sequence, but also between the pictures in the sequence and the base-view pictures. Thereafter, processing proceeds to step S7605.

In step S7603, the encoding unit 7502 selects a multiview coding method. However, since the playback section to be encoded is a "pseudo-2D playback section", only a sequence of left-view video frames L has been received from the switch 7501. The encoding unit 7502 converts this sequence into a base-view video stream via predictive encoding between the pictures in the sequence. The encoding unit 7502 then encodes the pictures in the sequence using the pictures themselves as reference pictures. The sequence is thus converted into a dependent-view video stream. Thereafter, processing proceeds to step S7605.

In step S7604, the encoding unit 7502 selects a single view coding method. The encoding unit 7502 converts a sequence of video frames received from the switch 7501 into a base-view video stream via predictive encoding between the pictures in the sequence. On the other hand, the encoding unit 7502 does not generate a dependent-view video stream. Thereafter, processing proceeds to step S7605.

In step S7605, the encoding unit 7502 checks whether the view coding method selection unit 7503 has indicated to continue encoding. If continued encoding has been indicated, processing is repeated starting at step S7601. Otherwise, processing terminates.

From the authoring staff, the view coding method selection unit 7503 receives information on one or more playback sections (hereinafter "consecutive playback sections") that are to be constructed consecutively from video frame sequences received by the switch 7501. In particular, this information indicates whether "each playback section is a 3D playback section or a 2D playback section" and whether "each playback section overlaps a playback section of 3D graphics images (hereinafter, a "3D graphics playback section"). In accordance with this information, the view coding method selection unit 7503 determines whether "the playback section to be constructed from the video frame sequence is a 3D playback section, pseudo-2D playback section, or regular 2D playback section". Furthermore, in synchronization with the switch 7501 receiving the video frame sequence from which a playback section is to be constructed, the view coding method selection unit 7503 indicates the type of the playback section to the switch 7501 and the encoding unit 7502.

Figure 78:
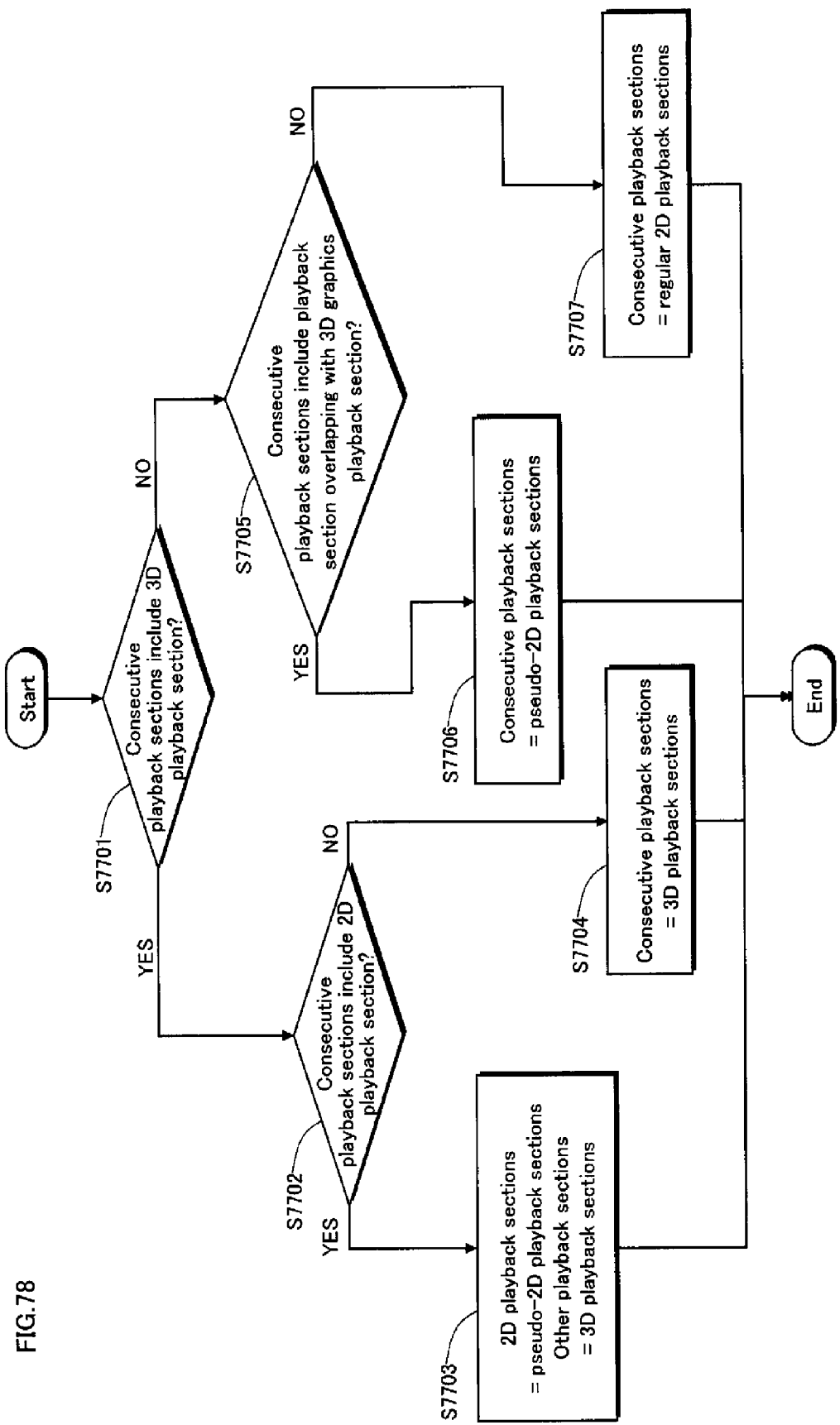
FIG. 78 is a flowchart of processing to determine the type of playback section that is to be constructed from a video frame sequence.

FIG. 78 is a flowchart of processing to determine the type of playback section that is to be constructed from a video frame sequence. This processing begins when the view coding method selection unit 7503 receives information on consecutive playback sections from the authoring staff.

In step S7701, the view coding method selection unit 7503 determines from the information on consecutive playback sections whether "the consecutive playback sections include a 3D playback section". When the consecutive playback sections include a 3D playback section, processing proceeds to step S7702. When the consecutive playback sections do not include a 3D playback section, i.e. when the consecutive playback sections are all 2D playback sections, processing proceeds to step S7705.

In step S7702, the view coding method selection unit 7503 determines from the information on consecutive playback sections whether "the consecutive playback sections include a 2D playback section". When the consecutive playback sections include a 2D playback section, processing proceeds to step S7703. When the consecutive playback sections do not include a 2D playback section, i.e. when the consecutive playback sections are all 3D playback sections, processing proceeds to step S7704.

In step S7703, the consecutive playback sections include a combination of 2D playback sections and 3D playback sections. Accordingly, the view coding method selection unit 7503 determines that the 2D playback sections within the consecutive playback sections are pseudo-2D playback sections, and that the remaining playback sections are 3D playback sections. Processing then terminates.

In step S7704, the view coding method selection unit 7503 determines that all of the consecutive playback sections are 3D playback sections. Processing then terminates.

In step S7705, the view coding method selection unit 7503 determines from the information on consecutive playback sections whether "the consecutive playback sections include a playback section that overlaps a 3D graphics playback section". When the consecutive playback sections include such a playback section, processing proceeds to step S7706. When the consecutive playback sections do not include such a playback section, processing proceeds to step S7707.

In step S7706, 3D graphics images are combined with 2D video images in at least a part of the consecutive playback sections. Accordingly, the view coding method selection unit 7503 determines that all of the consecutive playback sections are pseudo-2D playback sections. Alternatively, the view coding method selection unit 7503 may determine that, within the consecutive playback sections, the 2D playback sections that overlap 3D graphics playback sections are pseudo-2D playback sections, and that the remaining playback sections are regular 2D playback sections. Processing then terminates.

In step S7707, the view coding method selection unit 7503 determines that all of the consecutive playback sections are regular 2D playback sections. Processing then terminates.

Referring again to FIG. 76, the view coding information generation unit 7504 generates view coding information VCI based on instructions from the view coding method selection unit 7503. This view coding information VCI associates each playback section constructed from a video stream encoded by the encoding unit 7502 with a playback section type indicated by the view coding method selection unit 7503. When the encoding unit 7502 encodes a secondary video stream from a video frame sequence of 2D video images, the view coding information generation unit 7504 may further generate offset information OFS for the secondary video plane in accordance with operations by the authoring staff.

The frame depth information generation unit 7505 calculates depth information for each 3D video image from a motion vector VCT of each image between the left view and right view as detected by the encoding unit 7502. FIGS. 79A and 79B are schematic diagrams respectively showing a picture in a left view and a right view used to display one scene of 3D video images, and FIG. 79C is a schematic diagram showing depth information calculated from these pictures by the frame depth information generation unit 7505.

The encoding unit 7502 compresses left-view and right-view pictures using the redundancy between the pictures. In other words, the encoding unit 7502 compares both uncompressed pictures on a per-macroblock basis, i.e. per matrices of 8×8 or 16×16 pixels, so as to detect a motion vector for each image in the two pictures. Specifically, as shown in FIGS. 79A and 79B, a left-view picture 7801 and a right-view picture 7802 are first each divided into macroblocks 7803. Next, the areas occupied by the image data in picture 7801 and picture 7802 are compared for each macroblock 7803, and a motion vector for each image is detected based on the result of the comparison. For example, the area occupied by image 7804 showing a "house" in picture 7801 is substantially the same as that in picture 7802. Accordingly, a motion vector is not detected from these areas. On the other hand, the area occupied by image 7805 showing a "circle" in picture 7801 is substantially different from the area in picture 7802. Accordingly, a motion vector of the image 7805 is detected from these areas.

The encoding unit 7502 uses the detected motion vector to compress the pictures 7801 and 7802. On the other hand, the frame depth information generation unit 7505 uses the motion vector VCT to calculate the binocular parallax of the each image, such as the "house" image 7804 and "circle" image 7805. The frame depth information generation unit 7505 further calculates the depth of each image from the image's binocular parallax. The information indicating the depth of each image may be organized into a matrix 7806 the same size as the matrix of the macroblocks in pictures 7801 and 7802, as shown in FIG. 79C. In this matrix 7806, blocks 7807 are in one-to-one correspondence with the macroblocks 7803 in pictures 7801 and 7802.

Each block 7807 indicates the depth of the image shown by the corresponding macroblocks 7803 by using, for example, a depth of 8 bits. In the example shown in FIG. 79, the depth of the image 7805 of the "circle" is stored in each of the blocks in an area 7808 in the matrix 7806. This area 7808 corresponds to the entire areas in the pictures 7801 and 7802 that represent the image 7805.

The frame depth information generation unit 7505 may furthermore use this depth information to generate a depth map DPM for the left view or right view. In this case, the encoding unit 7502 respectively encodes either the left-view or right-view video frame sequence and the corresponding depth map DPM sequence as the base-view video stream and the depth map stream.

The mask area information generation unit 7506 uses the motion vector VCT detected by the frame depth information generation unit 7505 to generate mask area information MSK. If an image is included in a vertical or horizontal strip included at the edge of either the left view or the right view, the motion vector of this image is detected as indicating "frame out" from the left view to the right view or vice-versa. Accordingly, the mask area information generation unit 7506 can calculate the width or height of each strip from this motion vector.

<Multiplex Processing Unit>

In accordance with the parameter file PRF, the system multiplexer 7511 multiplexes the video stream VST encoded by the encoding unit 7502 with the elementary streams 7313-7316 into one piece of multiplexed stream data MSD. Furthermore, the system multiplexer 7511 creates offset metadata based on offset information OFS 7310 and stores the offset metadata along with the mask area information MSK in the dependent-view video stream. Additionally, the system multiplexer 7511 transmits management information MNG on the position of random access points in the multiplexed stream data MSD, the playback start/end time, etc. to the management information generation unit 7512.

The management information generation unit 7512 uses this management information MNG to create a 2D clip information file and a dependent-view clip information file via the following four steps. (I) Entry maps 2230 shown in FIG. 23 are created for the file 2D and file DEP. (II) Using each file's entry map, the extent start points 2242 and 2420 shown in FIGS. 24A and 24B are created. At this point, extent ATC times are aligned between consecutive data blocks. Furthermore, the sizes of 2D extents, base-view extents, dependent-view extents, and extents SS are set to satisfy predetermined conditions (see the <<Supplementary Explanation>> regarding these conditions). (III) The stream attribute information 2220 shown in FIG. 22 is extracted from each elementary stream to be multiplexed into the main TS and sub-TS. (IV) As shown in FIG. 22, a combination of an entry map 2230, 3D meta data 2240, and stream attribute information 2220 is associated with a piece of clip information 2210. Each clip information file CLI is thus created and transmitted to the format processing unit 7307.

Figure 80:
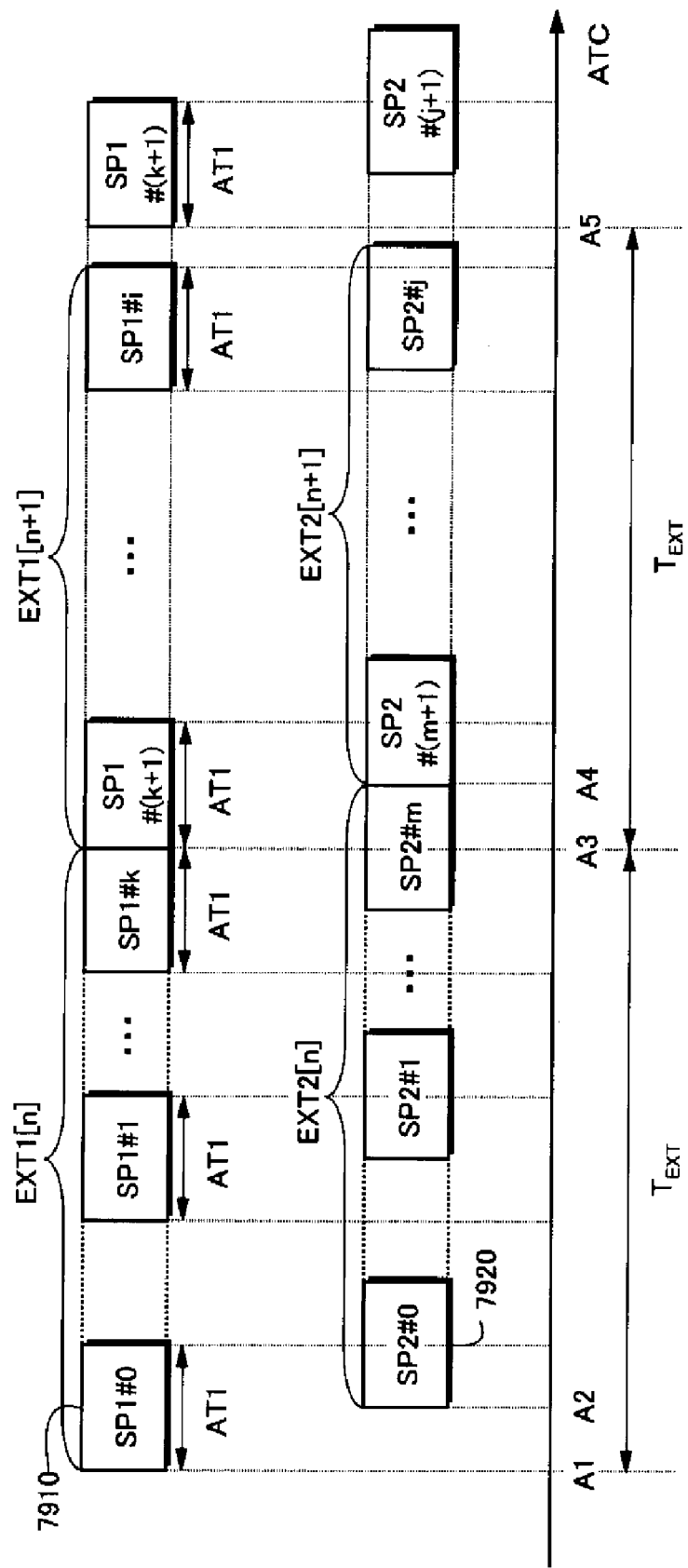
FIG. 80 is a schematic diagram showing a method to align extent ATC times between consecutive data blocks.

FIG. 80 is a schematic diagram showing a method to align extent ATC times between consecutive data blocks. First, ATSs along the same ATC time axis are assigned to source packets stored in a base-view data block (hereinafter, SP1) and source packets stored in a dependent-view data block (hereinafter, SP2). As shown in FIG. 80, the rectangles 7910 and 7920 respectively represent SP1 #p (p=0, 1, 2, 3, k, k+1, i+1) and SP2 #q (q=0, 1, 2, 3, ..., m, m+1, j). These rectangles 7910 and 7920 are arranged in order along the time axis by the ATS of each source packet. The position of the top of each rectangle 7910 and 7920 represents the value of the ATS of the source packet. The length AT1 of each rectangle 7910 and 7920 represents the amount of time needed for the 3D playback device to transfer one source packet from the read buffer to the system target decoder.

From the ATS A1 of SP1 #0 until an extent ATC time $T_{EXT}$ has passed, SP1, i.e. SP1 #0, 1, 2, ..., k, is transferred from the read buffer to the system target decoder and stored as the $n^{th}$ base-view extent EXT1[n] in one base-view data block. Similarly, from the ATS A3 of SP1 #(k+1) until an extent ATC time $T_{EXT}$ has passed, SP1, i.e. SP1 #(k+1), . . . , i, is transferred from the read buffer to the system target decoder and stored as the $(n+1)^{th}$ base-view extent EXT1[n+1] in the next base-view data block.

On the other hand, SP2, which is to be stored in as the $n^{th}$ dependent-view extent EXT2[n] in one dependent-view data block, is selected as follows. First, the sum of the ATS A1 of SP1 #0 and the extent ATC time $T_{EXT}$, A1+$T_{EXT}$, is sought as ATS A3 of SP1 #(k+1) located at the top of the $(n+1)^{th}$ base-view extent EXT1[n+1]. Next, SP2, i.e. SP2 #0, 1, 2, . . . , m, is selected. Transfer of SP2 from the read buffer to the system target decoder begins during the period from ATS A1 of SP1 #0 until ATS A3 of SP1 #(k+1). Accordingly, the top SP2, i.e. ATS A2 of SP2 #0, is always equal to or greater than the top SP1, i.e. ATS A1 of SP1 #0: A2 > A1. Furthermore, all of the ATS of SP2 #0–m are less than ATS A3 of SP1 #(k+1). In this context, completion of transfer of the last SP2, i.e. SP #m, may be at or after ATS A3 of SP1 #(k+1).

Similarly, SP2, which is to be stored as the $(n+1)^{th}$ dependent-view extent EXT2[n+1] in one dependent-view data block, is selected as follows. First, ATS A5 of SP1+1) located at the top of the $(n+2)^{th}$ base-view extent is sought as ATS AS=A3+$T_{EXT}$. Next, SP2, i.e. SP2 #(m+1)–j, is selected. Transfer of SP2 from the read buffer to the system target decoder begins during the period from ATS A3 of SP1 #(k+1) until ATS A5 of SP1+1). Accordingly, the top SP2, i.e. ATS A4 of SP2 #(m+1), is always equal to or greater than the top SP1, i.e. ATS A3 of SP1 #(k+1): A4 >A3. Furthermore, all of the ATS of SP2 #(m+1)–j are less than ATS AS of SP1 #(k+1).

<<Embodiment 5>>

Figure 81:
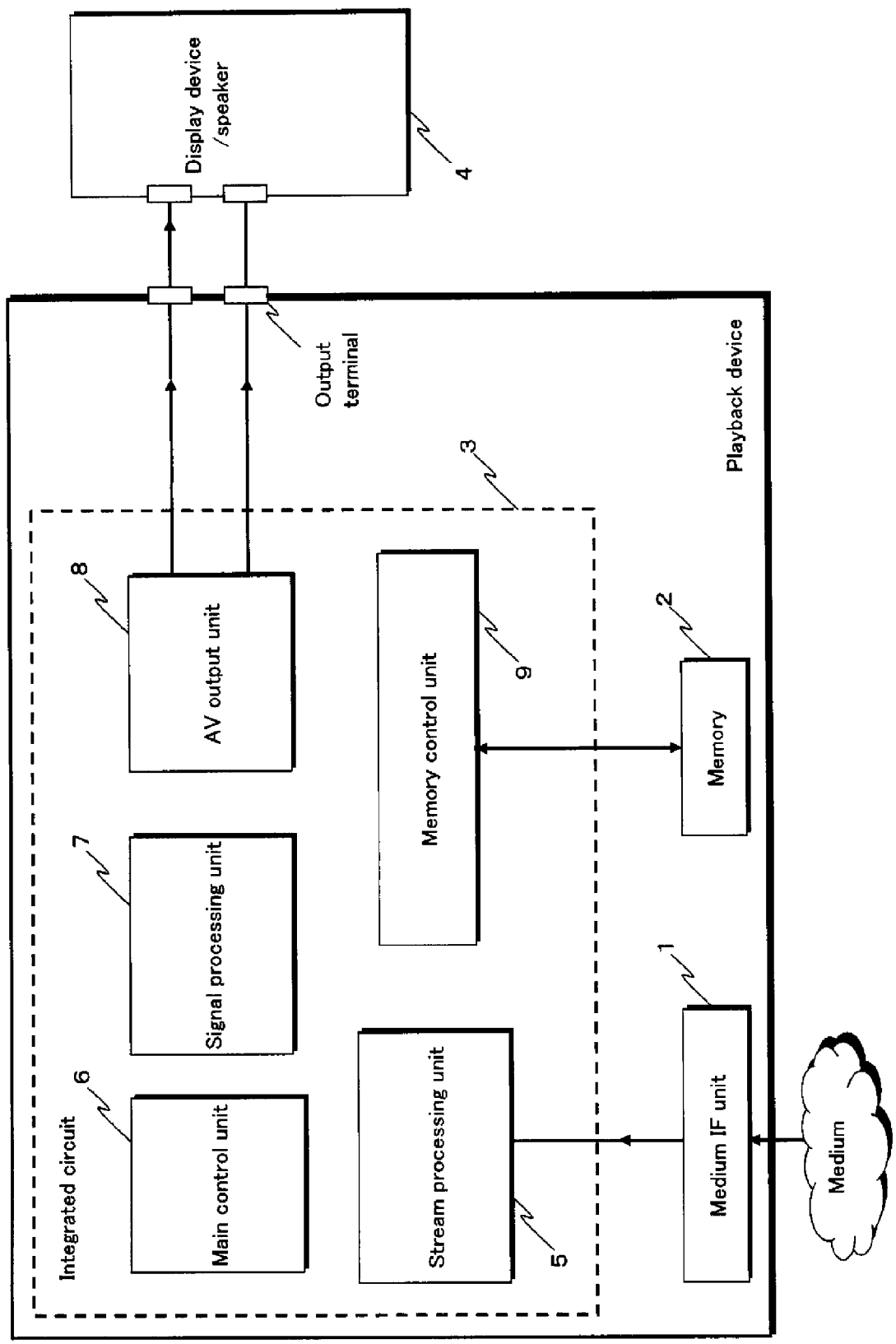
FIG. 81 is an example of a structure that uses an integrated circuit to implement a 2D/3D playback device.

In this embodiment, a description is provided for an example of a structure (FIG. 81) that uses an integrated circuit 3 to implement a playback device that plays back the data structure described in previous embodiments.

A medium IF unit 1 receives (reads) data from a medium and transmits the data to the integrated circuit 3. Note that the data the medium IF unit 1 receives from the medium has the structure described in previous embodiments. The medium IF unit 1 is, for example, a disk drive if the medium is an optical disc or hard disk; a card IF if the medium is a semiconductor memory such as an SD card, USB memory, etc.; a CAN tuner or Si tuner if the medium is a broadcast wave such as CATV or the like; and a network IF if the medium is the Ethernet™, wireless LAN, wireless public network, etc.

A memory 2 temporarily stores both the data that is received (read) from the medium and data that is being processed by the integrated circuit 3. A Synchronous Dynamic Random Access Memory (SDRAM), Double-Data-Rate x Synchronous Dynamic Random Access Memory (DDRx SDRAM; x=1, 2, 3, . . . ), etc. is used as the memory 2. Any number of memories 2 may be provided; as necessary, the memory 2 may be a single element or a plurality of elements.

The integrated circuit 3 is a system LSI and performs video and audio processing on the data transmitted from the medium IF unit 1. The integrated circuit 3 includes a main control unit 6, stream processing unit 5, signal processing unit 7, memory control unit 9, AV output unit 8, etc.

The main control unit 6 includes a processor core with a timer function and an interrupt function. The processor core controls the entire integrated circuit 3 in accordance with programs stored, for example, in the program memory. Note that the program memory or the like pre-stores basic software such as the OS.

Under the control of the main control unit 6, the stream processing unit 5 receives data from the medium transmitted via the medium IF unit 1 and stores the received data in the memory 2 via a data bus in the integrated circuit 3. Additionally, the stream processing unit 5 separates the received data into visual data and audio data. As previously described, in the data on the medium, a 2D/left-view AV stream file that includes a left-view video stream and a right-view AV stream file that includes a right-view video stream are divided into a plurality of extents that are alternately arranged. Accordingly, the main control unit 6 controls the integrated circuit 3 so that when left-view data that includes a left-view AV stream file is received, the data is stored in a first area in the memory 2, and when right-view data that includes a right-view video stream is received, the data is stored in a second area in the memory 2. Left-view data belongs to left-view extents, and right-view data belongs to right-view extents. Note that the first area and second area in the memory 2 may be a logical division of a single memory element or may be physically different memory elements. Also, in embodiment 5, the left-view data including the left-view video stream is considered main-view data, and the right-view data including the right-view video stream is considered sub-view data, but conversely the right-view data may be the main-view data and the left-view data the sub-view data.

Under the control of the main control unit 6, the signal processing unit 7 decodes, with an appropriate method, the visual data and audio data separated by the stream processing unit 5. The visual data is coded with a method such as MPEG-2, MPEG-4 AVC, MPEG-4 MVC, SMPTE VC-1, etc. Audio data is compressed and coded with a method such as Dolby AC-3, Dolby Digital Plus, MLP, DTS, DTS-HD, linear PCM, etc. The signal processing unit 7 decodes data with the corresponding method. Note that the signal processing unit 7 corresponds, for example, to each of the decoders in embodiment 1 shown in FIG. 44. Furthermore, the signal processing unit 7 extracts the metadata included in the right-view video stream and notifies the AV output unit 8. Note that, as per the above description, the metadata is provided in each GOP constituting the right-view video stream and includes a plurality of pieces of offset information and corresponding offset identifiers.

The memory control unit 9 arbitrates access to the memory 2 by the function blocks in the integrated circuit 3.

Under the control of the main control unit 6, the AV output unit 8 superimposes the visual data decoded by the signal processing unit 7, converts the format of the visual data, and outputs the results to the integrated circuit 3.

Figure 82:
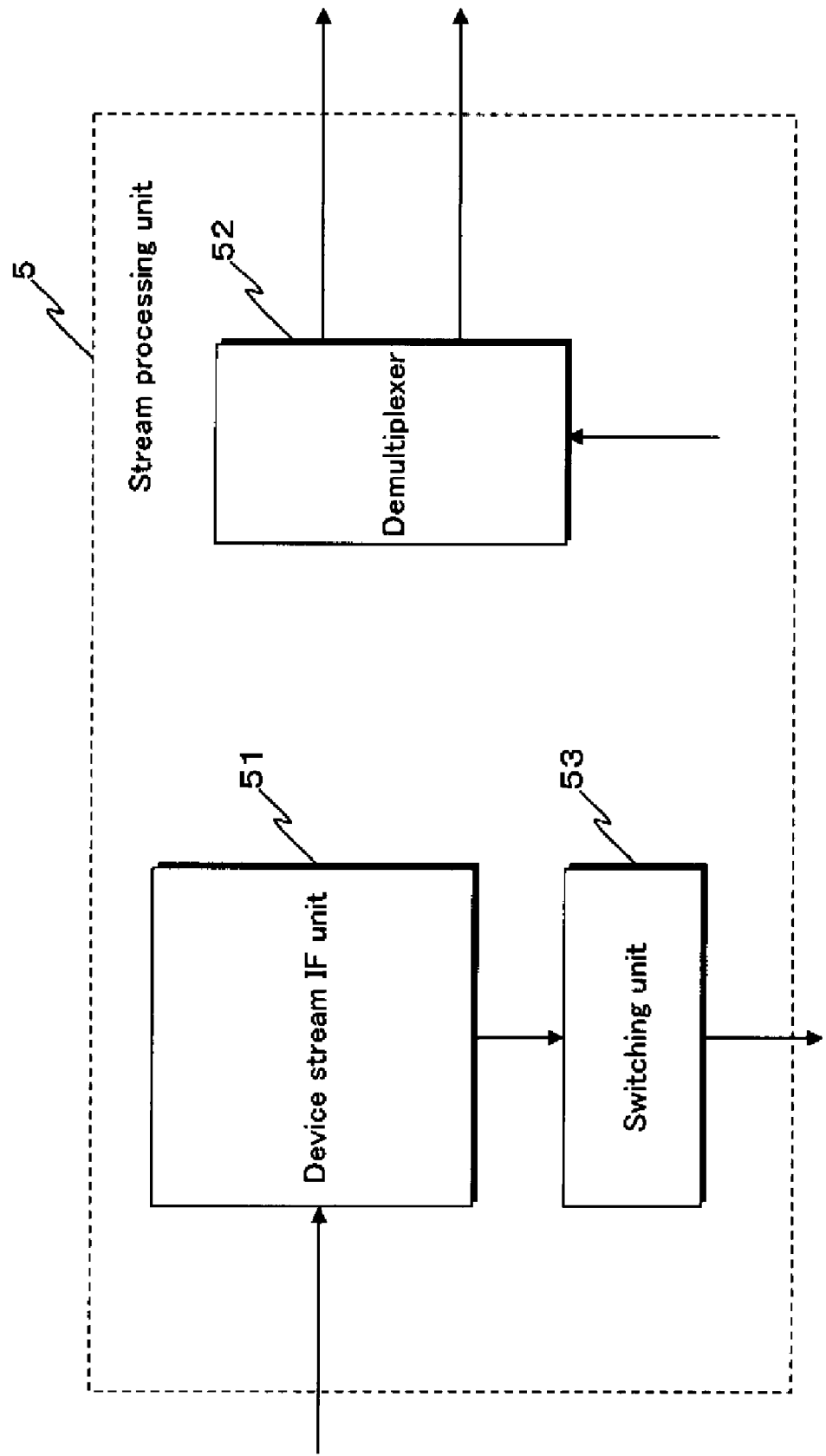
FIG. 82 is a functional block diagram showing a representative structure of a stream processing unit.

FIG. 82 is a functional block diagram showing a representative structure of the stream processing unit 5. The stream processing unit 5 is provided with a device stream IF unit 51, a demultiplexer 52, and a switching unit 53.

The device stream IF unit 51 is an interface that transfers data between the medium IF unit 1 and the integrated circuit 3. For example, the device stream IF unit S1 corresponds to a Serial Advanced Technology Attachment (SATA), Advanced Technology Attachment Packet Interface (ATAPI), or Parallel Advanced Technology Attachment (PATA) if the medium is an optical disc or a hard disk; to a card IF if the medium is a semiconductor memory such as an SD card, USB memory, etc.; to a tuner IF if the medium is a broadcast wave such as CATV or the like; and to a network IF if the medium is a network such as the Ethernet™, a wireless LAN, or a wireless public network. Note that depending on the type of medium, the device stream IF unit 51 may achieve part of the functions of the medium IF unit 1, or the medium IF unit 1 may be internal to the integrated circuit 3.

The demultiplexer 52 separates visual data and audio data from the playback data, which includes video and audio, transmitted from the medium. Each of the above-described extents consists of video, audio, PG (subtitle), IG (menu), etc. source packets. In some cases, however, sub-view data may not include an audio stream. Each extent is separated into video or audio TS packets in accordance with the PID (identifier) included in each source packet and is transmitted to the signal processing unit 7. Processed data is transmitted to the signal processing unit 7 either directly or after temporary storage in the memory 2. Note that the demultiplexer 52 corresponds, for example, to the source depacketizers and the PID filters shown in FIG. 44 in embodiment 1.

Figure 83:
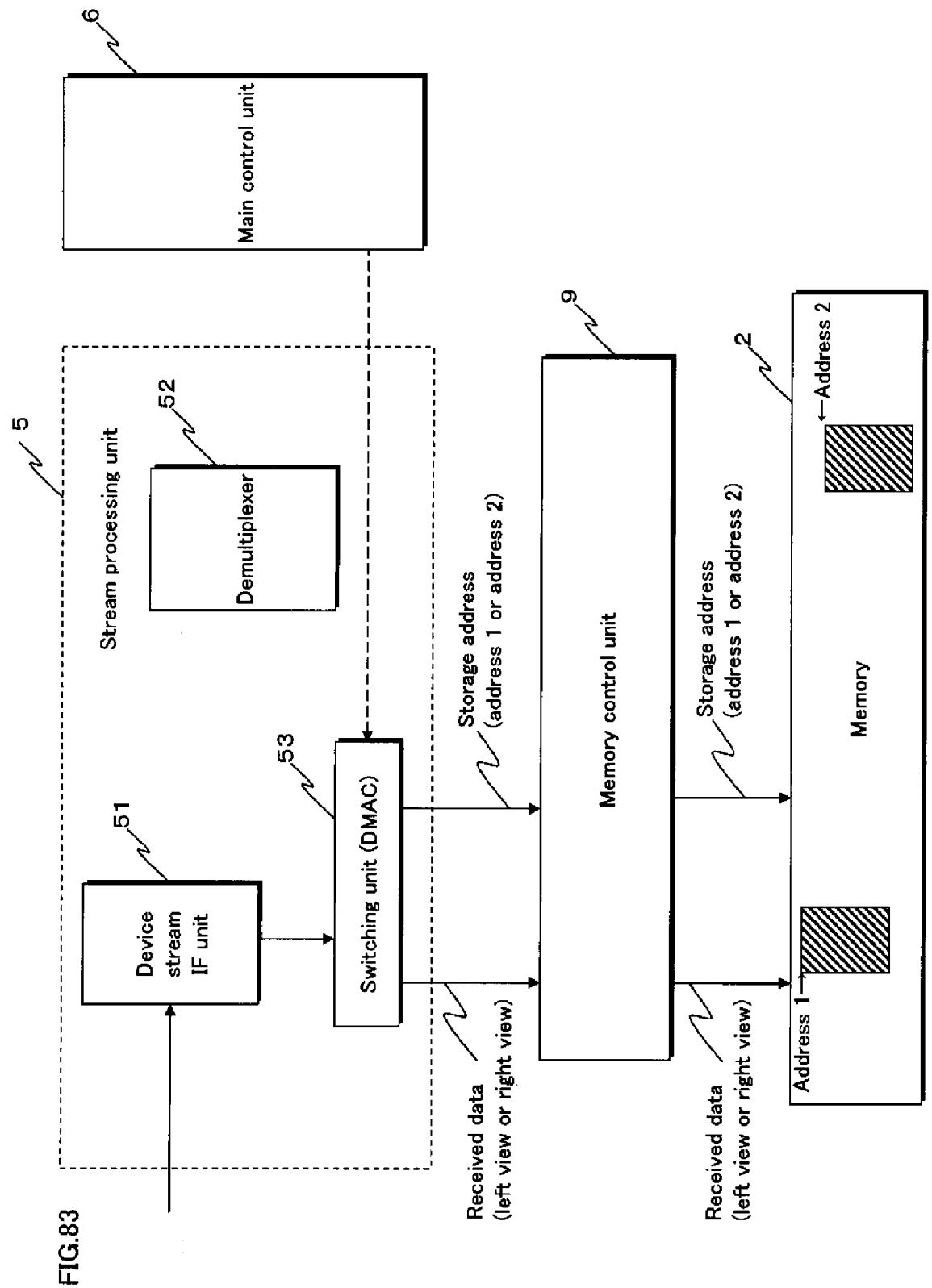
FIG. 83 is a conceptual diagram of a switching unit 53 and surrounding units when the switching unit is a DMAC.

The switching unit 53 switches the output (storage) destination so that when the device stream IF unit 51 receives left-view data, the data is stored in the first area of the memory 2, whereas when the device stream IF unit 51 receives right-view data, the data is stored in the second area of the memory 2. The switching unit 53 is, for example, a Direct Memory Access Controller (DMAC). FIG. 83 is a conceptual diagram of a switching unit 53 and surrounding units when the switching unit 53 is a DMAC. Under the control of the main control unit 6, the DMAC transmits the data received by the device stream IF unit as well as the address of the storage location of the data to the memory control unit 9. Specifically, when the device stream IF unit receives left-view data, the DMAC transmits address 1 (first storage area) to the memory control unit 9, whereas when the device stream IF unit receives right-view data, the DMAC transmits address 2 (second storage area) to the memory control unit 9. The DMAC thus switches the output (storage) location depending on the received data. The memory control unit 9 stores data in the memory 2 in accordance with the address of the storage location transmitted by the DMAC. Note that, instead of the main control unit 6, a dedicated circuit for controlling the switching unit 53 may be provided.

The device stream IF unit 51, demultiplexer 52, and switching unit 53 were described as a representative structure of the stream processing unit 5, but the stream processing unit 5 may be further provided with an encryption engine, a security control unit, a controller for direct memory access, etc. The encryption engine decrypts received encrypted data, key data, etc. The security control unit controls execution of a device authentication protocol or the like between the medium and the playback device and stores a private key. In the above example, when data received from the medium is stored in the memory 2, the switching unit 53 switches the storage location for left-view data and right-view data. Alternatively, the data received from the medium may be temporarily stored in the memory 2 and separated into left-view data and right-view data upon being transferred to the demultiplexer 52.

Figure 84:
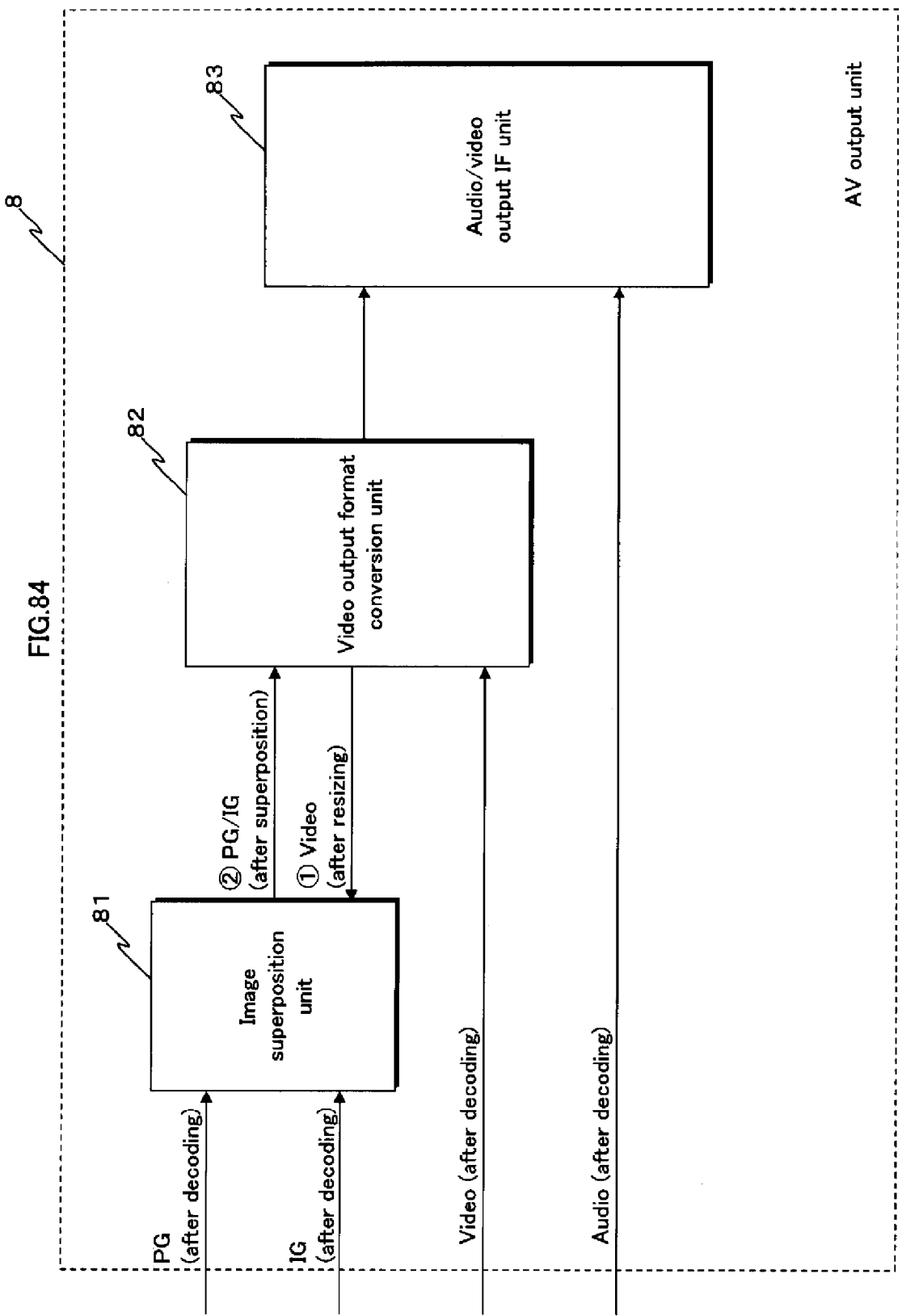
FIG. 84 is a functional block diagram showing a representative structure of an AV output unit.

FIG. 84 is a functional block diagram showing a representative structure of the AV output unit 8. The AV output unit 8 is provided with an image superimposition unit 81, video output format conversion unit 82, and audio/video output IF unit 83.

Figure 90:
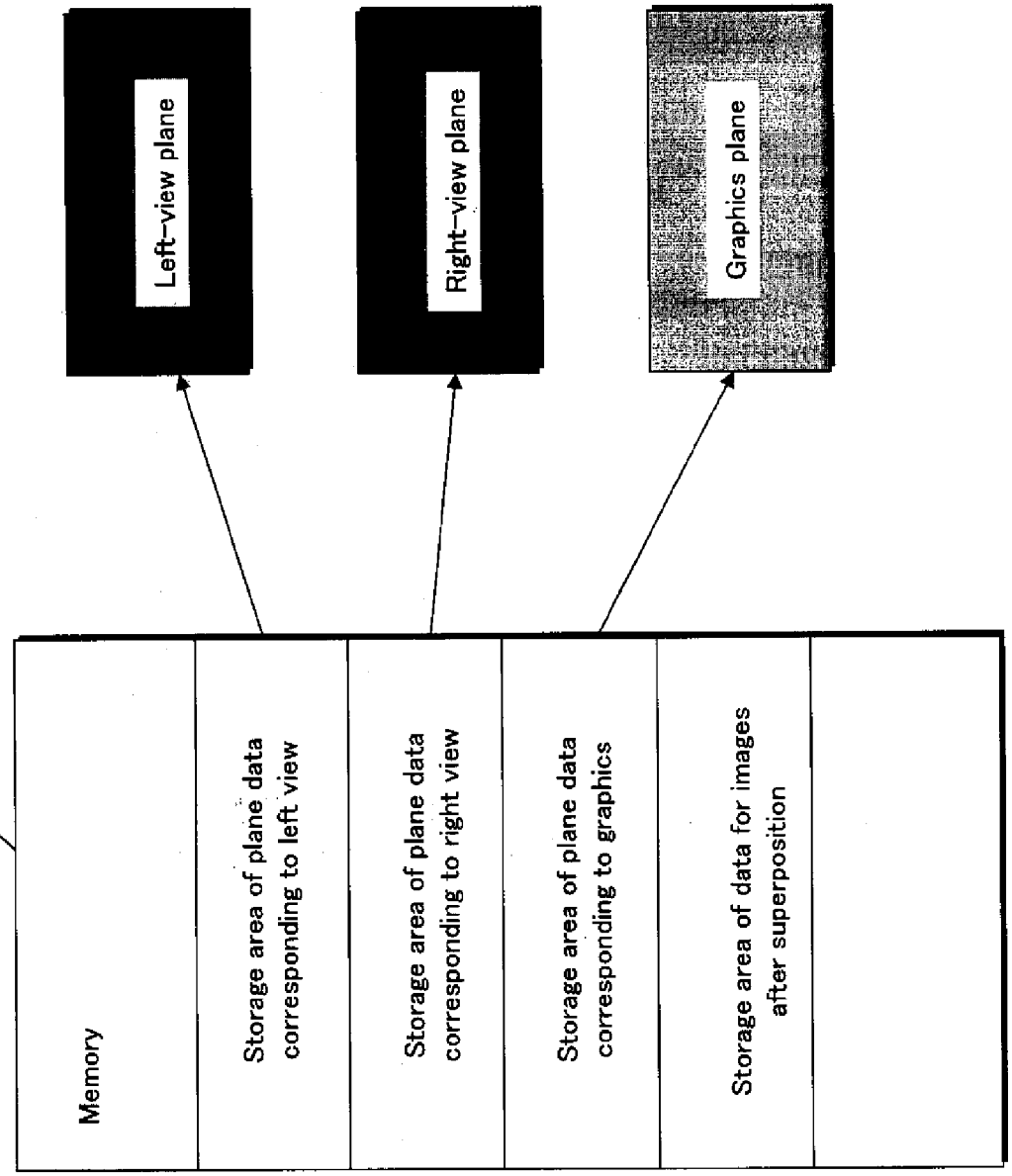
FIG. 90 is a conceptual diagram of image superimposition processing in an image superimposition unit.

The image superimposition unit 81 superimposes decoded visual data. Specifically, the image superimposition unit 81 first superimposes PG (subtitle) and IG (menu) data on the left-view video data and right-view video data in units of pictures. The model for the image superimposition unit 81 is shown, for example, in FIG. 45 in embodiment 1. FIG. 90 shows the correspondence between the memory 2 and each plane during image superimposition. The memory 2 is provided with areas for storing data that has been decoded and is to be rendered on each plane, namely a plane data storage area corresponding to the left view, a plane data storage area corresponding to the right view, and a plane data storage area corresponding to graphics. In this context, a plane is both an area in the memory 2 and a virtual space.

Figure 91:
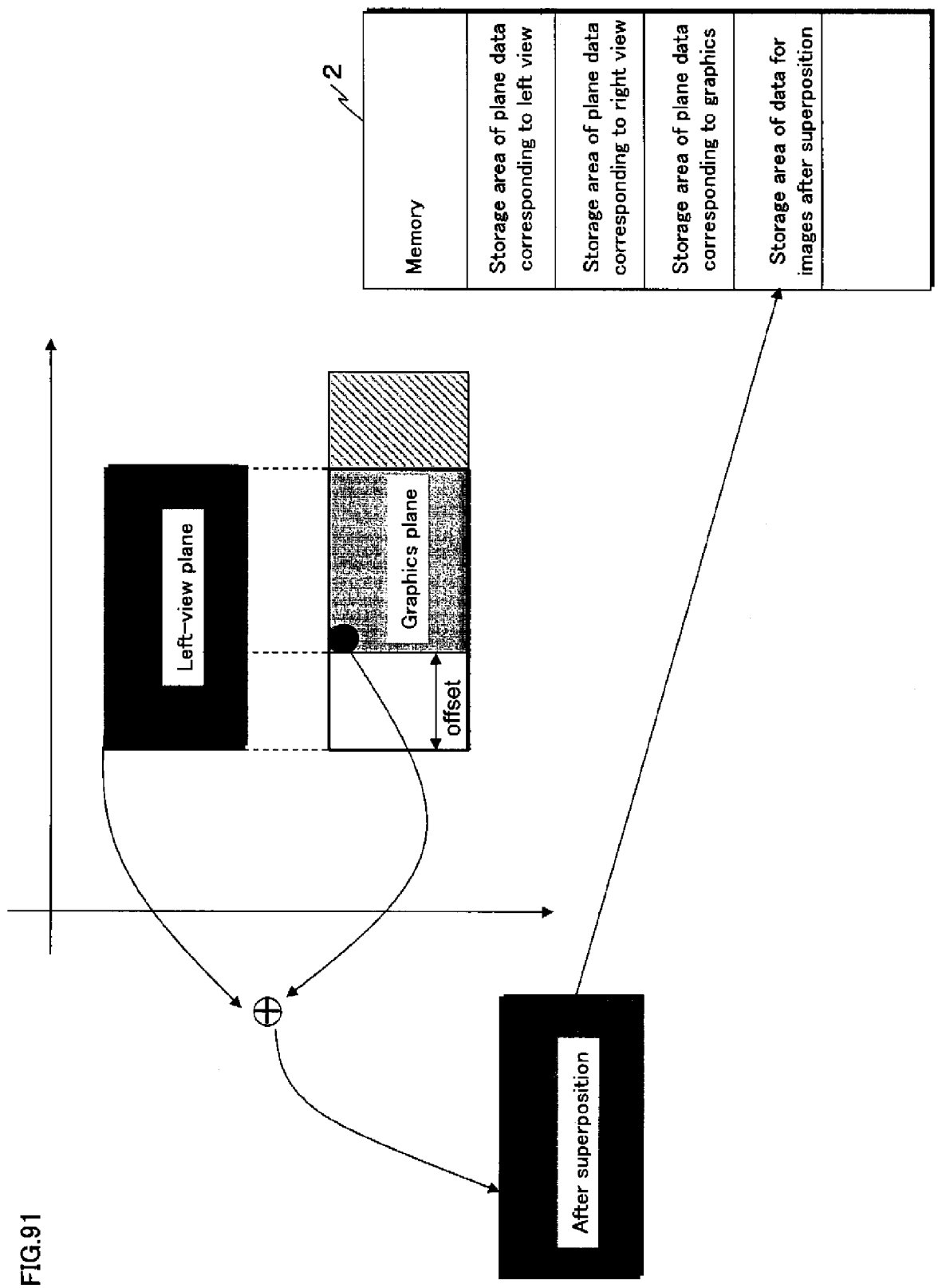
FIG. 91 is a conceptual diagram of image superimposition processing in an image superimposition unit.
Figure 92:
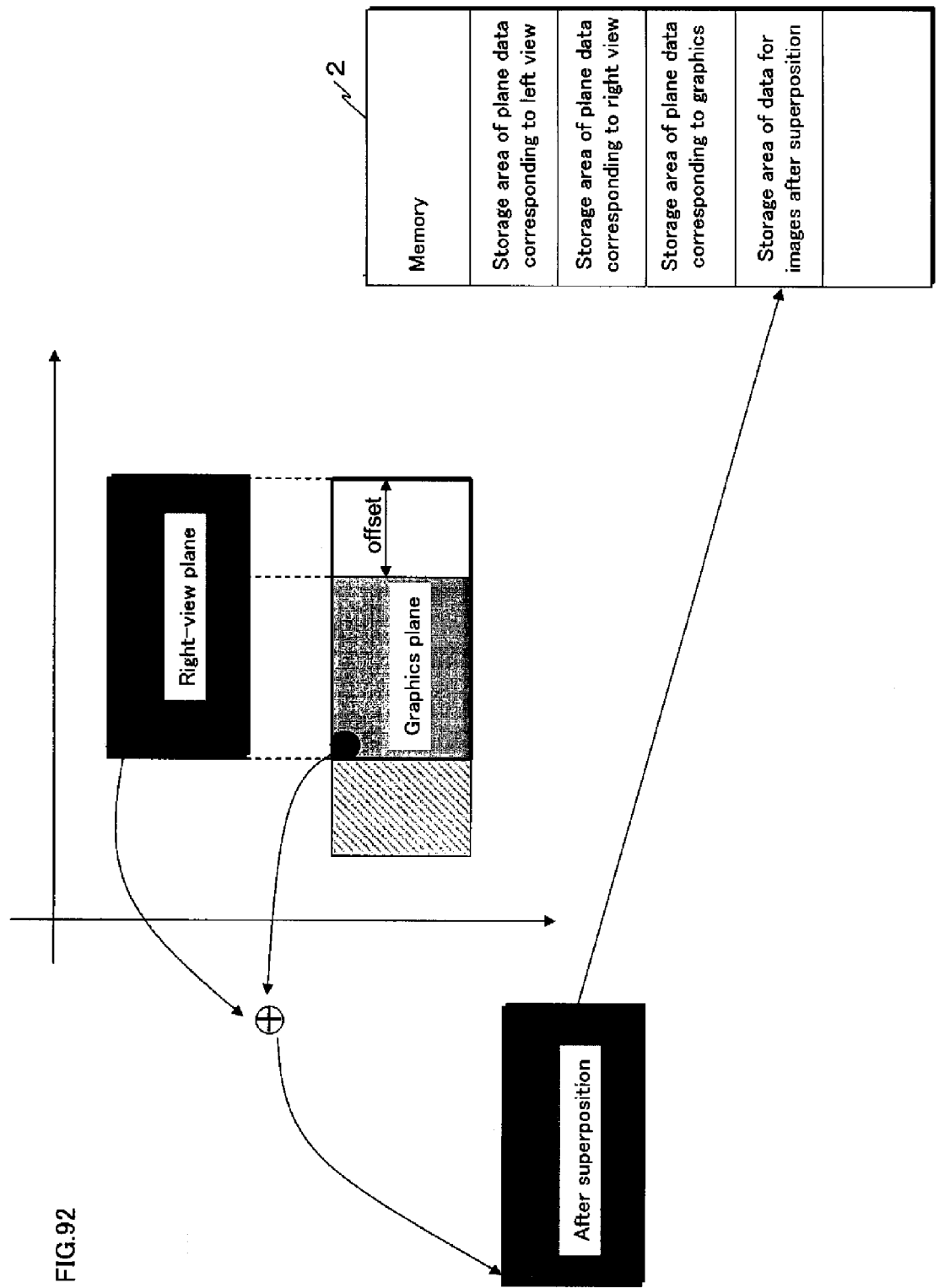
FIG. 92 is a conceptual diagram of image superimposition processing in an image superimposition unit.

FIGS. 91 and 92 are conceptual diagrams of image superimposition. The image superimposition unit 81 refers to the offset identifier in the stream selection table to retrieve the corresponding offset information from the metadata of which the signal processing unit 7 provides notification. Based on this offset information, the image superimposition unit 81 applies an offset to the graphics plane and superimposes the graphics plane on the image plane. When superimposing on the left-view plane, the image superimposition unit 81 applies a+X offset to the graphics plane (figure with an offset on the left), and when superimposing on the right-view plane, the image superimposition unit 81 applies a −X offset (figure with an offset on the right). The value X is the offset value and represents a number of pixels. Specifically, in FIG. 91, the graphics plane is superimposed on the left-view plane after being horizontally shifted to the right, as seen on paper, by the offset value X. On the other hand, in FIG. 92, the graphics plane is superimposed on the right-view plane after being horizontally shifted to the left, as seen on paper, by the offset value X. At this point, as shown in the figures, pieces of pixel data with the same left/right coordinates on paper are superimposed on one another, and the resulting data is stored in a storage area of data for images after superimposition in the memory 2.

Figure 93:
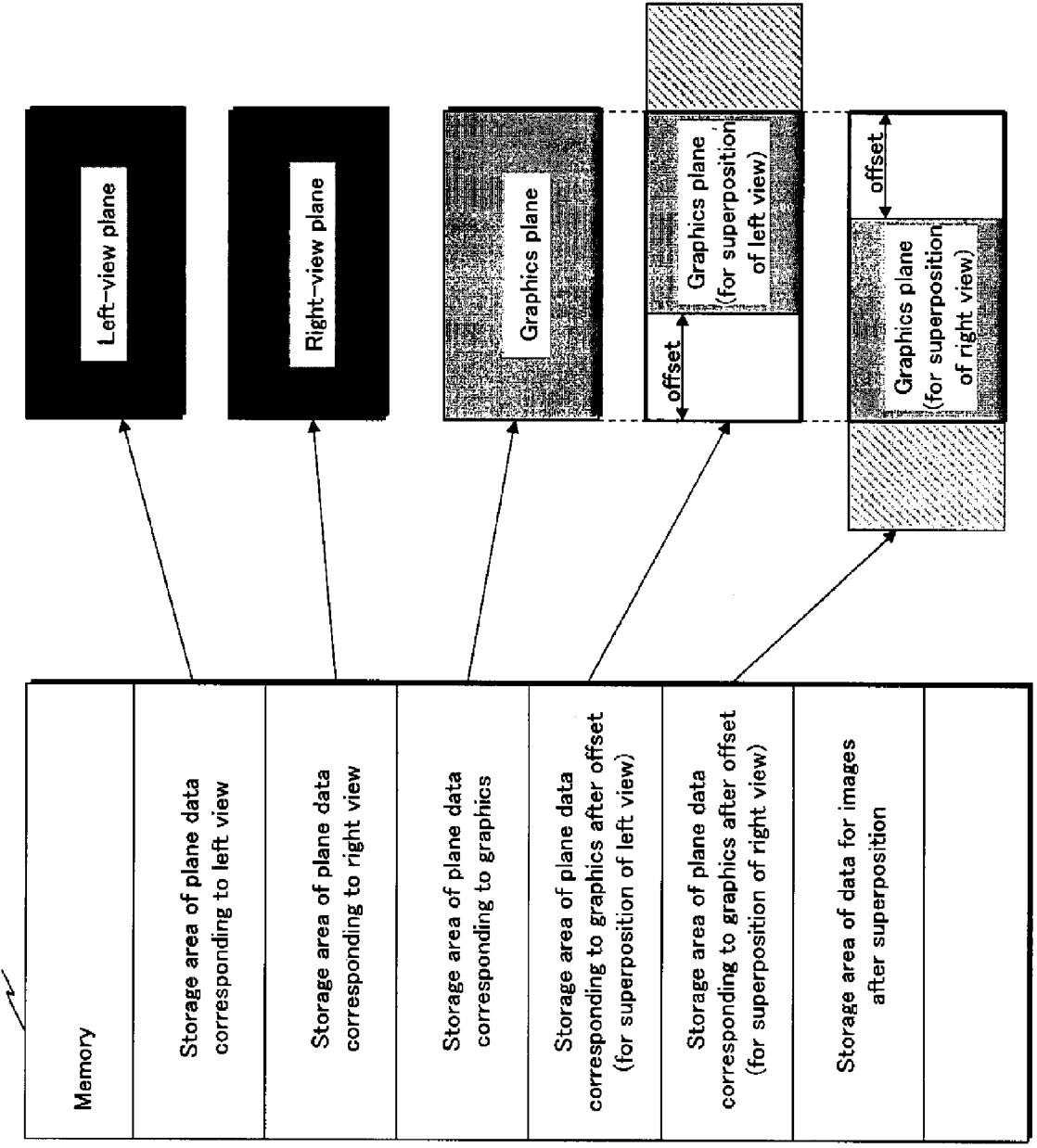
FIG. 93 is a conceptual diagram of image superimposition processing in an image superimposition unit.

FIG. 93 is a conceptual diagram showing another method of image superimposition. The memory 2 is further provided with plane data storage areas (for left-view superimposition and for right-view superimposition) corresponding to graphics that have been offset. Data to be superimposed on the left-view plane and right-view plane is prepared in the memory 2. The image superimposition unit 81 reads necessary data from the memory 2 and superimposes this data on the planes, storing the results in storage areas of data for images after superimposition in the memory 2.

Note that, as in embodiment 3, there is another method (2 plane mode) to perform superimposition by preparing one graphics plane for left-view superimposition and another for right-view superimposition and superimposing these planes after providing an offset value to each. As per the above description, it is also possible to combine 2D video images with 3D graphics images. In this case, graphics data constituting the decoded main-view is superimposed on picture data (originating in the main view data) constituting decoded monoscopic video images, and graphics data constituting the decoded sub-view is superimposed on picture data (originating in the sub-view data) constituting decoded monoscopic video images.

The video output format conversion unit 82 performs necessary processing, such as resizing, IP conversion, noise reduction, and frame rate conversion. Resizing is processing to enlarge or reduce the visual data. IP conversion is processing to convert a scanning method between progressive and interlaced. Noise reduction is processing to remove noise. Frame rate conversion is processing to convert the frame rate.

In conjunction with the data transmission format, the audio/video output IF unit 83 performs processing such as encoding of visual data, which has undergone image superimposition and format conversion, and of decoded audio data. Note that, as described below, part of the audio/video output IF unit 83 may be provided externally to the integrated circuit 3.

Figure 85:
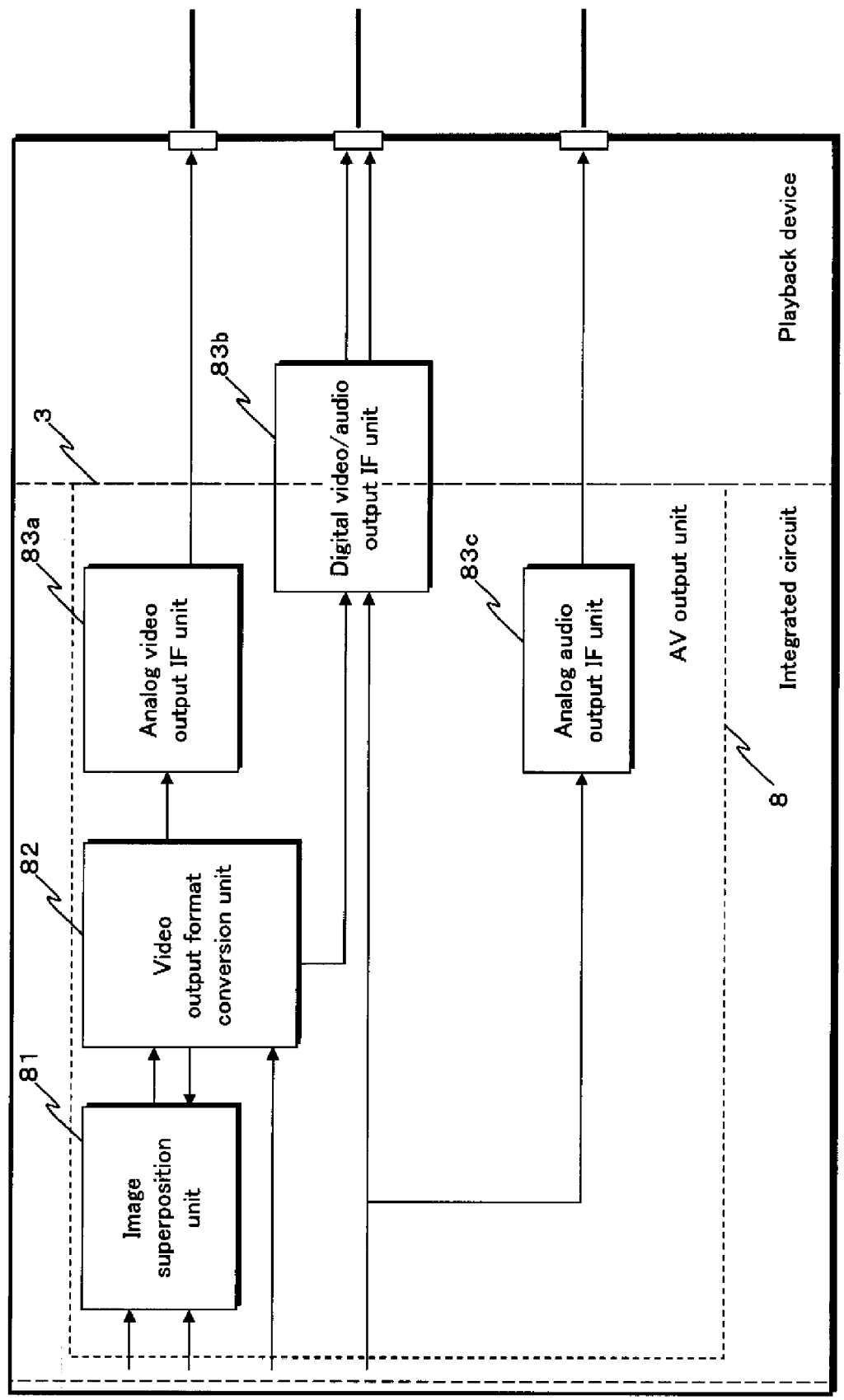
FIG. 85 is a detailed example of a structure of a data output unit in either an AV output unit or a playback device.

FIG. 85 is a detailed example of a structure of a data output unit in either the AV output unit 8 or a playback device. The integrated circuit 3 and playback device according to embodiment 5 correspond to a plurality of data transmission formats for visual data and audio data. As shown in FIG. 84, the audio/video output IF unit 83 includes an analog video output IF unit 83*a*, analog audio output IF unit 83*c*, and digital audio output IF unit 83*b*.

The analog video output IF unit 83*a* converts/encodes visual data that has undergone image superimposition and output format conversion into an analog video signal format and outputs the result. For example, the analog video output IF unit 83*a* corresponds to a composite video encoder, S video signal (Y/C separation) encoder, component video signal encoder, or D/A converter (DAC), compatible with one of the following three formats: NTSC, PAL, and SECAM.

The digital audio/video output IF unit 83*b* unites the decoded audio data and the video data that has undergone image superimposition and output format conversion and, after encryption, encodes and outputs the result in accordance with data transmission standards. The digital video/audio output IF unit 83*b* corresponds, for example, to a High-Definition Multimedia Interface (HDMI).

The analog audio output IF unit 83*c* D/A converts decoded audio data and outputs analog audio data. The analog audio output IF unit 83*c* corresponds to an audio DAC or the like.

The transmission format of the visual data and audio data can switch in accordance with the type of the data reception device (data input terminal) that the display device/speaker 4 supports. The transmission format can also be switched by user selection. Furthermore, it is possible to transmit data for the same content not only in a single transmission format but also in a plurality of transmission formats in parallel.

The image superimposition unit 81, video output format conversion unit 82, and audio/video output IF unit 83 were described as a representative structure of the AV output unit 8, but the AV output unit 8 may be further provided with a graphics engine that performs graphics processing such as filtering, screen combination, curve rendering, and 3D presentation.

This concludes the description of the structure of the playback device according to embodiment 5. Note that the above function blocks need not all be internal to the integrated circuit 3. Conversely, the memory 2 in FIG. 81 may be provided internal to the integrated circuit 3. Furthermore, in embodiment 5, the main control unit 6 and signal processing unit 7 were described as separate function blocks, but the main control unit 6 may perform part of the processing corresponding to the signal processing unit 7.

Figure 88:
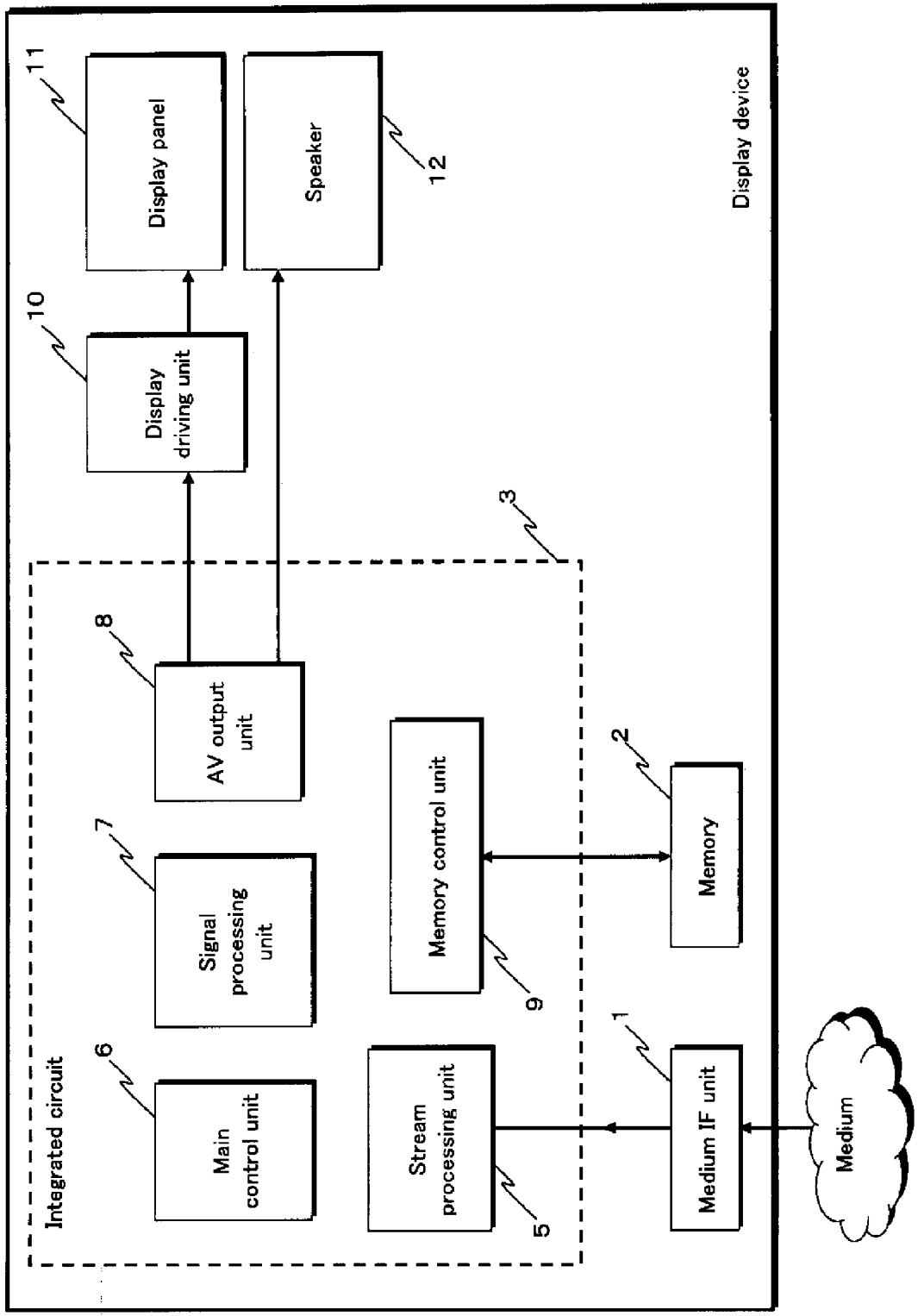
FIG. 88 is an example of a structure that uses an integrated circuit to implement a display device.
Figure 89:
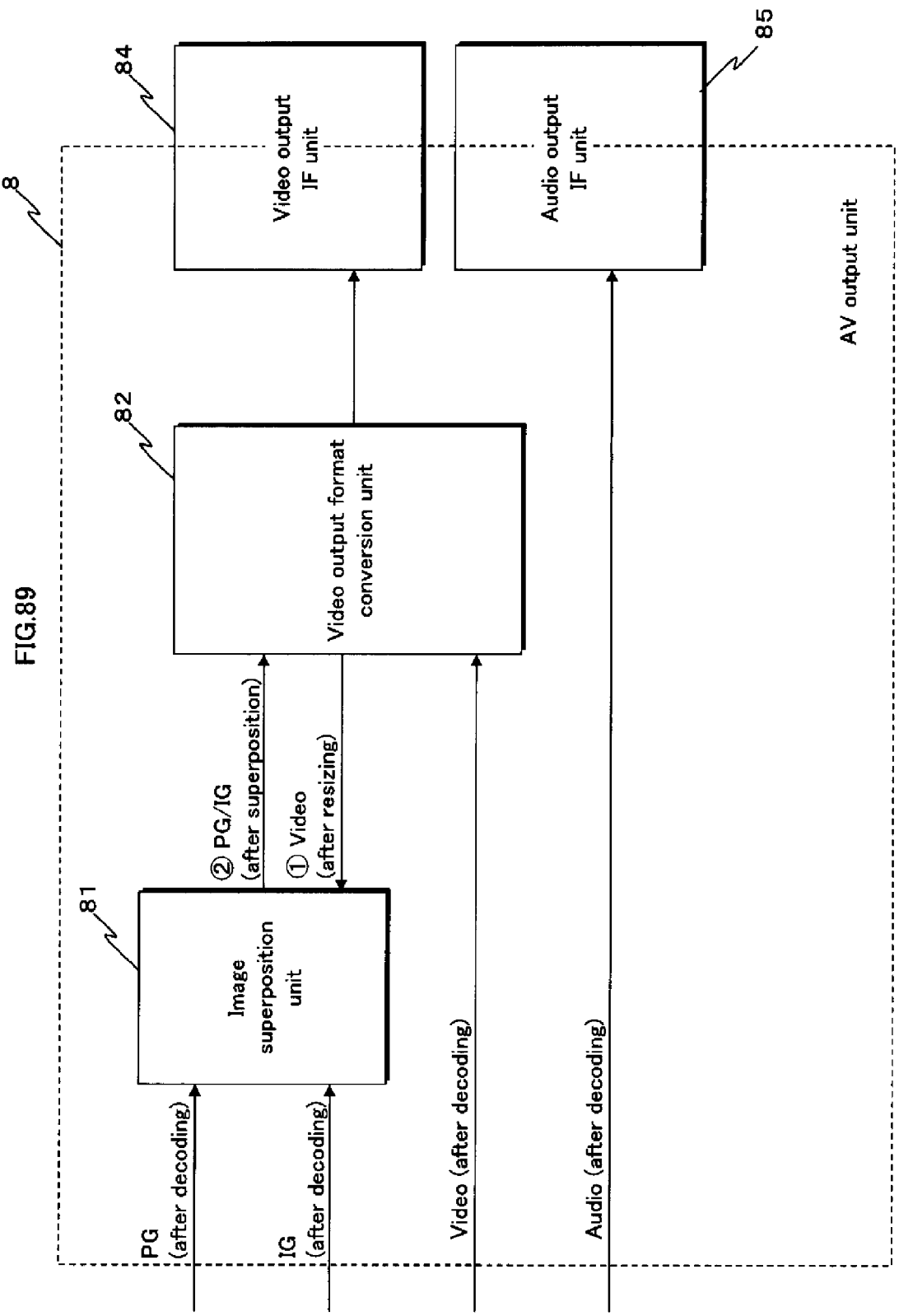
FIG. 89 is a functional block diagram showing a representative structure of an AV output unit in a display device.

The display device may be structured, for example, as shown in FIG. 88, and the display device may be caused to perform processing corresponding to the playback device according to embodiment 5. In this case, the integrated circuit 3 processes the signal for data received by the medium IF unit 1. Processed visual data is output to a display panel 11 via a display driving unit 10, and processed audio data is output via a speaker 12. The AV output unit 8 may be structured, for example, as in FIG. 89. In this case, data is transferred via an audio output IF unit 94 and a video output IF unit 89 internal or external to the integrated circuit 3. Note that a plurality of audio output IF units 94 and video output IF units 89 may be provided, or a shared video/audio IF unit may be provided.

Figure 86:
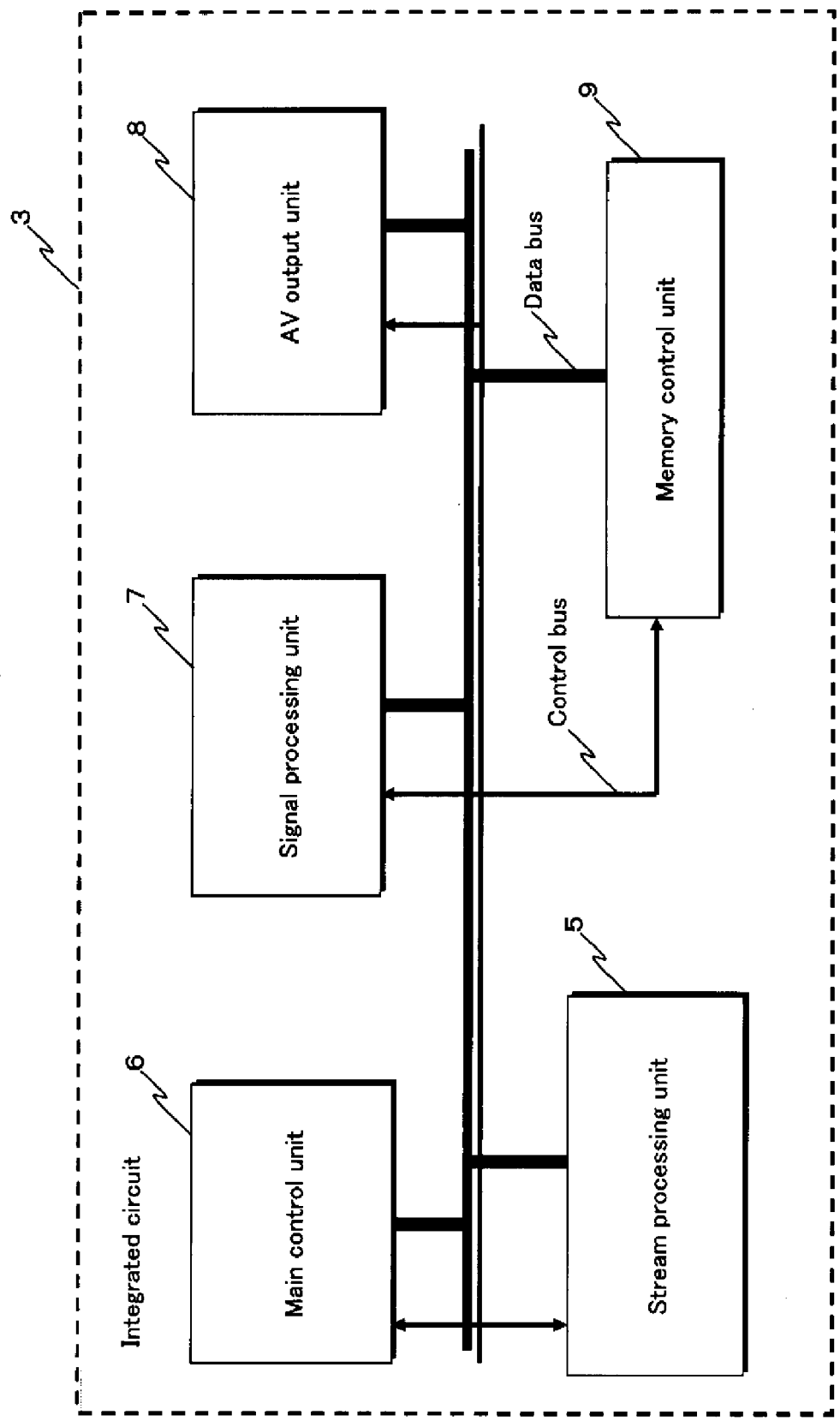
FIG. 86 shows an arrangement of a control bus and a data bus in an integrated circuit.
Figure 87:
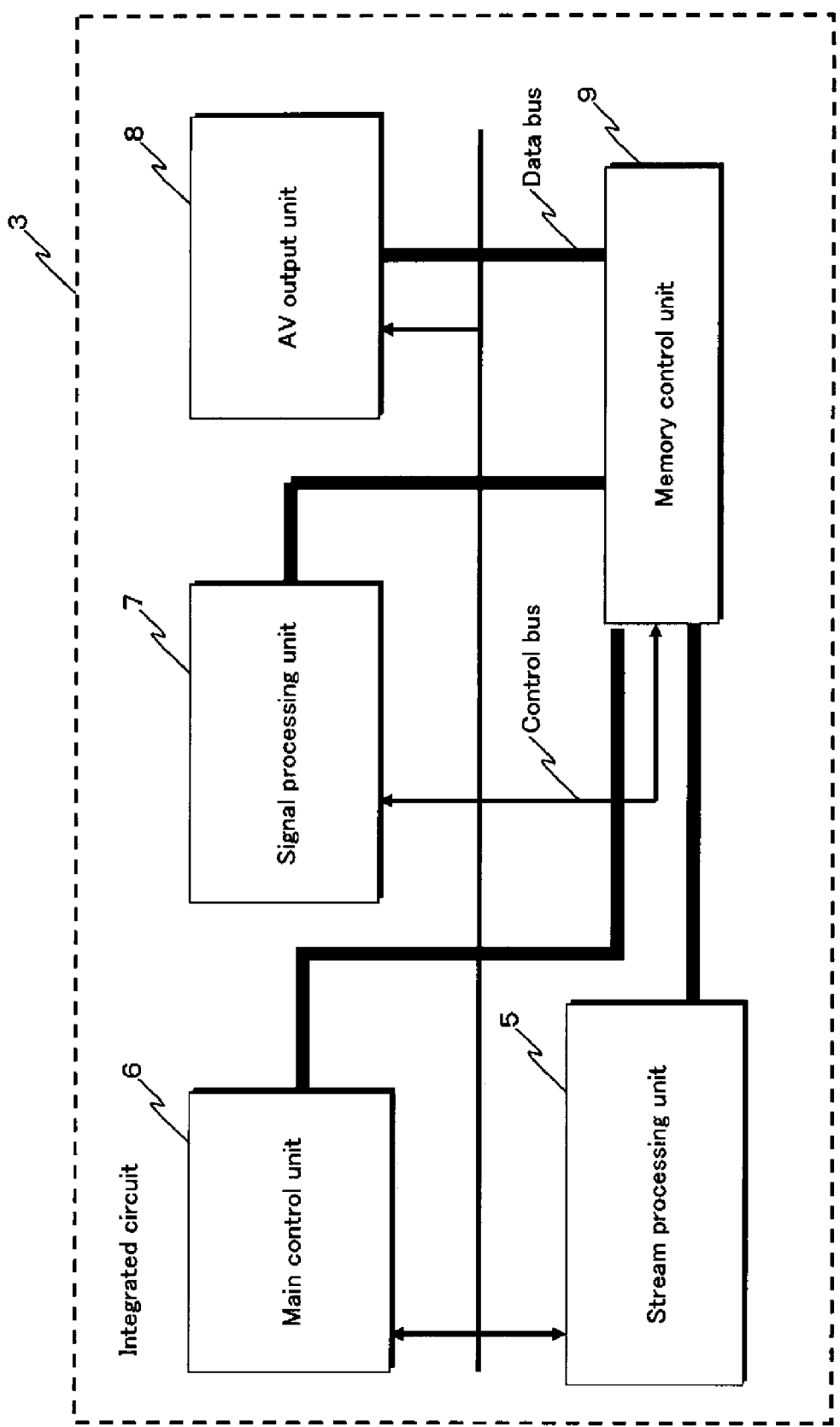
FIG. 87 shows an arrangement of a control bus and a data bus in an integrated circuit.

In the integrated circuit 3, the control bus and data bus are provided arbitrarily in conjunction with the order and the nature of each processing block. The data bus may directly connect each processing block, as in FIG. 86, or may connect processing blocks via the memory 2 (memory control unit 9) as in FIG. 87.

The integrated circuit 3 may be a multi-chip module made to look like a single LSI by sealing the plurality of chips in a single package. Alternatively, a Field Programmable Gate Array (FPGA), which is an LSI that can be programmed after manufacture, or a reconfigurable processor, which is an LSI whose connections between internal circuit cells and settings for each circuit cell can be reconfigured, may be used for the integrated circuit 3.

Figure 94:
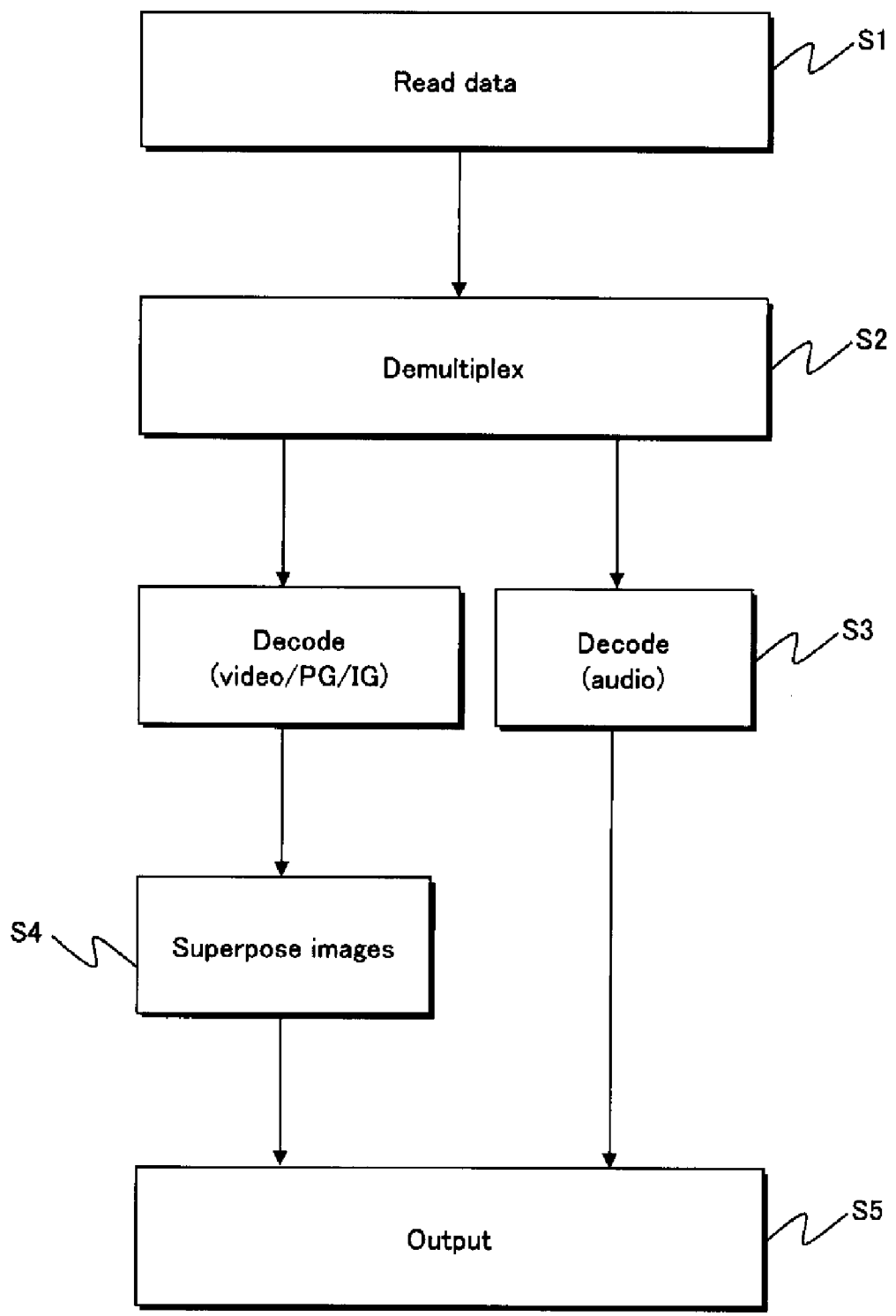
FIG. 94 is a simple flowchart showing operational procedures of a playback device.

The following is an explanation of operations by a playback device with the above structure. FIG. 94 is a simple flowchart showing operational playback procedures to output video and audio signals after data is received (read) from a medium and decoded.

Step S1: data is received (read) from a medium (medium IF unit 1, stream processing unit 5).

Step S2: different types of data (visual data, audio data) are separated from the data received (read) in step S1 (stream processing unit 5).

Step S3: the different types of data separated in step S2 are decoded into an appropriate format (signal processing unit 7).

Step S4: superimposition is performed on the visual data decoded in step S3

(AV output unit 8).

Step S5: the visual data and audio data processed in steps S2-S4 are output (AV output unit 8).

Figure 95:
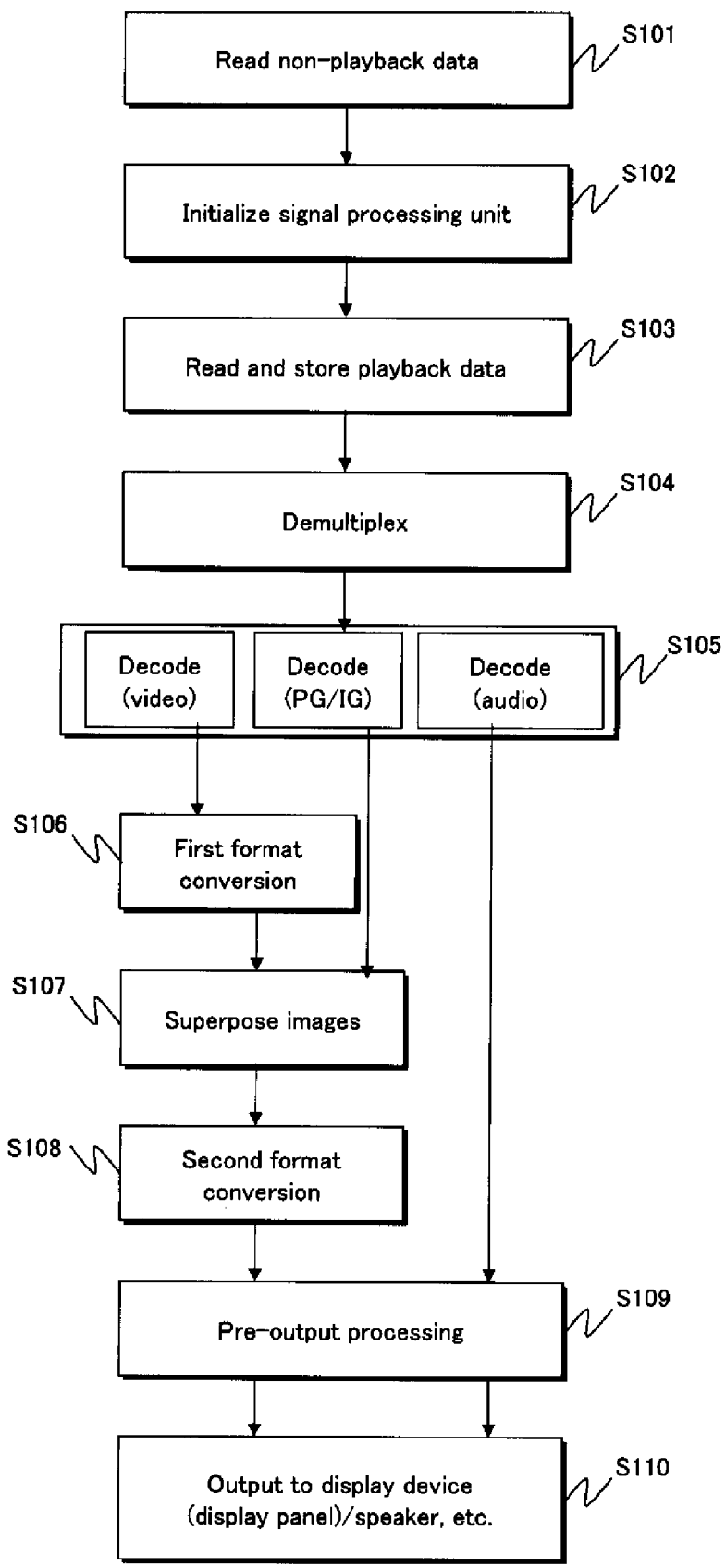
FIG. 95 is a flowchart showing details on operational procedures of a playback device.

FIG. 95 is a more detailed flowchart of operational playback procedures. Each operation/process is performed under the control of the main control unit 6.

Step S101: via the medium IF unit 1, the device stream IF unit 51 in the stream processing unit 5 receives (reads) data (playlist file, clip information file, etc.) necessary for playing back data for playback and stores the data in the memory 2 (medium IF unit 1, device IF unit 51, memory control unit 9, memory 2).

Step S102: from the stream attribute information included in the received clip information file, the main control unit 6 identifies the compression format of the video data and audio data stored in the medium and initializes the signal processing unit 7 to enable the signal processing unit 7 to perform corresponding decoding (main control unit 6).

Step S103: the device stream IF unit 51 in the stream processing unit 5 receives (reads) video/audio/etc. data for playback from the medium via the medium IF unit 1 and stores the data in the memory 2 via the switching unit 53 and memory control unit 9. Note that the data is received (read) in units of extents. Left-view data is stored in the first area, and right-view data is stored in the second area. The switching unit 53 switches between the storage locations in accordance with control by the main control unit 6 (medium IF unit 1, device IF unit 51, main control unit 6, switching unit 53, memory control unit 9, memory 2).

Step S104: the stream data stored in the memory 2 is transferred to the demultiplexer 52 in the stream processing unit 5. The demultiplexer 52 identifies whether stream data is visual (primary video, secondary video, PG (subtitle), IG (menu)) or audio (audio, sub-audio) from the PID included in each of the source packets composing the stream data. The demultiplexer 52 then transmits the stream data to the corresponding decoder in the signal processing unit 7 in units of TS packets (demultiplexer 52).

Step S105: each decoder in the signal processing unit 7 decodes the transmitted TS packets with an appropriate method (signal processing unit 7).

Step S106: the video output format conversion unit 82 resizes the data, among the visual data decoded by the signal processing unit 7, that corresponds to the left-view video stream and to the right-view video stream to match the display device 4 (video output format conversion unit 82).

Step S107: PG (subtitle) and IG (menu) are superimposed on the video stream resized in step S106 (image superimposition unit 81).

Step S108: IP conversion is performed on the video data resulting from superimposition in step S107 to convert the scanning method (video output format conversion unit 82).

Step S109: in accordance with the data output method of the display device/speaker 4 and the method of transmitting data to the display device/speaker 4, the visual data and audio data processed up until this step is encoded, D/A converted, etc. For example, processing corresponding to analog or digital output of the visual data and audio data is performed. A composite video signal, S video signal, component video signal, etc. are supported for analog output of visual data. HDMI is supported for digital output of visual/audio data (audio/video output IF unit 83).

Step S110: the visual data and audio data processed in step S109 is transmitted to the display device/speaker 4, which is caused to output corresponding video and audio (audio/video output IF unit 83, display device/speaker 4).

This concludes the description of the operational procedures of the playback device according to embodiment 5. Note that each time processing finishes, the results may be stored in the memory 2. Operational procedures when the display device in FIG. 88 performs playback processing are basically the same as the above-described operational procedures. In this case, the function blocks corresponding to the function blocks in the playback device in FIG. 81 perform similar processing. Furthermore, in the above operational procedures, the video output format conversion unit 82 performs resizing and IP conversion, but such processing may be omitted as necessary, or other processing (noise reduction, frame rate conversion, etc.) may be performed. Furthermore, the above operational procedures may be changed insofar as possible.

<<Supplementary Explanation>>

<Principle of 3D Video Image Playback>

Playback methods of 3D video images are roughly classified into two categories: methods using a holographic technique, and methods using parallax video.

A method using a holographic technique is characterized by allowing the viewer to perceive objects in video as stereoscopic by giving the viewer's visual perception substantially the same information as optical information provided to visual perception by human beings of actual objects. A technical theory for utilizing these methods for moving video display has been established. However, it is extremely difficult to construct, with present technology, a computer that is capable of real-time processing of the enormous amount of calculation required for moving video display and a display device having super-high resolution of several thousand lines per 1 mm. Accordingly, at the present time, the realization of these methods for commercial use is hardly in sight.

"Parallax video" refers to a pair of 2D video images shown to each of the viewer's eyes for the same scene, i.e. the pair of a left view and a right view. A method using parallax video is characterized by playing back the left-view and right-view of a single scene so that the viewer sees each view in only one eye, thereby allowing the user to perceive the scene as stereoscopic.

Figure 96B:
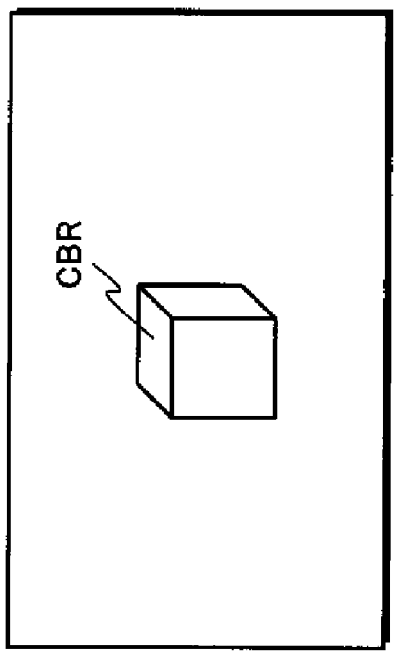
FIGS. 96A, 96B, and 96C are schematic diagrams illustrating the principle behind playback of 3D video images (stereoscopic video images) in a method using parallax video images.
Figure 96C:
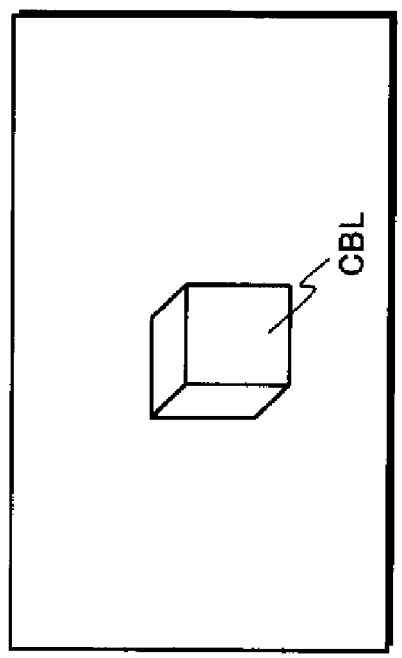
Figure 96A:
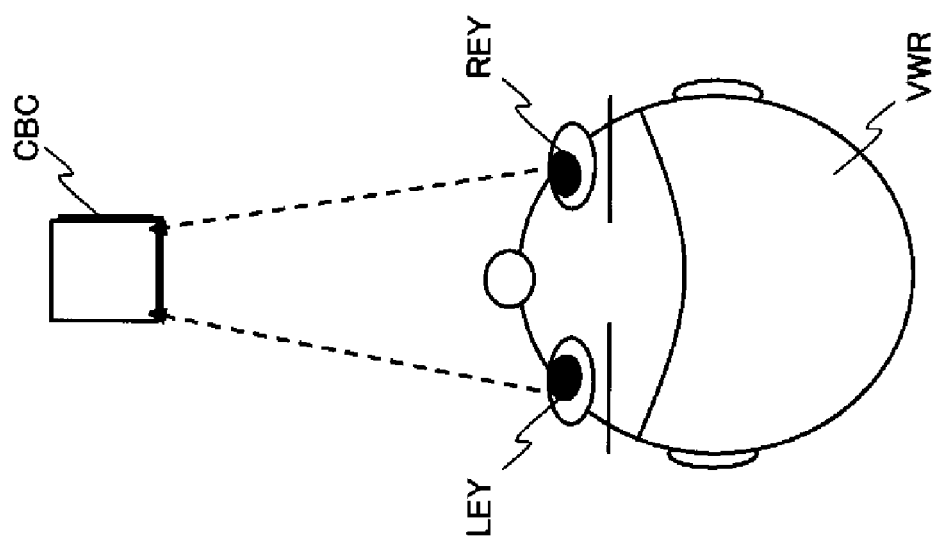

FIGS. 96A, 96B, and 96C are schematic diagrams illustrating the principle behind playback of 3D video images (stereoscopic video images) in a method using parallax video images. FIG. 96A is a top view of the viewer VWR looking at a cube CBC placed directly in front of the viewer's face. FIGS. 96B and 96C are schematic diagrams showing the outer appearance of the cube CBC as a 2D video image as perceived respectively by the left eye LEY and the right eye REY of the viewer VWR. As is clear from comparing FIG. 96B and FIG. 96C, the outer appearances of the cube CBC as perceived by the eyes are slightly different. The difference in the outer appearances, i.e., the binocular parallax allows the viewer VWR to recognize the cube CBC as three-dimensional. Thus, according to a method using parallax video, left and right 2D video images with different viewpoints are first prepared for a single scene. For example, for the cube CBC shown in FIG. 96A, the left view of the cube CBC shown in FIG. 96B and the right view shown in FIG. 96C are prepared. In this context, the position of each viewpoint is determined by the binocular parallax of the viewer VWR. Next, each 2D video image is played back so as to be perceived only by the corresponding eye of the viewer VWR. Consequently, the viewer VWR recognizes the scene played back on the screen, i.e., the video image of the cube CBC, as stereoscopic. Unlike methods using a holography technique, methods using parallax video thus have the advantage of requiring preparation of 2D video images from merely two viewpoints.

Several concrete methods for how to use parallax video have been proposed. From the standpoint of how these methods show left and right 2D video images to the viewer's eyes, the methods are divided into alternate frame sequencing methods, methods that use a lenticular lens, two-color separation methods, etc.

In the alternate frame sequencing method, left and right 2D video images are alternately displayed on a screen for a predetermined time, while the viewer watches the screen using shutter glasses. Each lens in the shutter glasses is formed by a liquid crystal panel, for example. The lenses pass or block light in a uniform and alternate manner in synchronization with switching of the 2D video images on the screen. That is, each lens functions as a shutter that periodically blocks an eye of the viewer. More specifically, while a left-video image is displayed on the screen, the shutter glasses make the left-side lens transmit light and the right-hand side lens block light. Conversely, while a right-video image is displayed on the screen, the shutter glasses make the right-side lens transmit light and the left-side lens block light. As a result, the viewer sees afterimages of the right and left-video images overlaid on each other and thus perceives a single 3D video image.

According to the alternate-frame sequencing method, as described above, right and left-video images are alternately displayed in a predetermined cycle. For example, when 24 video frames are displayed per second for playing back normal 2D video images, 48 video frames in total for both right and left eyes need to be displayed for 3D video images. Accordingly, a display device capable of quickly executing rewriting of the screen is preferred for this method.

In a method using a lenticular lens, a right-video frame and a left-video frame are respectively divided into vertically long and narrow rectangular shaped small areas. The small areas of the right-video frame and the small areas of the left-video frame are alternately arranged in a horizontal direction on the screen and displayed at the same time. The surface of the screen is covered by a lenticular lens. The lenticular lens is a sheet-shaped lens constituted from multiple long and thin hog-backed lenses arranged in parallel. Each hog-backed lens lies in the longitudinal direction on the surface of the screen. When the viewer sees the left and right-video frames through the lenticular lens, only the viewer's left eye perceives light from the display areas of the left-video frame, and only the viewer's right eye perceives light from the display areas of the right-video frame. The viewer thus sees a 3D video image from the binocular parallax between the video images respectively perceived by the left and right eyes. Note that according to this method, another optical component having similar functions, such as a liquid crystal device, may be used instead of the lenticular lens. Alternatively, for example, a longitudinal polarization filter may be provided in the display areas of the left image frame, and a lateral polarization filter may be provided in the display areas of the right image frame. In this case, the viewer sees the screen through polarization glasses. In the polarization glasses, a longitudinal polarization filter is provided for the left lens, and a lateral polarization filter is provided for the right lens. Consequently, the right and left-video images are each perceived only by the corresponding eye, thereby allowing the viewer to perceive 3D video images.

In a method using parallax video, in addition to being constructed from the start by a combination of left and right-video images, the 3D video content can also be constructed from a combination of 2D video images and a depth map. The 2D video images represent 3D video images projected on a hypothetical 2D screen, and the depth map represents the depth of each pixel in each portion of the 3D video images as compared to the 2D screen. When the 3D content is constructed from a combination of 2D video images with a depth map, the 3D playback device or display device first constructs left and right-video images from the combination of 2D video images with a depth map and then creates 3D video images from these left and right-video images using one of the above-described methods.

FIG. 97 is a schematic diagram showing an example of constructing a left-view LVW and a right-view RVW from the combination of a 2D video image MVW and a depth map DPH. As shown in FIG. 97, a circular plate DSC is shown in the background BGV of the 2D video image MVW. The depth map DPH indicates the depth for each pixel in each portion of the 2D video image MVW. According to the depth map DPH, in the 2D video image MVW, the display area DA1 of the circular plate DSC is closer to the viewer than the screen, and the display area DA2 of the background BGV is deeper than the screen. The parallax video generation unit PDG in the playback device first calculates the binocular parallax for each portion of the 2D video image MVW using the depth of each portion indicated by the depth map DPH. Next, the parallax video generation unit PDG shifts the presentation position of each portion in the 2D video image MVW to the left or right in accordance with the calculated binocular parallax to construct the left-view LVW and the right-view RVW. In the example shown in FIG. 97, the parallax video generation unit PDG shifts the presentation position of the circular plate DSC in the 2D video image MVW as follows: the presentation position of the circular plate DSL in the left-view LVW is shifted to the right by half of its binocular parallax, S1, and the presentation position of the circular plate DSR in the right-view RVW is shifted to the left by half of its binocular parallax, S1. In this way, the viewer perceives the circular plate DSC as being closer than the screen. Conversely, the parallax video generation unit PDG shifts the presentation position of the background BGV in the 2D video image MVW as follows: the presentation position of the background BGL in the left-view LVW is shifted to the left by half of its binocular parallax, S2, and the presentation position of the background BGR in the right-view RVW is shifted to the right by half of its binocular parallax, S2. In this way, the viewer perceives the background BGV as being deeper than the screen.

A playback system for 3D video images with use of parallax video is in general use, having already been established for use in movie theaters, attractions in amusement parks, and the like. Accordingly, this method is also useful for implementing home theater systems that can play back 3D video images. In the embodiments of the present invention, among methods using parallax video, an alternate-frame sequencing method or a method using polarization glasses is assumed to be used. However, apart from these methods, the present invention can also be applied to other, different methods, as long as they use parallax video. This will be obvious to those skilled in the art from the above explanation of the embodiments.

<File System on the BD-ROM Disc>

When UDF is used as the file system for the BD-ROM disc 101, the volume area 202B shown in FIG. 2 generally includes areas in which a plurality of directories, a file set descriptor, and a terminating descriptor are respectively recorded. Each "directory" is a data group composing the directory. A "file set descriptor" indicates the LBN of the sector in which a file entry for the root directory is stored. The "terminating descriptor" indicates the end of the recording area for the file set descriptor.

Each directory shares a common data structure. In particular, each directory includes a file entry, directory file, and a subordinate file group.

The "file entry" includes a descriptor tag, Information Control Block (ICB) tag, and allocation descriptor. The "descriptor tag" indicates that the type of the data that includes the descriptor tag is a file entry. For example, when the value of the descriptor tag is "261", the type of that data is a file entry. The "ICB tag" indicates attribute information for the file entry itself. The "allocation descriptor" indicates the LBN of the sector on which the directory file belonging to the same directory is recorded.

The "directory file" typically includes a plurality of each of a file identifier descriptor for a subordinate directory and a file identifier descriptor for a subordinate file. The "file identifier descriptor for a subordinate directory" is information for accessing the subordinate directory located directly below that directory. This file identifier descriptor includes identification information for the subordinate directory, directory name length, file entry address, and actual directory name. In particular, the file entry address indicates the LBN of the sector on which the file entry of the subordinate directory is recorded. The "file identifier descriptor for a subordinate file" is information for accessing the subordinate file located directly below that directory. This file identifier descriptor includes identification information for the subordinate file, file name length, file entry address, and actual file name. In particular, the file entry address indicates the LBN of the sector on which the file entry of the subordinate file is recorded. The "file entry of the subordinate file", as described below, includes address information for the data constituting the actual subordinate file.

By tracing the file set descriptors and the file identifier descriptors of subordinate directories/files in order, the file entry of an arbitrary directory/file recorded on the volume area 202B can be accessed. Specifically, the file entry of the root directory is first specified from the file set descriptor, and the directory file for the root directory is specified from the allocation descriptor in this file entry. Next, the file identifier descriptor for the directory immediately below the root directory is detected from the directory file, and the file entry for that directory is specified from the file entry address therein. Furthermore, the directory file for that directory is specified from the allocation descriptor in the file entry. Subsequently, from within the directory file, the file entry for the subordinate directory or subordinate file is specified from the file entry address in the file identifier descriptor for that subordinate directory or subordinate file.

"Subordinate files" include extents and file entries. The "extents" are a generally multiple in number and are data sequences whose logical addresses, i.e. LBNs, are consecutive on the disc. The entirety of the extents comprises the actual subordinate file. The "file entry" includes a descriptor tag, ICB tag, and allocation descriptors. The "descriptor tag" indicates that the type of the data that includes the descriptor tag is a file entry. The "ICB tag" indicates attribute information for the file entry itself. The "allocation descriptors" are provided in a one-to-one correspondence with each extent and indicate the arrangement of each extent on the volume area 202B, specifically the size of each extent and the LBN for the top of the extent. Accordingly, by referring to each allocation descriptor, each extent can be accessed. Also, the two most significant bits of each allocation descriptor indicate whether an extent is actually recorded on the sector for the LBN indicated by the allocation descriptor. Specifically, when the two most significant bits are "0", an extent has been assigned to the sector and has been actually recorded thereat. When the two most significant bits are "1", an extent has been assigned to the sector but has not been yet recorded thereat.

Like the above-described file system employing a UDF, when each file recorded on the volume area 202B is divided into a plurality of extents, the file system for the volume area 202B also generally stores the information showing the locations of the extents, as with the above-mentioned allocation descriptors, in the volume area 202B. By referring to the information, the location of each extent, particularly the logical address thereof, can be found.

<Size of Data Blocks and Extent Blocks>

As shown in FIG. 19, the multiplexed stream data on the BD-ROM disc 101 is arranged by being divided into dependent-view data blocks D[n] and base-view data blocks B[n] (n=0, 1, 2, 3, ... ). Furthermore, these data block groups D[n] and B[n] are recorded consecutively on a track in an interleaved arrangement to form a plurality of extent blocks 1901-1903. To ensure seamless playback of both 2D video images and 3D video images from these extent blocks 1901-1903, the size of each data block and each extent block 1901-1903 should meet the following conditions based on the capability of the playback device 102.

<<Conditions Based on Capability in 2D Playback Mode>>

Figure 98:
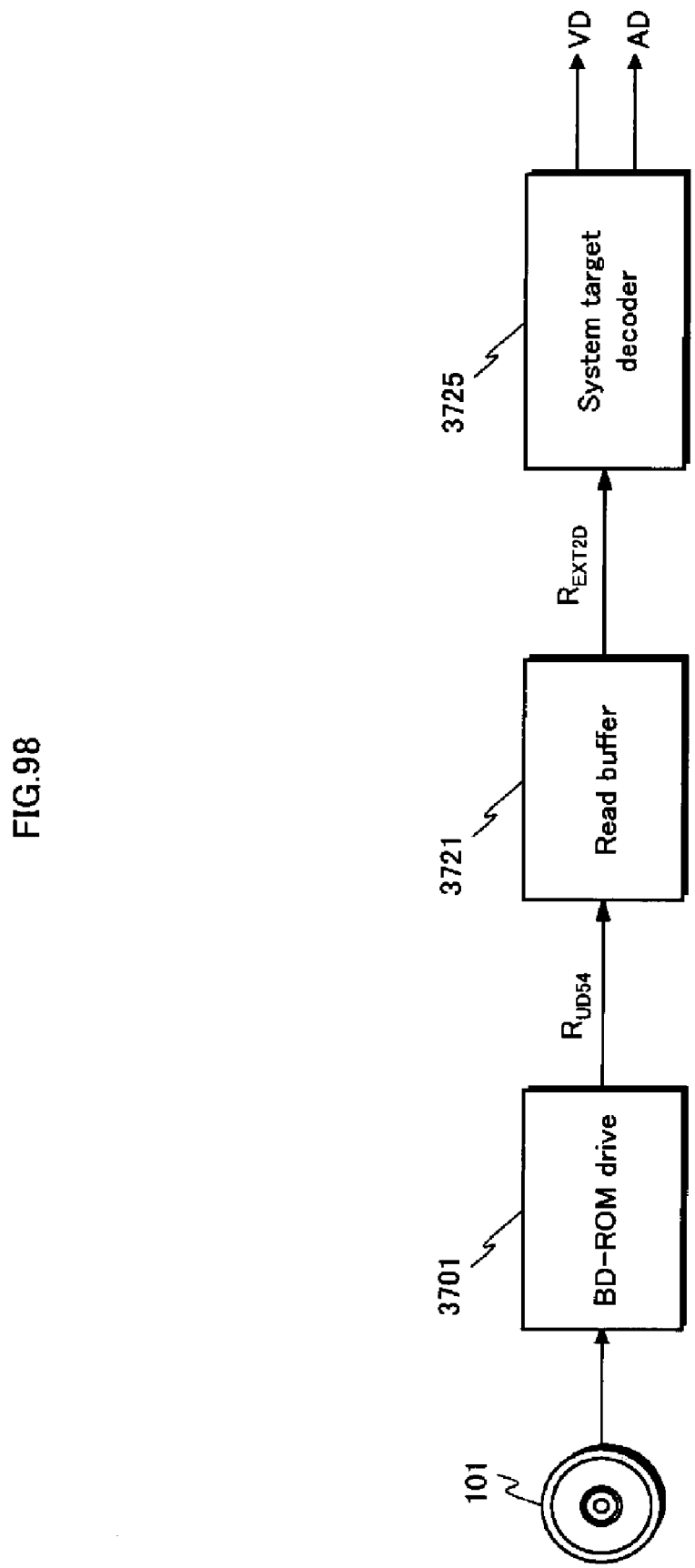
FIG. 98 is a block diagram showing playback processing in the playback device 102 in 2D playback mode.

FIG. 98 is a block diagram showing playback processing in the playback device 102 in 2D playback mode. As shown in FIG. 98, this playback processing system includes the BD-ROM drive 3701, read buffer 3721, and system target decoder 3725 shown in FIG. 37. The BD-ROM drive 3701 reads 2D extents from the BD-ROM disc 101 and transfers the 2D extents to the read buffer 3721 at a read rate $R_{UD54}$. The system target decoder 3725 reads source packets from each 2D extent stored in the read buffer 3721 at a mean transfer rate $R_{EXT2D}$ and decodes the source packets into video data VD and audio data AD.

The mean transfer rate $R_{EXT2D}$ equals 192/188 times the mean rate of processing by the system target decoder 3725 to extract TS packets from each source packet. In general, this mean transfer rate $R_{EXT2D}$ changes for each 2D extent. The maximum value $R_{MAX2D}$ of the mean transfer rate $R_{EXT2D}$ equals 192/188 times the system rate $R_{TS}$ for the file 2D. In this case, the coefficient 192/188 is the ratio of bytes in a source packet to bytes in a TS packet. The mean transfer rate $R_{EXT2D}$ is conventionally represented in bits/second and specifically equals the value of the size of a 2D extent expressed in bits divided by the extent ATC time. The "size of an extent expressed in bits" is eight times the product of the number of source packets in the extent and the number of bytes per source packet (=192 bytes×8 bits/byte). The read rate $R_{UD54}$ is conventionally expressed in bits/second and is set at a higher value, e.g. 54 Mbps, than the maximum value $R_{MAX2D}$ of the mean transfer rate $R_{EXT2D}$: $R_{UD54} > R_{MAX2D}$. This prevents underflow in the read buffer 3721 due to decoding processing by the system target decoder 3725 while the BD-ROM drive 3701 is reading a 2D extent from the BD-ROM disc 101.

FIG. 99A is a graph showing the change in the data amount DA stored in the read buffer 3721 during operation in 2D playback mode. FIG. 99B is a schematic diagram showing the correspondence between an extent block 8310 for playback and a playback path 8320 in 2D playback mode. As shown in FIG. 99B, in accordance with the playback path 8320, the base-view data blocks Bn (n=0, 1, 2, ... ) in the extent block 8310 are each read as one 2D extent EXT2D[n] from the BD-ROM disc 101 into the read buffer 3721. As shown in FIG. 99A, during the read period $PR_{2D}[n]$ for each 2D extent EXT2D[n], the stored data amount DA increases at a rate equal to $R_{UD54} - R_{EXT2D}[n]$, the difference between the read rate $R_{UD54}$ and the mean transfer rate $R_{EXT2D}[n]$.

Reading and transfer operations by the BD-ROM drive 8301 are not actually performed continuously, as suggested by the graph in FIG. 99A, but rather intermittently. During the read period $PR_{2D}[n]$ for each 2D extent, this prevents the stored data amount DA from exceeding the capacity of the read buffer 3721, i.e. overflow in the read buffer 3721. Accordingly, the graph in FIG. 99A represents what is actually a step-wise increase as an approximated straight increase.

A jump $J_{2D}[n]$, however, occurs between two contiguous 2D extents EXT2D[n−1] and EXT2D[n]. Since the reading of two contiguous dependent-view data blocks Dn is skipped during the corresponding jump period $PJ_{2D}[n]$, reading of data from the BD-ROM disc 101 is interrupted. Accordingly, the stored data amount DA decreases at a mean transfer rate $R_{EXT2D}[n]$ during each jump period $PJ_{2D}[n]$.

In order to play back 2D video images seamlessly from the extent block 8310 shown in FIG. 99B, the following conditions [1] and [2] should be met.

[1] While data is continuously provided from the read buffer 3721 to the system target decoder 3725 during each jump period $PJ_{2D}[n]$, continual output from the system target decoder 3725 needs to be ensured. To do so, the following condition should be met: the size $S_{EXT2D}[n]$ of each 2D extent EXT2D[n] is the same as the data amount transferred from the read buffer 3721 to the system target decoder 3725 from the read period $PR_{2D}[n]$ through the next jump period $PJ_{2D}[n+1]$. If this is the case, then as shown in FIG. 99A, the stored data amount DA at the end of the jump period $PJ_{2D}[n+1]$ does not fall below the value at the start of the read period $PR_{2D}[n]$. In other words, during each jump period $PJ_{2D}[n]$, data is continuously provided from the read buffer 3721 to the system target decoder 3725.

In particular, underflow does not occur in the read buffer 3721. In this case, the length of the read period $PR_{2D}[n]$ equals $S_{EXT2D}[n]/R_{UD54}$, the value obtained by dividing the size $S_{EXT2D}[n]$ of a 2D extent EXT2D[n] by the read rate $R_{UD54}$. Accordingly, the size $S_{EXT2D}[n]$ of each 2D extent EXT2D[n] should be equal to or greater than the minimum extent size expressed in the right-hand side of expression 1.

$$S_{EXT2D}[n] \geq \left( \frac{S_{EXT2D}[n]}{R_{UD54}} + T_{JUMP-2D}[n] \right) \times R_{EXT2D}[n] \qquad (1)$$

-continued $$\therefore S_{EXT2D}[n] \geq CEIL\left(L \frac{\frac{R_{EXT2D}[n]}{8} \times}{\frac{R_{UD54}}{R_{UD54} - R_{EXT2D}[n]} \times T_{JUMP-2D}[n]}\right)$$

In expression 1, the jump time $T_{JUMP-2D}[n]$ represents the length of the jump period $PJ_{2D}[n]$ in seconds. The read rate $R_{UD54}$ and the mean transfer rate $R_{EXT2D}$ are both expressed in bits per second. Accordingly, in expression 1, the mean transfer rate $R_{EXT2D}$ is divided by 8 to convert the size $S_{EXT2D}[n]$ of the 2D extent from bits to bytes. That is, the size $S_{EXT2D}[n]$ of the 2D extent is expressed in bytes. The function CEIL( ) is an operation to round up fractional numbers after the decimal point of the value in parentheses.

[2] Since the capacity of the read buffer 3721 is limited, the maximum value of the jump period $T_{JUMP-2D}[n]$ is limited. In other words, even if the stored data amount DA immediately before a jump period $PJ_{2D}[n]$ is the maximum capacity of the read buffer 3721, if the jump time $T_{JUMP-2D}[n]$ is too long, the stored data amount DA will reach zero during the jump period $PJ_{2D}[n]$, and there is a danger of underflow occurring in the read buffer 3721. Hereinafter, the time for the stored data amount DA to decrease from the maximum capacity of the read buffer 3721 to zero while data supply from the BD-ROM disc 101 to the read buffer 3721 has stopped, that is, the maximum value of the jump time $T_{JUMP-2D}$ that guarantees seamless playback, is referred to as the "maximum jump time $T_{JUMP\_MAX}$".

In standards of optical discs, the correspondence between jump distances and maximum jump times is determined from the access speed of the optical disc drive and other factors. FIG. 100 is an example of a correspondence table between jump distances $S_{JUMP}$ and maximum jump times $T_{JUMP\_MAX}$ for a BD-ROM disc. As shown in FIG. 100, jump distances $S_{JUMP}$ are represented in units of sectors, and maximum jump times $T_{JUMP\_MAX}$ are represented in milliseconds. One sector equals 2048 bytes. When a jump distance $S_{JUMP}$ is zero sectors or is within a range of 1-10000 sectors, 10001-20000 sectors, 20001-40000 sectors, 40001 sectors-1/10 of a stroke, and 1/10 of a stroke or greater, the corresponding maximum jump time $T_{JUMP\_MAX}$ is 0 ms, 250 ms, 300 ms, 350 ms, 700 ms, and 1400 ms, respectively. When the jump distance $S_{JUMP}$ equals zero sectors, the maximum jump time $T_{JUMP\_MAX}$ equals a zero sector transition time $T_{JUMP0}$. In the example in FIG. 100, the zero sector transition time $T_{JUMP0}$ is considered to be zero ms.

Based on the above considerations, the jump time $T_{JUMP-2D}[n]$ to be substituted into expression 1 is the maximum jump time $T_{JUMP\_MAX}$ specified for each jump distance by BD-ROM disc standards. Specifically, the jump distance $S_{JUMP}$ between the 2D extents EXT2D[n−1] and EXT2D[n] is substituted into expression 1 as the jump time $T_{JUMP-2D}[n]$. This jump distance $S_{JUMP}$ equals the maximum jump time $T_{JUMP\_MAX}$ that corresponds to the number of sectors from the end of the $n^{th}$ 2D extent EXT2D[n] to the top of the $(n+1)^{th}$ 2D extent EXT2D[n+1] as found in the table in FIG. 100.

Since the jump time $T_{JUMP-2D}[n]$ for the jump between two 2D extents EXT2D[n] and EXT2D[n+1] is limited to the maximum jump time $T_{JUMP\_MAX}$, the jump distance $S_{JUMP}$, i.e. the distance between the two 2D extents EXT2D[n] and EXT2D[n+1], is also limited. When the jump time $T_{JUMP}$ equals a maximum jump time $T_{JUMP\_MAX}$, the jump distance $S_{JUMP}$ reaches a maximum value, referred to as the "maximum jump distance $S_{JUMP\_MAX}$". For seamless playback of 2D video images, in addition to the size of 2D extents satisfying expression 1, the distance between 2D extents needs to be equal to or less than the maximum jump distance $S_{JUMP\_MAX}$.

Within each extent block, the distance between 2D extents equals the size of a dependent-view data block. Accordingly, this size is limited to being equal to or less than the maximum jump distance $S_{JUMP\_MAX}$. Specifically, when the maximum jump time $T_{JUMP\_MAX}$ between 2D extents is limited to the minimum value 250 ms specified in FIG. 100, then the distance between 2D extents, i.e. the size of dependent-view data blocks, is limited to the corresponding maximum jump distance $S_{JUMP\_MAX}$=10000 sectors or less.

When seamlessly playing back two extent blocks arranged on different recording layers, a long jump occurs between the $n^{th}$ 2D extent EXT2D[n] located at the end of the earlier extent block and the $(n+1)^{th}$ 2D extent EXT2D[n+1] located at the top of the later extent block. This long jump is caused by an operation, such as a focus jump, to switch the recording layer. Accordingly, in addition to the maximum jump time $T_{JUMP\_MAX}$ specified in the table in FIG. 100, the time required for this long jump further includes a "layer switching time", which is the time necessary for an operation to switch the recording layer. This "layer switching time" is, for example, 350 ms. As a result, in expression 1, which the size of the $n^{th}$ 2D extent EXT2D[n] should satisfy, the jump time $T_{JUMP-2D}[n]$ is determined by the sum of two parameters TJ[n] and TL[n]: $T_{JUMP-2D}[n]$=TJ[n]+TL[n]. The first parameter TJ[n] represents the maximum jump time $T_{JUMP\_MAX}$ specified for the jump distance $S_{JUMP}$ of the long jump according to BD-ROM disc standards. This maximum jump time $T_{JUMP\_MAX}$ equals the value, in the table in FIG. 100, corresponding to the number of sectors from the end of the $n^{th}$ 2D extent EXT2D[n] to the top of the $(n+1)^{th}$ 2D extent EXT2D[n+1]. The second parameter TL[n] represents the layer switching time, for example 350 ms. Accordingly, the distance between two 2D extents EXT2D[n] and EXT2D[n+1] is limited to being equal to or less than the maximum jump distance $S_{JUMP\_MAX}$ corresponding, in the table in FIG. 100, to the maximum jump time $T_{JUMP\_MAX}$ of the long jump minus the layer switching time.

<<Conditions Based on Capability in 3D Playback Mode>>

Figure 101:
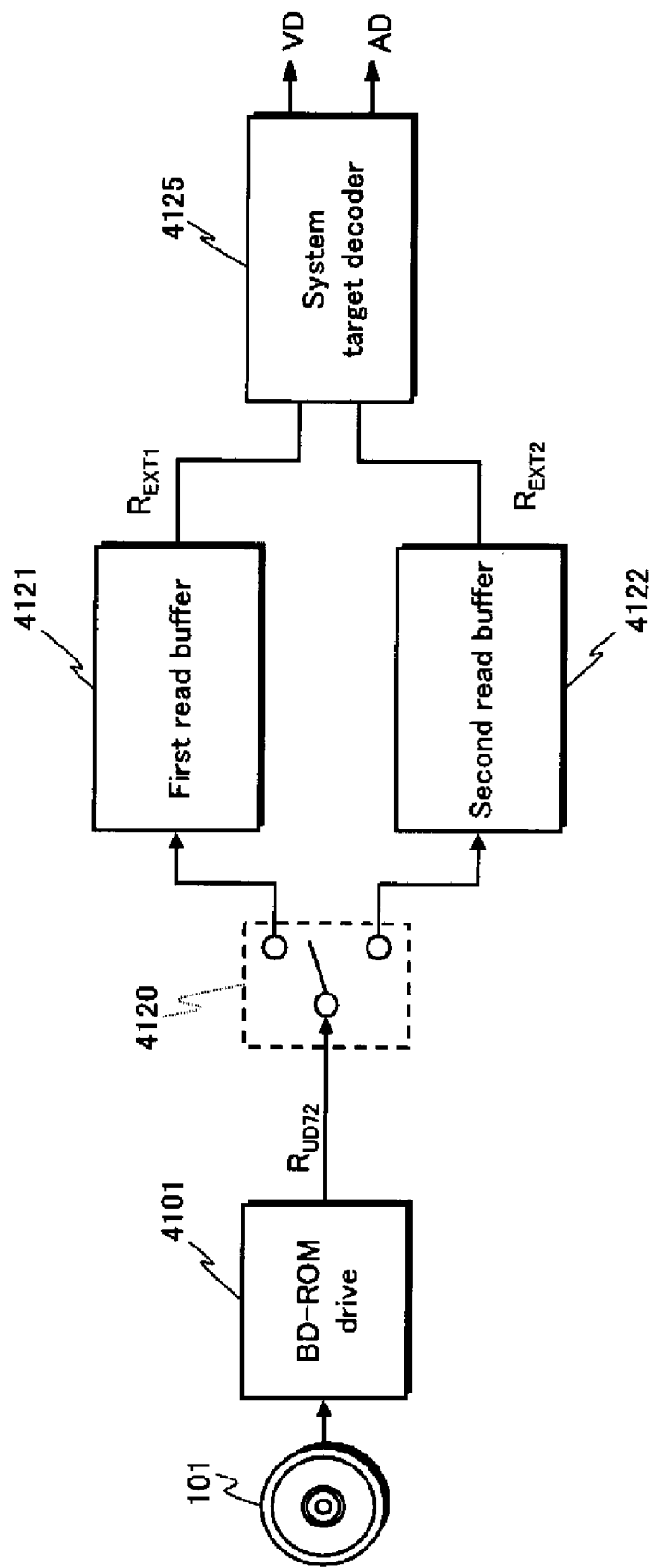
FIG. 101 is a block diagram showing playback processing in the playback device 102 in 3D playback mode.

FIG. 101 is a block diagram showing playback processing in the playback device 102 in 3D playback mode. As shown in FIG. 101, from among the elements shown in FIG. 41, this playback processing system includes the BD-ROM drive 4101, switch 4120, pair of read buffers 4121 and 4122, and system target decoder 4125. The BD-ROM drive 4101 reads extents SS from the BD-ROM disc 101 and transfers the extents SS to the switch 4120 at a read rate $R_{UD72}$. The switch 4120 separates extents SS into base-view data blocks and dependent-view data blocks. The base-view data blocks are stored in the first read buffer 4121, and the dependent-view data blocks are stored in the second read buffer 4122. The system target decoder 4125 reads source packets from the base-view data blocks stored in the first read buffer 4121 at a base-view transfer rate $R_{EXT1}$ and reads source packets from the dependent-view data blocks stored in the second read buffer 4122 at a dependent-view transfer rate $R_{EXT2}$. The system target decoder 4125 also decodes pairs of read base-view data blocks and dependent-view data blocks into video data VD and audio data AD.

The base-view transfer rate $R_{EXT1}$ and the dependent-view transfer rate $R_{EXT2}$ equal 192/188 times the mean rate of processing by the system target decoder 4125 to extract TS packets respectively from each source packet in the base-view data blocks and the dependent-view data blocks. The maximum value $R_{MAX1}$ of the base-view transfer rate $R_{EXT1}$ equals 192/188 times the system rate $R_{TS1}$ for the file 2D. The maximum value $R_{MAX2}$ of the dependent-view transfer rate $R_{EXT2}$ equals 192/188 times the system rate $R_{TS2}$ for the file DEP. The transfer rates $R_{EXT1}$ and $R_{EXT2}$ are conventionally represented in bits/second and specifically equal the value of the size of each data block expressed in bits divided by the extent ATC time. The extent ATC time equals the time required to transfer all of the source packets in the data block from the read buffers 4121, 4122 to the system target decoder 4125.

The read rate $R_{UD72}$ is conventionally expressed in bits/second and is set at a higher value, e.g. 72 Mbps, than the maximum values $R_{MAX1}$, $R_{MAX2}$ of the transfer rates $R_{EXT1}$, $R_{EXT2}$: $R_{UD72} > R_{MAX1}$, $R_{UD72} > R_{MAX2}$. This prevents underflow in the read buffers 4121 and 4122 due to decoding processing by the system target decoder 4125 while the BD-ROM drive 4101 is reading an extent SS from the BD-ROM disc 101.

[Seamless Connection Within an Extent Block]

FIGS. 102A and 102B are graphs showing changes in data amounts DA1 and DA2 stored in read buffers 4121 and 4122 when 3D video images are played back seamlessly from a single extent block. FIG. 102C is a schematic diagram showing a correspondence between the extent block 8610 and a playback path 8620 in 3D playback mode. As shown in FIG. 102C, in accordance with the playback path 8620, the entire extent block 8610 is read all at once as one extent SS. Subsequently, the switch 4120 separates the extent SS into dependent-view data blocks D[k] and base-view data blocks B[k] (k=n, n+1, n+2, . . . ).

Reading and transfer operations by the BD-ROM drive 4101 are not actually performed continuously, as suggested by the graphs in FIGS. 102A and 102B, but rather intermittently. During the read periods $PR_D[k]$ and $PR_B[k]$ for the data blocks D[k], B[k], this prevents overflow in the read buffers 4121 and 4122. Accordingly, the graphs in FIGS. 102A and 102B represent what is actually a step-wise increase as an approximated straight increase.

As shown in FIGS. 102A and 102B, during the read period $PR_D[n]$ of the $n^{th}$ dependent-view data block D[n], the stored data amount DA2 in the second read buffer 4122 increases at a rate equal to $R_{UD72} - R_{EXT2}[n]$, the difference between the read rate $R_{UD72}$ and a dependent-view transfer rate $R_{EXT2}[n]$, whereas the stored data amount DA1 in the first read buffer 4121 decreases at a base-view transfer rate $R_{EXT1}[n-1]$. As shown in FIG. 102C, a zero sector transition $J_0[2n]$ occurs from the $n^{th}$ dependent-view data block D[n] to the $n^{th}$ base-view data block B[n]. As shown in FIGS. 102A and 102B, during the zero sector transition period $PJ_0[n]$, the stored data amount DA1 in the first read buffer 4121 continues to decrease at the base-view transfer rate $R_{EXT1}[n-1]$, whereas the stored data amount DA2 in the second read buffer 4122 decreases at the dependent-view transfer rate $R_{EXT2}[n]$.

As further shown in FIGS. 102A and 102B, during the read period $PR_B[n]$ of the $n^{th}$ base-view data block B[n], the stored data amount DA1 in the first read buffer 4121 increases at a rate equal to $R_{UD72} - R_{EXT}[n]$ the difference between the read rate $R_{UD72}$ and a base-view transfer rate $R_{EXT1}[n]$. On the other hand, the stored data amount DA2 in the second read buffer 4122 continues to decrease at the dependent-view transfer rate $R_{EXT2}[n]$. As further shown in FIG. 102C, a zero sector transition $J_0[2n+1]$ occurs from the base-view data block B[n] to the next dependent-view data block D(n+1). As shown in FIGS. 102A and 102B, during the zero sector transition period $PJ_0[2n+1]$, the stored data amount DA1 in the first read buffer 4121 decreases at the base-view transfer rate $R_{EXT1}[n]$, and the stored data amount DA2 in the second read buffer 4122 continues to decrease at the dependent-view transfer rate $R_{EXT2}[n]$.

In order to play back 3D video images seamlessly from one extent block 8610, the following conditions [3] and [4] should be met.

[3] The size $S_{EXT1}[n]$ of the $n^{th}$ base-view data block B[n] is at least equal to the data amount transferred from the first read buffer 4121 to the system target decoder 4125 from the corresponding read period $PR_B[n]$ until immediately before the read period $PR_B[n+1]$ of the next base-view data block B[n+1]. In this case, as shown in FIG. 102A, immediately before the read period $PR_B[n+1]$ of the next base-view data block B[n+1], the stored data amount DA1 in the first read buffer 4121 does not fall below the amount immediately before the read period $PR_B[n]$ of the $n^{th}$ base-view data block B[n]. The length of the read period $PR_B[n]$ of the $n^{th}$ base-view data block B[n] equals $S_{EXT1}[n]/R_{UD72}$, the value obtained by dividing the size $S_{EXT1}[n]$ of this base-view data block B[n] by the read rate $R_{UD72}$. On the other hand, the length of the read period $PR_B[n+1]$ of the (n+1) dependent-view data block D[n+1] equals $S_{EXT2}[n+1]/R_{UD72}$, the value obtained by dividing the size $S_{EXT2}[n 1]$ of this dependent-view data block D[n+1] by the read rate $R_{UD72}$. Accordingly, the size $S_{EXT1}[n]$ of this base-view data block B[n] should be equal to or greater than the minimum extent size expressed in the right-hand side of expression 2.

$$S_{EXT1}[n] \geq \left( \frac{\frac{S_{EXT1}[n]}{R_{UD72}} + T_{JUMP0}[2n+1] +}{\frac{S_{EXT2}[n+1]}{R_{UD72}} + T_{JUMP0}[2n+2]} \right) \times R_{EXT1}[n] \quad (2)$$

$$\therefore S_{EXT1}[n] \geq CEI\left\{ L \frac{R_{EXT1}[n]}{8} \times \frac{R_{UD72}}{R_{UD72} - R_{EXT1}[n]} \times \left( \frac{T_{JUMP0}[2n+1] + \frac{S_{EXT2}[n+1]}{R_{UD72}} +}{T_{JUMP0}[2n+2]} \right) \right\}.$$

[4] The size $S_{EXT2}[n]$ of the $n^{th}$ dependent-view data block D[n] is at least equal to the data amount transferred from the second read buffer 4122 to the system target decoder 4125 from the corresponding read period $PR_R[n]$ until immediately before the read period $PR_D[n+1]$ of the next dependent-view data block D[n+1]. In this case, as shown in FIG. 102B, immediately before the read period $PR_D[n+1]$ of the next dependent-view data block D[n+1], the stored data amount DA2 in the second read buffer 4122 does not fall below the amount immediately before the read period $PR_D[n]$ of the $n^{th}$ dependent-view data block D[n]. The length of the read period $PR_D[n]$ of the $n^{th}$ dependent-view data block D[n] equals $S_{EXT2}[n]/R_{UD72}$, the value obtained by dividing the size $S_{EXT2}[n]$ of this dependent-view data block D[n] by the read rate $R_{UD72}$. Accordingly, the size $S_{EXT2}[n]$ of this dependent-view data block D[n] should be equal to or greater than the minimum extent size expressed in the right-hand side of expression 3.

$$S_{EXT2}[n] \geq \left( \frac{\frac{S_{EXT2}[n]}{R_{UD72}} + T_{JUMP0}[2n] +}{\frac{S_{EXT1}[n]}{R_{UD72}} + T_{JUMP0}[2n+1]} \right) \times R_{EXT2}[n] \quad (3)$$

$$\therefore S_{EXT2}[n] \geq CEIL\left(\frac{R_{EXT2}[n]}{8} \times \frac{R_{UD72}}{R_{UD72}-R_{EXT2}[n]} \times \begin{pmatrix} T_{JUMP0}[2n] + \\ \frac{S_{EXT1}[n]}{R_{UD72}} + \\ T_{JUMP0}[2n+1] \end{pmatrix}\right).$$

[Seamless Connection Between Extent Blocks]

Figures 103A, 103B:
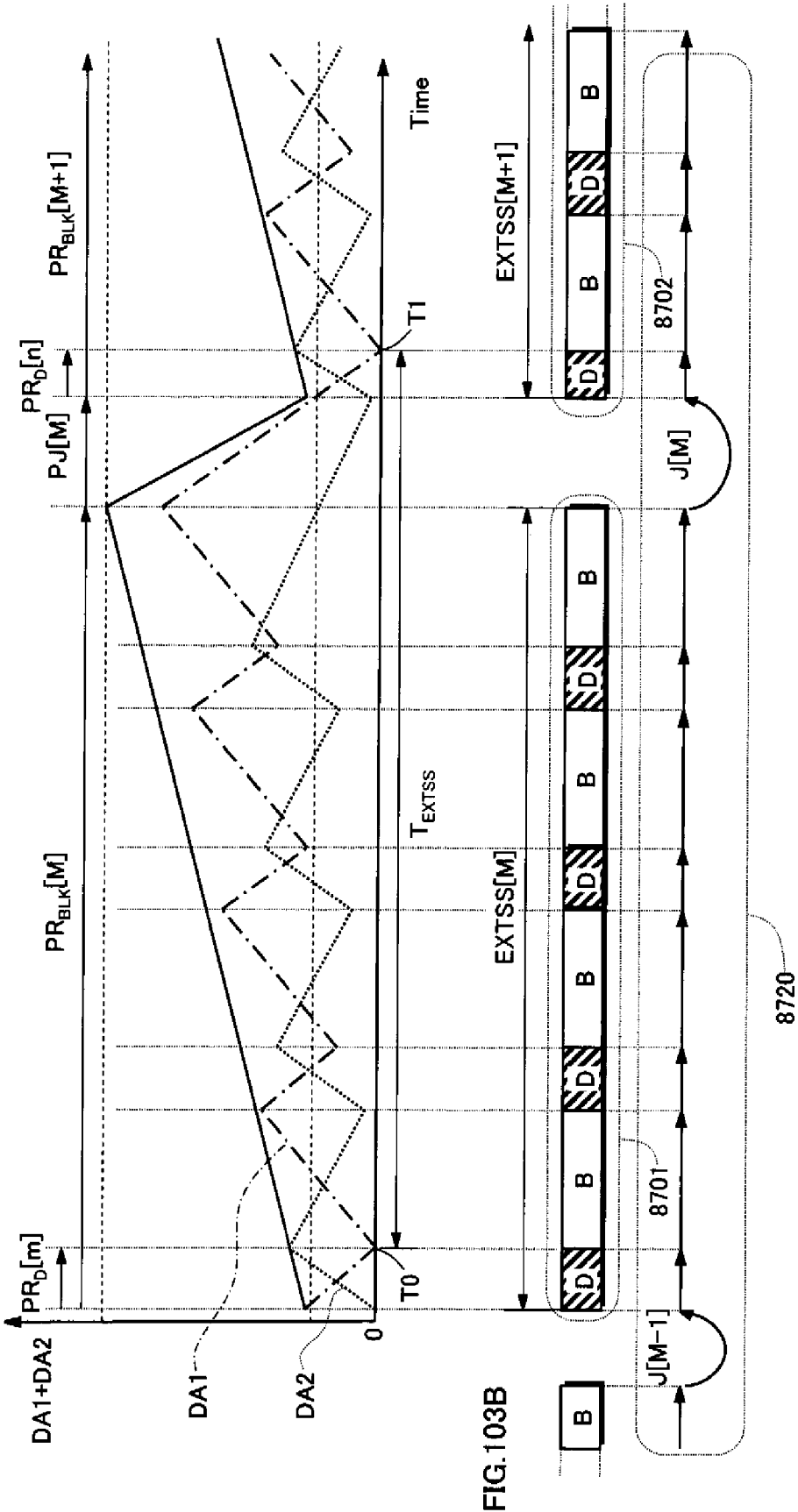
FIG. 103A is graph showing changes in data amounts DA1 and DA2 stored in read buffers 4121 and 4122 shown in FIG. 101, as well as the changes in the sum DA1+DA2, when 3D video images are played back seamlessly from $M^{th}$ (the letter M represents an integer greater than or equal to 2) and $(M+1)^{th}$ consecutive extent blocks 8701 and 8702.
FIG. 103B is a schematic diagram showing correspondence between the extent blocks 8701 and 8702 and a playback path 8720 in 3D playback mode.

FIG. 103B is a schematic diagram showing an $M^{th}$ (the letter M represents an integer greater than or equal to 2) extent block 8701 and $(M+1)^{th}$ extent block 8702 and the correspondence between these extent blocks 8701 and 8702 and a playback path 8720 in 3D playback mode. As shown in FIG. 103B, the two extent blocks 8701 and 8702 are separated by a layer boundary LB or a recording area for other data. In accordance with the playback path 8720, the entire $M^{th}$ extent block 8701 is first read all at once as the $M^{th}$ extent SS EXTSS[M]. A jump J[M] occurs immediately thereafter. Subsequently, the $(M+1)^{th}$ extent block 8702 is read all at once as the $(M+1)^{th}$ extent SS EXTSS[M+1].

FIG. 103A is a graph showing changes in data amounts DA1 and DA2 stored in read buffers 4121 and 4122, as well as the changes in the sum DA1+DA2, when 3D video images are continually played back seamlessly from two extent blocks 8701 and 8702. In FIG. 103A, the alternating long and short dashed line indicates changes in the data amount DA1 stored in the first read buffer 4121, the dashed line indicates changes in the data amount DA2 stored in the second read buffer 4122, and the solid line indicates changes in the sum DA1+DA2 of the two data amounts. In this graph, the solid line is an approximation that averages small changes each time a data block is read. Furthermore, the zero sector transition time $T_{JUMP0}$ is considered to be "zero seconds".

As shown in FIG. 103A, during the period $PR_{BLK}[M]$ during which the entire $M^{th}$ extent block 8701 is read from the BD-ROM disc 101 into the read buffers 4121 and 4122, the data amounts DA1 and DA2 respectively stored in the read buffers 4121 and 4122 both increase. Specifically, during the period $PR_{BLK}[M]$ during which the entire $M^{th}$ extent block 8701 is read, the sum DA1+DA2 of the stored data amounts increases at a rate equal to the difference $R_{UD72} R_{EXTSS}[M]$ between the read rate $R_{UD72}$ and a mean transfer rate $R_{EXTSS}[M]$. This mean transfer rate $R_{EXTSS}[M]$ is assessed as the value obtained by dividing the size of the entire $M^{th}$ extent block 8701, i.e. the size $S_{EXTSS}[M]$ of the $M^{th}$ extent SS EXTSS[M], by the extent ATC time $T_{EXTSS}$.

At the point the last base-view data block in the $M^{th}$ extent block 8701 is read into the first read buffer 4121, the sum DA1+DA2 of the stored data amount reaches its maximum value. During the period PJ[M] of the immediately subsequent jump J[M], the sum DA1+DA2 of the stored data amount decreases at the mean transfer rate $R_{EXTSS}[M]$. Accordingly, by adjusting the maximum value of the sum DA1+DA2 of the stored data amount to be sufficiently large, underflow in the read buffers 4121 and 4122 during the jump J[M] can be prevented. As a result, the two extent blocks 8701 and 8702 can be seamlessly connected.

The maximum value of the sum DA1+DA2 of the stored data amount is determined by the size of the $M^{th}$ extent block 8701. Accordingly, in order to seamlessly connect the $M^{th}$ extent block 8701 to the $(M+1)^{th}$ extent block 8702, the size of the $M^{th}$ extent block 8701, i.e. the size $S_{EXTSS}[M]$ of the $M^{th}$ extent SS EXTSS[M], should satisfy condition 5.

[5] During the read period $PR_D[m]$ of the dependent-view data block D located at the top of the $M^{th}$ extent block 8701, preloading is performed (the letter m represents an integer greater than or equal to 1). During this preload period $PR_D[m]$, the base-view data block B corresponding to the dependent-view data block D has not been stored in the first read buffer 4121, and thus the dependent-view data block D cannot be transferred from the second read buffer 4122 to the system target decoder 4125. Accordingly, data provision to the system target decoder 4125 during the period of the immediately prior jump J[M−1] is also continued during this preload period $PR_D[m]$ by transferring data in the $(M-1)^{th}$ extent block from the second read buffer 4122 to the system target decoder 4125. Similarly, during the read period $PR_D[n]$ of the dependent-view data block D located at the top of the $(M+1)^{th}$ extent block 8702, preloading is performed (the letter n represents an integer greater than or equal to m+1). Accordingly, data provision to the system target decoder 4125 during the period of the immediately prior jump J[M] is also continued during this preload period $PR_D[n]$ by transferring data in the $M^{th}$ extent block 8701 from the second read buffer 4122 to the system target decoder 4125. Therefore, in order to prevent underflow in both read buffers 4121 and 4122 during the jump J[M], the extent ATC time $T_{EXTSS}$ of the $M^{th}$ extent SS EXTSS[M] should be at least equal to the length of the period from the end time T0 of the preload period $PR_D[m]$ in the $M^{th}$ extent block 8701 until the end time T1 of the preload period $PR_D[n]$ in the $(M+1)^{th}$ extent block 8702. In other words, the size $S_{EXTSS}[M]$ of the $M^{th}$ extent SS EXTSS[M] should at least be equal to the sum of the data amounts transferred from the read buffers 4121 and 4122 to the system target decoder 4125 during the period T0-T1.

As is clear from FIG. 103A, the length of the period T0-T1 equals the sum of the length of the read period $PR_{BLK}[M]$ of the $M^{th}$ extent block 8701, the jump time $T_{JUMP}[M]$ of the jump J[M], and the difference $T_{DIFF}[M]$ in the lengths of the preload periods $PR_D[n]$ and $PR_D[m]$ in the extent blocks 8701 and 8702. Furthermore, the length of the read period $PR_{BLK}[M]$ of the $M^{th}$ extent block 8701 equals $S_{EXTSS}[M]/R_{UD72}$, the value obtained by dividing the size $S_{EXTSS}[M]$ of the $M^{th}$ extent SS EXTSS[M] by the read rate $R_{UD72}$. Accordingly, the size $S_{EXTSS}[M]$ of the $M^{th}$ extent SS EXTSS[M] should be equal to or greater than the minimum extent size expressed in the right-hand side of expression 4.

$$S_{EXTSS}[M] \geq \left(\frac{S_{EXTSS}[M]}{R_{UD72}} + T_{JUMP}[M] + T_{DIFF}[M]\right)(\times R)_{EXTSS}[M] \quad (4)$$

$$\therefore S_{EXTSS}[M] \geq \frac{R_{UD72} \times R_{EXTSS}[M]}{R_{UD72} - R_{EXTSS}[M]} \times (T_{JUMP}[M] + T_{DIFF}[M])$$

The lengths of the preload periods $PR_D[m]$ and $PR_D[n]$ respectively equal $S_{EXT2}[M]/R_{UD72}$ and $S_{EXT2}[n]/R_{UD72}$, the values obtained by dividing the sizes $S_{EXT2}[m]$ and $S_{EXT2}[n]$ of the dependent-view data block D located at the top of the extent blocks 8701 and 8702 by the read rate $R_{UD72}$. Accordingly, the difference $T_{DIFF}$ in the lengths of the preload periods $PR_D[m]$ and $PR_D[n]$ equals the difference in these values: $T_{DIFF}=S_{EXT2}[n] R_{UD72}-S_{EXT2}[m] R_{UD72}$. Note that, like the right-hand side of expressions 1-3, the right-hand side of expression 4 may be expressed as an integer value in units of bytes.

Also, when decoding of multiplexed stream data is improved upon as follows, the difference $T_{DIFF}$ in the right-hand side of expression 4 may be considered to be zero. First, the maximum value of the difference $T_{DIFF}$ throughout the multiplexed stream data, i.e. the worst value of $T_{DIFF}$, is sought. Next, when the multiplexed stream data is played back, the start of decoding is delayed after the start of reading by a time equal to the worst value of $T_{DIFF}$.

<<Conditions for Reducing the Capacities of the Read Buffers>>

FIGS. 104A and 104B are graphs showing changes in data amounts DA1 and DA2 stored in read buffers 4121 and 4122 when 3D video images are played back seamlessly from the two consecutive extent blocks 8701 and 8702 shown in FIG. 103B. As shown in FIG. 104A, the stored data amount DA1 in the first read buffer 4121 reaches a maximum value DM1 at the point when the base-view data block B[n−1] at the end of the $M^{th}$ extent block 8701 is read into the first read buffer 4121. Furthermore, the stored data amount DA1 decreases at the base-view transfer rate $R_{EXT1}[n-1]$ from the period PJ[M] of the immediately subsequent jump J[M] through the preload period $PR_D[n]$ in the $(M+1)^{th}$ extent block 8702. Accordingly, to prevent the stored data amount DA1 from reaching zero before completion of the preload period $PR_D[n]$, the maximum value DM1 of the stored data amount DA1 should be equal to or greater than the data amount transferred from the first read buffer 4121 to the system target decoder 4125 during the jump period PJ[M] and the preload period $PR_D[n]$. In other words, the maximum value DM1 of the stored data amount DA1 should be greater than or equal to the sum of the length $T_{JUMP}[M]$ of the jump period PJ[M] and the length of the preload period $PR_D[n]$, $S_{EXT2}[n]/R_{UD72}$, multiplied by the base-view transfer rate $R_{EXT1}[n-1]$:DM1$\geq (T_{JUMP}[M]+S_{EXT2}[n]/R_{UD72})\times R_{EXT1}[n-1]$. When the length $T_{JUMP}[M]$ of the jump period PJ[M] equals the maximum jump time $T_{JUMP\_MAX}$ of the jump J[M], and the base-view transfer rate $R_{EXT1}[n-1]$ equals its maximum value $R_{MAX1}$, the maximum value DM1 of the stored data amount DA1 is at its largest value. Accordingly, the first read buffer 4121 is required to have a capacity RB1 equal to or greater than the maximum value DM1 in this case: RB1$\geq (T_{JUMP\_MAX}+S_{EXT2}[n]/R_{UD72})\times R_{EXT1}$.

On the other hand, as shown in FIG. 104B, at the point when reading of the end base-view data block B[n−1] in the $M^{th}$ extent block 8701 starts, the stored data amount DA2 in the second read buffer 4122 reaches its maximum value DM2. Furthermore, the stored data amount DA2 decreases at a dependent-view transfer rate $R_{EXT2}[n-1]$ from the read period of the base-view data block B[n−1] through the preload period $PR_D[n]$ in the $(M+1)^{th}$ extent block 8702. Accordingly, in order to maintain provision of data to the system target decoder 4125 through the end of the preload period $PR_D[n]$, the maximum value DM2 of the stored data amount DA2 should be equal to or greater than the data amount transferred from the second read buffer 4122 to the system target decoder 4125 during the read period of the base-view data block B[n−1], the jump period PJ[M], and the preload period $PR_D[n]$. In other words, the maximum value DM2 of the stored data amount DA2 should be greater than or equal to the sum of the length of the read period of the base-view data block B[n−1] $S_{EXT1}[n-1]/R_{UD72}$, the length $T_{JUMP}[M]$ of the jump period PJ[M], and the length of the preload period $PR_D[n]$, $S_{EXT2}[n]/R_{UD72}$, multiplied by the dependent-view transfer rate $R_{EXT2}[n-1]$:DM2 $\geq (S_{EXT2}[n-1]/R_{UD72}+T_{JUMP}[M]+S_{EXT2}[n]/R_{UD72})\times R_{EXT1}[n-1]$. When the length $T_{JUMP}[M]$ of the jump period PJ[M] equals the maximum jump time $T_{JUMP\_MAX}$ of the jump J[M], and the dependent-view transfer rate $R_{EXT2}[n-1]$ equals its maximum value $R_{MAX2}$, the maximum value DM2 of the stored data amount DA2 is at its largest value. Accordingly, the second read buffer 4122 is required to have a capacity RB2 equal to or greater than the maximum value DM2 in this case: RB2$\geq (S_{EXT1}[n-1]/R_{UD72}+T_{JUMP_{MAX}}+S_{EXT2}[n]/R_{UD72})\times R_{MAX2}$. Furthermore, since any dependent-view data block may be the first data block read during interrupt playback, the capacity RB2 of the second read buffer 4122 should not be less than the size of any of the dependent-view data blocks: RB2$\geq S_{EXT2}[k]$ (the letter k represents an arbitrary integer).

As per the above description, the lower limits of the capacities RB 1 and RB2 of the read buffers 4121 and 4122 are determined by the sizes $S_{EXT1}[k]$ and $S_{EXT2}[k]$ of the data blocks. Accordingly, in order to economize the capacities RB1 and RB2, the upper limit of the sizes $S_{EXT1}[k]$ and $S_{EXT2}[k]$ of the data blocks, i.e. the maximum extent size, is limited via the following condition [6].

[6] As shown in FIG. 19, the base-view data blocks B[k] in each extent block 1901-1903 are shared by a file 2D and a file SS. Accordingly, the size $S_{EXT1}[k]$ of the base-view data blocks B[k] should satisfy expression 1. On the other hand, in order to reduce the capacity RB1 of the first read buffer 4121 as much as possible, the size $S_{EXT1}[k]$ of the base-view data blocks B[k] should be equal to or less than the lower limit of the minimum extent size of 2D extents. In other words, the size $S_{EXT1}[k]$ should be equal to or less than the maximum extent size expressed in the right-hand side of expression 5.

$$S_{EXT1}[k] \leq CEI\left(L\frac{R_{EXT1}[k]}{8} \times \frac{R_{UD54}}{R_{UD54} - R_{MAX1}} \times T_{JUMP-2D\_MIN}\right) \quad (5)$$

In this expression, the jump time $T_{JUMP-2D}\_MIN$ is the minimum value of the jump time necessary in each extent block 1901-1903, i.e. the minimum value of the maximum jump time $T_{JUMP}\_MAX$ between 2D extents. Specifically, the jump time $T_{JUMP-2D\_MIN}$ is set to the minimum value 250 ms specified in the table in FIG. 100. Meanwhile, the distance between 2D extents equals the size $S_{EXT2}[k]$ of a dependent-view data block D[k]. Accordingly, when the jump time $T_{JUMP-2D\_MIN}$ is set to 250 ms, the size $S_{EXT2}[k]$ of the dependent-view data block D[k] is limited to the maximum jump distance $S_{JUMP\_MAX}$=10000 sectors or less corresponding to the maximum jump time $T_{JUMP\_MAX}$=250 ms in the table in FIG. 100. In other words, the maximum extent size of dependent-view data blocks is 10000 sectors.

<<Conclusion>>

To seamlessly play back both 2D video images and 3D video images from a plurality of extent blocks, all of the above conditions [1]-[6] should be satisfied. In particular, the sizes of the data blocks and extent blocks should satisfy the following conditions 1-5.

Condition 1: The size $S_{EXT2D}$ of a 2D extent should satisfy expression 1.

Condition 2: The size $S_{EXT1}$ of a base-view data block should satisfy expression 2.

Condition 3: The size $S_{EXT2}$ a dependent-view data block should satisfy expression 3.

Condition 4: The size $S_{EXTSS}$ of an extent block should satisfy expression 4.

Condition 5: The size $S_{EXT1}$ of a base-view data block should satisfy expression 5.

<<Modifications to Condition 1>>

As is clear from the playback path 2101 in 2D playback mode shown in FIG. 21, jumps occur frequently in 2D playback mode. Accordingly, to further ensure seamless playback, it is preferable to further add a margin to the minimum extent size of the 2D extents represented by the right-hand side of expression 1. However, the addition of this margin should not change expression 5. The following are three methods for adding such a margin.

The first method adds a margin to the minimum extent size of a 2D extent by replacing the mean transfer rate $R_{EXT2D}$ included in the denominator of the right-hand side of expression 1 with the maximum value $R_{MAX}$. In other words, condition 1 is changed so that the size $S_{EXT2D}$ of a 2D extent satisfies expression 6 instead of expression 1.

$$S_{EXT2D}[n] \geq CEI\left(L\frac{R_{EXT2D}[n]}{8} \times \frac{R_{UD54}}{R_{UD54} - R_{MAX}} \times T_{JUMP-2D}[n]\right) \quad (6)$$

The second method adds a margin to the minimum extent size of a 2D extent by extending the extent ATC time of the 2D extent by ΔT seconds. In other words, condition 1 is changed so that the size $S_{EXT2D}$ of a 2D extent satisfies expression 7A or 7B instead of expression 1.

$$S_{EXT2D}[n] \geq CEI\left(L\frac{R_{EXT2D}[n]}{8} \times \left(\frac{R_{UD54}}{R_{UD54} - R_{EXT2D}[n]} \times T_{JUMP-2D}[n] + \Delta T\right)\right) \quad (7A)$$

$$S_{EXT2D}[n] \geq CEI\left(L\frac{R_{EXT2D}[n]}{8} \times \left(\frac{R_{UD54}}{R_{UD54} - R_{Max}} \times T_{JUMP-2D}[n] + \Delta T\right)\right) \quad (7B)$$

The extension time ΔT may be determined by the length of a GOP, or by the upper limit of the number of extents that can be played back during a predetermined time. For example, if the length of a GOP is one second, ΔT is set to 1.0 seconds. On the other hand, if the upper limit of the number of extents that can be played back during a predetermined time in seconds is n, then ΔT is set to the predetermined time/n.

The third method adds a margin to the minimum extent size of the 2D extent by replacing the mean transfer rate $R_{EXT2D}$ included throughout the right-hand side of expression 1 with the maximum value $R_{MAX}$. In other words, condition 1 is changed so that the size $S_{EXT2D}$ of a 2D extent satisfies expression 8 instead of expression 1.

$$S_{EXT2D}[n] \geq CEIL\left(\frac{R_{MAX}}{8} \times \frac{R_{UD54}}{R_{UD54} - R_{MAX}} \times T_{JUMP-2D}[n]\right) \quad (8)$$

In this method, an even larger margin can be added to the minimum extent size. Conversely, however, even when the bit rate of the 2D extent is low, the size needs to be maintained sufficiently large. Accordingly, it is necessary to compare the size of the margin with the efficiency of recording data on the BD-ROM disc.

<Separation of a Playback Path Before and After a Layer Boundary>

In FIG. 21, the playback path 2101 in 2D playback mode and the playback path 2102 in 3D playback mode both traverse the same base-view data block B[3] immediately before a long jump $J_{LY}$ that skips over a layer boundary LB. In other words, this base-view data block B[3] is read as the second 2D extent EXT2D[1] by the playback device 102 in 2D playback mode and as the last data block in the extent SS EXTSS[1] by the playback device 102 in 3D playback mode. The data amount to be processed by the system target decoder during the long jump $J_{LY}$ is guaranteed by the size of the base-view data block B[3] via condition 1 in 2D playback mode. On the other hand, in 3D playback mode, the data amount is guaranteed by the size of the entire second extent block 1902 via condition 4. Accordingly, the minimum extent size of the base-view data block B[3] as required by condition 1 is generally larger than the minimum extent size as per condition 2. Therefore, the capacity of the first read buffer 4121 has to be larger than the minimum value necessary for seamless playback in 3D playback mode. Furthermore, the extent ATC times are the same for the base-view data block B[3] and the immediately prior dependent-view data block D[3]. Accordingly, the size of the dependent-view data block D[3] is generally larger than the minimum extent size required for the data block D[3] as per condition 2. Therefore, the capacity of the second read buffer 4122 is generally larger than the minimum value necessary for seamless playback in 3D playback mode. In the arrangement shown in FIG. 21, two extent blocks 1902 and 1903 can thus be seamlessly connected, but the capacities of the read buffers 4121 and 4122 need to be maintained sufficiently large.

To reduce the capacity of the read buffers 4121 and 4122 while still permitting seamless playback of video images during a long jump $J_{LY}$, changes may be made in the interleaved arrangement of data blocks before and after a position where a long jump $J_{LY}$ is necessary, such as a layer boundary LB, in order to create separate playback paths in 2D playback mode and 3D playback mode. These changes are represented, for example, by the following two types of arrangements 1 and 2. With either of the arrangements 1 and 2, the playback path immediately before a long jump $J_{LY}$ traverses different base-view data blocks in each operation mode. As described below, this enables the playback device 102 to easily perform seamless playback of video images during a long jump $J_{LY}$ while keeping the necessary capacity of the read buffers 4121 and 4122 to a minimum.

<<Arrangement 1>>

Figure 105:
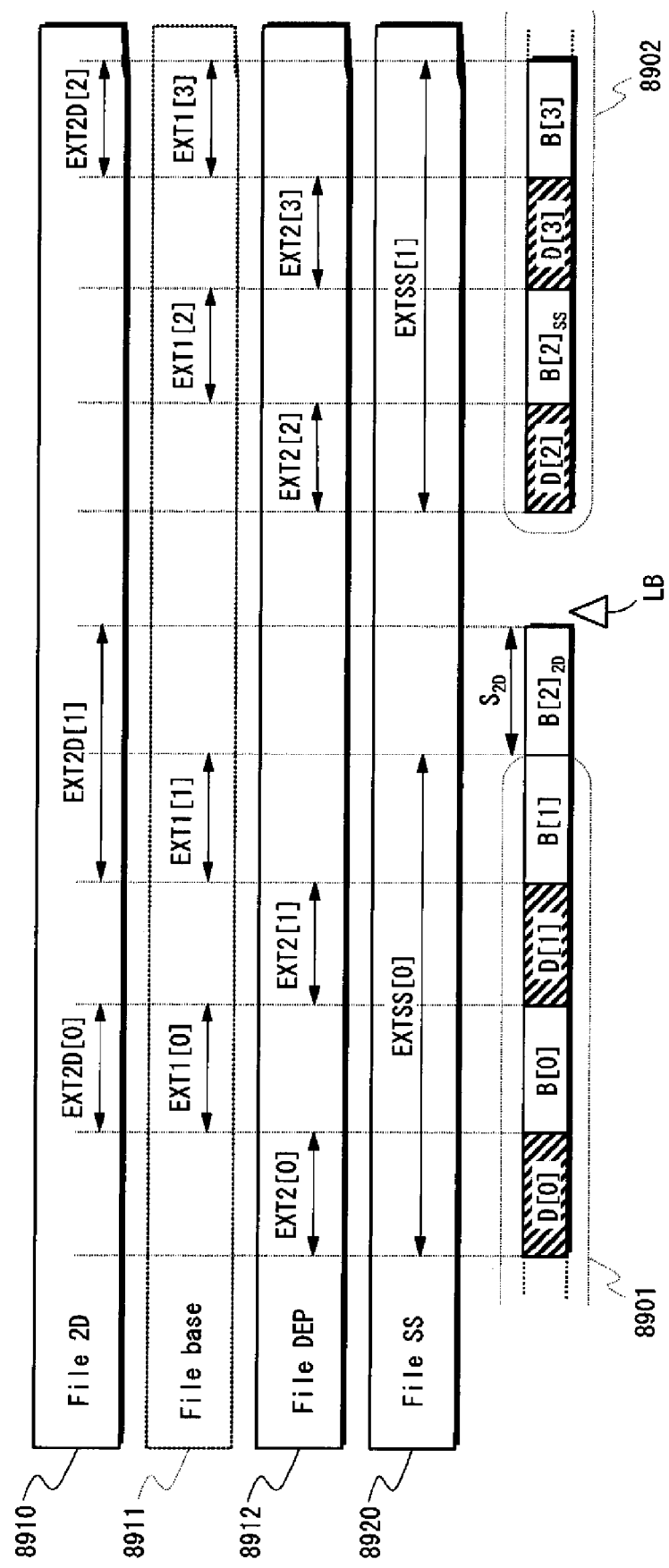
FIG. 105 is a schematic diagram showing a first example of a physical arrangement of a data block group recorded before and after a layer boundary LB on a BD-ROM disc 101.

FIG. 105 is a schematic diagram showing a first example of a physical arrangement of a data block group recorded before and after a layer boundary LB on a BD-ROM disc 101. Hereinafter, this arrangement is referred to as "arrangement 1". As shown in FIG. 105, a first extent block 8901 is recorded before the layer boundary LB, and a second extent block 8902 is recorded after the layer boundary LB. In the extent blocks 8901 and 8902, dependent-view data blocks D[n] and base-view data blocks B[n] form an interleaved arrangement (n= . . . , 0, 1, 2, 3, . . . ). In particular, the extent ATC times are the same between the $n^{th}$ pair of data blocks D[n] and B[n]. In arrangement 1, one base-view data block $B[2]_{2D}$ is further placed between the end B[1] of the first extent block 8901 and the layer boundary LB. This base-view data block $B[2]_{2D}$ matches bit-for-bit with a base-view data block $B[2]_{SS}$ at the top of the second extent block 8902. Hereinafter, $B[2]_{2D}$ is referred to as a "block exclusively for 2D playback", and $B[2]_{SS}$ is referred to as a "block exclusively for SS playback".

The base-view data blocks shown in FIG. 105 can be accessed as extents in a file 2D 8910, i.e. as 2D extents EXT2D[·], with the exception of the block exclusively for SS playback $B[2]_{SS}$. For example, the base-view data block B[0] second from the end of the first extent block 8901, the pair $B[1]+B[2]_{2D}$ of the last base-view data block B[1] and the block exclusively for 2D playback $B[2]_{2D}$, and the second base-view data block B[3] in the second extent block 8902 can respectively be accessed as individual 2D extents EXT2D[0], EXT2D[1], and EXT2D[2]. On the other hand, the dependent-view data blocks D[n] (n= . . . , 0, 1, 2, 3, . . . ) shown in FIG. 105 can each be accessed as a single extent in the file DEP 8912, i.e. as dependent-view extents EXT2[n].

For the data block groups shown in FIG. 105, cross-linking of AV stream files is performed as follows. The entire extent blocks 8901 and 8902 can respectively be accessed as one extent EXTSS[0] and EXTSS[1] in the file SS 8920. Accordingly, the base-view data blocks B[0], B[1], and B[3] in the extent blocks 8901 and 8902 are shared by the file 2D 8910 and file SS 8920. On the other hand, the block exclusively for 2D playback $B[2]_{2D}$ can only be accessed as part of the 2D extent EXT2D[1] located immediately before the layer boundary LB. On the other hand, the block exclusively for SS playback $B[2]_{SS}$ can only be accessed as part of the extent SS EXTSS[1] located immediately after the layer boundary LB. Therefore, the base-view data blocks other than the block exclusively for 2D playback $B[2]_{2D}$, i.e. B[0], B[1], $B[2]_{SS}$, and B[3], can be extracted from extents SS EXTSS[0], EXTSS[1] as extents in the file base 8911, i.e. base-view extents EXT1[n] (n=0, 1, 2, 3).

Figure 106:
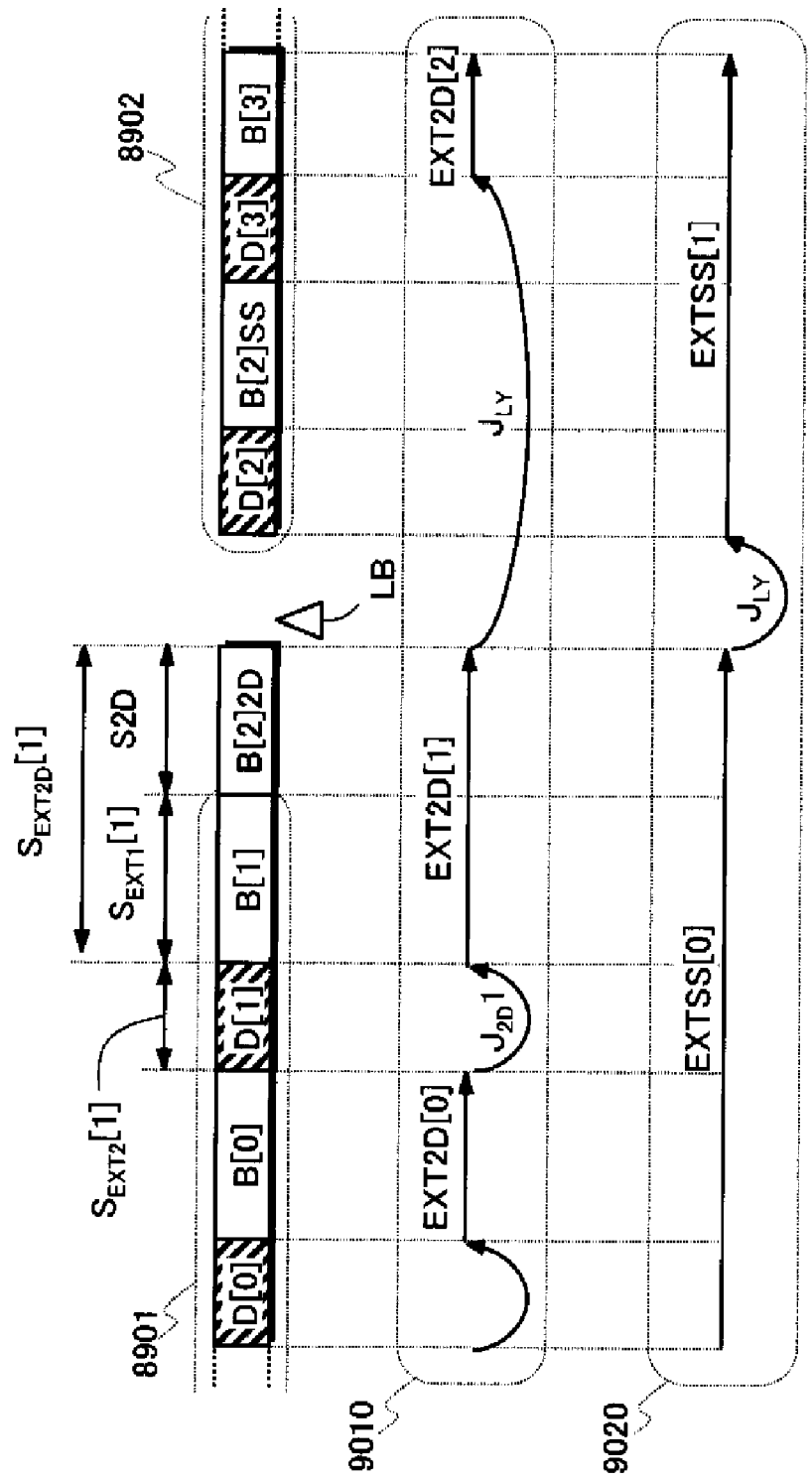
FIG. 106 is a schematic diagram showing a playback path 9010 in 2D playback mode and a playback path 9020 in 3D playback mode for the data block group in arrangement 1 shown in FIG. 105.

FIG. 106 is a schematic diagram showing a playback path 9010 in 2D playback mode and a playback path 9020 in 3D playback mode for the data block group in arrangement 1 shown in FIG. 105.

The playback device 102 in 2D playback mode plays back the file 2D 8910. Accordingly, as shown by the playback path 9010 in 2D playback mode, the base-view data block B[0] second from the end of the first extent block 8901 is read as the first 2D extent EXT2D[0], and then reading of the immediately subsequent dependent-view data block D[1] is skipped by a jump $J_{2D}1$. Next, a pair $B[1]+B[2]_{2D}$ of the last base-view data block B[1] in the first extent block 8901 and the immediately subsequent block exclusively for 2D playback $B[2]_{2D}$ is read continuously as the second 2D extent EXT2D[1]. A long jump $J_{LY}$ occurs at the immediately subsequent layer boundary LB, and reading of the three data blocks D[2], $B[2]_{SS}$, and D[3] located at the top of the second extent block 8902 is skipped. Subsequently, the second base-view data block B[3] in the second extent block 8902 is read as the third 2D extent EXT2D[2].

The playback device 102 in 3D playback mode plays back the file SS 8920. Accordingly, as shown by the playback path 9020 in 3D playback mode, the entire first extent block 8901 is continuously read as the first extent SS EXTSS[0]. Immediately thereafter, a long jump $J_{LY}$ occurs, and reading of the block exclusively for 2D playback $B[2]_{2D}$ is skipped. Subsequently, the entire second extent block 8902 is read continuously as the second extent SS EXTSS[1].

As shown in FIG. 106, in 2D playback mode, the block exclusively for 2D playback $B[2]_{2D}$ is read, whereas reading of the block exclusively for SS playback $B[2]_{SS}$ is skipped. Conversely, in 3D playback mode, reading of the block exclusively for 2D playback $B[2]_{2D}$ is skipped, whereas the block exclusively for SS playback $B[2]_{SS}$ is read. However, since the data blocks $B[2]_{2D}$ and $B[2]_{SS}$ match bit-for-bit, the base-view video frames that are played back are the same in both playback modes. In arrangement 1, the playback path 9010 in 2D playback mode and the playback path 9020 in 3D playback mode are divided before and after the long jump $J_{LY}$ in this way. Accordingly, unlike the arrangement shown in FIG. 21, the size $S_{EXT2D}[1]$ of the 2D extent EXT2D[1] located immediately before the layer boundary LB and the size $S_{EXT2}[1]$ of the immediately preceding dependent-view data block D[1] can be determined separately as follows.

The size $S_{EXT2D}[1]$ of the 2D extent EXT2D[1] equals $S_{EXT1}[1]S_{2D}$, the sum of the size $S_{EXT1}[1]$ of the base-view data block B[1] and the size $S_{2D}$ of the block exclusively for 2D playback $B[2]_{2D}$. Accordingly, for seamless playback of 2D video images, this sum $S_{EXT1}[1]$ $S_{2D}$ should satisfy expression 1. The maximum jump time $T_{JUMP\_MAX}$ of the long jump $J_{LY}$ is substituted into the right-hand side of expression 1 as the jump time $T_{JUMP-2D}$. Next, the number of sectors from the end of the block exclusively for 2D playback $B[2]_{2D}$ to the first 2D extent EXT2D[2]=B[3] in the second extent block 8902 should be equal to or less than the maximum jump distance $S_{JUMP\_MAX}$ for the long jump $J_{LY}$ specified in accordance with the capabilities of the 2D playback device.

On the other hand, for seamless playback of 3D video images, the sizes $S_{EXT2}[1]$ and $S_{EXT1}[1]$ of the dependent-view data block D[1] and base-view data block B[1] located at the end of the first extent SS EXTSS[0] should satisfy expressions 3 and 2. Regardless of the occurrence of a long jump $J_{LY}$, a typical value for a zero sector transition time should be substituted into the right-hand side of expressions 3 and 2 as the zero sector transition times $T_{JUMP0}[2n+1]$ and $T_{JUMP0}[2n+2]$. Next, the size of the first extent SS EXTSS[0] should satisfy condition 4. Furthermore, the number of sectors from the end of this extent SS EXTSS[0] to the top of the extent SS EXTSS[1] should be equal to or less than the maximum jump distance $S_{JUMP\_MAX}$ for a long jump $J_{LY}$ specified in accordance with the capabilities of the 3D playback device.

Within the 2D extent EXT2D[1] located immediately before a layer boundary LB, only the base-view data block B[1] located at the front of the 2D extent EXT2D[1] is shared with the first extent SS EXTSS[0]. Accordingly, by appropriately enlarging the size $S_{2D}$ of the block exclusively for 2D playback $B[2]_{2D}$, the size $S_{EXT1}[1]$ of the base-view data block B[1] can be further limited while keeping the size $S_{EXT2D}[1]=S_{EXT1}[1]+S_{2D}$ of the 2D extent EXT2D[1] constant. In this case, the extent ATC time of the base-view data block B[1] is shortened. As a result, the size $S_{EXT2}[1]$ of the dependent-view data block D[1] located immediately before can also be further limited.

Since the block exclusively for SS playback $B[2]_{SS}$ and the block exclusively for 2D playback $B[2]_{2D}$ match bit for bit, enlarging the size $S_{2D}$ of the block exclusively for 2D playback $B[2]_{2D}$ enlarges the size of the dependent-view data block D[2] located immediately before the block exclusively for SS playback $B[2]_{SS}$. However, this size can be made sufficiently smaller than the size of the dependent-view data block D[3] located immediately before the layer boundary LB shown in FIG. 21. The capacity of the read buffers 4121 and 4122 can thus be brought even closer to the minimum amount necessary for seamless playback of 3D video images. It is thus possible to set each data block in arrangement 1 to be a size at which seamless playback of both 2D and 3D video images during a long jump is possible while keeping the read buffer capacity that is to be guaranteed in the playback device 102 to the minimum necessary.

In arrangement 1, duplicate data of the block exclusively for 2D playback $B[2]_{2D}$ is arranged in the second extent block 5202 as a single block exclusively for SS playback $B[2]_{SS}$. Alternatively, this duplicate data may be divided into two or more blocks exclusively for SS playback.

<<Arrangement 2>>

Figure 107:
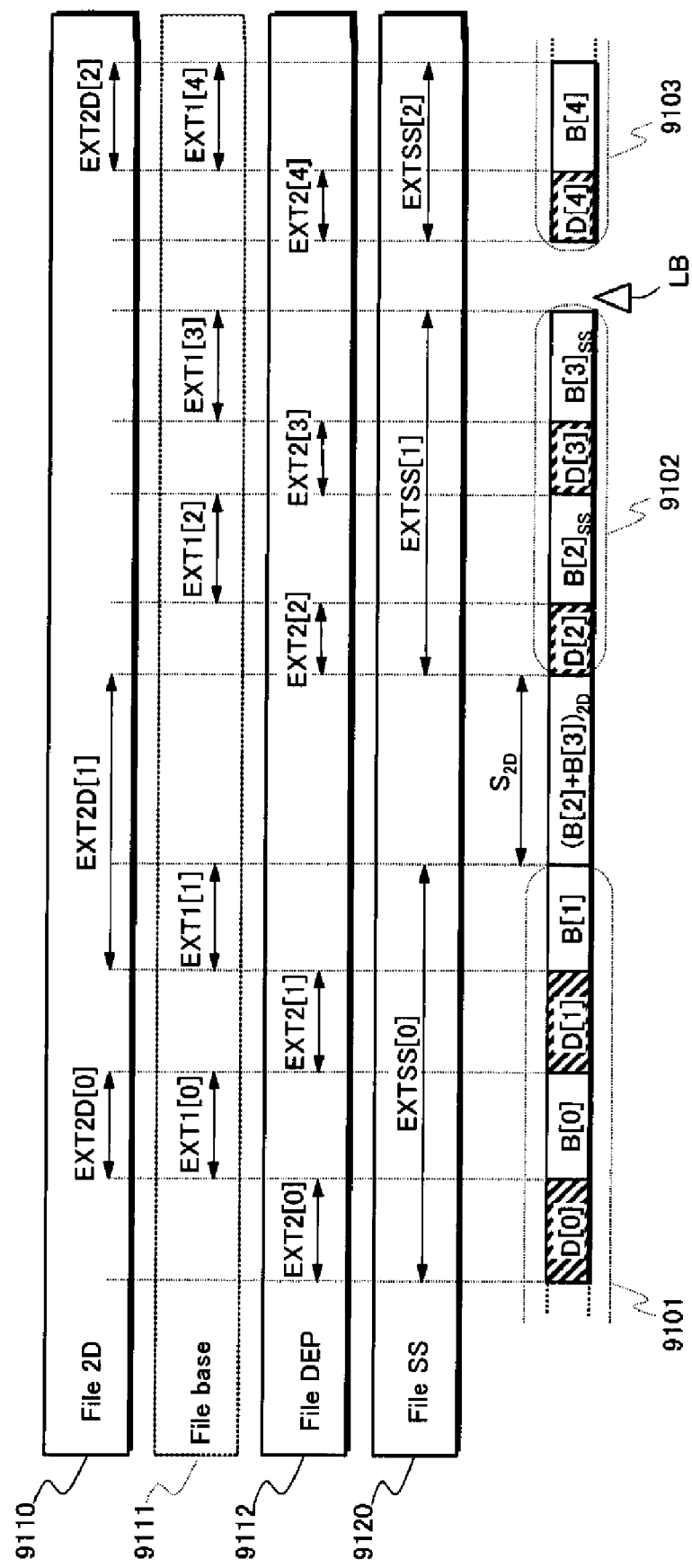
FIG. 107 is a schematic diagram showing a second example of a physical arrangement of a data block group recorded before and after a layer boundary LB on a BD-ROM disc 101.

FIG. 107 is a schematic diagram showing a second example of a physical arrangement of a data block group recorded before and after a layer boundary LB on a BD-ROM disc 101. Hereinafter, this arrangement is referred to as "arrangement 2".

As shown by comparing FIG. 107 with FIG. 105, arrangement 2 differs from arrangement 1 in that an extent block 9102, which includes blocks exclusively for SS playback $B[2]_{SS}$ and $B[3]_{SS}$, is located immediately before a layer boundary LB.

As shown in FIG. 107, a first extent block 9101, block exclusively for 2D+B[3])$_{2D}$, and second extent block 9102 are located before a layer boundary LB in this order, and a third extent block 9103 is located after the layer boundary LB. In the extent blocks 9101-9103, dependent-view data blocks D[n] and base-view data blocks B[n] form an interleaved arrangement (n=..., 0, 1, 2, 3, 4,...). In particular, the extent ATC times are the same between the $n^{th}$ pair of data blocks D[n] and B[n]. In the second extent block 9102, stream data is continuous with the data blocks D[1] and B[1] located at the end of the first extent block 9101 and the data blocks D[4] and B[4] located at the top of the third extent block 9103. The base-view data blocks included in the second extent block 9102 are both blocks exclusively for SS playback, B[2]$_{SS}$ and B[3]$_{SS}$, and the combination of these blocks+B[3]$_{SS}$ matches bit-for-bit with the block exclusively for 2D playback (B[2]+B[3])$_{2D}$ located before the second extent block 9102.

Within the base-view data block shown in FIG. 107, data blocks other than the blocks exclusively for SS playback B[2]$_{SS}$ and B[3]$_{SS}$ can be accessed as extents EXT2D[0], EXT2D[1], and EXT2D[2] in a file 2D 9110. In particular, the pair of the last base-view data block B[1] and the block exclusively for 2D playback (B[2]+B[3])$_{2D}$ in the first extent block 9101 can be accessed as a single 2D extent EXT2D[1]. Furthermore, the base-view data blocks not located in the second extent block 9102, i.e. the data blocks B[0], B[1], and B[4] in the extent blocks 9101 and 9103, can also be extracted as extents EXT1[0], EXT1[1], and EXT1[4] in the file base 9111 from the extents EXTSS[0] and EXTSS[1] in the file SS 9120. Conversely, the block exclusively for 2D playback (B[2]+B[3])$_{2D}$ can only be accessed as part of the 2D extent EXT2D[1]. On the other hand, the blocks exclusively for SS playback B[2]$_{SS}$ and B[3]$_{SS}$ can be extracted from the extent SS EXTSS[1] as base-view extents EXT1[2] and EXT1[3].

Figure 108:
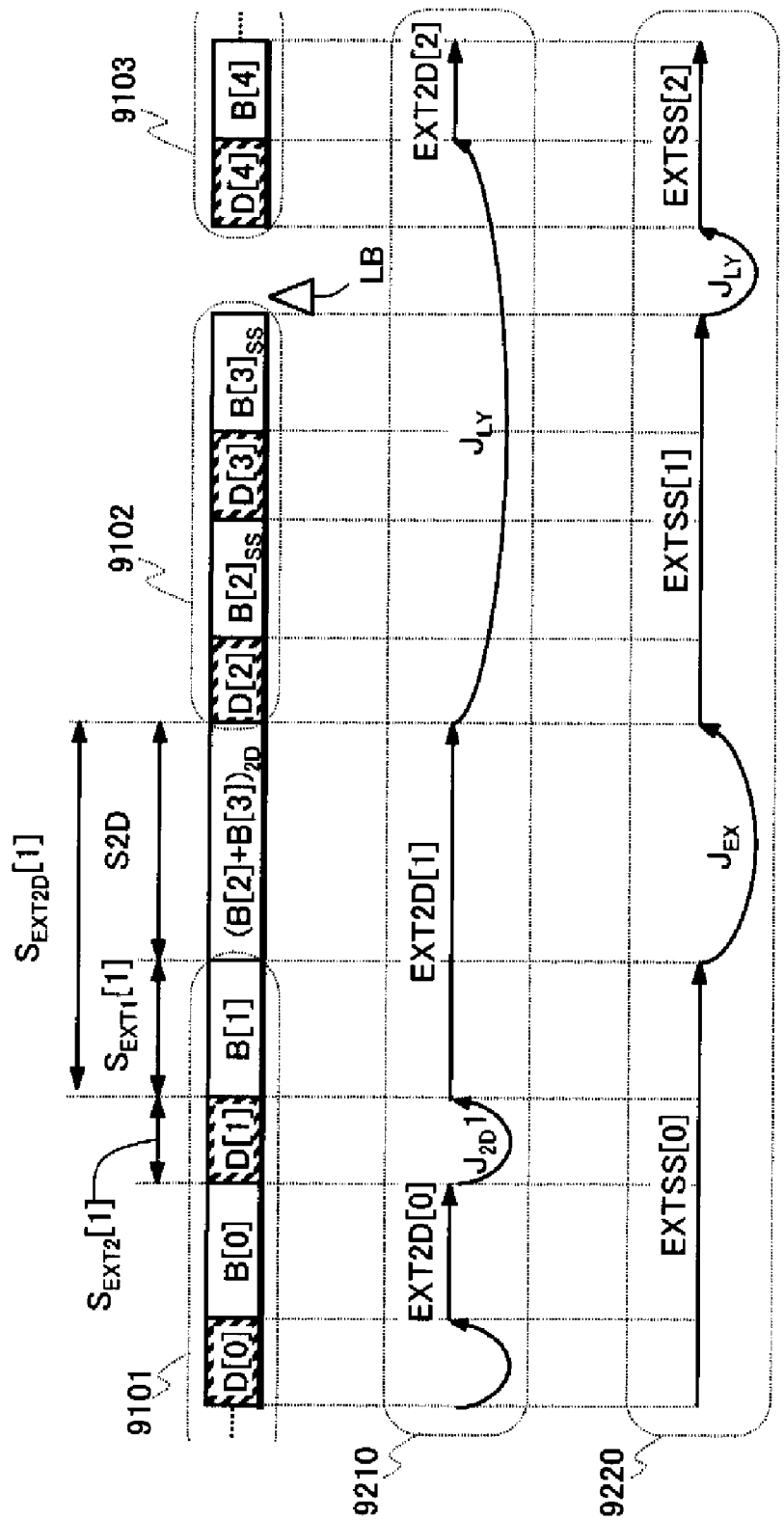
FIG. 108 is a schematic diagram showing a playback path 9210 in 2D playback mode and a playback path 9220 in 3D playback mode for the data block group in arrangement 2 shown in FIG. 107.

FIG. 108 is a schematic diagram showing a playback path 9210 in 2D playback mode and a playback path 9220 in 3D playback mode for the data block group in arrangement 2 shown in FIG. 107.

The playback device 102 in 2D playback mode plays back the file 2D 9110. Accordingly, as shown by the playback path 9210 in 2D playback mode, the base-view data block B[0] second from the end of the first extent block 9101 is read as the first 2D extent EXT2D[0], and then reading of the immediately subsequent dependent-view data block D[1] is skipped by a jump J$_{2D}$1. Next, the pair of the last base-view data block B[1] in the first extent block 9101 and the immediately subsequent block exclusively for 2D playback (B[2]+B[3])$_{2D}$ are continuously read as the second 2D extent EXT2D[1]. A long jump J$_{LY}$ occurs immediately thereafter, and reading of the second extent block 9102 and the dependent-view data block D[4] located at the top of the third extent block 9103 is skipped. Subsequently, the first base-view data block B[4] in the third extent block 9103 is read as the third 2D extent EXT2D[2].

The playback device 102 in 3D playback mode plays back the file SS 9120. Accordingly, as shown by the playback path 9220 in 3D playback mode, the entire first extent block 9101 is continuously read as the first extent SS EXTSS[0]. A jump J$_{Ex}$ occurs immediately thereafter, and reading of the block exclusively for 2D playback (B[2]+B[3])$_{2D}$ is skipped. Next, the entire second extent block 9102 is read continuously as the second extent SS EXTSS[1]. Immediately thereafter, a long jump J$_{LY}$ to skip over a layer boundary LB occurs. Subsequently, the entire third extent block 9103 is read continuously as the third extent SS EXTSS[2].

As shown in FIG. 108, in 2D playback mode, the block exclusively for 2D playback (B[2]+B [3])$_{2D}$ is read, whereas reading of the blocks exclusively for SS playback B[2]$_{SS}$ and B[3]$_{SS}$ is skipped. Conversely, in 3D playback mode, reading of the block exclusively for 2D playback (B[2]+B[3])$_{2D}$ is skipped, whereas the blocks exclusively for SS playback B[2]$_{SS}$ and B[3]$_{SS}$ are read. However, since the block exclusively for 2D playback (B[2]+B[3])$_{2D}$ matches the entirety of the blocks exclusively for SS playback B[2]$_{SS}$+B[3]$_{SS}$ bit-for-bit, the base-view video frames that are played back are the same in both playback modes. In arrangement 2, the playback path 9210 in 2D playback mode and the playback path 9220 in 3D playback mode are divided before and after the long jump J$_{LY}$ in this way. Accordingly, the size S$_{EXT2D}$[1] of the 2D extent EXT2D[1] located immediately before the layer boundary LB and the size S$_{EXT2}$[1] of the immediately preceding dependent-view data block D[1] can be determined separately as follows.

The size S$_{EXT2D}$[1] of the 2D extent EXT$_{2D}$[1] equals S$_{EXT1}$[1]+S$_{2D}$, the sum of the size S$_{EXT1}$[1] of the base-view data block B[1] and the size S$_{2D}$ of the block exclusively for 2D playback (B[2]+B[3])$_{2D}$. Accordingly, for seamless playback of 2D video images, this sum S$_{EXT1}$[1]+S$_{2D}$ should satisfy expression 1. The maximum jump time T$_{JUMP\_MAX}$ of the long jump J$_{LY}$ is substituted into the right-hand side of expression 1 as the jump time T$_{JUMP-2D}$. Next, the number of sectors from the end of the block exclusively for 2D playback (B[2]+B[3])$_{2D}$ to the first 2D extent EXT2D[2]=B[4] in the third extent block 9103 should be equal to or less than the maximum jump distance S$_{JUMP\_MAX}$ for the long jump J$_{LY}$ specified in accordance with the capabilities of the 2D playback device.

On the other hand, for seamless playback of 3D video images, the sizes S$_{EXT2}$[1] and S$_{EXT1}$[1] of the dependent-view data block D[1] and base-view data block B[1] located at the end of the first extent SS EXTSS[0] should satisfy expressions 3 and 2. Regardless of the occurrence of a jump J$_{EX}$, a typical value for a zero sector transition time should be substituted into the right-hand side of expressions 3 and 2 as the zero sector transition times T$_{JUMP0}$[2n+1] and T$_{JUMP0}$[2n+2]. Next, the sizes S$_{EXT2}$[3] and S$_{EXT1}$[3] of the dependent-view data block D[3] and block exclusively for SS playback B[3]$_{SS}$ located at the end of the second extent SS EXTSS[1] should satisfy expressions 3 and 2. Regardless of the occurrence of a long jump J$_{LY}$, a typical value for a zero sector transition time should be substituted into the right-hand side of expressions 3 and 2 as the zero sector transition times T$_{JUMP0}$[2n+1] and T$_{JUMP0}$[2n+2].

Only the base-view data block B[1] located at the front of the 2D extent EXT2D[1] is shared with the extent SS EXTSS[1]. Accordingly, by appropriately enlarging the size S$_{2D}$ of the block exclusively for 2D playback (B[2]+B[3])$_{2D}$, the size S$_{EXT1}$[1] of the base-view data block B[1] can be further limited while keeping the size S$_{EXT2D}$[1]=S$_{EXT1}$[1]+S$_{2D}$ of the 2D extent EXT2D[1] constant. As a result, the size S$_{EXT2}$[1] of the dependent-view data block D[1] located immediately before can also be further limited.

The blocks exclusively for SS playback B[2]$_{SS}$+B[3]$_{SS}$ entirely match the block exclusively for 2D playback (B[2]+B[3])$_{2D}$ bit for bit. Accordingly, enlarging the size S$_{2D}$ of the block exclusively for 2D playback (B[2]+B[3])$_{2D}$ enlarges the sizes of the dependent-view data blocks D[2] and D[3] respectively located immediately before the blocks exclusively for SS playback B[2]$_{SS}$ and B[3]$_{SS}$. However, there are two blocks exclusively for SS playback B[2]$_{SS}$ and B[3]$_{SS}$ as +B[3])$_{2D}$. As a result, the sizes of each of the blocks exclusively for SS playback B[2]$_{SS}$ and B[3]$_{SS}$ can be made sufficiently small. The capacity of the read buffers 4121 and 4122 can thus be further reduced to a minimum amount necessary for seamless playback of 3D video images. It is thus possible to set each data block in arrangement 2 to be a size at which seamless playback of both 2D and 3D video images is possible while keeping the read buffer capacity that is to be guaranteed in the playback device 102 to the minimum necessary.

In arrangement 2, duplicate data of the block exclusively for 2D playback $(B[2]+B[3])_{2D}$ is divided into two blocks exclusively for SS playback $B[2]_{SS}$ and $B[3]_{SS}$. Alternatively, the duplicate data may be one block exclusively for SS playback or may be divided into three or more blocks exclusively for SS playback.

<Extent Pair Flag>

Figure 109:
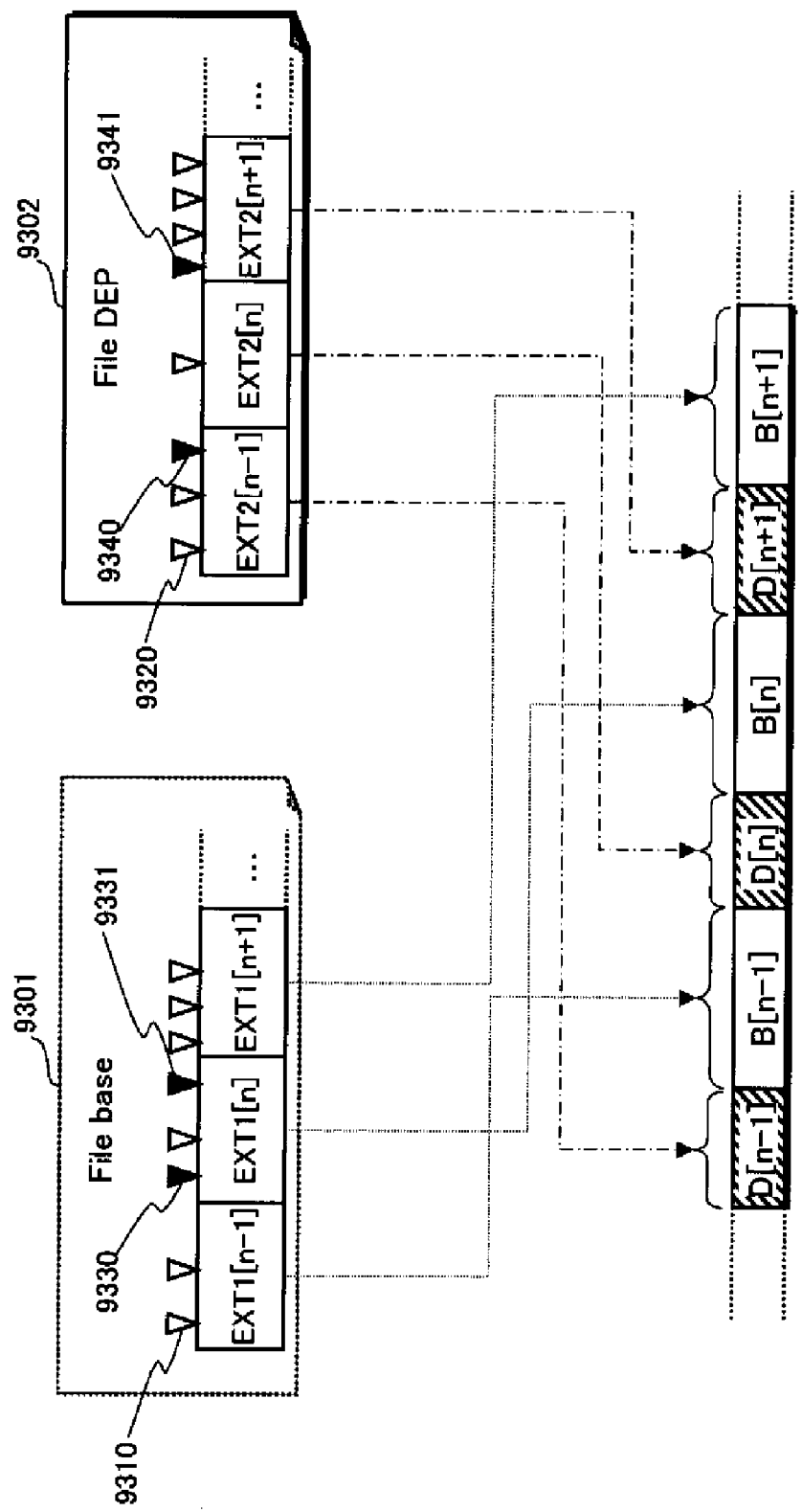
FIG. 109 is a schematic diagram showing entry points 9310 and 9320 set for extents EXT1[k] and EXT2[k] (the letter k represents an integer greater than or equal to 0) in a file base 9301 and a file DEP 9302.

FIG. 109 is a schematic diagram showing entry points 9310 and 9320 set for extents EXT1[k] and EXT2[k] (the letter k represents an integer greater than or equal to 0) in a file base 9301 and a file DEP 9302. The entry point 9310 in the file base 9301 is defined by the entry map in the 2D clip information file, and the entry point 9320 in the file DEP 9302 is defined by the entry map in the dependent-view clip information file. Each entry point 9310 and 9320 particularly includes an extent pair flag. When an entry point in the file base 9301 and an entry point in the file DEP 9302 indicate the same PTS, an "extent pair flag" indicates whether or not the extents in which these entry points are set EXT1[i] and EXT2[j] are in the same order from the top of the files 9301 and 9302 (i=j or i≠j). As shown in FIG. 109, the PTS of the first entry point 9330 set in the $(n+1)^{th}$ (the letter n represents an integer greater than or equal to 1) base-view extent EXT1[n] equals the PTS of the last entry point 9340 set in the $(n-1)^{th}$ dependent-view extent EXT2[n−1]. Accordingly, the value of the extent pair flag for the entry points 9330 and 9340 is set to "0". Similarly, the PTS of the last entry point 9331 set in the $(n+1)^{th}$ base-view extent EXT1[n] equals the PTS of the first entry point 9341 set in the $(n+1)^{th}$ dependent-view extent EXT2[n+1]. Accordingly, the value of the extent pair flag for the entry points 9331 and 9341 is set to "0". For other entry points 9310 and 9320, when the PTSs are equal, the order of the extents EXT1[·] and EXT2[·] in which these points are set is also equal, and thus the value of the extent pair flag is set to "1".

When the playback device 102 in 3D playback mode begins interrupt playback, it refers to the extent pair flag in the entry point of the playback start position. When the value of the flag is "1", playback actually starts from that entry point. When the value is "0", the playback device 102 searches, before or after that entry point, for another entry point that has an extent pair flag with a value of "1". Playback starts from that other entry point. This ensures that the $n^{th}$ dependent-view extent EXT2[n] is read before the $n^{th}$ base-view extent EXT1[n]. As a result, interrupt playback can be simplified.

The presentation time corresponding to the distance between entry points having an extent pair flag=0 may be limited to be no greater than a constant number of seconds. For example, the time may be limited to be less than or equal to twice the maximum value of the presentation time for one GOP. At the start of interrupt playback, this can shorten the wait time until playback begins, which is caused by searching for an entry point having an extent pair flag=1. Alternatively, the value of the extent pair flag for the entry point following an entry point with an extent pair flag=0 may be limited to a value of "1". An angle switching flag may also be used as a substitute for an extent pair flag. An "angle switching flag" is a flag prepared within the entry map for content that supports multi-angle. The angle switching flag indicates the angle switching position within multiplexed stream data (see below for a description of multi-angle).

<Matching Playback Periods Between Data Blocks>

For pairs of data blocks with equal extent ATC times, the playback period may also match, and the playback time of the video stream may be equal. In other words, the number of VAUs may be equal between these data blocks. The significance of such equality is explained below.

FIG. 110A is a schematic diagram showing a playback path when extent ATC times and playback times of the video stream differ between contiguous base-view data blocks and dependent-view data blocks. As shown in FIG. 110A, the playback time of the top base-view data block B[0] is four seconds, and the playback time of the top dependent-view data block D[0] is one second. In this case, the section of the base-view video stream that is necessary for decoding of the dependent-view data block D[0] has the same playback time as the dependent-view data block D[0]. Accordingly, to save read buffer capacity in the playback device, it is preferable, as shown by the arrow ARW1 in FIG. 110A, to have the playback device alternately read the base-view data block B[0] and the dependent-view data block D[0] by the same amount of playback time, for example one second at a time. In that case, however, as shown by the dashed lines in FIG. 110A, jumps occur during read processing. As a result, it is difficult to cause read processing to keep up with decoding processing, and thus it is difficult to stably maintain seamless playback.

FIG. 110B is a schematic diagram showing a playback path when the playback times of the video stream are equal for contiguous base-view and dependent-view data blocks. As shown in FIG. 110B, the playback time of the video stream between a pair of adjacent data blocks may be the same. For example, for the pair of the top data blocks B[0] and D[0], the playback times of the video stream both equal one second, and the playback times of the video stream for the second pair of data blocks B[1] and D[1] both equal 0.7 seconds. In this case, during 3D playback mode, the playback device reads data blocks B[0], D[0], B[1], D[1], . . . in order from the top, as shown by arrow ARW2 in FIG. 110B. By simply reading these data blocks in order, the playback device can smoothly read the main TS and sub-TS alternately in the same increments of playback time. In particular, since no jump occurs during read processing, seamless playback of 3D video images can be stably maintained.

If the extent ATC time is actually the same between contiguous base-view and dependent-view data blocks, jumps do not occur during reading, and synchronous decoding can be maintained. Accordingly, even if the playback period or the playback time of the video stream are not equal, the playback device can reliably maintain seamless playback of 3D video images by simply reading data block groups in order from the top, as in the case shown in FIG. 110B.

The number of any of the headers in a VAU, and the number of PES headers, may be equal for contiguous base-view and dependent-view data blocks. These headers are used to synchronize decoding between data blocks. Accordingly, if the number of headers is equal between data blocks, it is relatively easy to maintain synchronous decoding, even if the number of VAUs is not equal. Furthermore, unlike when the number of VAUs is equal, all of the data in the VAUs need not be multiplexed in the same data block. Therefore, there is a high degree of freedom for multiplexing stream data during the authoring process of the BD-ROM disc 101.

The number of entry points may be equal for contiguous base-view and dependent-view data blocks. Referring again to FIG. 109, in the file base 9301 and the file DEP 9302, the extents EXT1[n] and EXT2[n], located in the same order from the top, have the same number of entry points 9310 and 9320, after excluding the entry points 9330, 9340, 9331, 9341 with an extent pair flag=0. Whether jumps are present differs between 2D playback mode and 3D playback mode. When the number of entry points is equal between data blocks, however, the playback time is substantially equal. Accordingly, it is easy to maintain synchronous decoding regardless of jumps. Furthermore, unlike when the number of VAUs is equal, all of the data in the VAUs need not be multiplexed in the same data block. Therefore, there is a high degree of freedom for multiplexing stream data during the authoring process of the BD-ROM disc 101.

<Multi-Angle>

Figures 111A, 111B, 111C:
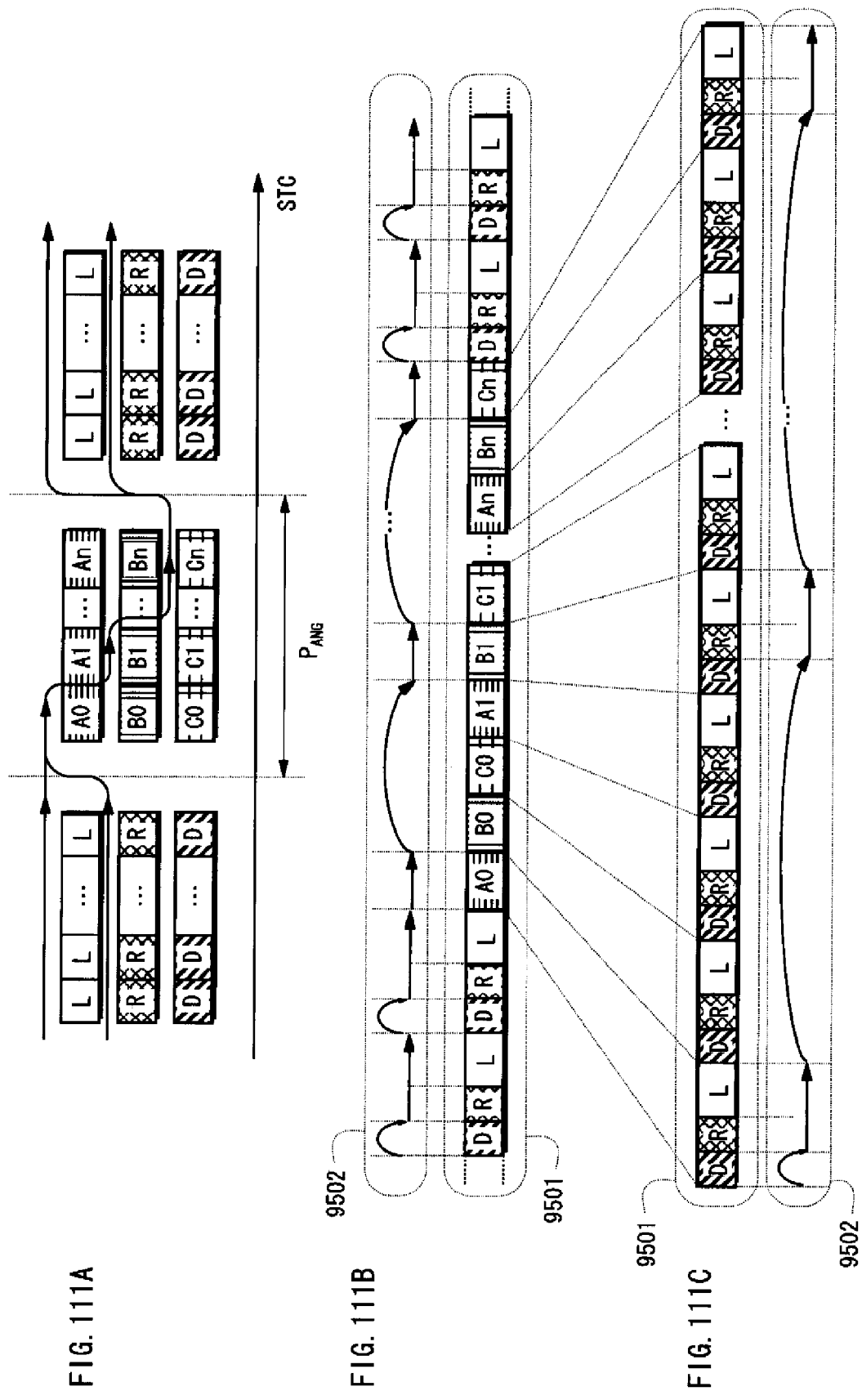
FIG. 111A is a schematic diagram showing a playback path for multiplexed stream data support multi-angle.
FIG. 111B is a schematic diagram showing a data block group 9501 recorded on a BD-ROM disc and a corresponding playback path 9502 in L/R mode.
FIG. 111C is a schematic diagram showing an extent block formed by stream data Ak, Bk, and Ck for different angles.

FIG. 111A is a schematic diagram showing a playback path for multiplexed stream data supporting multi-angle. As shown in FIG. 111A, three types of pieces of stream data L, R, and D respectively for a base view, right view, and depth map are multiplexed in the multiplexed stream data. For example, in L/R mode the base-view and right-view pieces of stream data L and R are played back in parallel. Furthermore, pieces of stream data Ak, Bk, and Ck (k=0, 1, 2, . . . , n) for different angles (viewing angles) are multiplexed in the section played back during a multi-angle playback period $P_{ANG}$. The stream data Ak, Bk, and Ck for different angles is divided into sections for which the playback time equals the angle change interval. Furthermore, stream data for the base view, right view and depth map is multiplexed in each of the pieces of data Ak, Bk, and Ck. During the multi-angle playback period $P_{ANG}$, playback can be switched between the pieces of stream data Ak, Bk, and Ck for different angles in response to user operation or instruction by an application program.

FIG. 111B is a schematic diagram showing a data block group 9501 recorded on a BD-ROM disc and a corresponding playback path 9502 in L/R mode. This data block group 9501 includes the pieces of stream data L, R, D, Ak, Bk, and Ck shown in FIG. 111A. As shown in FIG. 111B, in the data block group 9501, in addition to the regular pieces of stream data L, R, and D, the pieces of stream data Ak, Bk, and Ck for different angles are recorded in an interleaved arrangement. In L/R mode, as shown in the playback path 9502, the right-view and base-view data blocks R and L are read, and reading of the depth map data blocks D is skipped by jumps. Furthermore, from among the pieces of stream data Ak, Bk, and Ck for different angles, the data blocks for the selected angles A0, B1, . . . , Cn are read, and reading of other data blocks is skipped by jumps.

FIG. 111C is a schematic diagram showing an extent block formed by stream data Ak, Bk, and Ck for different angles. As shown in FIG. 111C, the pieces of stream data Ak, Bk, and Ck for each angle are composed of three types of data blocks L, R, and D recorded in an interleaved arrangement. In L/R mode, as shown by the playback path 9502, from among the pieces of stream data Ak, Bk, and Ck for different angles, right-view and base-view data blocks R and L are read for selected angles A0, B1, . . . , Cn. Conversely, reading of the other data blocks is skipped by jumps.

Note that in the pieces of stream data Ak, Bk, and Ck for each angle, the stream data for the base view, right view, and depth map may be stored as a single piece of multiplexed stream data. However, the recording rate has to be limited to the range of the system rate for which playback is possible in the 2D playback device. Also, the number of pieces of stream data (TS) to be transferred to the system target decoder differs between such pieces of multiplexed stream data and multiplexed stream data for other 3D video images. Accordingly, each PI in the 3D playlist file may include a flag indicating the number of TS to be played back. By referring to this flag, the 3D playback device can switch between these pieces of multiplexed stream data within one 3D playlist file. In the PI that specifies two TS for playback in 3D playback mode, this flag indicates 2TS. On the other hand, in the PI that specifies a single TS for playback, such as the above pieces of multiplexed stream data, the flag indicates 1TS. The 3D playback device can switch the setting of the system target decoder in accordance with the value of the flag. Furthermore, this flag may be expressed by the value of the connection condition (CC). For example, a CC of "7" indicates a transition from 2TS to 1TS, whereas a CC of "8" indicates a transition from 1TS to 2TS.

Figure 112:
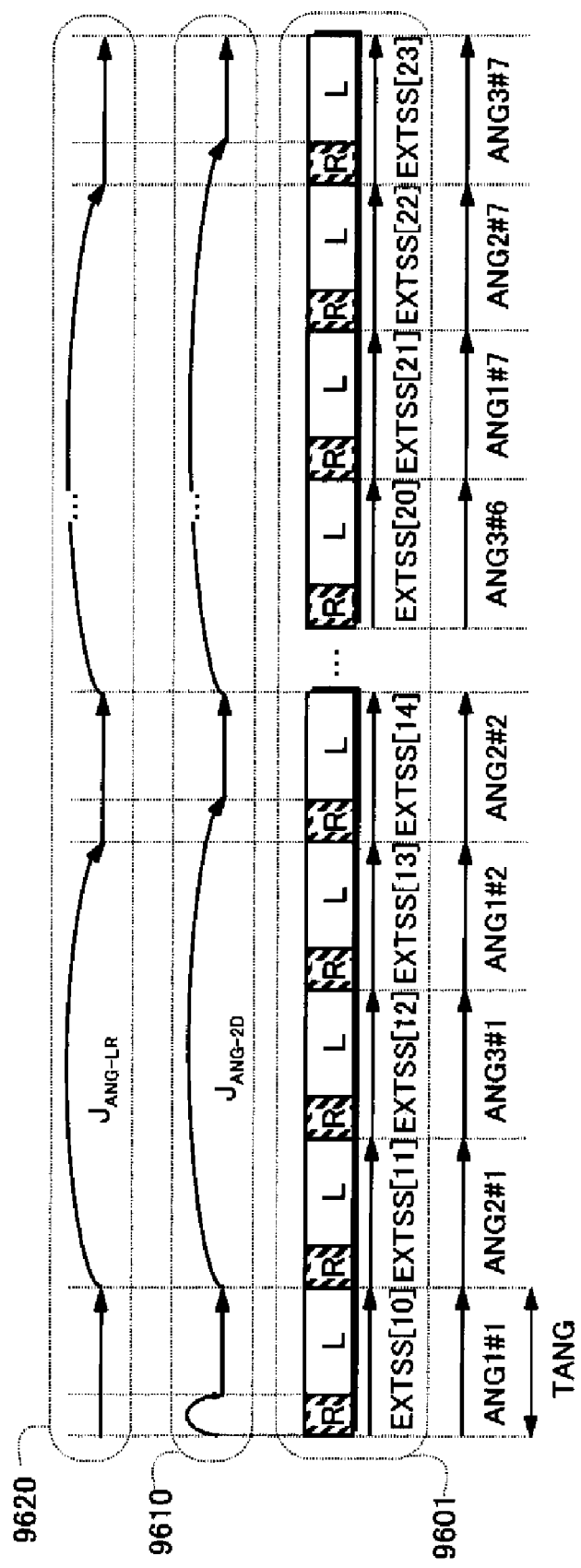
FIG. 112 is a schematic diagram showing (i) a data block group 9601 constituting a multi-angle period and (ii) a playback path 9610 in 2D playback mode and playback path 9620 in L/R mode that correspond to the data block group 9601.
Figure 113:
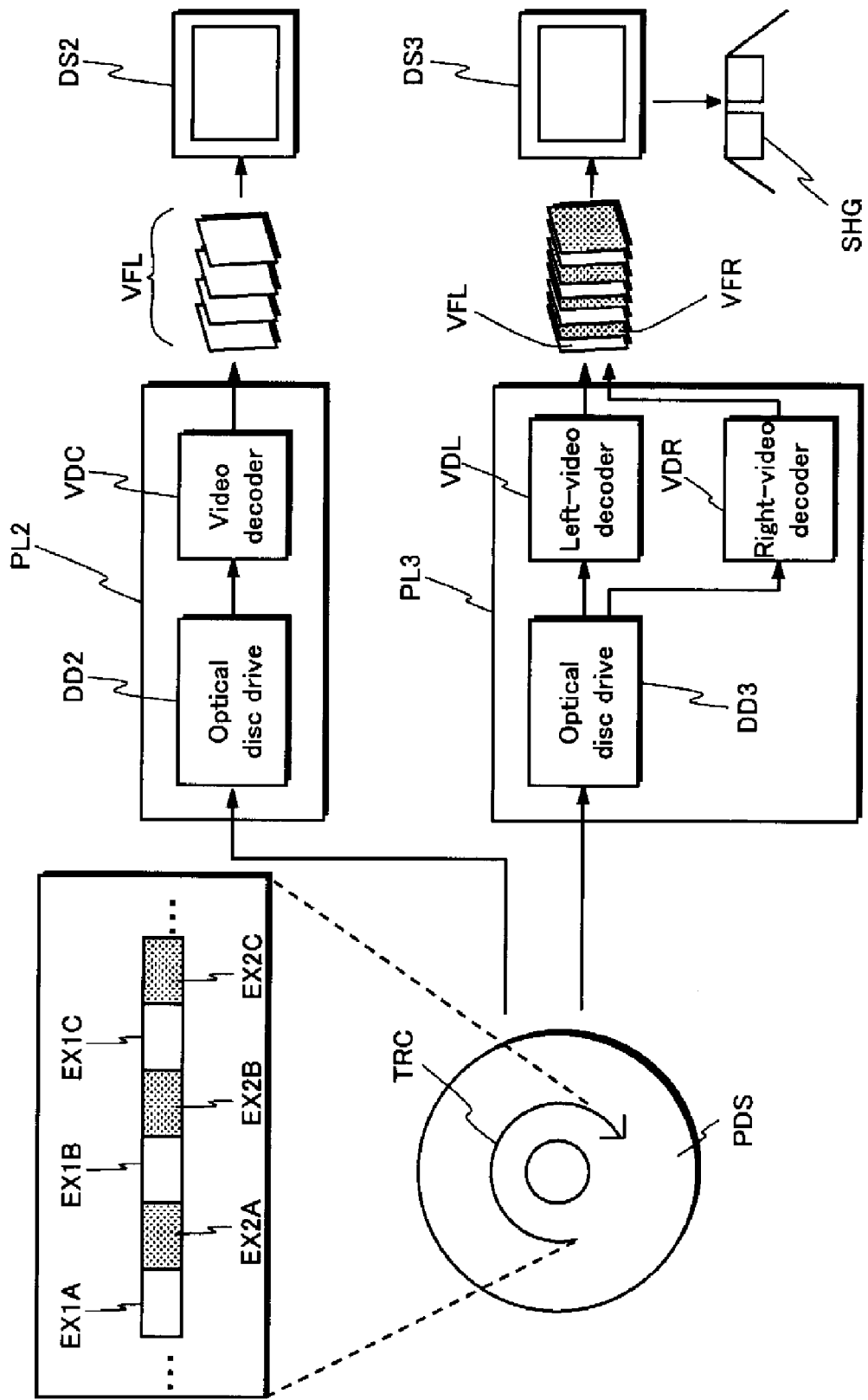
FIG. 113 is a schematic diagram showing technology for ensuring compatibility with a 2D playback devices for an optical disc on which 3D video content is recorded.

FIG. 112 is a schematic diagram showing (i) a data block group 9601 constituting a multi-angle period and (ii) a playback path 9610 in 2D playback mode and playback path 9620 in L/R mode that correspond to the data block group 9601. As shown in FIG. 112, this data block group 9601 is formed by three types of angle change sections ANG1 #k, ANG2 #k, and ANG3 #k (k=1, 2, . . . , 6, 7) in an interleaved arrangement. An "angle change section" is a group of consecutive data blocks in which stream data for video images seen from a single angle is stored. The angle of video images differs between different types of angle change sections. The k$^{th}$ sections of each type of angle change section ANG1 #k, ANG2 #k, and ANG3 #k are contiguous. Each angle change section ANGm #k (m=1, 2, 3) is formed by one extent block, i.e. is referred to as one extent SS EXTSS[k] (k=10, 11, . . . , 23). The capacity of the read buffer can thus be reduced as compared to when a plurality of angle change sections form one extent SS EXTSS [k]. Furthermore, each extent block includes one dependent-view data block R and one base-view data block L. This pair of data blocks R and L is referred to as a pair of the n$^{th}$ dependent-view extent EXT2[n] and the n$^{th}$ base-view extent EXT1[n] (the letter n represents an integer greater than or equal to 0).

The size of each extent block satisfies conditions 1-4. In particular, the jump that should be taken into consideration in condition 1 is the jump $J_{ANG-2D}$ to skip reading of other angle change sections, as shown by the playback path 9610 in 2D playback mode. On the other hand, the jump that should be taken into consideration in condition 4 is the jump $J_{ANG-LR}$ to skip reading of other angle change sections, as shown by the playback path 9620 in L/R mode. As shown by the playback paths 9610 and 9620, both of these jumps $J_{ANG-2D}$ and $J_{ANG-LR}$ generally include an angle switch, i.e. a switch between the type of angle change section to be read. Further referring to FIG. 112, each angle change section includes one base-view data block L. Accordingly, the extent ATC time of the base-view extent EXT1[•] is limited to being no greater than the maximum value $T_{ANG}$ of the length of the angle change section. For example, in order to make it possible to switch angles at a rate of once every two seconds of presentation time, the maximum value $T_{ANG}$ of the length of the angle change section has to be limited to two seconds. As a result, the extent ATC time of the base-view extent EXT1 [•] is limited to two seconds or less. Therefore, condition 5 is changed so that the size $S_{EXT1}$ of the base-view extent satisfies expression 9 instead of expression 5.

$$S_{EXT1}[k] \le \max\left\{ R_{EXT1}[k] \times \frac{R_{UD54}}{R_{UD54} - R_{MAX1}} \times T_{JUMP\text{-}2D\_MIN}, \frac{R_{EXT1}[k] \times}{T_{ANG}} \right\} \quad (9)$$

<Data Distribution via Broadcasting or Communication Circuit>

The recording medium according to the embodiments of the present invention may be, in addition to an optical disc, a general removable medium available as a package medium, such as a portable semiconductor memory device, including an SD memory card. Also, the above embodiments describe an example of an optical disc in which data has been recorded beforehand, namely, a conventionally available read-only optical disc such as a BD-ROM or a DVD-ROM.

However, the embodiments of the present invention are not limited in this way. For example, when a terminal device writes 3D video content that has been distributed via broadcasting or a network onto a conventionally available writable optical disc such as a BD-RE or a DVD-RAM, arrangement of the extents according to embodiment 1 may be used. The terminal device may be incorporated in a playback device or may be a device different from the playback device.

<Playback of Semiconductor Memory Card>

The following describes a data read unit of a playback device in the case where a semiconductor memory card is used as the recording medium according to the embodiments of the present invention instead of an optical disc.

The part of the playback device that reads data from an optical disc is composed of, for example, an optical disc drive. Conversely, the part of the playback device that reads data from a semiconductor memory card is composed of an exclusive interface (I/F). Specifically, a card slot is provided with the playback device, and the I/F is mounted in the card slot. When the semiconductor memory card is inserted into the card slot, the semiconductor memory card is electrically connected with the playback device via the I/F. Furthermore, the data is read from the semiconductor memory card to the playback device via the I/F.

<Copyright Protection Technique for Data Stored in BD-ROM Disc>

The mechanism for protecting copyright of data recorded on a BD-ROM disc is now described as an assumption for the following supplementary explanation.

From a standpoint, for example, of improving copyright protection or confidentiality of data, there are cases in which a part of the data recorded on the BD-ROM is encrypted. The encrypted data is, for example, a video stream, an audio stream, or other stream. In such a case, the encrypted data is decoded in the following manner.

The playback device has recorded thereon beforehand a part of data necessary for generating a "key" to be used for decoding the encrypted data recorded on the BD-ROM disc, namely, a device key. On the other hand, the BD-ROM disc has recorded thereon another part of the data necessary for generating the "key", namely, a media key block (MKB), and encrypted data of the "key", namely, an encrypted title key. The device key, the MKB, and the encrypted title key are associated with one another, and each are further associated with a particular ID written into a BCA 201 recorded on the BD-ROM disc 101 shown in FIG. 2, namely, a volume ID. When the combination of the device key, the MKB, the encrypted title key, and the volume ID is not correct, the encrypted data cannot be decoded. In other words, only when the combination is correct, the above-mentioned "key", namely the title key, can be generated. Specifically, the encrypted title key is first decrypted using the device key, the MKB, and the volume ID. Only when the title key can be obtained as a result of the decryption, the encrypted data can be decoded using the title key as the above-mentioned "key".

When a playback device tries to play back the encrypted data recorded on the BD-ROM disc, the playback device cannot play back the encrypted data unless the playback device has stored thereon a device key that has been associated beforehand with the encrypted title key, the MKB, the device, and the volume ID recorded on the BD-ROM disc. This is because a key necessary for decoding the encrypted data, namely a title key, can be obtained only by decrypting the encrypted title key based on the correct combination of the MKB, the device key, and the volume ID.

In order to protect the copyright of at least one of a video stream and an audio stream that are to be recorded on a BD-ROM disc, a stream to be protected is encrypted using the title key, and the encrypted stream is recorded on the BD-ROM disc. Next, a key is generated based on the combination of the MKB, the device key, and the volume ID, and the title key is encrypted using the key so as to be converted to an encrypted title key. Furthermore, the MKB, the volume ID, and the encrypted title key are recorded on the BD-ROM disc. Only a playback device storing thereon the device key to be used for generating the above-mentioned key can decode the encrypted video stream and/or the encrypted audio stream recorded on the BD-ROM disc using a decoder. In this manner, it is possible to protect the copyright of the data recorded on the BD-ROM disc.

The above-described mechanism for protecting the copyright of the data recorded on the BD-ROM disc is applicable to a recording medium other than the BD-ROM disc. For example, the mechanism is applicable to a readable and writable semiconductor memory device and in particular to a portable semiconductor memory card such as an SD card.

<Recording Data on a Recording Medium Through Electronic Distribution>

The following describes processing to transmit data, such as an AV stream file for 3D video images (hereinafter, "distribution data"), to the playback device according to the embodiments of the present invention via electronic distribution and to cause the playback device to record the distribution data on a semiconductor memory card. Note that the following operations may be performed by a specialized terminal device for performing the processing instead of the above-mentioned playback device. Also, the following description is based on the assumption that the semiconductor memory card that is a recording destination is an SD memory card.

The playback device includes the above-described card slot. An SD memory card is inserted into the card slot. The playback device in this state first transmits a transmission request of distribution data to a distribution server on a network. At this point, the playback device reads identification information of the SD memory card from the SD memory card and transmits the read identification information to the distribution server together with the transmission request. The identification information of the SD memory card is, for example, an identification number specific to the SD memory card and, more specifically, is a serial number of the SD memory card. The identification information is used as the above-described volume ID.

The distribution server has stored thereon pieces of distribution data. Distribution data that needs to be protected by encryption such as a video stream and/or an audio stream has been encrypted using a predetermined title key. The encrypted distribution data can be decrypted using the same title key.

The distribution server stores thereon a device key as a private key common with the playback device. The distribution server further stores thereon an MKB in common with the SD memory card. Upon receiving the transmission request of distribution data and the identification information of the SD memory card from the playback device, the distribution server first generates a key from the device key, the MKB, and the identification information and encrypts the title key using the generated key to generate an encrypted title key.

Next, the distribution server generates public key information. The public key information includes, for example, the MKB, the encrypted title key, signature information, the identification number of the SD memory card, and a device list. The signature information includes for example a hash value of the public key information. The device list is a list of devices that need to be invalidated, that is, devices that have a risk of performing unauthorized playback of encrypted data included in the distribution data. The device list specifies the device key and the identification number for the playback device, as well as an identification number or function (program) for each element in the playback device such as the decoder.

The distribution server transmits the distribution data and the public key information to the playback device. The playback device receives the distribution data and the public key information and records them in the SD memory card via the exclusive I/F of the card slot.

Encrypted distribution data recorded on the SD memory card is decrypted using the public key information in the following manner, for example. First, three types of checks are performed as authentication of the public key information. These checks may be performed in any order.

(1) Does the identification information of the SD memory card included in the public key information match the identification number stored in the SD memory card inserted into the card slot?

(2) Does a hash value calculated based on the public key information match the hash value included in the signature information?

(3) Is the playback device excluded from the device list indicated by the public key information? Specifically, is the device key of the playback device excluded from the device list?

If at least any one of the results of the checks (1) to (3) is negative, the playback device stops decryption processing of the encrypted data. Conversely, if all of the results of the checks (1) to (3) are affirmative, the playback device authorizes the public key information and decrypts the encrypted title key included in the public key information using the device key, the MKB, and the identification information of the SD memory card, thereby obtaining a title key. The playback device further decrypts the encrypted data using the title key, thereby obtaining, for example, a video stream and/or an audio stream.

The above mechanism has the following advantage. If a playback device, compositional elements, and a function (program) that have the risk of being used in an unauthorized manner are already known when data is transmitted via the electronic distribution, the corresponding pieces of identification information are listed in the device list and are distributed as part of the public key information. On the other hand, the playback device that has requested the distribution data inevitably needs to compare the pieces of identification information included in the device list with the pieces of identification information of the playback device, its compositional elements, and the like. As a result, if the playback device, its compositional elements, and the like are identified in the device list, the playback device cannot use the public key information for decrypting the encrypted data included in the distribution data even if the combination of the identification number of the SD memory card, the MKB, the encrypted title key, and the device key is correct. In this manner, it is possible to effectively prevent distribution data from being used in an unauthorized manner.

The identification information of the semiconductor memory card is desirably recorded in a recording area having high confidentiality included in a recording area of the semiconductor memory card. This is because if the identification information such as the serial number of the SD memory card has been tampered with in an unauthorized manner, it is possible to realize an illegal copy of the SD memory card easily. In other words, if the tampering allows generation of a plurality of semiconductor memory cards having the same identification information, it is impossible to distinguish between authorized products and unauthorized copy products by performing the above check (1). Therefore, it is necessary to record the identification information of the semiconductor memory card on a recording area with high confidentiality in order to protect the identification information from being tampered with in an unauthorized manner.

The recording area with high confidentiality is structured within the semiconductor memory card in the following manner, for example. First, as a recording area electrically disconnected from a recording area for recording normal data (hereinafter, "first recording area"), another recording area (hereinafter, "second recording area") is provided. Next, a control circuit exclusively for accessing the second recording area is provided within the semiconductor memory card. As a result, access to the second recording area can be performed only via the control circuit. For example, assume that only encrypted data is recorded on the second recording area and a circuit for decrypting the encrypted data is incorporated only within the control circuit. As a result, access to the data recorded on the second recording area can be performed only by causing the control circuit to store therein an address of each piece of data recorded in the second recording area. Also, an address of each piece of data recorded on the second recording area may be stored only in the control circuit. In this case, only the control circuit can identify an address of each piece of data recorded on the second recording area.

In the case where the identification information of the semiconductor memory card is recorded on the second recording area, then when an application program operating on the playback device acquires data from the distribution server via electronic distribution and records the acquired data in the semiconductor memory card, the following processing is performed. First, the application program issues an access request to the control circuit via the memory card I/F for accessing the identification information of the semiconductor memory card recorded on the second recording area. In response to the access request, the control circuit first reads the identification information from the second recording area. Then, the control circuit transmits the identification information to the application program via the memory card I/F. The application program transmits a transmission request of the distribution data together with the identification information. The application program further records, in the first recording area of the semiconductor memory card via the memory card I/F, the public key information and the distribution data received from the distribution server in response to the transmission request.

Note that it is preferable that the above-described application program check whether the application program itself has been tampered with before issuing the access request to the control circuit of the semiconductor memory card. The check may be performed using a digital certificate compliant with the X.509 standard. Furthermore, it is only necessary to record the distribution data in the first recording area of the semiconductor memory card, as described above. Access to the distribution data need not be controlled by the control circuit of the semiconductor memory card.

<Application to Real-Time Recording>

Embodiment 4 of the present invention is based on the assumption that an AV stream file and a playlist file are recorded on a BD-ROM disc using the prerecording technique of the authoring system, and the recorded AV stream file and playlist file are provided to users. Alternatively, it may be possible to record, by performing real-time recording, the AV stream file and the playlist file on a writable recording medium such as a BD-RE disc, a BD-R disc, a hard disk, or a semiconductor memory card (hereinafter, "BD-RE disc or the like") and provide the user with the recorded AV stream file and playlist file. In such a case, the AV stream file may be a transport stream that has been obtained as a result of real-time decoding of an analog input signal performed by a recording device. Alternatively, the AV stream file may be a transport stream obtained as a result of partialization of a digitally input transport stream performed by the recording device.

The recording device performing real-time recording includes a video encoder, an audio encoder, a multiplexer, and a source packetizer. The video encoder encodes a video signal to convert it into a video stream. The audio encoder encodes an audio signal to convert it into an audio stream. The multiplexer multiplexes the video stream and audio stream to convert them into a digital stream in the MPEG-2 TS format. The source packetizer converts TS packets in the digital stream in MPEG-2 TS format into source packets. The recording device stores each source packet in the AV stream file and writes the AV stream file on the BD-RE disc or the like.

In parallel with the processing of writing the AV stream file, the control unit of the recording device generates a clip information file and a playlist file in the memory and writes the files on the BD-RE disc or the like. Specifically, when a user requests performance of recording processing, the control unit first generates a clip information file in accordance with an AV stream file and writes the file on the BD-RE disc or the like. In such a case, each time a head of a GOP of a video stream is detected from a transport stream received from outside, or each time a GOP of a video stream is generated by the video encoder, the control unit acquires a PTS of an I picture positioned at the head of the GOP and an SPN of the source packet in which the head of the GOP is stored. The control unit further stores a pair of the PTS and the SPN as one entry point in an entry map of the clip information file. At this time, an "is_angle_change" flag is added to the entry point. The is_angle_change flag is set to "on" when the head of the GOP is an IDR picture, and "off" when the head of the GOP is not an IDR picture. In the clip information file, stream attribute information is further set in accordance with an attribute of a stream to be recorded. In this manner, after writing the AV stream file and the clip information file into the BD-RE disc or the like, the control unit generates a playlist file using the entry map in the clip information file, and writes the file on the BD-RE disc or the like.

<Managed Copy>

The playback device according to the embodiments of the present invention may write a digital stream recorded on the BD-ROM disc 101 on another recording medium via a managed copy. "Managed copy" refers to a technique for permitting copy of a digital stream, a playlist file, a clip information file, and an application program from a read-only recording medium such as a BD-ROM disc to a writable recording medium only in the case where authentication via communication with the server succeeds. This writable recording medium may be a writable optical disc, such as a BD-R, BD-RE, DVD-R, DVD-RW, or DVD-RAM, a hard disk, or a portable semiconductor memory element such as an SD memory card, Memory Stick™, Compact Flash™, Smart Media™ or Multimedia Card™. A managed copy allows for limitation of the number of backups of data recorded on a read-only recording medium and for charging a fee for backups.

When a managed copy is performed from a BD-ROM disc to a BD-R disc or a BD-RE disc and the two discs have an equivalent recording capacity, the bit streams recorded on the original disc may be copied in order as they are.

If a managed copy is performed between different types of recording media, a trans code needs to be performed. This "trans code" refers to processing for adjusting a digital stream recorded on the original disc to the application format of a recording medium that is the copy destination. For example, the trans code includes the process of converting an MPEG-2 TS format into an MPEG-2 program stream format and the process of reducing a bit rate of each of a video stream and an audio stream and re-encoding the video stream and the audio stream. During the trans code, an AV stream file, a clip information file, and a playlist file need to be generated in the above-mentioned real-time recording.

<Method for Describing Data Structure>

Among the data structures in the embodiments of the present invention, a repeated structure "there is a plurality of pieces of information having a predetermined type" is defined by describing an initial value of a control variable and a cyclic condition in a "for" sentence. Also, a data structure "if a predetermined condition is satisfied, predetermined information is defined" is defined by describing, in an "if" sentence, the condition and a variable to be set at the time when the condition is satisfied. In this manner, the data structure described in the embodiments is described using a high level programming language. Accordingly, the data structure is converted by a computer into a computer readable code via the translation process performed by a compiler, which includes "syntax analysis", "optimization", "resource allocation", and "code generation", and the data structure is then recorded on the recording medium. By being described in a high level programming language, the data structure is treated as a part other than the method of the class structure in an object-oriented language, specifically, as an array type member variable of the class structure, and constitutes a part of the program. In other words, the data structure is substantially equivalent to a program. Therefore, the data structure needs to be protected as a computer related invention.

<Management of Playlist File and Clip Information File by Playback Program>

When a playlist file and an AV stream file are recorded on a recording medium, a playback program is recorded on the recording medium in an executable format. The playback program makes the computer play back the AV stream file in accordance with the playlist file. The playback program is loaded from a recording medium to a memory element of a computer and is then executed by the computer. The loading process includes compile processing or link processing. By these processes, the playback program is divided into a plurality of sections in the memory element. The sections include a text section, a data section, a bss section, and a stack section. The text section includes a code array of the playback program, an initial value, and non-rewritable data. The data section includes variables with initial values and rewritable data. In particular, the data section includes a file, recorded on the recording medium, that can be accessed at any time. The bss section includes variables having no initial value. The data included in the bss section is referenced in response to commands indicated by the code in the text section. During the compile processing or link processing, an area for the bss section is set aside in the computer's internal RAM. The stack section is a memory area temporarily set aside as necessary. During each of the processes by the playback program, local variables are temporarily used. The stack section includes these local variables. When the program is executed, the variables in the bss section are initially set at zero, and the necessary memory area is set aside in the stack section.

As described above, the playlist file and the clip information file are already converted on the recording medium into computer readable code. Accordingly, at the time of execution of the playback program, these files are each managed as "non-rewritable data" in the text section or as a "file accessed at any time" in the data section. In other words, the playlist file and the clip information file are each included as a compositional element of the playback program at the time of execution thereof. Therefore, the playlist file and the clip information file fulfill a greater role in the playback program than mere presentation of data.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A recording medium on which a main-view video stream, a sub-view video stream, a graphics stream, and playlist information are recorded, wherein
the main-view video stream includes main-view pictures, which constitute main views of stereoscopic video images,
the sub-view video stream includes sub-view pictures and metadata, the sub-view pictures constituting sub-views of stereoscopic video images,
the graphics stream includes graphics data, which constitutes monoscopic graphics images,
each of the main-view pictures is rendered on a main-view video plane when played back,
each of the sub-view pictures is rendered on a sub-view video plane when played back,
the graphics data is rendered on a graphics plane when played back,
the metadata is provided in each group of pictures (GOP) constituting the sub-view video stream and includes a plurality of pieces of offset information and a plurality of offset identifiers corresponding to the pieces of offset information,
the pieces of offset information are control information defining offset control for a plurality of pictures constituting a GOP,
the offset control is a process to provide a left offset and a right offset for horizontal coordinates in the graphics plane to generate a pair of graphics planes, and then combine the pair of graphics planes respectively with the main-view video plane and the sub-view video plane,
the playlist information includes at least one piece of playback section information,
each piece of playback section information includes (i) information indicating a start position and an end position in a playback section and (ii) a stream selection table corresponding to the playback section,
the stream selection table is a correspondence table associating stream numbers with packet identifiers for stream data whose playback is permitted in the playback section, and
when associating a stream number with a packet identifier of the graphics stream, the stream selection table allocates one of the offset identifiers to the stream number.

2. The recording medium of claim 1, wherein
the metadata is provided at the top of each GOP constituting the sub-view video stream, and the number of offset values included in the offset information in the metadata of a GOP equals the number of frames in the GOP.

3. The recording medium of claim 1, wherein
when associating a stream number with a packet identifier of the graphics stream, the stream selection table allocates an offset adjustment value to the stream number, and
the offset adjustment value is used to adjust the offset information corresponding to the offset identifier allocated to the stream number of the graphics stream.

4. The recording medium of claim 1, wherein
when the playlist information specifies that two playback sections are to be connected seamlessly, stream selection tables separately corresponding to the two playback sections share offset identifiers.

5. A recording medium on which a main-view video stream and a sub-view video stream are recorded, wherein
the main-view video stream includes main-view pictures, which constitute main views of stereoscopic video images,
the sub-view video stream includes sub-view pictures and metadata, the sub-view pictures constituting sub-views of stereoscopic video images, and
the metadata includes information for identifying a shared area in which viewing angles of video images overlap, the video images being respectively represented by a left-view picture and a right-view picture of stereoscopic video images constituted by the main-view pictures and the sub-view pictures.

6. The recording medium of claim 5, wherein
an area of the left-view picture other than the shared area includes a strip along the left edge of the left-view picture, and an area of the right-view picture other than the shared area includes a strip along the right edge of the right-view picture, and
the information indicates a width of each strip.

7. A recording medium on which a main-view video stream, a sub-view video stream, and a graphics stream are recorded, wherein
the main-view video stream includes main-view pictures, which constitute main views of stereoscopic video images,
the sub-view video stream includes sub-view pictures and metadata, the sub-view pictures constituting sub-views of stereoscopic video images,
the graphics stream includes graphics data, which constitutes monoscopic graphics images,
each of the main-view pictures is rendered on a main-view video plane when played back,
each of the sub-view pictures is rendered on a sub-view video plane when played back,
the graphics data is rendered on a graphics plane when played back, and
the metadata includes information defining an active area in the graphics plane.

8. The recording medium of claim 7, wherein
the information indicates widths of two strips respectively along a left side and a right side of the graphics plane.

9. The recording medium of claim 8, wherein
the two strips are areas that are to be removed from the graphics plane.

10. The recording medium of claim 8, wherein
the two strips are areas in which placement of graphics is prohibited.

11. A recording medium on which a main-view video stream, a sub-view video stream, a main-view graphics stream, and a sub-view graphics stream are recorded, wherein
the main-view video stream includes main-view pictures, which constitute monoscopic video images,
the main-view graphics stream includes graphics data constituting main views of stereoscopic graphics images,
the sub-view graphics stream includes graphics data constituting sub-views of stereoscopic graphics images, and
the sub-view video stream includes pictures constituting the same monoscopic video images as the main-view pictures.

12. A playback device for playing back video images from a recording medium, wherein
a main-view video stream, a sub-view video stream, a graphics stream, and playlist information are recorded on the recording medium,
the main-view video stream includes main-view pictures, which constitute main views of stereoscopic video images,
the sub-view video stream includes sub-view pictures and metadata, the sub-view pictures constituting sub-views of stereoscopic video images,
the graphics stream includes graphics data, which constitute monoscopic graphics images,
each of the main-view pictures is rendered on a main-view video plane when played back,
each of the sub-view pictures is rendered on a sub-view video plane when played back,
the graphics data is rendered on a graphics plane when played back,
the metadata is provided in each group of pictures (GOP) constituting the sub-view video stream and includes a plurality of pieces of offset information and a plurality of offset identifiers corresponding to the pieces of offset information,
the pieces of offset information are control information defining offset control for a plurality of pictures constituting a GOP,
the offset control is a process to provide a left offset and a right offset for horizontal coordinates in the graphics plane to generate a pair of graphics planes, and then combine the pair of graphics planes respectively with the main-view video plane and the sub-view video plane,
the playlist information includes at least one piece of playback section information,
each piece of playback section information includes (i) information indicating a start position and an end position in a playback section and (ii) a stream selection table corresponding to the playback section,
the stream selection table is a correspondence table associating stream numbers with packet identifiers for stream data whose playback is permitted in the playback section, and
when associating a stream number with a packet identifier of the graphics stream, the stream selection table allocates one of the offset identifiers to the stream number,
the playback device comprising:

a read unit operable to read data from the recording medium;
a decoding unit operable to (i) decode playback section information in order from playlist information read by the read unit, (ii) select a packet identifier and an offset identifier for stream data to be decoded in each playback section, (iii) separate, from stream data read by the read unit, stream data indicated by the packet identifier corresponding to the selected stream number, (iv) decode at least one of a video plane and a graphics plane, and (v) extract the metadata from the sub-view video stream; and
a plane composition unit operable to refer to the offset identifier allocated to the selected stream number to retrieve offset information from the metadata extracted by the decoding unit and then perform offset control on the graphics plane in accordance with the offset information.

13. The playback device of claim 12, wherein
the plane composition unit maintains offset information included in metadata extracted from a GOP from a time at which video images are played back from the GOP located at the end of the sub-view video stream until a time at which metadata is extracted from the next GOP.

14. A playback device for playing back video images from a recording medium, wherein
a main-view video stream and a sub-view video stream are recorded on the recording medium,
the main-view video stream includes main-view pictures, which constitute main views of stereoscopic video images,
the sub-view video stream includes sub-view pictures and metadata, the sub-view pictures constituting sub-views of stereoscopic video images,
each of the main-view pictures is rendered on a main-view video plane when played back,
each of the sub-view pictures is rendered on a sub-view video plane when played back,
the metadata includes information for identifying a shared area in which viewing angles of video images overlap, the video images being respectively represented by a left-view picture and a right-view picture of stereoscopic video images constituted by the main-view pictures and the sub-view pictures,
the playback device comprising:
a read unit operable to read the main-view video stream and the sub-view video stream from the recording medium;
a decoding unit operable to (i) decode the main-view video stream and the sub-view video stream read by the read unit into respective video planes, and (ii) extract the metadata from the sub-view video stream; and
a plane processing unit operable to process the video planes, based on information included in the metadata, and thus hide areas other than the shared area in the left-view picture and the right-view picture.

15. The playback device of claim 14, wherein
the plane processing unit provides areas in the video planes with one of a background color and black, except for the shared area in the left-view picture and the right-view picture.

16. The playback device of claim 15, wherein
the plane processing unit shifts the shared area to the center of each video plane.

17. The playback device of claim 14, wherein
the plane processing unit crops each video plane to remove the areas other than the shared area from the left-view picture and the right-view picture and enlarges the shared area.

18. A playback device for playing back video images from a recording medium, wherein
a main-view video stream, a sub-view video stream, and a graphics stream are recorded on the recording medium,
the main-view video stream includes main-view pictures, which constitute main views of stereoscopic video images,
the sub-view video stream includes sub-view pictures and metadata, the sub-view pictures constituting sub-views of stereoscopic video images,
the graphics stream includes graphics data, which constitutes monoscopic graphics images,
each of the main-view pictures is rendered on a main-view video plane when played back,
each of the sub-view pictures is rendered on a sub-view video plane when played back,
the graphics data is rendered on a graphics plane when played back,
the metadata includes information defining an active area in the graphics plane, and
the information indicates widths of two strips respectively along a left side and a right side of the graphics plane,
the playback device comprising:
a read unit operable to read the main-view video stream, the sub-view video stream, and the graphics stream from the recording medium;
a decoding unit operable to decode stream data read by the read unit into video planes and graphics planes and to extract the metadata from the sub-view video stream; and
a plane composition unit operable to extract, from the metadata extracted by the decoding unit, information defining an active area in the graphics plane and to remove strips from a left edge and right edge of the graphics plane in accordance with the information.

19. A playback device for playing back video images from a recording medium, wherein
a main-view video stream, a sub-view video stream, a main-view graphics stream, and a sub-view graphics stream are recorded on the recording medium,
the main-view video stream includes main-view pictures, which constitute monoscopic video images,
the main-view graphics stream includes graphics data constituting main views of stereoscopic graphics images,
the sub-view graphics stream includes graphics data constituting sub-views of stereoscopic graphics images, and
the sub-view video stream includes pictures constituting the same monoscopic video images as the main-view pictures,
the playback device comprising:
a read unit operable to read the main-view video stream, the sub-view video stream, the main-view graphics stream, and the sub-view graphics stream from the recording medium;
a decoding unit operable to decode streams read by the read unit; and
a superimposition unit operable to superimpose monoscopic video images and stereoscopic graphics images decoded by the decoding unit.

20. An encoding device for encoding stereoscopic video images and monoscopic video images as a series of picture data, the encoding device
encoding video images from one viewpoint as main-view picture data and video images from another viewpoint as sub-view picture data with reference to the main-view picture data when encoding stereoscopic video images, and
encoding monoscopic video images as main-view picture data and encoding the monoscopic video images as sub-view picture data with reference to the main-view picture data when encoding monoscopic video images.

21. A semiconductor integrated circuit for performing video signal processing on data received from a recording medium on which are recorded a main-view video stream, a sub-view video stream, a graphics stream, and playlist information, wherein
the main-view video stream includes picture data constituting main views of stereoscopic video images,
the sub-view video stream includes picture data and metadata, the picture data constituting sub-views of stereoscopic video images,
the graphics stream includes graphics data, which constitutes monoscopic graphics images,
the main-view video stream is multiplexed into a main-view transport stream and then divided into a plurality of main-view data groups,
the sub-view video stream is multiplexed into a sub-view transport stream and then divided into a plurality of sub-view data groups,
the main-view data groups and the sub-view data groups are recorded in an interleaved arrangement,
the graphics stream is multiplexed in at least one of the main-view transport stream and the sub-view transport stream, and at least one of the main-view data groups and the sub-view data groups includes the graphics data,
a positive offset and a negative offset are provided for horizontal coordinates in a graphics plane to generate a pair of graphics planes, and then the pair of graphics planes are superimposed respectively on picture data constituting the main view and picture data constituting the sub-view,
the metadata is provided in each group of pictures (GOP) constituting the sub-view video stream and includes a plurality of pieces of offset information and a plurality of offset identifiers corresponding to the pieces of offset information,
the pieces of offset information are control information specifying offset control for a plurality of pictures constituting a GOP and include information indicating an offset value for the graphics plane in units of pixels,
the playlist information includes at least one piece of playback section information,
each piece of playback section information includes (i) information indicating a start position and an end position in a playback section and (ii) a stream selection table corresponding to the playback section,
the stream selection table is a correspondence table associating stream numbers with packet identifiers for streams whose playback is permitted in the playback section, and
when associating a stream number with a packet identifier of the graphics stream, the stream selection table allocates one of the offset identifiers to the stream number,
the semiconductor integrated circuit comprising:
a stream processing unit operable to receive data from the recording medium, store the data in a memory unit internal or external to the semiconductor integrated circuit, and then demultiplex the data into the picture data and the graphics data;

a signal processing unit operable to decode the picture data and the graphics data into decoded picture data and decoded graphics data; and an AV output unit operable to superimpose the decoded graphics data on the decoded picture data and output superimposed data, wherein the stream processing unit comprises a switching unit operable to switch a storage location of the data received from the recording medium between a first area and a second area within the memory unit, the switching unit is controlled to store data belonging to the main-view data groups and the sub-view data groups in the first area and the second area respectively, the AV output unit comprises an image superimposition unit operable to superimpose the decoded graphics data on the decoded picture data, the signal processing unit stores
  (iii) the decoded picture data belonging to the main-view data groups in a third area of the memory unit, the third area being provided for a main-view video plane,
  (iv) the decoded picuture data belonging to the sub-view data groups in a fourth area of the memory unit, the fourth area being provided for a sub-view video plane, and
  (v) the decoded graphics data in a fifth area of the memory unit, the fifth area being provided for a graphics plane, the signal processing unit extracts the metadata from the sub-view video stream and notifies the image superimposition unit of the metadata, and the image superimposition unit refers to an offset identifier in the stream selection table to retrieve offset information from the metadata, uses the offset information to provide a positive offset and a negative offset for horizontal coordinates in the graphics plane to generate a pair of graphics planes, and then superimposes the pair of graphics planes respectively on the main-view video plane and the sub-view video plane.

22. A playback output device for receiving a multiplexed stream in which a video stream and an audio stream are multiplexed, the video stream being constituted by sequential video frame data and the audio stream being constituted by sequential audio frame data, and then playing back and outputting stereoscopic video images from the multiplexed stream, the playback output device comprising:

a receiving unit operable to receive the multiplexed stream;
a stream processing unit operable to separate video data and audio data from the multiplexed stream;
a signal processing unit operable to decode the video data and the audio data respectively into decoded sequential video frame data and decoded sequential audio frame data; and
an output unit operable to output the decoded sequential video frame data and the decoded sequential audio frame data,
the playback output device removing a portion of pixel data from the sequential video frame data when outputting stereoscopic video images.

23. The playback output device of claim 22, wherein the portion of pixel data includes pixel data located in strips along both edges of each video frame.

24. A playback output device for receiving a multiplexed stream in which a video stream and a graphics stream are multiplexed, the video stream being constituted by sequential video frame data and the graphics stream being constituted by graphics data, and then playing back and outputting stereoscopic video images from the multiplexed stream, the playback output device comprising:

a receiving unit operable to receive the multiplexed stream;
a stream processing unit operable to separate video data and graphics data from the multiplexed stream;
a signal processing unit operable to decode the video data and the graphics data into decoded sequential video frame data and decoded graphics data respectively; and
an output unit operable to superimpose the decoded graphics data on the decoded sequential video frame data and then output superimposed data,
the playback output device being operable to remove a portion from the decoded graphics data.

25. A semiconductor integrated circuit for performing video signal processing on data received from a recording medium on which are recorded a main-view video stream, a sub-view video stream, a main-view graphics stream, and a sub-view graphics stream, wherein the main-view video stream includes picture data constituting monoscopic video images,
the sub-view video stream includes picture data constituting the same monoscopic video images as the main-view video stream,
the main-view graphics stream includes main-view graphics data constituting main views of stereoscopic graphics images,
the sub-view graphics stream includes sub-view graphics data constituting sub-views of stereoscopic graphics images,
the main-view video stream is multiplexed into a main-view transport stream and then divided into a plurality of main-view data groups,
the sub-view video stream is multiplexed into a sub-view transport stream and then divided into a plurality of sub-view data groups,
the main-view data groups and the sub-view data groups are recorded in an interleaved arrangement,
the main-view graphics stream is multiplexed in at least one of the main-view transport stream and the sub-view transport stream,
the sub-view graphics stream is multiplexed in at least one of the main-view transport stream and the sub-view transport stream, and at least one of the main-view data groups and the sub-view data groups includes at least one of the main-view graphics data and the sub-view graphics data, the semiconductor integrated circuit comprising:

a stream processing unit operable to receive, from the recording medium, data in which the main-view data groups and the sub-view data groups are recorded in an interleaved arrangement, store the data in a memory unit internal or external to the semiconductor integrated circuit, and demultiplex the data into the picture data and the graphics data;

a signal processing unit operable to decode picture data belonging to the main-view data groups, picture data belonging to the sub-view data groups, the main-view graphics data, and the sub-view graphics data into decoded picture data belonging to the main-view data groups, decoded picture data belonging to the sub-view data groups, decoded main-view graphics data, and decoded sub-view graphics data, respectively; and an AV output unit operable to superimpose the decoded picture data belonging to the sub-view data groups, the decoded main-view graphics data, and the decoded sub-view graphics data on the decoded picture data belonging to the main-view data groups, and to output superimposed data, the stream processing unit comprising a switching unit operable to switch a storage location of the data received from the recording medium between a first area and a second area within the memory unit, the switching unit being controlled to store data belonging to the main-view data groups in the first area in the memory unit and data belonging to the sub-view data groups in the second area in the memory unit, and the AV output unit comprising an image superimposition unit that superimposes the decoded main-view graphics data on the decoded picture data belonging to the main-view data groups and superimposes the decoded sub-view graphics data on the decoded picture data belonging to the sub-view data groups.

\* \* \* \* \*